US010496774B2

(12) United States Patent
Anetseder

(10) Patent No.: US 10,496,774 B2
(45) Date of Patent: Dec. 3, 2019

(54) SPECIFICATION METHOD FOR PRODUCING DATA PROCESSING SYSTEMS

(75) Inventor: Leo Philip Anetseder, Starnberg (DE)

(73) Assignee: Leo Philip Anetseder, Starnberg (DE)

( * ) Notice: Subject to any disclaimer, the term of this patent is extended or adjusted under 35 U.S.C. 154(b) by 151 days.

(21) Appl. No.: 13/388,348

(22) PCT Filed: Aug. 3, 2010

(86) PCT No.: PCT/DE2010/000918
§ 371 (c)(1),
(2), (4) Date: Feb. 1, 2012

(87) PCT Pub. No.: WO2011/015191
PCT Pub. Date: Feb. 10, 2011

(65) Prior Publication Data

US 2012/0131541 A1 May 24, 2012

(30) Foreign Application Priority Data

Aug. 3, 2009 (DE) ........................ 10 2009 035 751

(51) Int. Cl.
*G06F 9/44* (2018.01)
*G06F 17/50* (2006.01)

(52) U.S. Cl.
CPC ...... *G06F 17/5054* (2013.01); *G06F 2217/86* (2013.01)

(58) Field of Classification Search
CPC ............................... G06F 8/77; G06F 17/5054
USPC .......................................................... 717/101
See application file for complete search history.

(56) References Cited

U.S. PATENT DOCUMENTS 4,901,221 A 2/1990 Kodosky et al.
7,969,431 B2 * 6/2011 Makowski ................ G06F 8/71 345/418
2003/0195729 A1 10/2003 Kodosky et al.
2003/0196187 A1 * 10/2003 Kodosky et al. ............ 717/109
(Continued)

FOREIGN PATENT DOCUMENTS

WO 2007/067894 6/2007

OTHER PUBLICATIONS

International Search Report for international application No. PCT/DE2010/000918, dated Jan. 26, 2011 (12 pages).
(Continued)

*Primary Examiner* — Chat C Do
*Assistant Examiner* — Lenin Paulino
(74) *Attorney, Agent, or Firm* — Gable Gotwals

(57) ABSTRACT

The invention relates to a specification method (SPV) for producing software systems or hardware systems, comprising a method of designing from component/objects, which can comprise any number of elements/methods, wherein the data processing sequence is formed by a sequential arrangement of data processing steps, software systems or hardware systems are produced by the specification method (SPV) without subsequent software programming, data processing sequences in software systems are controlled directly by means of compilers and/or interpreters on machine/computer platforms or microprocessor configurations, and hardware systems are realized directly by means of compliers, including the data processing sequence controller, in hardware configurations (FPGAs, ASICs).

2 Claims, 450 Drawing Sheets

(56) References Cited

U.S. PATENT DOCUMENTS

Figure 2:
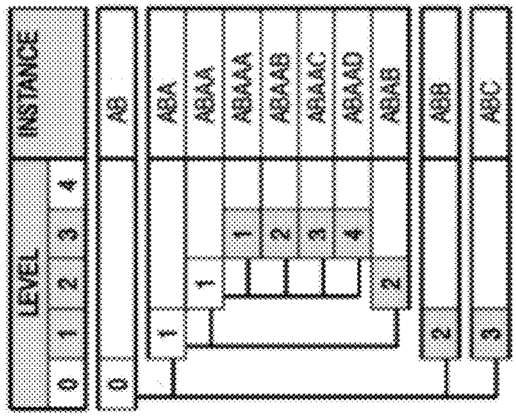

| | | | | |
|---|---|---|---|---|
| 2008/0034079 | A1* | 2/2008 | Kodosky | G06F 8/34 709/223 |
| 2009/0100403 | A1* | 4/2009 | Joffrain | G06F 8/34 717/100 |

OTHER PUBLICATIONS

Zhonghai Lu et al.: "A Case Study of Hardware and Software Synthesis in ForSyDe"; 15th. International Symposium on System Synthesis, ISSS. Kyoto, Japan, Oct. 2-4, 2002; [International Symposium on System Synthesis. ISSSS], New York, NY: ACM US, Oct. 2, 2002, pp. 86-91.

Leo P. Anetseder: "Survey of the figures: New specification method SPV for a developement of hardware/software with zero-error quality"; Fig. 1-26, Lpa Innovations, Jun. 2014 (46 pages).

* cited by examiner

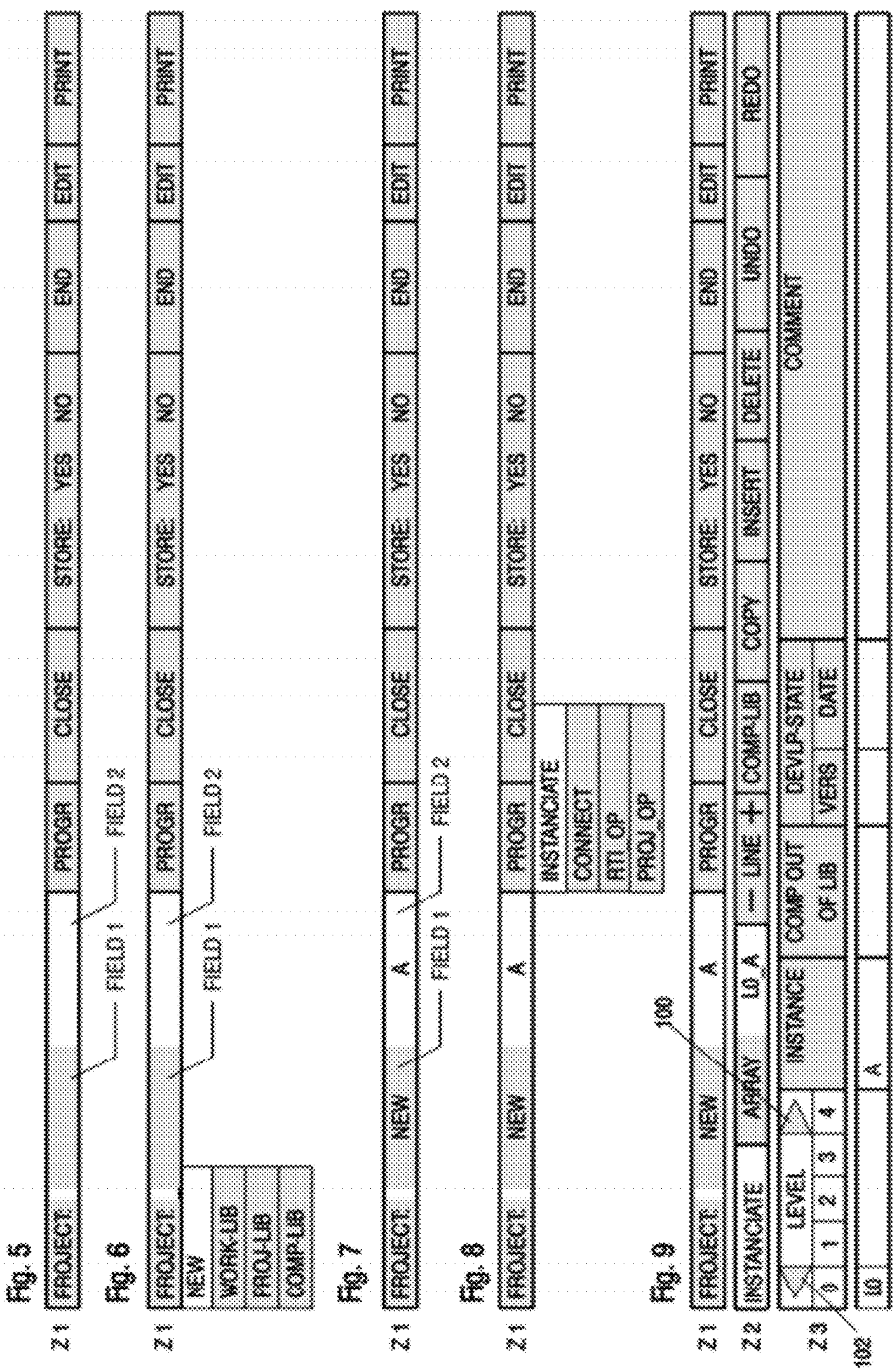
Fig. 5
Z1
PROJECT
FIELD 1
FIELD 2
PROGR
CLOSE
STORE
YES
NO
END
EDIT
PRINT
Fig. 6
NEW
WORK-LIB
PROJ-LIB
COMP-LIB
Fig. 7
NEW
A
Fig. 8
INSTANCIATE
CONNECT
RTL OP
PROJ OP
Fig. 9
Z2
Z3
100
102
INSTANCIATE
ARRAY
L0_A
LINE
COMP-LIB
COPY
INSERT
DELETE
UNDO
REDO
LEVEL
0
1
2
3
4
INSTANCE
COMP OUT OF LIB
DEVLP-STATE
VERS
DATE
COMMENT
L0

Z1 Z2 Z3

Z1 Z2 Z3

Fig. 80a
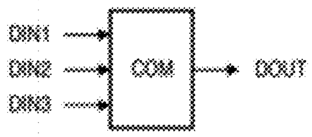
Fig. 80b
| working step | DIN1 | DIN2 | DIN3 | Element | DOUT |
|---|---|---|---|---|---|
| "WSTP" | SSTA | SSTA | SSTA | ESTA | SSTA |
| 1 | 0 | 2 | 1 | 2 | 2 |
| 2 | 0 | 3 | 1 | 3 | 3 |
| 3 | 5 | 3 | 1 | 5 | 5 |
| 4 | 5 | 4 | 2 | 6 | 6 |
| 5 | 6 | 6 | 3 | 7 | 7 |
| 6 | 9 | 7 | 4 | 9 | 9 |
Fig. 81a
Fig. 81b
| working step | DIN | Element | DOUT |
|---|---|---|---|
| "WSTP" | SSTA | ESTA | SSTA |
| 1 | 3 | 4 | 4 |
| 2 | 4 | 5 | 5 |
| 3 | 8 | 9 | 9 |
| 4 | 5 | 10 | 10 |
| 5 | 12 | 13 | 13 |
Fig. 82a
Fig. 82b
| working step | CNT | DIN | Element | DOUT | |
|---|---|---|---|---|---|
| "WSTP" | FCT(Count) | SSTA | ESTA | SSTA | decimal |
| 1 | LD | 3 | 4 | 4 | 20 |
| 2 | CU(1) | | 5 | 5 | 21 |
| 3 | CU(2) | | 6 | 6 | 22 |
| 4 | CU(3) | | 7 | 7 | 23 |
| 5 | CU(4) | | 8 | 8 | 24 |
| 6 | CU(5) | | 9 | 9 | 25 |
| 7 | CU(6) | | 10 | 10 | 26 |
| 8 | CU(7) | | 11 | 11 | 27 |
| 9 | LD | 13 | 14 | 14 | 45 |
| 10 | CU(1) | | 15 | 15 | 46 |
| 11 | CU(2) | | 16 | 16 | 47 |
| 12 | CU(3) | | 17 | 17 | 48 |
| 13 | CD(1) | | 18 | 18 | 47 |
| 14 | CD(2) | | 19 | 19 | 46 |
| 15 | CD(3) | | 20 | 20 | 45 |
| 16 | LD | 16 | 21 | 21 | 30 |
| 17 | LD | 25 | 26 | 26 | 75 |
| 18 | CU(1) | | 27 | 27 | 76 |
| 19 | CU(2) | | 28 | 28 | 77 |
| 20 | CU(3) | | 29 | 29 | 78 |
| 21 | LD | 18 | 30 | 30 | 100 |
| 22 | CD(1) | | 31 | 31 | 99 |
| 23 | CD(2) | | 32 | 32 | 98 |

Fig. 83a

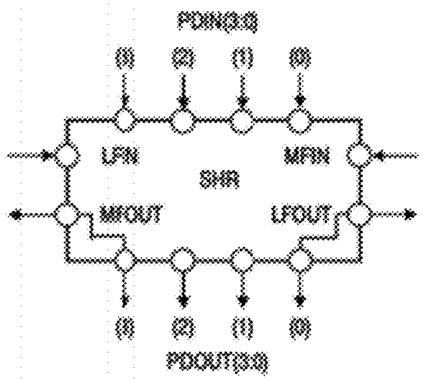

Fig. 83b

| working step | SHR | PDIN | LFIN | MFIN | Element | PDOUT | LFOUT | MFOUT |
|---|---|---|---|---|---|---|---|---|
| "WSTP" | FCT | SSTA_Bit | SSTA_Bit | SSTA_Bit | ESTA | SSTA_FCT.Bit | SSTA_FCT.Bit | SSTA_FCT.Bit |
| 1 | LD | 0_3.2.1.0 | | | 1 | 1_LD.3.2.1.0 | 1_LD.0 | 1_1LD.3 |
| 2 | LF | | 0_0 | | 2 | 2_LF.0_1LD.3.2.1 | 2_LD.1 | |
| 3 | LF | | 1_1 | | 3 | 3_LF.1.0_1LD.3.2 | 3_LD.2 | |
| 4 | LF | | 2_2 | | 4 | 4_LF.2.1.0_1LD.3 | 4_LD.3 | |
| 5 | LF | | 3_3 | | 5 | 5_LF.3.2.1.0 | 5_LF.0 | |
| 6 | LF | | 8_4 | | 9 | 9_LF.4.3.2.1 | 9_LF.1 | |
| 7 | LF | | 9_5 | | 10 | 10_LF.5.4.3.2 | 10_LF.2 | |
| 8 | LF | | 10_6 | | 11 | 11_LF.6.5.4.3 | 11_LF.3 | |
| 9 | LF | | 11_7 | | 12 | 12_LF.7.6.5.4 | 12_LF.4 | |
| 10 | LF | | 12_X | | 13 | 13_LF.X.7.6.5 | 13_LF.5 | |
| 11 | LF | | 13_X | | 14 | 14_LF.X.X.7.6 | 14_LF.6 | |
| 12 | LF | | 14_X | | 15 | 15_LF.X.X.X.7 | 15_LF.7 | |
| 13 | MF | | | 20_3 | 21 | 21_LF.X.X.7_MF.3 | | (21_LF.X) |
| 14 | MF | | | 21_2 | 22 | 22_LF.X.7_MF.3.2 | | (22_LF.X) |
| 15 | MF | | | 22_1 | 23 | 23_LF.7_MF3.2.1 | | (23_LF.7) |
| 16 | MF | | | 23_0 | 24 | 24_MF.3.2.1.0 | | 24_MF.3 |
| 17 | MF | | | 24_X | 25 | 25_MF.2.1.0.X | | 25_MF.2 |
| 18 | MF | | | 25_X | 26 | 26_MF.1.0.X.X | | 26_MF.1 |
| 19 | MF | | | 26_X | 27 | 27_MF.0.X.X.X | | 27_MF.0 |
| 20 | LD | 9_3.2.1.0 | | | 28 | 28_LD.3.2.1.0 | 28_LD.0 | 28_LD.3 |
| 21 | MF | | | 24_3 | 29 | 29_LD.2.1.0_MF.3 | | 29_LD.2 |
| 22 | MF | | | 25_2 | 30 | 30_LD.1.0_MF.3.2 | | 30_LD.1 |
| 23 | MF | | | 26_1 | 31 | 31_LD.0_MF3.2.1 | | 31_LD.0 |
| 24 | MF | | | 27_0 | 32 | 32_MF.3.2.1.0 | | 32_MF.3 |
| 25 | MF | | | 28_X | 33 | 33_MF.2.1.0.X | | 33_MF.2 |
| 26 | MF | | | 29_X | 34 | 34_MF.1.0.X.X | | 34_MF.1 |
| 27 | LF | | 15_0 | | 35 | 35_LF.0_MF.1.0.X | (35_MF.X) | |

Fig. 84a
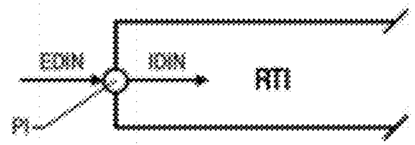
Fig. 84b
| working step | EDIN | PI | IDIN |
|---|---|---|---|
| "WSTP" | SSTA | ESTA | SSTA |
| 1 | 0 | 0 | 0 |
| 2 | 1 | 1 | 1 |
| 3 | 2 | 2 | 2 |
| 4 | 3 | 3 | 3 |
Fig. 85a
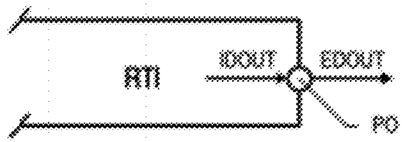
Fig. 85b
| working step | IDOUT | PO | EDOUT |
|---|---|---|---|
| "WSTP" | SSTA | ESTA | SSTA |
| 1 | 3 | 3 | 3 |
| 2 | 4 | 4 | 4 |
| 3 | 8 | 8 | 8 |
| 4 | 5 | 9 | 9 |
| 5 | 12 | 12 | 12 |
Fig. 86a
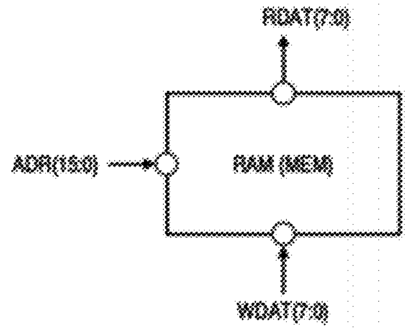
Fig. 86b
| working step | RAM | ADR | WDAT | Element | RDAT |
|---|---|---|---|---|---|
| "WSTP" | FCT | SSTA | SSTA | ESTA | SSTA |
| 1 | WR | 3 | 1 | 4 | |
| 2 | WR | 4 | 2 | 5 | |
| 3 | WR | 5 | 3 | 6 | |
| 4 | WR | 6 | 4 | 7 | |
| 5 | WR | 12 | 7 | 13 | |
| 6 | WR | 8 | 8 | 14 | |
| 7 | RD | 7 | | 15 | 15 |
| 8 | RD | 9 | | 16 | 16 |
| 9 | RD | 10 | | 17 | 17 |
| 10 | RD | 11 | | 18 | 18 |
| 11 | RD | 24 | | 25 | 25 |
| 12 | RD | 28 | | 29 | 29 |
| 13 | WR | 19 | 16 | 30 | |
| 14 | WR | 20 | 40 | 41 | |

Fig. 87a

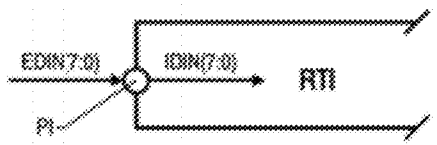

Fig. 87b

| working step | type of data/signal EDIN | | | PI | IDIN signal names | | | |
|---|---|---|---|---|---|---|---|---|
| "WSTP" | SSTA | static | dynamic | ESTA | SSTA | SID | static | dynamic |
| 0 | 0 | DAT(7:0) | | 0 | 0 | 0 | DAT(7:0) | |
| 1 | 0 | | ADR(7:0) | 0 | 0 | 1 | | ADR(7:0) |
| 2 | 1 | | ADR(15:8) | 1 | 1 | 2 | | ADR(15:8) |
| 3 | 2 | | HEADDAT(7:0) | 2 | 2 | 3 | | HEADDAT(7:0) |
| 4 | 3 | | HEADDAT(15:8) | 3 | 3 | 4 | | HEADDAT(15:8) |
| 5 | 4 | | WDAT(7:0) | 4 | 4 | 5 | | WDAT(7:0) |
| 6 | 5 | | WDAT(15:8) | 5 | 5 | 6 | | WDAT(15:8) |
| 7 | 6 | | WDAT(23:16) | 6 | 6 | 7 | | WDAT(23:16) |
| 8 | 7 | | WDAT(31:24) | 7 | 7 | 8 | | WDAT(31:24) |

Fig. 87c

| working step | type of data/signal EDIN | | | PI | IDIN signal names | | | |
|---|---|---|---|---|---|---|---|---|
| "WSTP" | SSTA | static | dynamic | ESTA | SSTA | SID | static | dynamic |
| 0 | 0 | DAT(7:0) | | 0 | 0 | 0 | DAT(7:0) | |
| 1 | 0 | | ADR(7:0) | 0 | 0 | 1 | | ADR(7:0) |
| 2 | 1 | | ADR(15:8) | 1 | 1 | 1 | | ADR(7:0) |
| 3 | 2 | | HEADDAT(7:0) | 2 | 2 | 2 | | HEADDAT(7:0) |
| 4 | 3 | | HEADDAT(15:8) | 3 | 3 | 2 | | HEADDAT(7:0) |
| 5 | 4 | | WDAT(7:0) | 4 | 4 | 3 | | WDAT(7:0) |
| 6 | 5 | | WDAT(15:8) | 5 | 5 | 3 | | WDAT(7:0) |
| 7 | 6 | | WDAT(23:16) | 6 | 6 | 3 | | WDAT(7:0) |
| 8 | 7 | | WDAT(31:24) | 7 | 7 | 3 | | WDAT(7:0) |

Fig. 88a

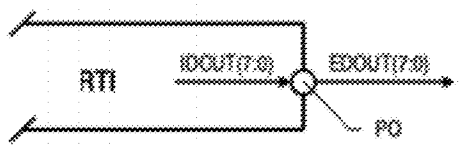

Fig. 88b

| working step | type of data/signal IDOUT | | | PO | EDOUT signal names | | | |
|---|---|---|---|---|---|---|---|---|
| "WSTP" | SSTA | static | dynamic | ESTA | SSTA | SIC | static | dynamic |
| 0 | 0 | DAT(7:0) | | 0 | 0 | 0 | DAT(7:0) | |
| 1 | 3 | | ADR(7:0) | 3 | 3 | 1 | | ADR(7:0) |
| 2 | 4 | | ADR(15:8) | 4 | 4 | 2 | | ADR(15:8) |
| 3 | 8 | | HEADDAT(7:0) | 8 | 8 | 3 | | HEADDAT(7:0) |
| 4 | 5 | | HEADDAT(15:8) | 9 | 9 | 4 | | HEADDAT(15:8) |
| 5 | 12 | | WDAT(7:0) | 12 | 12 | 5 | | WDAT(7:0) |
| 6 | 13 | | WDAT(15:8) | 13 | 13 | 6 | | WDAT(15:8) |
| 7 | 6 | | WDAT(23:16) | 14 | 14 | 7 | | WDAT(23:16) |
| 8 | 7 | | WDAT(31:24) | 15 | 15 | 8 | | WDAT(31:24) |

Fig. 88c

| working step | type of data/signal IDOUT | | | PO | EDOUT signal names | | | |
|---|---|---|---|---|---|---|---|---|
| "WSTP" | SSTA | static | dynamic | ESTA | SSTA | SIC | static | dynamic |
| 0 | 0 | DAT(7:0) | | 0 | 0 | 0 | DAT(7:0) | |
| 1 | 3 | | ADR(7:0) | 3 | 3 | 1 | | ADR(7:0) |
| 2 | 4 | | ADR(15:8) | 4 | 4 | 1 | | ADR(7:0) |
| 3 | 8 | | HEADDAT(7:0) | 8 | 8 | 2 | | HEADDAT(7:0) |
| 4 | 5 | | HEADDAT(15:8) | 9 | 9 | 2 | | HEADDAT(7:0) |
| 5 | 12 | | WDAT(7:0) | 12 | 12 | 3 | | WDAT(7:0) |
| 6 | 13 | | WDAT(15:8) | 13 | 13 | 3 | | WDAT(7:0) |
| 7 | 6 | | WDAT(23:16) | 14 | 14 | 3 | | WDAT(7:0) |
| 8 | 7 | | WDAT(31:24) | 15 | 15 | 3 | | WDAT(7:0) |

Fig. 89a

Fig. 89b

| working step | type of data/signal DIN | | | REG | DOUT signal names | | | |
|---|---|---|---|---|---|---|---|---|
| "WSTP" | SSTA | static | dynamic | ESTA | SSTA | SIC | static | dynamic |
| 0 | 0 | DIN(15:0) | | 0 | 0 | 0 | REF(15:0) | |
| 1 | 7 | | REF1(15:0) | 8 | 8 | 1 | | REF1(15:0) |
| 2 | 8 | | REF1(31:16) | 9 | 9 | 2 | | REF1(31:16) |
| 3 | 9 | | REF1(47:32) | 10 | 10 | 3 | | REF1(47:32) |
| 4 | 4 | | REF3(15:0) | 11 | 11 | 4 | | REF3(15:0) |
| 5 | 5 | | REF3(31:16) | 12 | 12 | 5 | | REF3(31:16) |
| 6 | 10 | | REF4(15:0) | 13 | 13 | 6 | | REF4(15:0) |
| 7 | 15 | | REF6(15:0) | 16 | 16 | 7 | | REF6(15:0) |
| 8 | 12 | | REF8(15:0) | 17 | 17 | 8 | | REF8(15:0) |

Fig. 89c

| working step | type of data/signal DIN | | | REG | DOUT signal names | | | |
|---|---|---|---|---|---|---|---|---|
| "WSTP" | SSTA | static | dynamic | ESTA | SSTA | SIC | static | dynamic |
| 0 | 0 | DIN(15:0) | | 0 | 0 | 0 | REF(15:0) | |
| 1 | 7 | | REF1(15:0) | 8 | 8 | 1 | | REF1(15:0) |
| 2 | 8 | | REF1(31:16) | 9 | 9 | 1 | | REF1(15:0) |
| 3 | 9 | | REF1(47:32) | 10 | 10 | 1 | | REF1(15:0) |
| 4 | 4 | | REF3(15:0) | 11 | 11 | 2 | | REF3(15:0) |
| 5 | 5 | | REF3(31:16) | 12 | 12 | 2 | | REF3(15:0) |
| 6 | 10 | | REF4(15:0) | 13 | 13 | 3 | | REF4(15:0) |
| 7 | 15 | | REF6(15:0) | 16 | 16 | 4 | | REF6(15:0) |
| 8 | 12 | | REF8(15:0) | 17 | 17 | 5 | | REF8(15:0) |

| working step | CNT | type of data/signal DIN | | | CNT | DOUT signal names | | | | DOUT |
|---|---|---|---|---|---|---|---|---|---|---|
| "WSTP" | FCT(Count) | SSTA | static | dynamic | ESTA | SSTA | SID | static | dynamic | decimal |
| 0 | | | DIN(7:0) | | 0 | 0 | 0 | DAT(7:0) | | |
| 1 | LD | 3 | | ADR(15:8) | 4 | 4 | 1 | | ADR(15:8) | 20 |
| 2:8 | CU(1:7) | | | | 5:11 | 5:11 | 1 | | ADR(15:8) | 21:27 |
| 9 | LD | 13 | | ADR(7:0) | 14 | 14 | 2 | | ADR(7:0) | 45 |
| 10:12 | CU(1:3) | | | | 15:17 | 15:17 | 2 | | ADR(7:0) | 46:48 |
| 13:15 | CD(1:3) | | | | 18:20 | 18:20 | 2 | | ADR(7:0) | 47:45 |
| 16 | LD | 16 | | DAT1(7:0) | 21 | 21 | 3 | | DAT1(7:0) | 90 |
| 17 | LD | 25 | | DAT2(7:0) | 26 | 26 | 4 | | DAT2(7:0) | 75 |
| 18:20 | CD(1:3) | | | | 27:29 | 27:29 | 4 | | DAT2(7:0) | 74:72 |
| 21 | LD | 18 | | DAT3(7:0) | 30 | 30 | 5 | | DAT3(7:0) | 100 |
| 22:24 | CU(1:3) | | | | 31:33 | 31:33 | 5 | | DAT3(7:0) | 101:103 |

| working step | SHR | type of data/signal PDIN | | | SHR | LFDOUT signal names | | | |
|---|---|---|---|---|---|---|---|---|---|
| "WSTP" | FCT | SSTA | static | dynamic | ESTA | SSTA | SID | static | dynamic (Bit) |
| 0 | | | PDIN(3:0) | | 0 | 0 | 0 | LFDAT(0) | |
| 1 | LD | 4 | | ADR(3:0) | 5 | 5 | 1 | | ADF(0) |
| 2 | LF | | | | 6 | 6 | 2 | | ADF(1) |
| 3 | LF | | | | 7 | 7 | 3 | | ADF(2) |
| 4 | LF | | | | 8 | 8 | 4 | | ADF(3) |
| 5 | LD | 5 | | ADR(7:4) | 9 | 9 | 5 | | ADF(4) |
| 6 | LF | | | | 10 | 10 | 6 | | ADF(5) |
| 7 | LF | | | | 11 | 11 | 7 | | ADF(6) |
| 8 | LF | | | | 12 | 12 | 8 | | ADF(7) |
| 9 | LD | 16 | | DAT(3:0) | 17 | 17 | 9 | | DAT(0) |
| 10 | LF | | | | 18 | 18 | 10 | | DAT(1) |
| 11 | LF | | | | 19 | 19 | 11 | | DAT(2) |
| 12 | LF | | | | 20 | 20 | 12 | | DAT(3) |
| 13 | LD | 17 | | DAT(7:4) | 21 | 21 | 13 | | DAT(4) |
| 14 | LF | | | | 22 | 22 | 14 | | DAT(5) |
| 15 | LF | | | | 23 | 23 | 15 | | DAT(6) |
| 16 | LF | | | | 24 | 24 | 16 | | DAT(7) |
| 17 | LD | 18 | | DAT(11:8) | 25 | 25 | 17 | | DAT(8) |
| 18 | LF | | | | 26 | 26 | 18 | | DAT(9) |
| 19 | LF | | | | 27 | 27 | 19 | | DAT(10) |
| 20 | LF | | | | 28 | 28 | 20 | | DAT(11) |
| 21 | LD | 19 | | DAT(15:12) | 29 | 29 | 21 | | DAT(12) |
| 22 | LF | | | | 30 | 30 | 22 | | DAT(13) |
| 23 | LF | | | | 31 | 31 | 23 | | DAT(14) |
| 24 | LF | | | | 32 | 32 | 24 | | DAT(15) |

| working step | SHR | type of data/signal PDIN | | | SHR | MFDOUT signal names | | | |
|---|---|---|---|---|---|---|---|---|---|
| "WSTP" | FCT(step) | SSTA | static | dynamic | ESTA | SSTA | SID | static | dynamic (Bit) |
| 0 | 0 | | PDIN(3:0) | | 0 | 0 | 0 | MFDAT(0) | |
| 1 | LD | 4 | | ADR(3:0) | 5 | 5 | 1 | | ADR(3) |
| 2:4 | MF(1:3) | | | | 6:8 | 6:8 | 2:4 | | ADR(2:0) |
| 5 | LD | 5 | | ADR(7:4) | 9 | 9 | 5 | | ADR(7) |
| 6:8 | MF(1:3) | | | | 10:12 | 10:12 | 6:8 | | ADR(6:4) |
| 9 | LD | 16 | | DAT(3:0) | 17 | 17 | 9 | | DAT(3) |
| 10:12 | MF(1:3) | | | | 18:20 | 18:20 | 10:12 | | DAT(2:0) |
| 13 | LD | 17 | | DAT(7:4) | 21 | 21 | 13 | | DAT(7) |
| 14:16 | MF(1:3) | | | | 22:24 | 22:24 | 14:16 | | DAT(6:4) |
| 17 | LD | 18 | | DAT(11:8) | 25 | 25 | 17 | | DAT(11) |
| 18:20 | MF(1:3) | | | | 26:28 | 26:28 | 18:20 | | DAT(10:8) |
| 21 | LD | 19 | | DAT(15:12) | 29 | 29 | 21 | | DAT(15) |
| 22:24 | MF(1:3) | | | | 30:32 | 30:32 | 22:24 | | DAT(14:12) |

| working step | SHR | type of data/signal LFDIN | | | SHR | PDOUT signal names | | | |
|---|---|---|---|---|---|---|---|---|---|
| "WSTP" | FCT(step) | SSTA | static | dynamic (Bit) | ESTA | SSTA | SID | static | dynamic |
| 0 | 0 | | LFDIN(0) | | 0 | 0 | 0 | PDAT(3:0) | |
| 1:4 | LF(1:4) | 4:7 | | ADR(0:3) | 5:8 | 8 | 1 | | ADR(3:0) |
| 5:8 | LF(1:4) | 8:11 | | ADR(4:7) | 9:12 | 12 | 2 | | ADR(7:4) |
| 9:12 | LF(1:4) | 16:19 | | DAT1(0:3) | 17:20 | 20 | 3 | | DAT1(3:0) |
| 13:16 | LF(1:4) | 22:25 | | DAT2(0:3) | 23:26 | 26 | 4 | | DAT2(3:0) |
| 17:20 | LF(1:4) | 6:9 | | DAT3(0:3) | 27:30 | 30 | 5 | | DAT3(3:0) |
| 21:24 | LF(1:4) | 10:13 | | DAT3(4:7) | 31:34 | 34 | 6 | | DAT3(7:4) |

| working step | SHR | type of data/signal MFDIN | | | SHR | PDOUT signal names | | | |
|---|---|---|---|---|---|---|---|---|---|
| "WSTP" | FCT(step) | SSTA | static | dynamic (Bit) | ESTA | SSTA | SID | static | dynamic |
| 0 | 0 | | MFDIN(0) | | 0 | 0 | 0 | PDAT(3:0) | |
| 1:4 | MF(1:4) | 4:7 | | ADR(3:0) | 5:8 | 8 | 1 | | ADR(3:0) |
| 5:8 | MF(1:4) | 8:11 | | ADR(7:4) | 9:12 | 12 | 2 | | ADR(7:4) |
| 9:12 | MF(1:4) | 16:19 | | DAT1(3:0) | 17:20 | 20 | 3 | | DAT1(3:0) |
| 13:16 | MF(1:4) | 22:25 | | DAT2(3:0) | 23:26 | 26 | 4 | | DAT2(3:0) |
| 17:20 | MF(1:4) | 6:9 | | DAT3(3:0) | 27:30 | 30 | 5 | | DAT3(3:0) |
| 21:24 | MF(1:4) | 10:13 | | DAT3(7:4) | 31:34 | 34 | 6 | | DAT3(7:4) |

| working step | Elements: | REG1 | REG2 | CNT1 | | CNT2 | | RAM1 | | RAM2 | | MUL1 | REG3 | ADD1 | REG4 | REG5 |
|---|---|---|---|---|---|---|---|---|---|---|---|---|---|---|---|---|
| "WSTP" | TCYC | ESTA | ESTA | FCT | ESTA | FCT | ESTA | FCT | ESTA | FCT | ESTA | ESTA | ESTA | ESTA | ESTA | ESTA |
| 0 | | 0 | 0 | 0 | 0 | 0 | 0 | 0 | 0 | 0 | 0 | | 0 | | 0 | 0 |
| 1 | | 0 | 0 | LD | 1 | LD | 1 | 0 | 0 | 0 | 0 | | 0 | | 0 | 0 |
| 2 | | 0 | 0 | | | | | RD | 2 | RD | 2 | | 0 | | 0 | 0 |
| 3 | | 0 | 0 | | | | | | | | | 2 | 0 | | 0 | 0 |
| 4 | | 0 | 0 | | | | | | | | | | 3 | | 0 | 0 |
| 5 | | 0 | 0 | | | | | | | | | | | 3 | 0 | 0 |
| 6 | | 0 | 0 | | | | | | | | | | | | 4 | 0 |

Fig. 95c

| working step | Elements | REG1 | REG2 | CNT1 | | CNT2 | | RAM1 | | RAM2 | | MUL1 | REG3 | ADD1 | REG4 | REG5 |
|---|---|---|---|---|---|---|---|---|---|---|---|---|---|---|---|---|
| "WSTP" | TCYC | ESTA | ESTA | FCT | ESTA | FCT | ESTA | FCT | ESTA | FCT | ESTA | ESTA | ESTA | ESTA | ESTA | ESTA |
| 0 | | 0 | 0 | | 1 | | 1 | | 2 | | 2 | 2 | 3 | 3 | 4 | 0 |
| 1 | 1 | 0 | 0 | CU | 2_1 | CU | 2_1 | | | | | | | | | 0 |
| 2 | 2 | 0 | 0 | CU | 3_2 | CU | 3_2 | RD | 3_1 | RD | 3_1 | | | | | 0 |
| 3 | 3 | 0 | 0 | CU | 4_3 | CU | 4_3 | RD | 4_2 | RD | 4_2 | 3_1 | | | | 0 |
| 4 | 4 | 0 | 0 | CU | 5_4 | CU | 5_4 | RD | 5_3 | RD | 5_3 | 4_2 | 4_1 | | | 0 |
| 5 | 5 | 0 | 0 | CU | 6_5 | CU | 6_5 | RD | 6_4 | RD | 6_4 | 5_3 | 5_2 | 4_1 | | 0 |
| 6 | 6 | 0 | 0 | CU | 7_6 | CU | 7_6 | RD | 7_5 | RD | 7_5 | 6_4 | 6_3 | 5_2 | 5_1 | 0 |
| 7 | 7 | 0 | 0 | CU | 8_7 | CU | 8_7 | RD | 8_6 | RD | 8_6 | 7_5 | 7_4 | 6_3 | 6_2 | 0 |
| 8 | | | | | | | | RD | 9_7 | RD | 9_7 | 8_6 | 8_5 | 7_4 | 7_3 | 0 |
| 9 | | | | | | | | | | | | 9_7 | 9_6 | 8_5 | 8_4 | 0 |
| 10 | | | | | | | | | | | | | 10_7 | 9_6 | 9_5 | 0 |
| 11 | | | | | | | | | | | | | | 10_7 | 10_6 | 0 |
| 12 | | | | | | | | | | | | | | | 11_7 | 0 |
| 13 | | | | | | | | | | | | | | | | 12 |

Fig. 95d

| Cycle Array "A1" | | | | | | | |
|---|---|---|---|---|---|---|---|
| TSEQ_Elements: 1_CNT1,CNT2; 2_RAM1,RAM2; 3_MUL1; 4_REG3; 5_ADD1; 6_REG4; | | | | | | | |
| working step | TCYC1 | TCYC2 | TCYC3 | TCYC4 | TCYC5 | TCYC6 | TCYC7 |
| WSTP* | TSEQ | TSEQ | TSEQ | TSEQ | TSEQ | TSEQ | TSEQ |
| 1 | 1 | | | | | | |
| 2 | 2 | 1 | | | | | |
| 3 | 3 | 2 | 1 | | | | |
| 4 | 4 | 3 | 2 | 1 | | | |
| 5 | 5 | 4 | 3 | 2 | 1 | | |
| 6 | 6 | 5 | 4 | 3 | 2 | 1 | |
| 7 | | 6 | 5 | 4 | 3 | 2 | 1 |
| 8 | | | 6 | 5 | 4 | 3 | 2 |
| 9 | | | | 6 | 5 | 4 | 3 |
| 10 | | | | | 6 | 5 | 4 |
| 11 | | | | | | 6 | 5 |
| 12 | | | | | | | 6 |

Fig. 95e

| | | | | TSEQ1 | | | | TSEQ2 | | | | TSEQ3 | TSEQ4 | TSEQ5 | TSEQ6 | |
|---|---|---|---|---|---|---|---|---|---|---|---|---|---|---|---|---|
| working step | Elements: | REG1 | REG2 | CNT1 | | CNT2 | | RAM1 | | RAM2 | | MUL1 | REG3 | ADD1 | REG4 | REG5 |
| "WSTP" | TCYC | ESTA | ESTA | FCT | ESTA | FCT | ESTA | FCT | ESTA | FCT | ESTA | ESTA | ESTA | ESTA | ESTA | ESTA |
| 0 | | 0 | 0 | | 1 | | 1 | | 2 | | 2 | 2 | 3 | 3 | 4 | 0 |
| 1 | 1 | 0 | 0 | CU | 2_1 | CU | 2_1 | | | | | | | | | 0 |
| 2 | 2 | 0 | 0 | CU | 3_2 | CU | 3_2 | RD | 3_1 | RD | 3_1 | | | | | 0 |
| 3 | 3 | 0 | 0 | CU | 4_3 | CU | 4_3 | RD | 4_2 | RD | 4_2 | 3_1 | | | | 0 |
| 4 | 4 | 0 | 0 | CU | 5_4 | CU | 5_4 | RD | 5_3 | RD | 5_3 | 4_2 | 4_1 | | | 0 |
| 5 | 5 | 0 | 0 | CU | 6_5 | CU | 6_5 | RD | 6_4 | RD | 6_4 | 5_3 | 5_2 | 4_1 | | 0 |
| 6 | 6 | 0 | 0 | CU | 7_6 | CU | 7_6 | RD | 7_5 | RD | 7_5 | 6_4 | 6_3 | 5_2 | 5_1 | 0 |
| 7 | 7 | 0 | 0 | CU | 8_7 | CU | 8_7 | RD | 8_6 | RD | 8_6 | 7_5 | 7_4 | 6_3 | 6_2 | 0 |
| 8 | | | | | | | | RD | 9_7 | RD | 9_7 | 8_6 | 8_5 | 7_4 | 7_3 | 0 |
| 9 | | | | | | | | | | | | 9_7 | 9_6 | 8_5 | 8_4 | 0 |
| 10 | | | | | | | | | | | | | 10_7 | 9_6 | 9_5 | 0 |
| 11 | | | | | | | | | | | | | | 10_7 | 10_6 | 0 |
| 12 | | | | | | | | | | | | | | | 11_7 | 0 |
| 13 | | | | | | | | | | | | | | | | 12 |

Fig. 95f

| Cycle Array "A1" | | | | | | | |
|---|---|---|---|---|---|---|---|
| TSEQ_Elements: 1_CNT1,CNT2; 2_RAM1,RAM2; 3_MUL1; 4_REG3; 5_ADD1; 6_REG4; | | | | | | | |
| working step | TCYC1 | TCYC2 | TCYC3 | TCYC4 | TCYC5 | TCYC6 | TCYC7 |
| "WSTP" | TSEQ | TSEQ | TSEQ | TSEQ | TSEQ | TSEQ | TSEQ |
| 1 | 1 | | | | | | |
| 2 | 2 | 1 | | | | | |
| 3 | 3 | 2 | 1 | | | | |
| 4 | 4 | 3 | 2 | (1) | | | |
| 5 | 5 | 4 | 3 | (2) | (1) | | |
| 6 | 6 | 5 | 4 | (3) | (2) | (1) | |
| 7 | | 6 | 5 | (4) | (3) | (2) | (1) |
| 8 | | | 6 | (5) | (4) | (3) | (2) |
| (9) | | | | (6) | (5) | (4) | (3) |
| (10) | | | | | (6) | (5) | (4) |
| (11) | | | | | | (6) | (5) |
| (12) | | | | | | | (6) |

Fig. 95g

| | | | | TSEQ1 | | | | TSEQ2 | | | | TSEQ3 | TSEQ4 | TSEQ5 | TSEQ6 | |
|---|---|---|---|---|---|---|---|---|---|---|---|---|---|---|---|---|
| working step | Elements: | REG1 | REG2 | CNT1 | | CNT2 | | RAM1 | | RAM2 | | MUL1 | REG3 | ADD1 | REG4 | REG5 |
| "WSTP" | TCYC | ESTA | ESTA | FCT | ESTA | FCT | ESTA | FCT | ESTA | FCT | ESTA | ESTA | ESTA | ESTA | ESTA | ESTA |
| 0 | | 0 | 0 | | 1 | | 1 | | 2 | | 2 | 2 | 3 | 3 | 4 | 0 |
| 1 | 1 | 0 | 0 | CU | 2_1 | CU | 2_1 | | | | | | | | | 0 |
| 2 | 2 | 0 | 0 | CU | 3_2 | CU | 3_2 | RD | 3_1 | RD | 3_1 | | | | | 0 |
| 3 | 3 | 0 | 0 | CU | 4_3 | CU | 4_3 | RD | 4_2 | RD | 4_2 | 3_1 | | | | 0 |
| 4 | (4) | 0 | 0 | | | | | RD | 5_3 | RD | 5_3 | 4_2 | 4_1 | | | 0 |
| 5 | (5) | 0 | 0 | | | | | | | | | 5_3 | 5_2 | 4_1 | | 0 |
| 6 | (6) | 0 | 0 | | | | | | | | | | 6_3 | 5_2 | 5_1 | 0 |
| 7 | (7) | 0 | 0 | | | | | | | | | | | 6_3 | 6_2 | 0 |
| 8 | | 0 | 0 | | | | | | | | | | | | 7_3 | 0 |

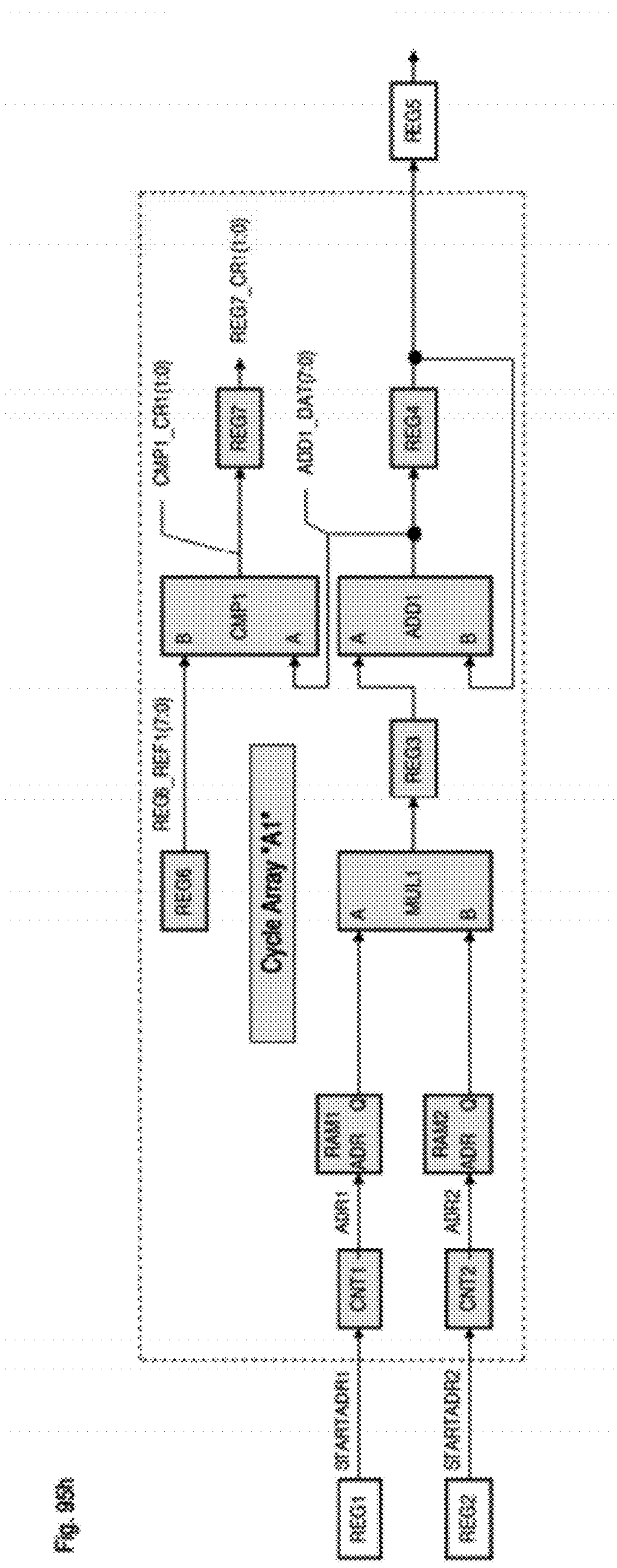
REG1
REG2
STARTADR1
STARTADR2
CNT1
CNT2
ADR1
ADR2
RAM1
RAM2
MUL1
REG3
ADD1
REG4
REG5
REG6
REG6_REF1[7:0]
CMP1
REG7
CMP1_CR1[1:0]
REG7_CR1[1:0]
ADD1_DAT[7:0]
Cycle Array "A1"

Fig. 95i

| working step | Elements: | REG1 | REG2 | CNT1 | | CNT2 | | RAM1 | | RAM2 | | MUL1 | REG3 | ADD1 | REG4 | REG5 |
|---|---|---|---|---|---|---|---|---|---|---|---|---|---|---|---|---|
| *WSTP* | TCYC | ESTA | ESTA | FCT | ESTA | FCT | ESTA | FCT | ESTA | FCT | ESTA | ESTA | ESTA | ESTA | ESTA | ESTA |
| 0 | | 0 | 0 | | 1 | | 1 | | 7 | | 2 | 2 | 3 | 3 | 4 | 0 |
| 1 | 1 | 0 | 0 | CU | 2_1 | CU | 2_1 | | | | | | | | | 0 |
| 2 | 2 | 0 | 0 | CU | 3_2 | CU | 3_2 | RD | 8_1 | RD | 3_1 | | | | | 0 |
| 3 | 3 | 0 | 0 | CU | 4_3 | CU | 4_3 | RD | 9_2 | RD | 4_2 | 8_1 | | | | 0 |
| 4 | 4 | 0 | 0 | CU | 5_4 | CU | 5_4 | RD | 10_3 | RD | 5_3 | 9_2 | 9_1 | | | 0 |
| 5 | 5 | 0 | 0 | CU | 6_5 | CU | 6_5 | RD | 11_4 | RD | 6_4 | 10_3 | 10_2 | 9_1 | | 0 |
| 6 | 6 | 0 | 0 | CU | 7_6 | CU | 7_6 | RD | 12_5 | RD | 7_5 | 11_4 | 11_3 | 10_2 | 10_1 | 0 |
| 7 | 7 | 0 | 0 | CU | 8_7 | CU | 8_7 | RD | 13_6 | RD | 8_6 | 12_5 | 12_4 | 11_3 | 11_2 | 0 |
| 8 | | | | | | | | RD | 14_7 | RD | 9_7 | 13_6 | 13_5 | 12_4 | 12_3 | 0 |
| 9 | | | | | | | | | | | | 14_7 | 14_6 | 13_5 | 13_4 | 0 |
| 10 | | | | | | | | | | | | | 15_7 | 14_6 | 14_5 | 0 |
| 11 | | | | | | | | | | | | | | 15_7 | 15_6 | 0 |
| 12 | | | | | | | | | | | | | | | 16_7 | 0 |
| 13 | | | | | | | | | | | | | | | | 17 |

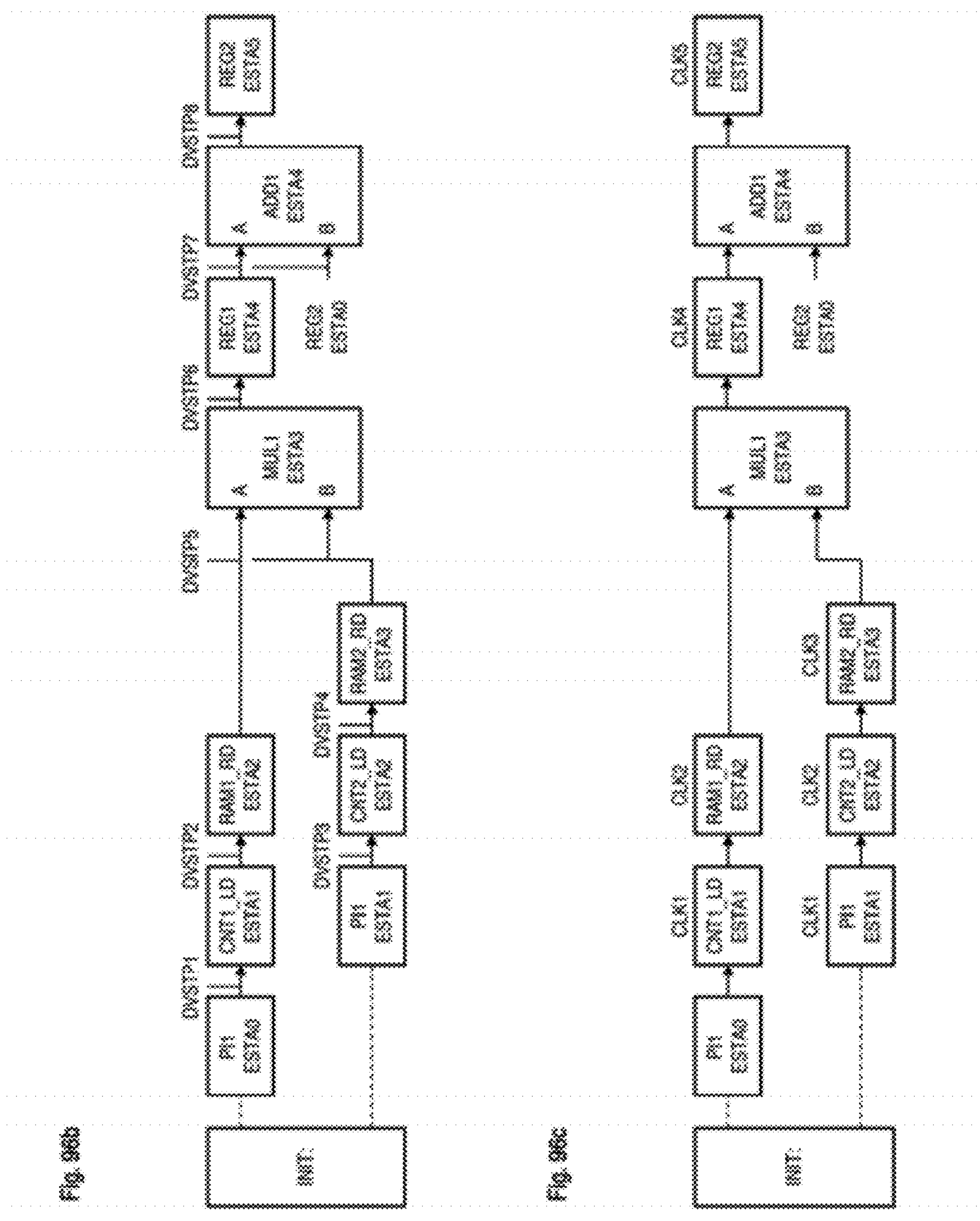

PI1
PI2
PI1_DAT.A
PI2_DAT.B
RTT
OVAR 0
OVAR 1
OVAR 2
OVAR 3
VAR 0
VAR 1
REG1
REG2
REG3
REG1_DAT.A
REG1_DAT.B
REG2_REF1
REG3_REF2
TID 0
TID 1
TID 2
TID 3
ADD1
A
B
ADD1_DAT.C
ADD1_DAT.D
ADD1_DAT.E
ADD1_DAT.F

Fig. 99p

Z1 PROJECT: NEW A | PROGR | PROJ_OP | PRINT | STORE: YES NC

Z2 UNDO | REDO | COPY | INSERT | DELETE | EDIT | CLOSE | END

Z3 INSTANCE: 2.1.1.3 ABAAC OG: 1 | LIB | E_GEN: — 1 + | CR | MIN | VS: 1

Z4 RTI_OP | OP_MOD_OVAR_OSTA: TYP.C.B_0_1_0 ◁ | TYP.C.B_0_0_0

ELEMENT: FCT | ESTA | PORT

Za

| LINE | BASE-OP | MOD | OVAR | VS | ◁ | REF-OP | MOD | OVAR | VS | COMMENT |
|---|---|---|---|---|---|---|---|---|---|---|
| 1 | TYP.C.A | 0 | 0 | 1 | | NEW | | | | |
| 1.1 | (TYP.C.A.A) | 1 | 0 | | | TYP.C.A | 0 | 0 | 1 | |
| 1.2 | (TYP.C.A.B) | 2 | 0 | | | TYP.C.A | 0 | 0 | 1 | |
| 1.3 | (TYP.C.A.C) | 3 | 0 | | | TYP.C.A | 2 | 0 | 0 | |
| 2 | TYP.C.B | 0 | 0 | 1 | | NEW | | | | |
| 2.1 | | 0 | 1 | 0 | ◁ | TYP.C.B | 0 | 0 | 1 | |
| 2.2 | (TYP.C.B.A) | 1 | 0 | 0 | | TYP.C.B | 0 | 0 | 1 | |
| 2.3 | (TYP.C.B.B) | 2 | 0 | 0 | | TYP.C.B | 1 | 0 | 0 | |
| 3 | TYP.C.C | 0 | 0 | 0 | | TYP.C.A | 0 | 0 | 0 | |
| 3.1 | | 0 | 1 | 0 | | TYP.C.C | 0 | 0 | 0 | |
| 3.2 | | 0 | 2 | 0 | | TYP.C.C | 0 | 1 | 0 | |
| 3.3 | (TYP.C.C.A) | 1 | 0 | 0 | | TYP.C.C | 0 | 0 | 0 | |
| 3.4 | | 1 | 1 | 0 | | TYP.C.C | 1 | 0 | 0 | |
| 3.5 | (TYP.C.C.B) | 2 | 0 | 0 | | TYP.C.C | 0 | 0 | 0 | |
| 3.6 | (TYP.C.C.C) | 3 | 0 | 0 | | TYP.C.C | 2 | 0 | 0 | |

— LINE + | DELETE | OK | UNDO | REDO | CLOSE

| LINE | BASE-OP | MOD | OVAR | VS | ◁ | REF-OP | MOD | OVAR | VS | COMMENT |
|---|---|---|---|---|---|---|---|---|---|---|
| 1 | TYPC.A | 0 | 0 | 1 | | NEW | | | | |
| 1.1 | (TYPC.A.A) | 1 | 0 | | | TYPC.A | 0 | 0 | 1 | |
| 1.2 | (TYPC.A.B) | 2 | 0 | | | TYPC.A | 0 | 0 | 1 | |
| 1.3 | (TYPC.A.C) | 3 | 0 | | | TYPC.A | 2 | 0 | 0 | |
| 2 | TYPC.B | 0 | 0 | 1 | | NEW | | | | |
| 2.1 | | 0 | 1 | 0 | | TYPC.B | 0 | 0 | 1 | |
| 2.2 | (TYPC.B.A) | 1 | 0 | 0 | | TYPC.B | 0 | 0 | 1 | |
| 2.3 | (TYPC.B.B) | 2 | 0 | 0 | | TYPC.B | 1 | 0 | 0 | |
| 3 | TYPC.C | 0 | 0 | 0 | | TYPC.A | 0 | 0 | 0 | |
| 3.1 | | 0 | 1 | 0 | | TYPC.C | 0 | 0 | 0 | |
| 3.2 | | 0 | 2 | 0 | | TYPC.C | 0 | 1 | 0 | |
| 3.3 | (TYPC.C.A) | 1 | 0 | 0 | ◁ | TYPC.C | 0 | 0 | 0 | |
| 3.4 | | 1 | 1 | 0 | | TYPC.C | 1 | 0 | 0 | |
| 3.5 | (TYPC.C.B) | 2 | 0 | 0 | | TYPC.C | 0 | 0 | 0 | |
| 3.6 | (TYPC.C.C) | 3 | 0 | 0 | | TYPC.C | 2 | 0 | 0 | |

Fig. 100b

Z1 ELEMENT-TYPES | RTI: 2.1.1.3_ABAAC | Vers: 4.0 / Date: Feb.24.2006 | FCT LIB | DELETE | UNDO | REDO | CLOSE

Z2

| ELEMENT | NOTATION | COMMENT | PRODUCER / TECHNOLOGY-TYPE | MODEL / LANGUAGES |
|---|---|---|---|---|
| REG | REGISTER | | | |
| REG | Register | | | VHDL; System-C; |
| CNT | COUNTER | | | |
| CNT | Counter (Standard) | | | VHDL; System-C; |
| CNT_GC | Counter_Gray-Code | | | VHDL; System-C; |
| SHR | SHIFT-REGISTER | | | |
| SHR | Shift-Register (Standard) | | | VHDL; System-C; |
| COM | COMBINER | | | |
| COM | Combiner (Standard) | | | |
| PCH | Parity-Checker | | | VHDL; System-C; |
| PGN | Parity-Generator | | | VHDL; System-C; |
| ADD | Adder | | | VHDL; System-C; |
| SUB | Subtractor | | | VHDL; System-C; |
| MUL | Multiplier | | | VHDL; System-C; |
| DIV | Divider | | | VHDL; System-C; |
| CMP | Comparator | | | VHDL; System-C; |
| COM_PP1 | Combiner_Priority 1 | wrap around | | VHDL; System-C; |
| LOG_0 | Log0-Transmitter | | | |
| LOG_1 | Log1-Transmitter | | | |
| LOG_X | LogX-Transmitter | | | |
| MEM | MEMORY | | | |
| RAM_SP | RAM_SinglePort (Standard) | mode: 1 ADR-CYC, 1xWR-/1xRD-CYC | | VHDL; System-C; |
| RAM_SP_4RD | RAM_SinglePort_4RD-Cycle | mode: 1 ADR-CYC, 1xWR-/4xRD-CYC | | VHDL; System-C; |
| RAM_DP | RAM_DualPort (Standard) | | | VHDL; System-C; |
| ROM_STD | ReadOnlyMemory_Standard | | | VHDL; System-C; |
| EEP_STD | EEPROM_Standard | | | VHDL; System-C; |

Fig. 101a

Z1 ELEMENT-TYPES | RTI: 2.1.1.3_ABAAC | Vers: 4.0 / Date: Feb.24.2006 | FCT LIB | DELETE | UNDO | REDO | CLOSE

Z2

| ELEMENT | NOTATION | COMMENT | PRODUCER / TECHNOLOGY-TYPE | MODEL / LANGUAGES |
|---|---|---|---|---|
| REG | REGISTER | | | |
| REG | Register | | | VHDL; System-C; |
| CNT | COUNTER | | | |
| CNT | Counter (Standard) | | | VHDL; System-C; |
| CNT_GC | Counter_Gray-Code | | | VHDL; System-C; |
| SHR | SHIFT-REGISTER | | | |
| SHR | Shift-Register (Standard) | | | VHDL; System-C; |
| COM | COMBINER | | | |
| COM | Combiner (Standard) | | | |
| PCH | Parity-Checker | | | VHDL; System-C; |
| PGN | Parity-Generator | | | VHDL; System-C; |
| ADD | Adder | | | VHDL; System-C; |
| SUB | Subtractor | | | VHDL; System-C; |
| MUL | Multiplier | | | VHDL; System-C; |
| DIV | Divider | | | VHDL; System-C; |
| CMP | Comparator | | | VHDL; System-C; |
| COM_PF1 | Combiner_Priority 1 | wrap around | | VHDL; System-C; |
| LOG_0 | Log0-Transmitter | | | |
| LOG_1 | Log1-Transmitter | | | |
| LOG_X | LogX-Transmitter | | | |
| MEM | MEMORY | | | |
| RAM_SP | RAM_SinglePort (Standard) | mode: 1 ADR-CYC, 1xWR-/1xRD-CYC | | VHDL; System-C; |
| RAM_SP 4RD | RAM_SinglePort_4RD-Cycle | mode: 1 ADR-CYC, 1xWR-/4xRD-CYC | | VHDL; System-C; |
| RAM_DP | RAM_DualPort (Standard) | | | VHDL; System-C; |
| ROM_STD | ReadOnlyMemory_Standard | | | VHDL; System-C; |
| EEP_STD | EEPROM_Standard | | | VHDL; System-C; |

Fig. 101b

Z1 ELEMENT-TYPES | RTI: 2.1.1.3_ABAAC | Vers: 4.0 / Date: Feb.24.2006 | FCT LIB | DELETE | UNDO | REDO | CLOSE

Z2

| ELEMENT | NOTATION | COMMENT | PRODUCER / TECHNOLOGY-TYPE | MODEL / LANGUAGES |
|---|---|---|---|---|
| REG | REGISTER | | | |
| REG | Register | | | VHDL; System-C; |
| CNT | COUNTER | | | |
| CNT | Counter (Standard) | | | VHDL; System-C; |
| CNT_GC | Counter_Gray-Code | | | VHDL; System-C; |
| SHR | SHIFT-REGISTER | | | |
| SHR | Shift-Register (Standard) | | | VHDL; System-C; |
| COM | COMBINER | | | |
| COM | Combiner (Standard) | | | |
| PCH | Parity-Checker | | | VHDL; System-C; |
| PGN | Parity-Generator | | | VHDL; System-C; |
| ADD | Adder | | | VHDL; System-C; |
| SUB | Subtractor | | | VHDL; System-C; |
| MUL | Multiplier | | | VHDL; System-C; |
| DIV | Divider | | | VHDL; System-C; |
| CMP | Comparator | | | VHDL; System-C; |
| COM_PF1 | Combiner_Priority 1 | wrap around | | VHDL; System-C; |
| LOG_0 | Log0-Transmitter | | | |
| LOG_1 | Log1-Transmitter | | | |
| LOG_X | LogX-Transmitter | | | |
| MEM | MEMORY | | | |
| RAM_SP | RAM_SinglePort (Standard) | mode: 1 ADR-CYC, 1xWR-/1xRD-CYC | | VHDL; System-C; |
| RAM_SP 4RD | RAM_SinglePort_4RD-Cycle | mode: 1 ADR-CYC, 1xWR-/4xRD-CYC | | VHDL; System-C; |
| RAM_DP | RAM_DualPort (Standard) | | | VHDL; System-C; |
| ROM_STD | ReadOnlyMemory_Standard | | | VHDL; System-C; |
| EEP_STD | EEPROM_Standard | | | VHDL; System-C; |

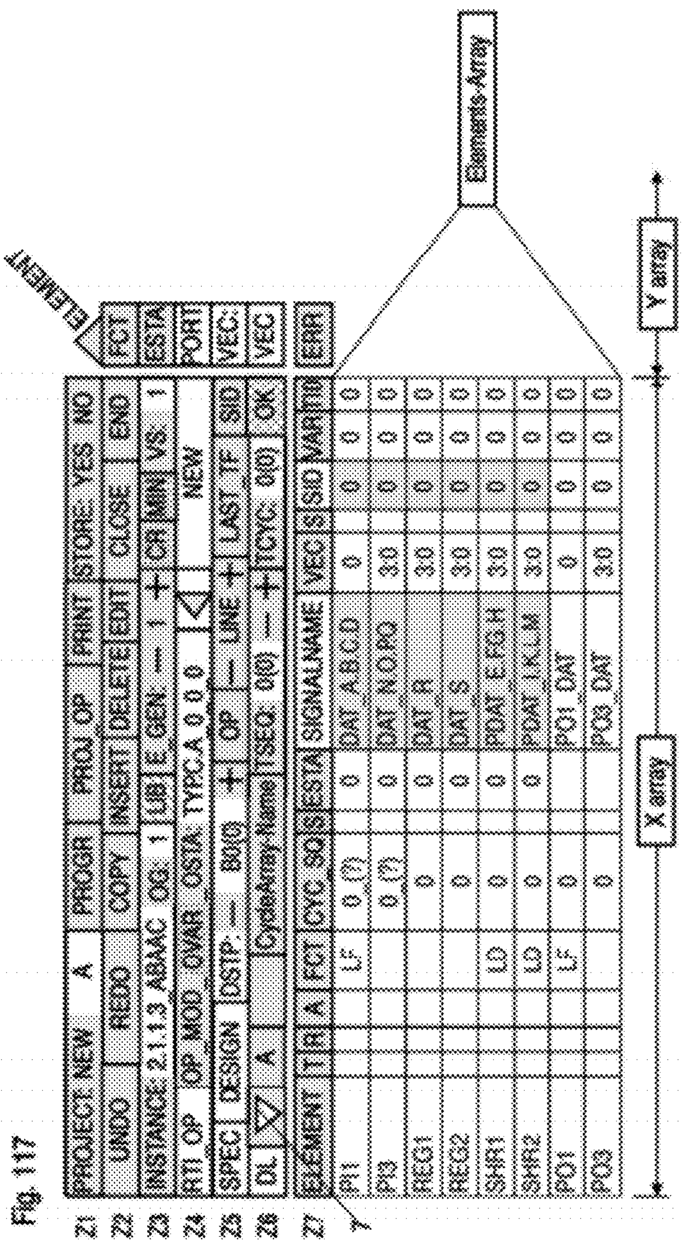
Fig. 117
Z1
Z2
Z3
Z4
Z5
Z6
Z7
PROJECT NEW A PROGR PROJ OP PRINT STORE: YES NO
UNDO REDO COPY INSERT DELETE EDIT CLOSE END
INSTANCE 2.1.1.3 ABAAC OG: 1 LIB E_GEN — 1 + CR MIN VS: 1
RTI OP OP_MOD OVAR OSTA TYPC.A 0 0 0 NEW
SPEC DESIGN DSTP: — B0(0 + OP — LINE + LAST TF SID
DL A CycleArray-Name TSEQ: 0(0) — + TCYC: 0(0) OK
ELEMENT T R A FCT CYC SQ S ESTA SIGNALNAME VEC S SID VAR TB
P11 LF 0 (?) 0 DAT_A,B,C,D 0 0 0 0
P13 0 (?) 0 DAT_N,O,P,Q 3.0 0 0 0
REG1 0 0 DAT_R 3.0 0 0 0
REG2 0 0 DAT_S 3.0 0 0 0
SHR1 LD 0 0 PDAT_E,F,G,H 3.0 0 0 0
SHR2 LD 0 0 PDAT_I,K,L,M 3.0 0 0 0
PO1 LF 0 PO1_DAT 0 0 0 0
PO3 0 PO3_DAT 3.0 0 0 0
ELEMENT
FCT
ESTA
PORT
VEC:
VEC
ERR
Elements-Array
Y array
X array

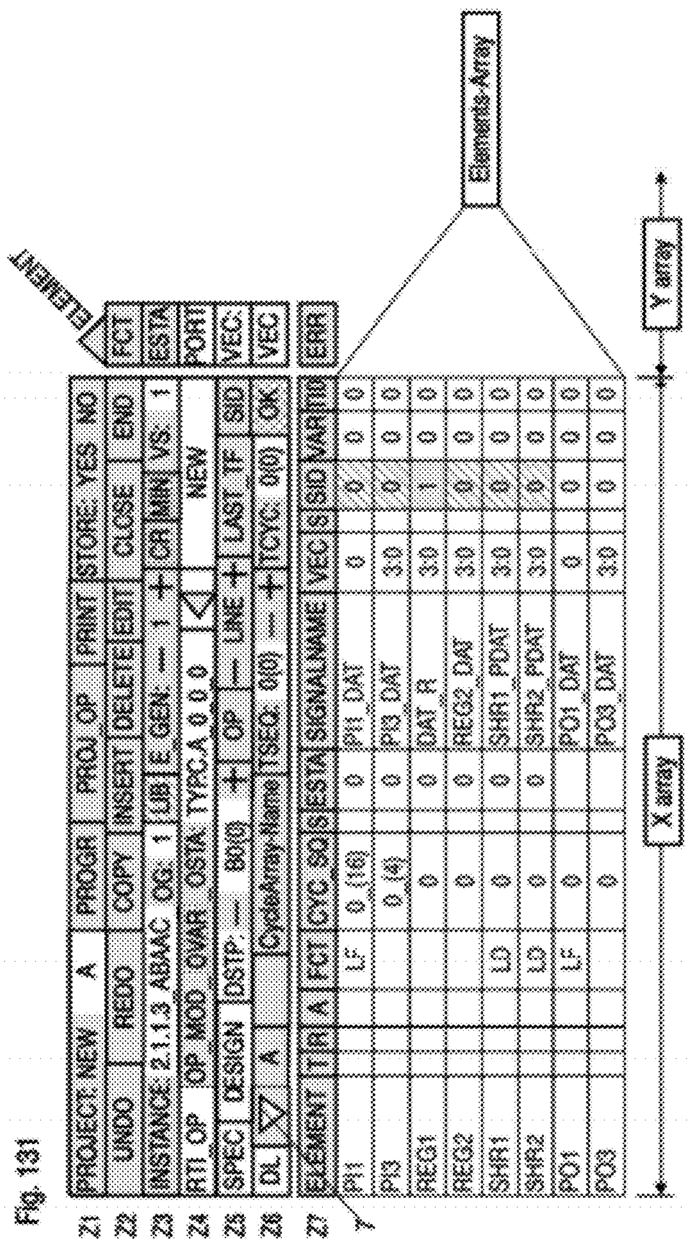

Fig. 131
Z1
Z2
Z3
Z4
Z5
Z6
Z7
Y
PROJECT NEW
A
PROGR
PROJ OP
PRINT
STORE
YES
NO
UNDO
REDO
COPY
INSERT
DELETE
EDIT
CLOSE
END
INSTANCE 2.1.1.3 ABAAC
OG: 1
LIB
E GEN
CR
MIN
VS: 1
RTI OP
OP MOD
OVAR
OSTA
TYP:CA 0 0 0
NEW
SPEC
DESIGN
DSTP
B0(0)
OP
LINE
LAST_TF
SID
DL
CycleArray-Name
TSEQ: 0(0)
TCYC: 0(0)
OK
ELEMENT
FCT
ESTA
PORT
VEC.
VEC
ERR
ELEMENT
TR
A
CYC
SQ
S
ESTA
SIGNALNAME
VEC
SID
VAR
PI1
LF
0 (16)
PI1_DAT
PI3
0 (4)
PI3_DAT
REG1
DAT_R
REG2
REG2_DAT
SHR1
LD
SHR1_PDAT
SHR2
SHR2_PDAT
PO1
PO1_DAT
PO3
PO3_DAT
3:0
Elements-Array
Y array
X array

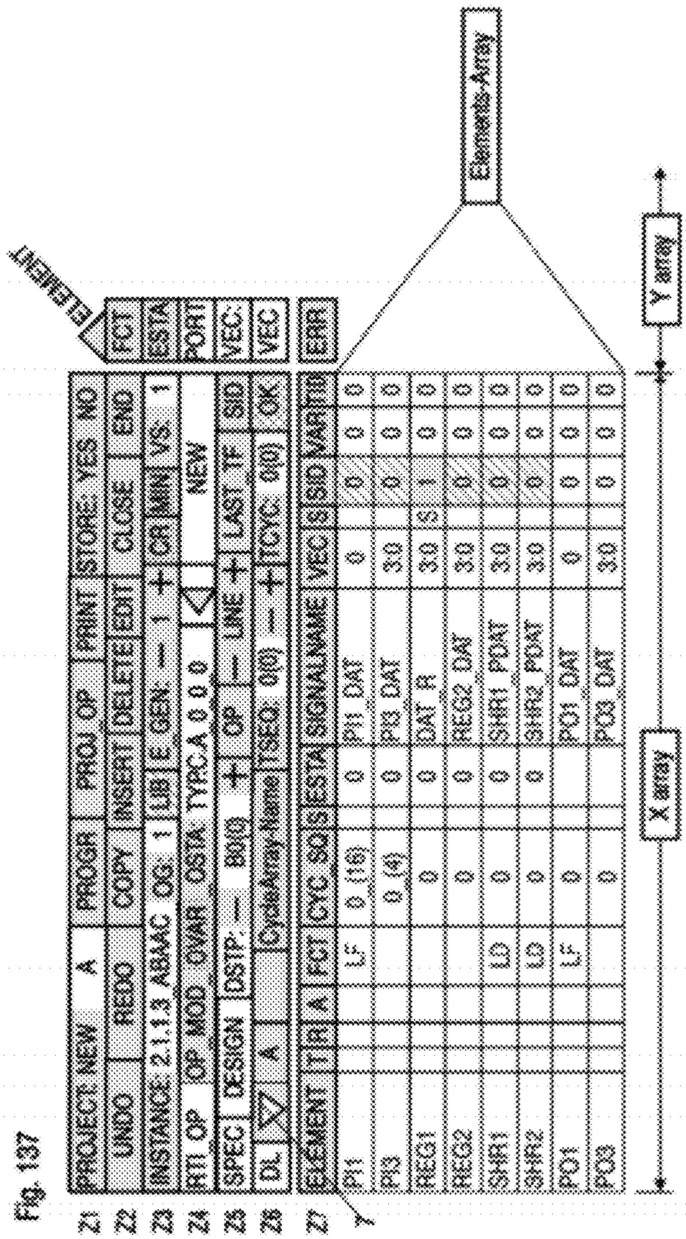
Fig. 137
Z1
Z2
Z3
Z4
Z5
Z6
Z7
Y
PROJECT NEW A PROGR PROJ OP PRINT STORE: YES NO
UNDO REDO COPY INSERT DELETE EDIT CLOSE END
INSTANCE: 2.1.1.3 ABAAC OG: 1 UB E GEN: — 1 + CR MIN VS: 1
RTI OP OP MOD OVAR OSTA TYRC A 0 0 0 NEW
SPEC DESIGN DSTP: — B0(0) + OP — LINE + LAST TF SID
DL A CycleArray Name TSEQ: 0(0) — + TCYC: 0(0) OK
ELEMENT T R A FCT CYC SQ S ESTA SIGNAL NAME VEC S SID MAR TB
PI1 LF 0 (16) 0 PI1_DAT 0 0 0 0
PI3 0 (4) 0 PI3_DAT 3:0 0 0 0
REG1 0 0 DAT_R 3:0 S 1 0 0
REG2 0 0 REG2_DAT 3:0 0 0 0
SHR1 LD 0 0 SHR1_PDAT 3:0 0 0 0
SHR2 LD 0 0 SHR2_PDAT 3:0 0 0 0
PO1 LF 0 PO1_DAT 0 0 0 0
PO3 0 PO3_DAT 3:0 0 0 0
ELEMENT
FCT
ESTA
PORT
VEC:
VEC
ERR
Elements Array
Y array
X array

Z1 Z2 Z3 Z4 Z5 Z6 Z7 7

Specification-Array
Receiver-Array
Transmitter-Array
Elements-Array
X array
Y array Specification-Array
Receiver-Array
Transmitter-Array
Elements-Array
X array
Y array Fig. 2321
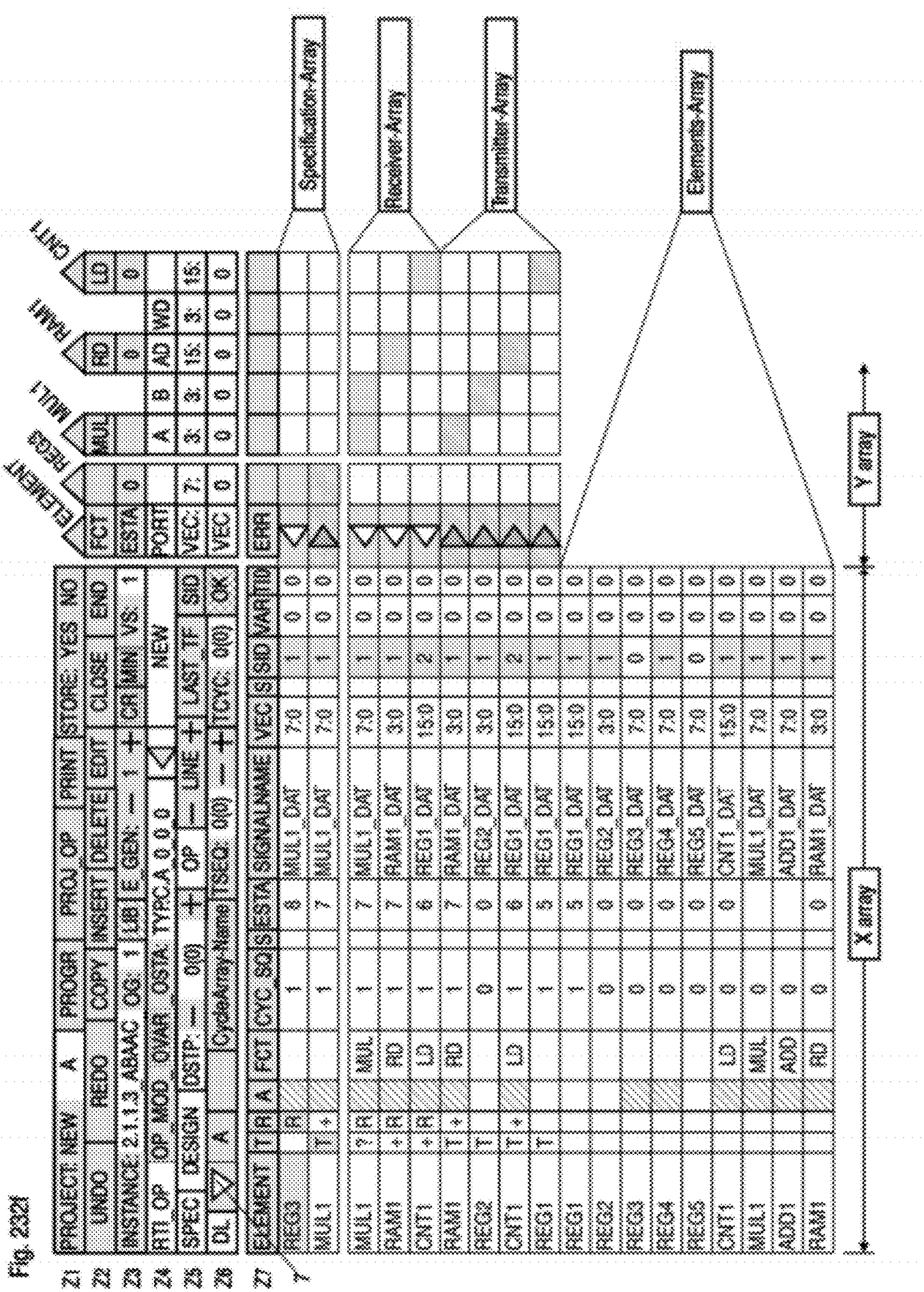

Fig. 2321
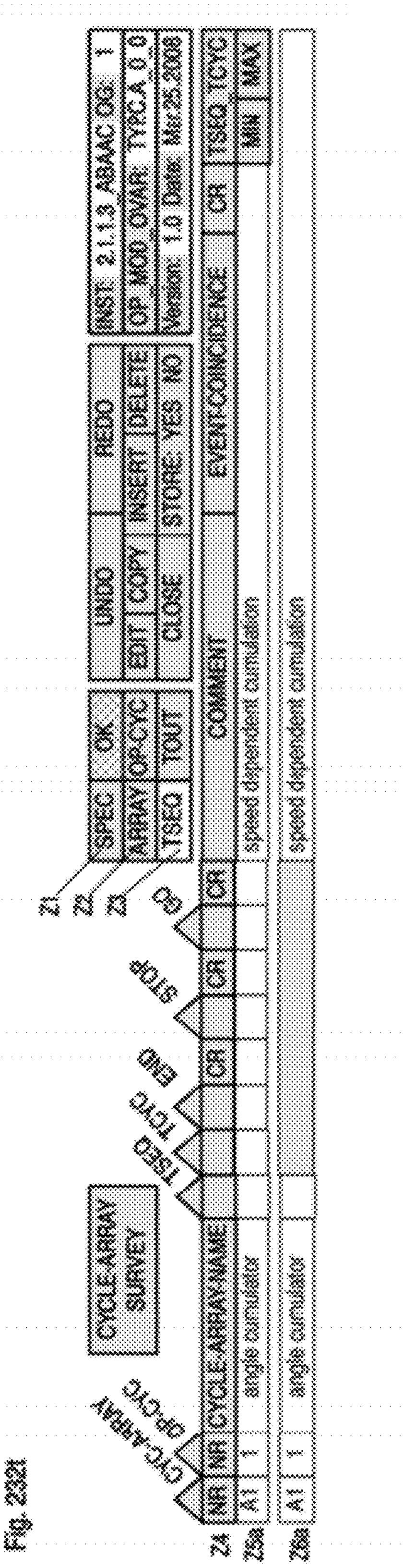

Specification-Array
Elements-Array
X array
Y array
ELEMENT
Z1
Z2
Z3
Z4
Z5
Z6
Z7
7
7a Specification-Array
Receiver-Array
Transmitter-Array
Elements-Array
X array
Y array
Z1
Z2
Z3
Z4
Z5
Z6
Z7

Z1 Z2 Z3 Z4 Z4

ELEMENT
Specification-Array
Y array
X array
PROJECT NEW A PROGR PROJ OP PRINT STORE YES NC
UNDO REDO COPY INSERT DELETE EDIT CLOSE END
FCT
ESTA
PORT
VEC
VEC
ERR
ELEMENT TRI A FCT CYC SQ SESTA SIGNALNAME VEC S SID VARID
21
22
23
24
25
26
27

21
22
23
24
25

Z1 Z2 Z3 Z4 Z5

Fig. 240b

| C.POG | | | | 2.1.1.1_ABAAA_OG:1 | | | 2.1.1.2_ABAAB_OG:1 | | | 2.1.1.3_ABAAC_OG:1 | | | 2.1.1.4_ABAAD_OG:1 | | |
|---|---|---|---|---|---|---|---|---|---|---|---|---|---|---|---|
| POP | MOD | POVAR | OSTA | OP | MOD | OVAR | OP | MOD | OVAR | OP | MOD | OVAR | OP | MOD | OVAR |
| TYP.PA | 0 | 0 | 1 | TYP.A.A | 0 | 0 | TYP.B.A | 0 | 0 | | | | | | |
| | | | 2 | | | | | | | TYP.C.A | 0 | 0 | | | |
| | | | 3 | | | | | | | | | | TYP.D.A | 0 | 0 |
| TYP.PA | 0 | 1 | 1 | TYP.A.A | 0 | 1 | TYP.B.A | 0 | 0 | | | | | | |
| | | | 2 | | | | | | | TYP.C.B | 0 | 0 | | | |
| | | | 3 | | | | | | | | | | TYP.D.B | 0 | 0 |
| TYP.PA | 0 | 2 | 1 | TYP.A.A | 0 | 0 | TYP.B.A | 0 | 1 | | | | | | |
| | | | 2 | | | | | | | TYP.C.A | 0 | 0 | | | |
| | | | 3 | | | | | | | | | | TYP.D.C | 0 | 0 |
| TYP.PA | 0 | 3 | 1 | TYP.A.A | 0 | 1 | TYP.B.A | 0 | 1 | | | | | | |
| | | | 2 | | | | | | | TYP.C.B | 0 | 0 | | | |
| | | | 3 | | | | | | | | | | TYP.D.D | 0 | 0 |
| TYP.PA | 0 | 4 | 1 | TYP.A.A | 0 | 2 | TYP.B.A | 0 | 0 | | | | | | |
| | | | 2 | | | | | | | TYP.C.C | 0 | 0 | | | |
| | | | 3 | | | | | | | | | | TYP.D.E | 0 | 0 |
| TYP.PA | 0 | 5 | 1 | TYP.A.A | 0 | 3 | TYP.B.A | 0 | 0 | | | | | | |
| | | | 2 | | | | | | | | | | TYP.D.F | 0 | 0 |
| TYP.PA | 0 | 6 | 1 | TYP.A.A | 0 | 4 | TYP.B.A | 0 | X | | | | | | |
| TYP.PA | 0 | 7 | 1 | TYP.A.A | 0 | 0 | TYP.B.A | 0 | 0 | | | | | | |
| | | | 2 | | | | | | | TYP.C.A | 0 | 0 | | | |
| | | | 3 | | | | | | | | | | TYP.D.A | 0 | 3 |

Fig. 240c

| RTI: 2.1.1.1_ABAAA_OG: 1; OP_MOD: TYPA_A_0 | | | | | |
|---|---|---|---|---|---|
| | E_AVAR | | SVAR | | |
| OVAR | HWERR | SWERR | CMDPERR | ADRPERR | DATPERR |
| 0 | 0 | 0 | 0 | 0 | 0 |
| 1 | 0 | 0 | 0 | 0 | 1 |
| | 0 | 0 | 0 | 1 | 0 |
| | 0 | 0 | 0 | 1 | 1 |
| 2 | 0 | 0 | 1 | X | X |
| 3 | 0 | 1 | X | X | X |
| 4 | 1 | X | X | X | X |

DVSTP 1

DVSTP 2

DVSTP 1

DVSTP 2

DVSTP 1

DVSTP 2

DVSTP 1

DVSTP 2

DVSTP 1

DVSTP 2

DVSTP 1

DVSTP 2

DVSTP 1

DVSTP 2

Fig. 249a

| Fig. | Data-Transmitter ⇨ Memorizing-Element / RTI-PI | | | | | Data-Processing ⇨ Combiner-Element | | | | | Data-Receiver Memorizing-Element / RTI-PO | | | | |
|---|---|---|---|---|---|---|---|---|---|---|---|---|---|---|---|
| | DVSTP | ELEM | FCT | ASTA | ESTA | IN | ELEM | ASTA | (ESTA) | ESTA | ELEM | FCT | ASTA | (ESTA) | ESTA |
| 241a | 1 (1) | PI1 | LF | 0 | 0,3 | | | | | | SHR | LF | 1 | (0) | 1,4 |
| 241a | 1 (1) | PI2 | | 0 | 0 | | | | | | REG1 | | 1 | (0) | 1 |
| 241b | 1 (2) | REG1 | | 1 | 1 | | | | | | RAM | RD | 1 | (0) | 2 |
| 241c | 1 (3) | RAM | RD | 1 | 2 | | | | | | REG3 | | 1 | (0) | 3 |
| 241d | 1 (4) | SHR | PD | 1 | 4 | | | | | | REG2 | | 1 | (0) | 5 |
| 241e,f | 1, 2 (5) | REG2<br>REG3 | | 1<br>1 | 5<br>3 | A<br>B | ADD1 | 1 | - | 5 | REG4 | | 1 | (0) | 6 |
| 241g | 1 (6) | REG4 | | 1 | 6 | | | | | | PO1 | | 1 | - | 6 |

Fig. 249b

| Fig. | Data-Transmitter ⇨ Memorizing-Element / RTI-PI | | | | | Data-Processing ⇨ Combiner-Element | | | | | Data-Receiver Memorizing-Element / RTI-PO | | | | |
|---|---|---|---|---|---|---|---|---|---|---|---|---|---|---|---|
| | DVSTP | ELEM | FCT | ASTA | ESTA | IN | ELEM | ASTA | (ESTA) | ESTA | ELEM | FCT | ASTA | (ESTA) | ESTA |
| 242a,b | 1,2 | REG5<br>REG6 | | 2<br>1 | 4<br>2 | A<br>B | MUL1 | 1 | (2) | 4 | REG7 | | 1 | (3) | 5 |
| 243a,b | 1,2 | REG8<br>REG6 | | 1<br>1 | 3<br>2 | A<br>B | MUL1 | 2 | (4) | 5 | REG7 | | 2 | (5) | 6 |
| 244b | 2 | REG8<br>REG6 | | 1<br>1 | 3<br>2 | A<br>B | MUL1 | 2 | (4) | 5 | REG9 | | 3 | (8) | 9 |
| 245a,b | 1,2 | REG10<br>REG11 | | 1<br>0 | 1<br>0 | A<br>B | ADD2 | 1 | (0) | 1 | REG8 | | 2 | (2) | 3 |
| 246a,b | 1,2 | REG12<br>REG13 | | 2<br>1 | 6<br>2 | A<br>B | ADD3 | 1 | (-) | 6 | PO2 | | 1 | (-) | 6 |
| 247b | 2 | REG12<br>REG13 | | 2<br>1 | 6<br>2 | A<br>B | ADD3 | 1 | (-) | 6 | PO3 | | 5 | (8) | 9 |

Fig 250a

| Fig. | Data-Transmitter ⇨ Memorizing-Element / RTI-PI | | | | | Hold | | Data-Processing ⇨ Combiner-Element | | | | Hold | Data-Receiver (Memorizing-Element / PO) Memorizing-Element / RTI-PO | | | | Hold ⇦ | Load |
|---|---|---|---|---|---|---|---|---|---|---|---|---|---|---|---|---|---|---|
| | DVSTP | ELEM | FCT | ASTA | (PSTA:H) | PSTA:H | PSTA | IN | ELEM | ASTA | (PSTA:H) | PSTA:H | ELEM | FCT | ASTA | (PSTA:H) | (PSTA) | PSTA |
| 24:a | 1 (1) | PI1 | LF | 0 | (0) | 0 | 0 (0.3) | | | | | | SHR | LF | 1 | (0) | (0) | 1 (0.4) |
| 24:a | 1 (1) | PI2 | | 0 | (0) | 0 | 0 | | | | | | REG1 | | 1 | (0) | (0) | 1 |
| 24:b | 1 (2) | REG1 | | 1 | (1) | 1 | 1 | | | | | | RAM | RD | 1 | (0) | (0) | 2 |
| 24:c | 1 (3) | RAM | RD | 1 | (2) | 2 | 2 | | | | | | REG3 | | 1 | (0) | (0) | 3 |
| 24:d | 1 (4) | SHR | PD | 1 | (1) | 1 | 1 | | | | | | REG2 | | 1 | (0) | (0) | 2 |
| 24:e,f | 1, 2 (5) | REG2 | | 1 | (2) | 3 | 2 | A | ADD1 | 1 | (-) | 3 | REG4 | | 1 | (0) | (0) | 4 |
| | | REG3 | | 1 | (3) | 3 | 3 | B | | | | | | | | | | |
| 24:g | 1 (6) | REG4 | | 1 | (4) | 4 | 4 | | | | | | PO1 | | 1 | (-) | (-) | 4 |

Fig 250b

| Fig. | Data-Transmitter ⇨ Memorizing-Element / RTI-PI | | | | | Hold | | Data-Processing ⇨ Combiner-Element | | | | Hold | Data-Receiver Memorizing-Element / RTI-PO | | | | Hold ⇦ | Load |
|---|---|---|---|---|---|---|---|---|---|---|---|---|---|---|---|---|---|---|
| | DVSTP | ELEM | FCT | ASTA | (PSTA:H) | PSTA:H | PSTA | IN | ELEM | ASTA | (PSTA:H) | PSTA:H | ELEM | FCT | ASTA | (PSTA:H) | (PSTA) | PSTA |
| 242a,b | 1, 2 | REG5 | | 2 | (4) | 4 | 4 | A | MUL1 | 1 | (-) | 4 | REG7 | | 1 | (3) | (3) | [illegible] |
| | | REG6 | | 1 | (2) | 4 | 2 | B | | | | | | | | | | |
| 243a,b | 1, 2 | REG8 | | 1 | (3) | 5 | 3 | A | MUL1 | 2 | (4) | 5 | REG7 | | 2 | (5) | (5) | [illegible] |
| | | REG6 | | 1 | (4) | 5 | 2 | B | | | | | | | | | | |
| 244b | 2 | REG8 | | 1 | (3) | 8 | 3 | A | MUL1 | 2 | (5) | 8 | REG9 | | 3 | (8) | (8) | [illegible] |
| | | REG6 | | 1 | (5) | 8 | 2 | B | | | | | | | | | | |
| 245a,b | 1, 2 | REG10 | | 1 | (1) | 8 | 1 | A | ADD2 | 1 | (-) | 8 | REG6 | | 2 | (8) | (2) | [illegible] |
| | | REG11 | | 0 | (2) | 8 | 0 | B | | | | | | | | | | |
| 246a,b | 1, 2 | REG12 | | 2 | (6) | 6 | 6 | A | ADD3 | 1 | (-) | 6 | PO2 | | 1 | (-) | (-) | [illegible] |
| | | REG13 | | 1 | (2) | 6 | 2 | B | | | | | | | | | | |
| 24*b | 2 | REG12 | | 2 | (6) | 9 | 6 | A | ADD3 | 1 | (6) | 9 | PO3 | | 5 | (8) | (8) | [illegible] |
| | | REG13 | | 1 | (2) | 9 | 2 | B | | | | | | | | | | |

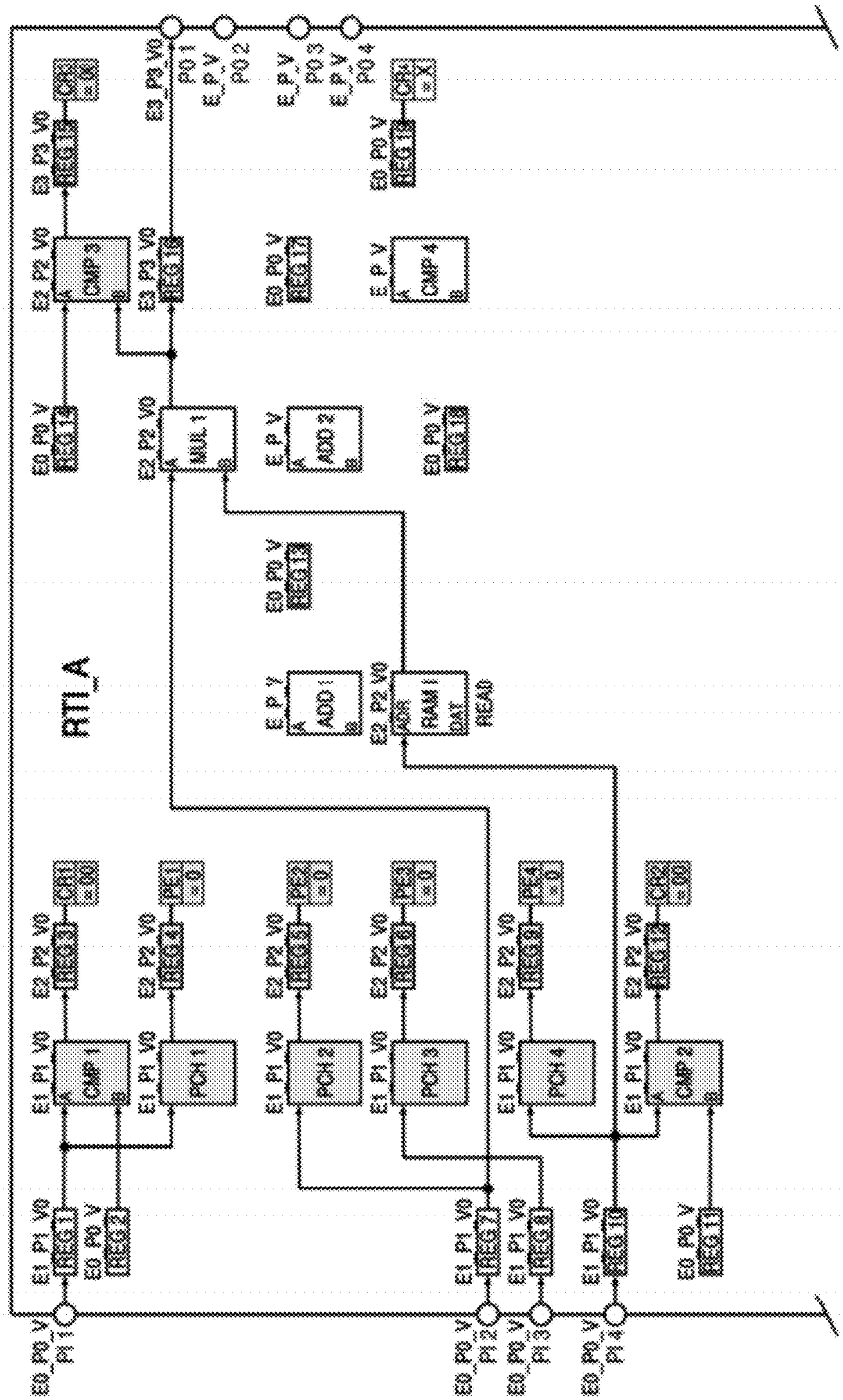
Fig. 251a: OVAR 0

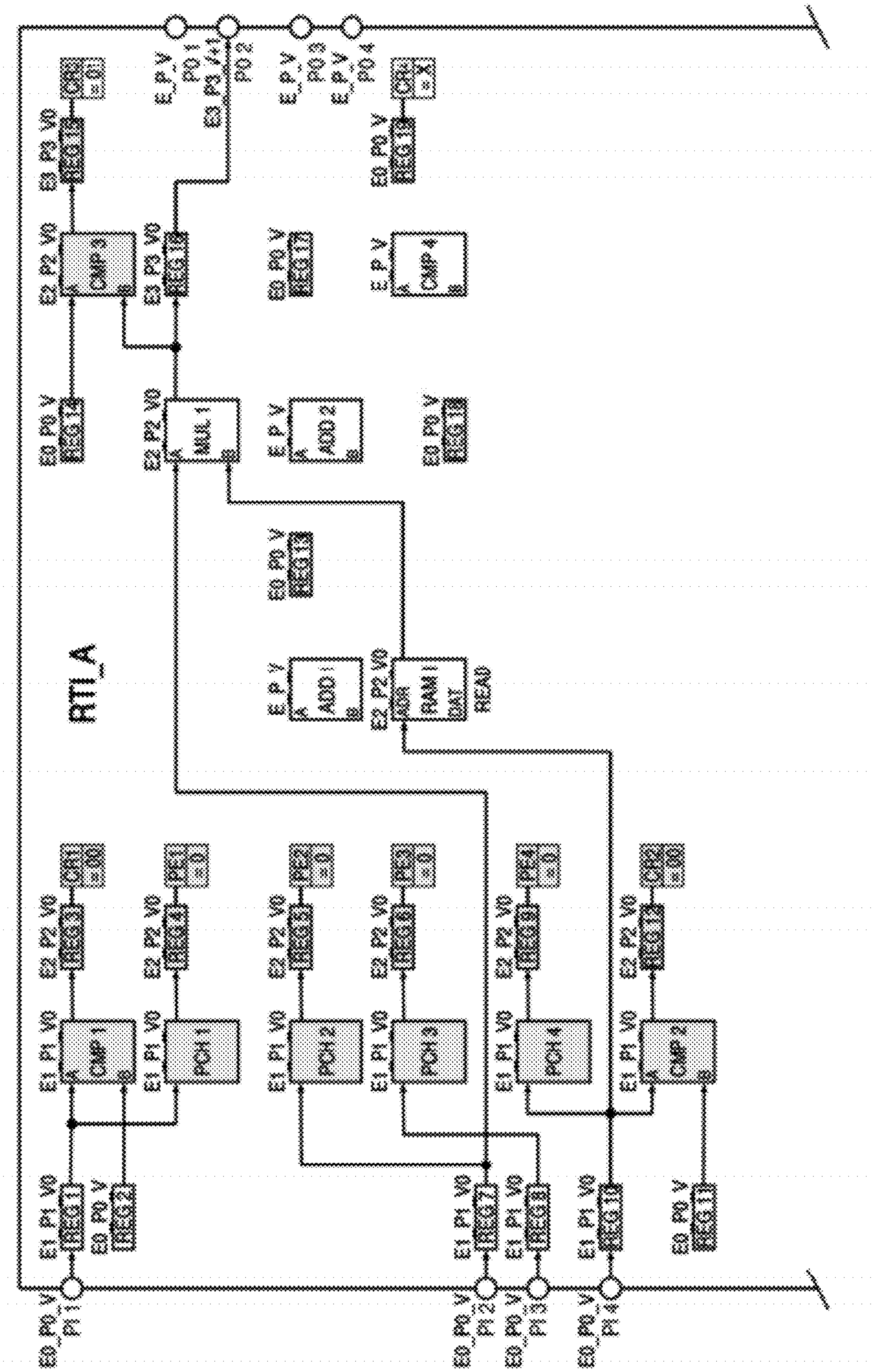
Fig. 251b: OVAR 1

Fig. 251c: OVAR 2
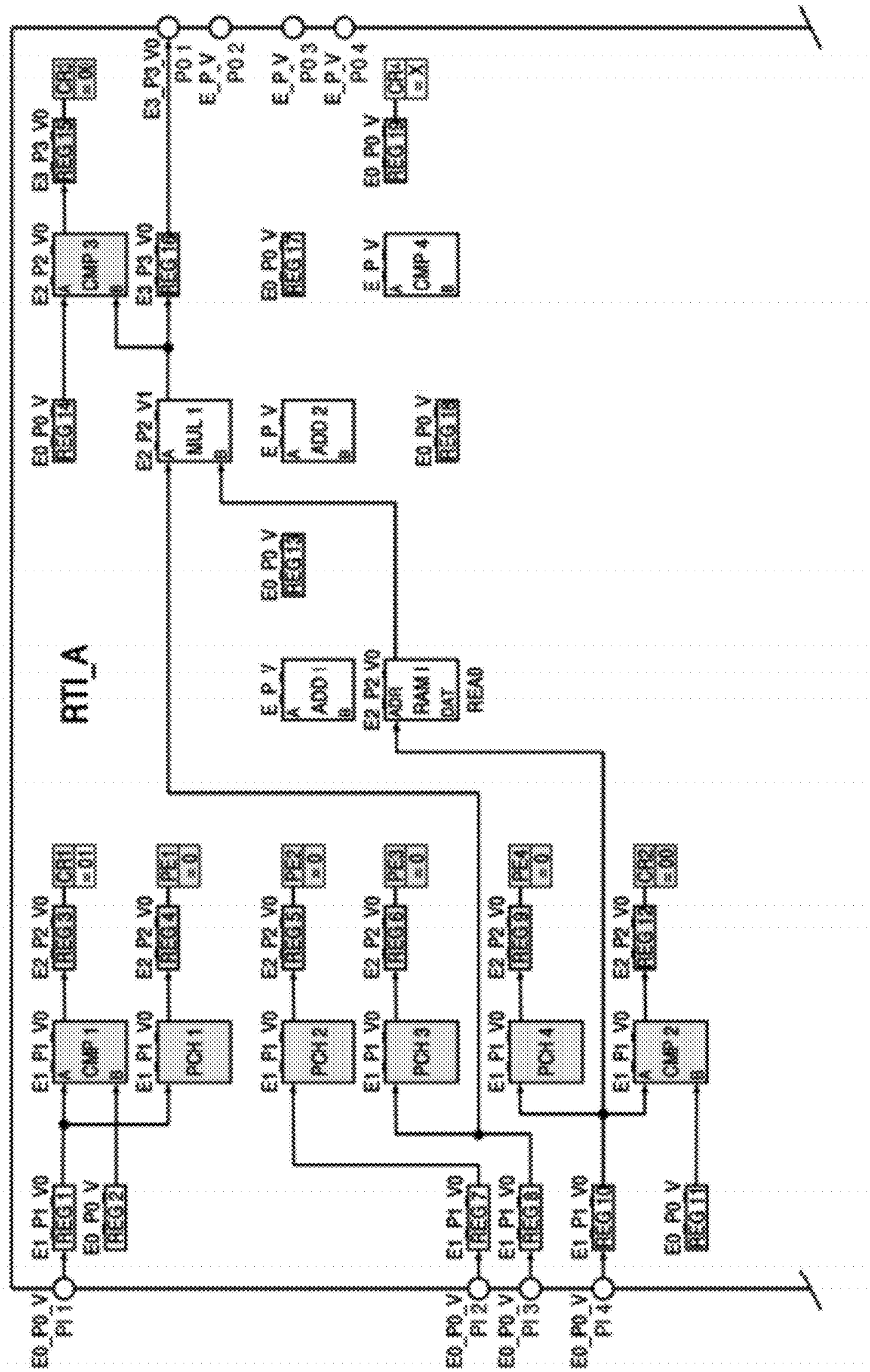

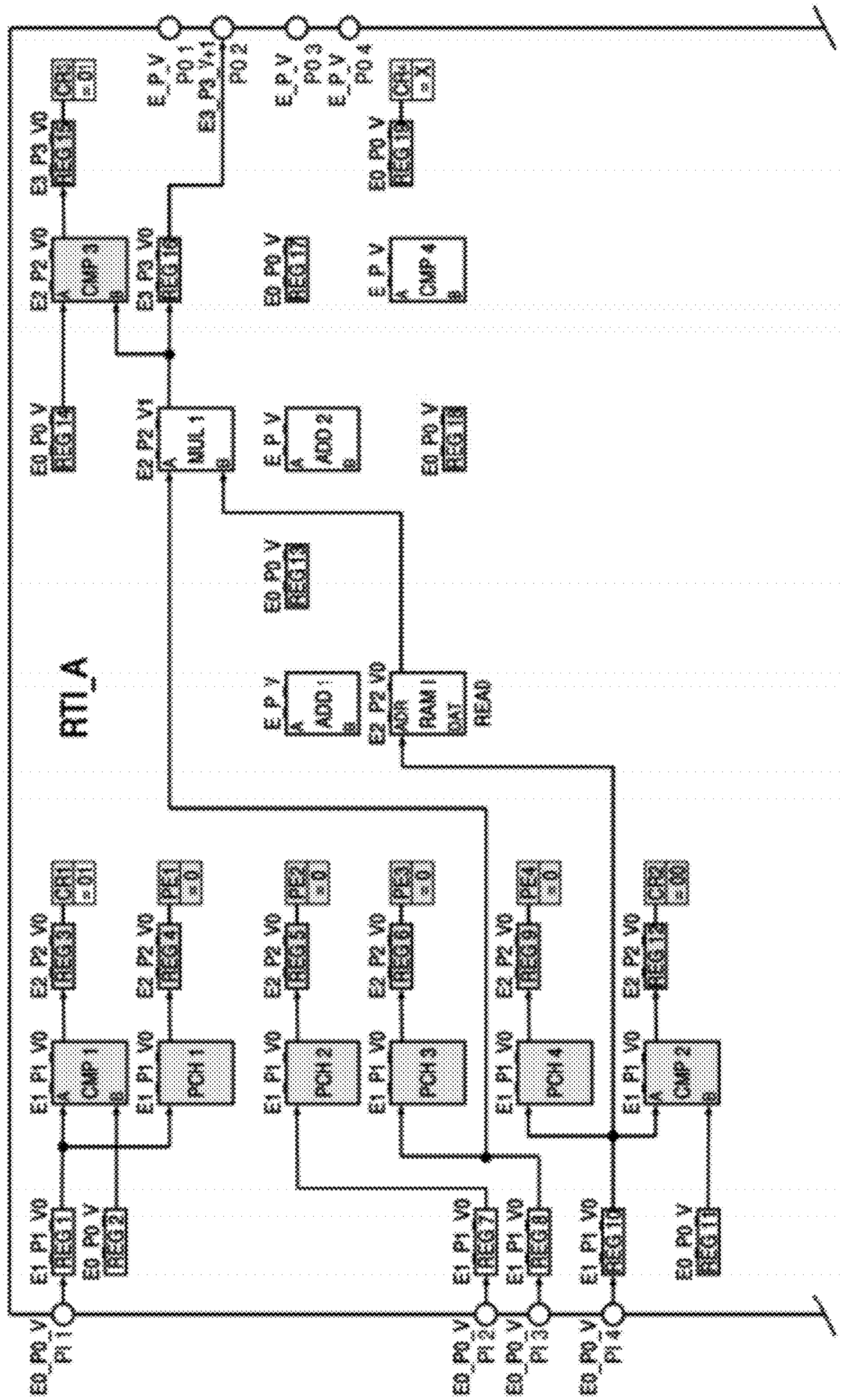
Fig. 251d: OVAR 3

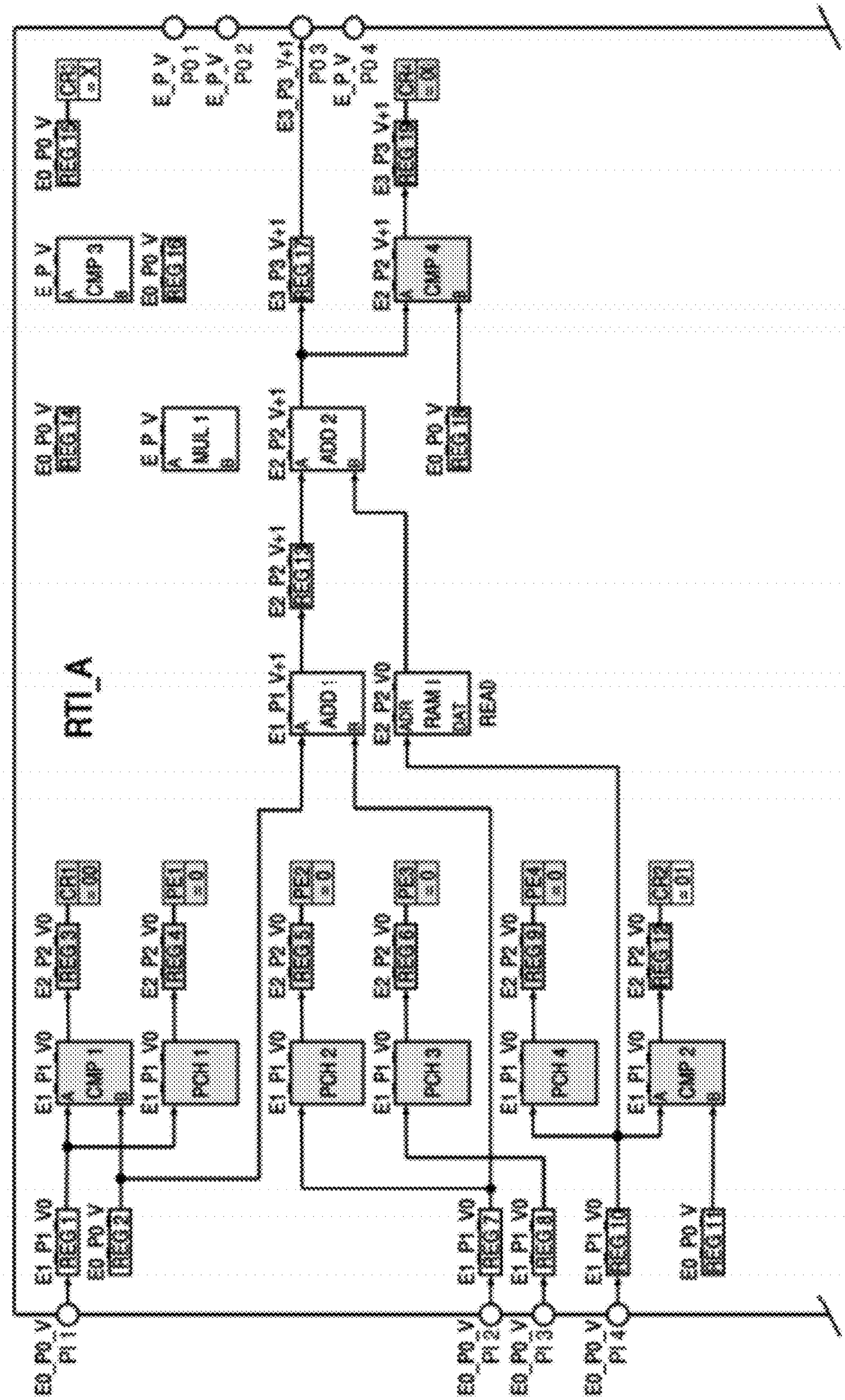
Fig. 251e: OVAR 4

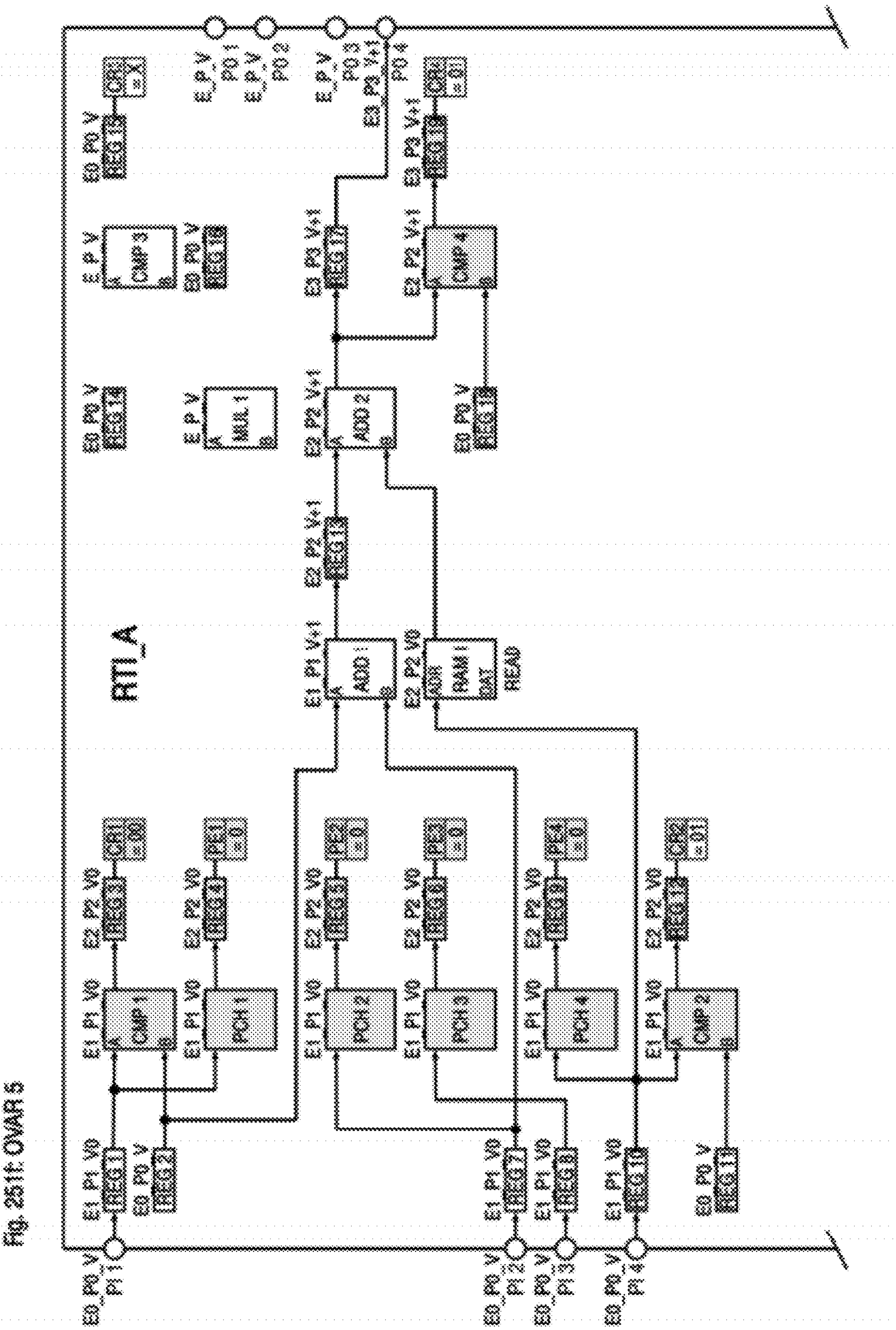
Fig. 251f: OVAR 5

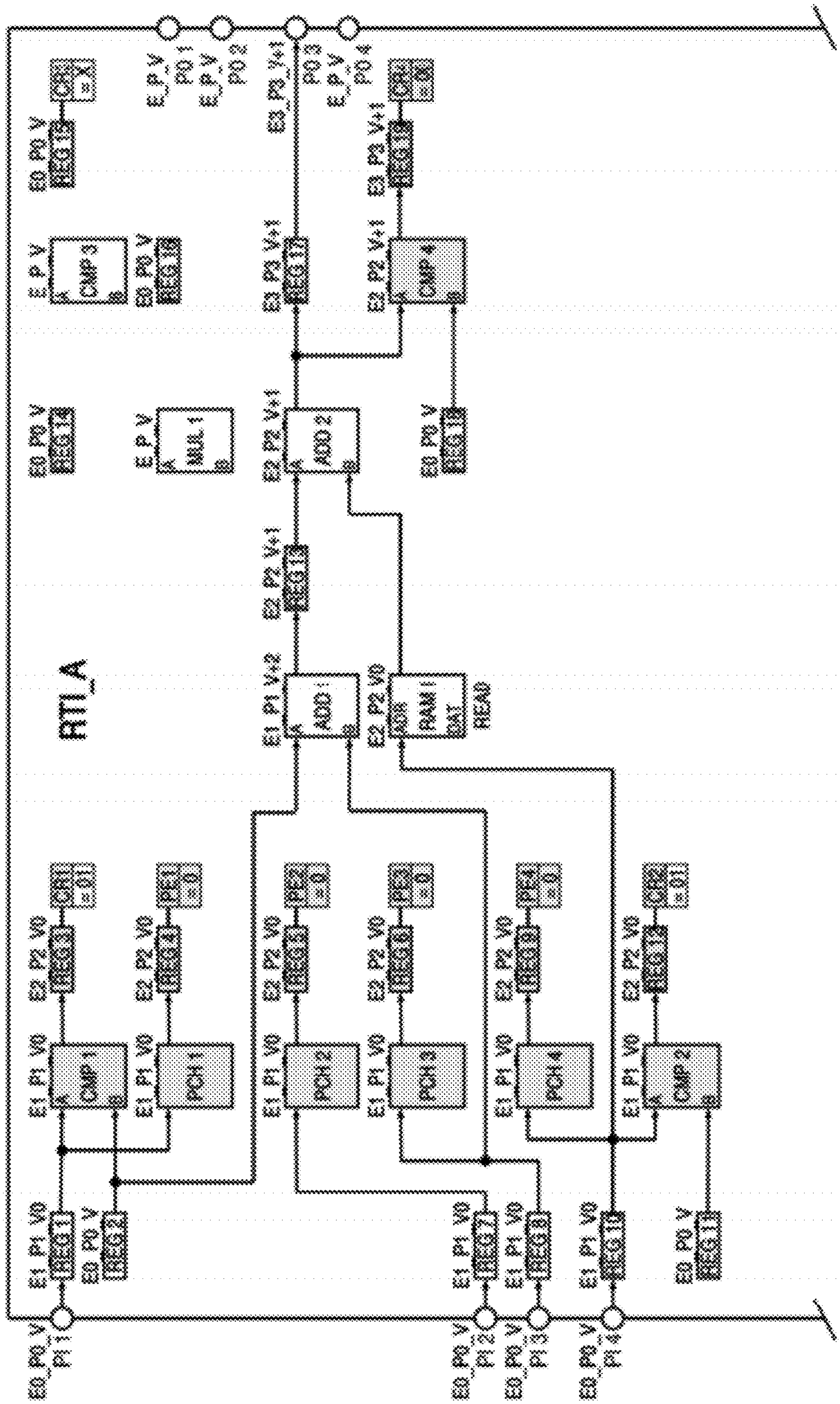
Fig. 251g: OVAR 6

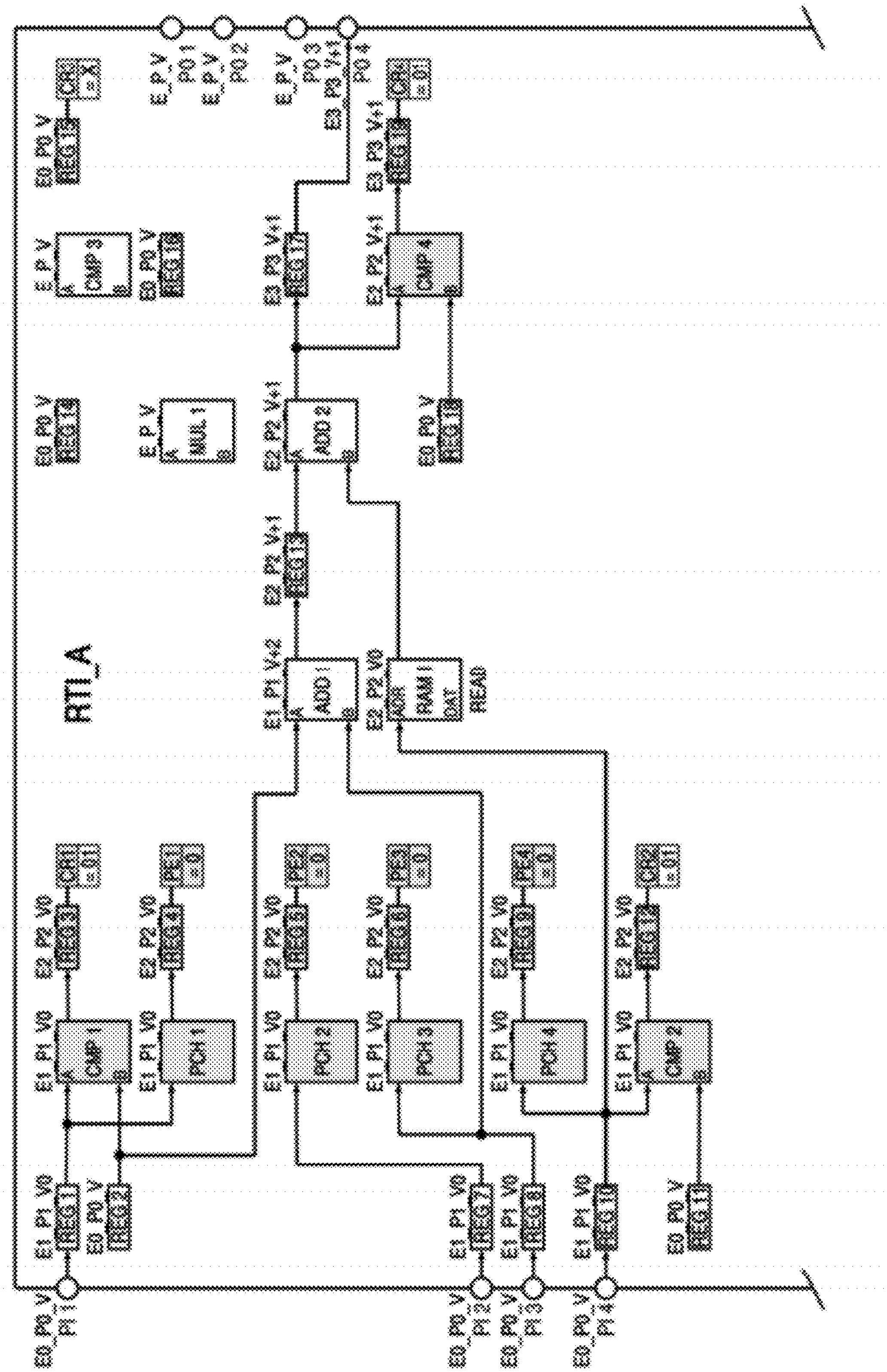
Fig. 251h: OVAR 7

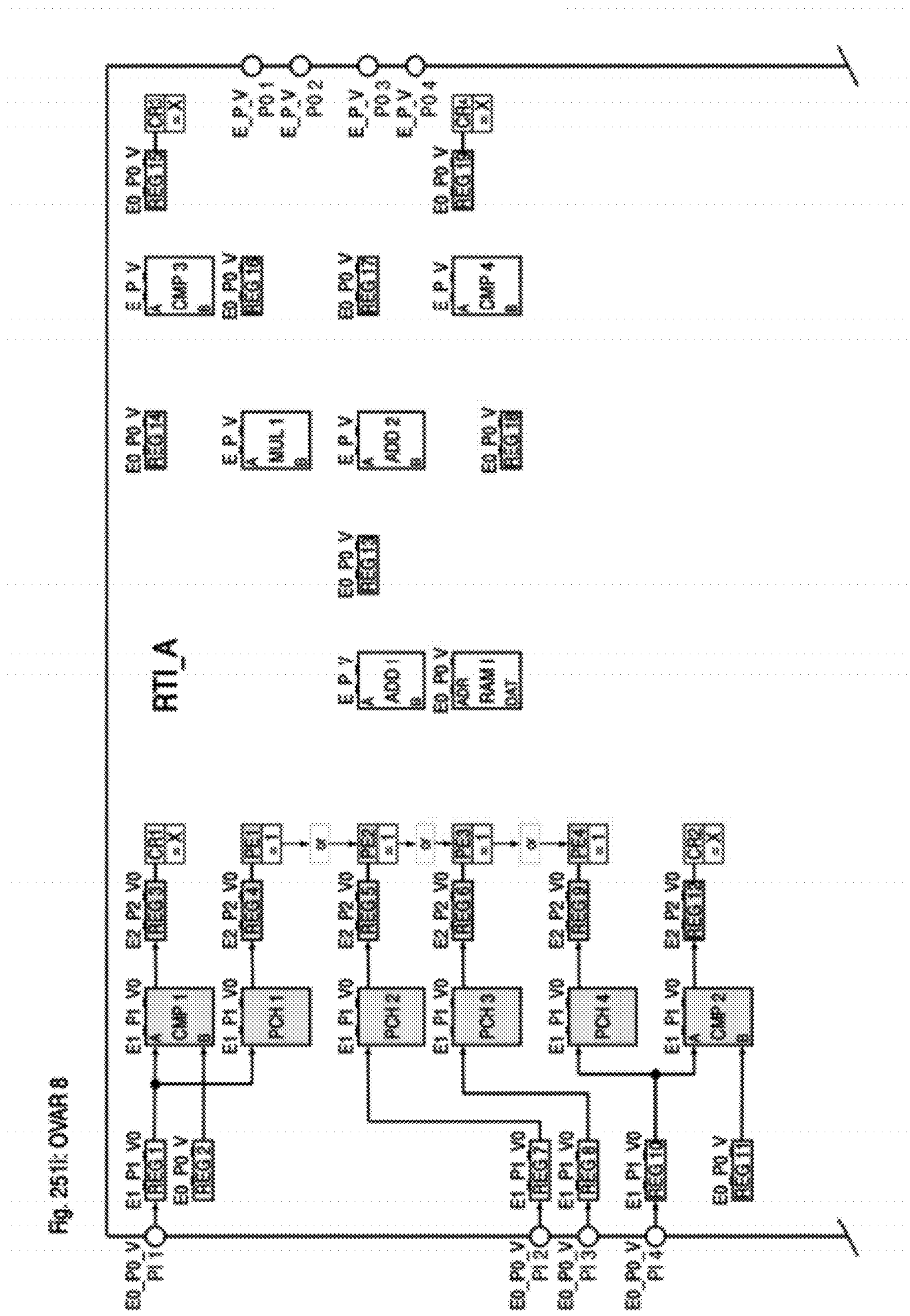
Fig. 251I: OVAR 8

Fig. 252

Execution of RTI_A-Operation "OP1" with Operation-Variants "OVAR" depending on Criteria "CR1, CR2, CR3, CR4, PE1, PE2, PE3, PE4";

| OVAR | SVAR_SIG | | | | | | | | AVAR_SIG | E_SVAR_SIG | E_AVAR_SIG | Comment |
|---|---|---|---|---|---|---|---|---|---|---|---|---|
| | CR1 | CR2 | CR3 | CR4 | PE1 | PE2 | PE3 | PE4 | | | | |
| 0 | 00 | 00 | 00 | X | 0 | 0 | 0 | 0 | | | | Base-Operation |
| 1 | 00 | 00 | 01 | X | 0 | 0 | 0 | 0 | | | | |
| 2 | 01 | 00 | 00 | X | 0 | 0 | 0 | 0 | | | | |
| 3 | 01 | 00 | 01 | X | 0 | 0 | 0 | 0 | | | | |
| 4 | 00 | 01 | X | 00 | 0 | 0 | 0 | 0 | | | | |
| 5 | 00 | 01 | X | 01 | 0 | 0 | 0 | 0 | | | | |
| 6 | 01 | 01 | X | 00 | 0 | 0 | 0 | 0 | | | | |
| 7 | 01 | 01 | X | 01 | 0 | 0 | 0 | 0 | | | | |
| 8 | X | X | X | X | 1 | X | X | X | | | | |
| | X | X | X | X | X | 1 | X | X | | | | |
| | X | X | X | X | X | X | 1 | X | | | | |
| | X | X | X | X | X | X | X | 1 | | | | |

Fig. 253

Execution of "OP1" in RTI_A, Base-Operation-Variants OVAR1-8 depending on CR1-4 and PE1-4 with allocation of Element-Input-Variant "VAR"

| PSTA | OVAR | CR1 | CR2 | CR3 | CR4 | PE1 | PE2 | PE3 | PE4 | VAR REG 1 | VAR TMP 1 | VAR REG 3 | VAR CH 1 | VAR REG 4 | VAR REG 7 | VAR CH 2 | VAR REG 5 | VAR REG 6 | VAR CH 3 | VAR REG 8 | VAR REG 10 | VAR CH 4 | VAR REG 9 | VAR TMP 2 | VAR REG 12 | VAR RAM 1 | VAR ACL 1 | VAR TMP 3 | VAR REG 15 | VAR REG 16 | VAR CO 1 | VAR CO 2 | VAR ADD 1 | VAR REG 13 | VAR ADD 2 | VAR REG 17 | VAR CO 3 | VAR CO 4 | VAR TMP 4 | VAR REG 19 | Comment |
|---|---|---|---|---|---|---|---|---|---|---|---|---|---|---|---|---|---|---|---|---|---|---|---|---|---|---|---|---|---|---|---|---|---|---|---|---|---|---|---|---|---|
| | 0 | | | | | | | | | 0 | 0 | | 0 | | 0 | 0 | | 0 | 0 | | 0 | 0 | | 0 | | 0 | | | | | | | | | | | | | | | Base-Op. |
| | 1 | | | | | | | | | 0 | 0 | | 0 | | 0 | 0 | | 0 | 0 | | 0 | 0 | | 0 | | 0 | | | | | | | | | | | | | | | |
| | 2 | | | | | | | | | 0 | 0 | | 0 | | 0 | 0 | | 0 | 0 | | 0 | 0 | | 0 | | 0 | | | | | | | | | | | | | | | |
| | 3 | | | | | | | | | 0 | 0 | | 0 | | 0 | 0 | | 0 | 0 | | 0 | 0 | | 0 | | 0 | | | | | | | | | | | | | | | |
| 1 | 4 | | | | | | | | | 0 | 0 | | 0 | | 0 | 0 | | 0 | 0 | | 0 | 0 | | 0 | | 0 | | | | | | | +1 | | | | | | | | |
| | 5 | | | | | | | | | 0 | 0 | | 0 | | 0 | 0 | | 0 | 0 | | 0 | 0 | | 0 | | 0 | | | | | | | +1 | | | | | | | | |
| | 6 | | | | | | | | | 0 | 0 | | 0 | | 0 | 0 | | 0 | 0 | | 0 | 0 | | 0 | | 0 | | | | | | | +2 | | | | | | | | |
| | 7 | | | | | | | | | 0 | 0 | | 0 | | 0 | 0 | | 0 | 0 | | 0 | 0 | | 0 | | 0 | | | | | | | +2 | | | | | | | | |
| | 8 | | | | | | | | | 0 | 0 | | 0 | | 0 | 0 | | 0 | 0 | | 0 | 0 | | 0 | | | | | | | | | | | | | | | | | |
| | 0 | 00 | 00 | 00 | X | 0 | 0 | 0 | 0 | | | 0 | | 0 | | | 0 | | | 0 | | | 0 | | 0 | | 0 | 0 | | | | | | | | | | | | | Base-Op. |
| | 1 | 00 | 00 | 01 | X | 0 | 0 | 0 | 0 | | | 0 | | 0 | | | 0 | | | 0 | | | 0 | | 0 | | 0 | 0 | | | | | | | | | | | | | |
| | 2 | 01 | 00 | 00 | X | 0 | 0 | 0 | 0 | | | 0 | | 0 | | | 0 | | | 0 | | | 0 | | 0 | | 1 | 0 | | | | | | | | | | | | | |
| | 3 | 01 | 00 | 01 | X | 0 | 0 | 0 | 0 | | | 0 | | 0 | | | 0 | | | 0 | | | 0 | | 0 | | 1 | 0 | | | | | | | | | | | | | |
| 2 | 4 | 00 | 01 | X | 00 | 0 | 0 | 0 | 0 | | | 0 | | 0 | | | 0 | | | 0 | | | 0 | | 0 | | | | | | | | | +1 | +1 | | | | +1 | | |
| | 5 | 00 | 01 | X | 01 | 0 | 0 | 0 | 0 | | | 0 | | 0 | | | 0 | | | 0 | | | 0 | | 0 | | | | | | | | | +1 | +1 | | | | +1 | | |
| | 6 | 01 | 01 | X | 00 | 0 | 0 | 0 | 0 | | | 0 | | 0 | | | 0 | | | 0 | | | 0 | | 0 | | | | | | | | | +1 | +1 | | | | +1 | | |
| | 7 | 01 | 01 | X | 01 | 0 | 0 | 0 | 0 | | | 0 | | 0 | | | 0 | | | 0 | | | 0 | | 0 | | | | | | | | | +1 | +1 | | | | +1 | | |
| | 8 | X | X | X | X | [illegible] | [illegible] | [illegible] | 1 | | | 0 | | 0 | | | 0 | | | 0 | | | 0 | | 0 | | | | | | | | | | | | | | | | |
| | 0 | | | | | | | | | | | | | | | | | | | | | | | | | | | | 0 | 0 | 0 | | | | | | | | | | Base-Op. |
| | 1 | | | | | | | | | | | | | | | | | | | | | | | | | | | | 0 | 0 | | +1 | | | | | | | | | |
| | 2 | | | | | | | | | | | | | | | | | | | | | | | | | | | | 0 | 0 | 0 | | | | | | | | | | |
| | 3 | | | | | | | | | | | | | | | | | | | | | | | | | | | | 0 | 0 | | +1 | | | | | | | | | |
| 3 | 4 | | | | | | | | | | | | | | | | | | | | | | | | | | | | | | | | | | | +1 | +1 | | | +1 | |
| | 5 | | | | | | | | | | | | | | | | | | | | | | | | | | | | | | | | | | | +1 | | +1 | | +1 | |
| | 6 | | | | | | | | | | | | | | | | | | | | | | | | | | | | | | | | | | | +1 | +1 | | | +1 | |
| | 7 | | | | | | | | | | | | | | | | | | | | | | | | | | | | | | | | | | | +1 | | +1 | | +1 | |
| | 8 | | | | | | | | | | | | | | | | | | | | | | | | | | | | | | | | | | | | | | | | |

SPECIFICATION METHOD FOR PRODUCING DATA PROCESSING SYSTEMS

The invention relates to a specification method for producing data processing systems in the form of software systems or hardware systems.

According to the state of the art, data processing systems, which can be realized as software systems or hardware systems are specified in text form and/or flow charts/diagrams and are generated by conversion into software by programming languages.

As is known, for the generation of software for software systems, programming languages for example "C" or "C++" are utilized, and for hardware systems the programming languages for example "VHDL" or "VERILOG".

For the realization of program flows on machine/computer platforms, microprocessor configurations etc. the software systems which are programmed for instance in "C" or "C++" are converted to executable object code by corresponding compilers and/or interpreters.

For the realization of hardware configurations in "FPGAs", "ASICs" etc. the hardware systems programmed for instance in "VHDL" or "VERILOG" are converted by corresponding compilers into a hard wired logic structure.

In software systems and hardware systems the sequential flow of data processing respectively the generation of results as a rule is basically affected or controlled by constraints and criteria.

The known procedures or programming languages to generate software systems and hardware systems define or program respectively with each data processing step, depending on the effective constraints and criteria, the alternative generations of result. In the sequential continuation of the programming of data processing steps the alternative generations of result of the previous data processing steps and the effective constraints and criteria for each following data processing step have to be taken into account. Depending on the number of constraints, criteria and sequential data processing steps, for the programming respectively the generation of software systems and hardware systems normally a huge number of combinations of effective constraints, criteria or variations of generation of results are to be taken into account.

Generally this causes errors during the programming for generation of software systems and hardware systems. Furthermore, the debugging by modification of the program after the detection of errors in the following tests is difficult and therefore new errors may occur. Hereby it is possible that depending on the extent of the software systems and hardware system or the complexity of the combination of constraints and criteria, a considerable amount of tests, substantially bigger than the effort for the programming may be produced.

Furthermore the readability and the capability of understanding of the interrelationship of complex data processing flows with common methods or programming languages for generation of software systems and hardware systems is difficult to interpret for people who have not developed the data processing aggregate. If such people perform modifications and/or extensions of programs, then normally the occurrence of errors will increase.

By the programming for generation of software systems and hardware systems following the specification, another source for errors is created by misinterpretation of details in the specification.

While for software systems, which are for example programmed or generated by the programming language "C" or "C++" and which are ported executably by corresponding compilers on machine/computer-platforms, microprocessor configurations etc., the program flow control is generated by the compiler or interpreter. In contrast, for hardware systems, which are programmed or generated with the programming language "VHDL" or "VERILOG" the program flow control has to be provided by programming.

Therefore, it is an object of the invention to create a uniform specification method for generation of software systems and hardware systems, which works without any subsequent software programming and which, in this way, generates and/or controls the program flow in software systems straightforward by compiler or/and interpreter on machine-/computer platforms, microprocessor configurations, etc. as well as it realizes in hardware systems directly by compiler hardware configurations including the program control in "FPGAs", "ASICs" etc.

This task is solved by a specification method in the way mentioned before according to the invention, which is stated by the characteristic features of claims 1, 31 and 40.

With this solution according to the invention, the specification of one data processing step in hardware systems and software systems occurs without considering combinations of constraints, criteria or variations of previous generations of results. This is achieved by specifying a first data processing procedure, a so-called base operation action with a definite combination of constraints and criteria. Hereby for the combination of constraints and criteria a so-called standard/normal state without error events is assumed. After that a sequential data processing action, a so-called RTI-base-operation-variant, is specified for each single combination of constraints and criteria. During the specification of an RTI-base-operation-variant only the data processing steps, which are different to the RTI-base-operation are changed or, respectively, added in the specification. The data processing steps, which hereby got erroneous by the modification of the data processing action, are preferably accessed and characterized automatically step by step in direction of the data processing flow, so that adequate corrections can be made.

Benefiting extensions of the invention are indicated in the subclaims.

Figure 1:
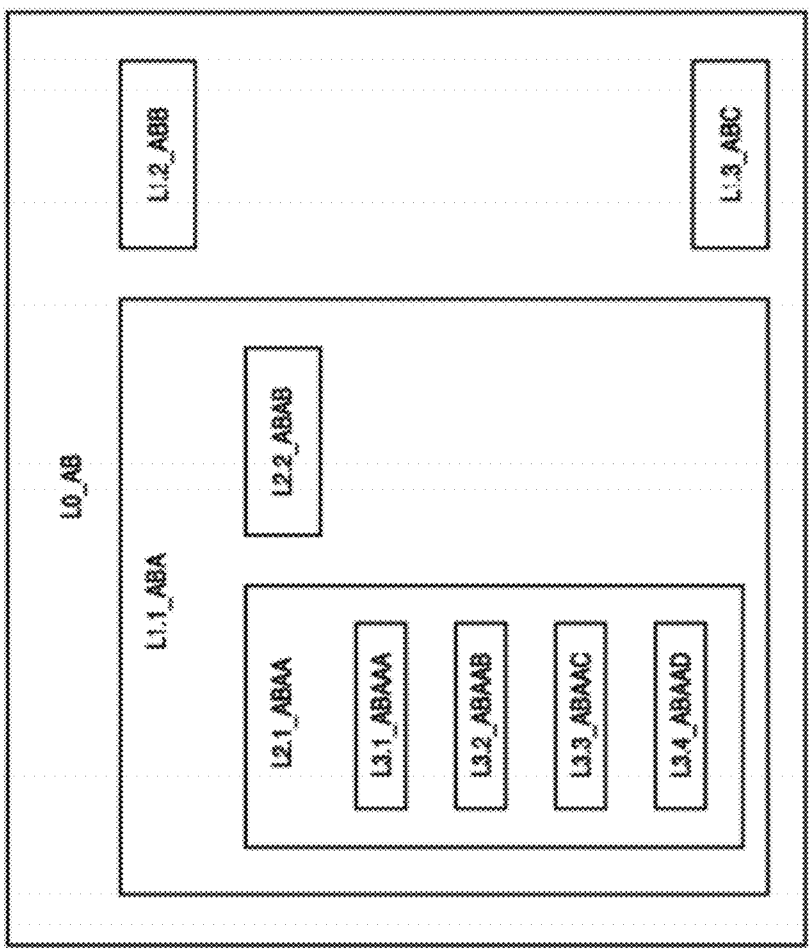
Figure 3:
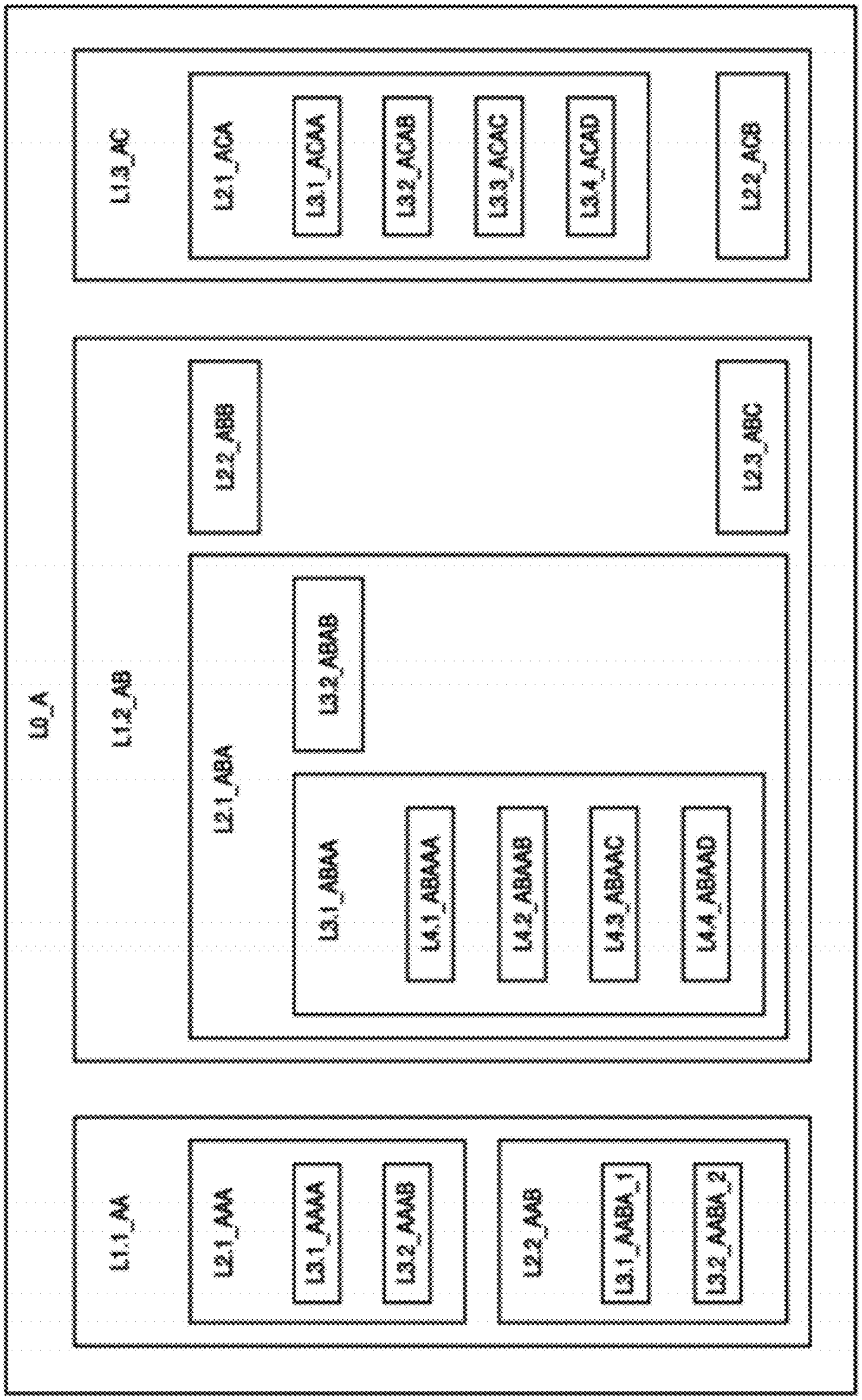
Figure 4:
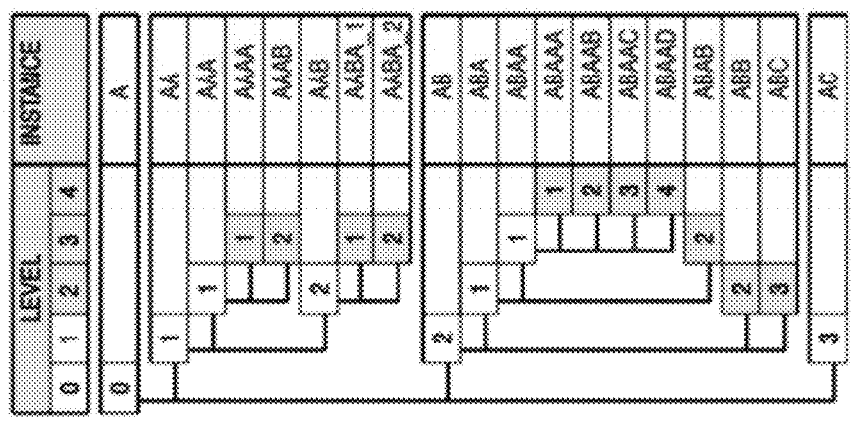
Figure 10A:
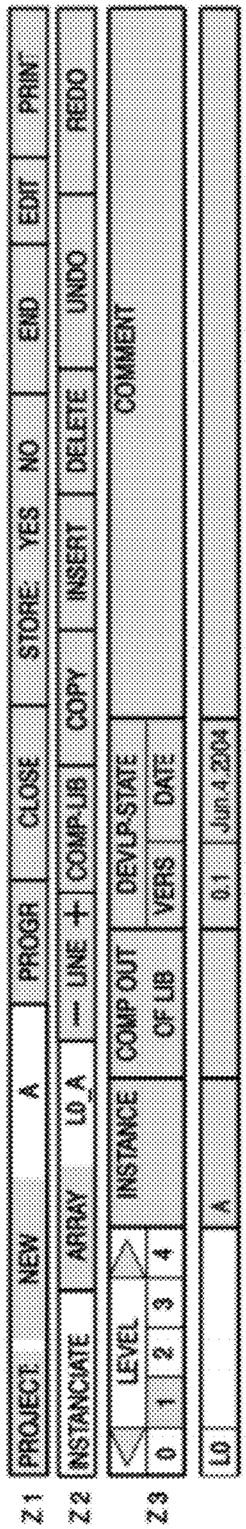

In the following the invention is described more particularly by explaining examples in the figures. It is shown in:

FIG. 1 the top level "AB" with its instances and sub-instances in block structure design;

FIG. 2 the top level "AB" of FIG. 1 with its instances and sub instances in a directory design;

FIG. 3 the top level "A" with its instances and sub instances in block structure design;

FIG. 4 the top level "A" of FIG. 3 with its instances and sub instances in a directory design;

FIG. 5 the menu line "Z1" after activating of SPV;

FIG. 6 the menu line "Z1" with open project window and a project selection "NEW":

FIG. 7 the menu line "Z1" with project selection "NEW" in "FIELD1" by closing the project window of FIG. 6 and the manual project entry "A" in "FIELD2";

FIG. 8 the menu line "Z1" with open program window and project selection "INSTANCIATE";

FIG. 9 the display "INSTANCIATE" after closing the program window of FIG. 8;

FIG. 10*a* the manual entry of state of development in line of the top level "A"

Figure 10B:
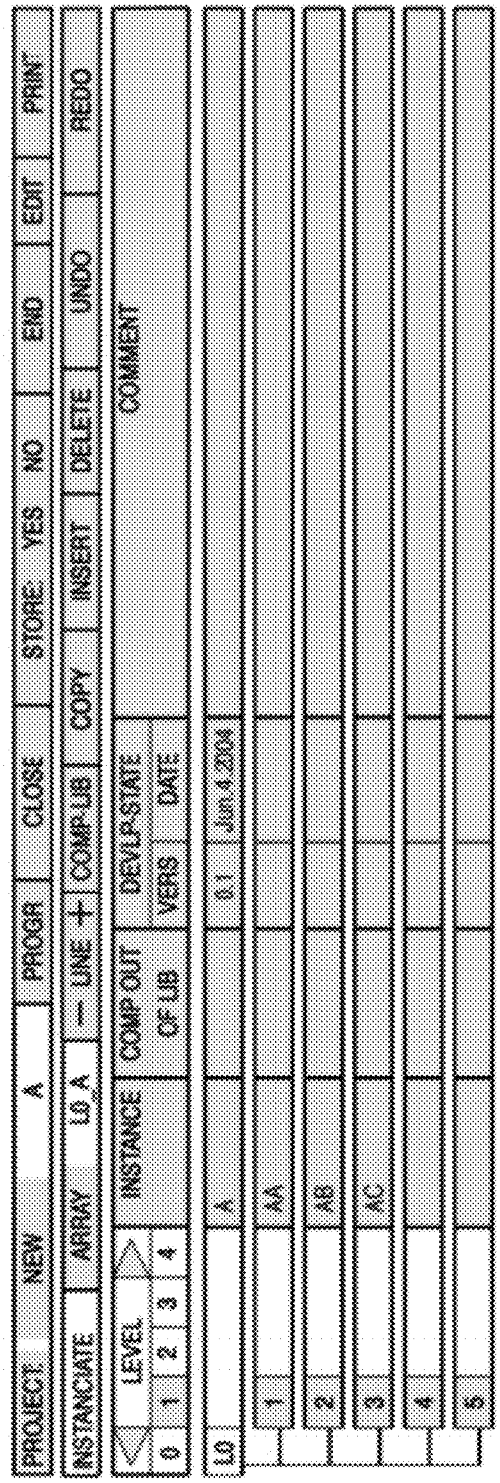
Figure 10C:
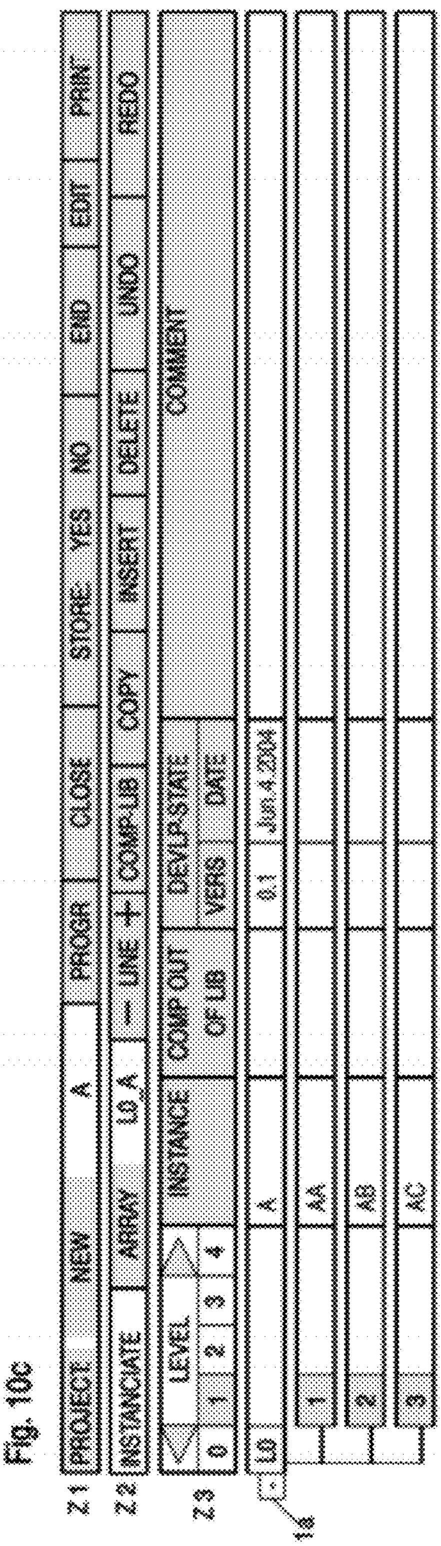
Figure 11:
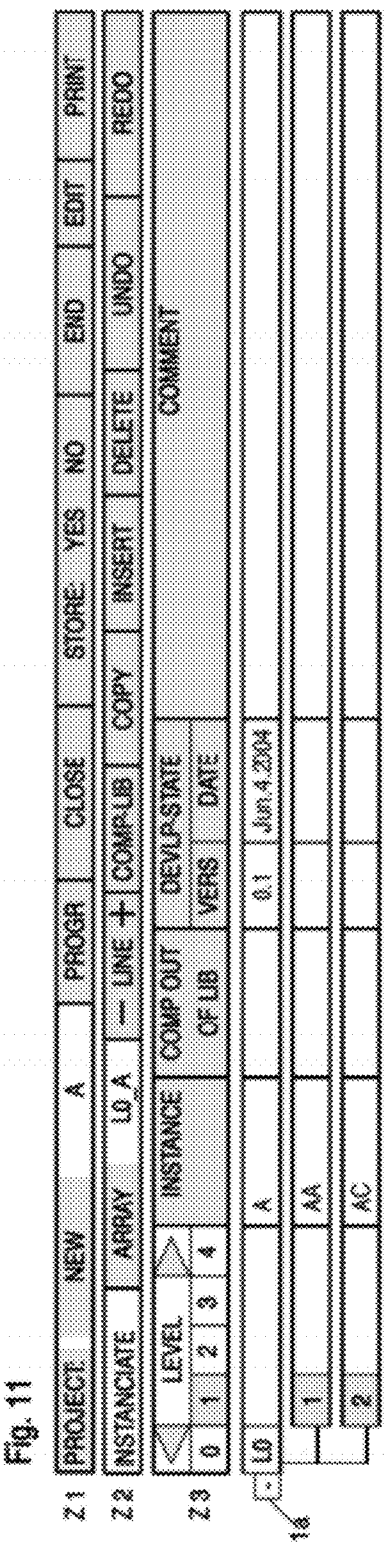
Figure 12A:
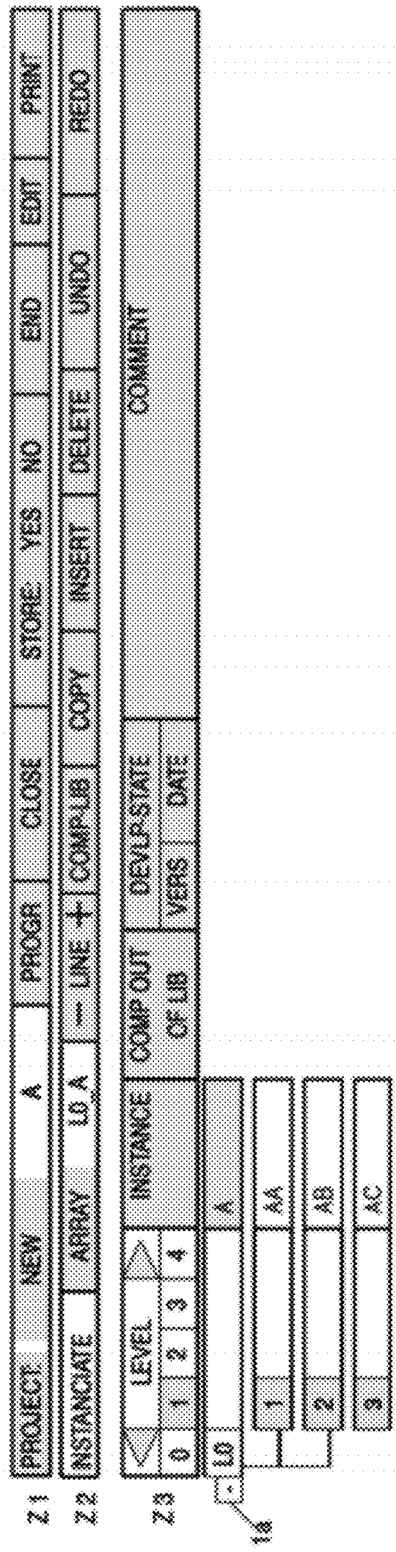
Figure 12B:
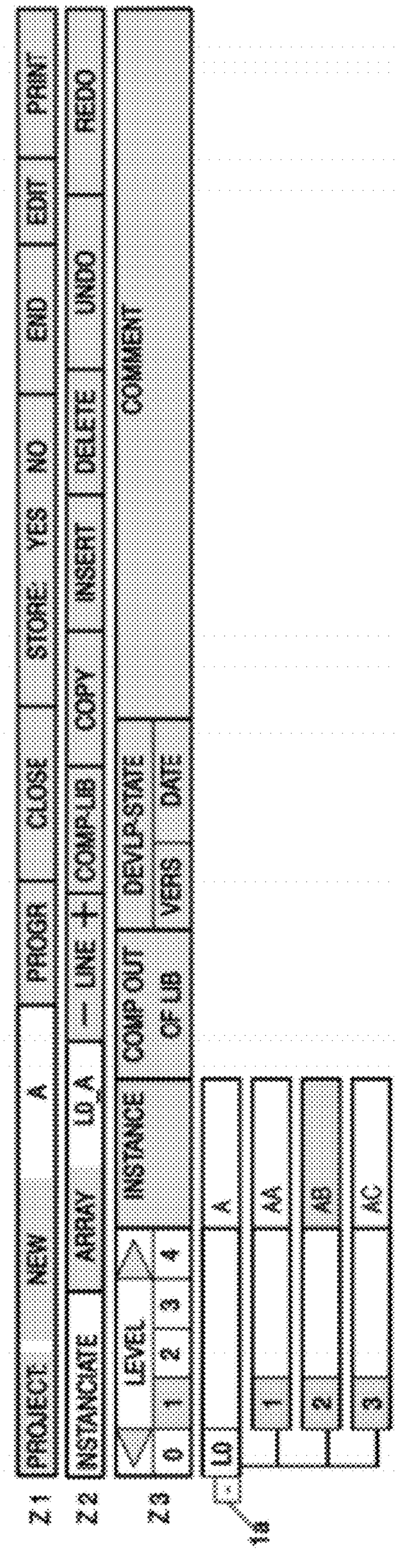
Figure 13:
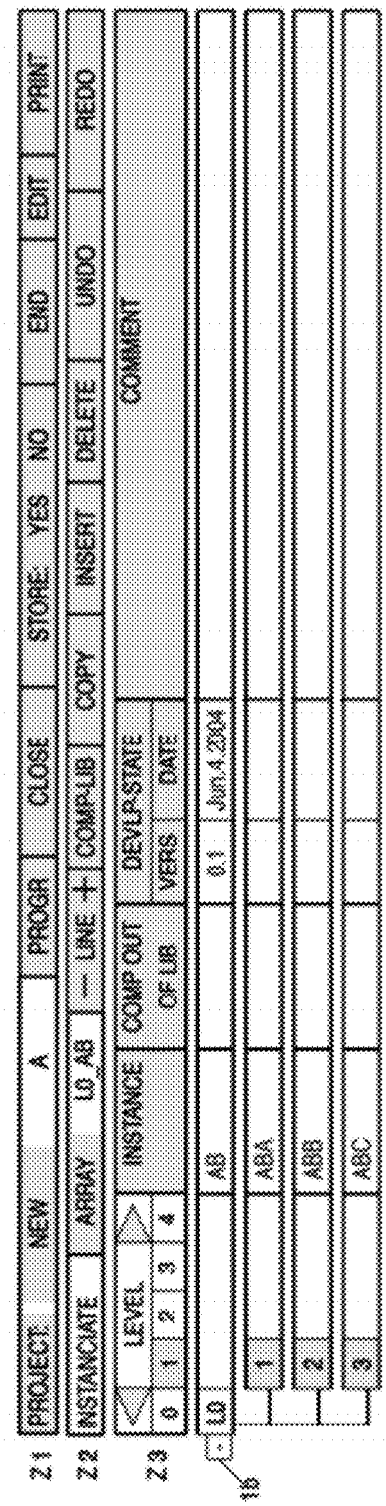
Figure 22:
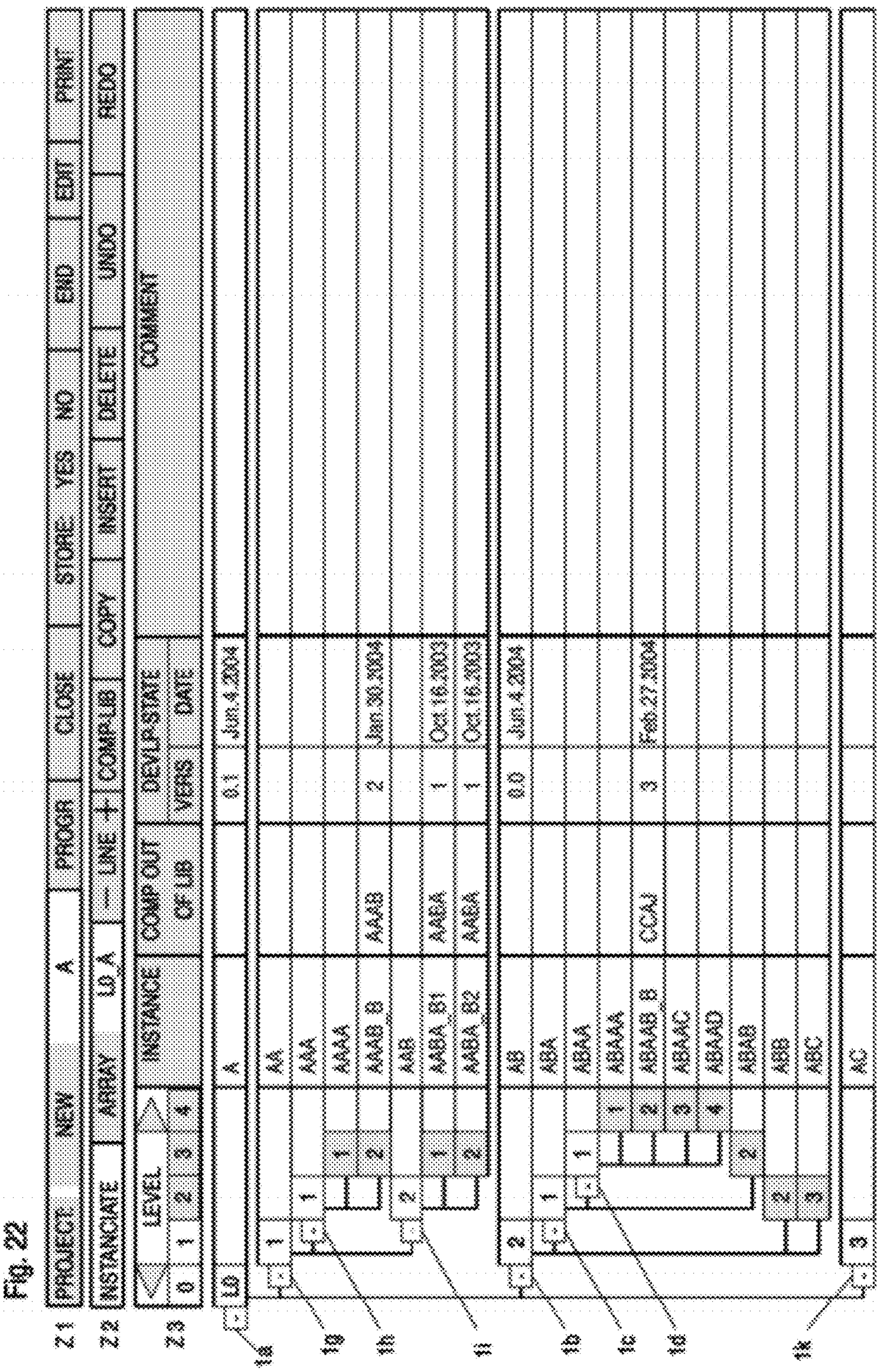
Figure 23:
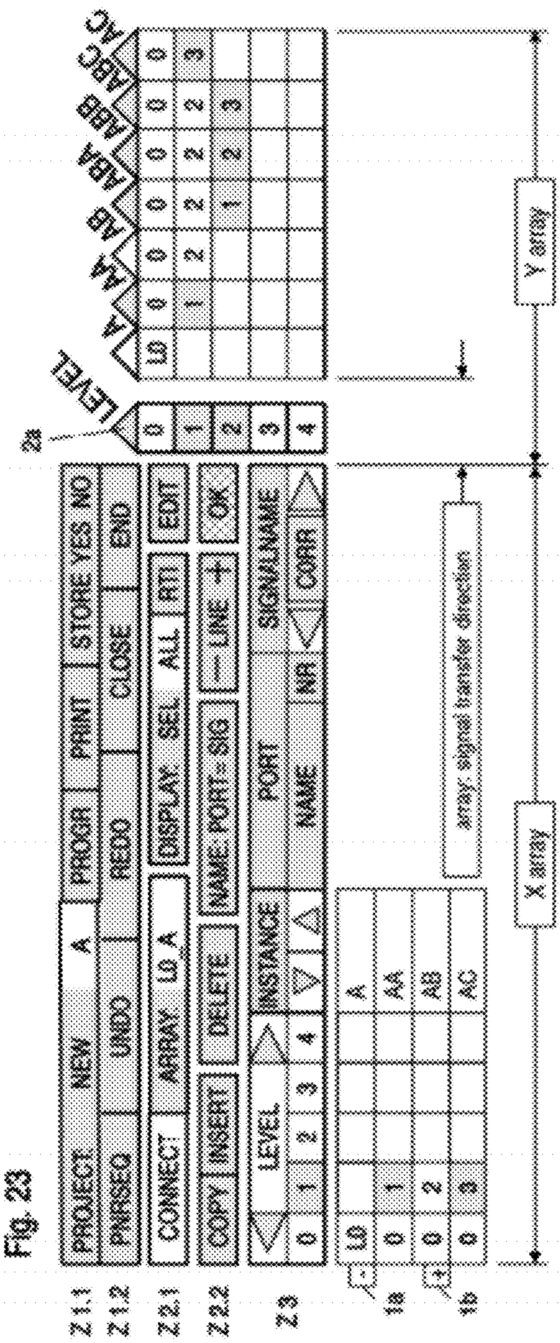
Figure 24:
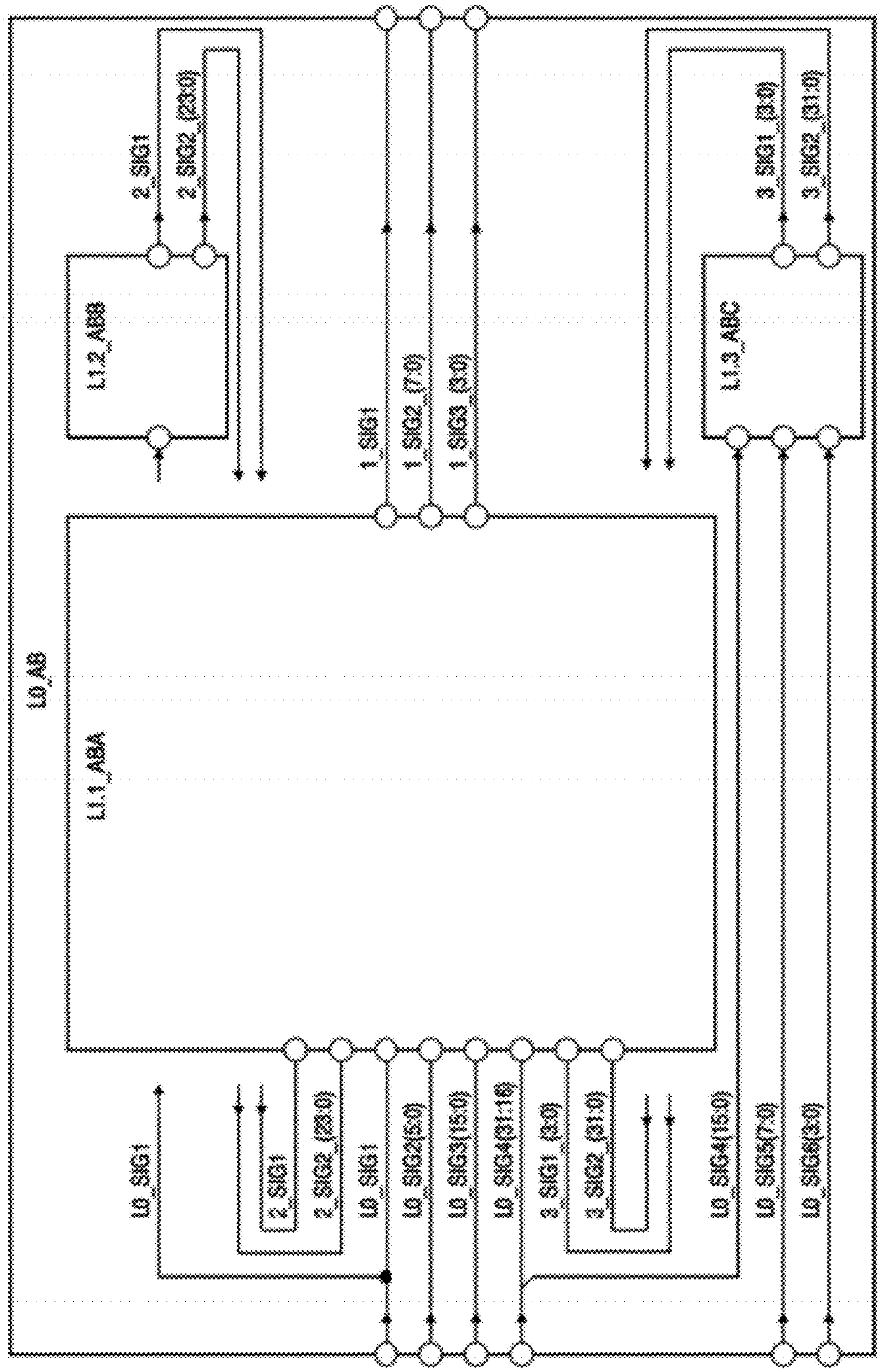
Figure 25A:
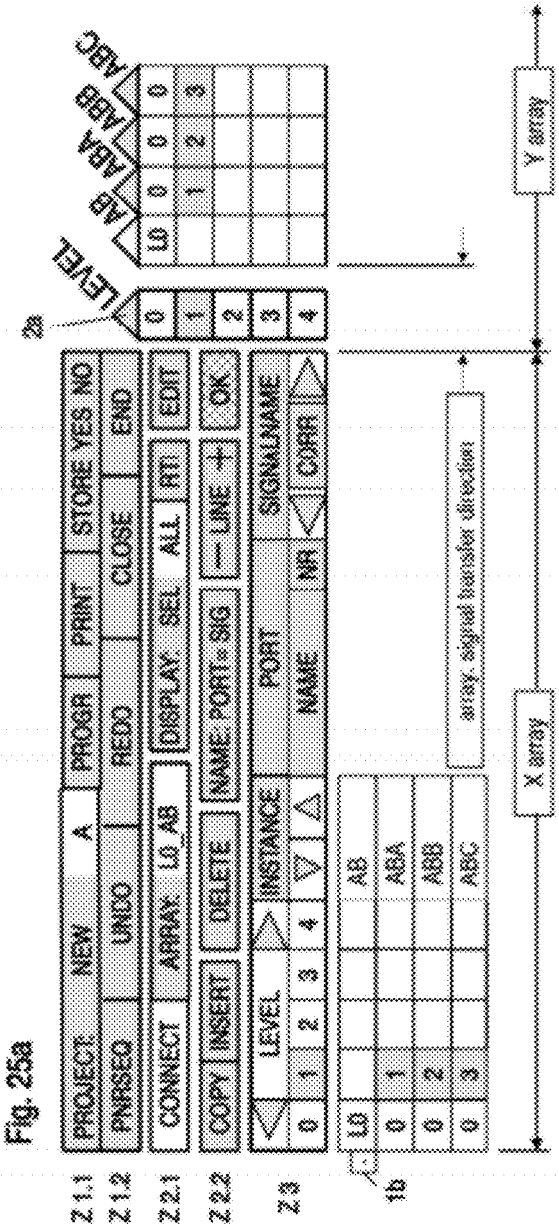
Figure 32A:
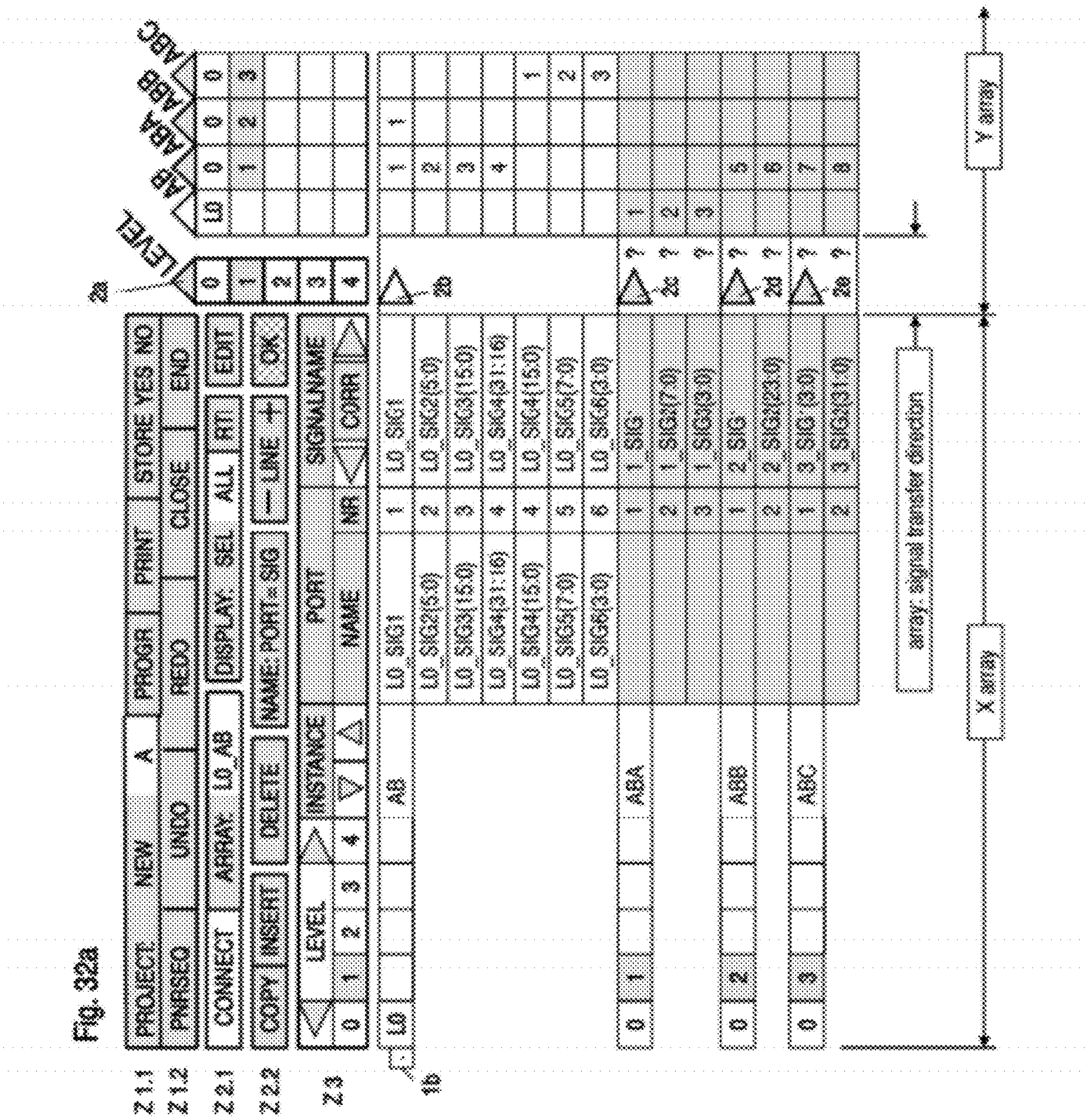
Figure 32B:
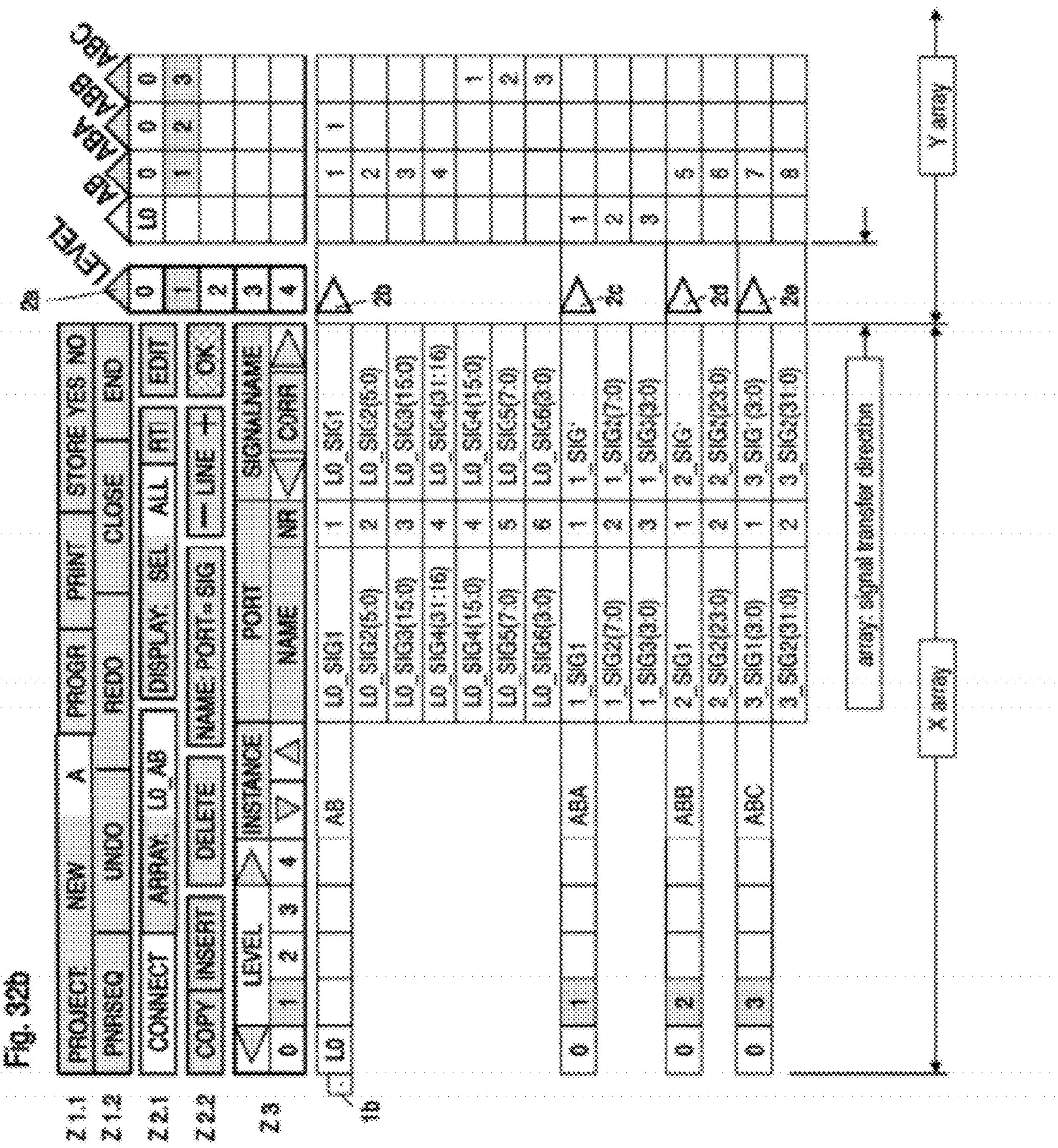
Figure 33:
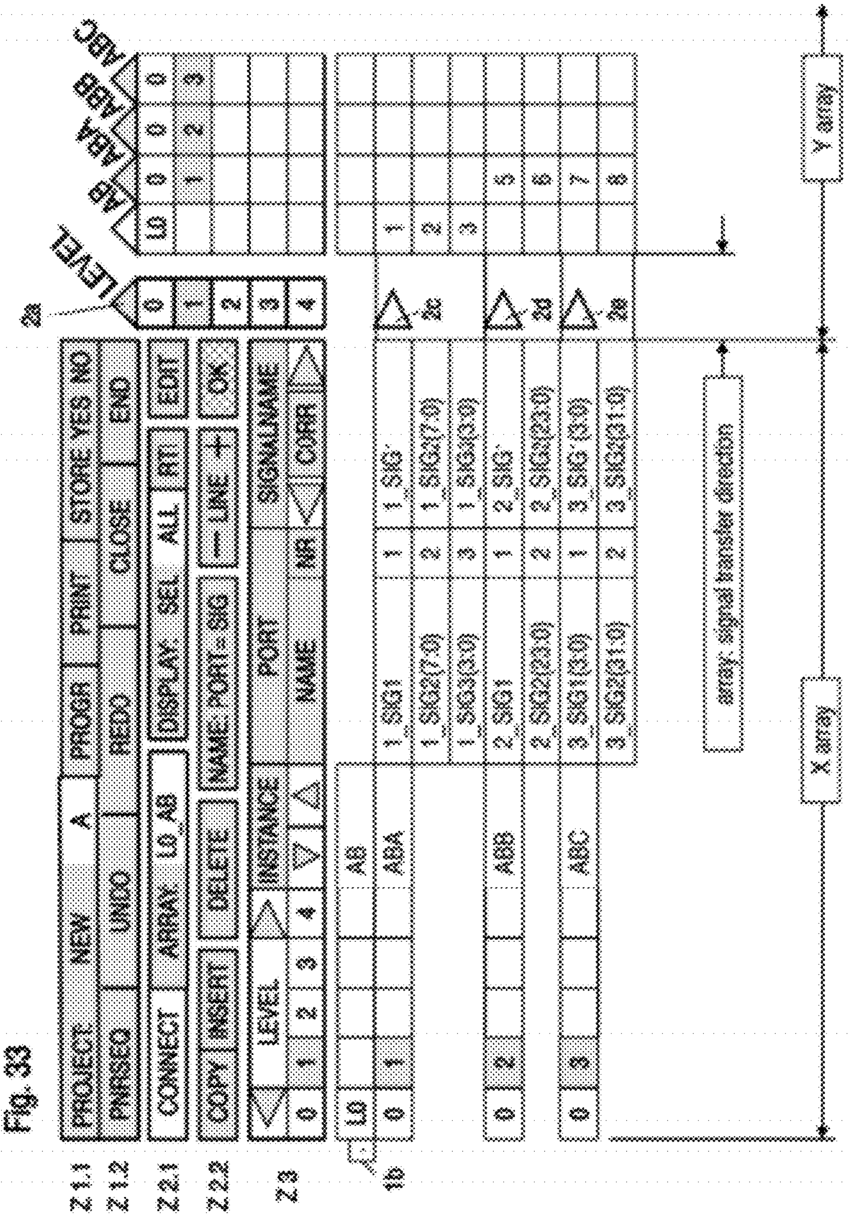
Figure 34:
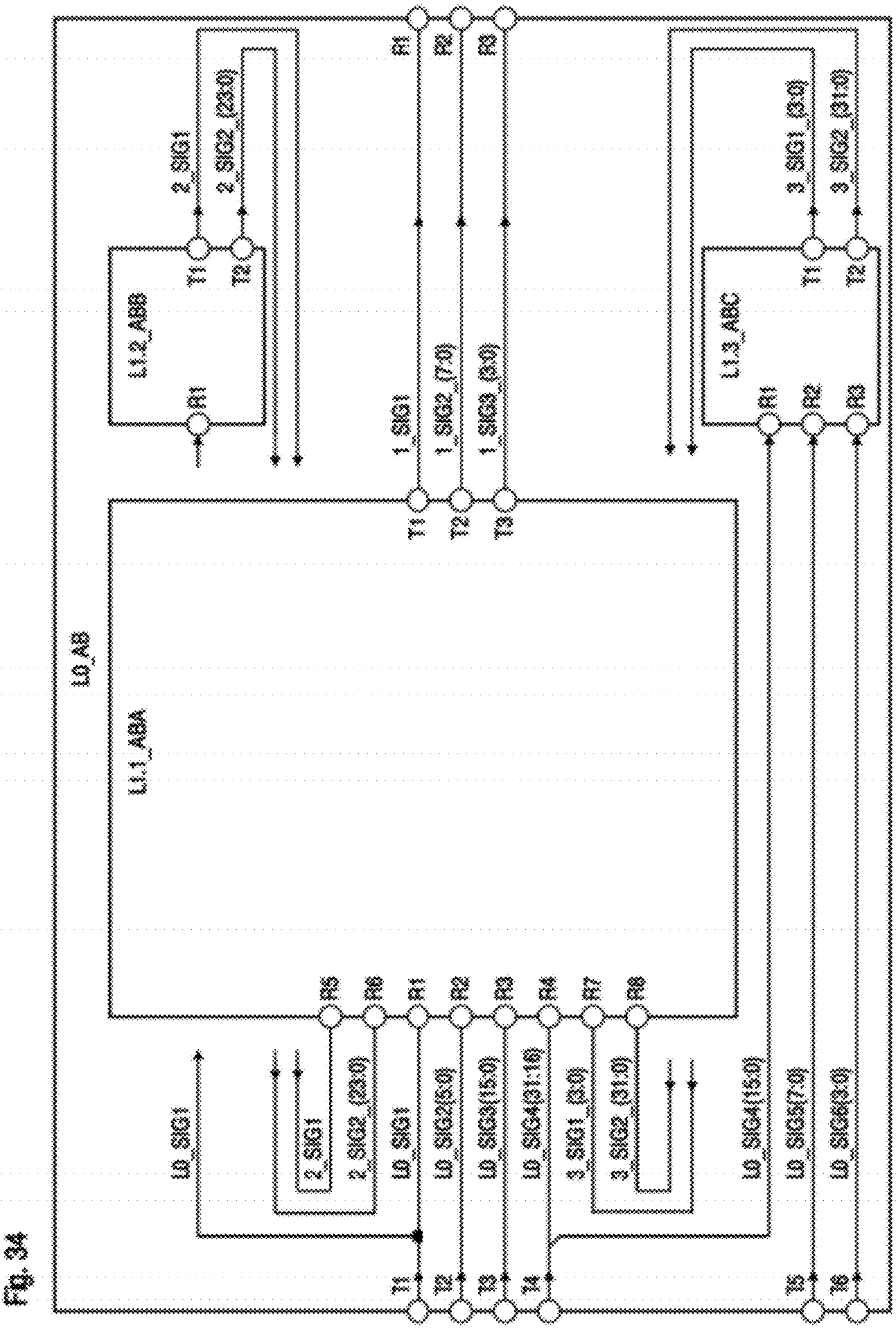
Figure 35:
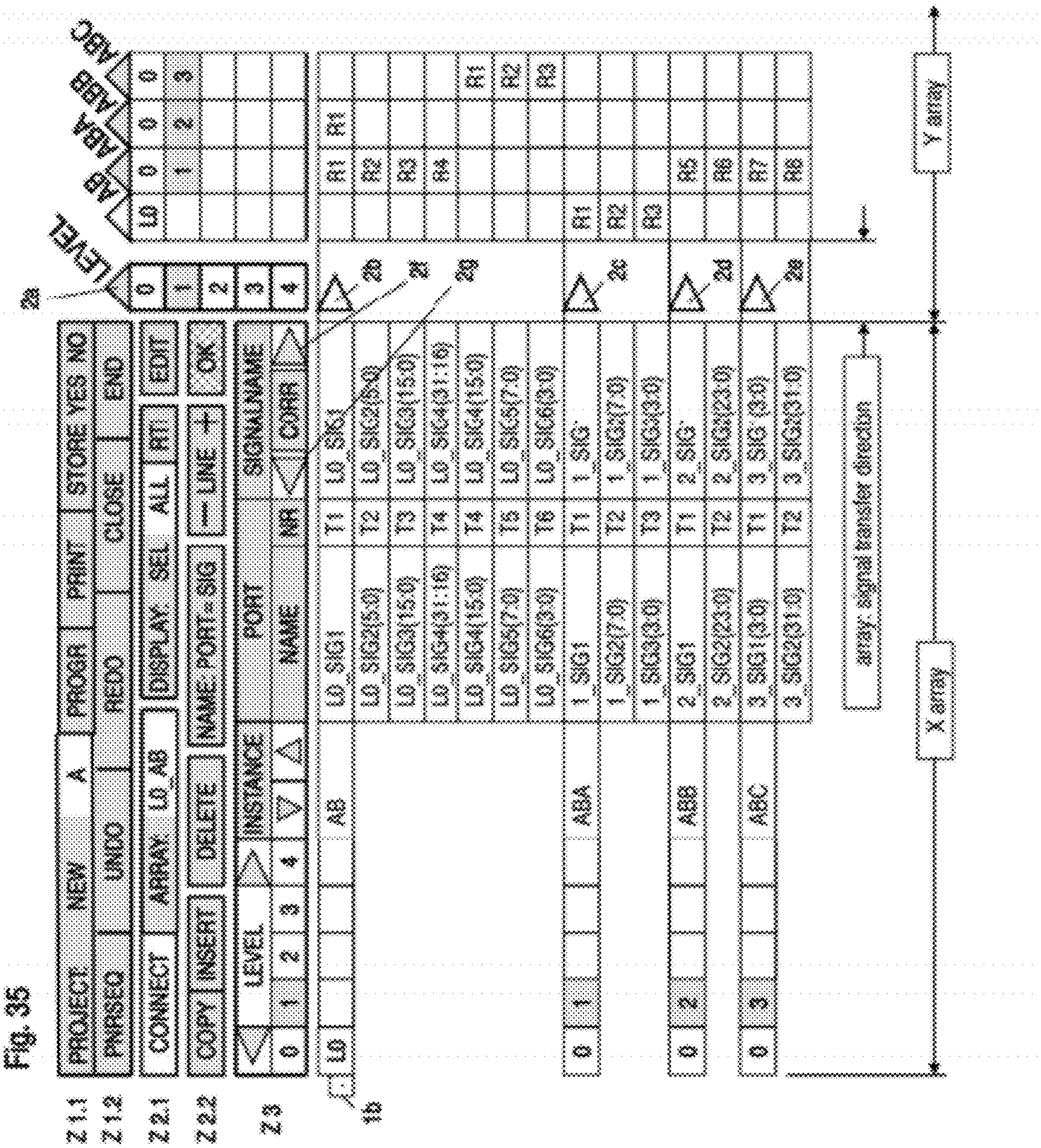
Figure 36A:
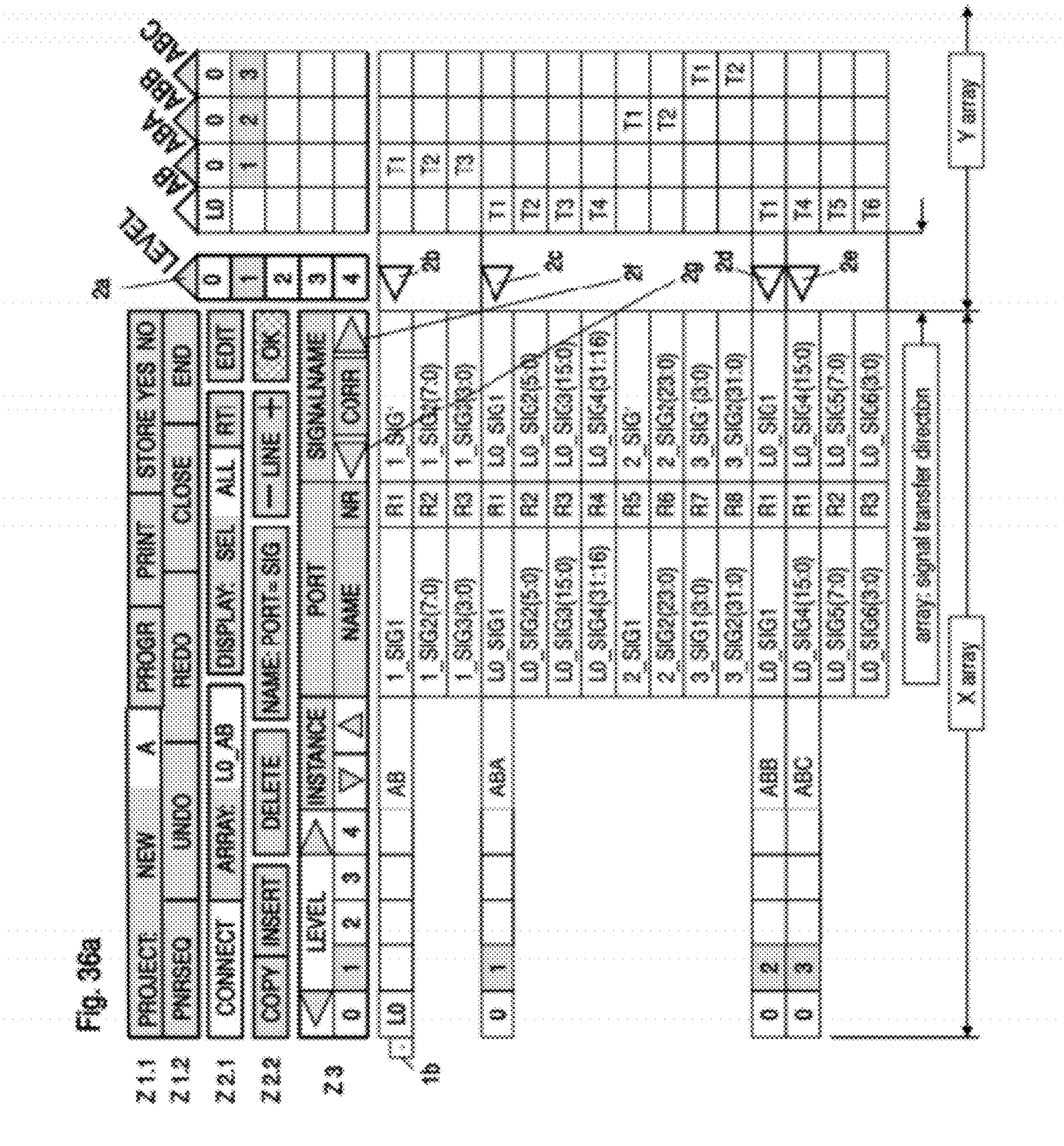
Figure 36B:
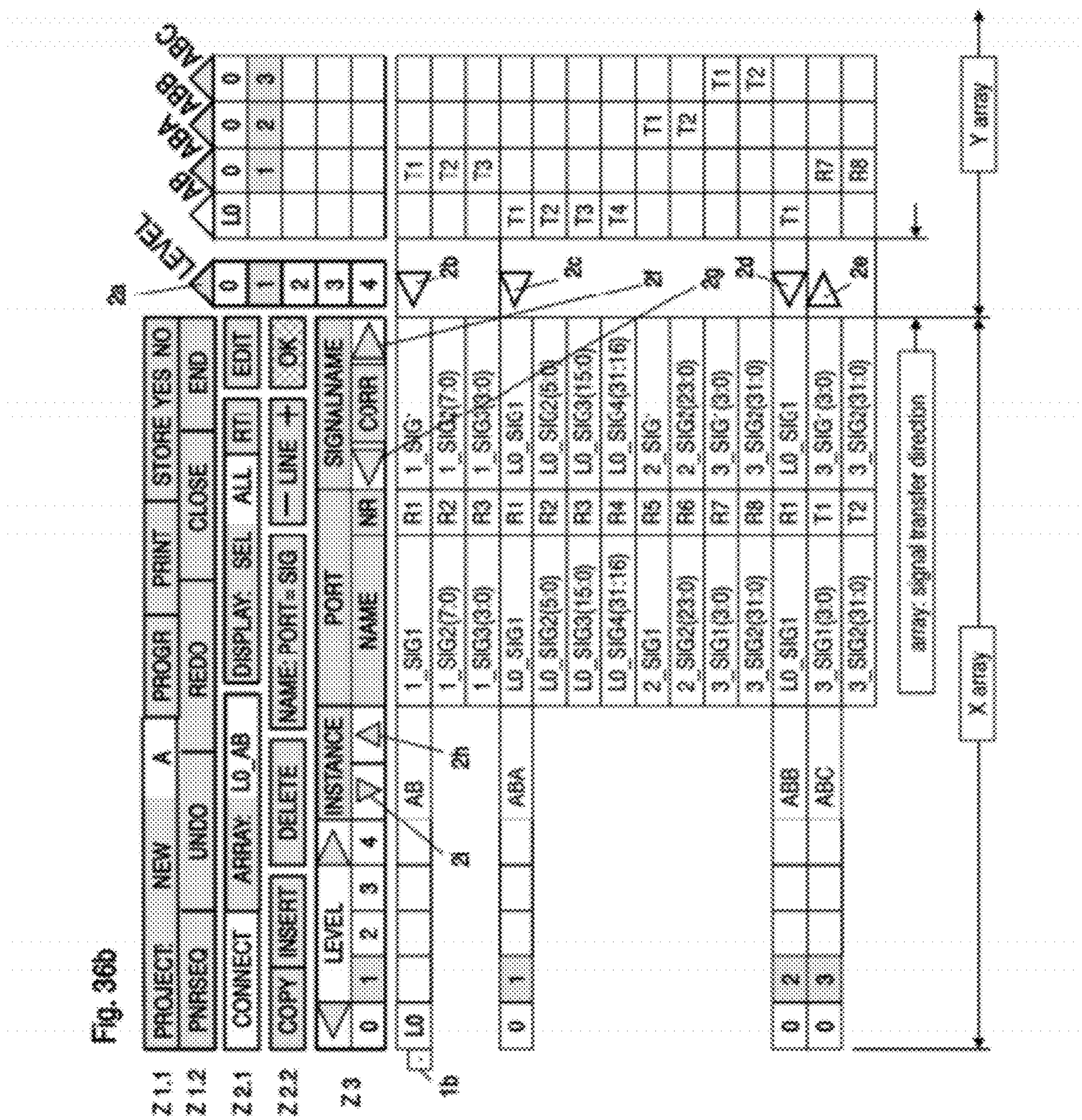
Figure 37:
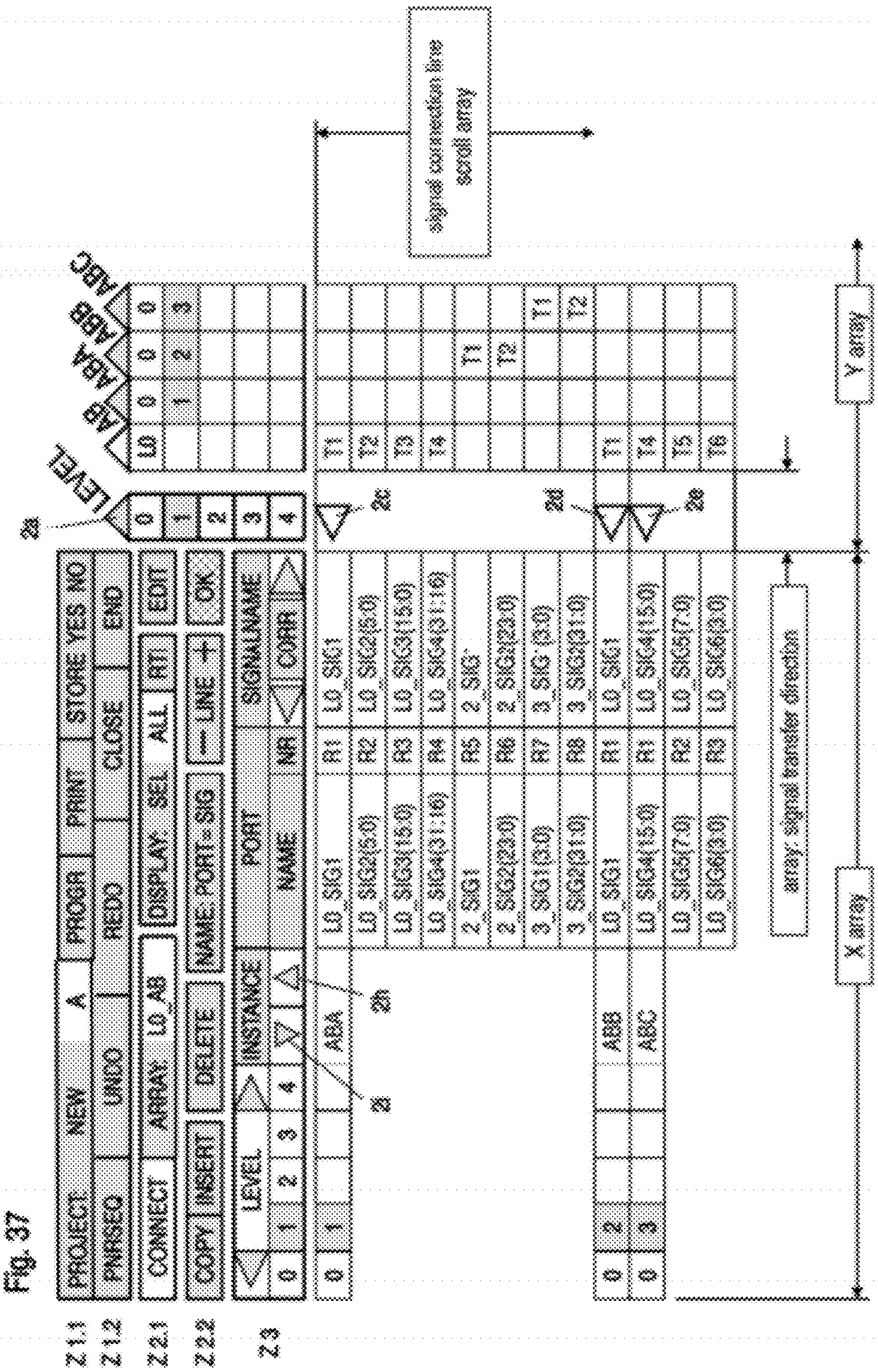
Figure 38:
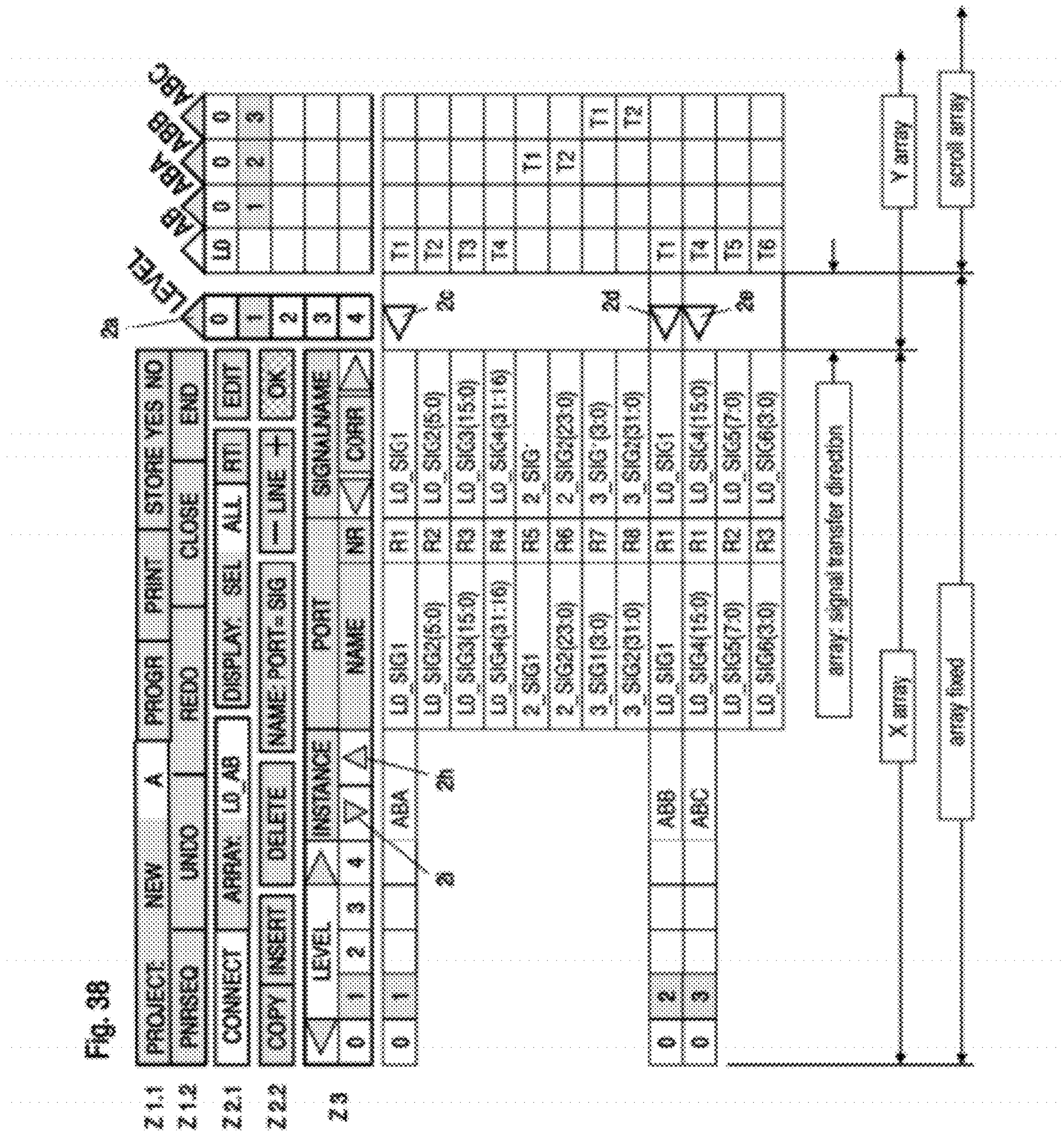
Figure 39:
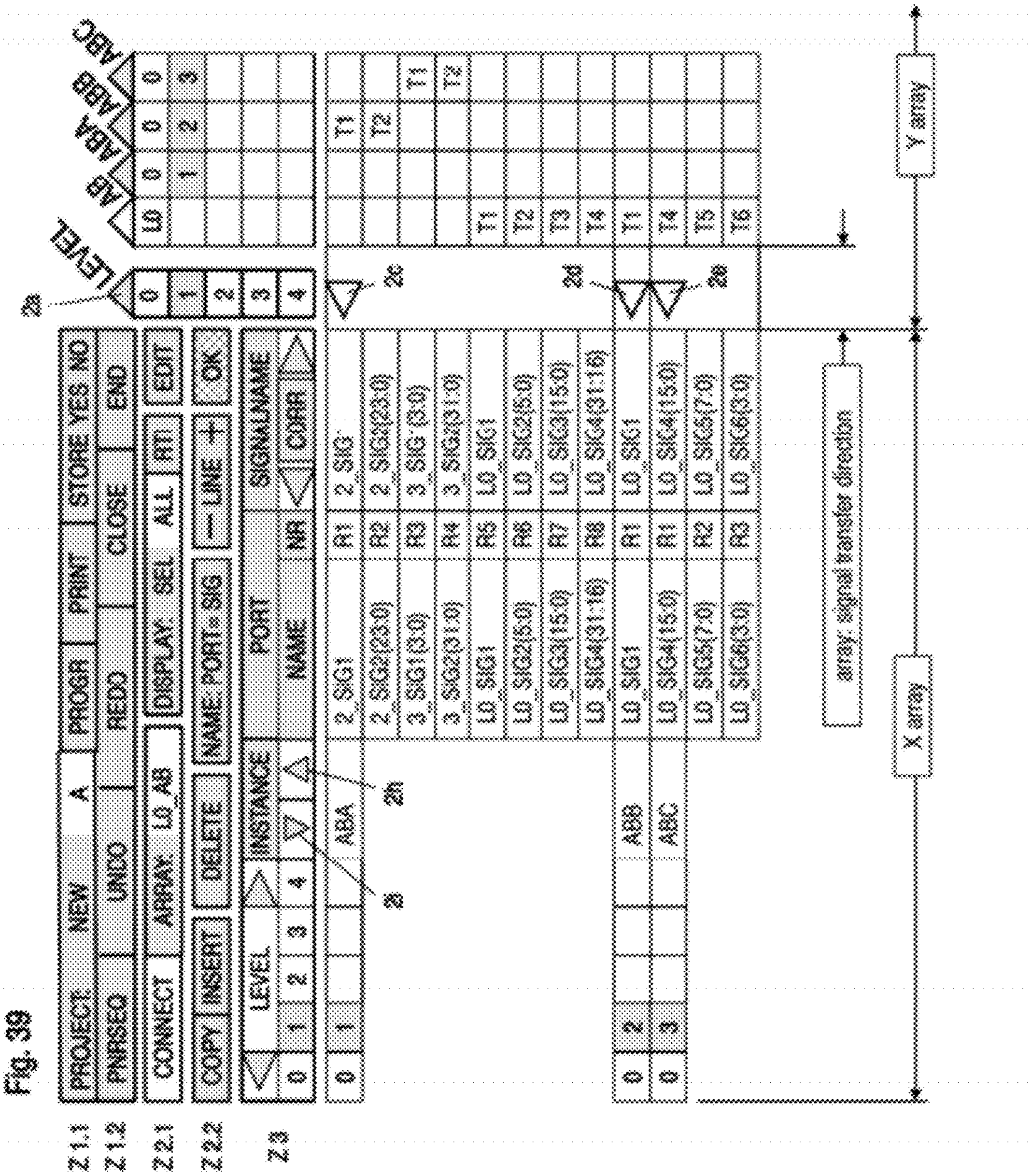
Figure 40:
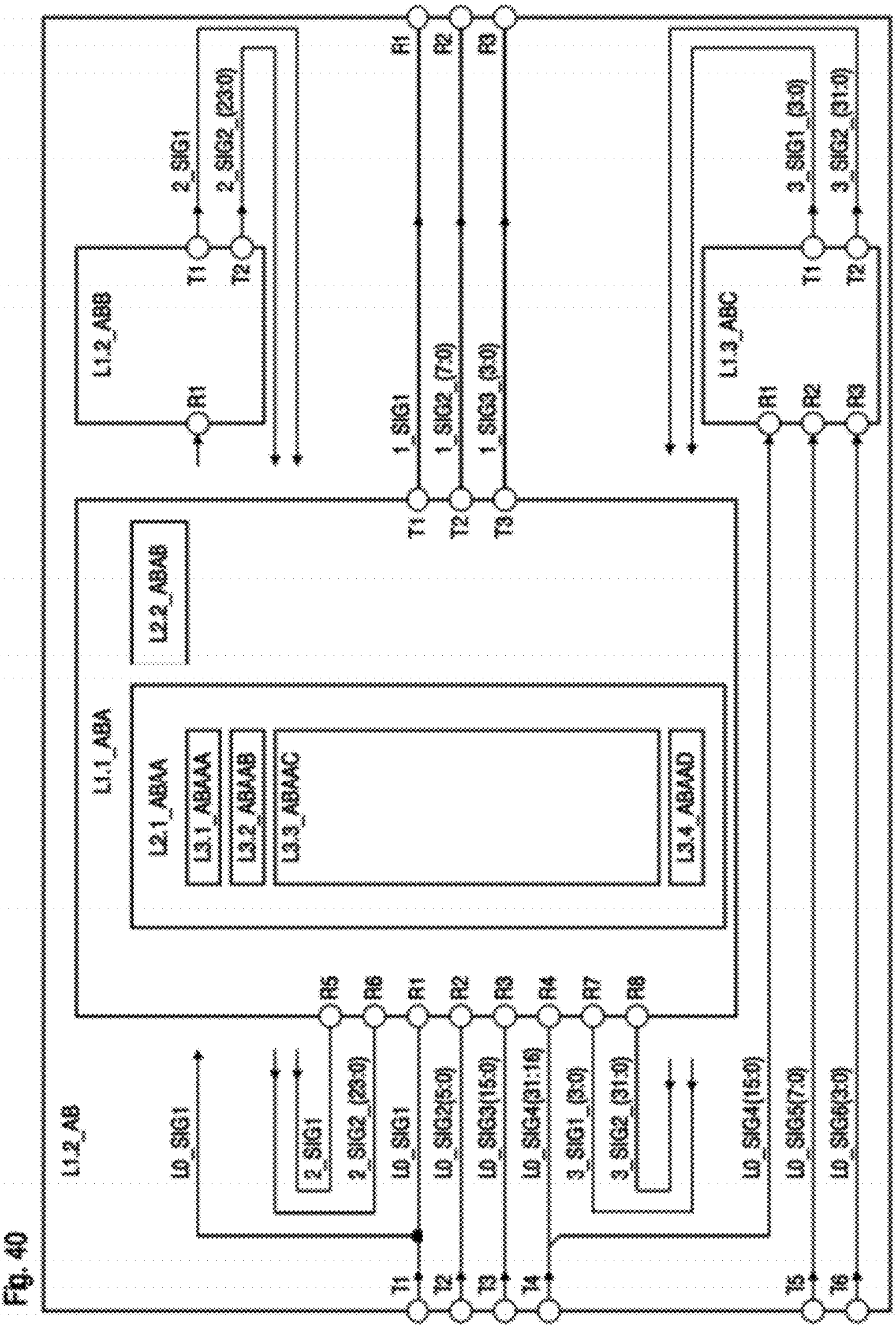
Figure 41A:
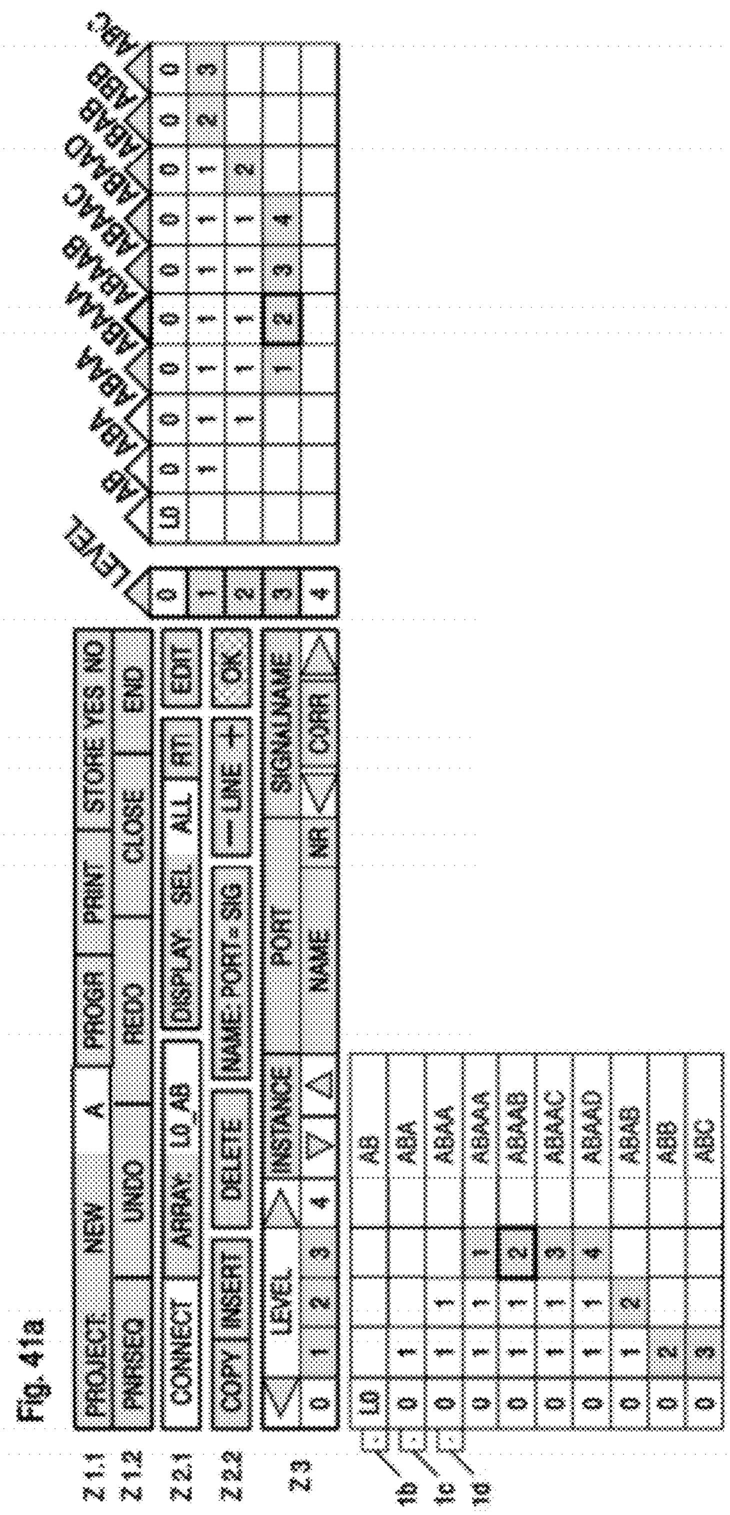
Figure 41B:
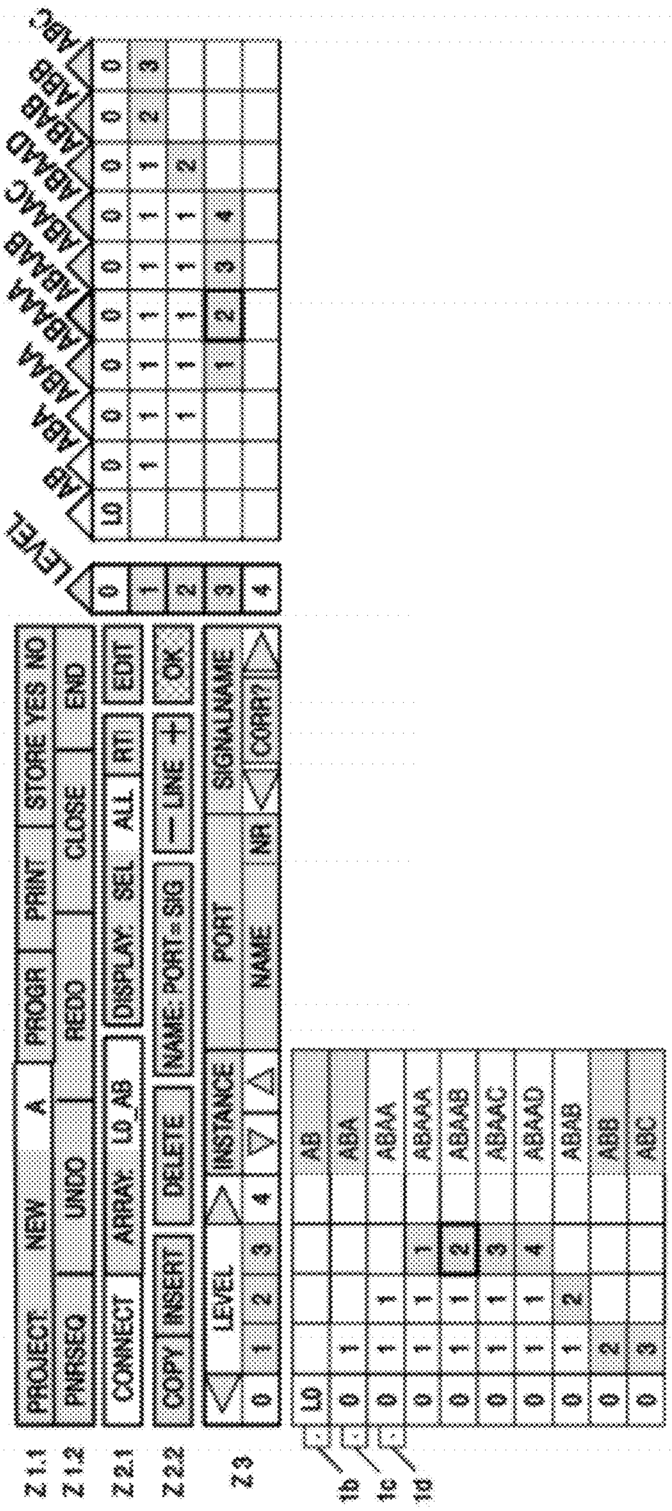
Figure 42:
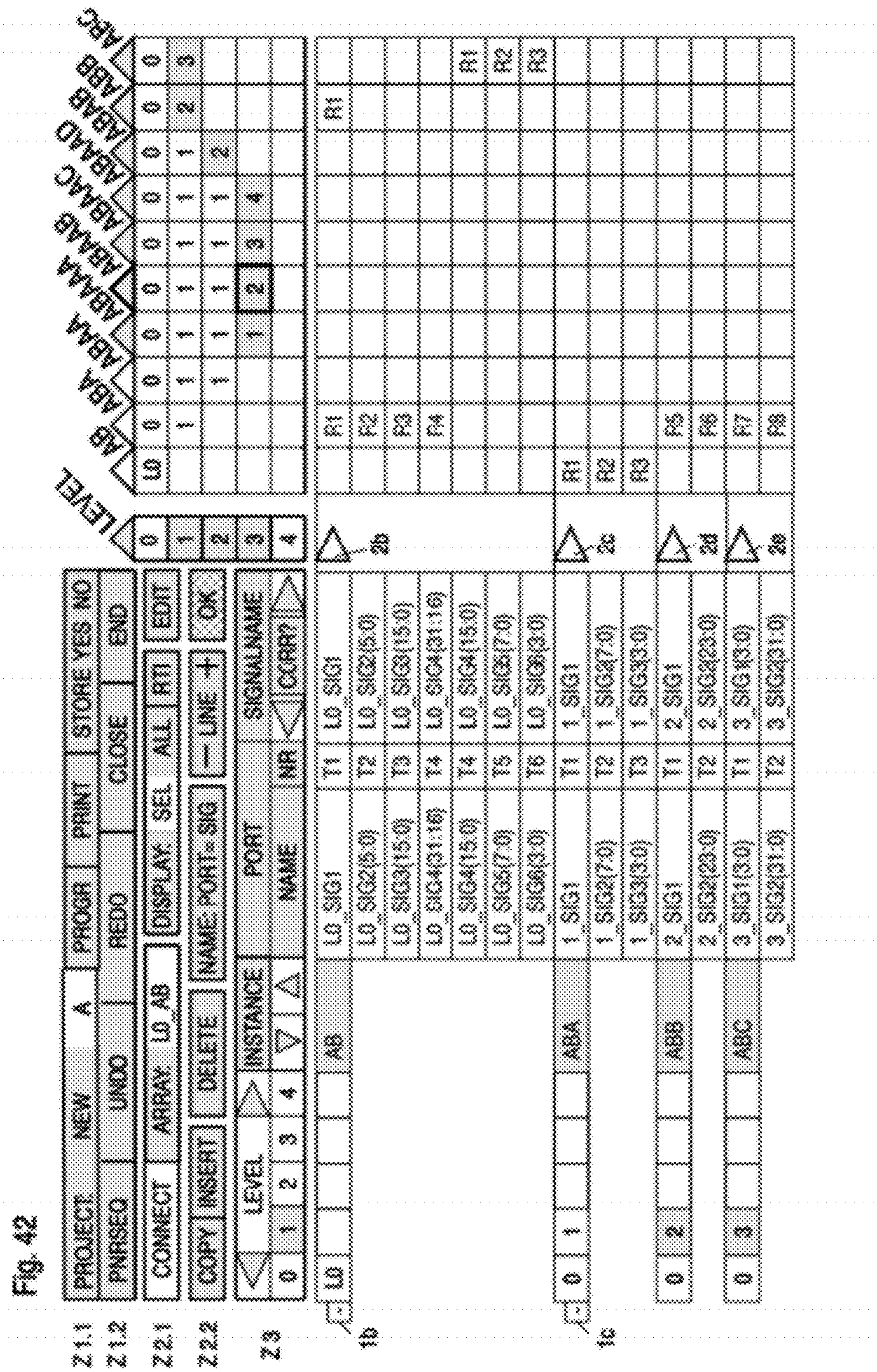
Figure 43A:
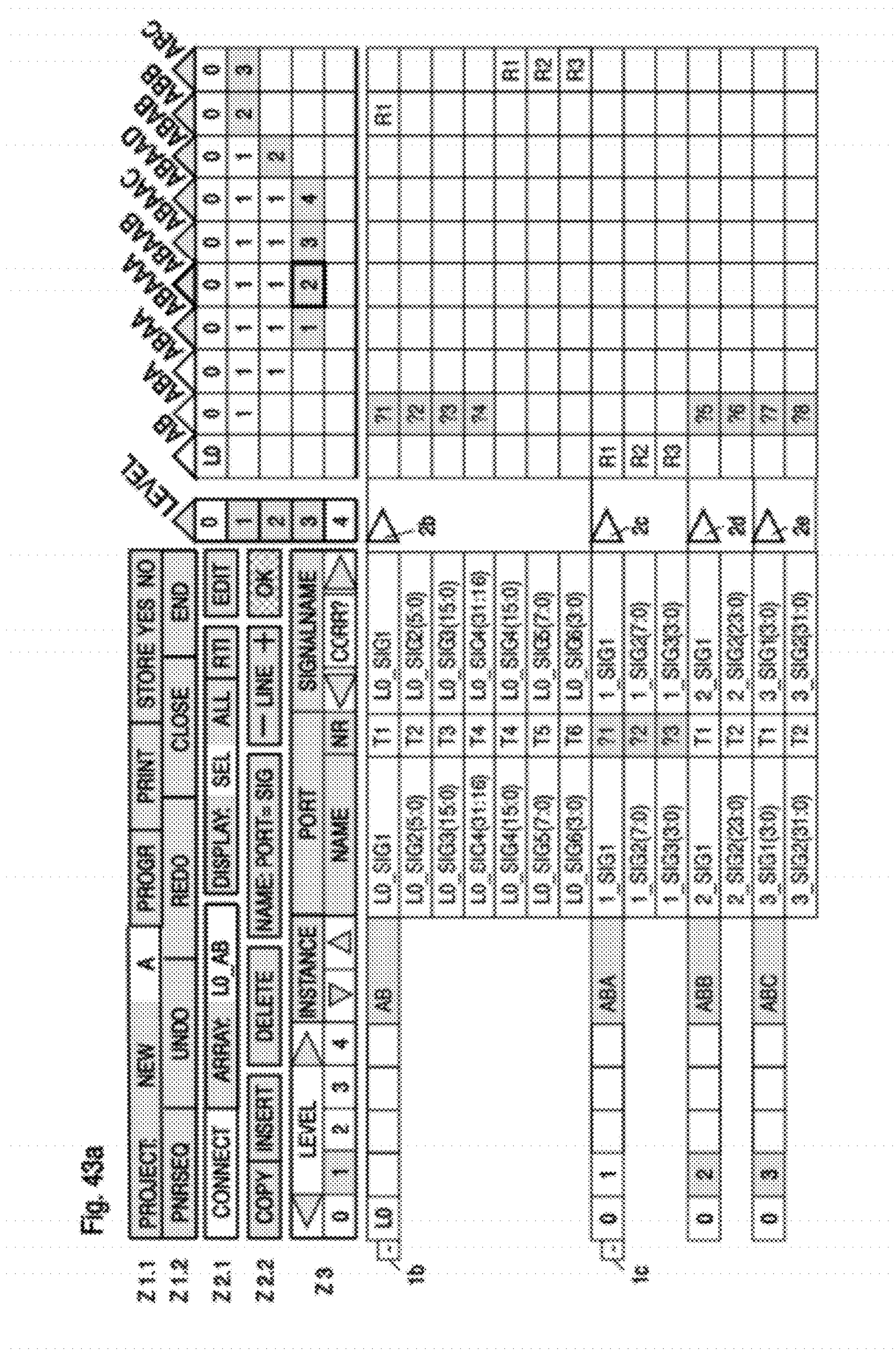

FIG. 10*b* the generation of instance lines with manual entry of instances "AA", "AB" and "AC";

FIG. 10c the acknowledgement of the instantiation of components "AA", "AB" and "AC" and the deletion of the surplus instance lines;

FIG. 11 the display "INSTANCIATE" after deletion of instance line "AB";

FIG. 12a-12b the preparation of a change of top level from "A" to "AB";

FIG. 13 the display "INSTANCIATE" after acknowledgement of top level change from "A" to "AB";

FIG. 14-21 the instantiation of components and their sub instances under top level "AB" and the use of functions of the display "INSTANCIATE" inclusive the edit functions;

FIG. 22 in display "INSTANCIATE" the instantiation of components "AA", "AB" and "AC" with their sub instances in top level "A";

FIG. 23 the display "CONNECT" after opening, with the top level "A" with its instances "AA", "AB" and "AC" in the X-/Y array and the sub instances "ABA", "ABB" and "ABC" of instance "AB" in the Y array;

FIG. 24 the top level "AB" with its instances "ABA", "ABB" and "ABC" in block structure design;

FIG. 25a the display "CONNECT" with top level "AB" and its instances "ABA", "ABB" and "ABC";

FIG. 25b-32b the specification of the connections in display "CONNECT" corresponding to the block structure of FIG. 24;

FIG. 33 the transmit ports AB which are switched off compared to FIG. 32b;

FIG. 34 the illustration of block structure of FIG. 24, together with port notations separated for transmit ports "T" and receive ports "R";

FIG. 35 in display "CONNECT" the notations of transmit ports with "T" in X array and the receive ports with "R" in Y array;

FIG. 36a the display "CONNECT" with the transmit ports in Y array and the receive ports in X array;

FIG. 36b compared to FIG. 36a the selective switch over of the direction of signal transmission for the instance "ABC" with transmit ports in X array and receive ports in Y array;

FIG. 37 the display "CONNECT" with switched off top level "AB" compared to FIG. 36a and the illustration of the scroll area of the signal connections;

FIG. 38 the illustration of the scroll area for the columns in Y array;

FIG. 39 compared to FIG. 38 an allocation modified by editing of transmit ports for the ABA receive ports;

FIG. 40 compared to FIG. 34 an extended block structure for the top level "AB";

FIG. 41a the display "CONNECT" with the extension by the sub instances "ABAA", "ABAAA", "ABAAB", "ABAAC", "ABAAD" and "ABAB" for the instance "ABA" according to the block structure of FIG. 40. Thereby the ABA transmit/receive ports become transit ports and with that the signal connection gets incomplete. This is automatically shown by a question mark "?" at the button "CORR" in Z3 adjacent to CORR;

FIG. 41b the display "CONNECT" with marks on top level "AB" and on the instances "ABA", "ABB" and "ABC" in the column "INSTANCE" as preparation for a selective illustration of the signal connection between these marked units;

FIG. 42 the selective illustration of the until now specified signal connections by switching from "DISPLAY:ALL" in "Z2.1" to "DISPLAY:SEL";

FIG. 43a the activated button for correction "CORR?" in "Z3", by that the instance extension shown in FIG. 41a for the specification of signal connections is involved and the ABA transmit/receive ports are marked as transit ports with a question mark "?".

Figure 43B:
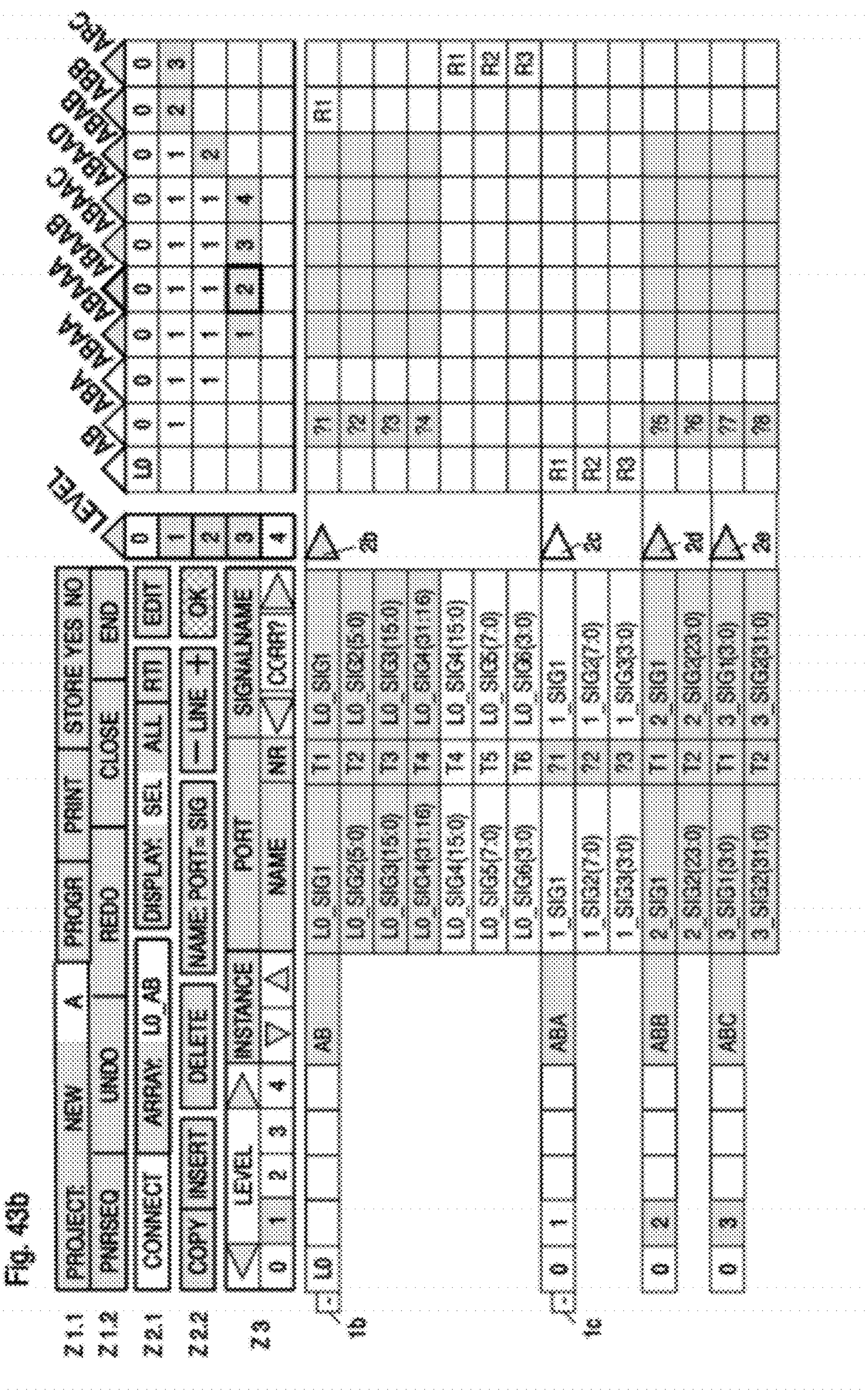
Figure 44:
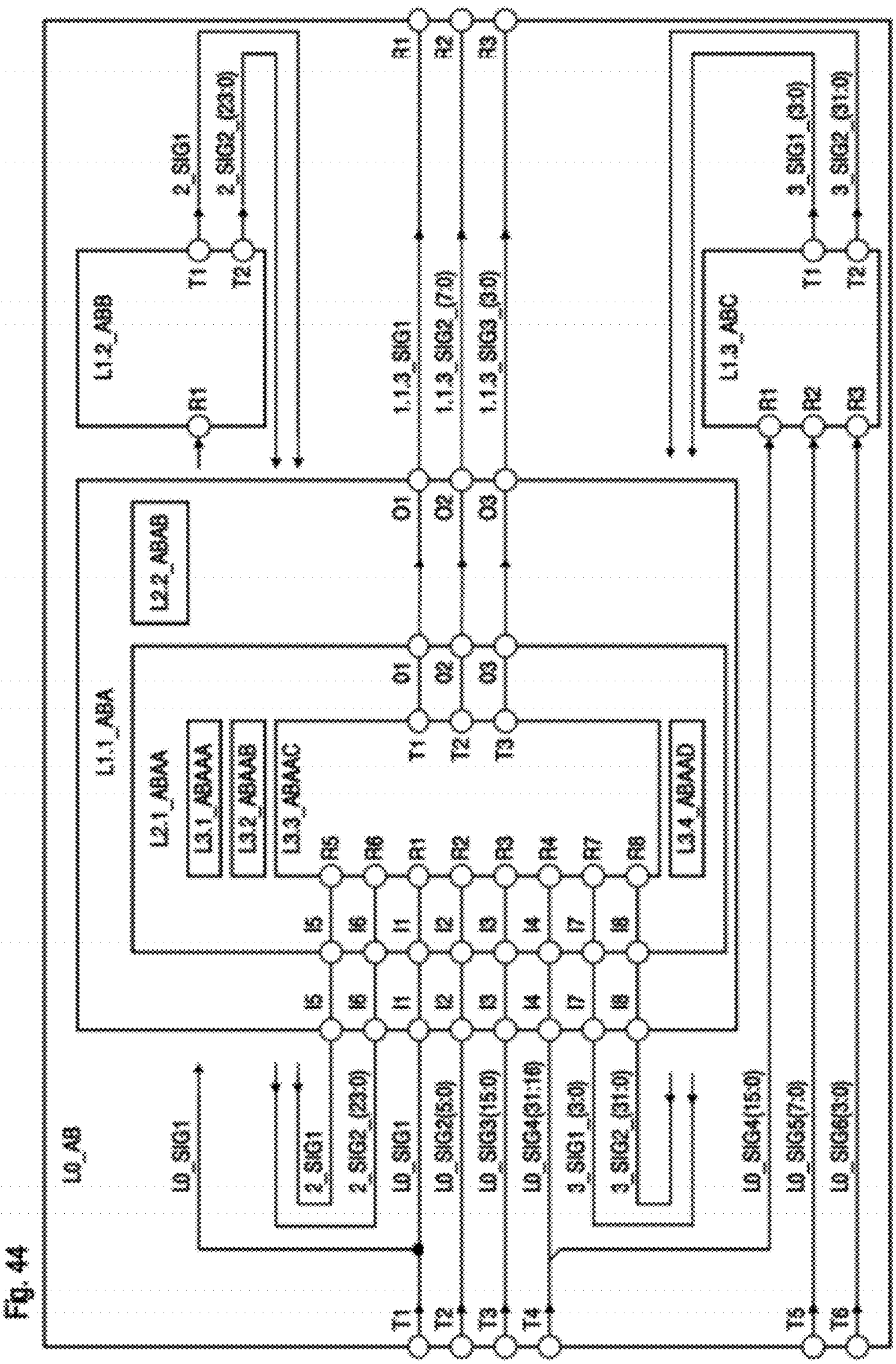
Figure 45:
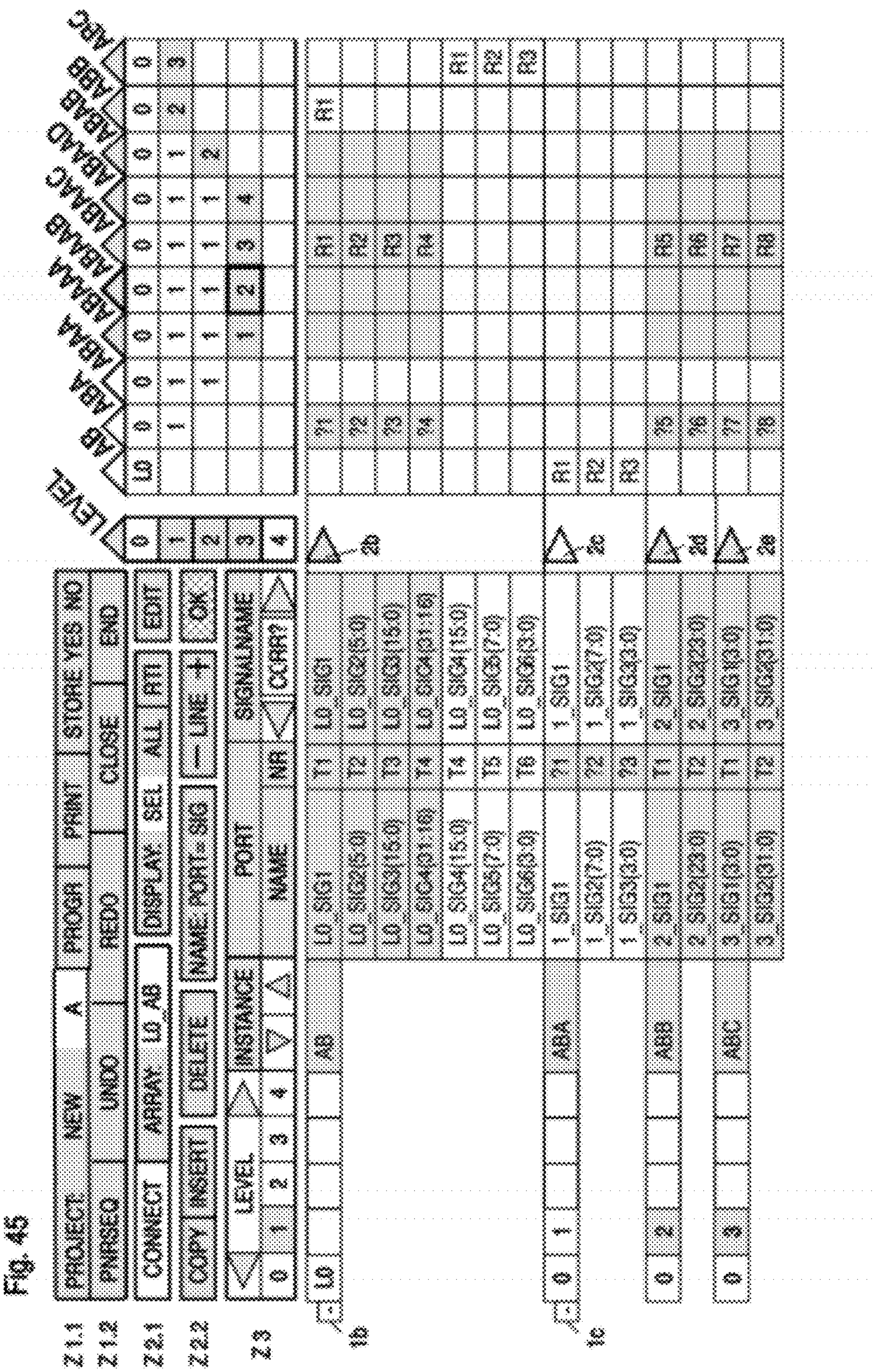
Figure 46:
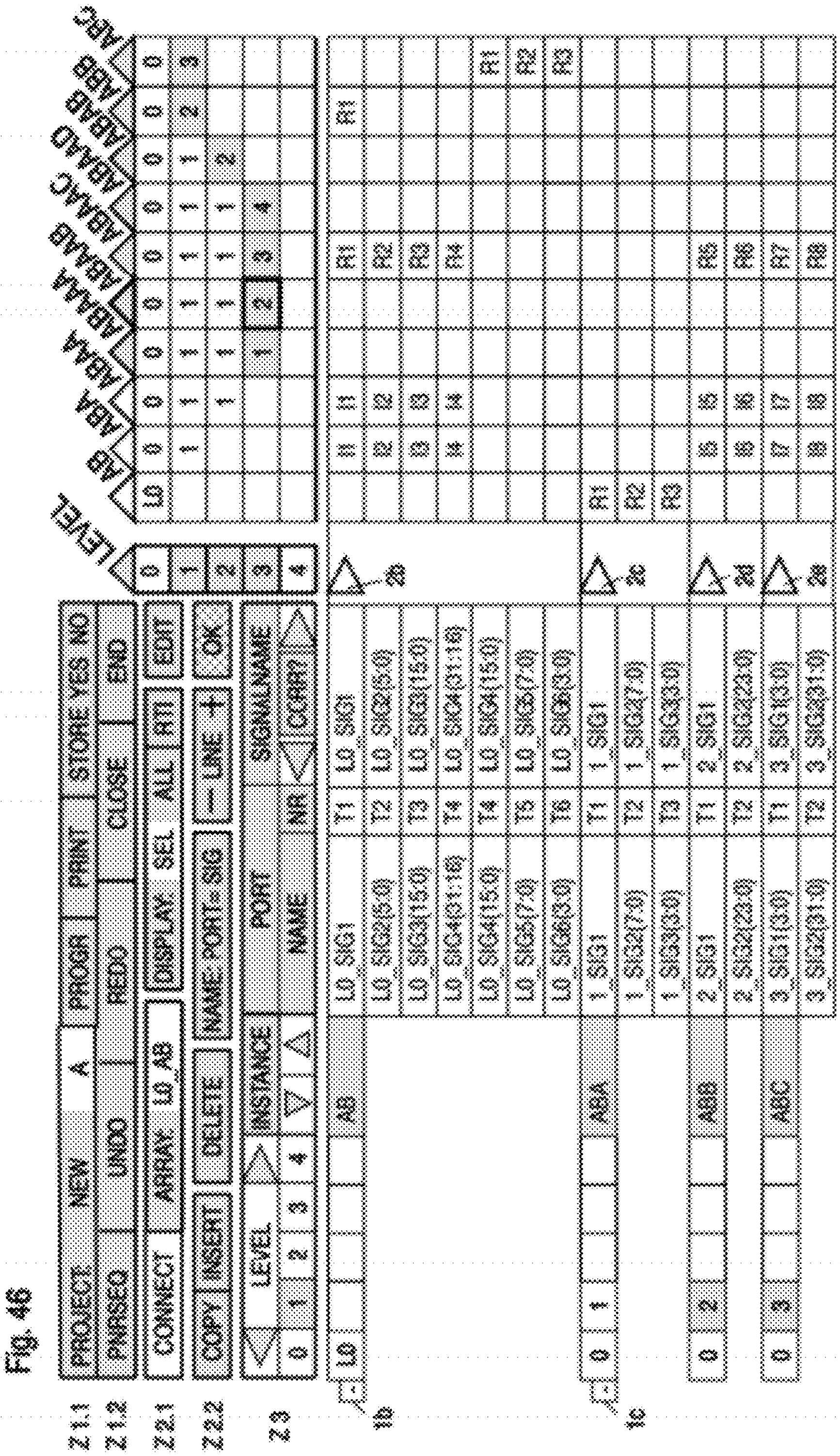
Figure 47:
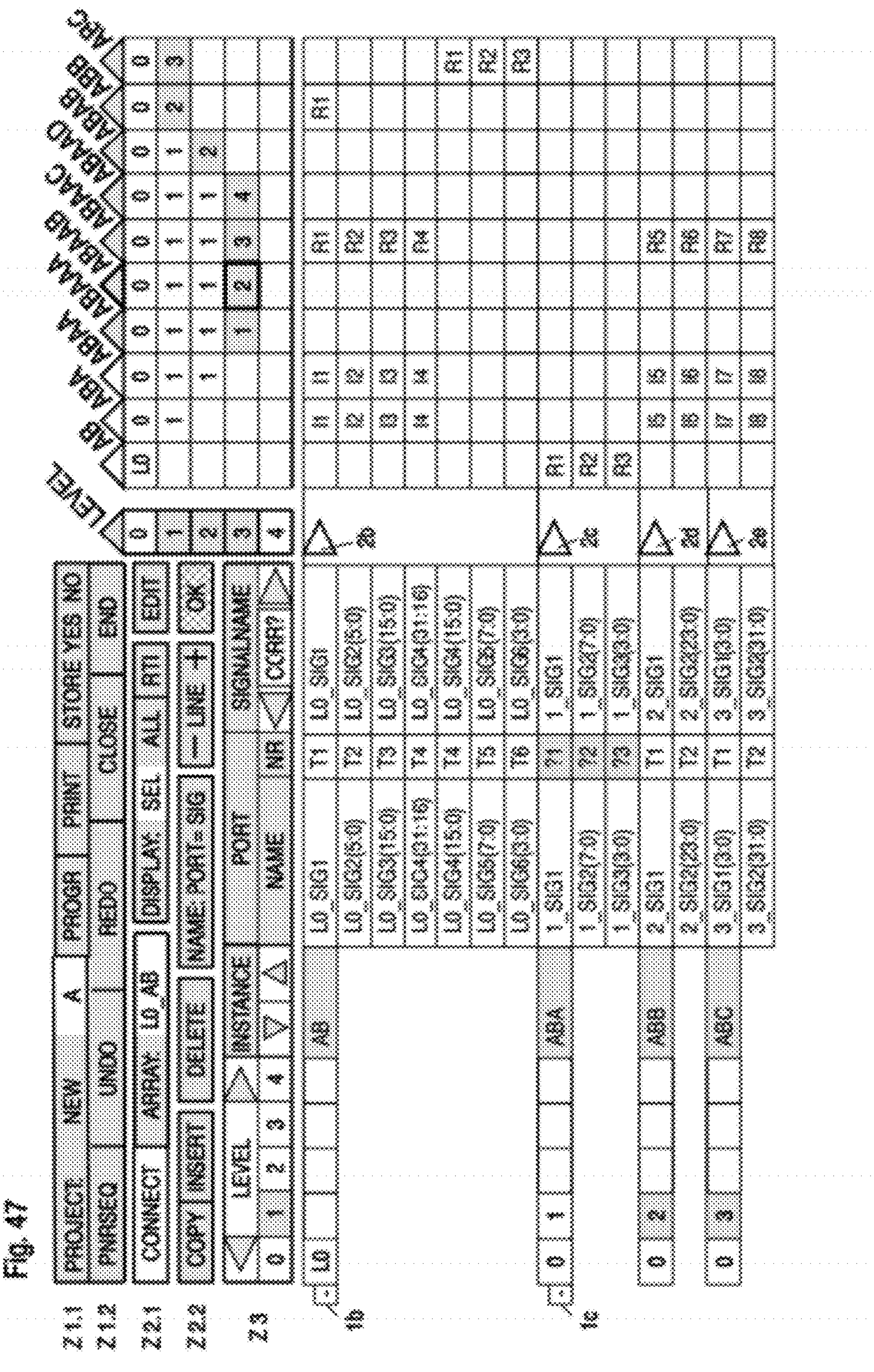
Figure 48:
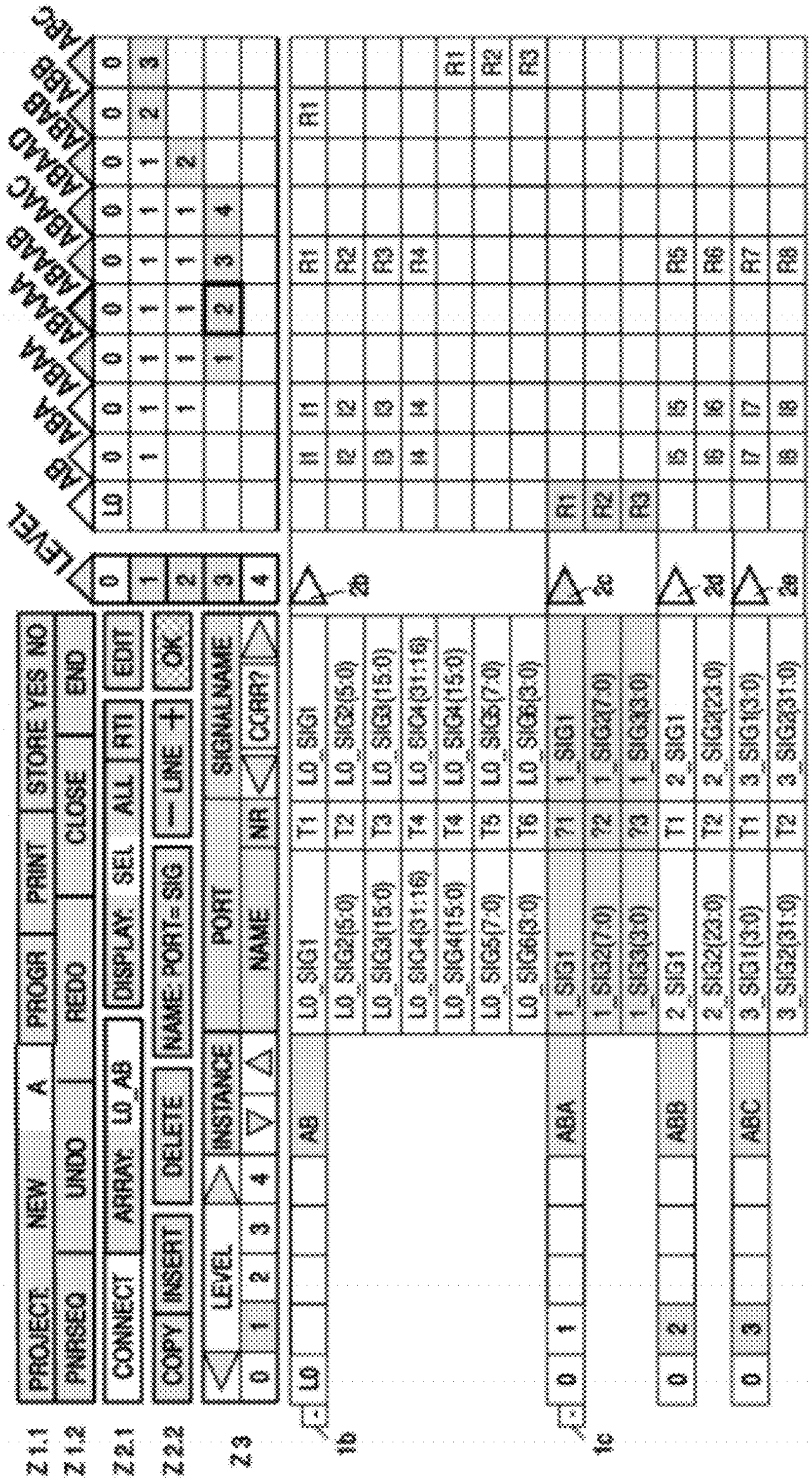
Figure 49:
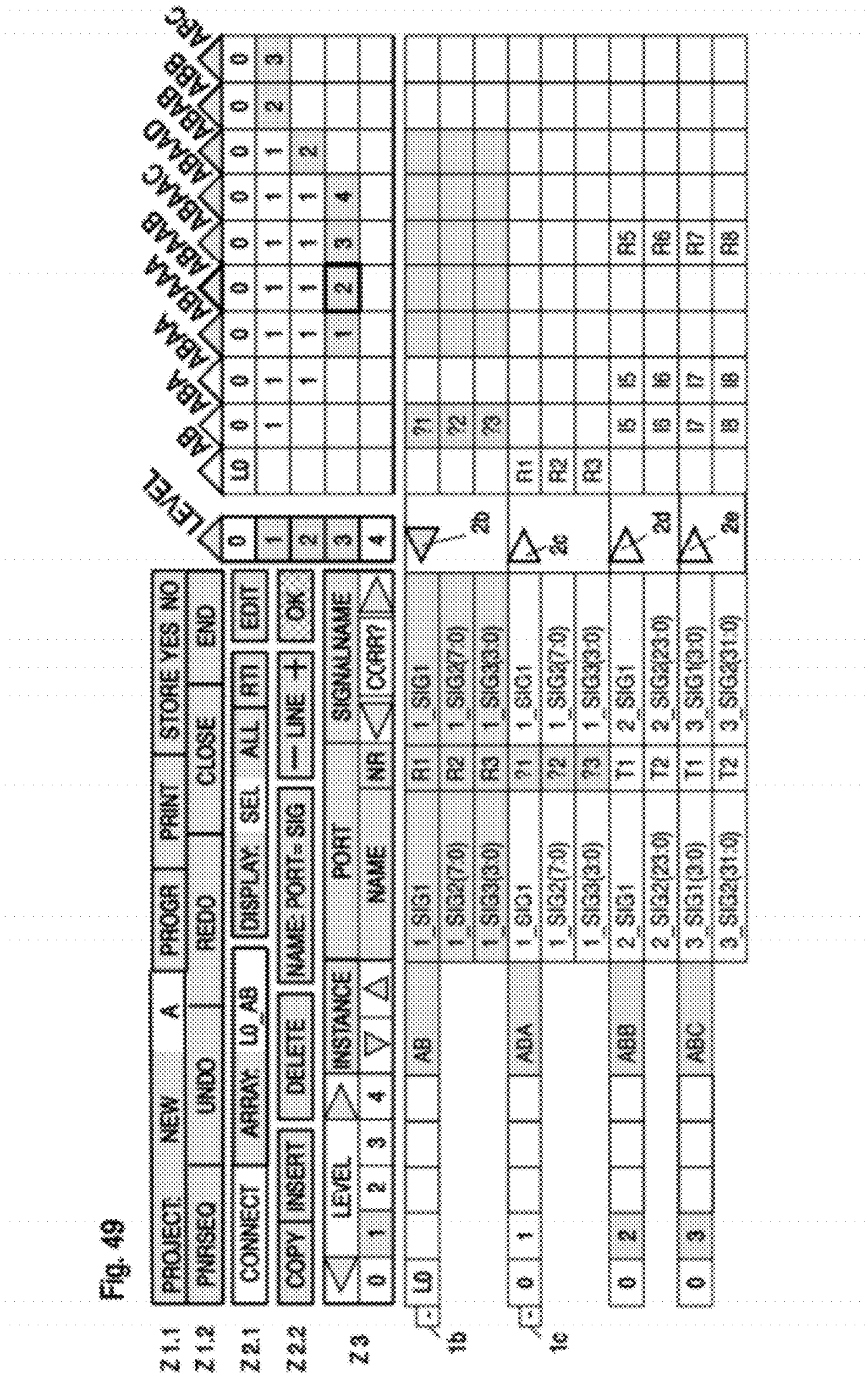
Figure 50:
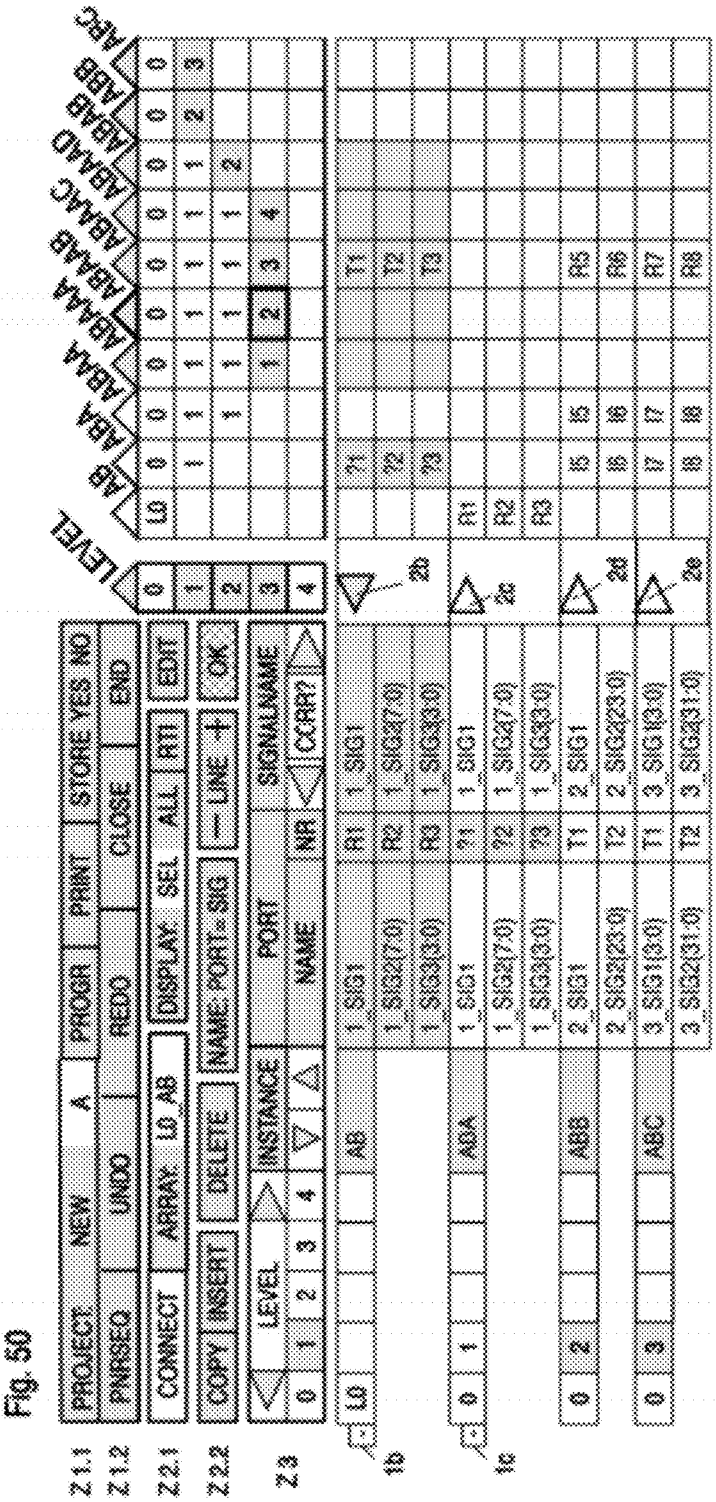
Figure 51A:
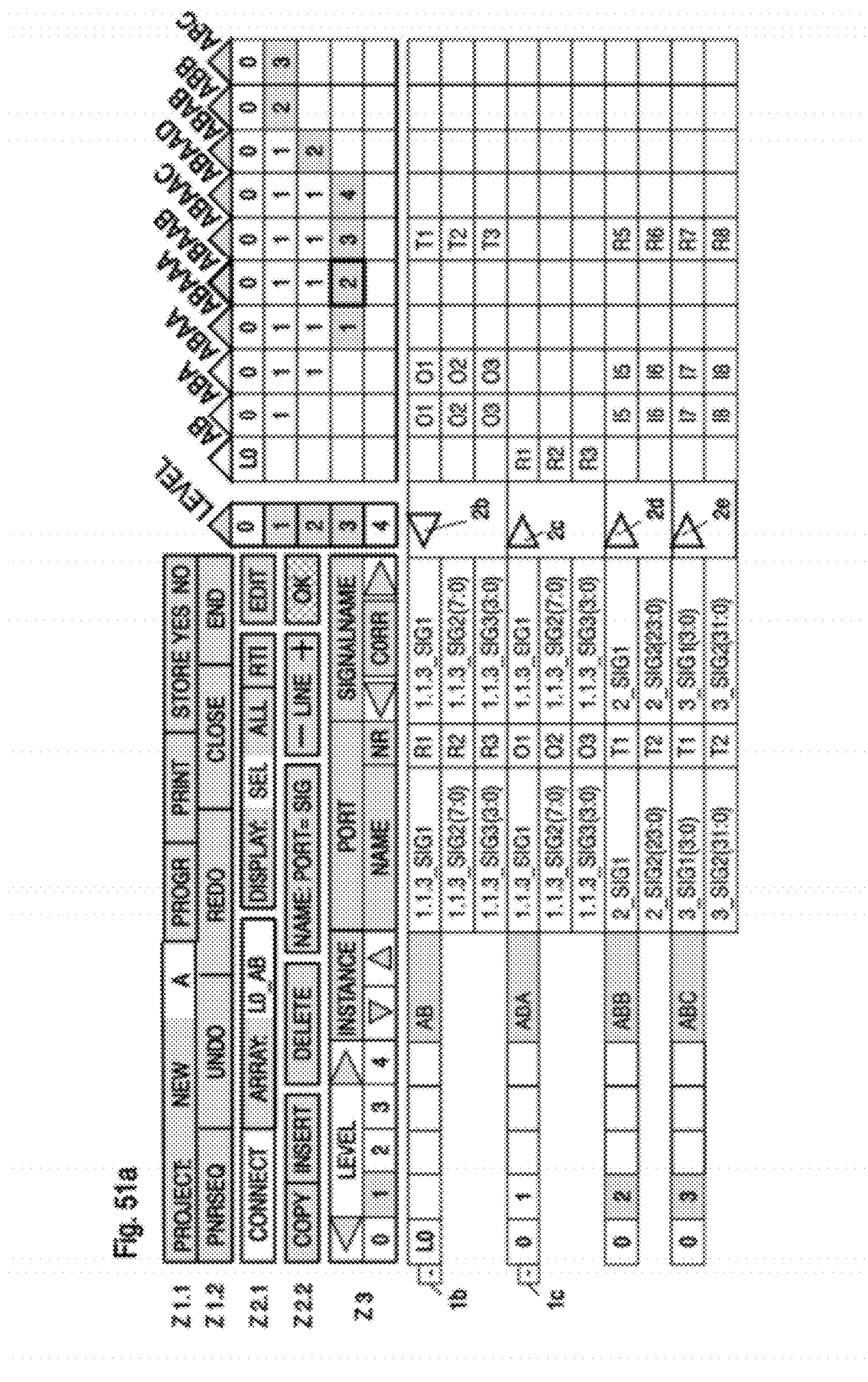
Figure 51B:
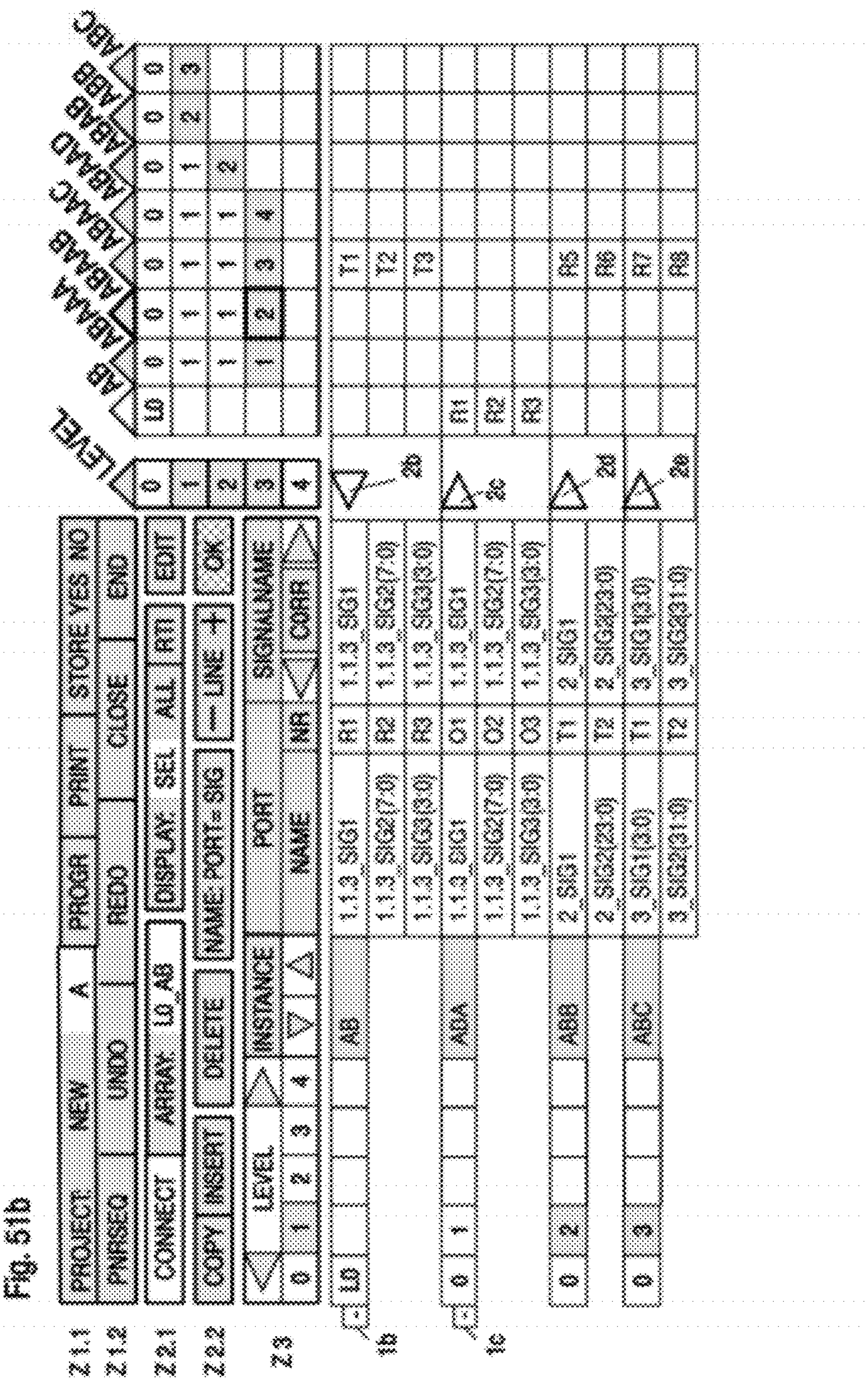
Figure 52A:
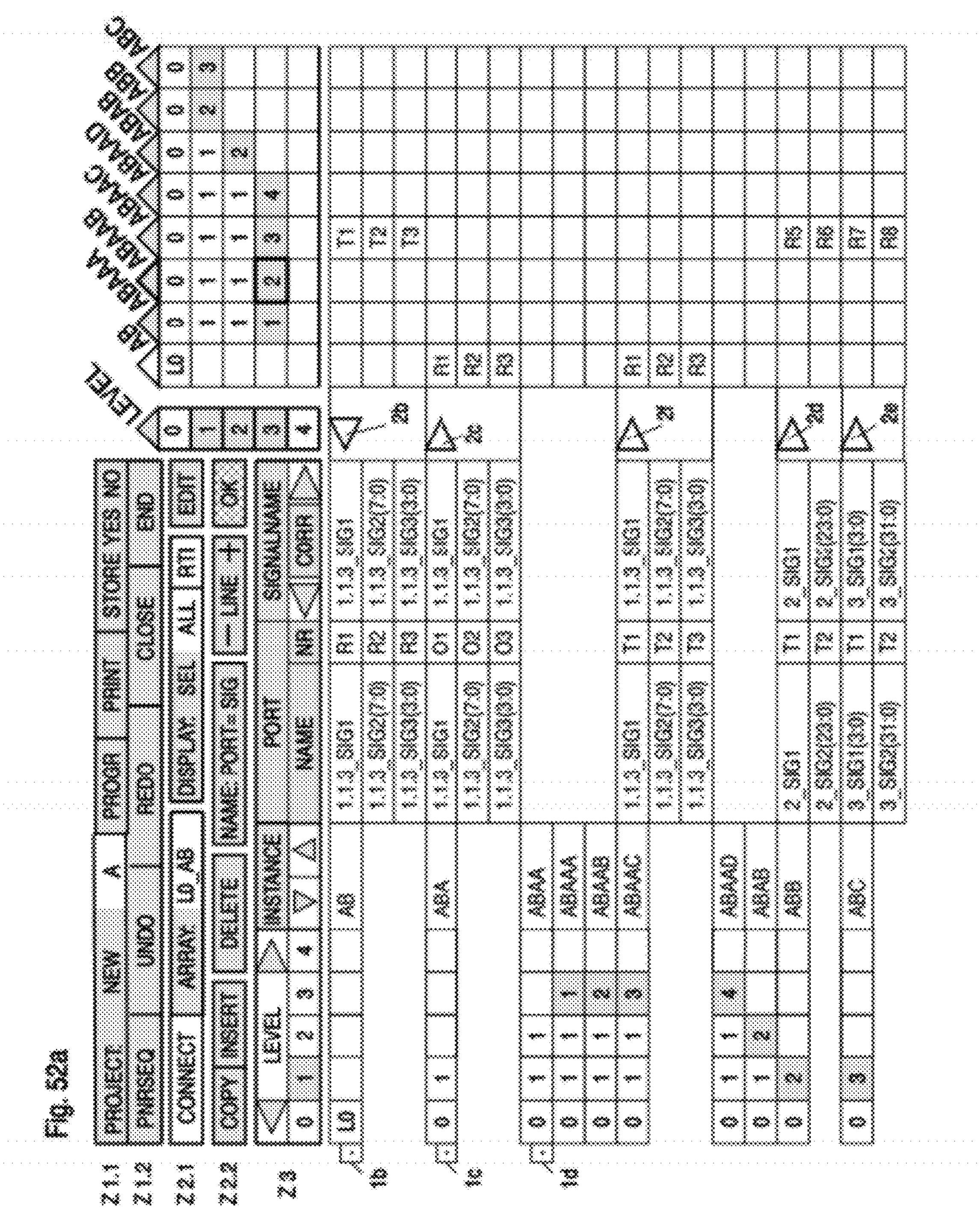
Figure 52B:
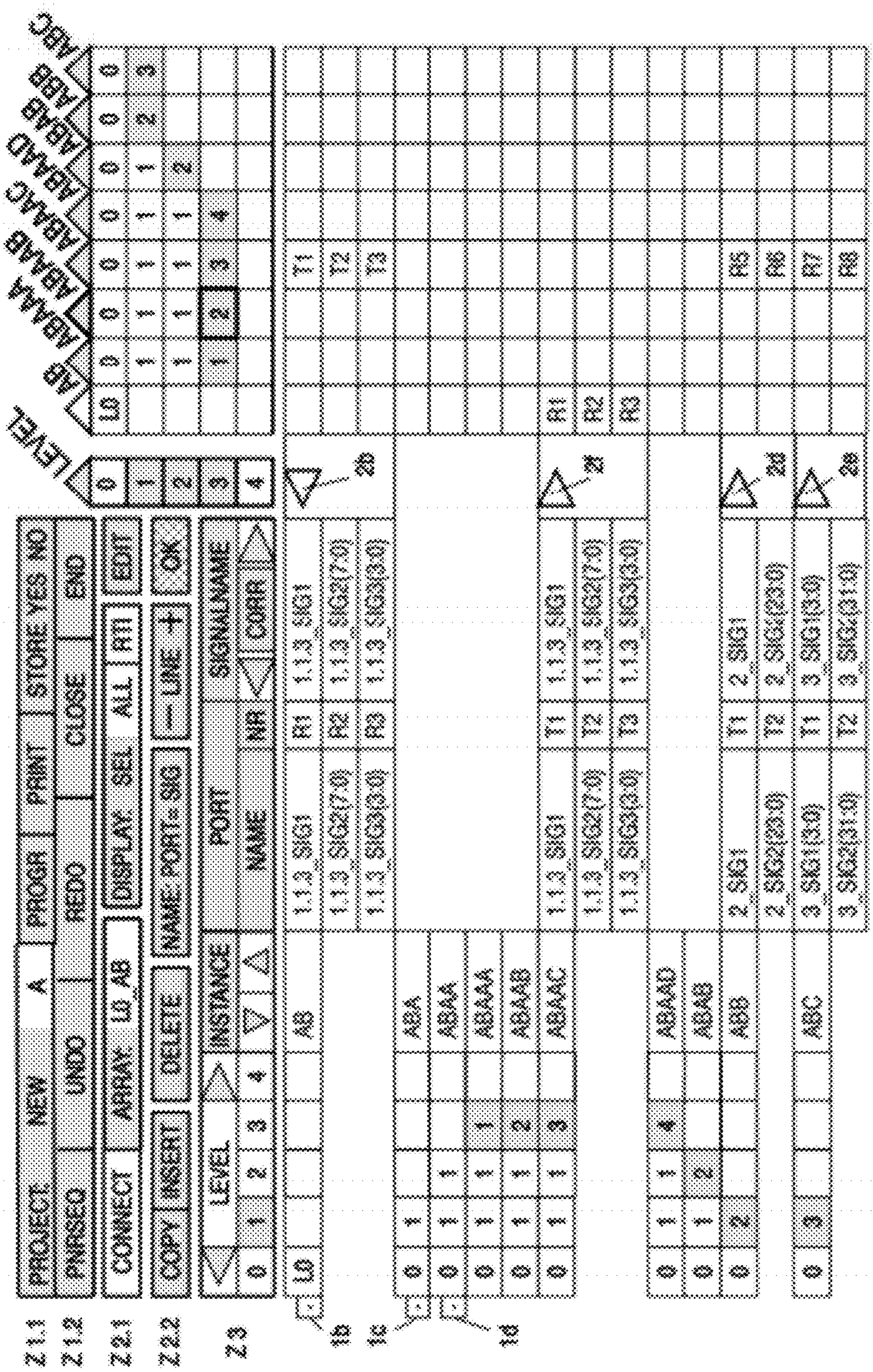
Figure 53A:
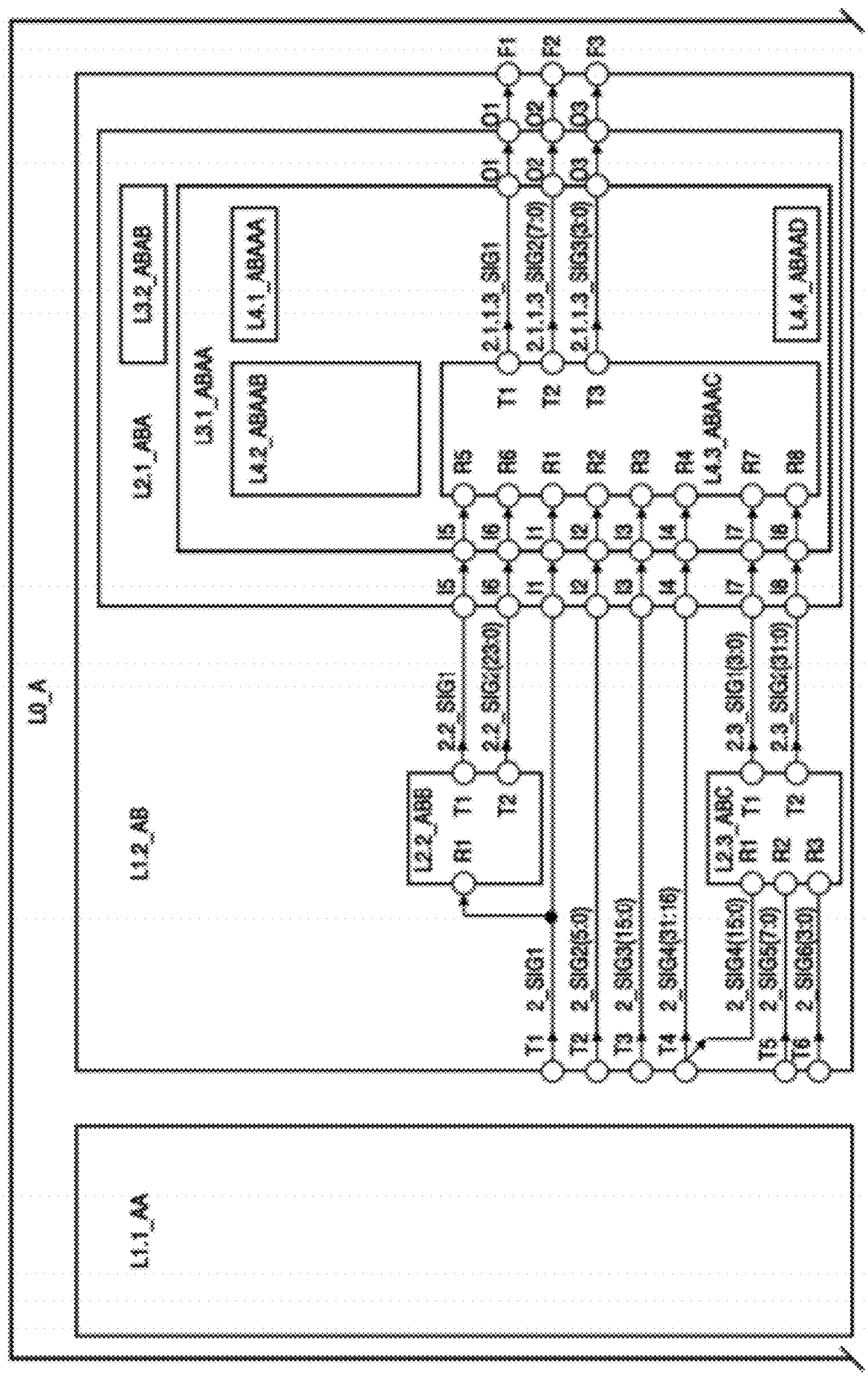
Figure 53B:
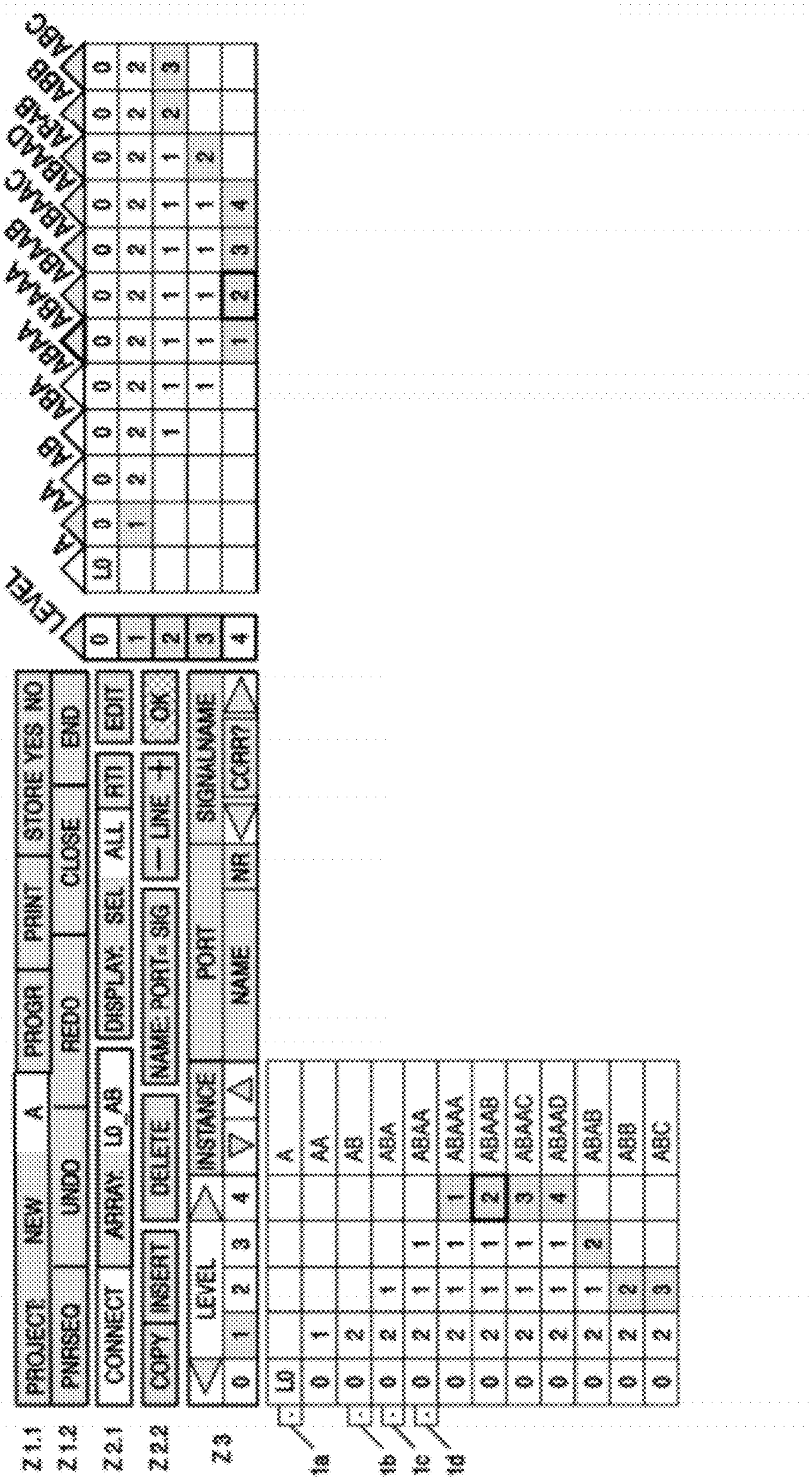
Figure 53C:
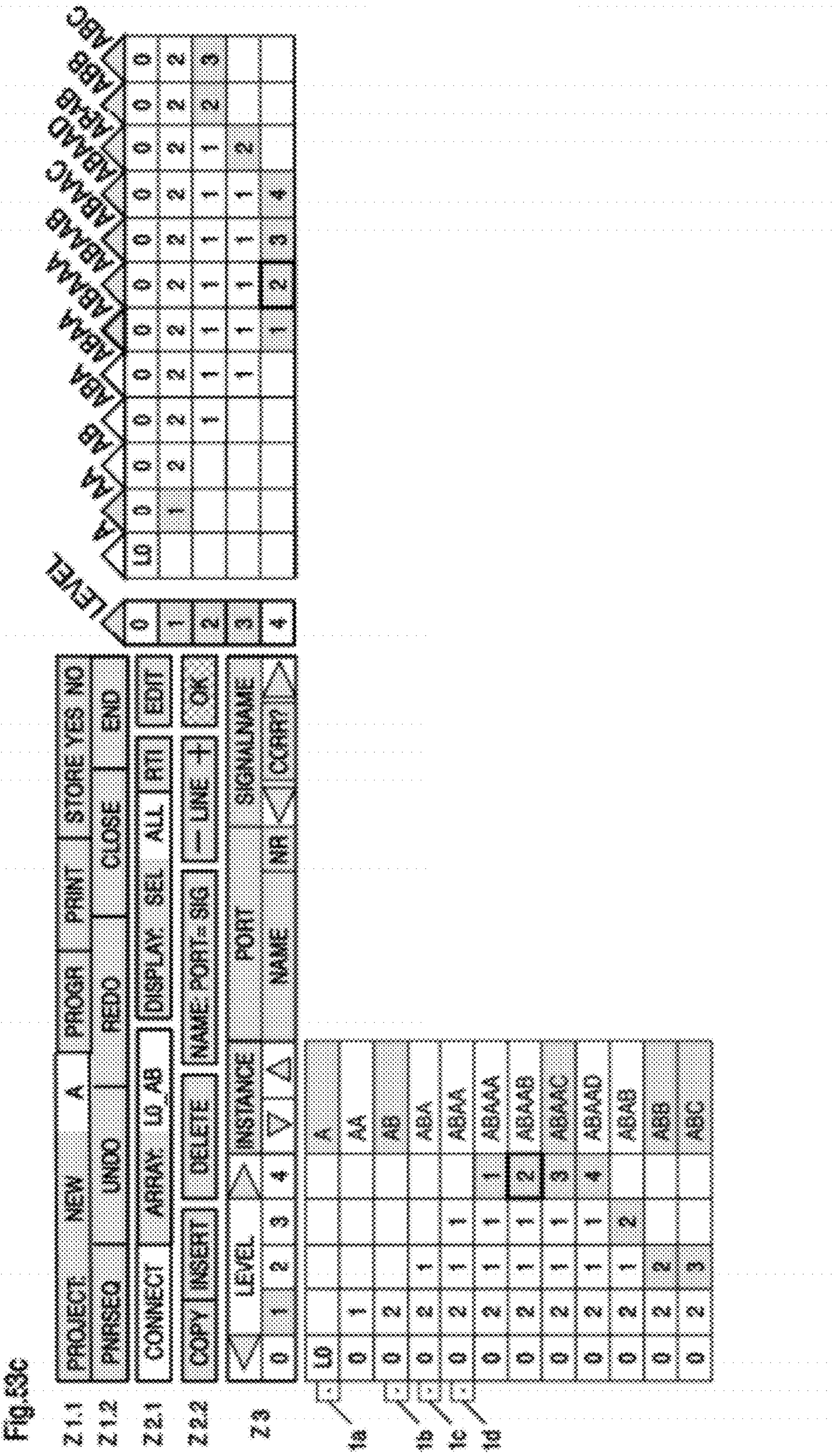
Figure 53D:
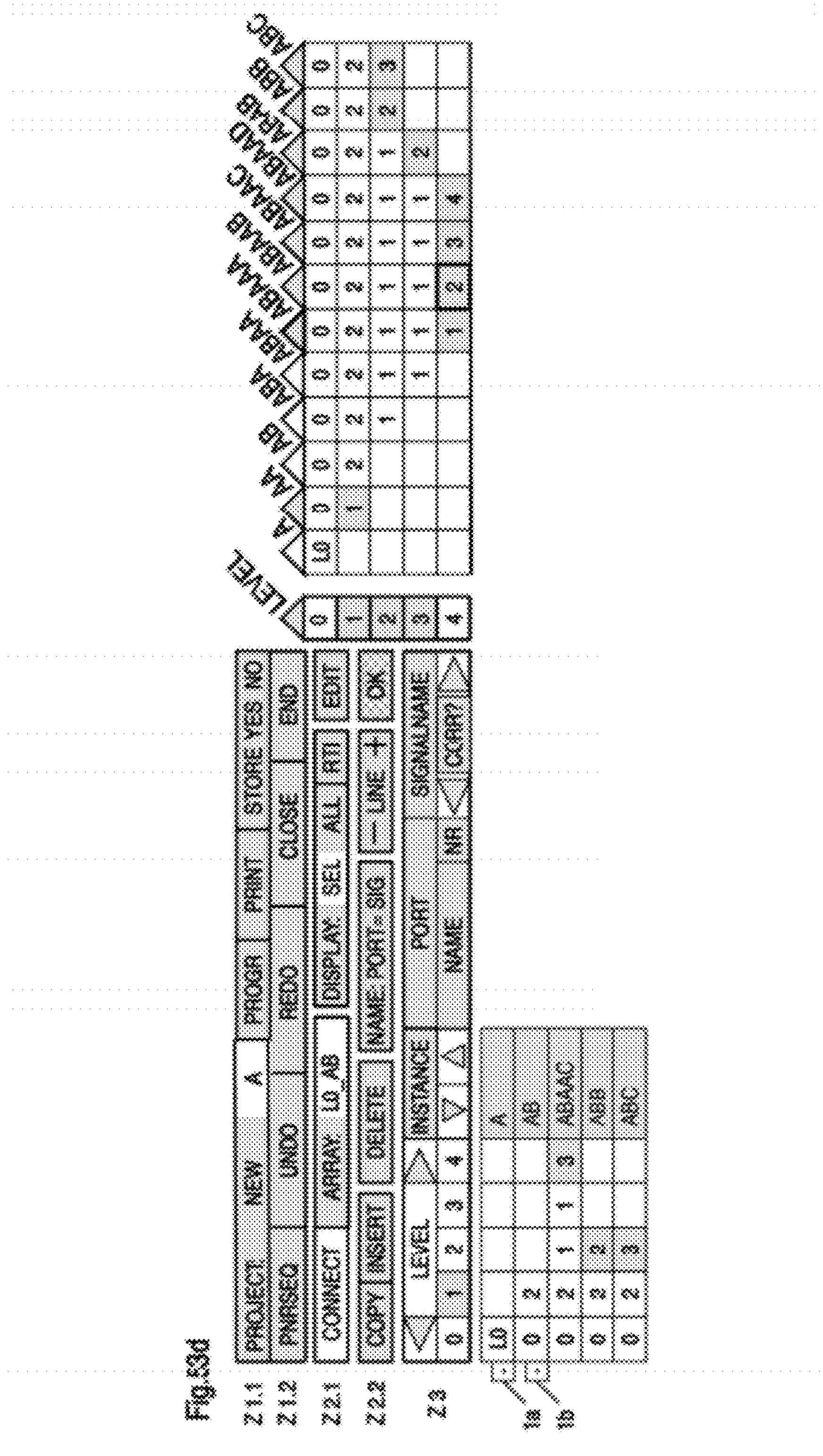
Figure 53E:
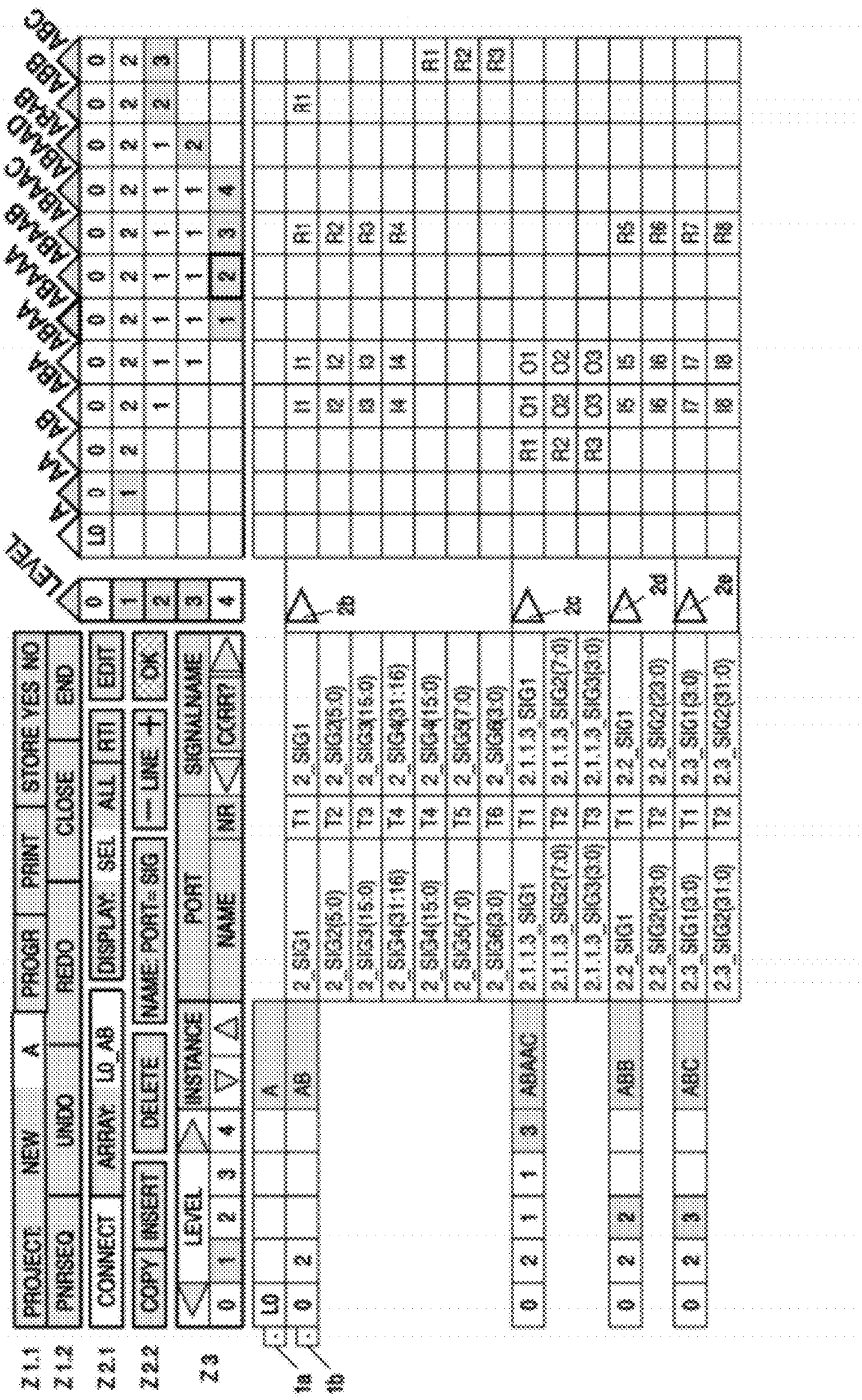
Figure 53F:
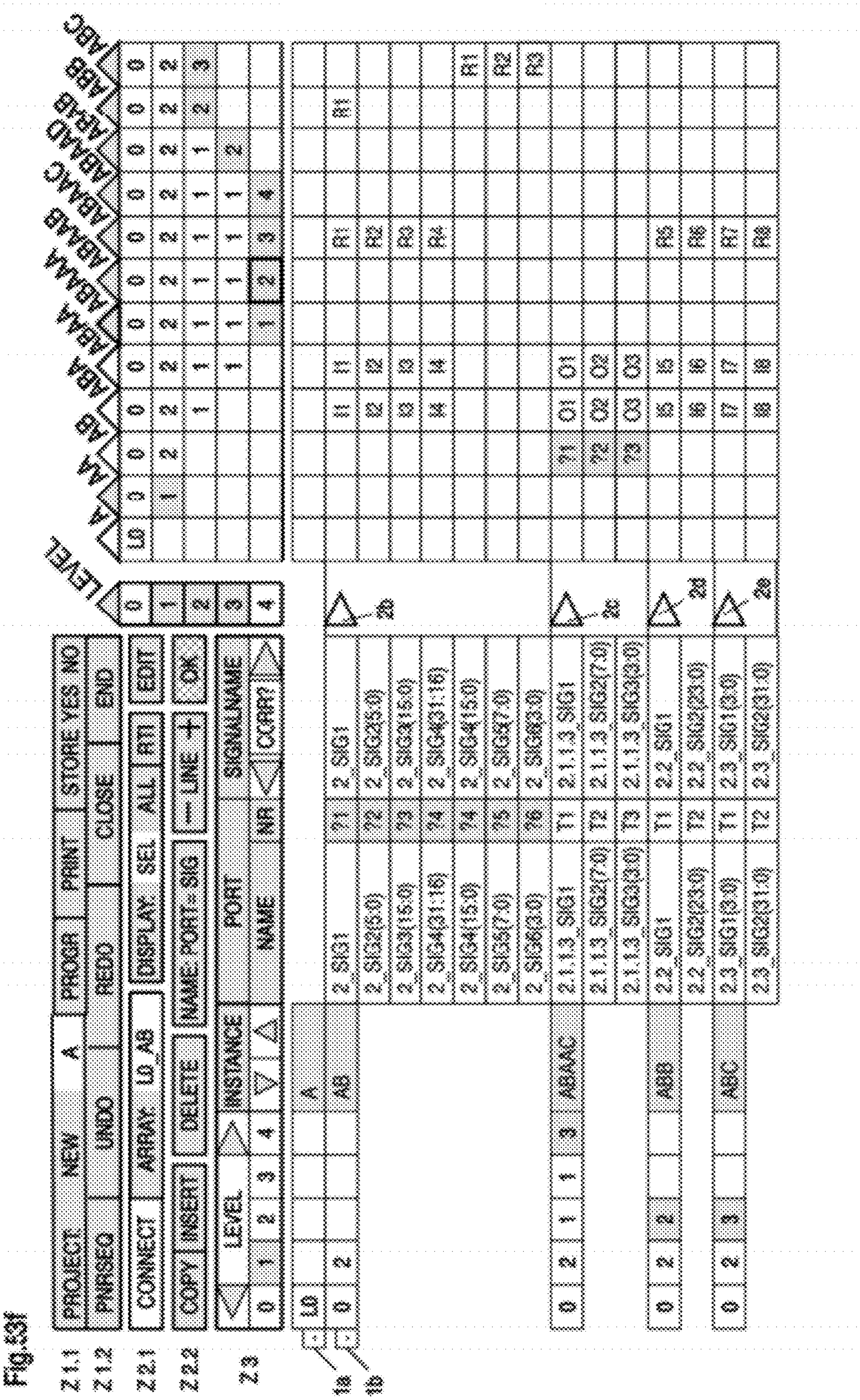
Figure 54A:
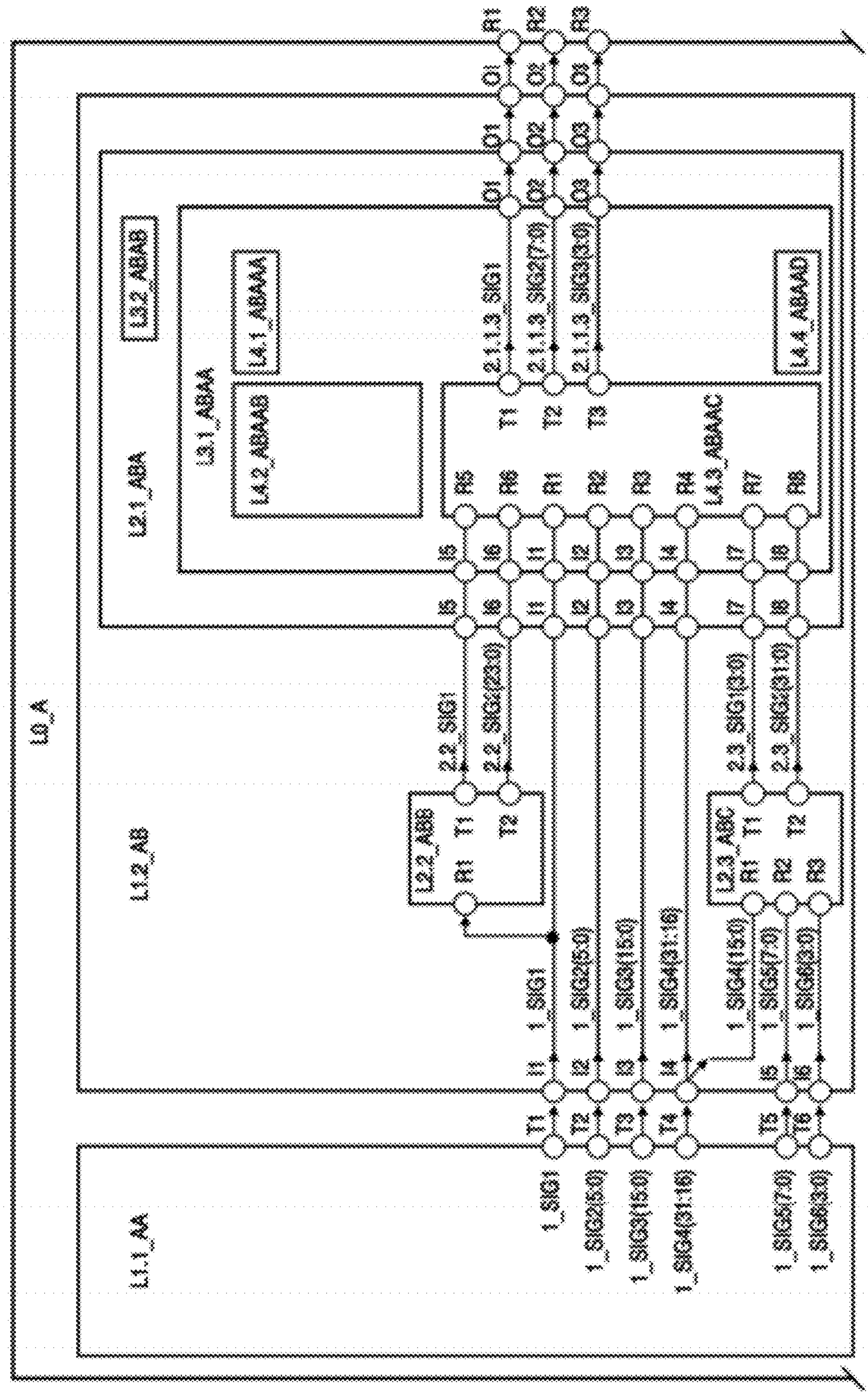
Figure 54B:
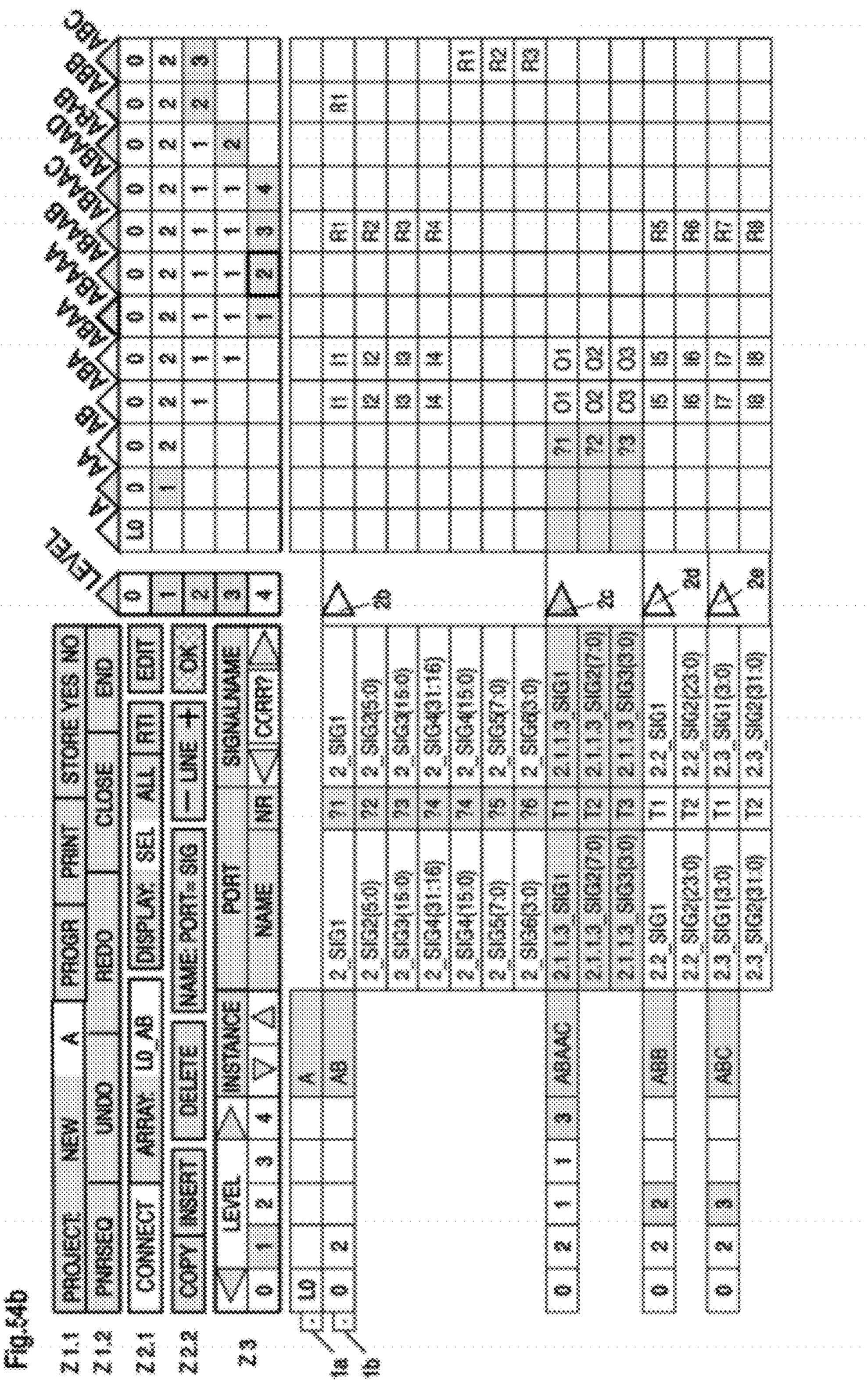
Figure 54C:
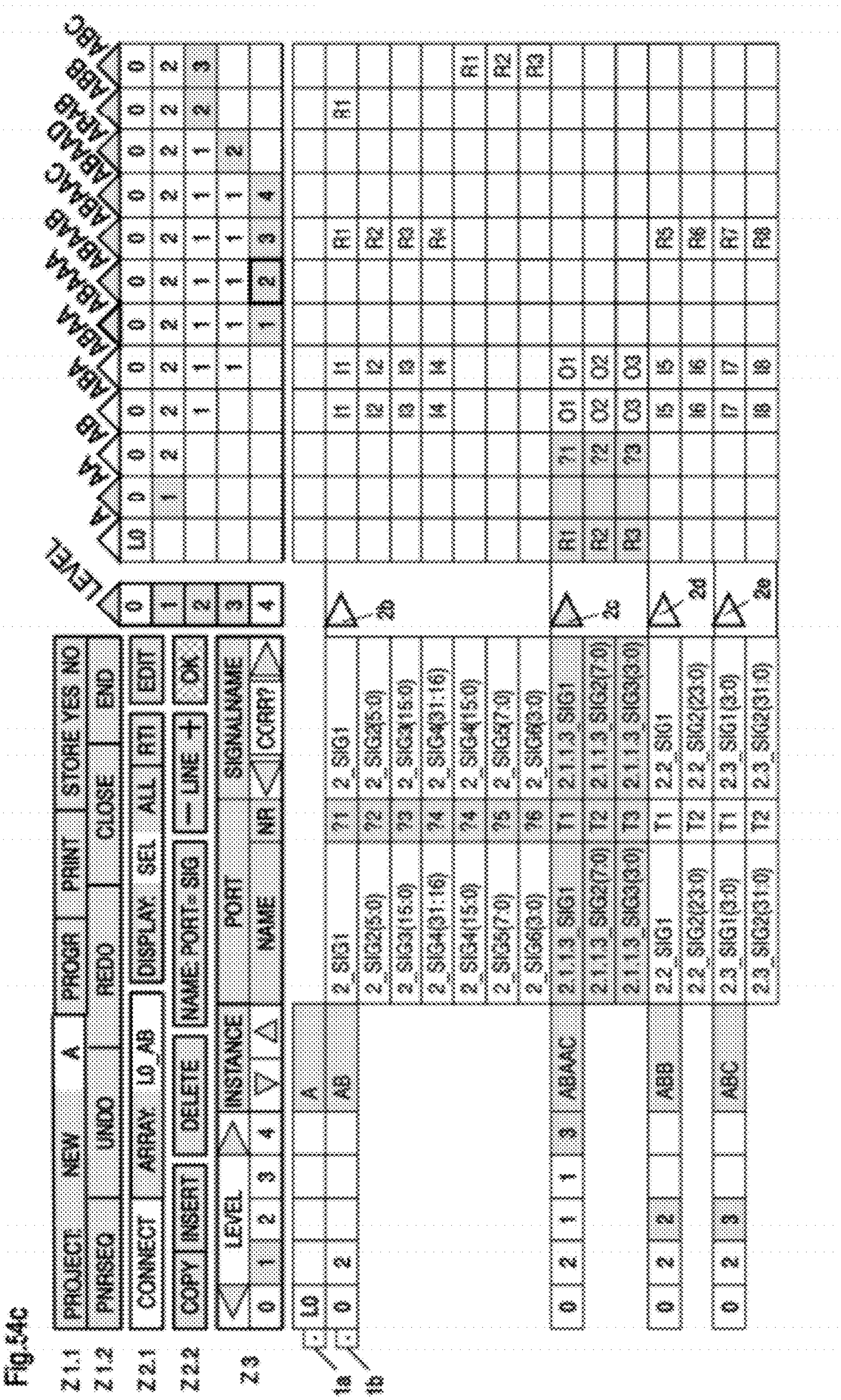
Figure 54D:
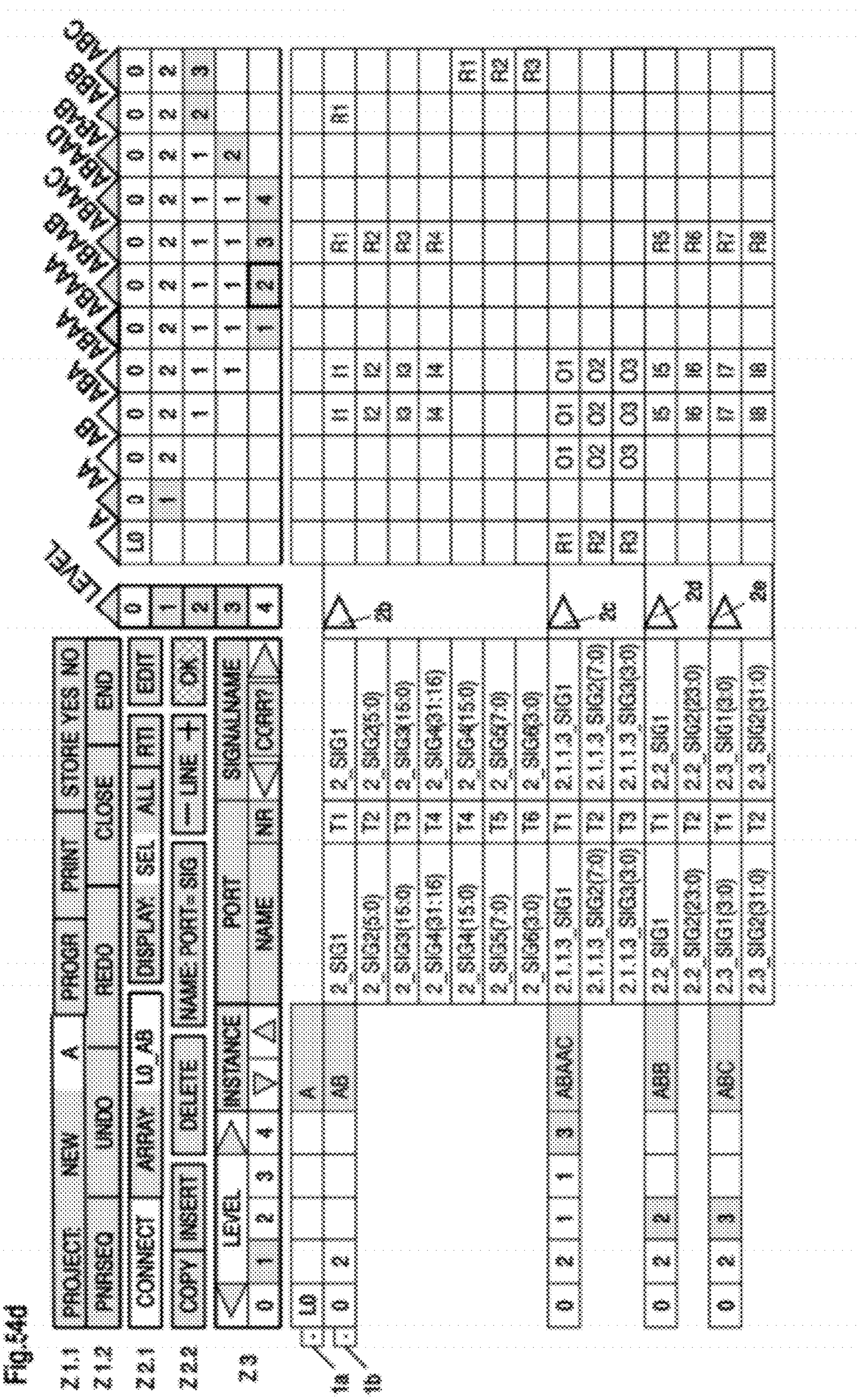
Figure 54E:
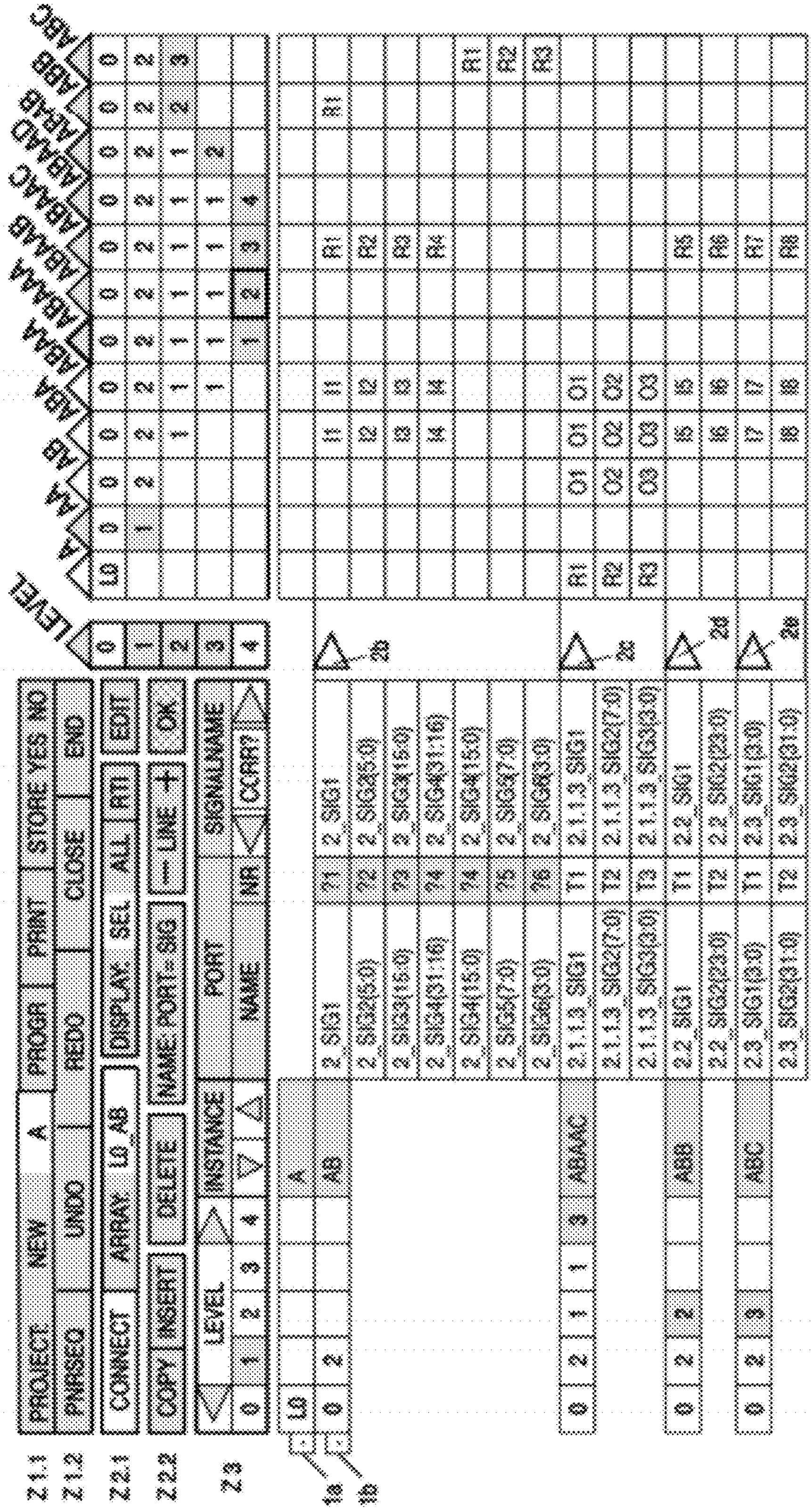
Figure 54F:
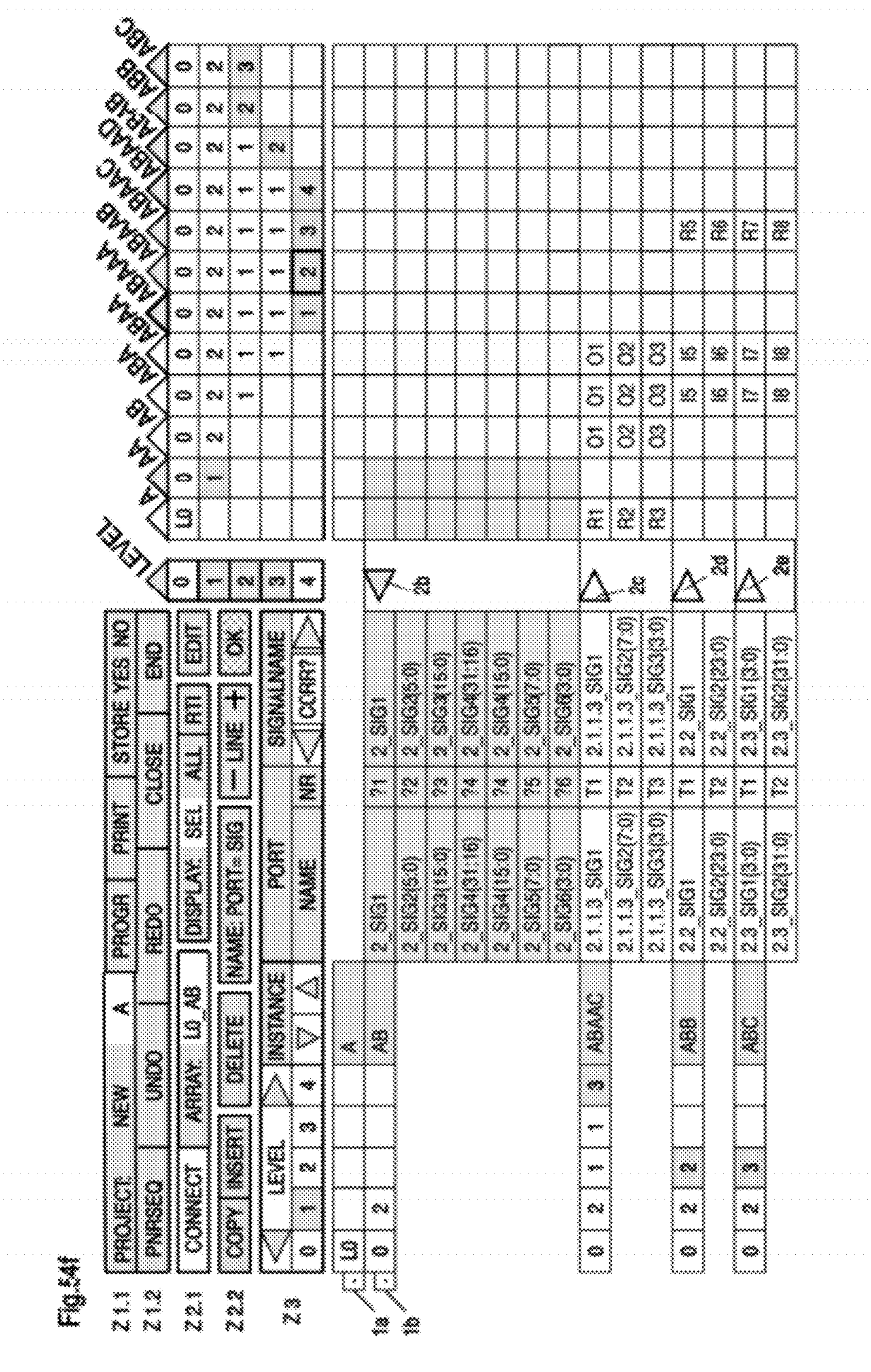
Figure 54G:
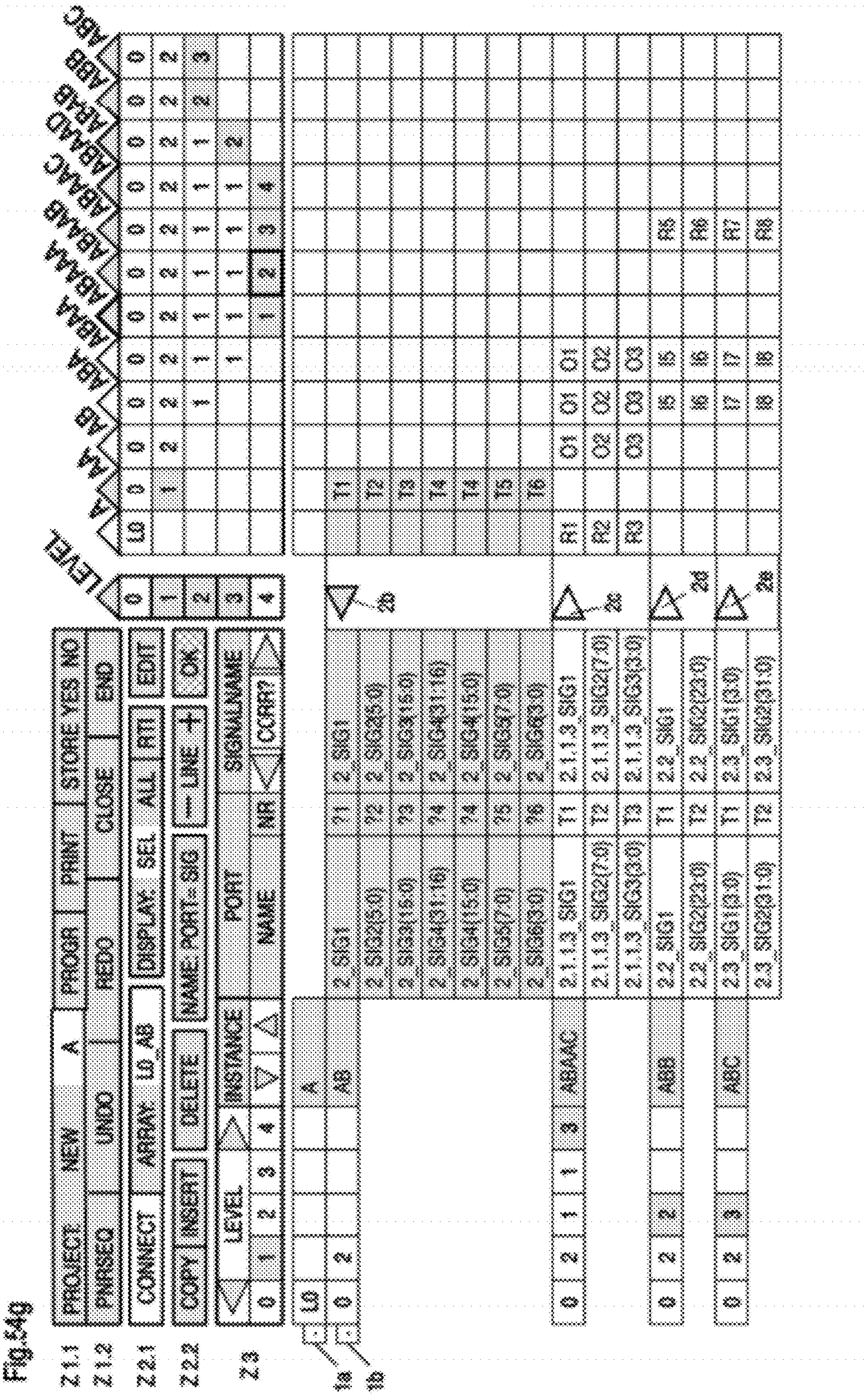
Figure 54H:
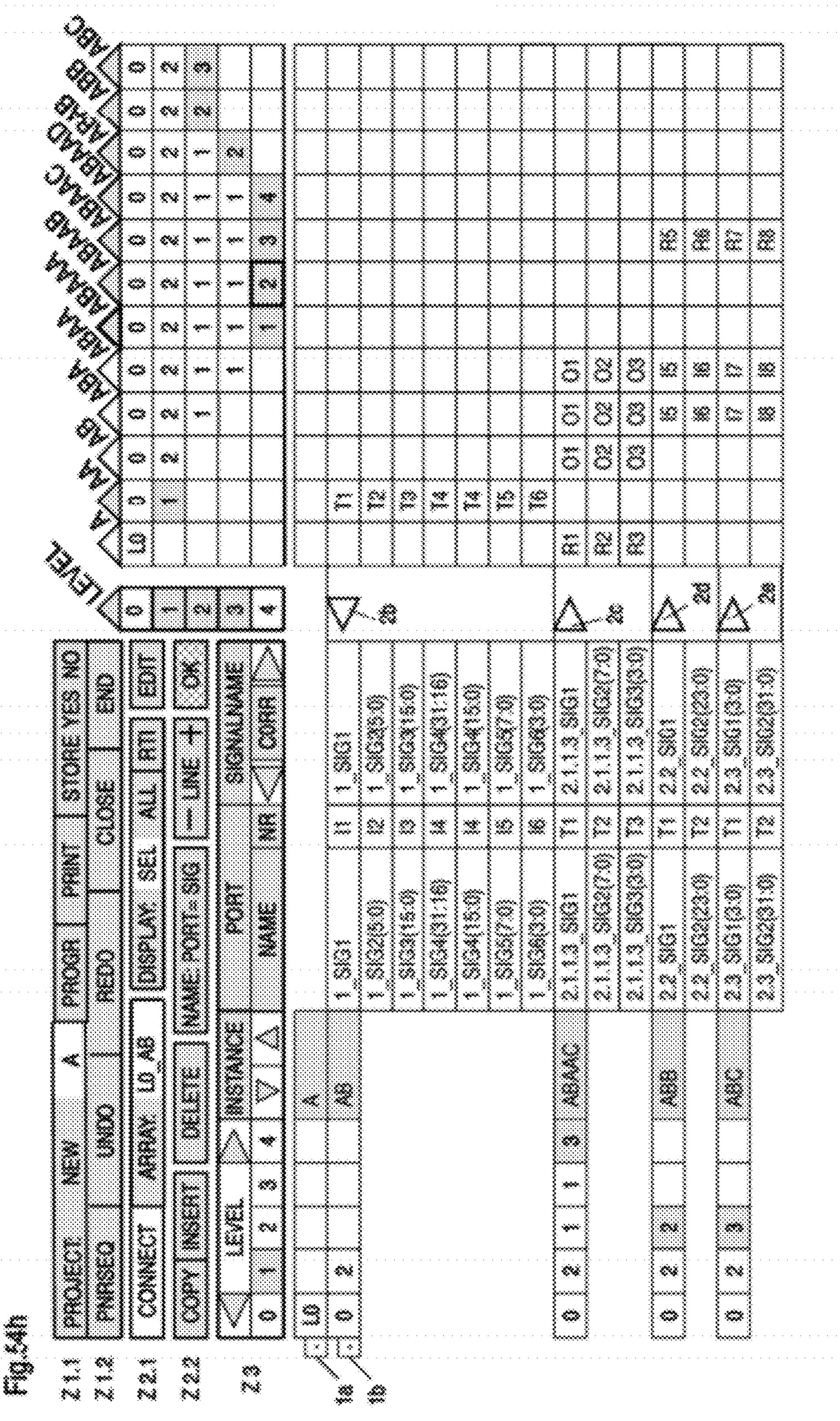
Figure 54I:
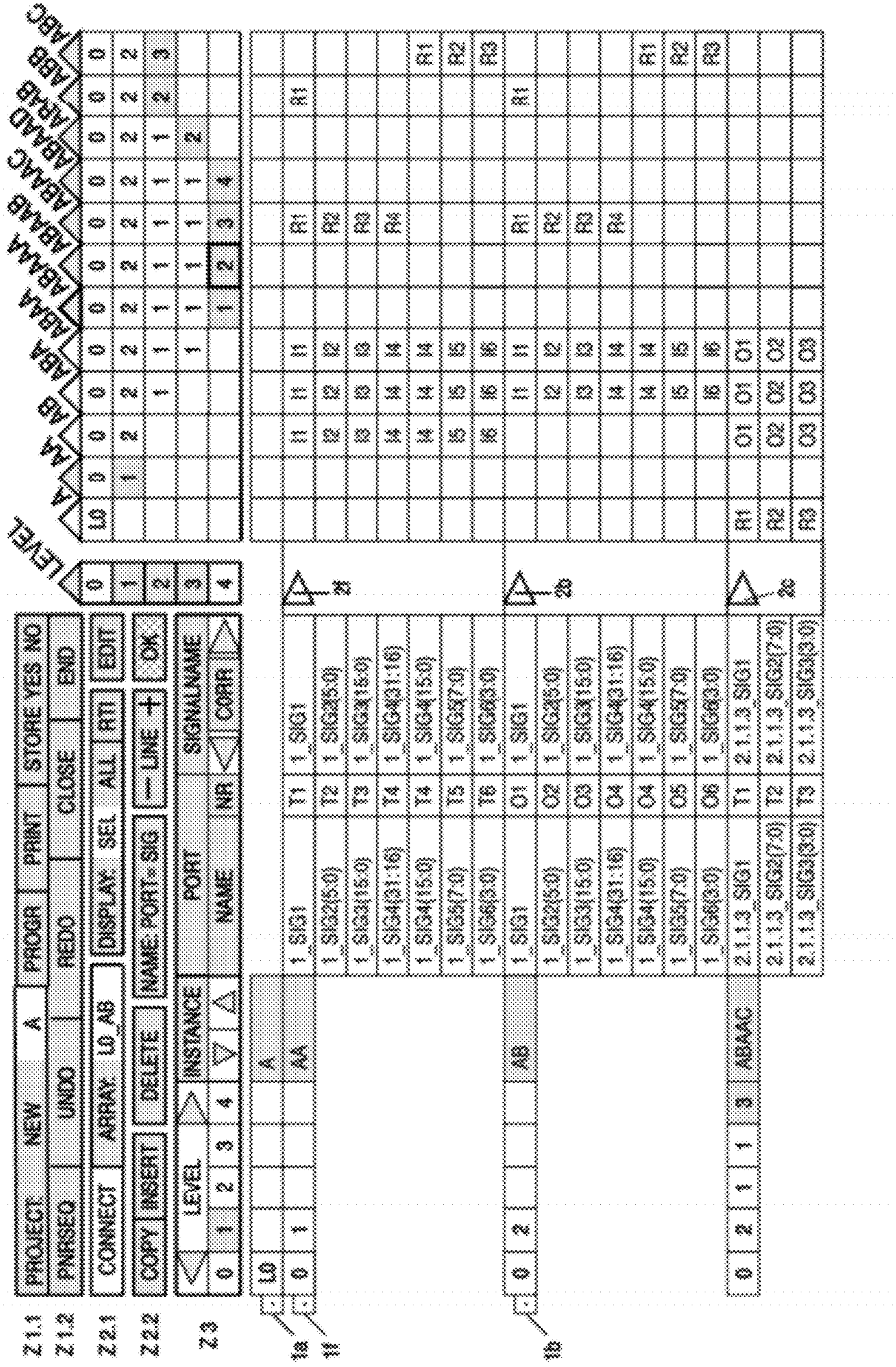
Figure 55:
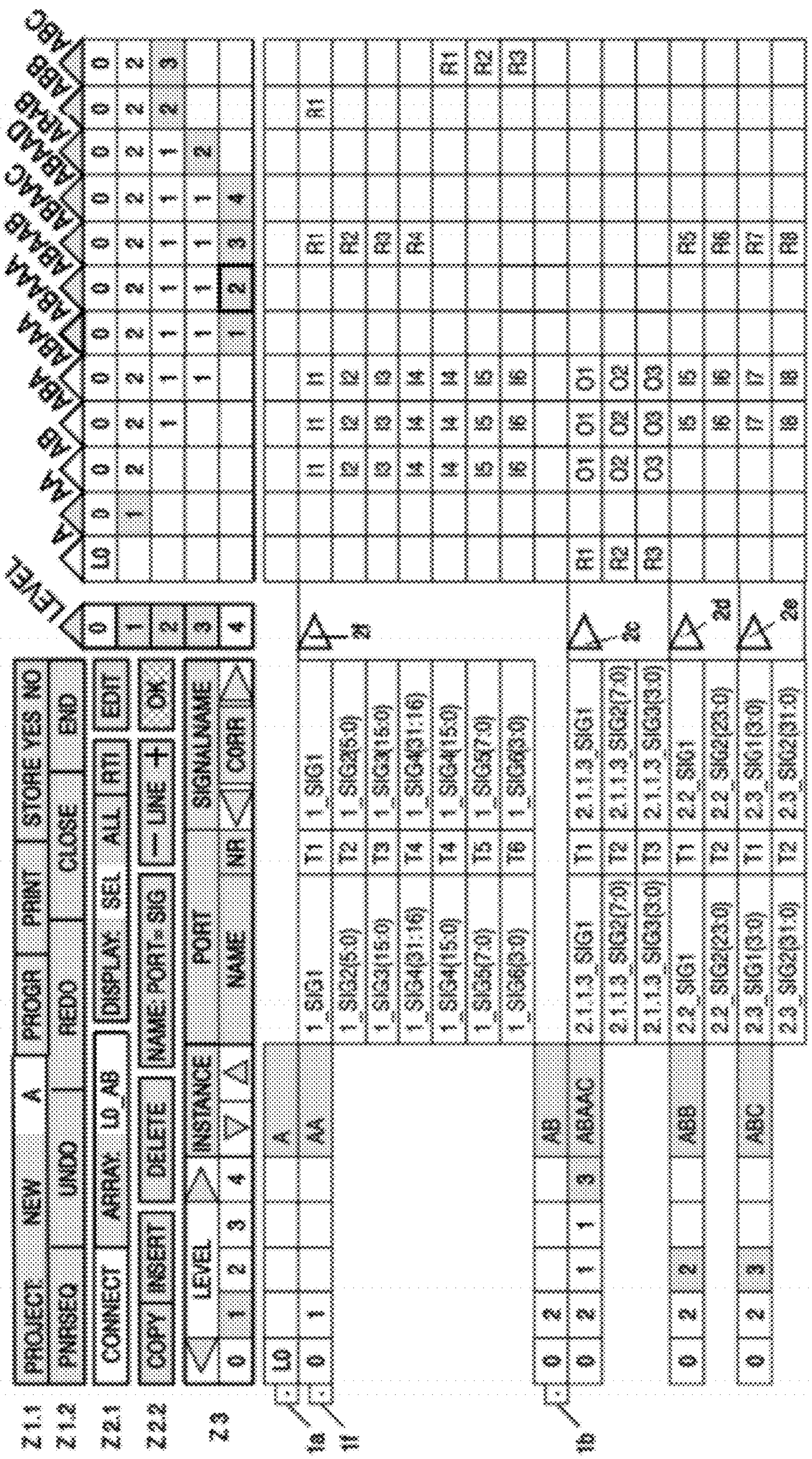
Figure 56A:
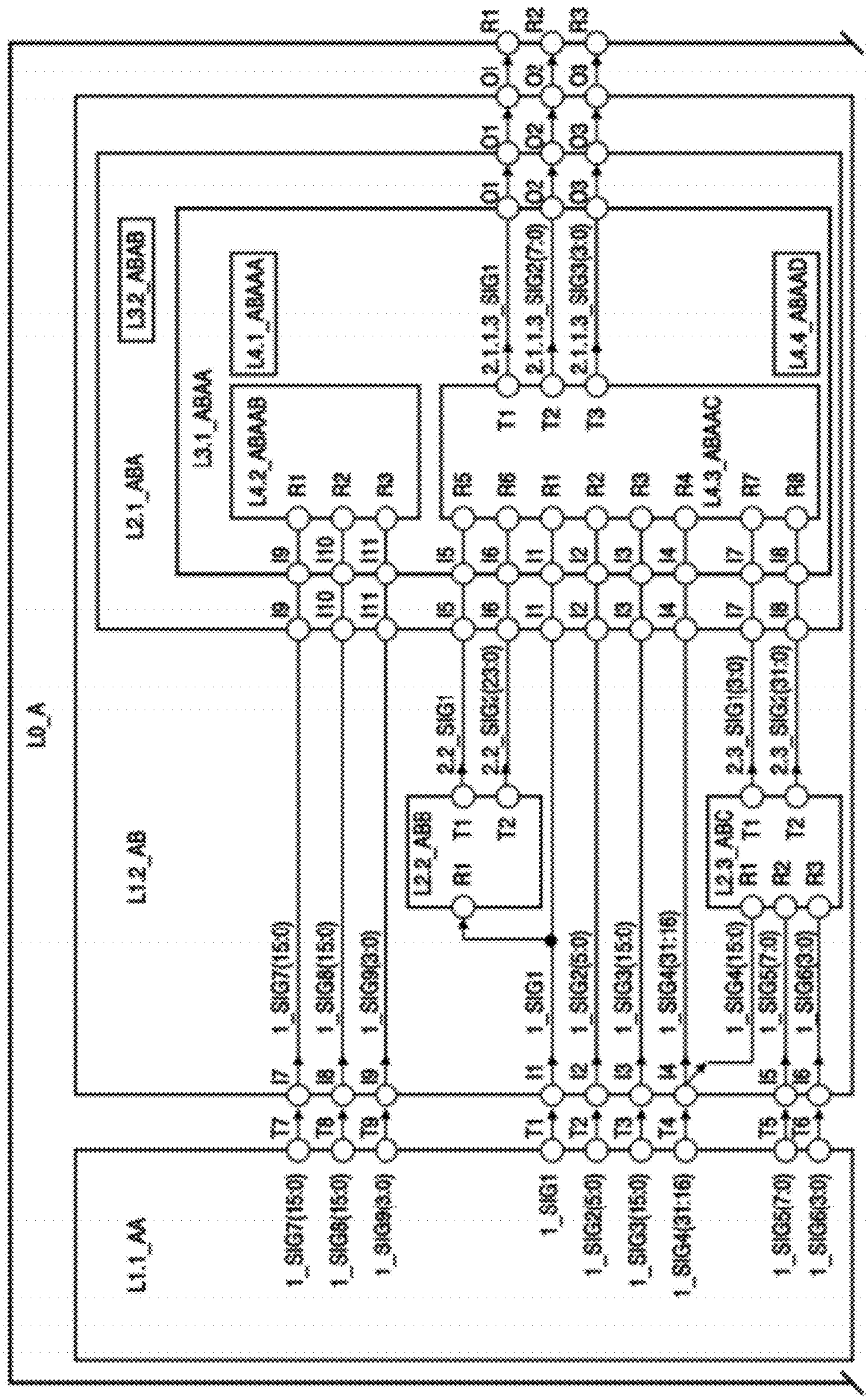
Figure 56B:
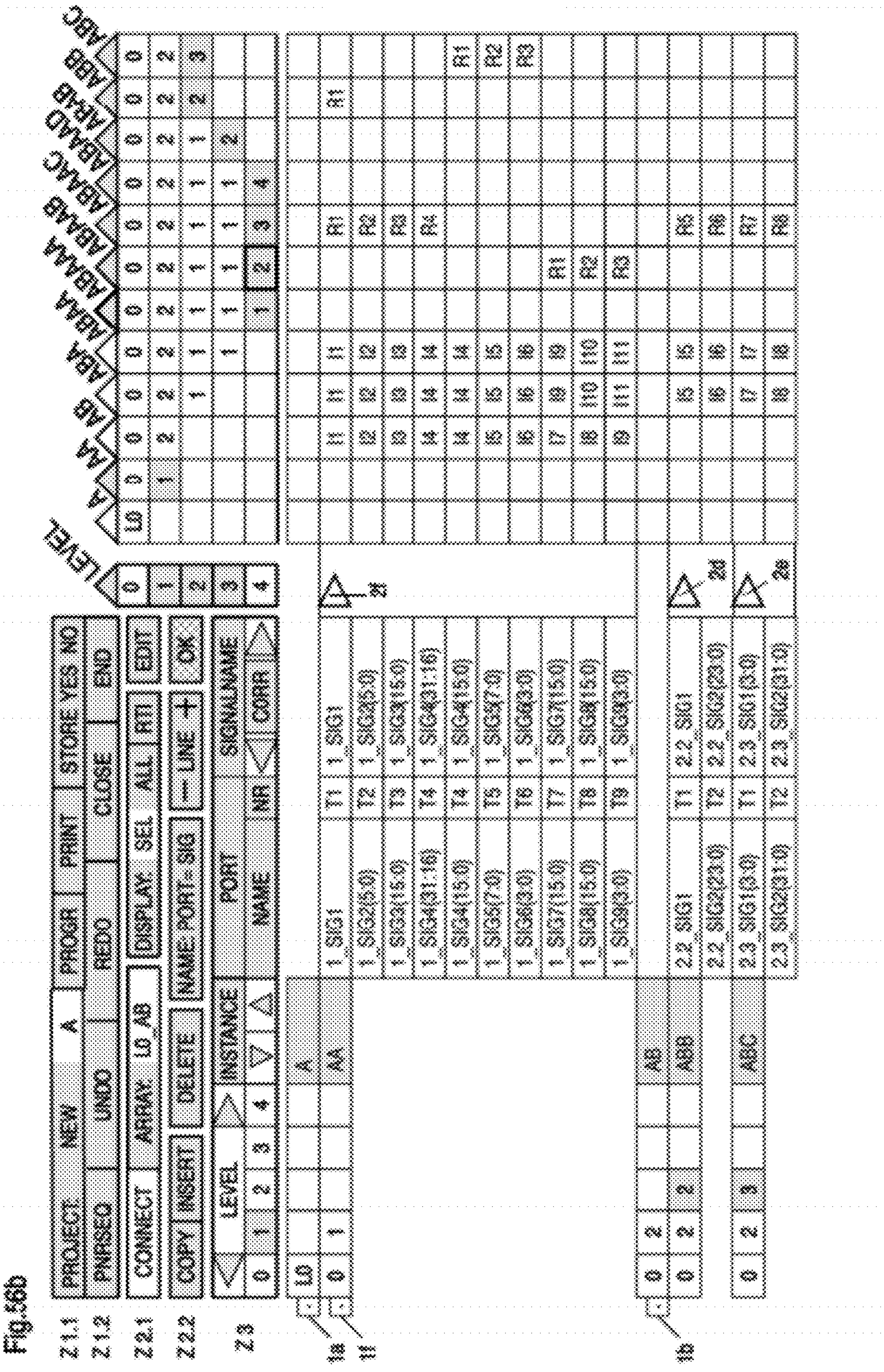

FIG. 43b the preparation for the specification of signal connections for the extension of instances in FIG. 41a;

FIG. 44 the block structure with the extension of instances according to FIG. 41a and the added signal connections to specify;

FIG. 45 the entry for the ABAAC receive ports "R1-8" in the Y array;

FIG. 46 the display "CONNECT" after entry and acknowledgment of the ABAAC receive ports "R1-8" of FIG. 45, thereby the transit input ports ABA-/ABAA "I1-8" were filled in automatically;

FIG. 47 a new activation of the button correction "CORR?" in "Z3" with ABA transmit ports designated by a question mark "?";

FIG. 48-49 the AB receive ports "R1-3" after switching from Y array to X array and the designation of possible transmit ports in the Y array by marking;

FIG. 50 the entry of ABAAC transmit ports "T1-3" in the Y array;

FIG. 51a the display "CONNECT" after entry and acknowledgement of the ABAAC transmit ports "T1-3" in the Y array of FIG. 50. Thereby the ABA-/ABAA transit output ports "O1-3" were filled in automatically;

FIG. 51b the activation of the button "RTI" in "Z2.1". Thereby only the least significant instances (RTIs) of the top level "AB" are shown;

FIG. 52a in the X array the top level "AB" with its receive ports, as well as the output ports of the instance "ABA" and the transmit ports of the instances "ABAAC", "ABB" and "ABC", by that only the "RTIs" are shown in the Y array;

FIG. 52b the display "CONNECT" of FIG. 52a, but with switched off ABA output ports, FIG. 53a the block structure of the top level "A" in which the instance "AA" and the above mentioned top level "AB" are instantiated;

FIG. 53b the display "CONNECT" with the top level "A" and the instantiation illustrated in FIG. 53a and all instances in the Y array. Thereby a "?" is inserted in the button correction "CORR" in "Z3", since the input/output ports of instance "AB" are only transit ports;

FIG. 53c in the column "INSTANCE" the buttons of top level "A" and of the instances "AB" together with the sub instances "ABAAC", "ABB" and "ABC" which were chosen for a selective display by marking;

FIG. 53d the instances selected in FIG. 53c by activating the button "SEL" in "Z2.1" for a selective display of instance;

FIG. 53e the until now specified signal connections of instance "AB" and how they are illustrated in the block structure of FIG. 53a;

FIG. 53f the activated button "CORR?" in "Z3". Hereby the AB transmit/receive ports become transit ports which are identified by marking and question mark "?", whose signal connections are still to specify;

FIG. 54a the signal connections of the AB transit ports in block structure design still to specify;

FIG. 54b-54c the accomplishment of specification of the signal connections for the AB output transit ports;

FIG. 54d the newly specified AB output ports "O1-O3" in the Y array after acknowledgement of the specification of the signal connections;

FIG. 54e-54g the accomplishment of the specification of the signal connections for the AB input transit ports;

FIG. 54*h* the newly specified AB input ports with "I1-I6" in the X array;

FIG. 54*i* the view of the transmit ports in the X array for the top level instances "AA", "AB" and the sub instance "ABAAC";

FIG. 55 with regard to FIG. 54*i* additionally the transmit ports in the X array for the sub instances "ABB" and "ABC", the AB transmit ports are switched off;

FIG. 56*a* with regard to the block structure of FIG. 54*a* the additional to specify signal connections of the AA transmit ports "T7-T9" to the ABAAB receive ports "R1-R3";

FIG. 56*b* the additionally specified signal connections of FIG. 56*a;*

Figure 57A:
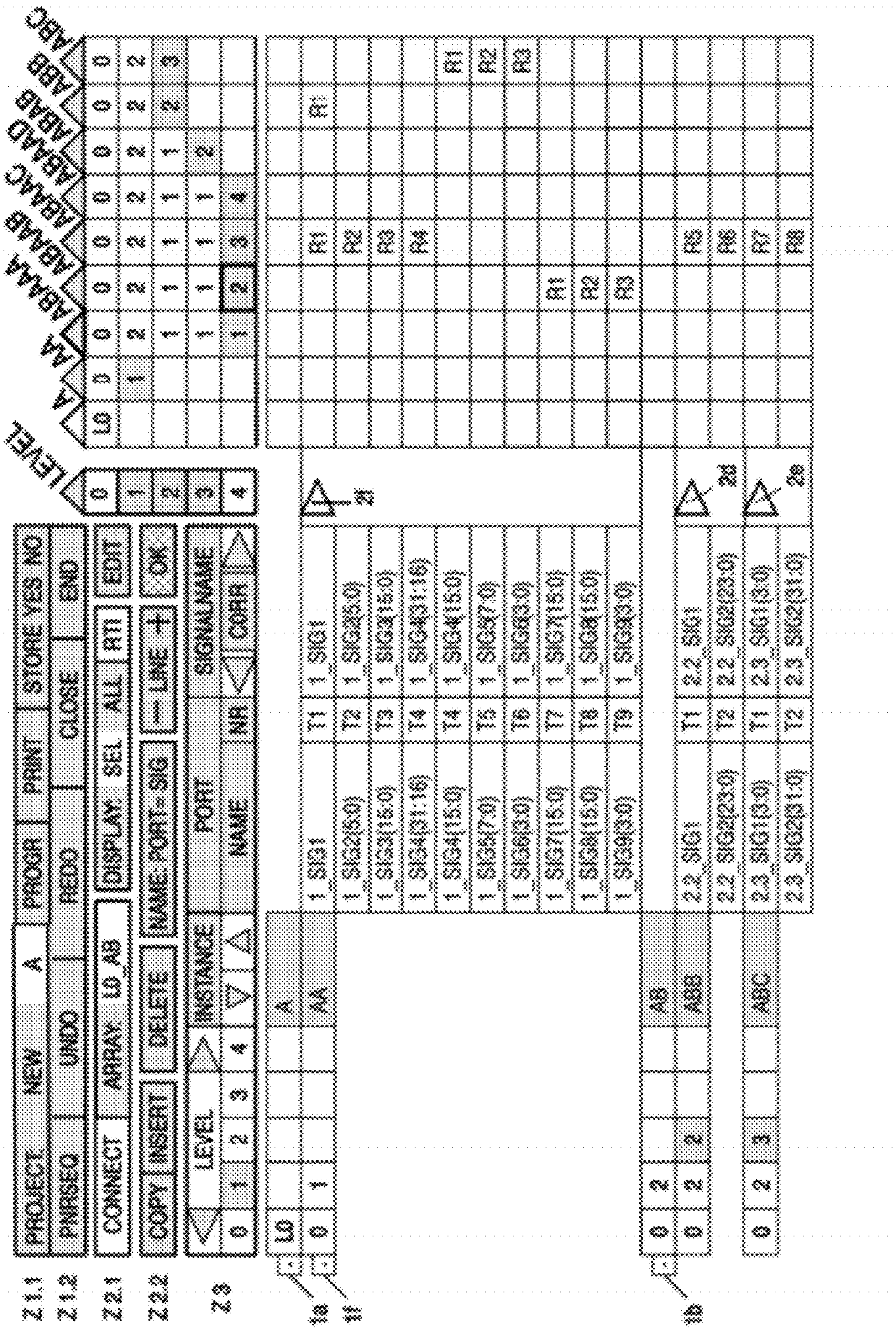
Figure 57B:
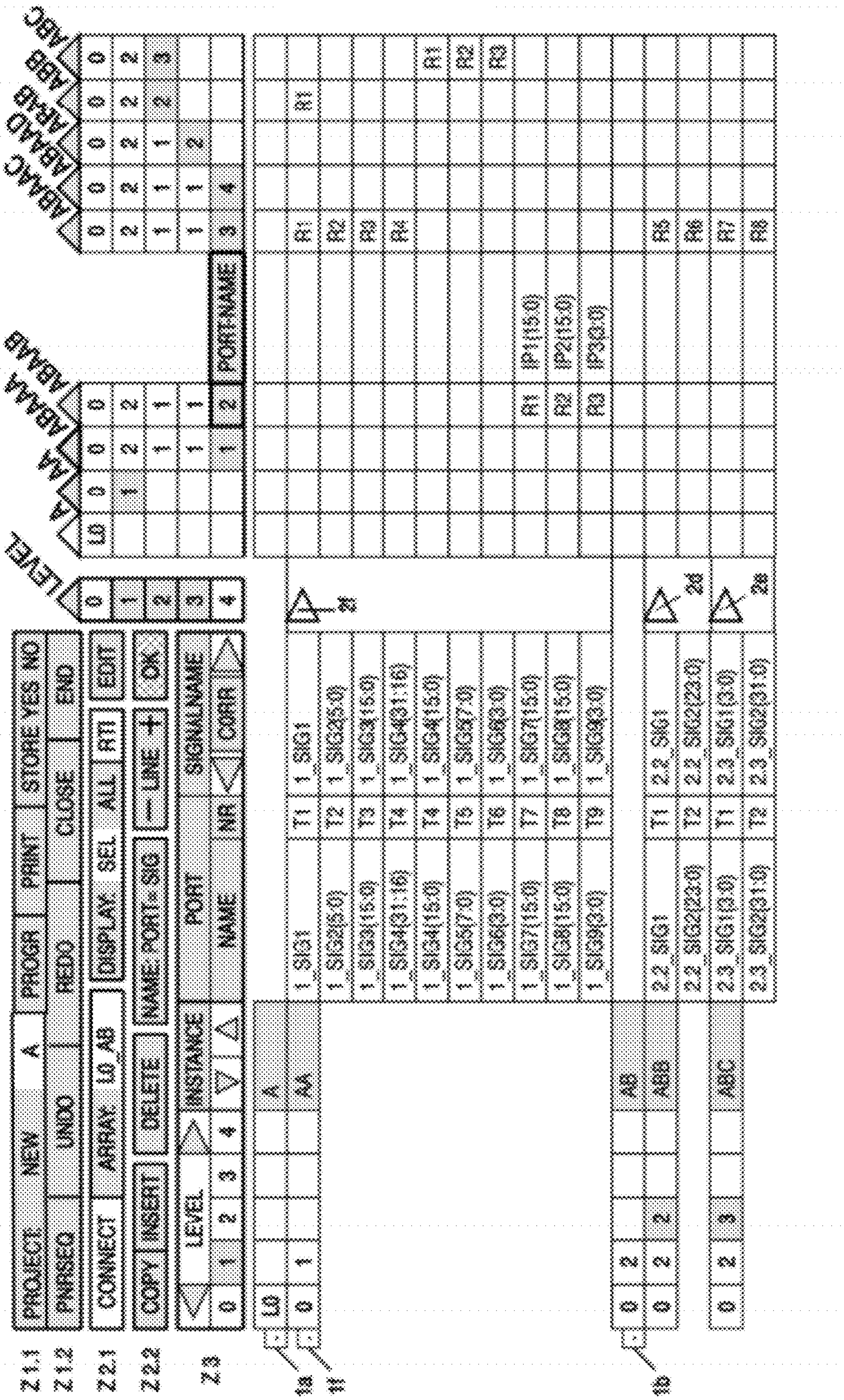
Figure 57C:
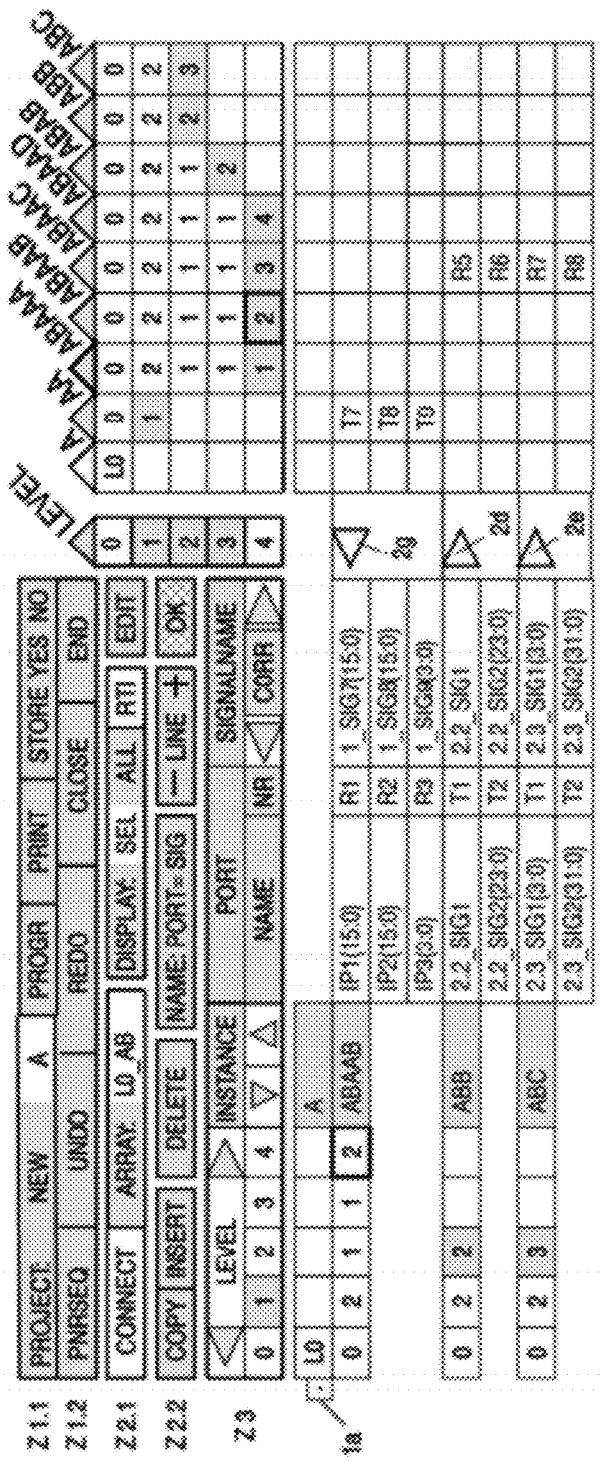
Figure 58:
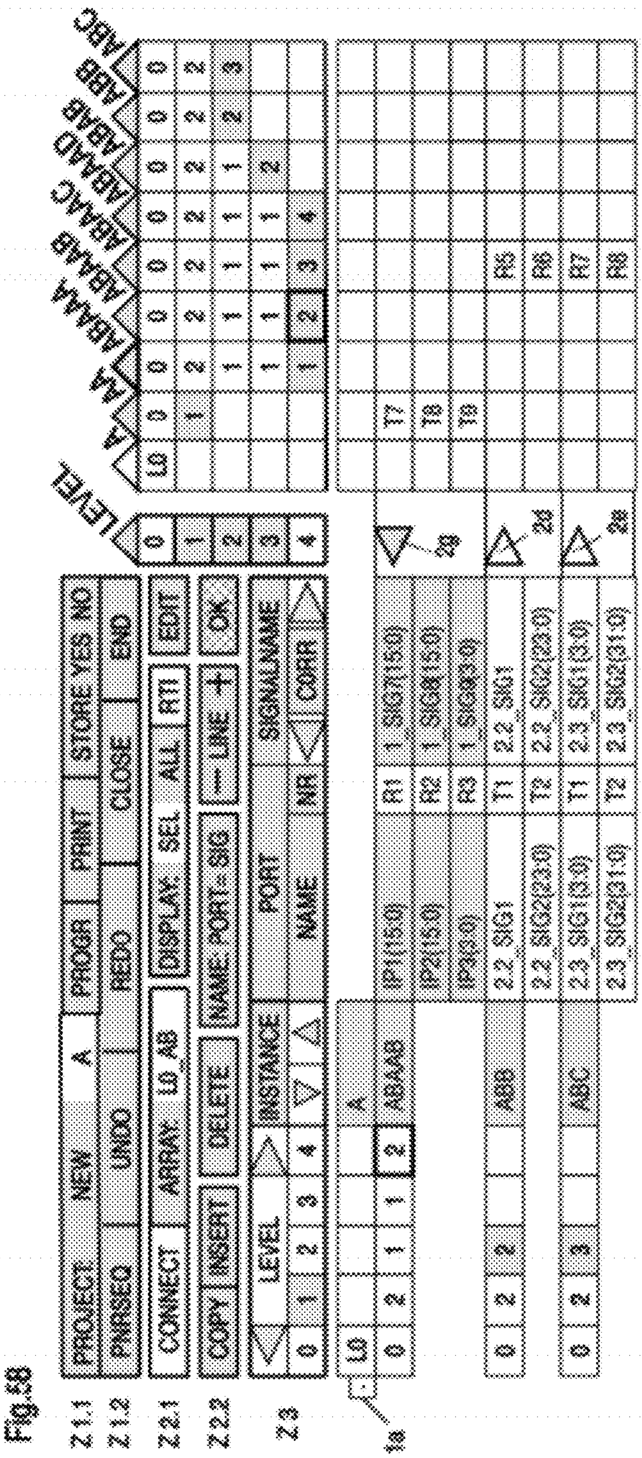
Figure 59:
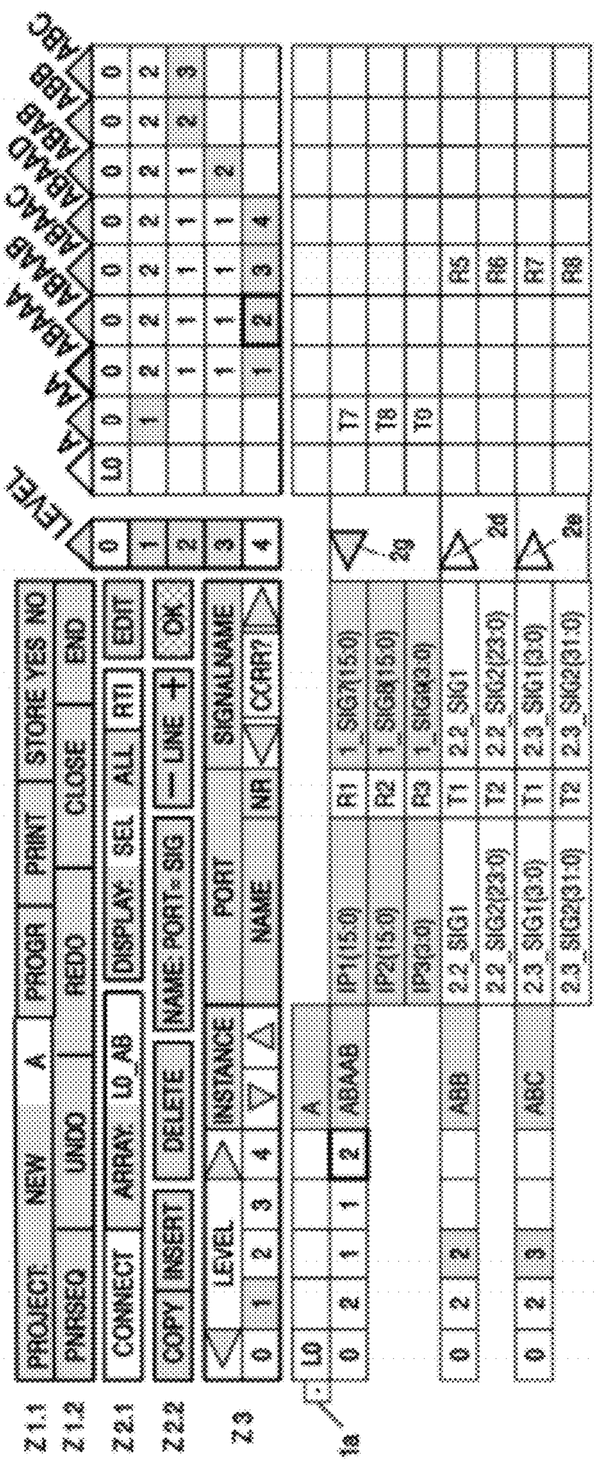
Figure 60:
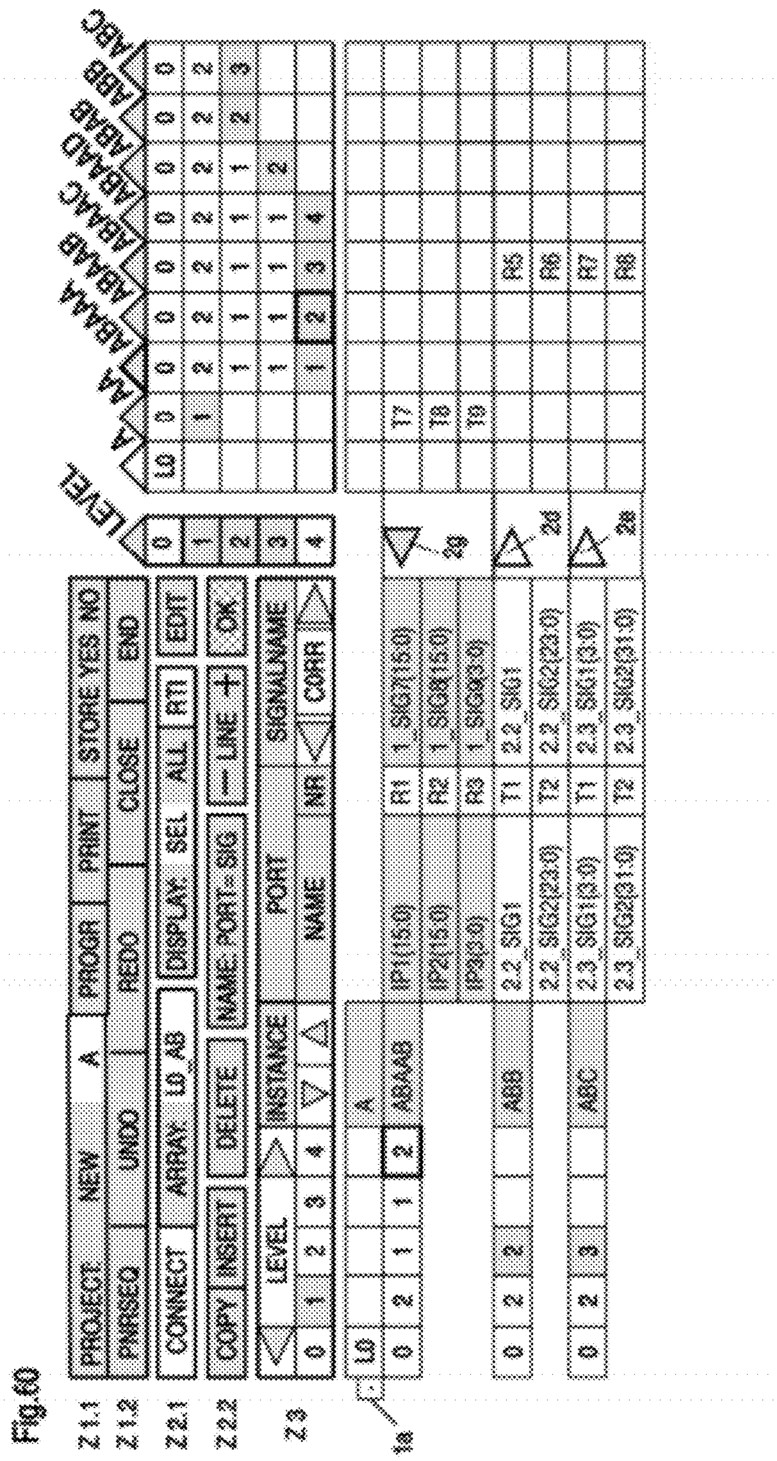
Figure 61:
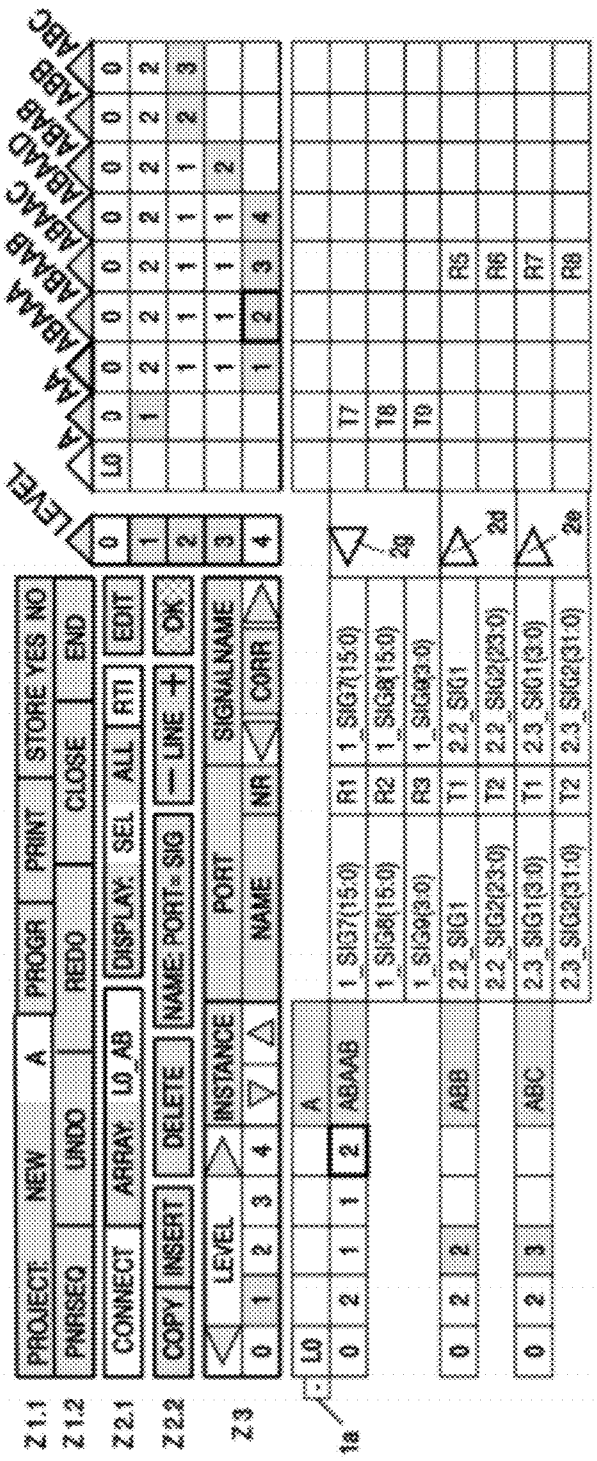
Figure 62:
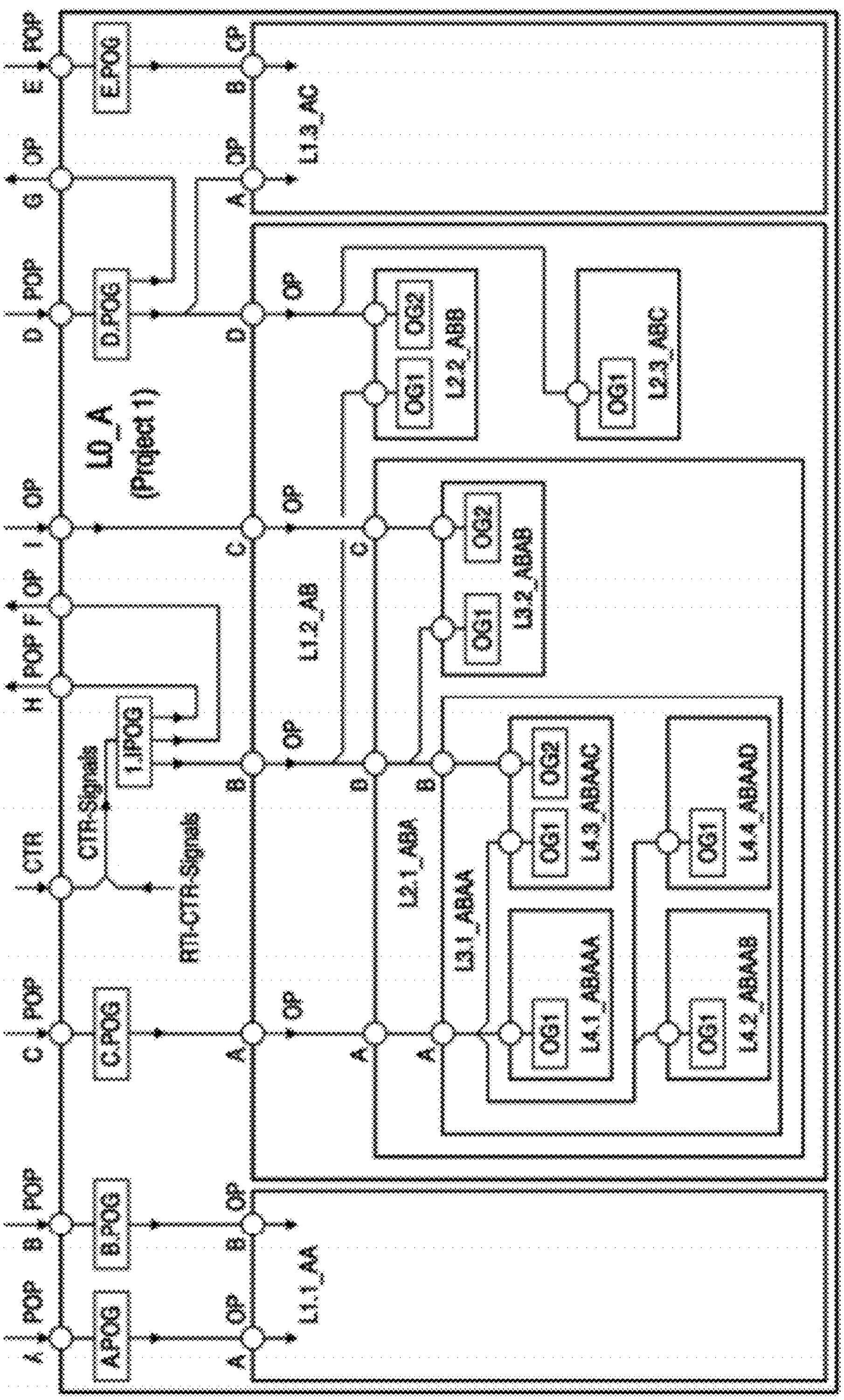
Figure 63:
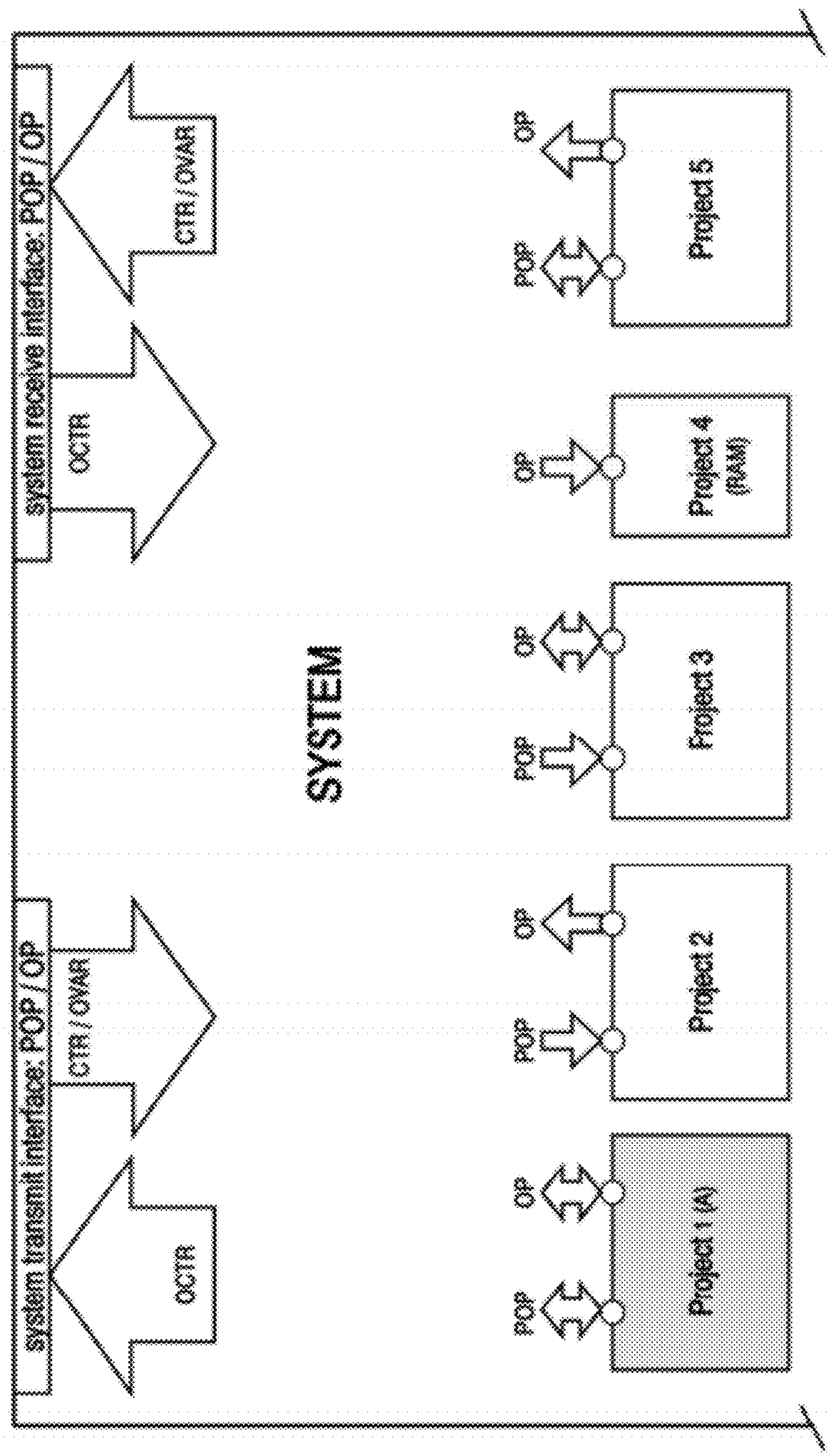
Figure 64:
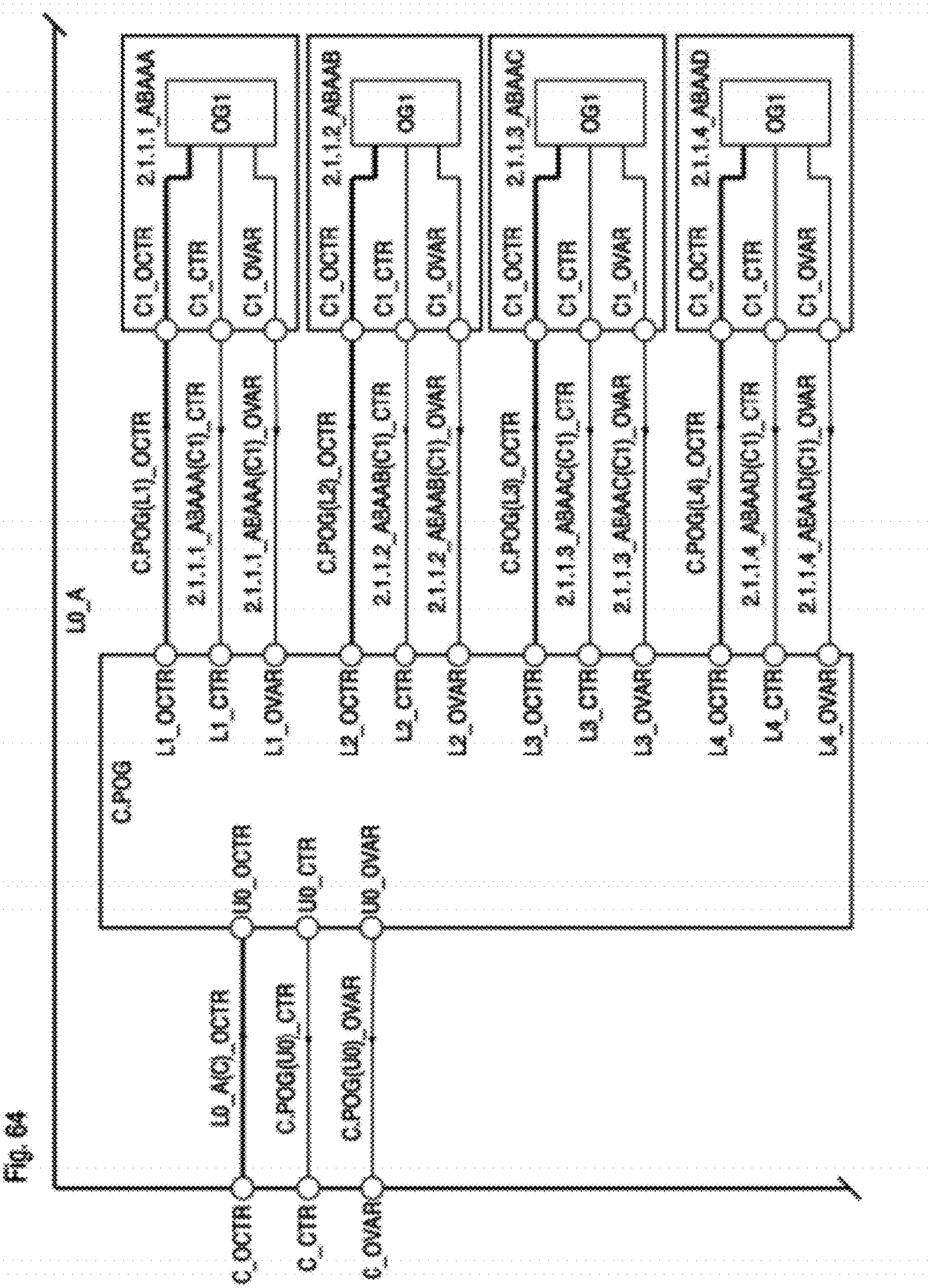
Figure 65:
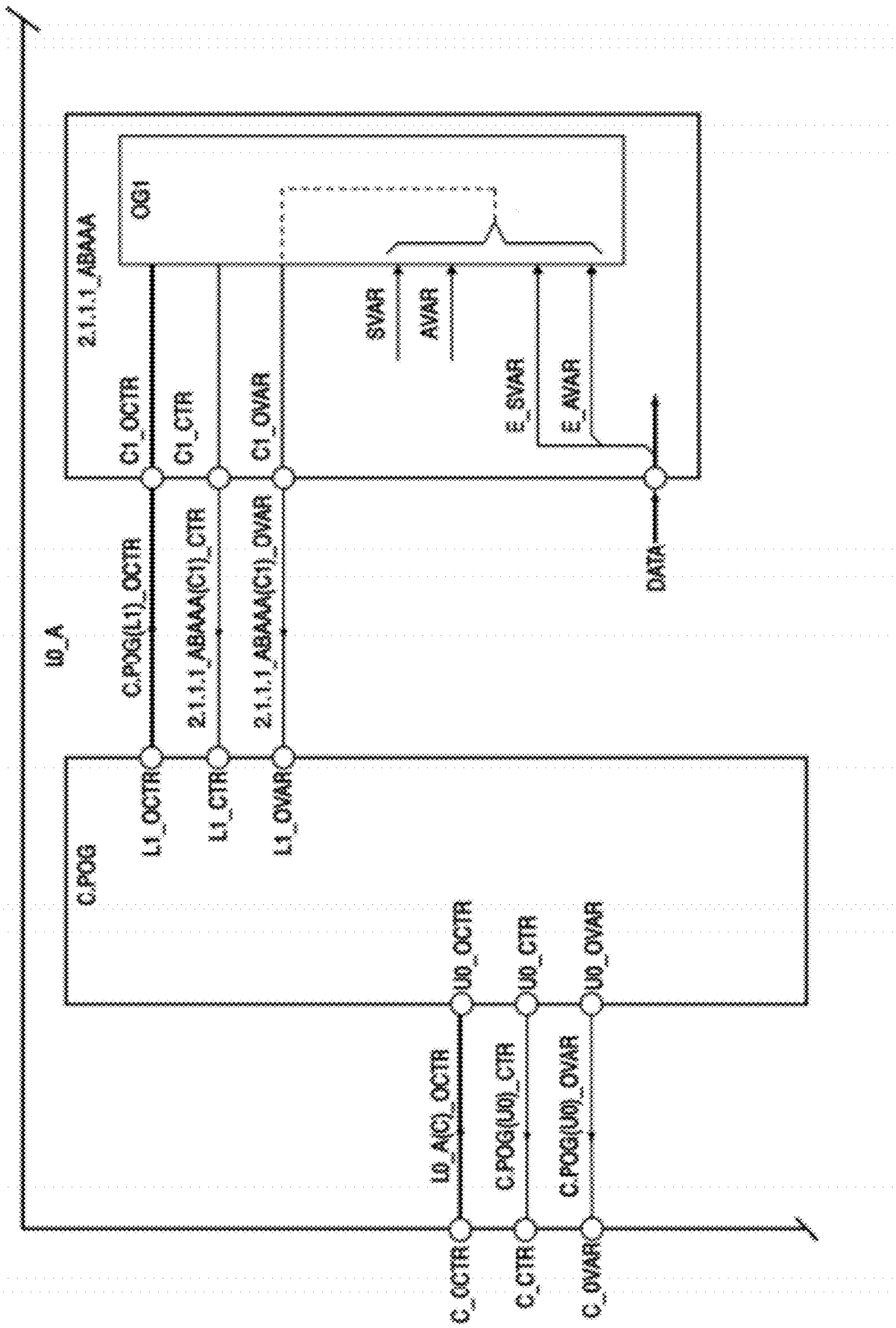
Figure 66:
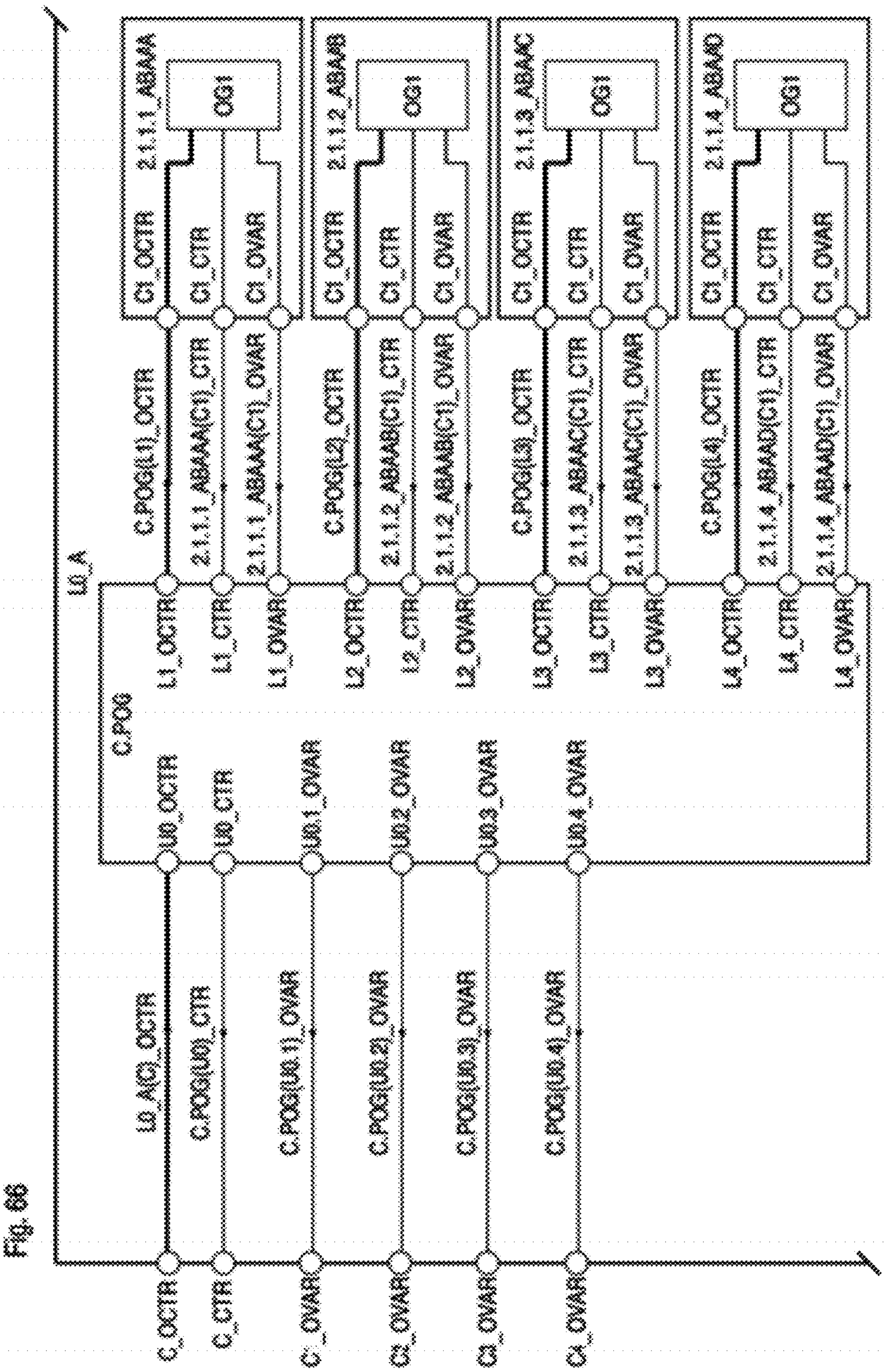
Figure 72:
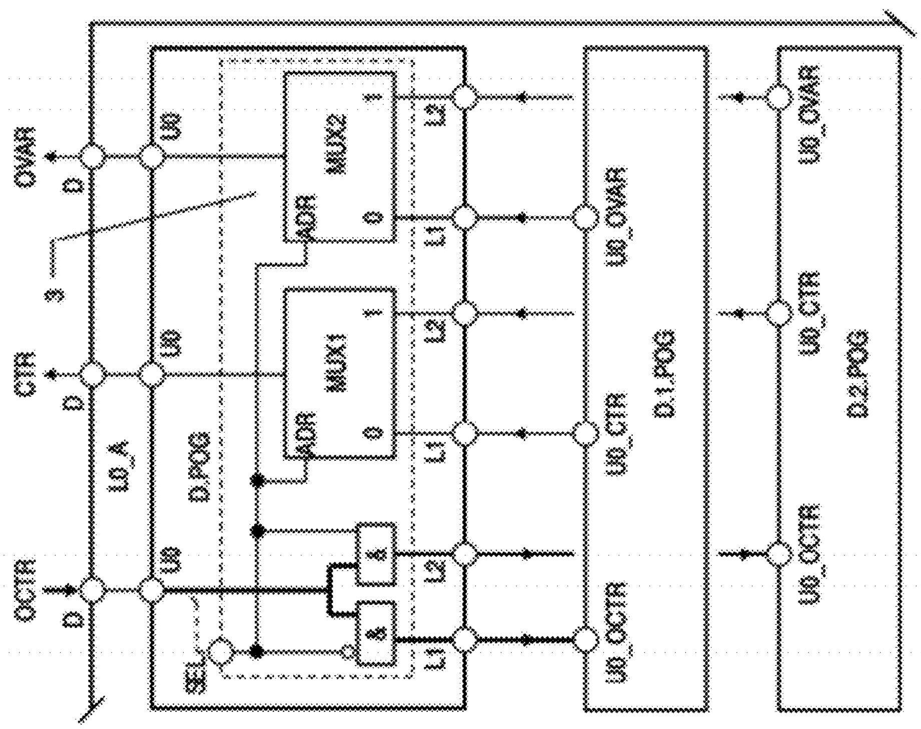
Figure 73:
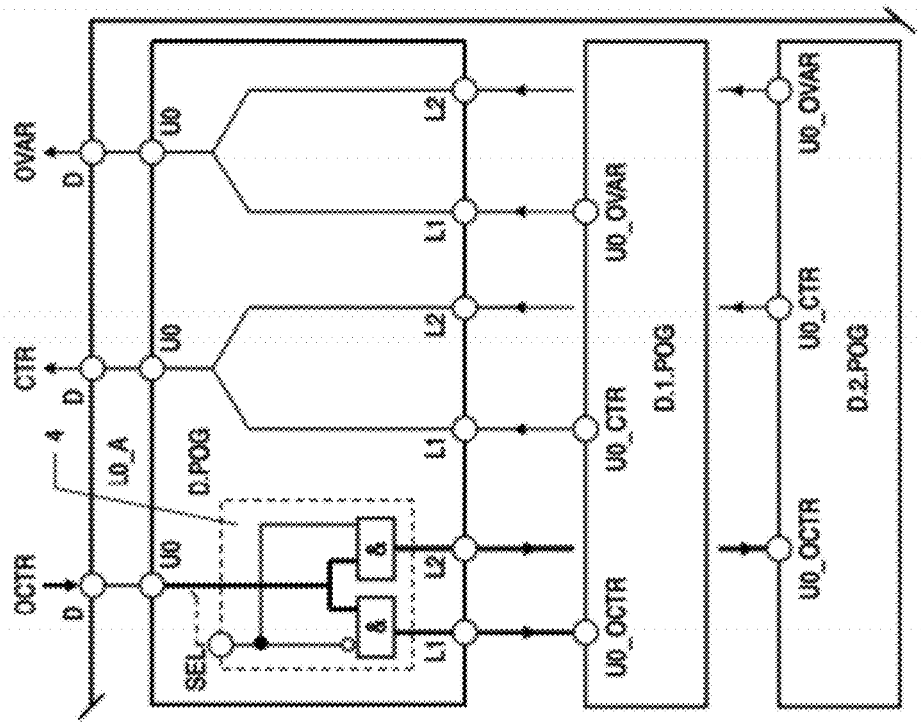
Figure 74:
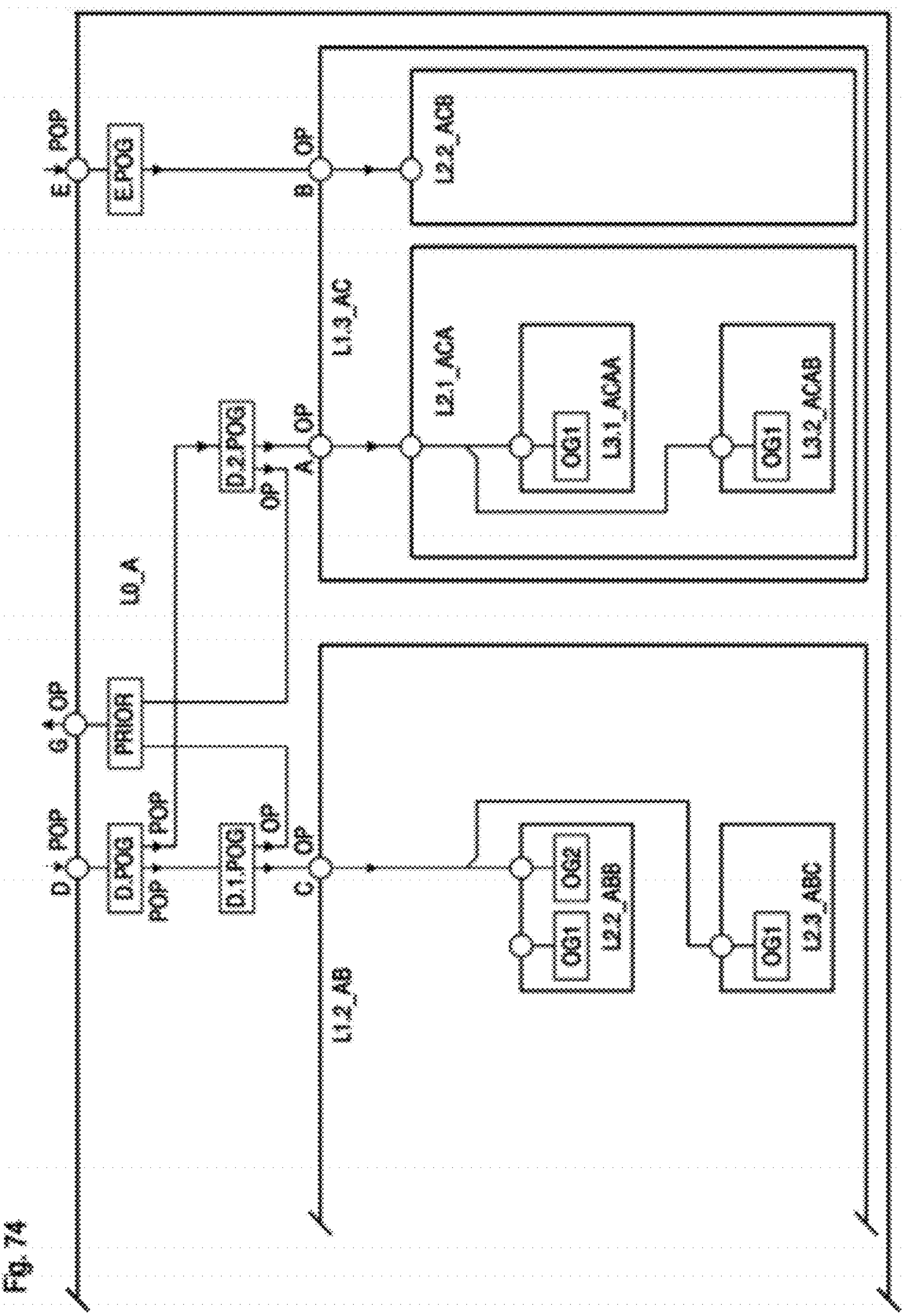
Figure 75:
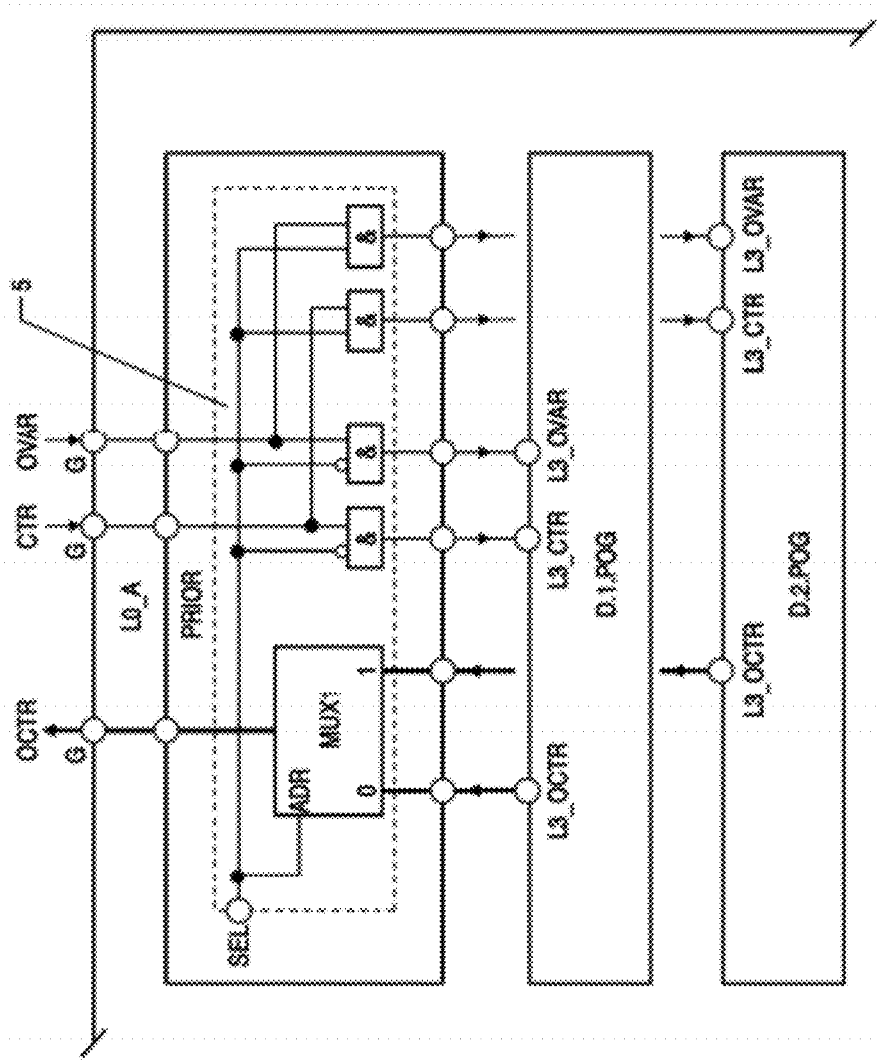
Figure 76:
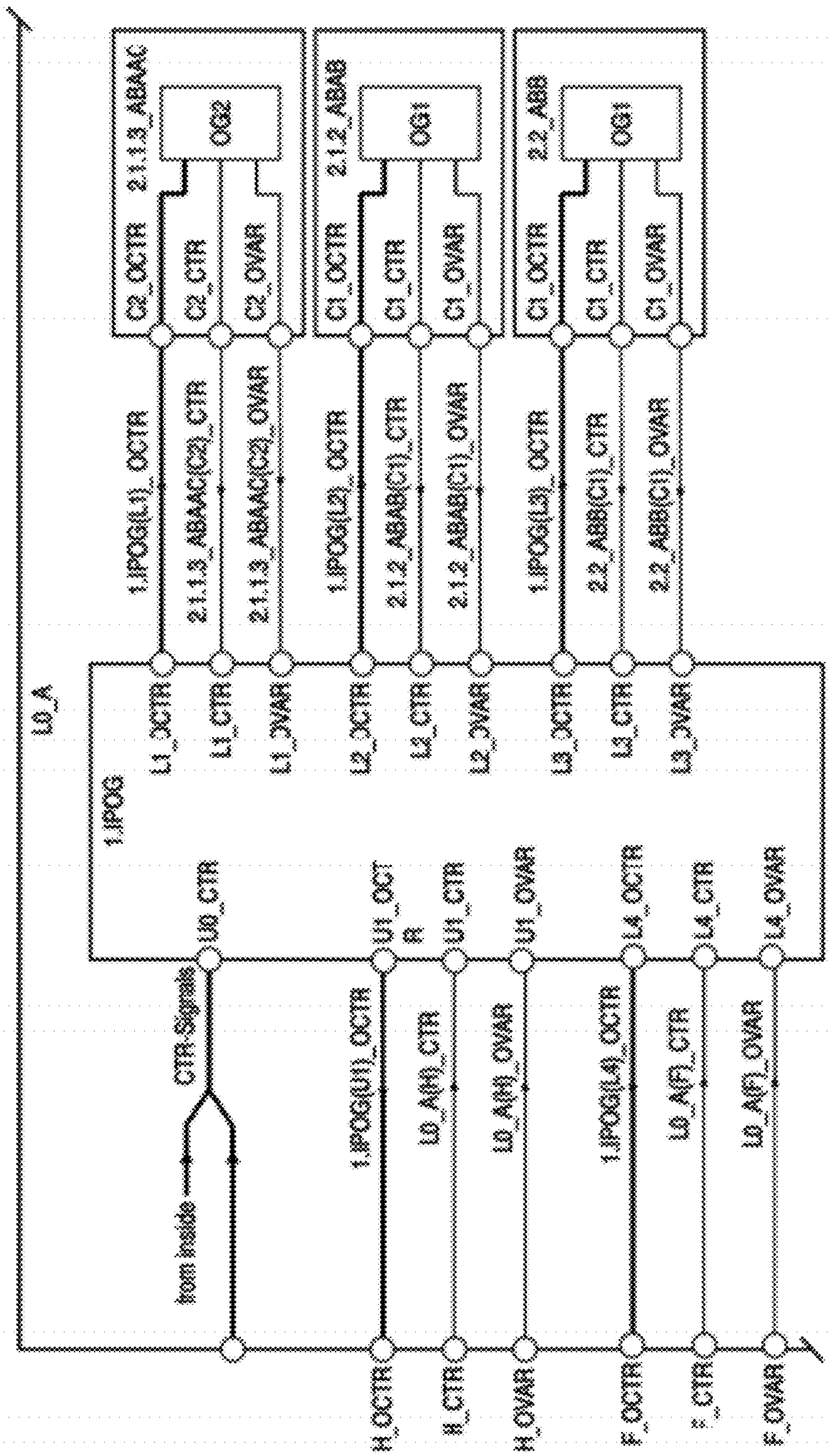
Figure 77:
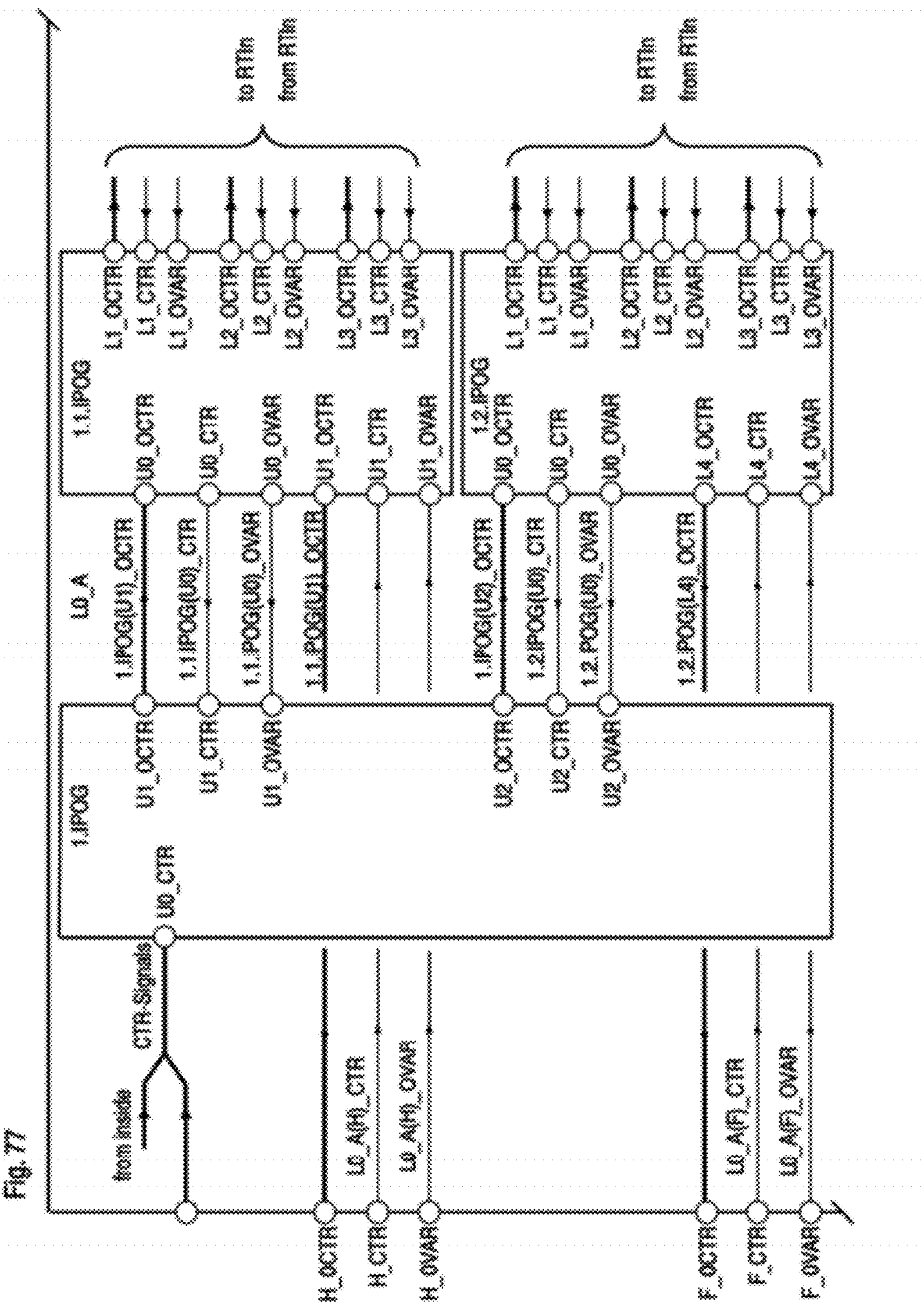
Figure 78:
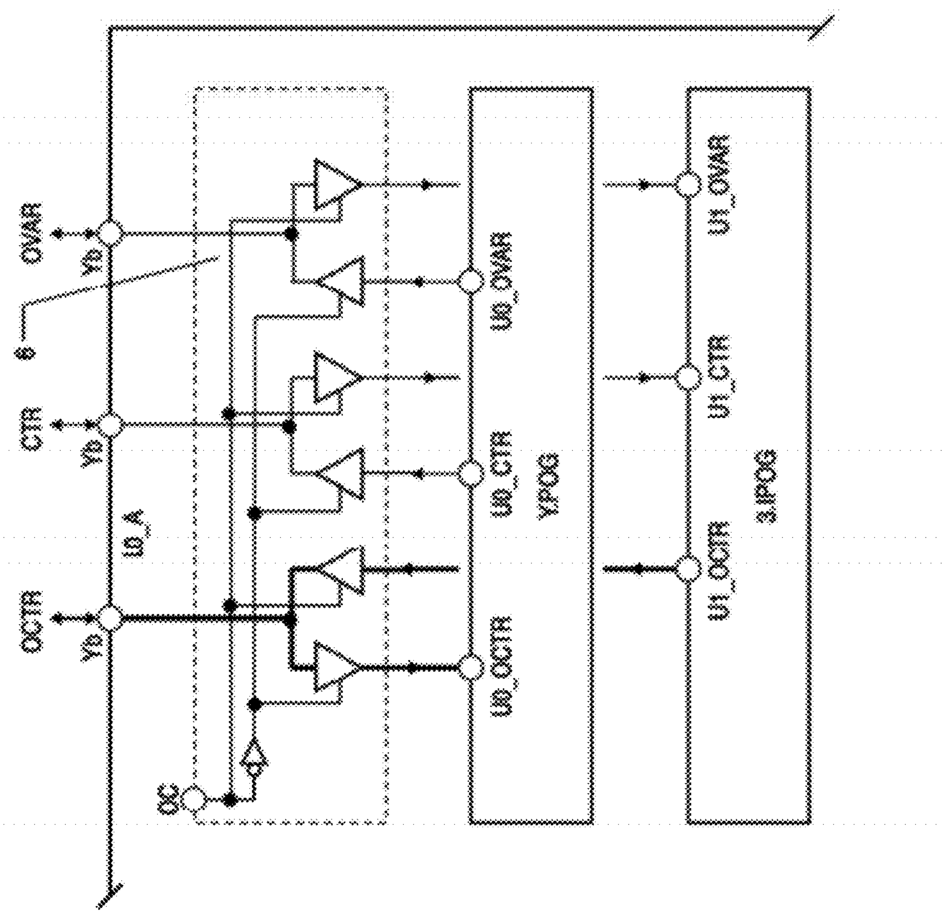
Figure 79:
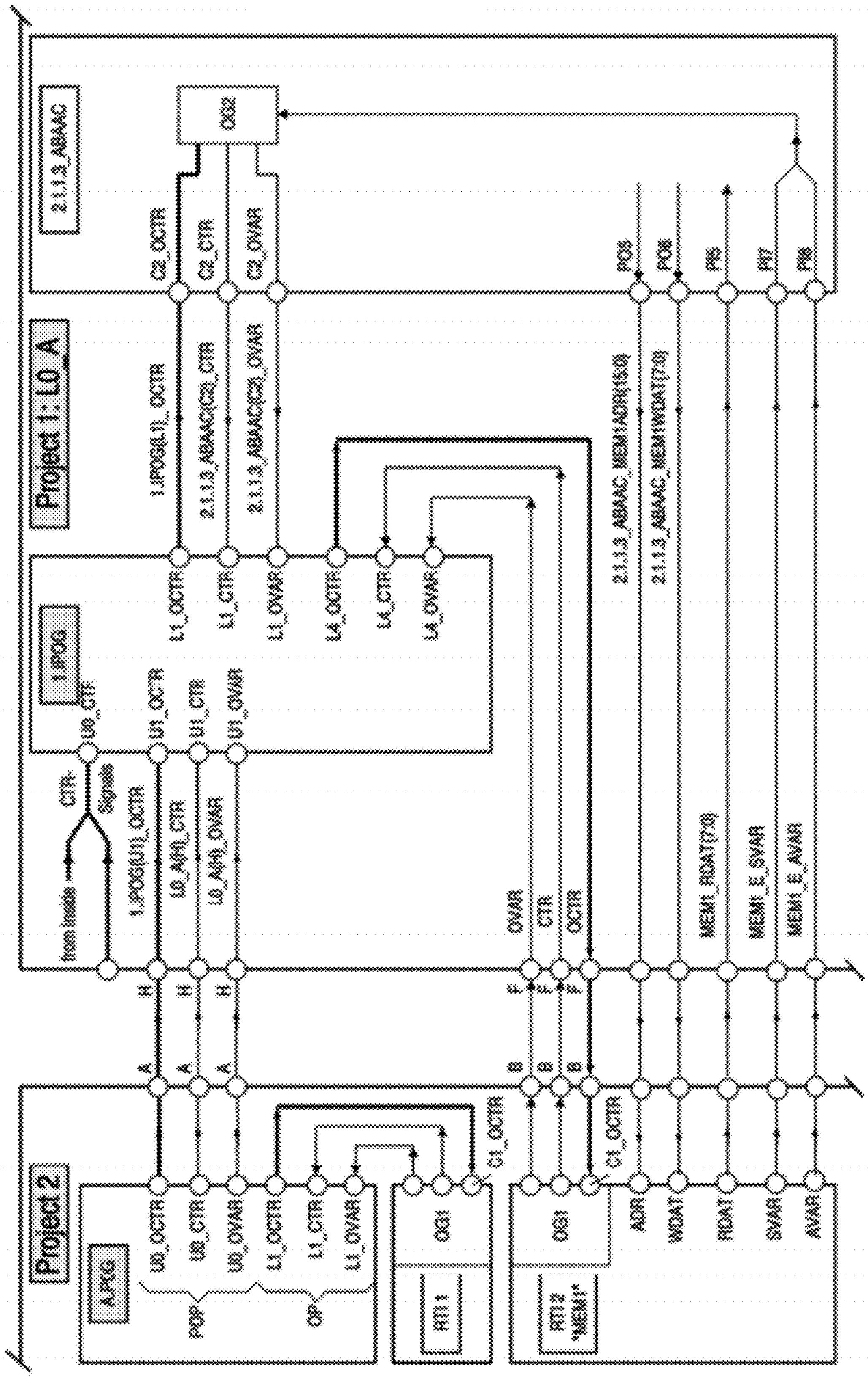
Figure 99A:
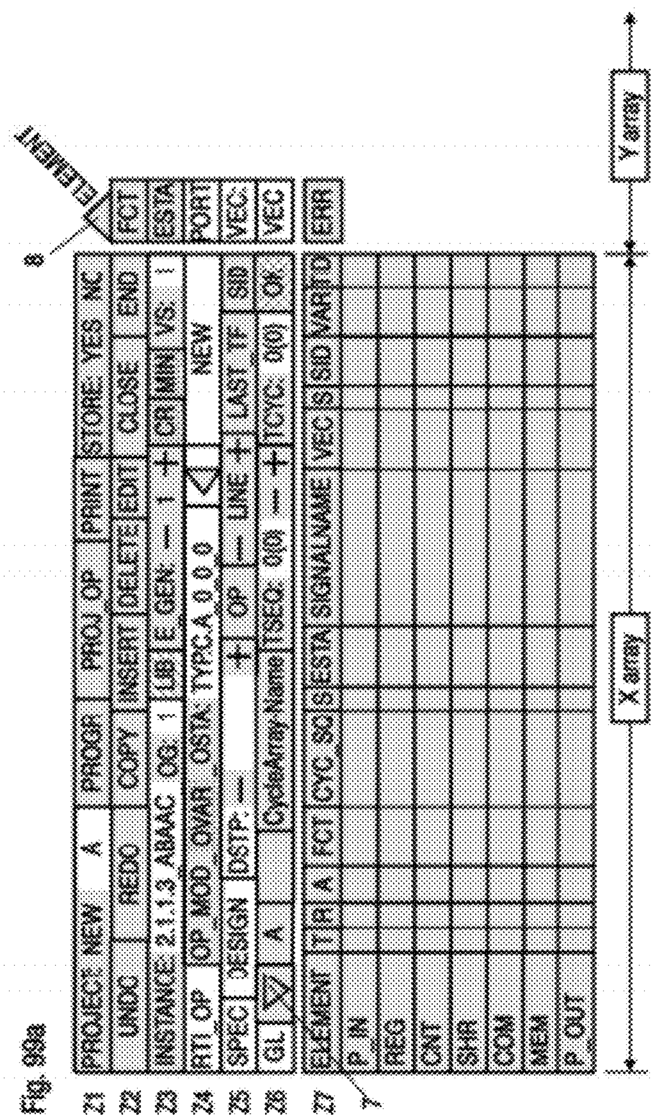
Figure 99B:
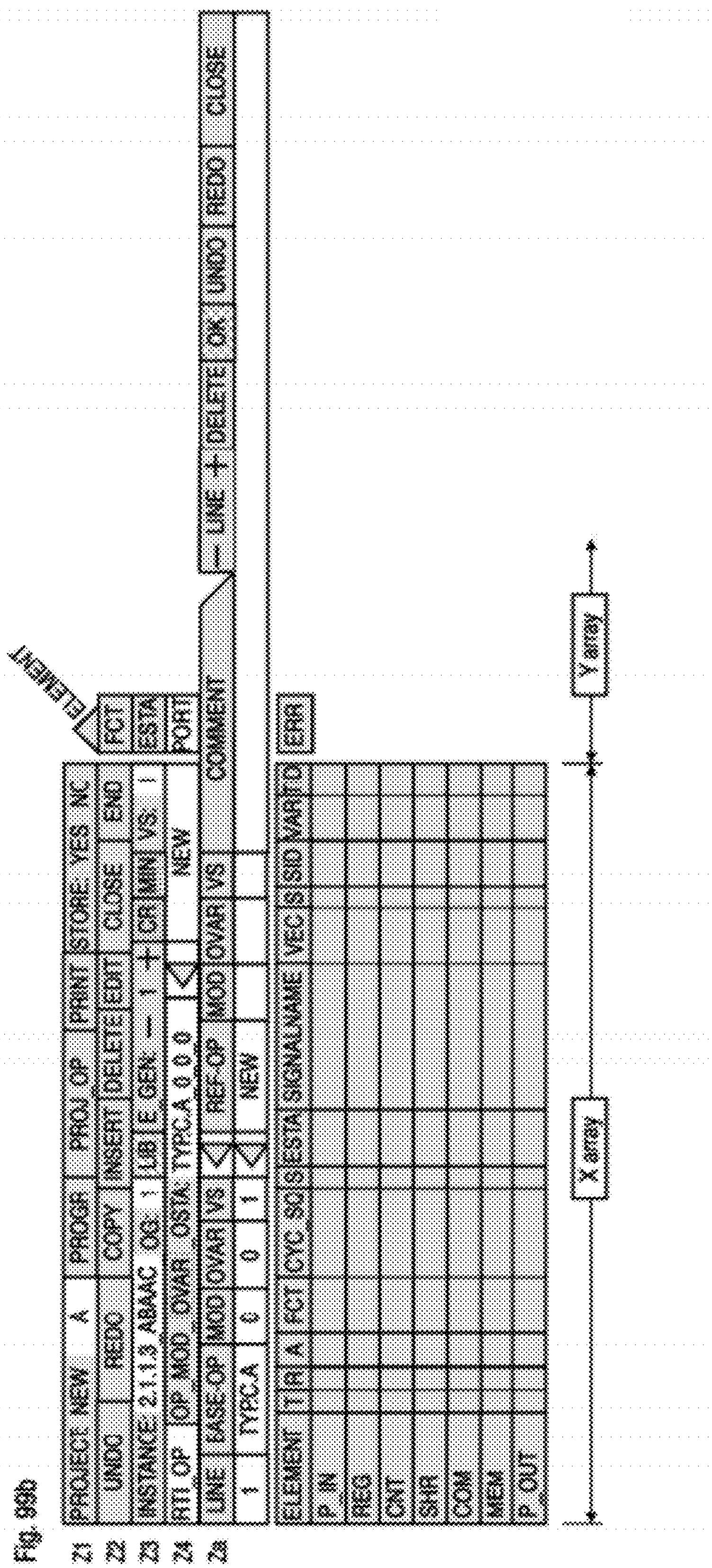
Figure 99C:
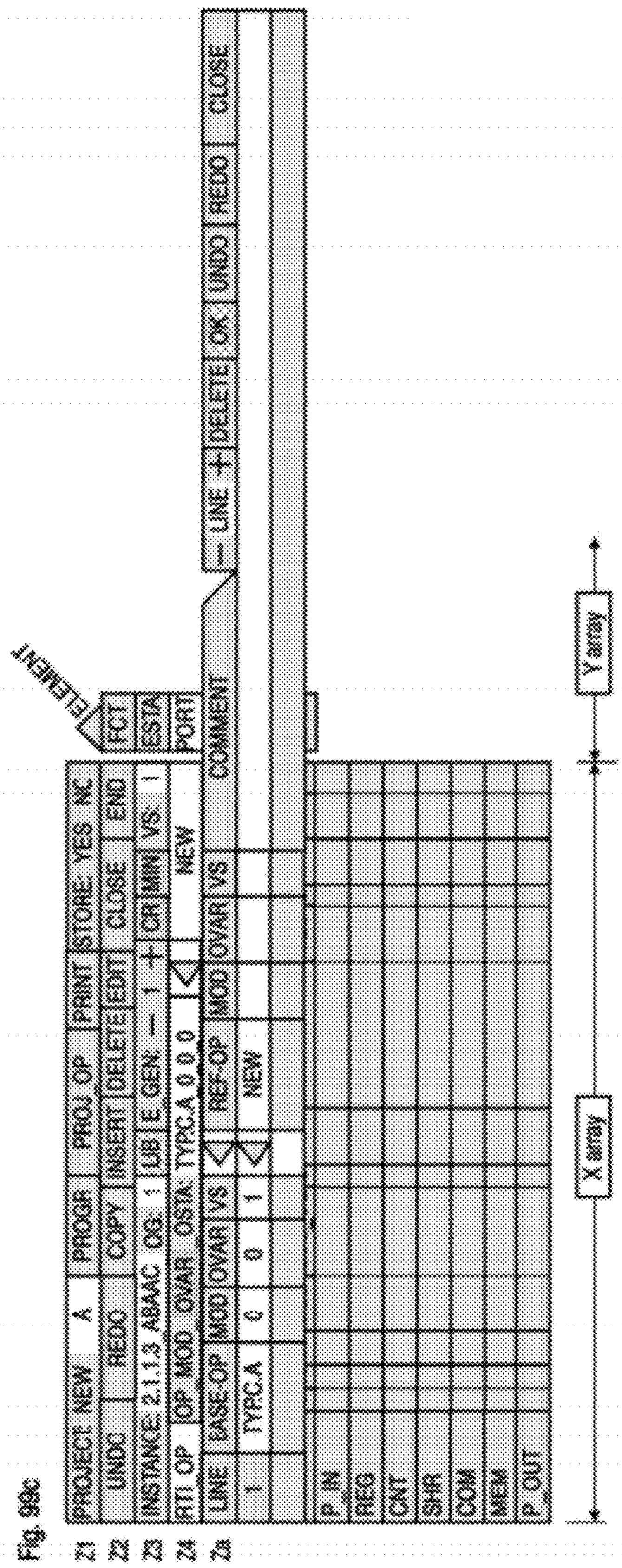
Figure 99D:
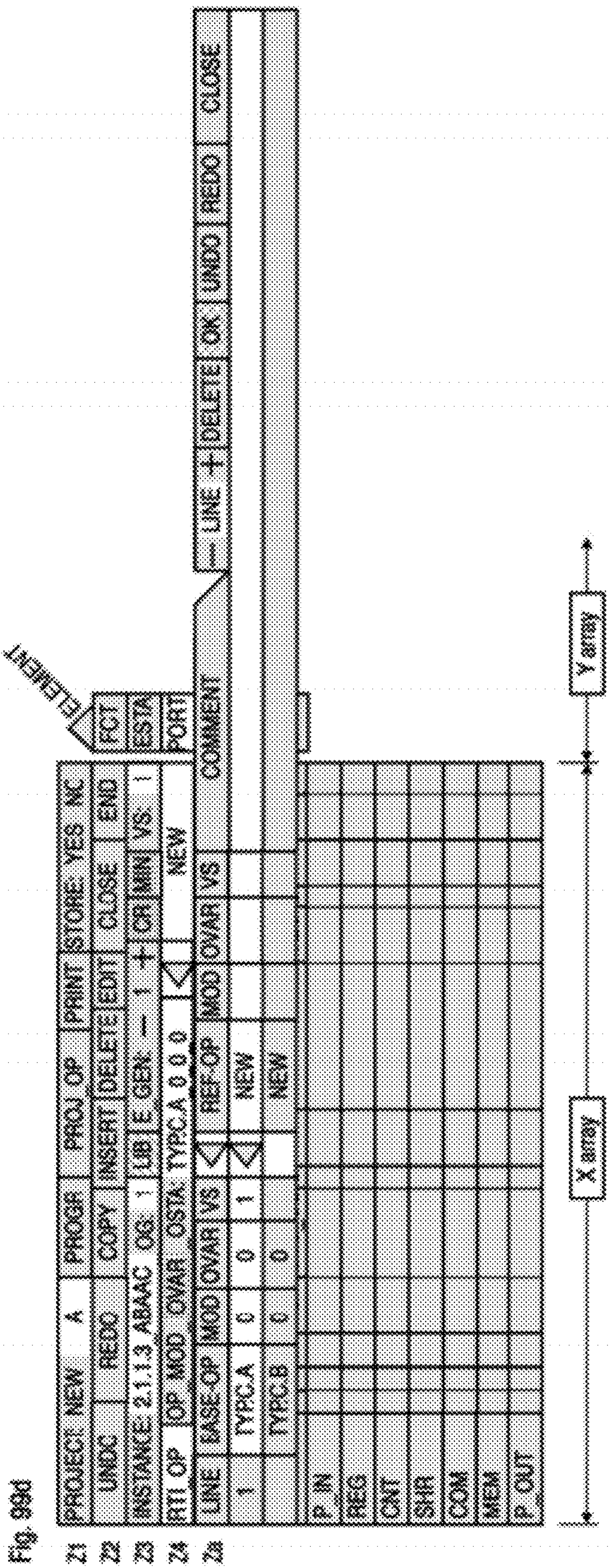
Figure 99E:
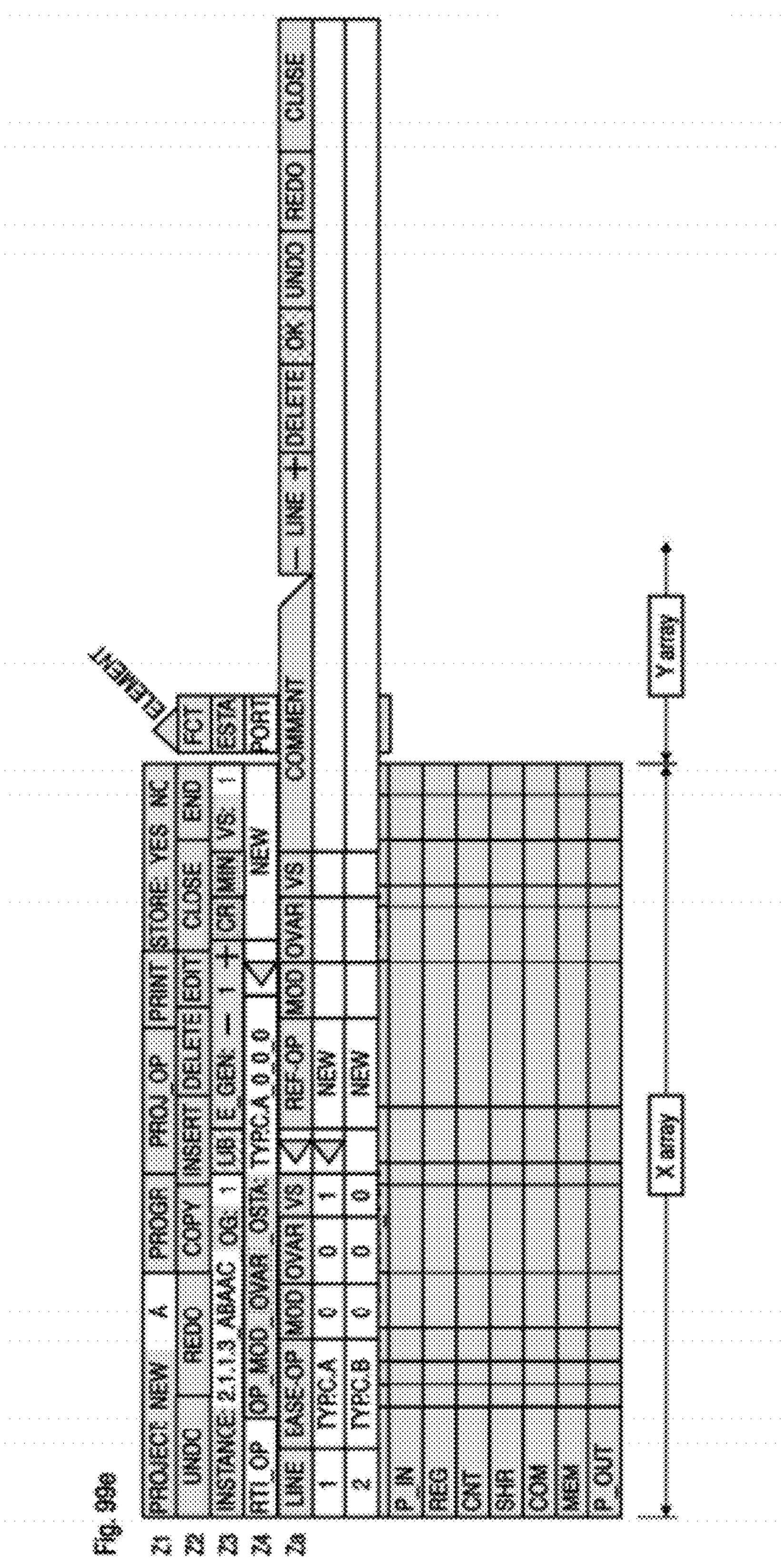
Figure 99F:
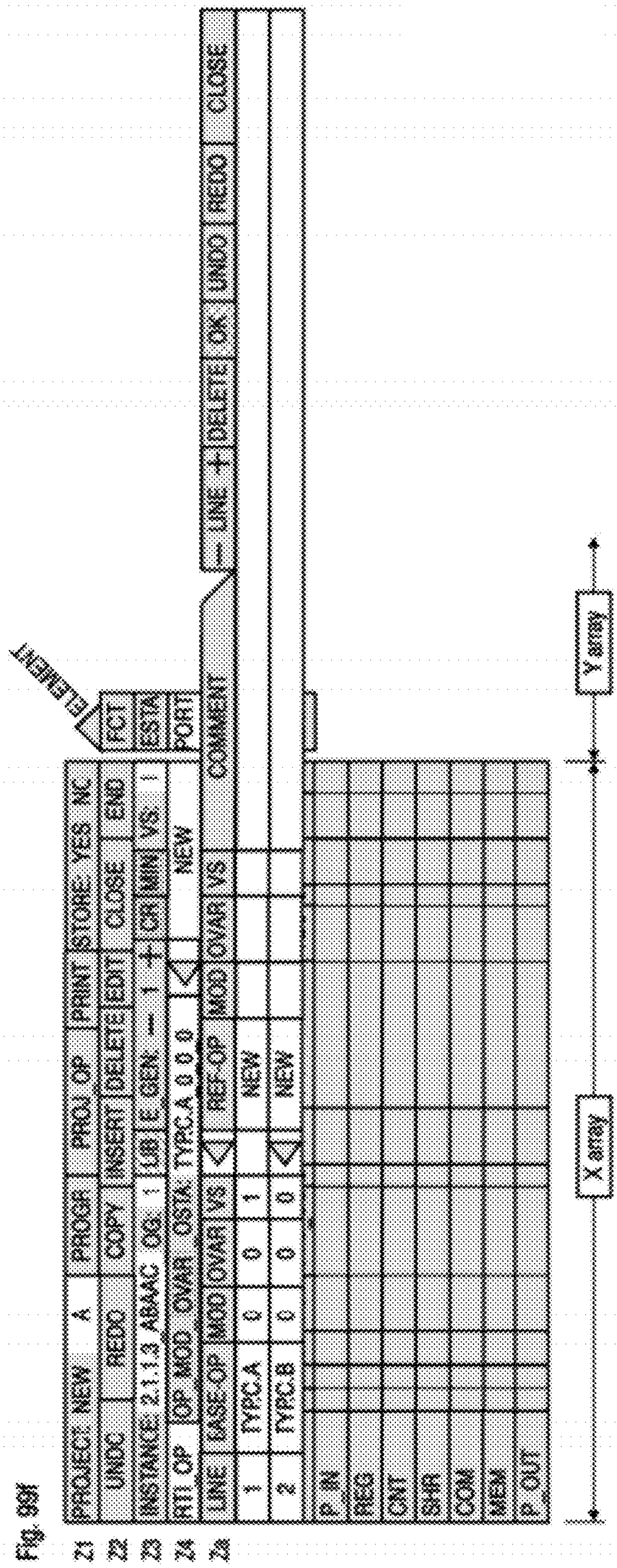
Figure 99G:
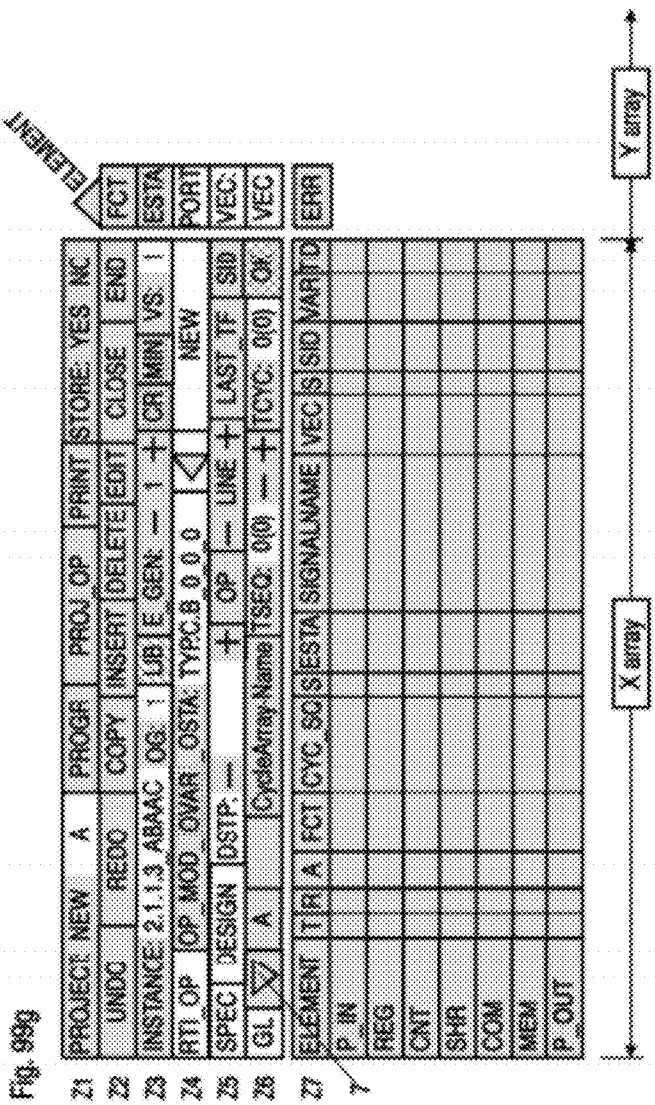
Figure 99H:
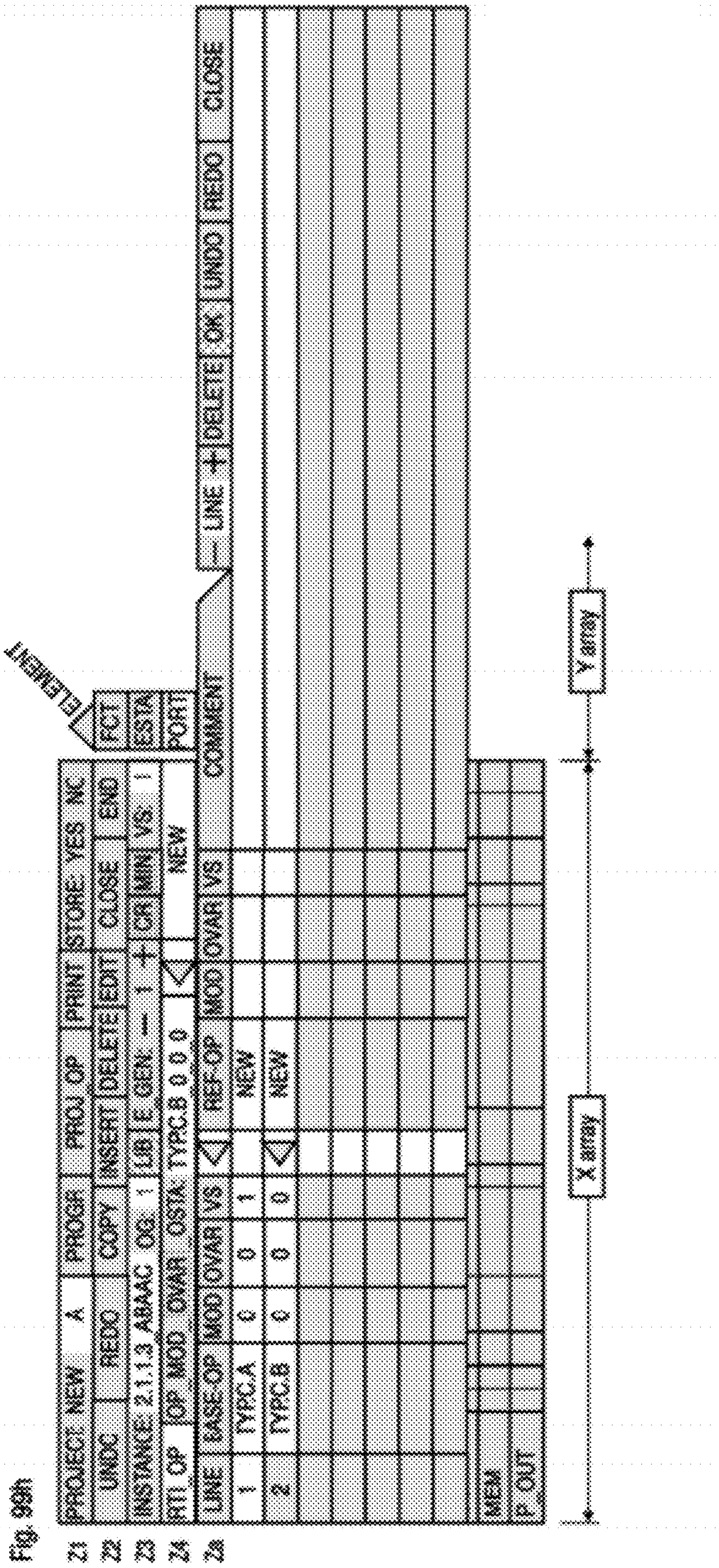
Figure 99I:
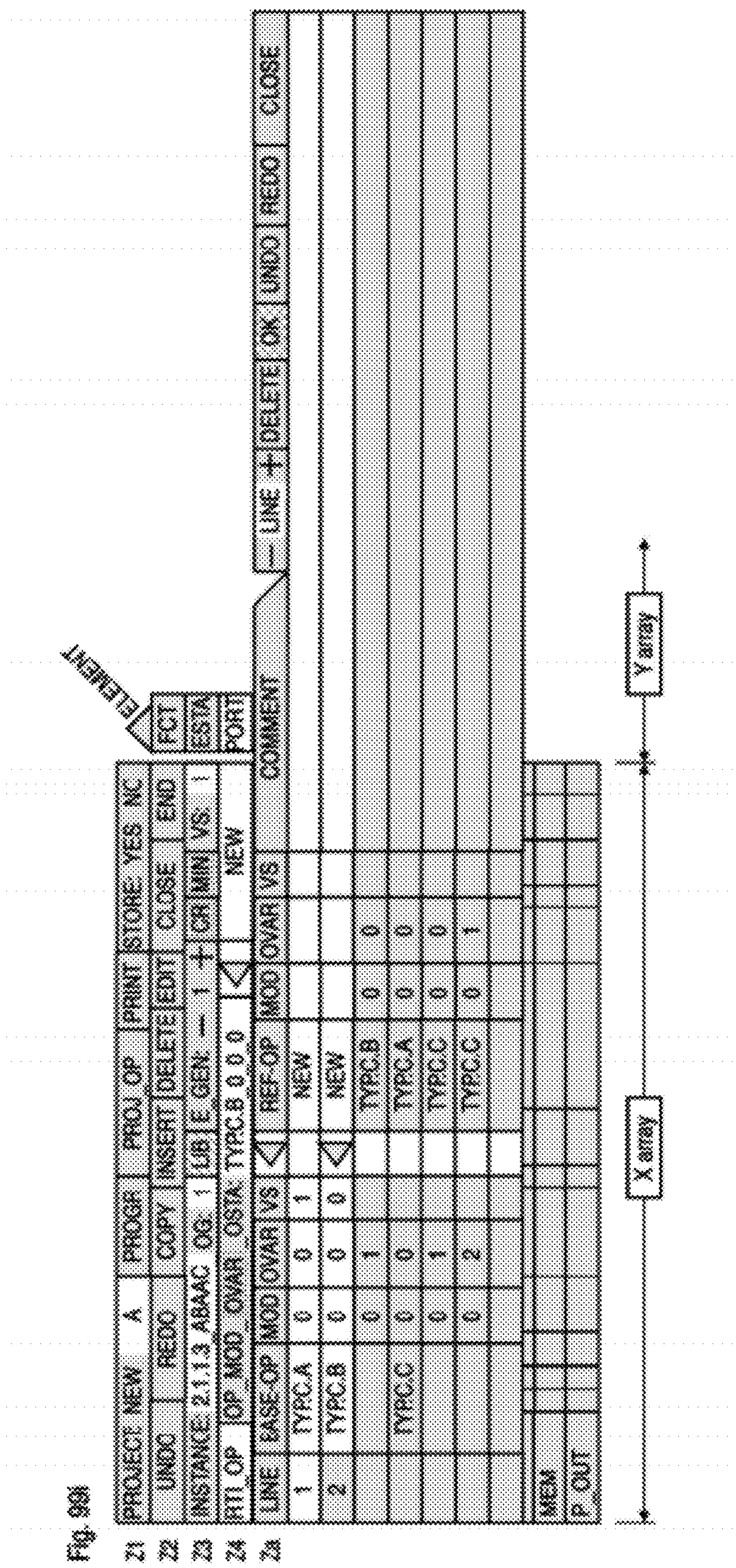
Figure 99K:
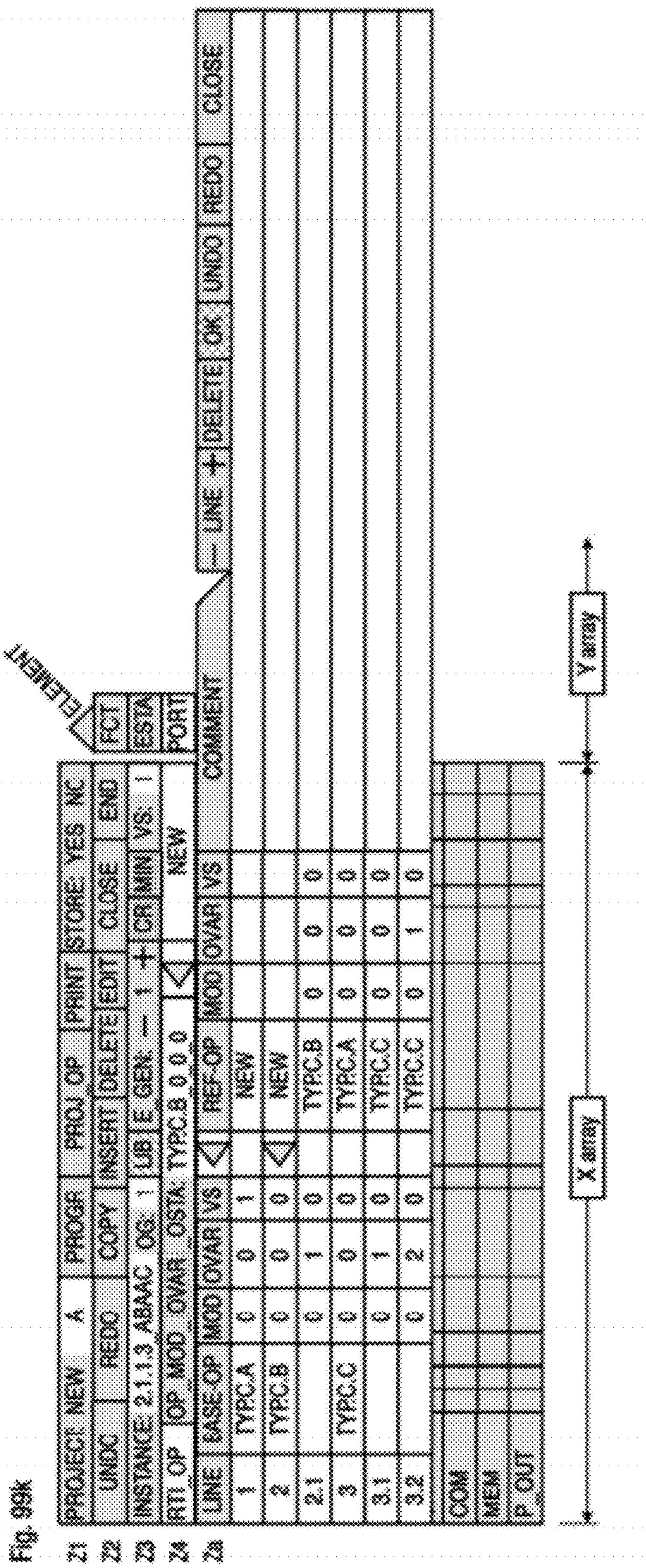
Figure 99I:
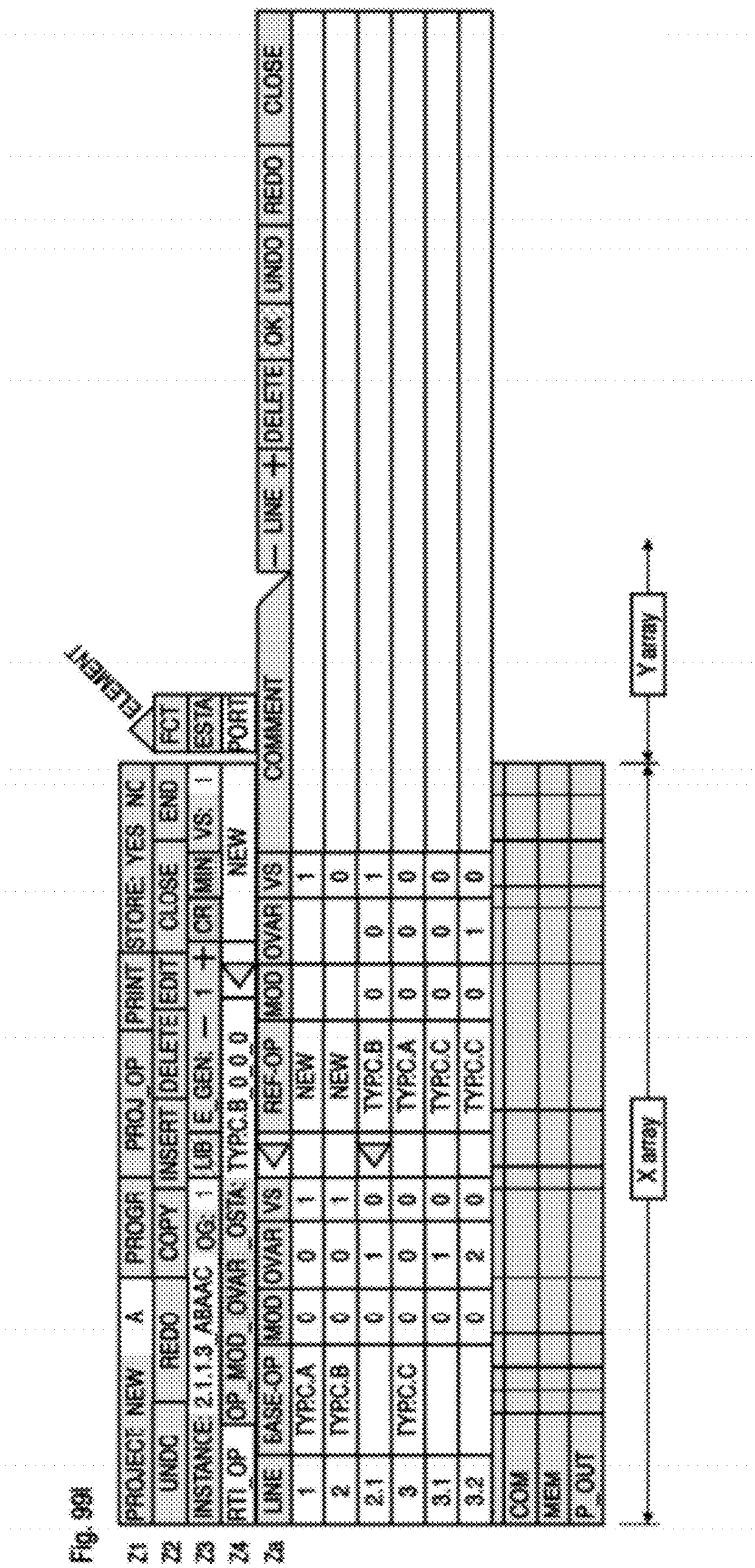
Figure 99M:
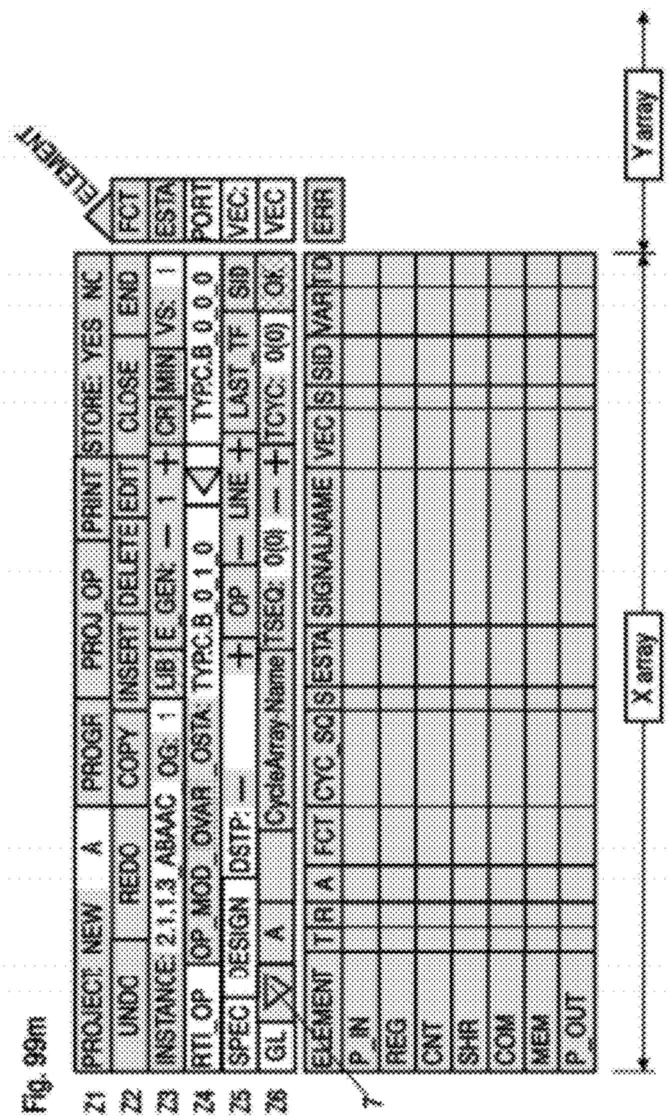
Figure 99N:
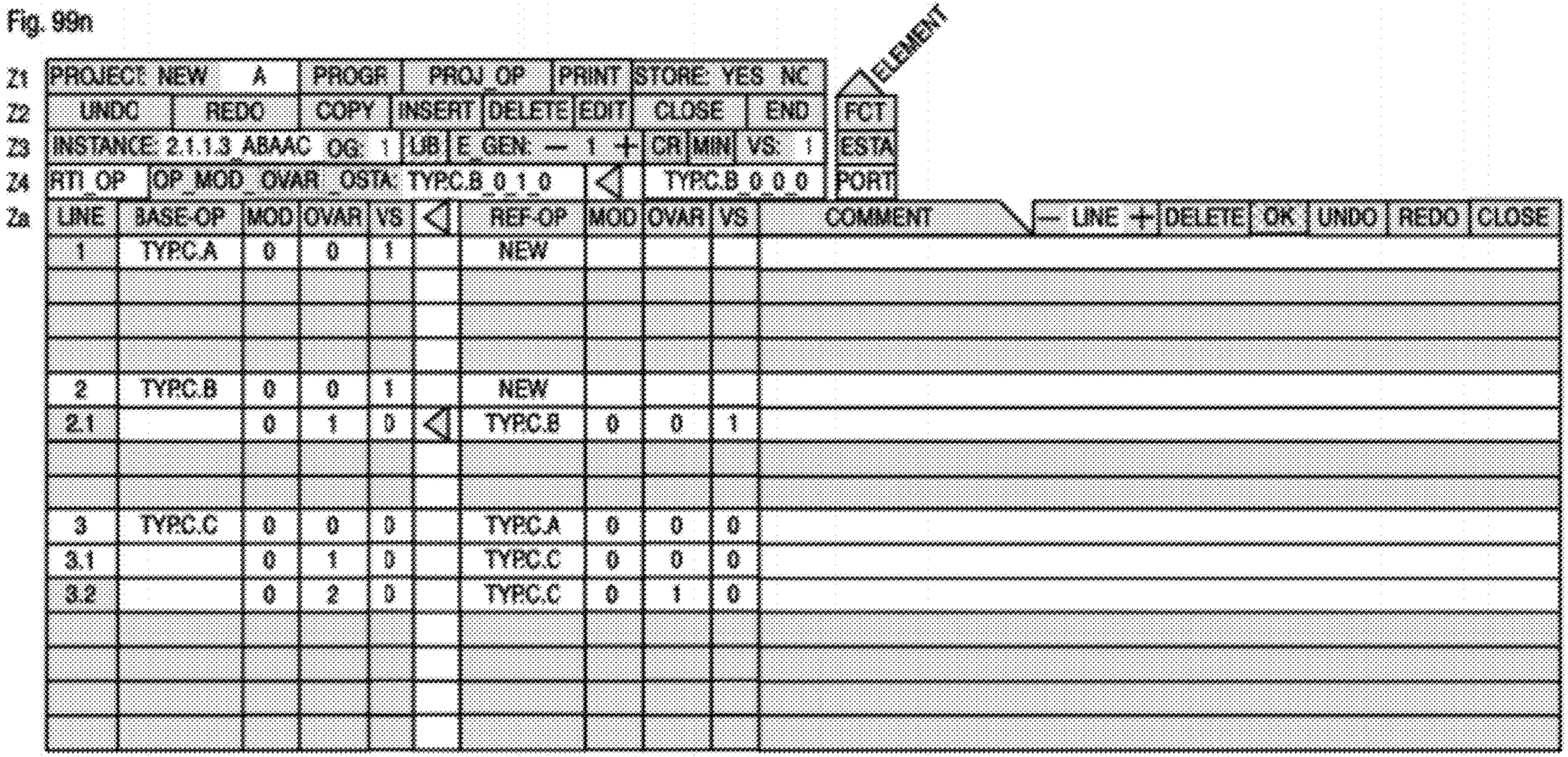
Figure 99O:
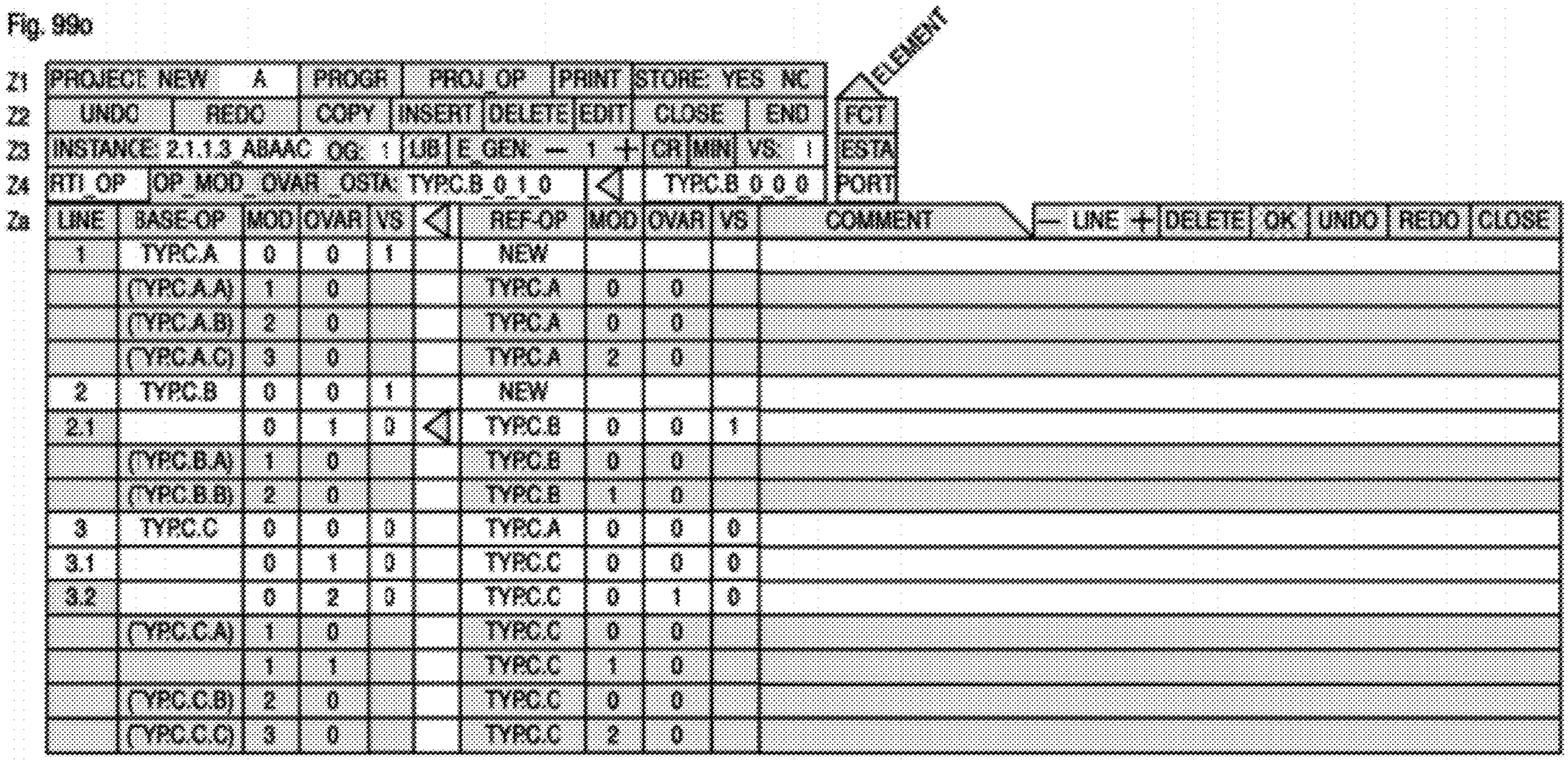
Figure 99Q:
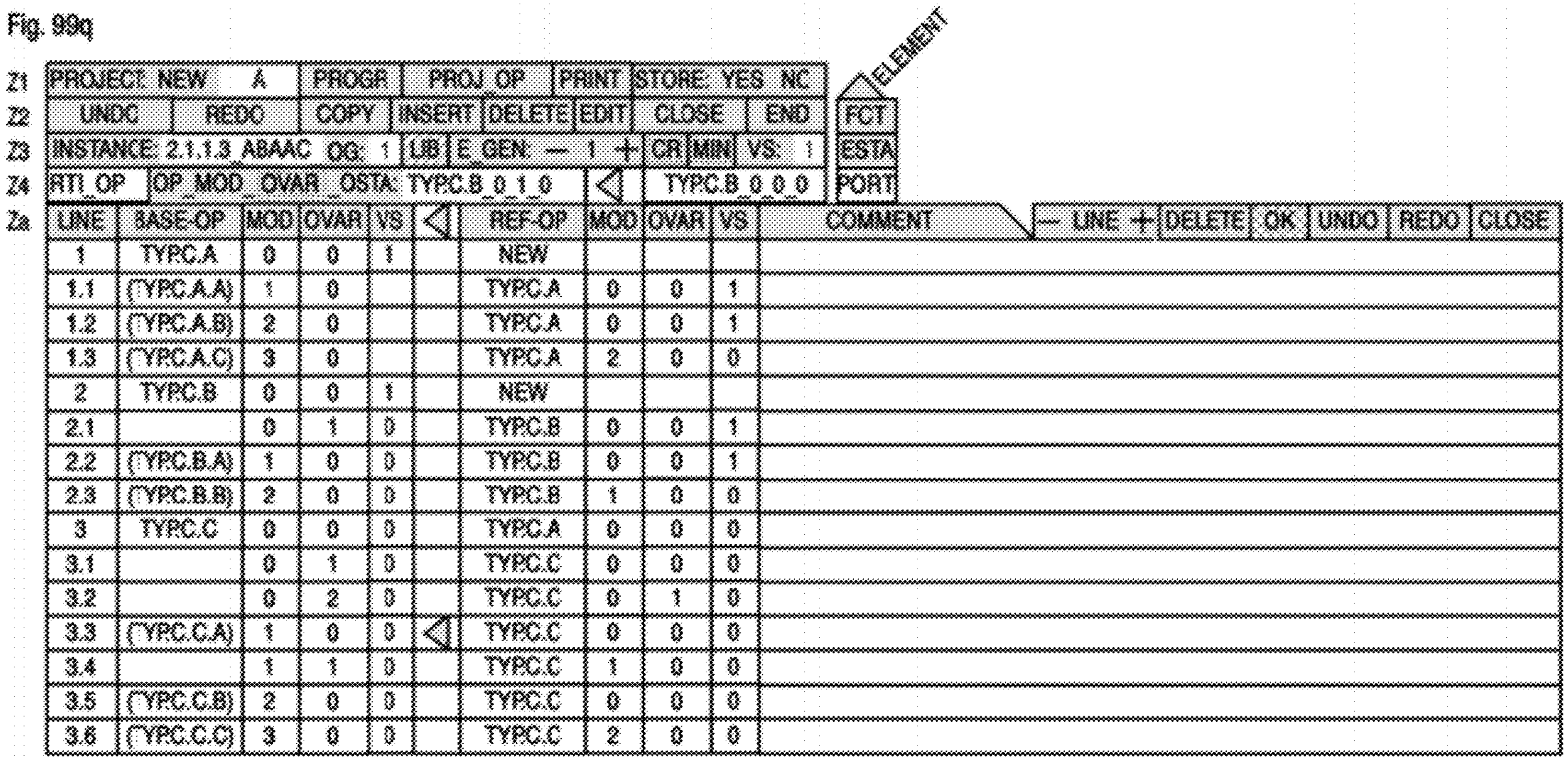
Figure 99F:
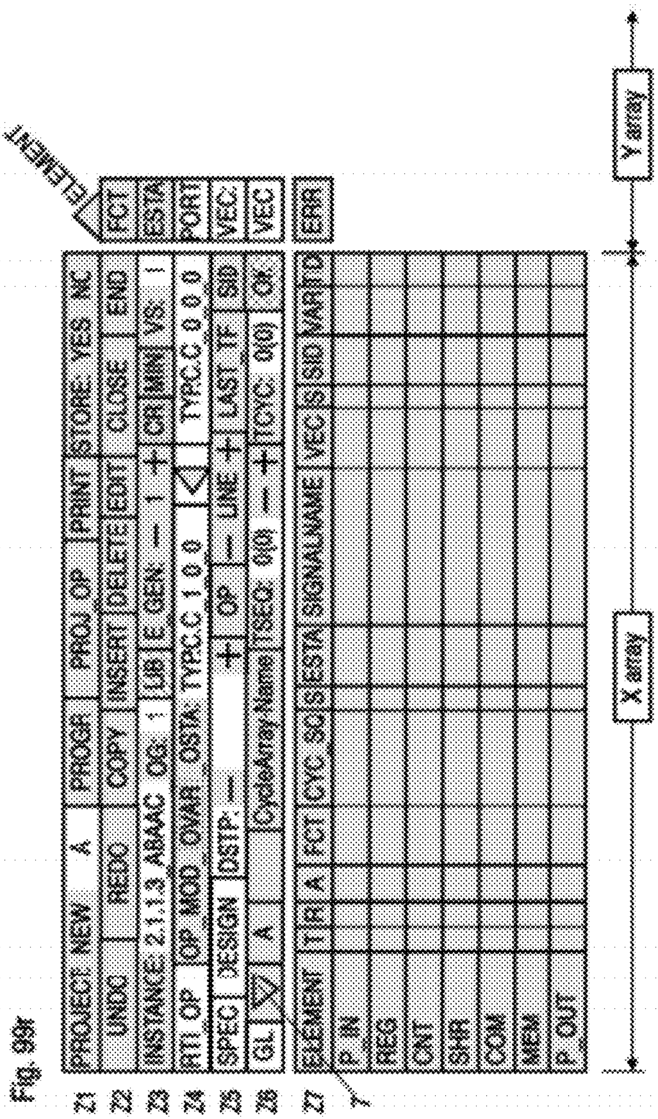
Figure 99S:
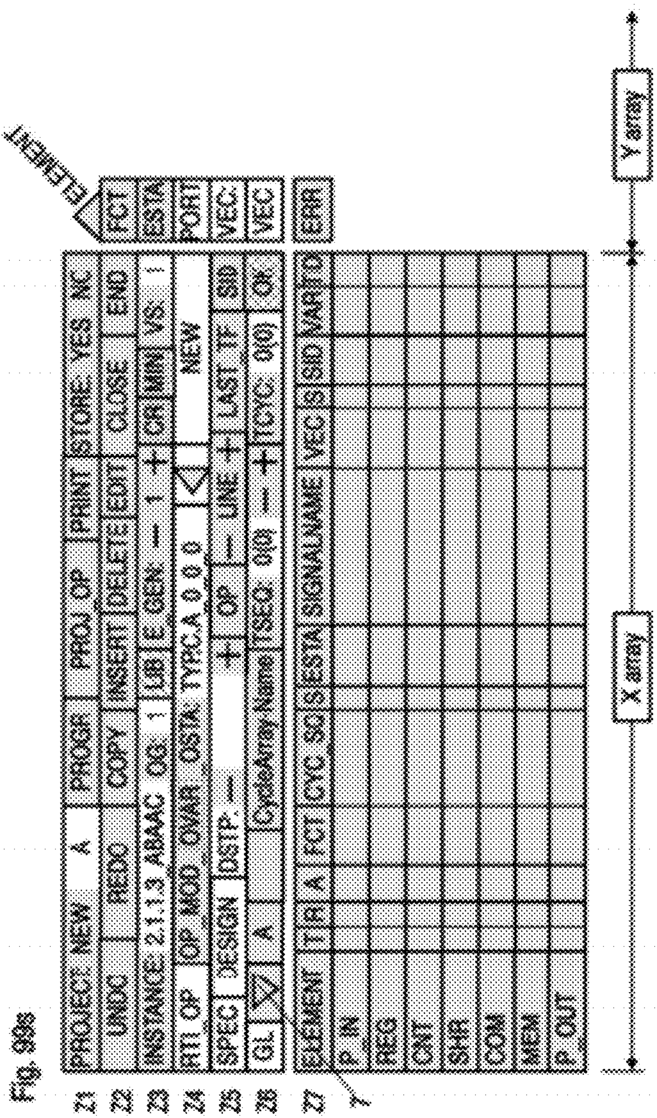
Figure 229A:
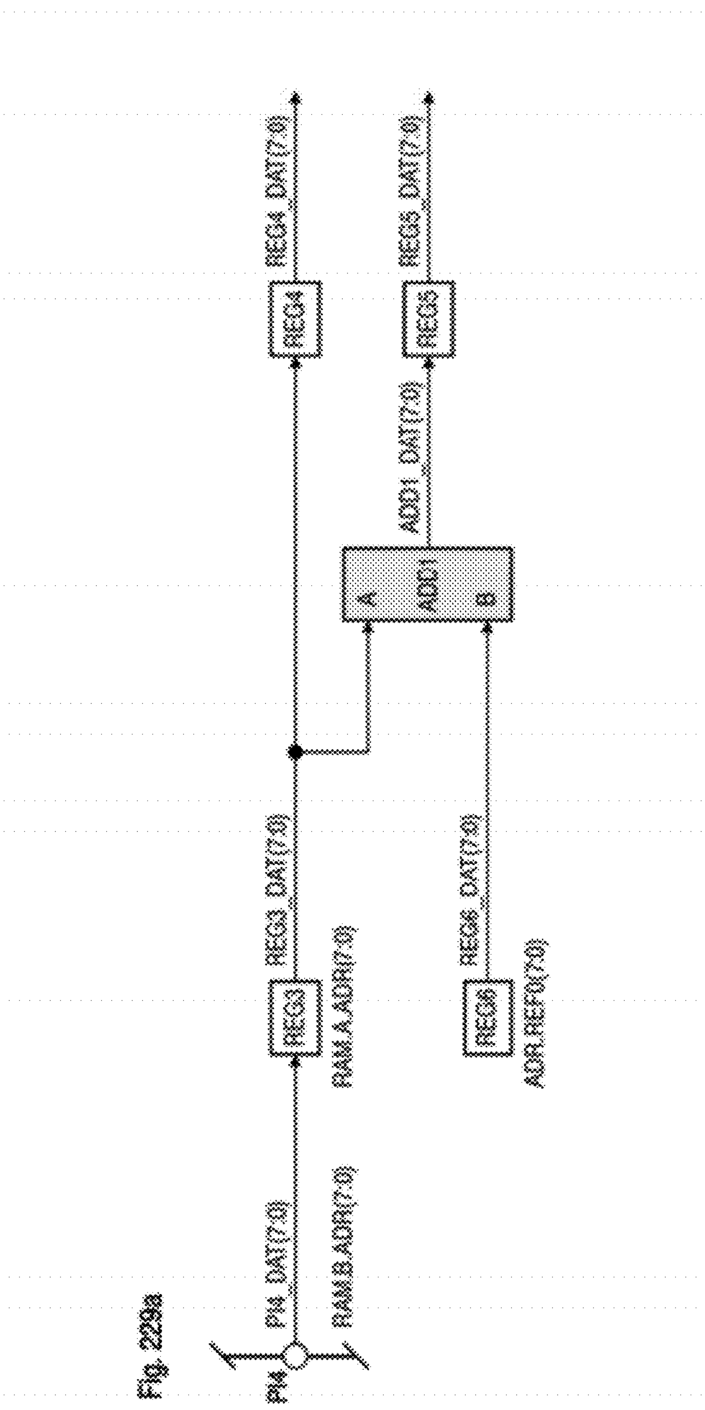
Figure 229B:
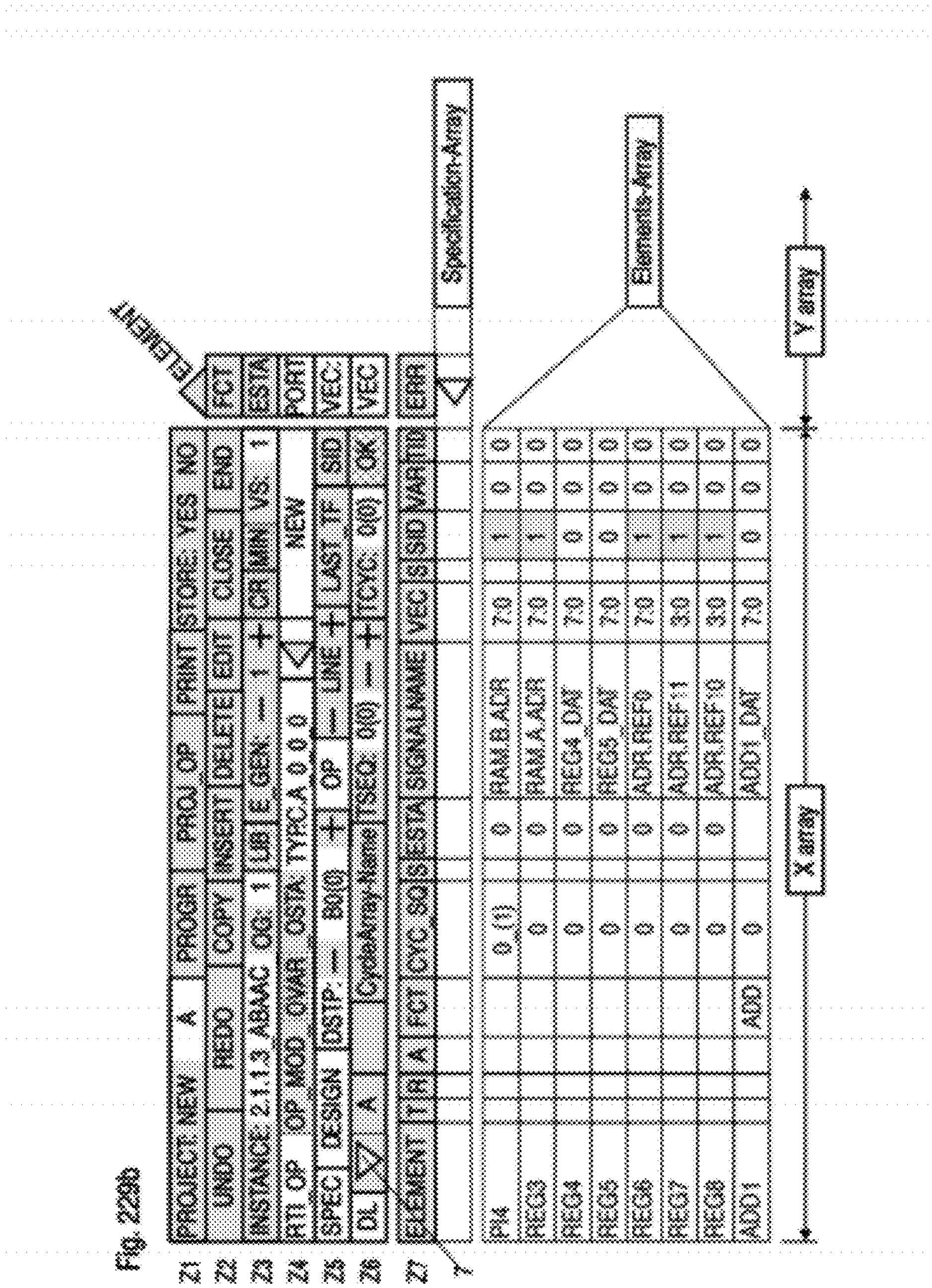
Figure 229C:
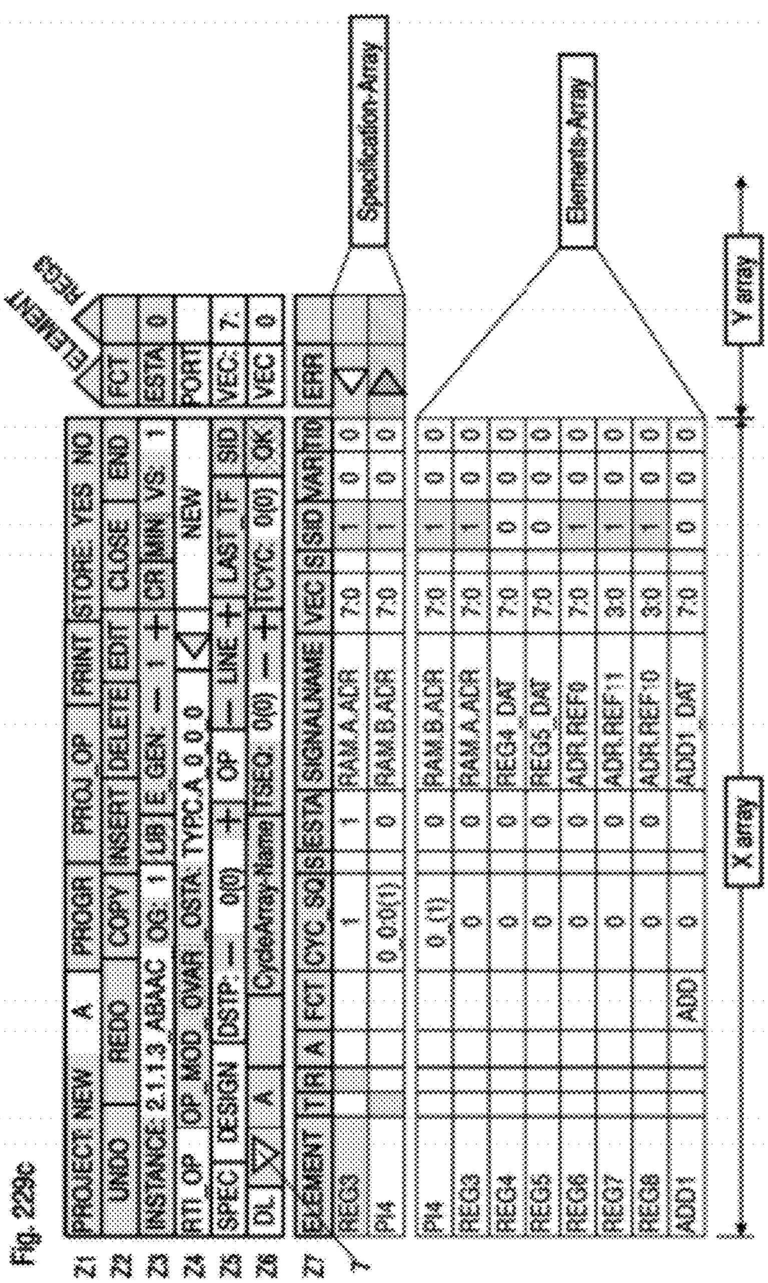
Figure 229D:
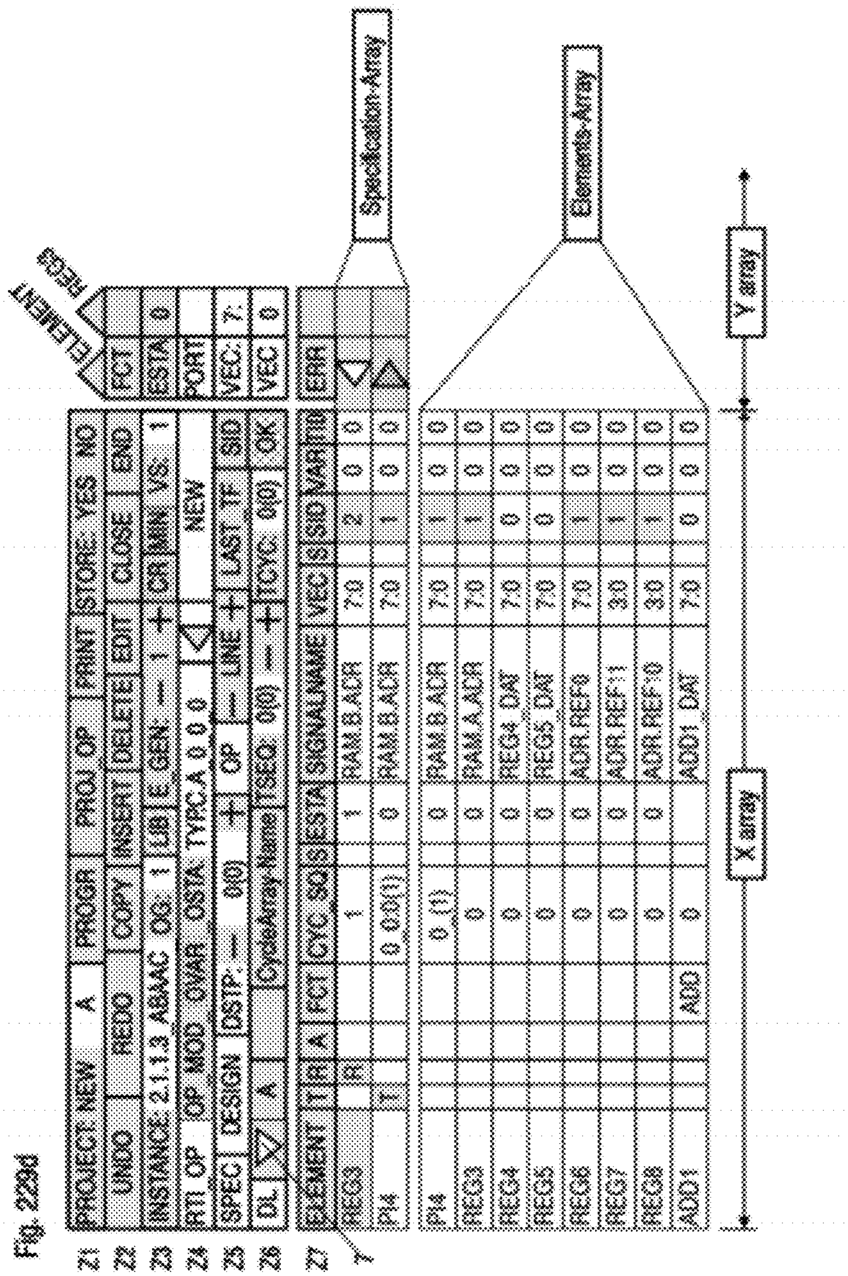
Figure 229E:
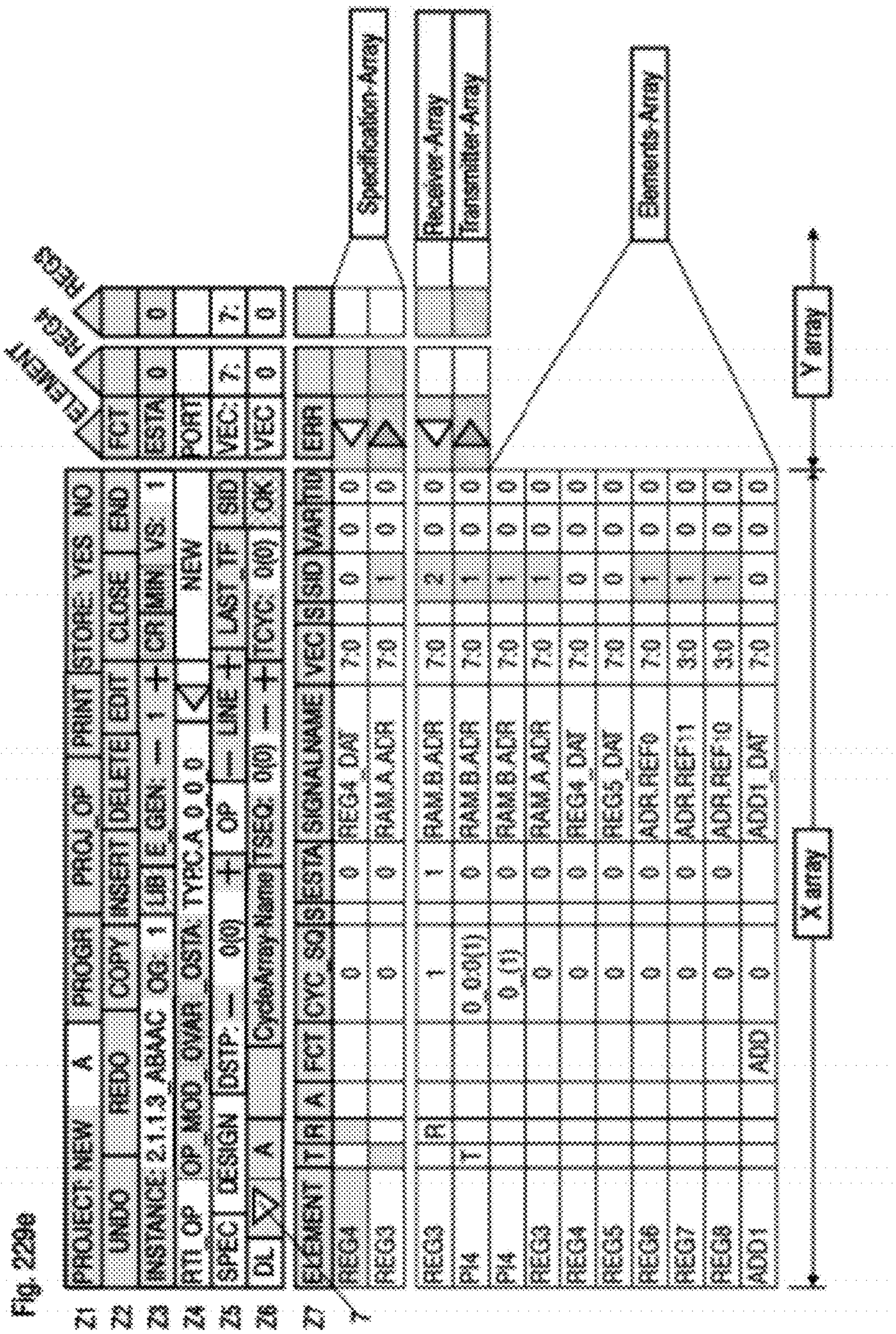
Figure 229F:
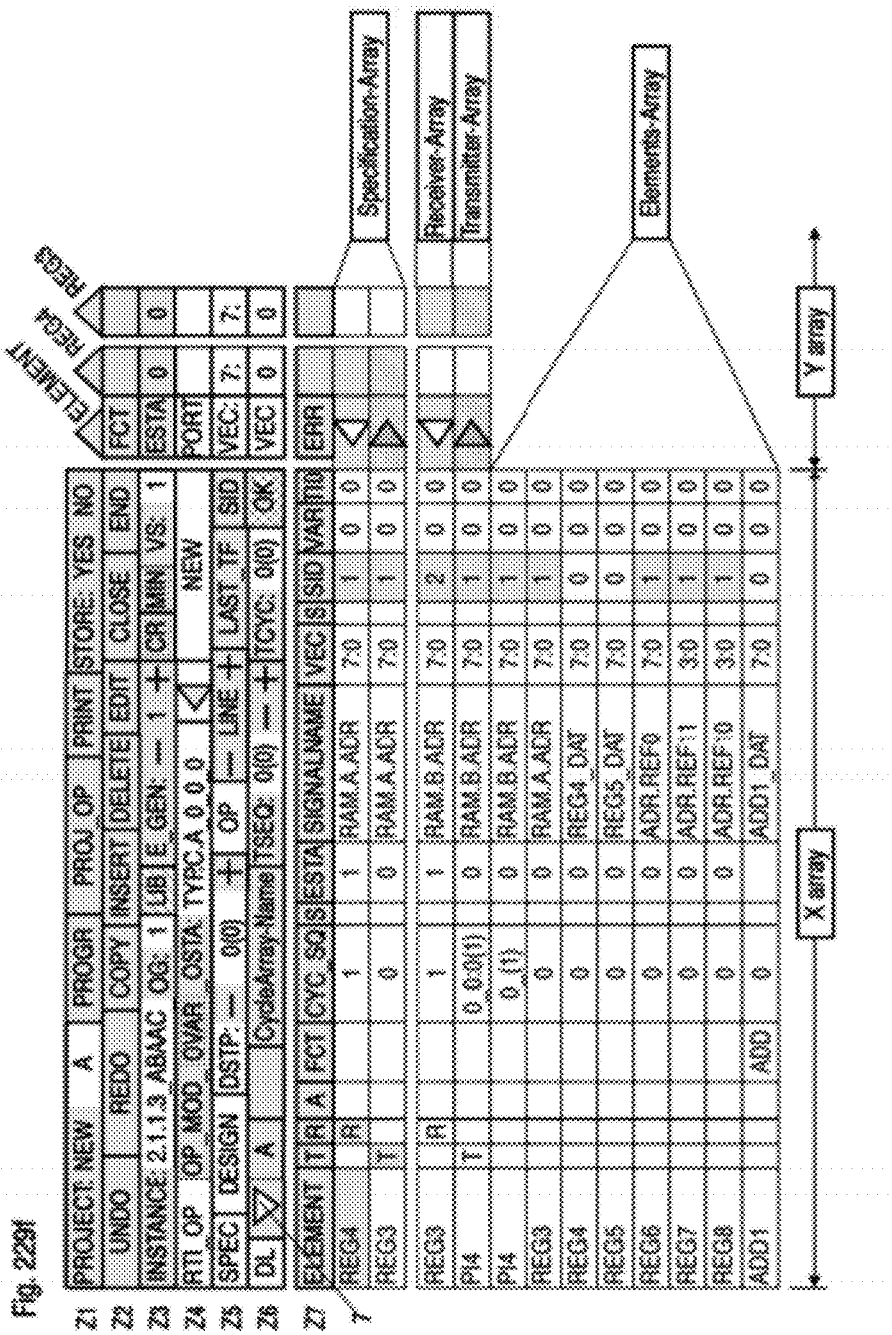
Figure 229G:
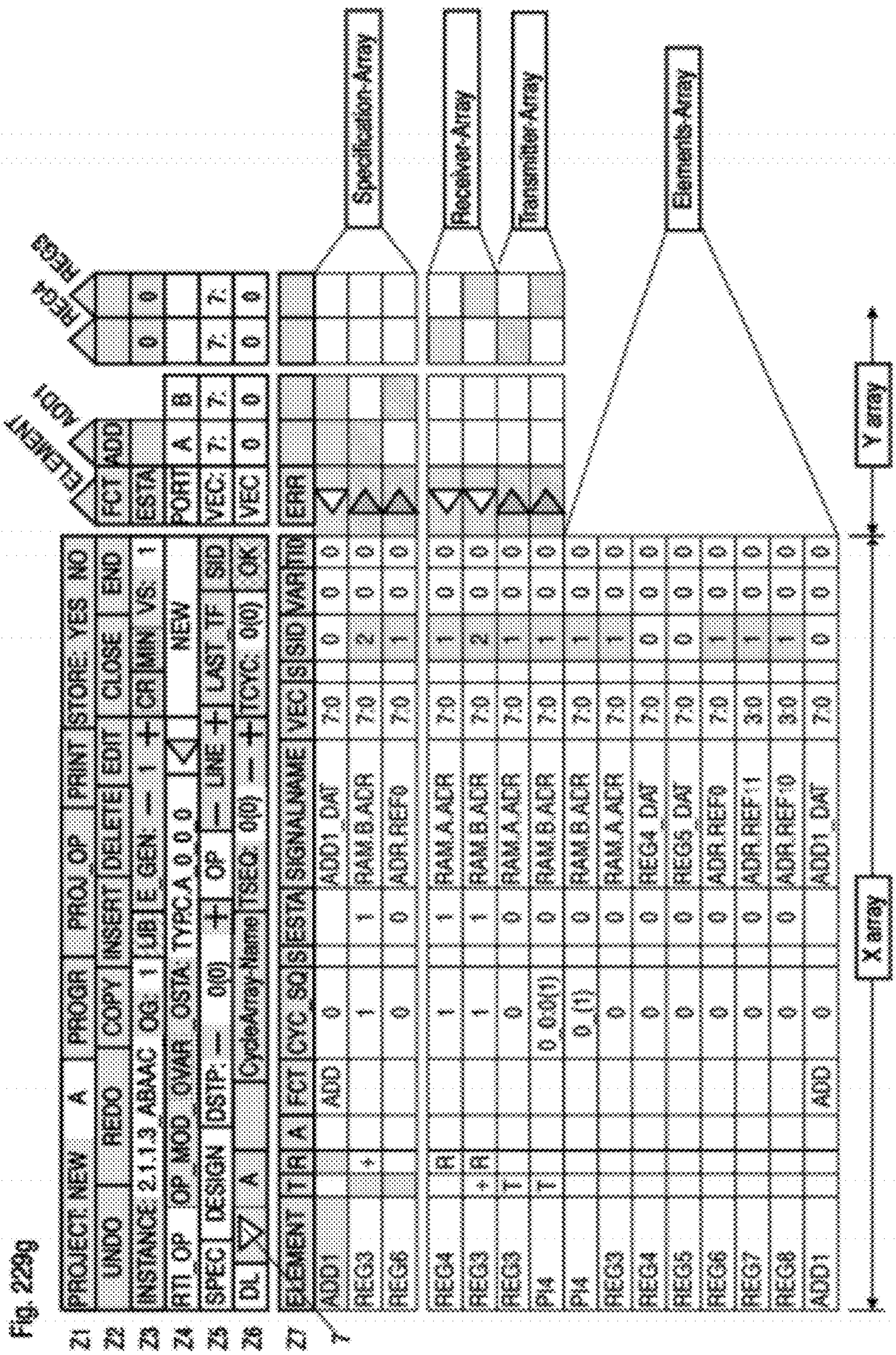
Figure 229H:
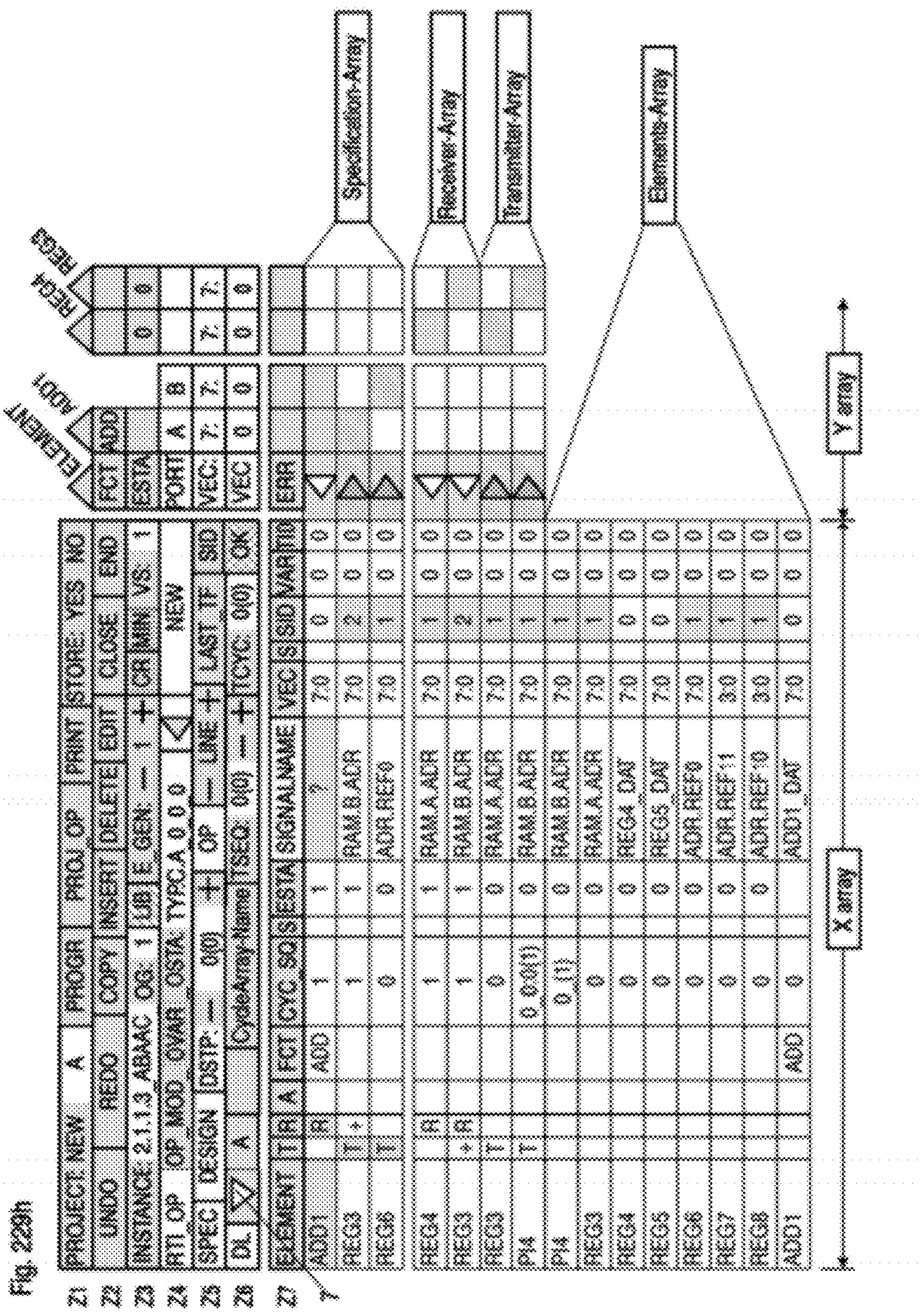
Figure 229I:
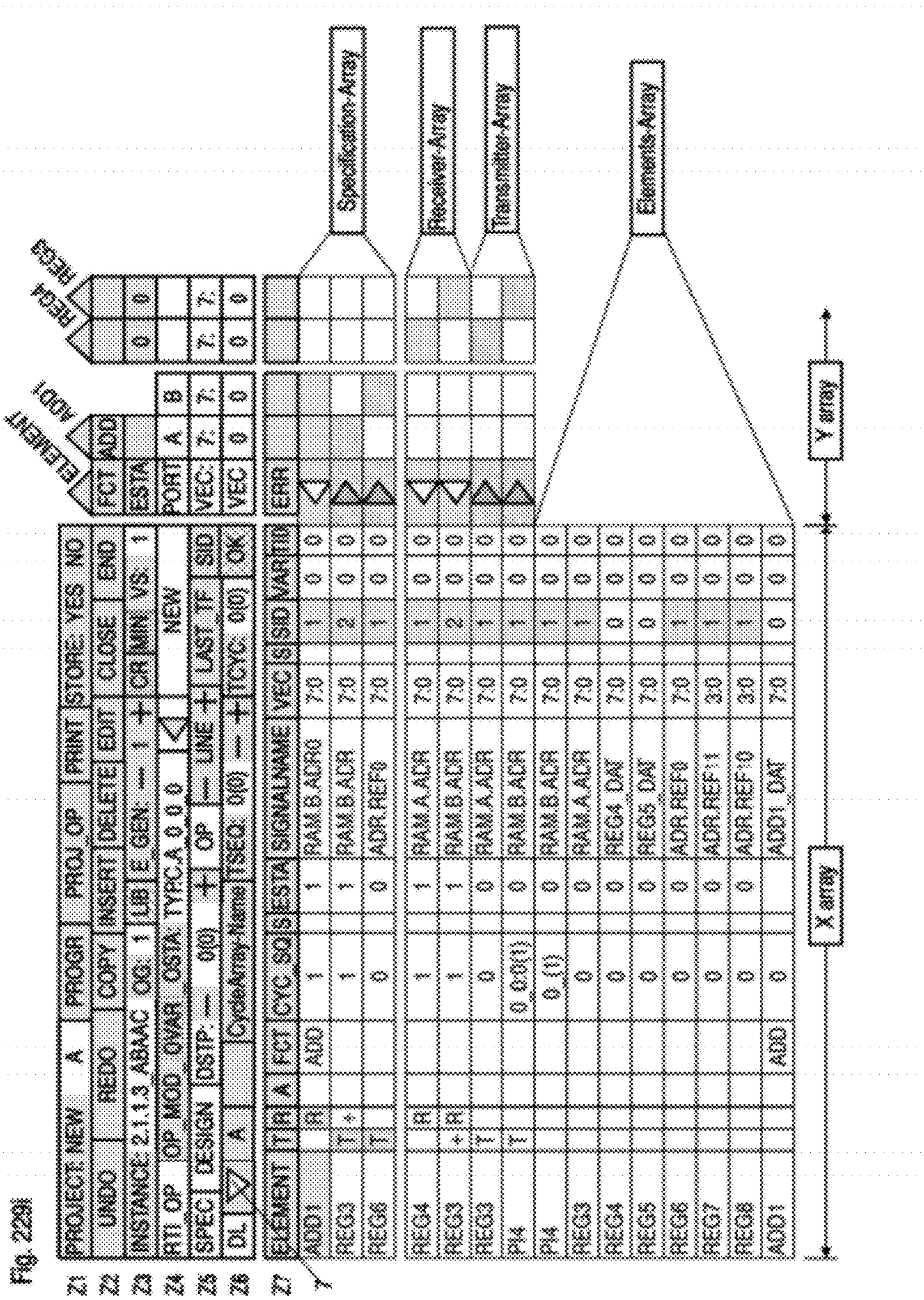
Figure 229K:
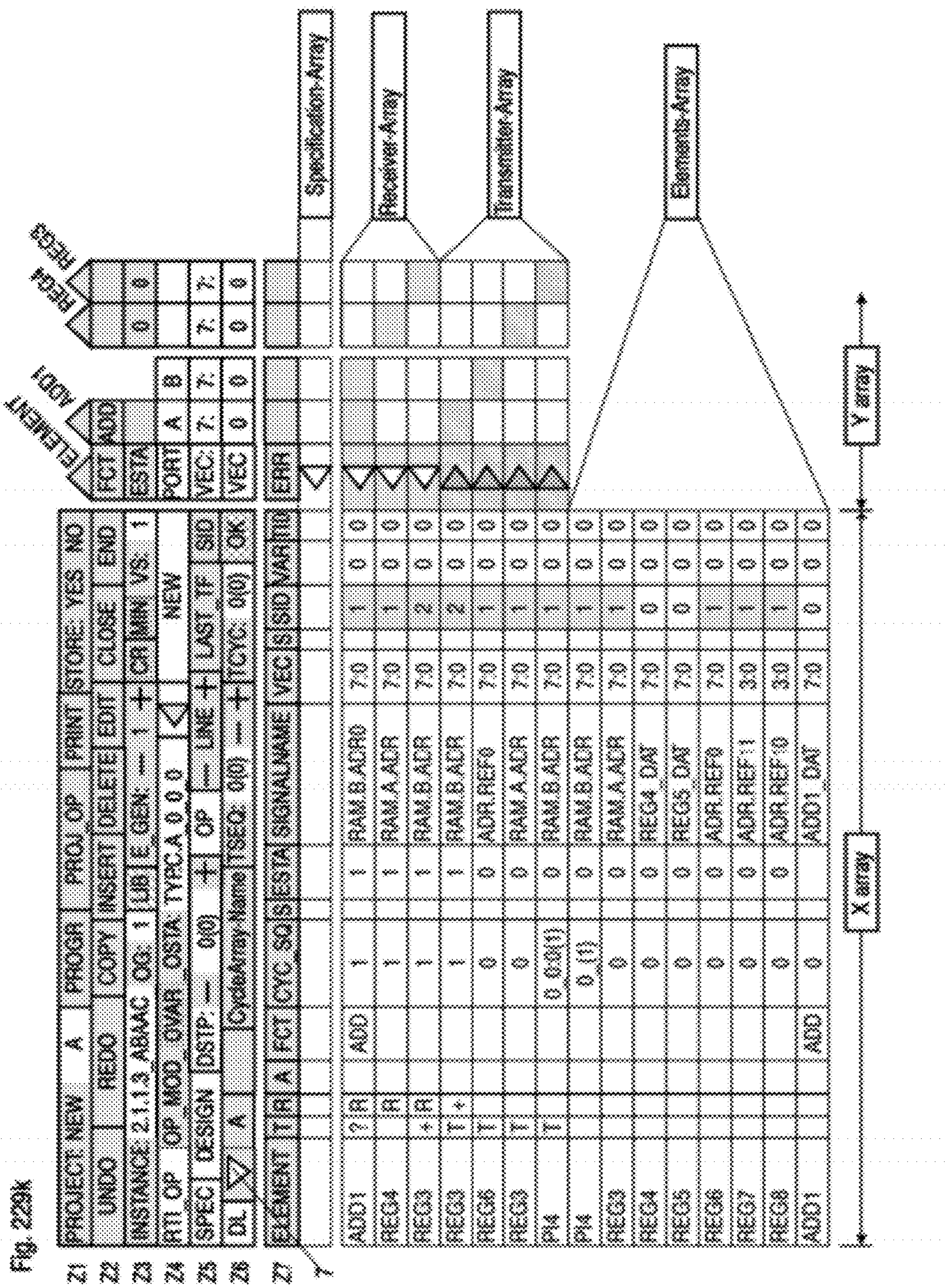
Figure 22I:
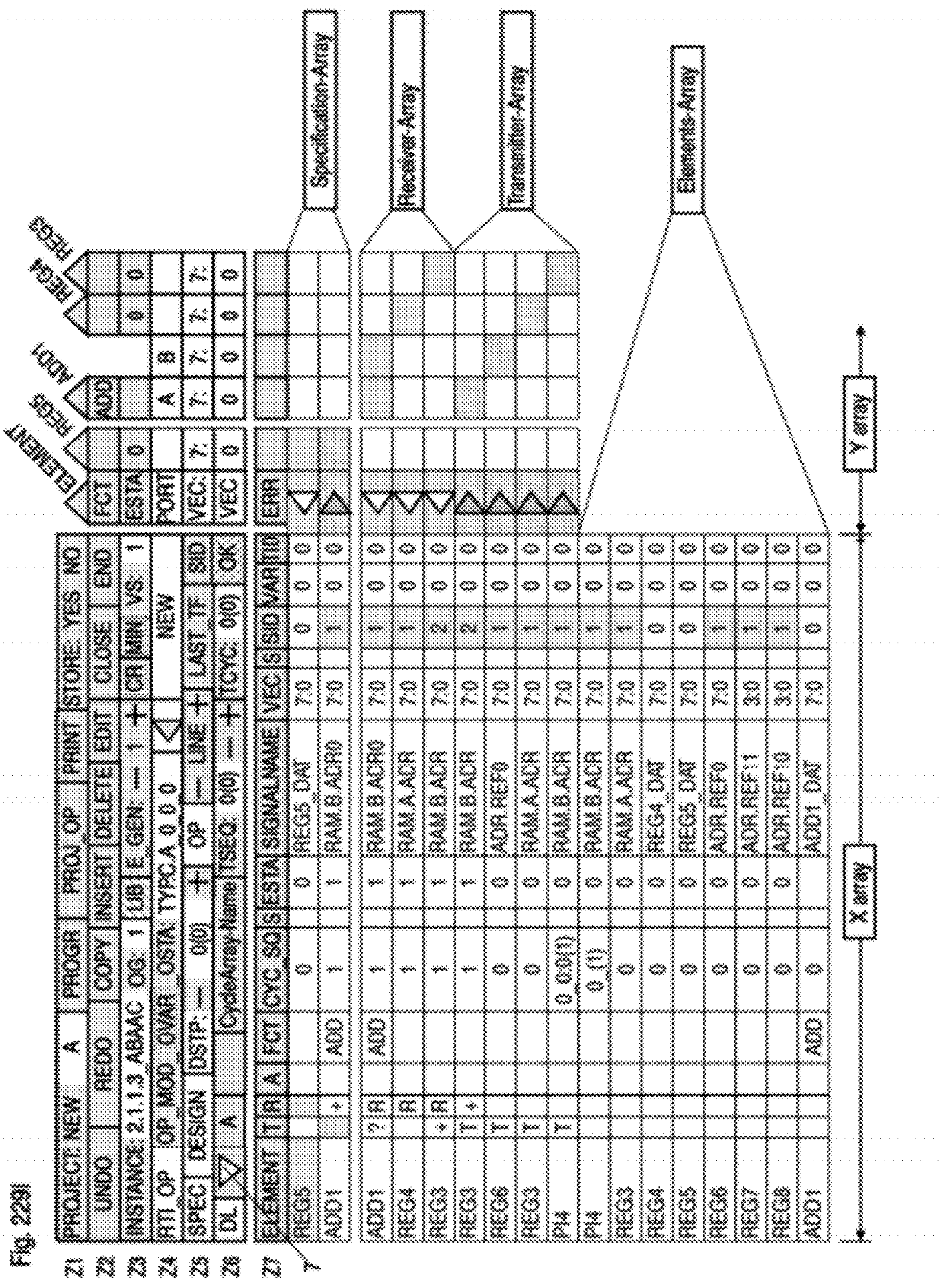
Figure 229M:
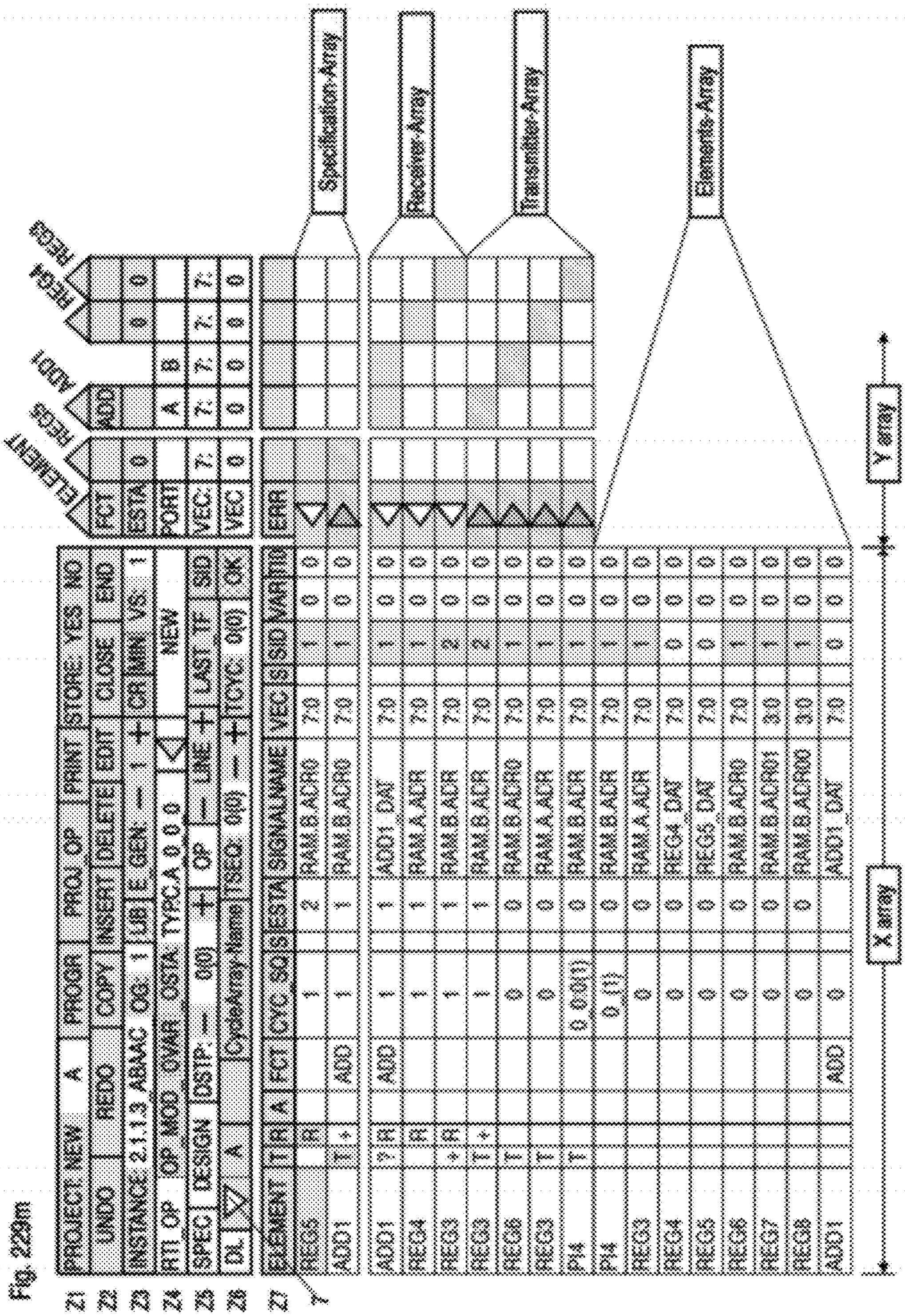
Figure 229N:
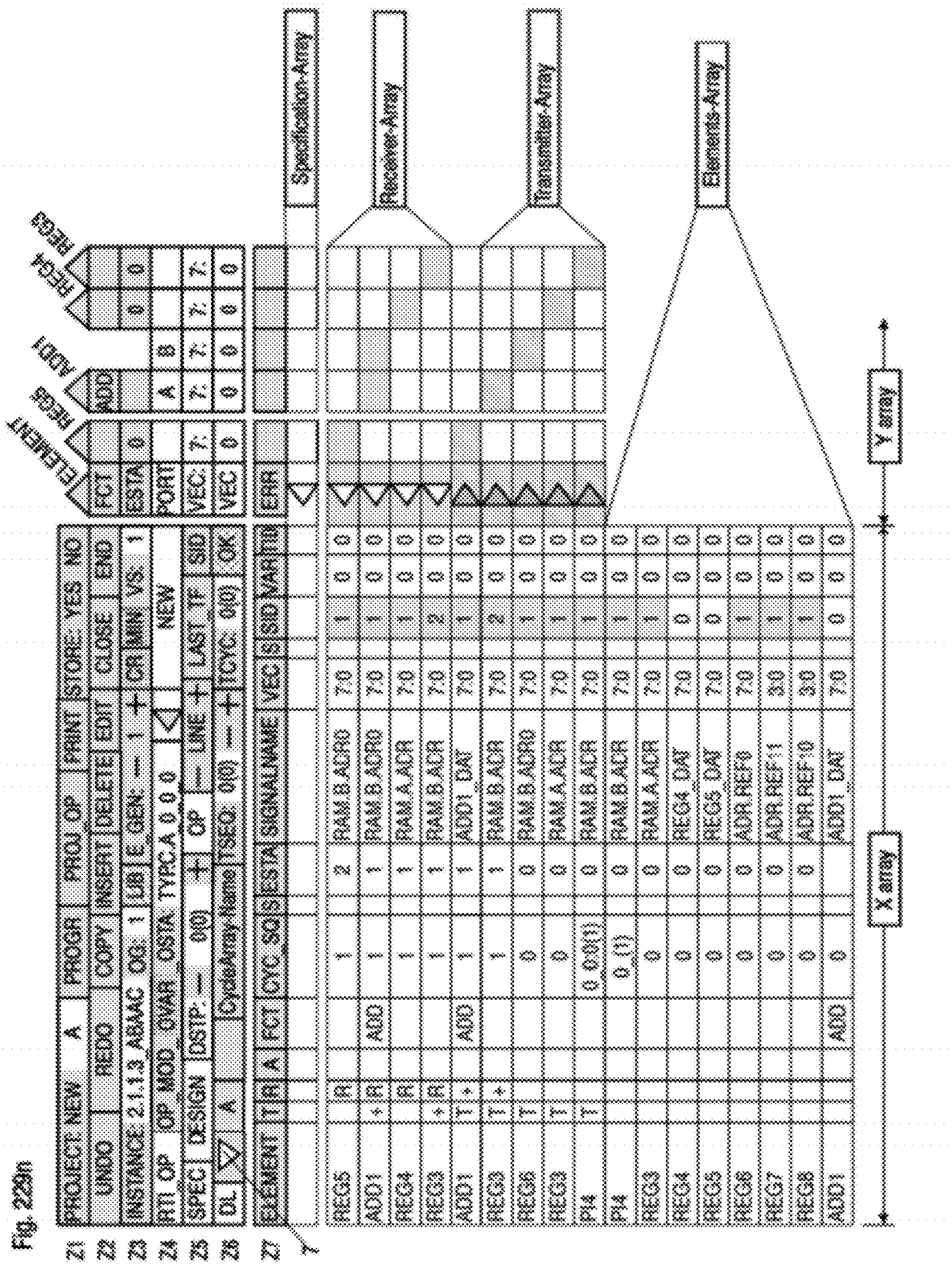
Figure 229O:
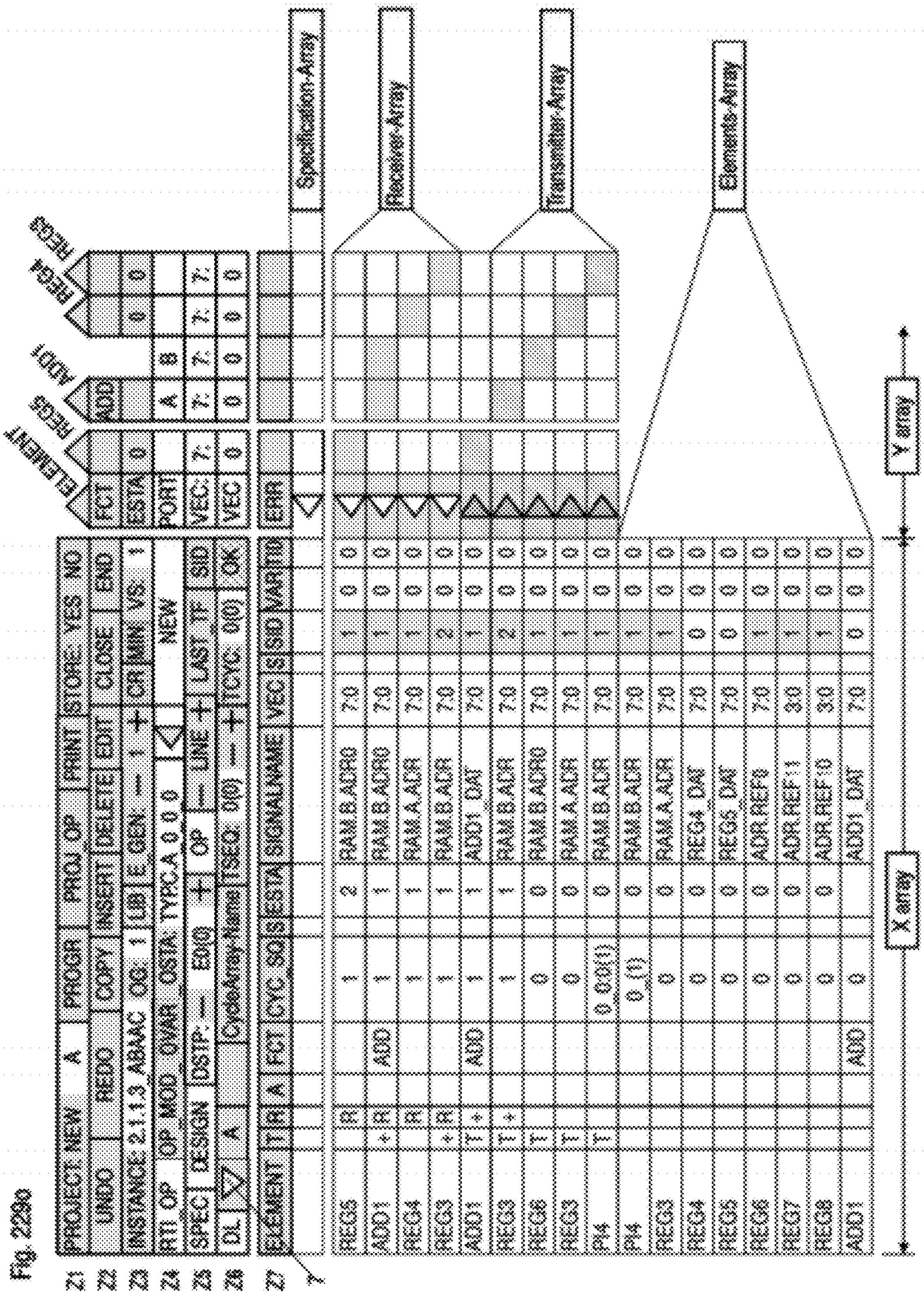
Figure 229P:
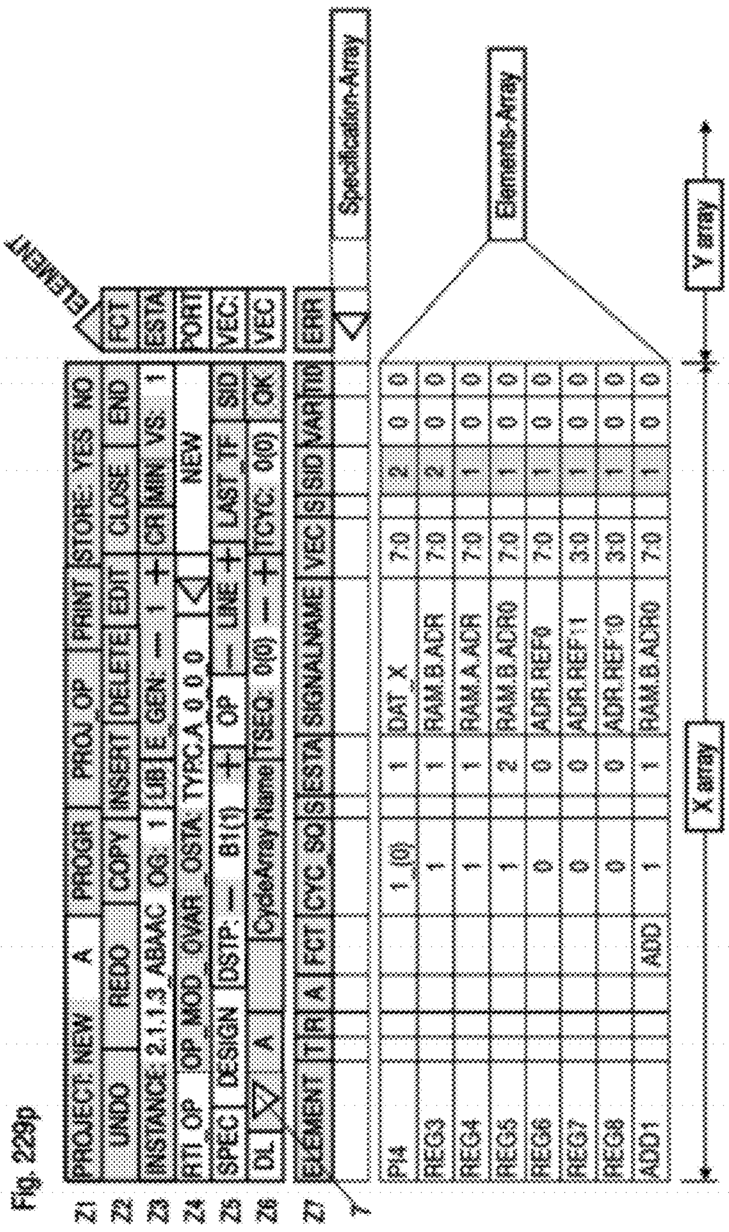
Figure 232A:
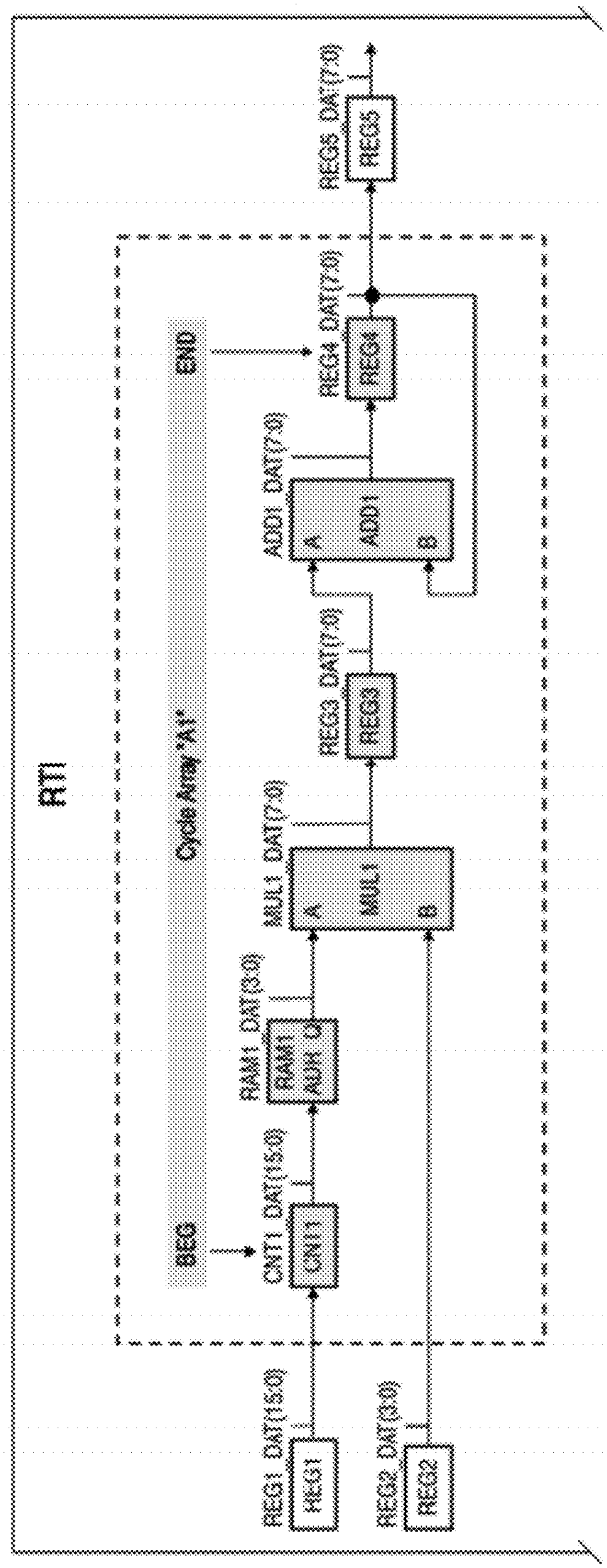
Figure 233A:
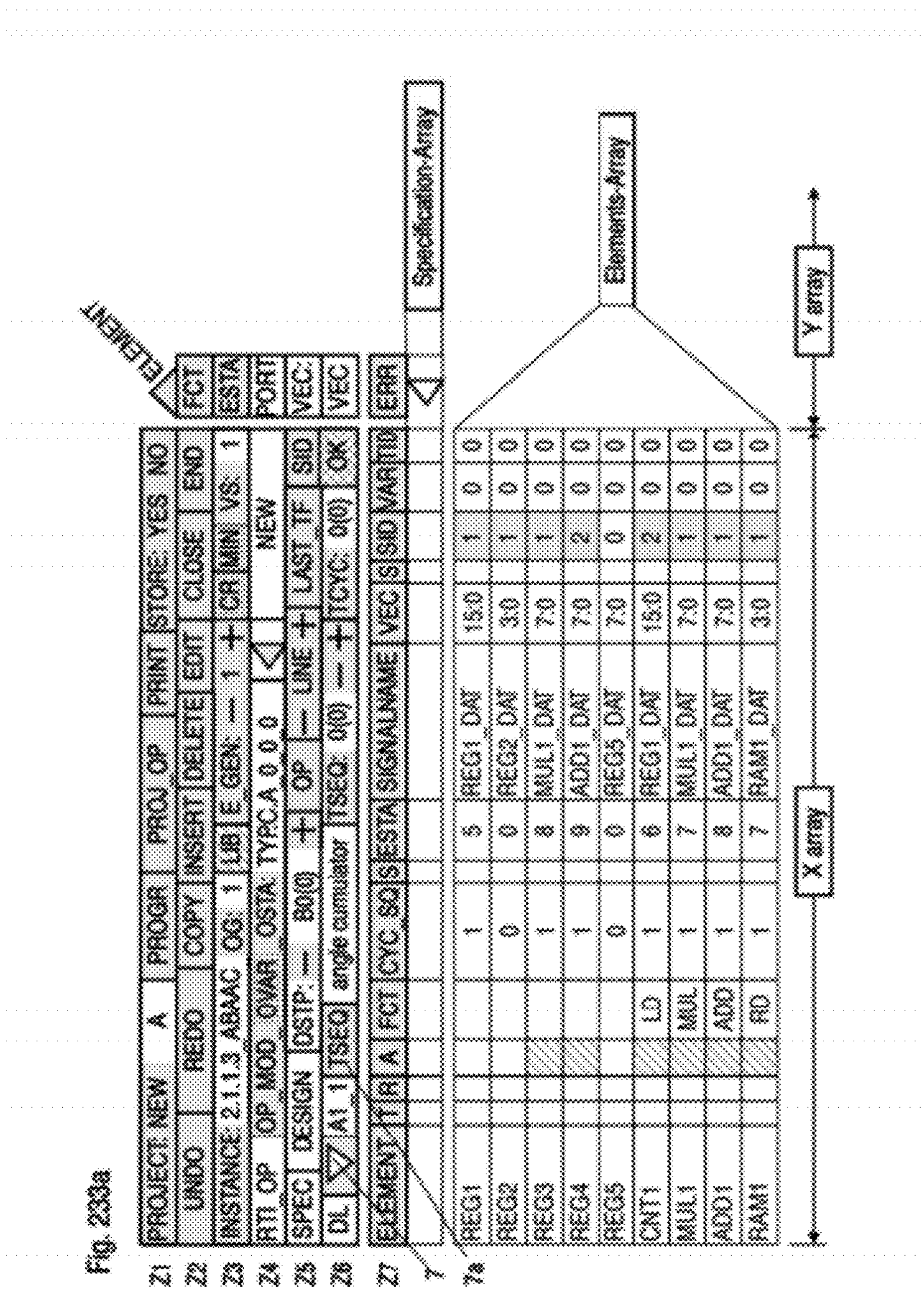
Figure 233B:
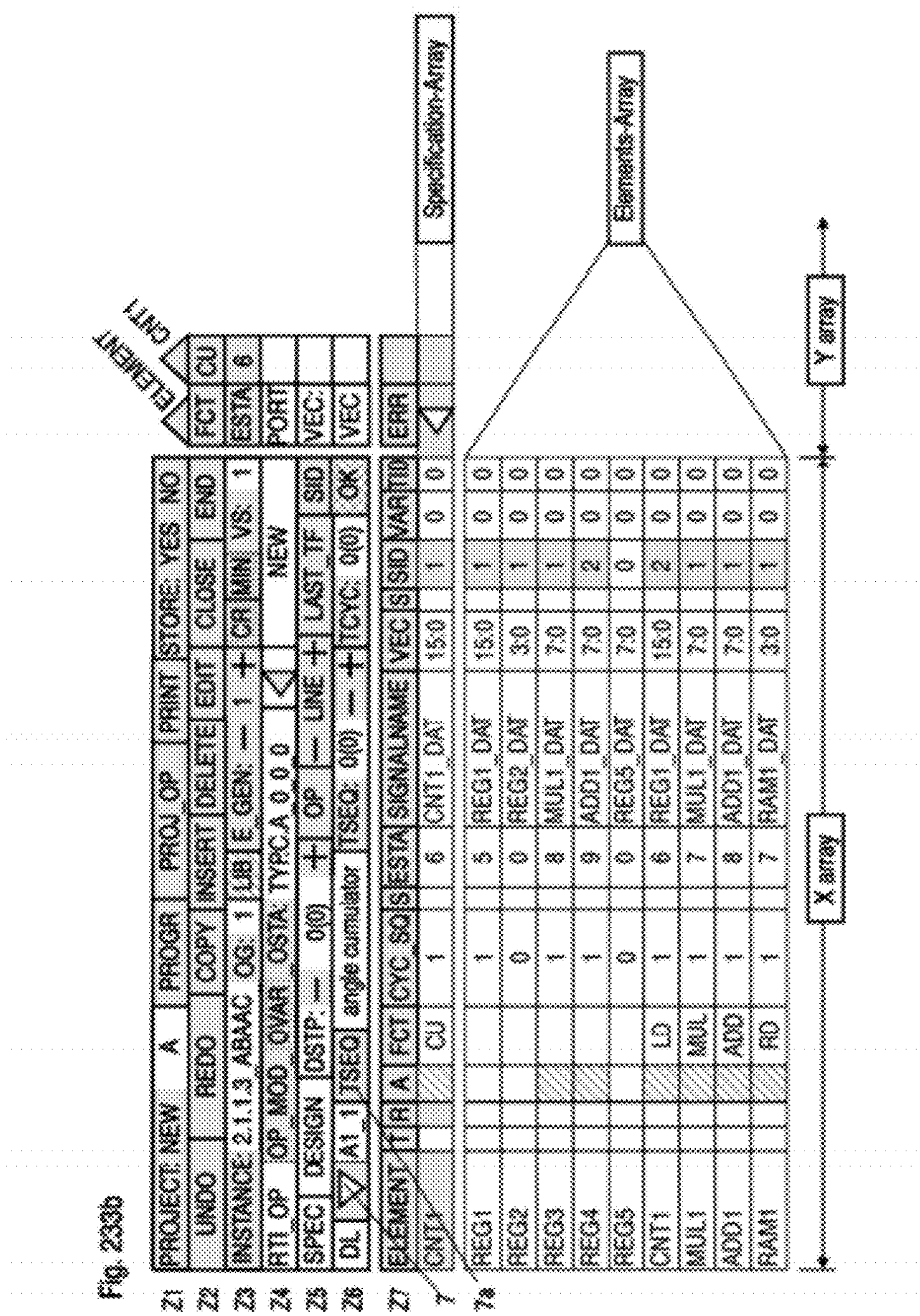
Figure 233C:
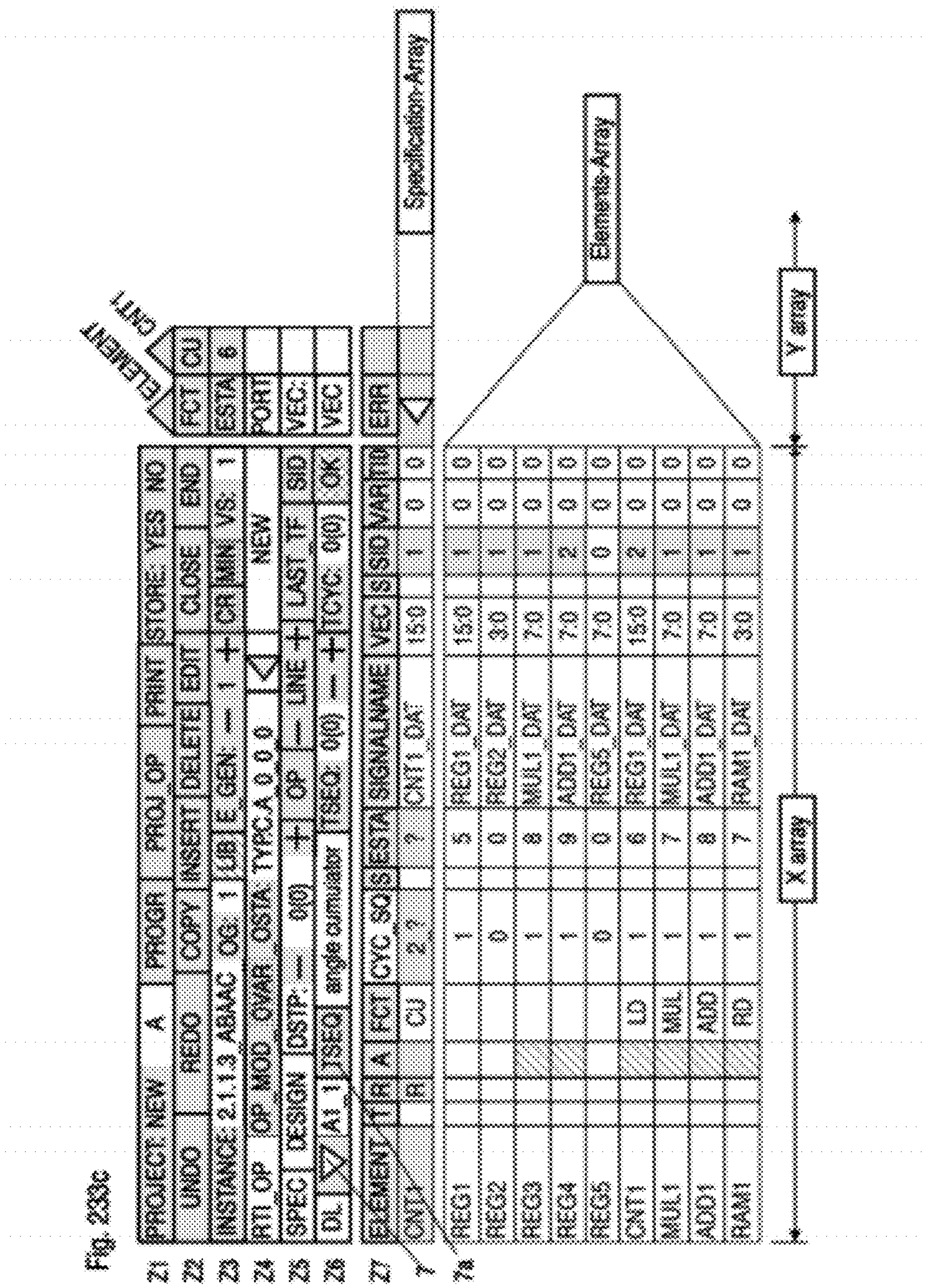
Figure 233D:
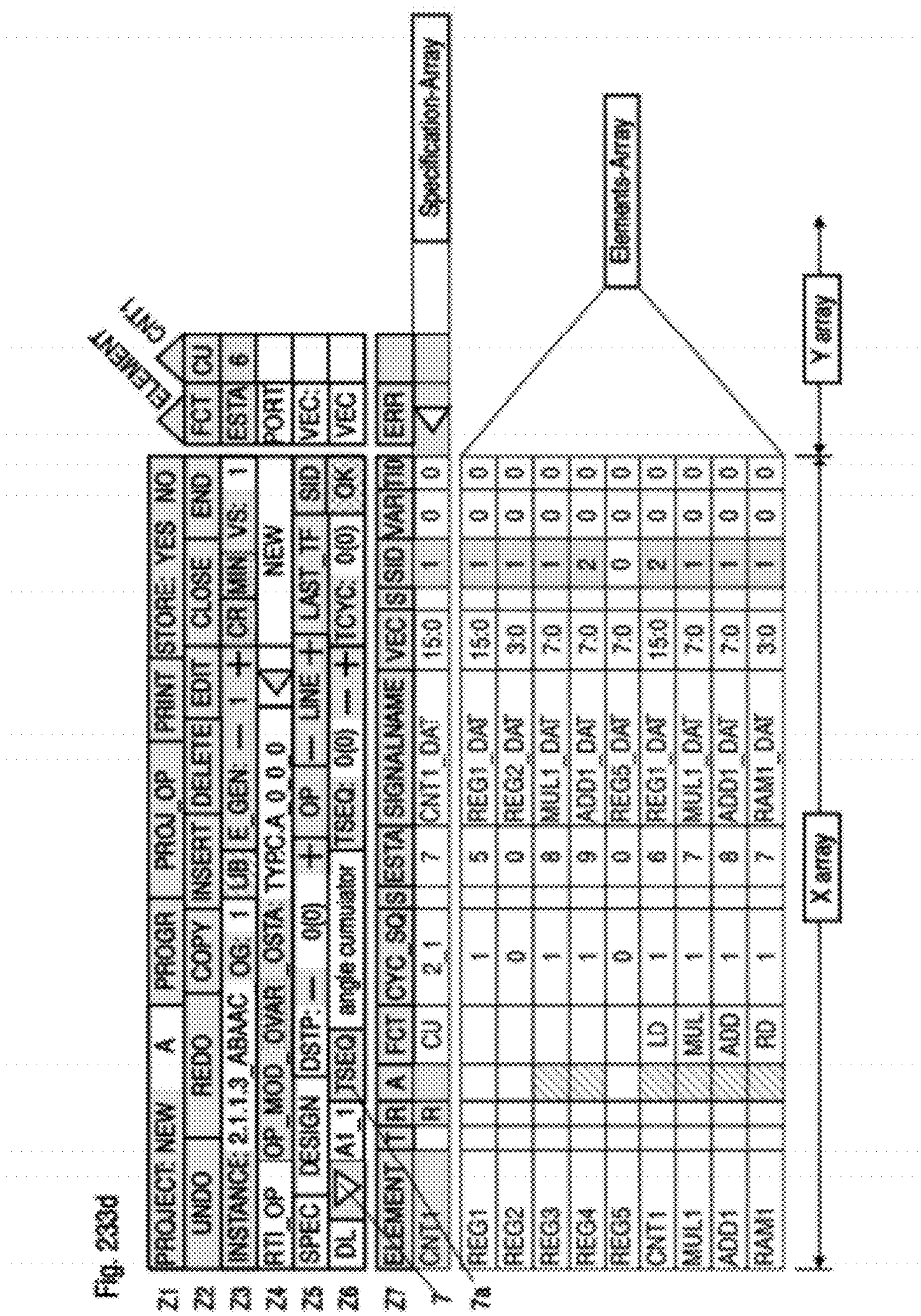
Figure 233E:
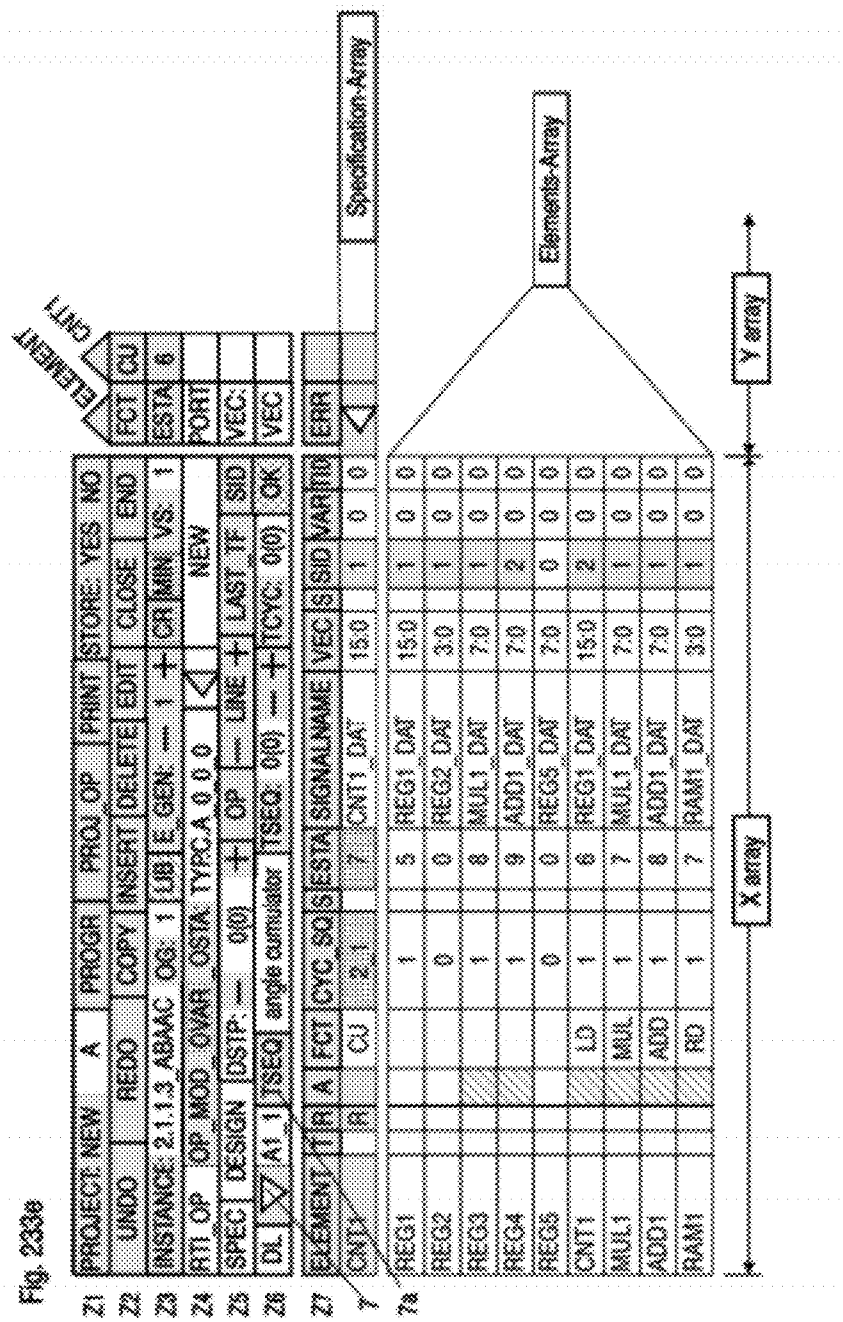
Figure 233F:
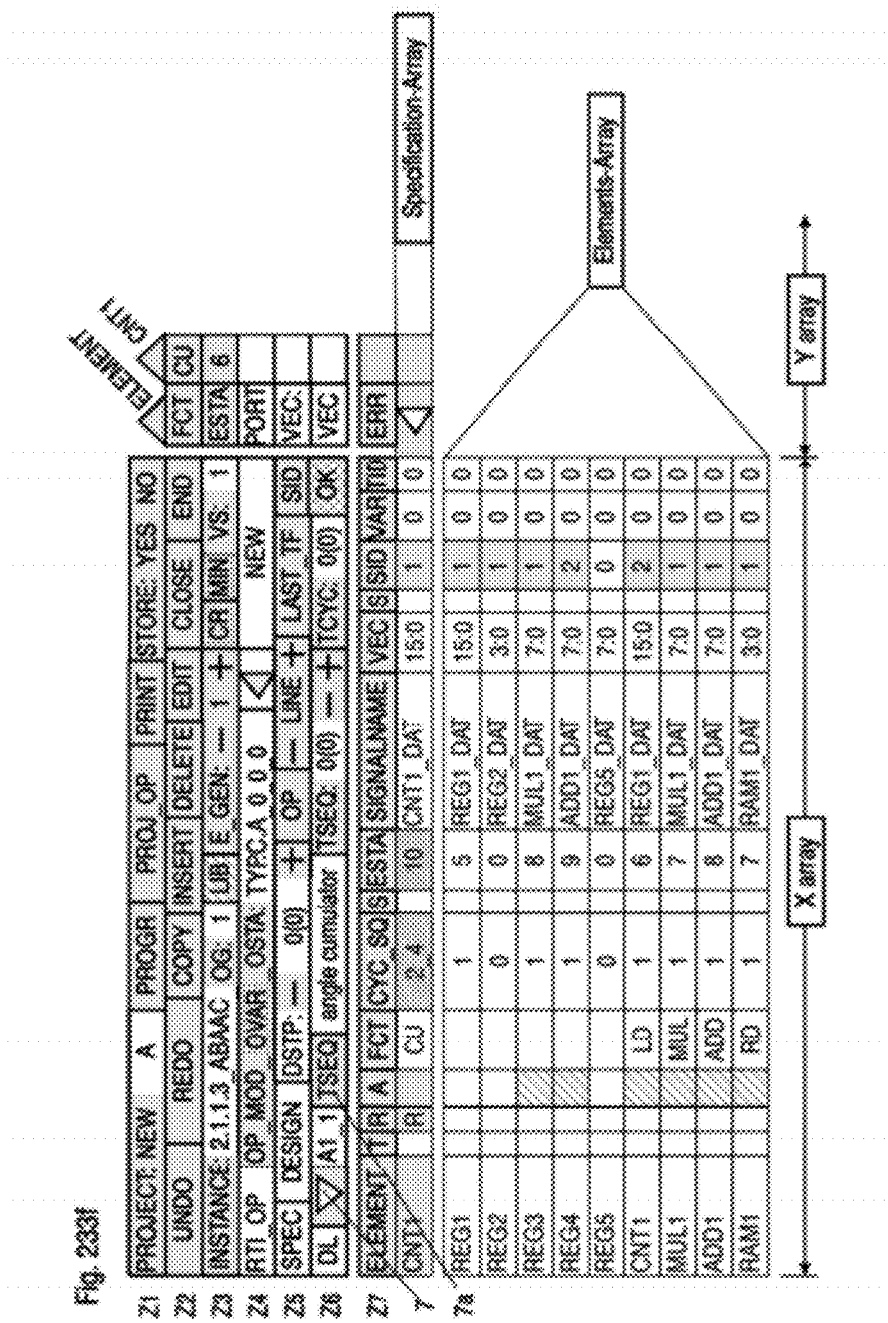
Figure 233G:
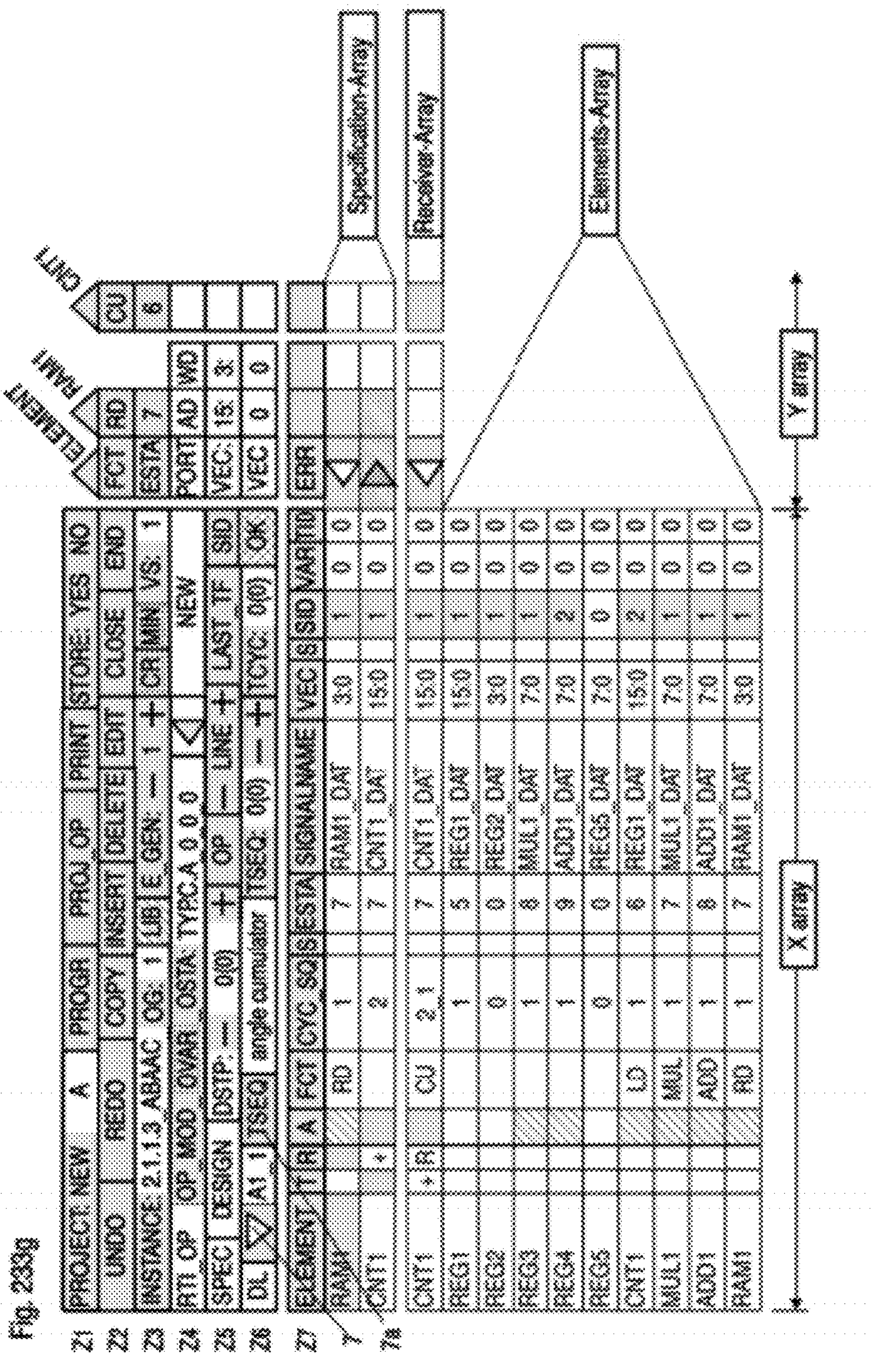
Figure 233H:
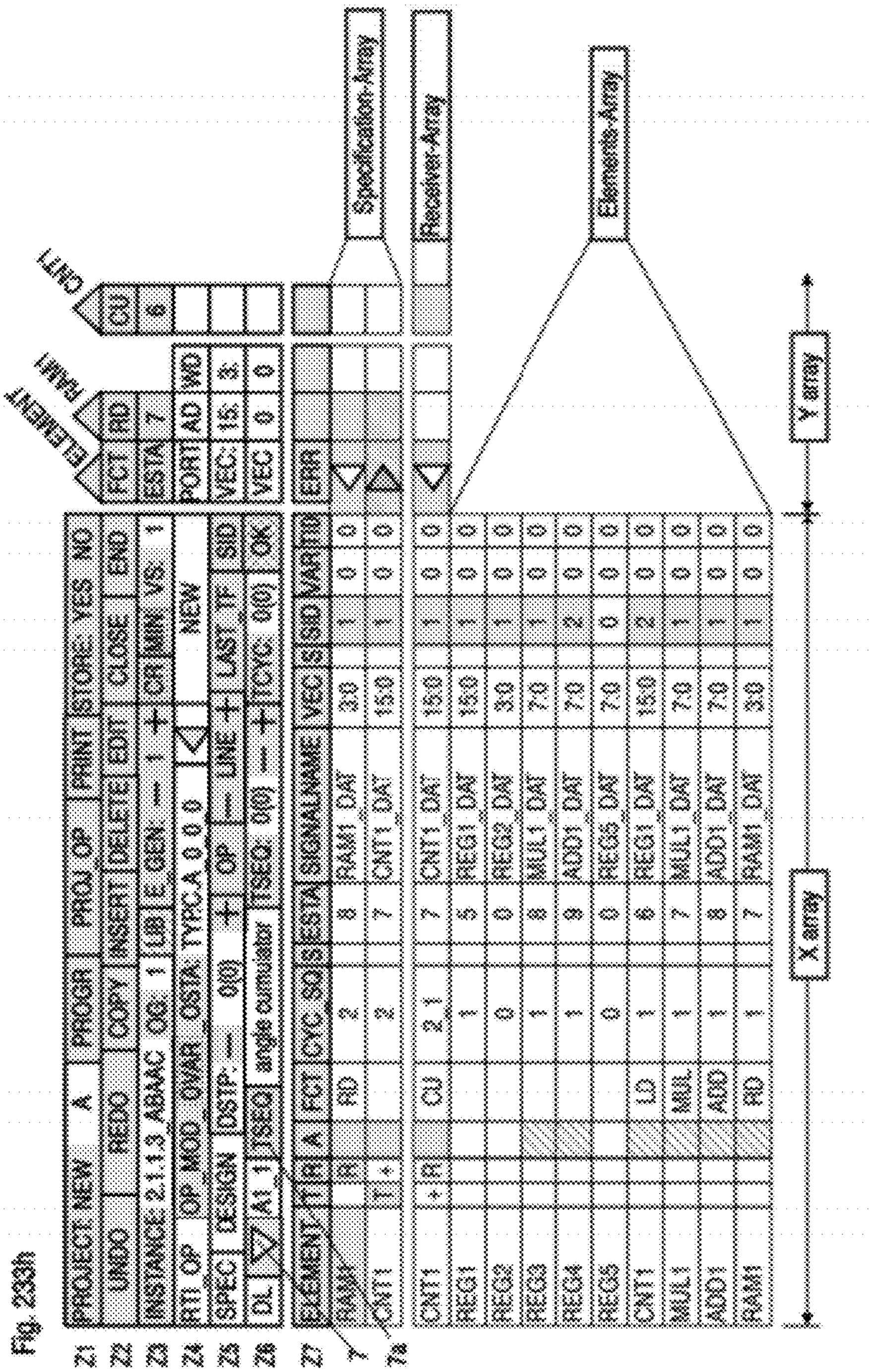
Figure 233I:
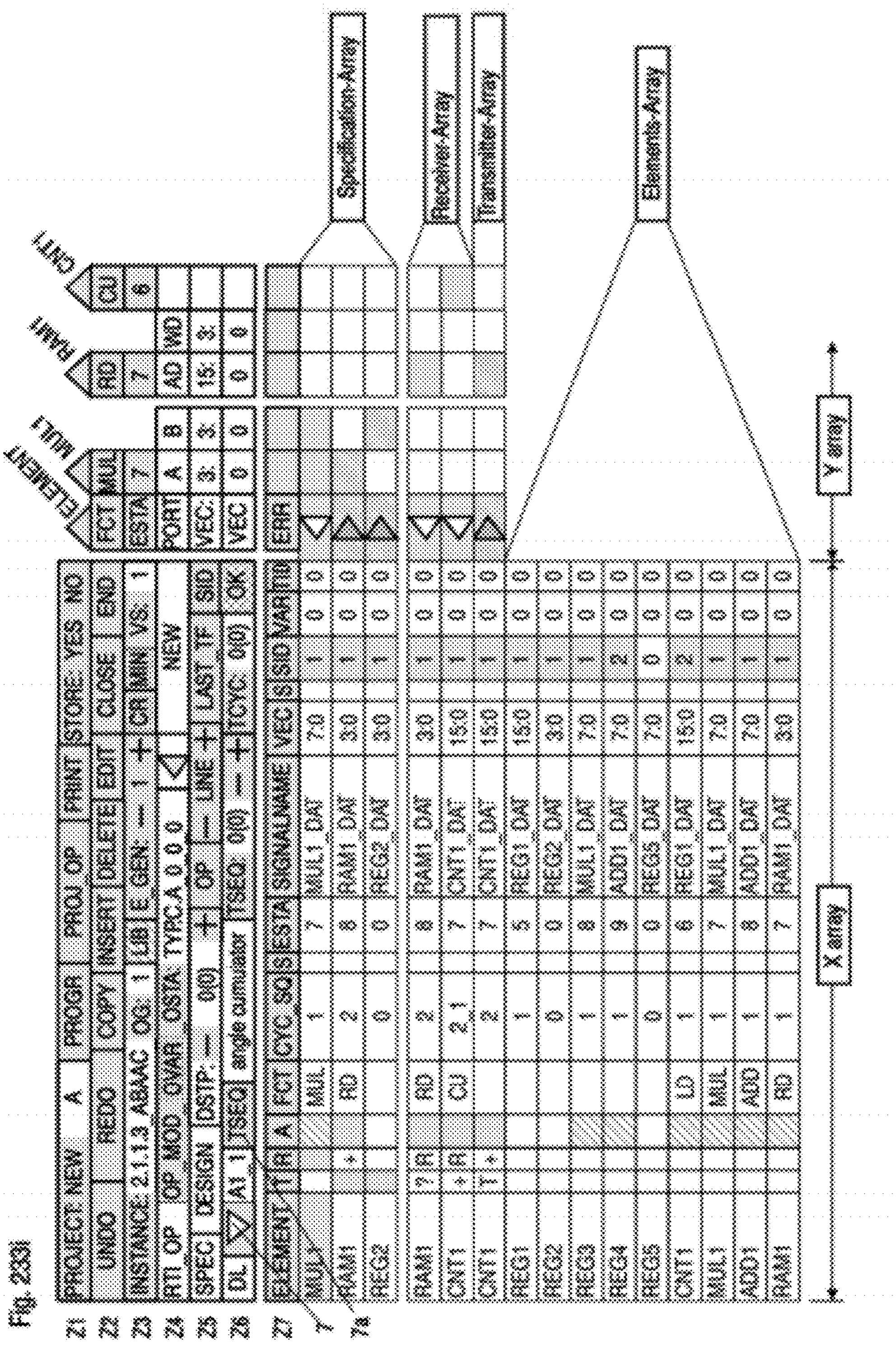
Figure 233K:
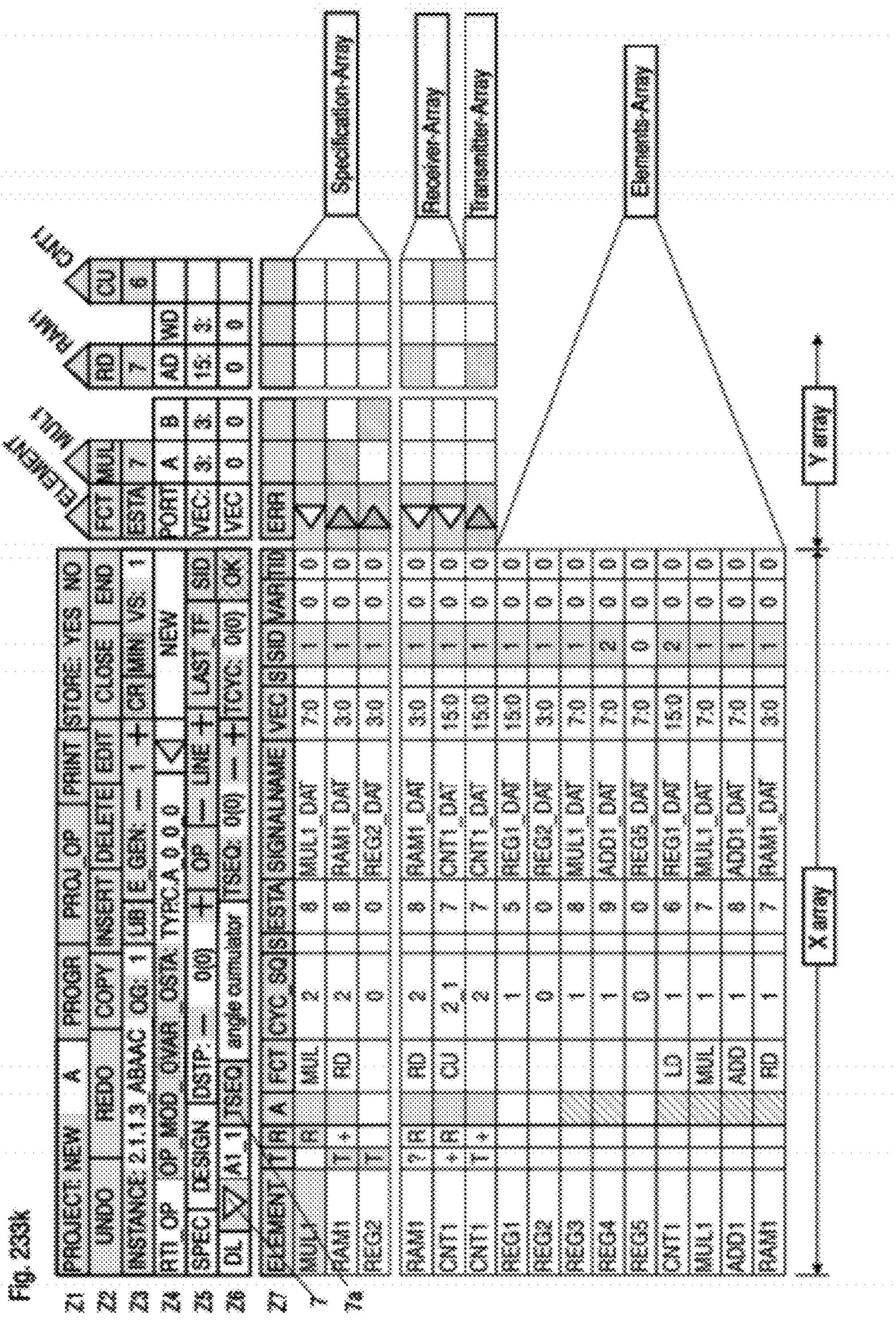
Figure 233I:
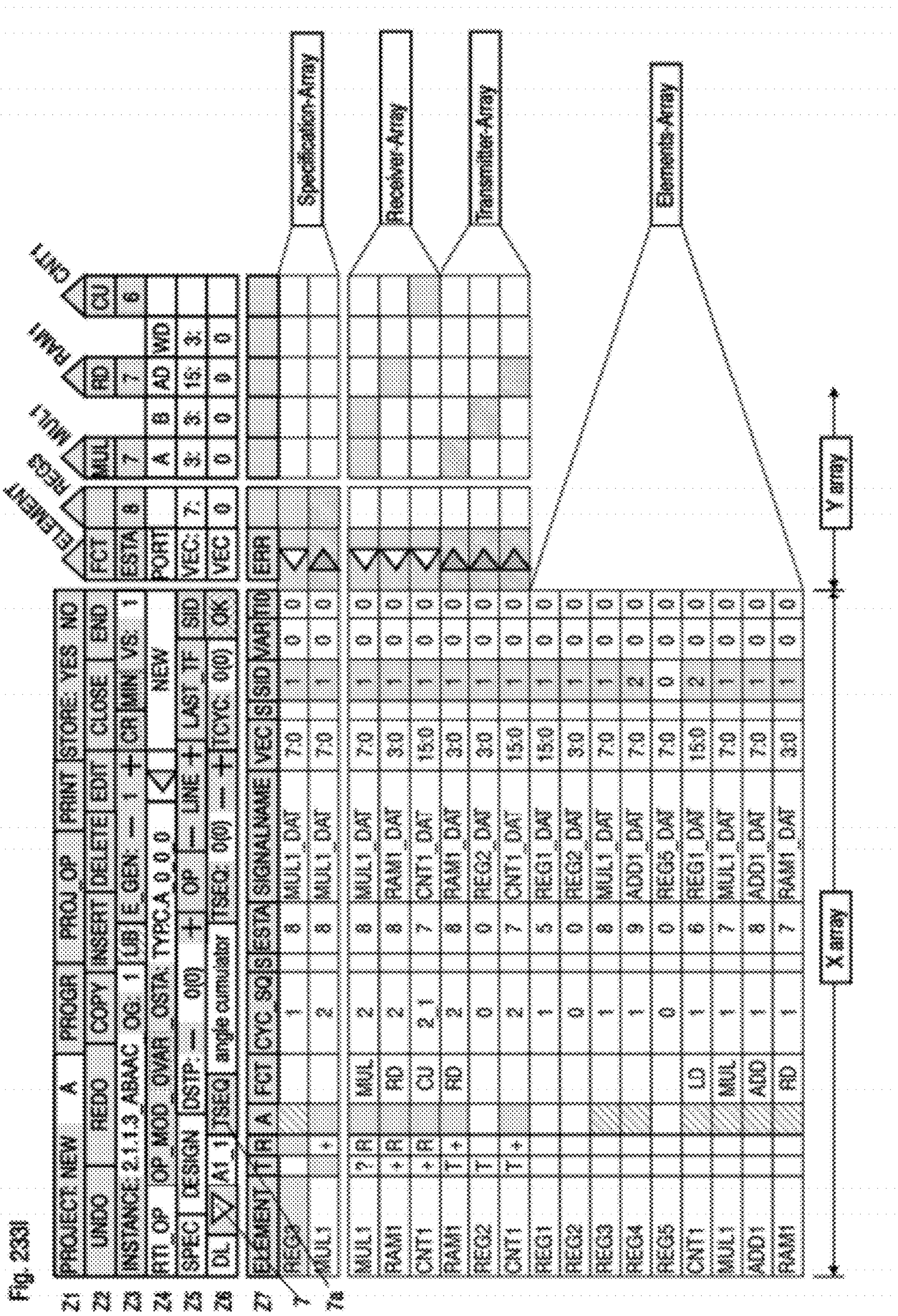
Figure 233M:
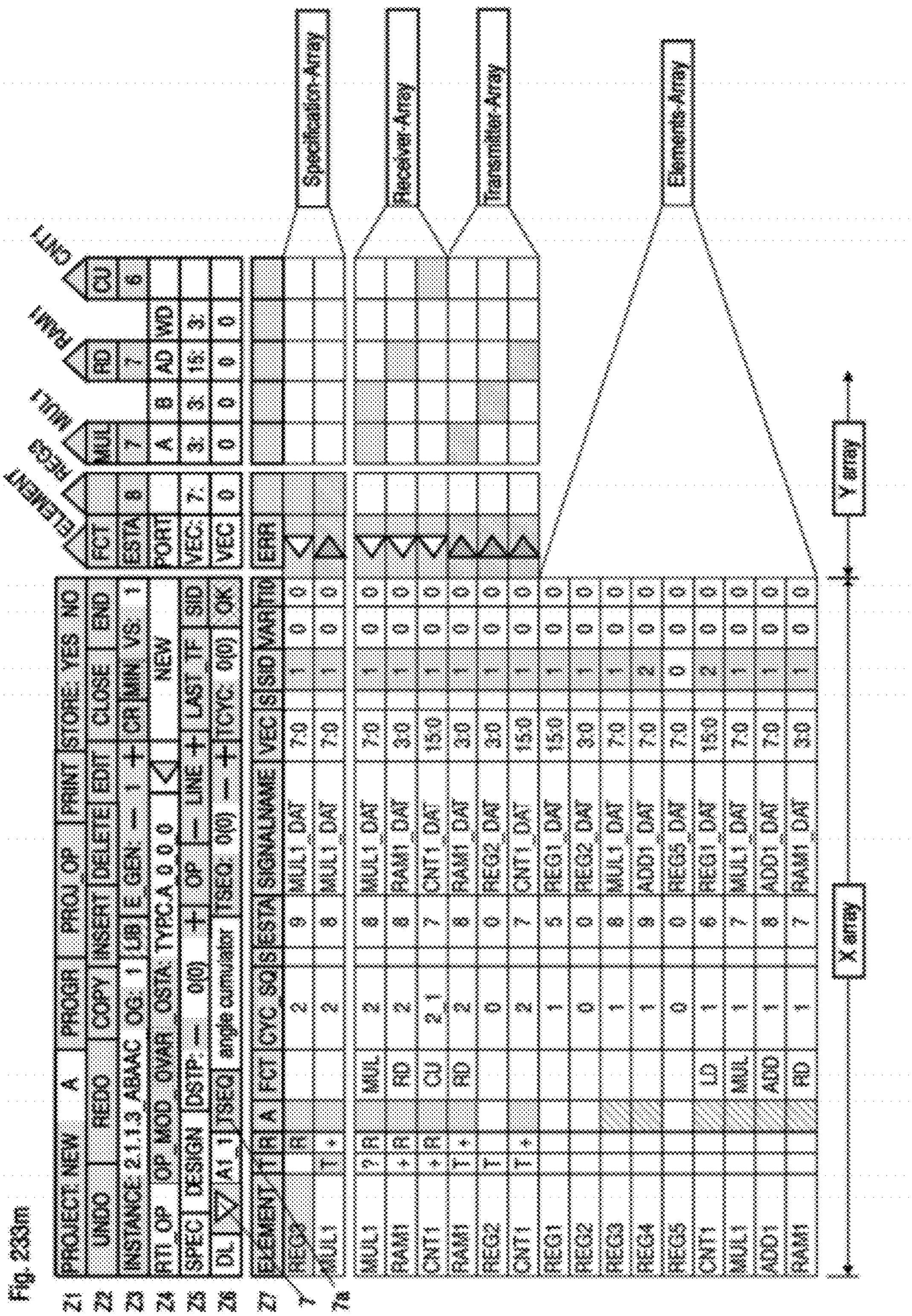
Figure 233N:
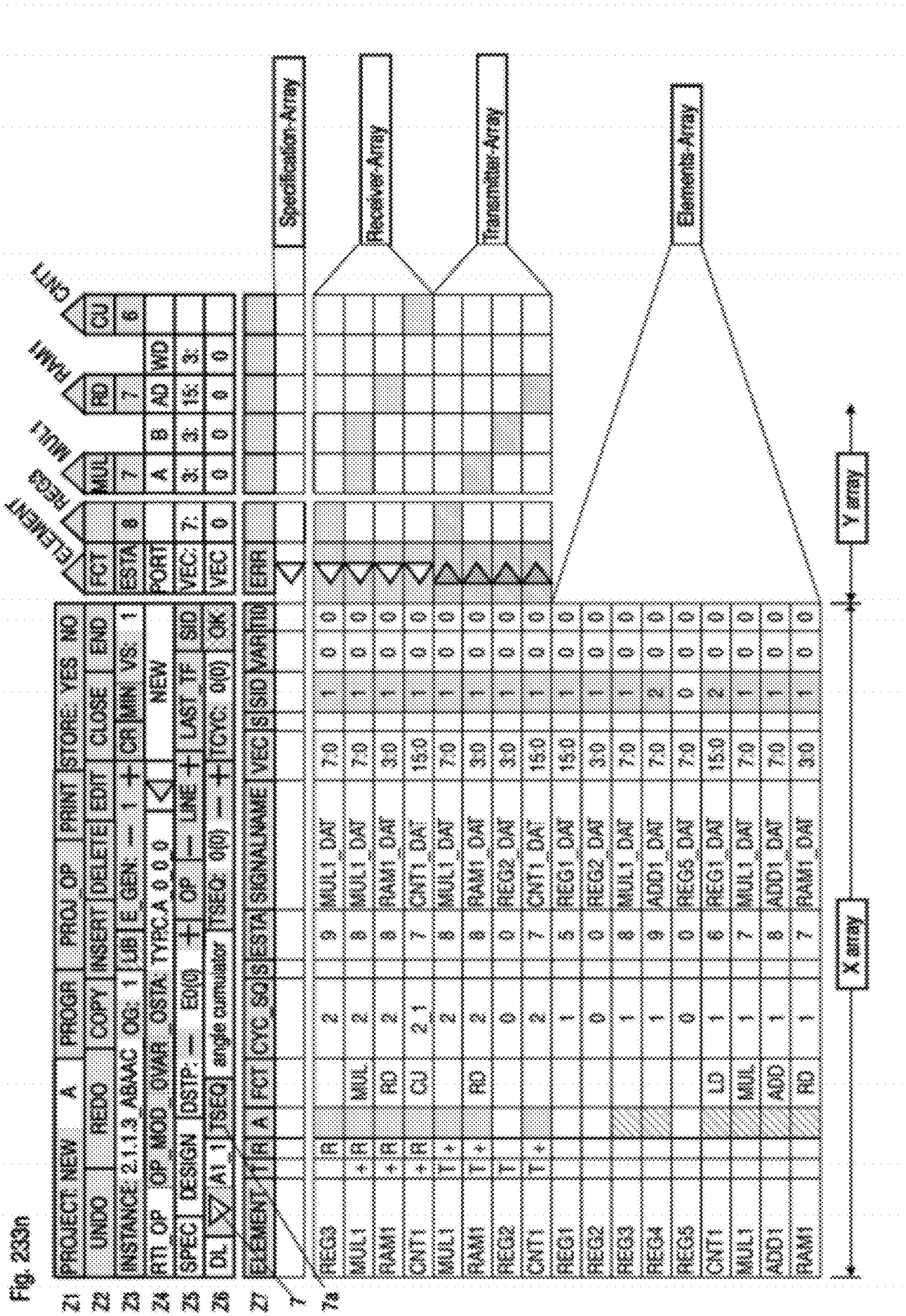
Figure 233O:
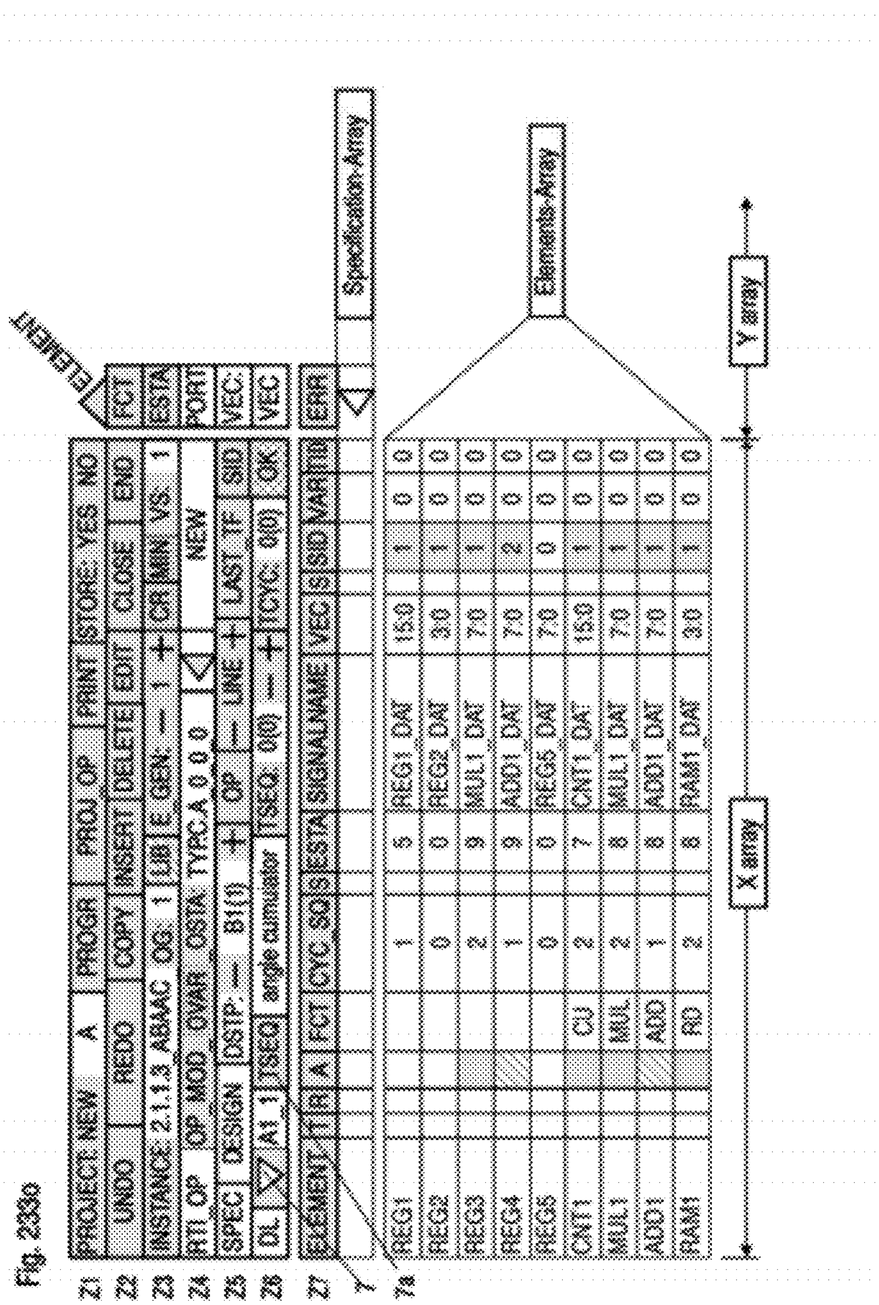
Figure 233P:
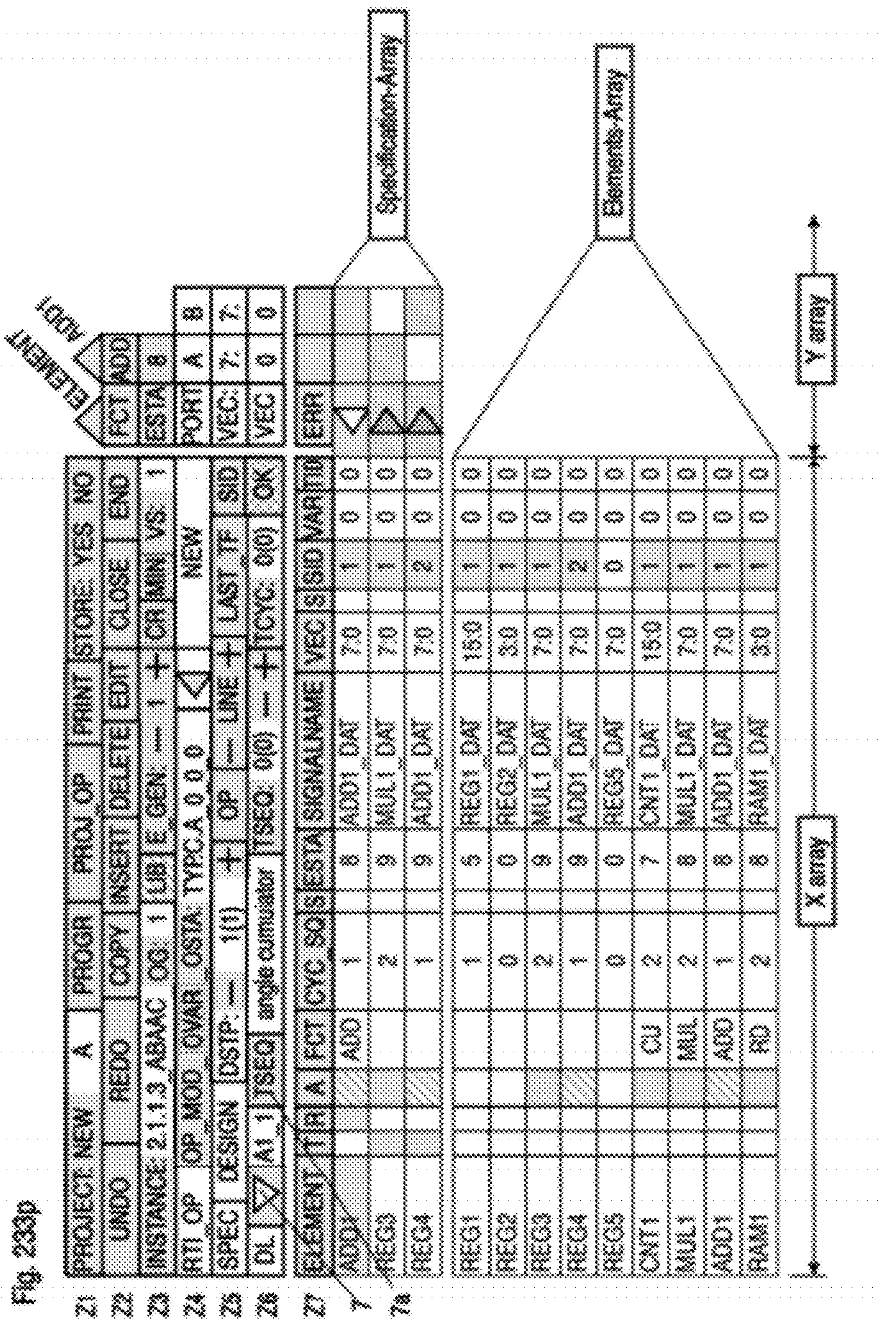
Figure 233Q:
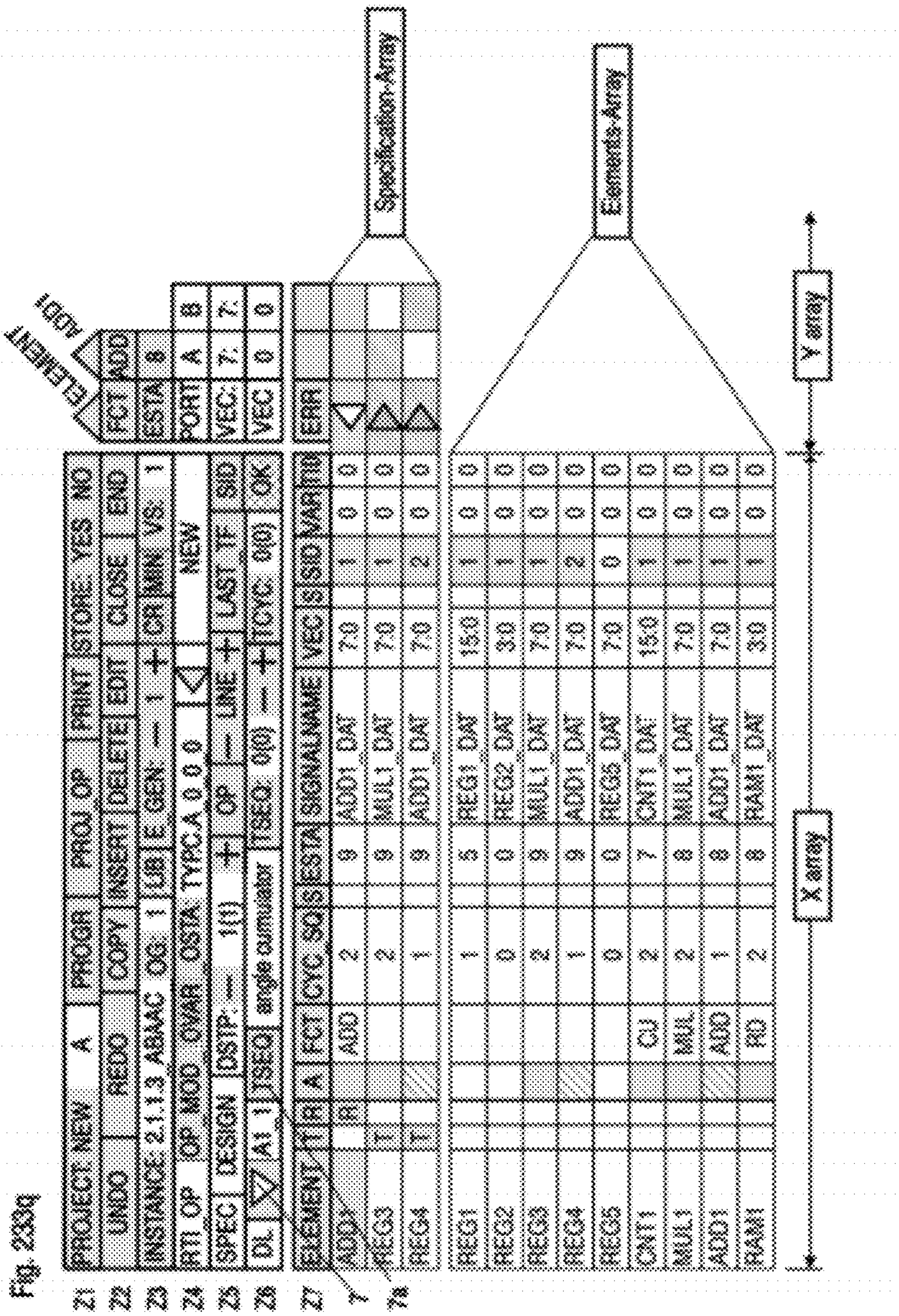
Figure 233R:
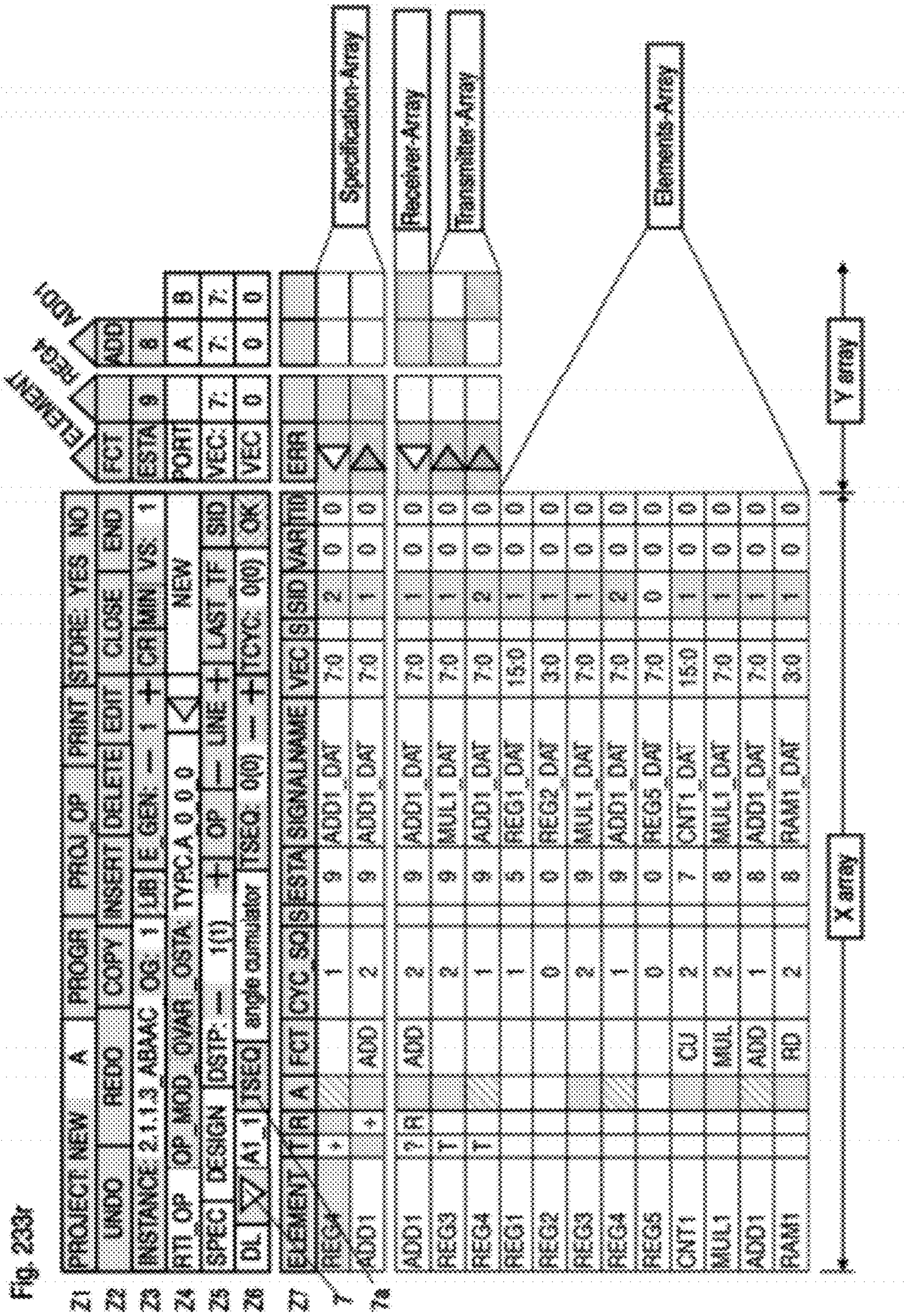
Figure 233S:
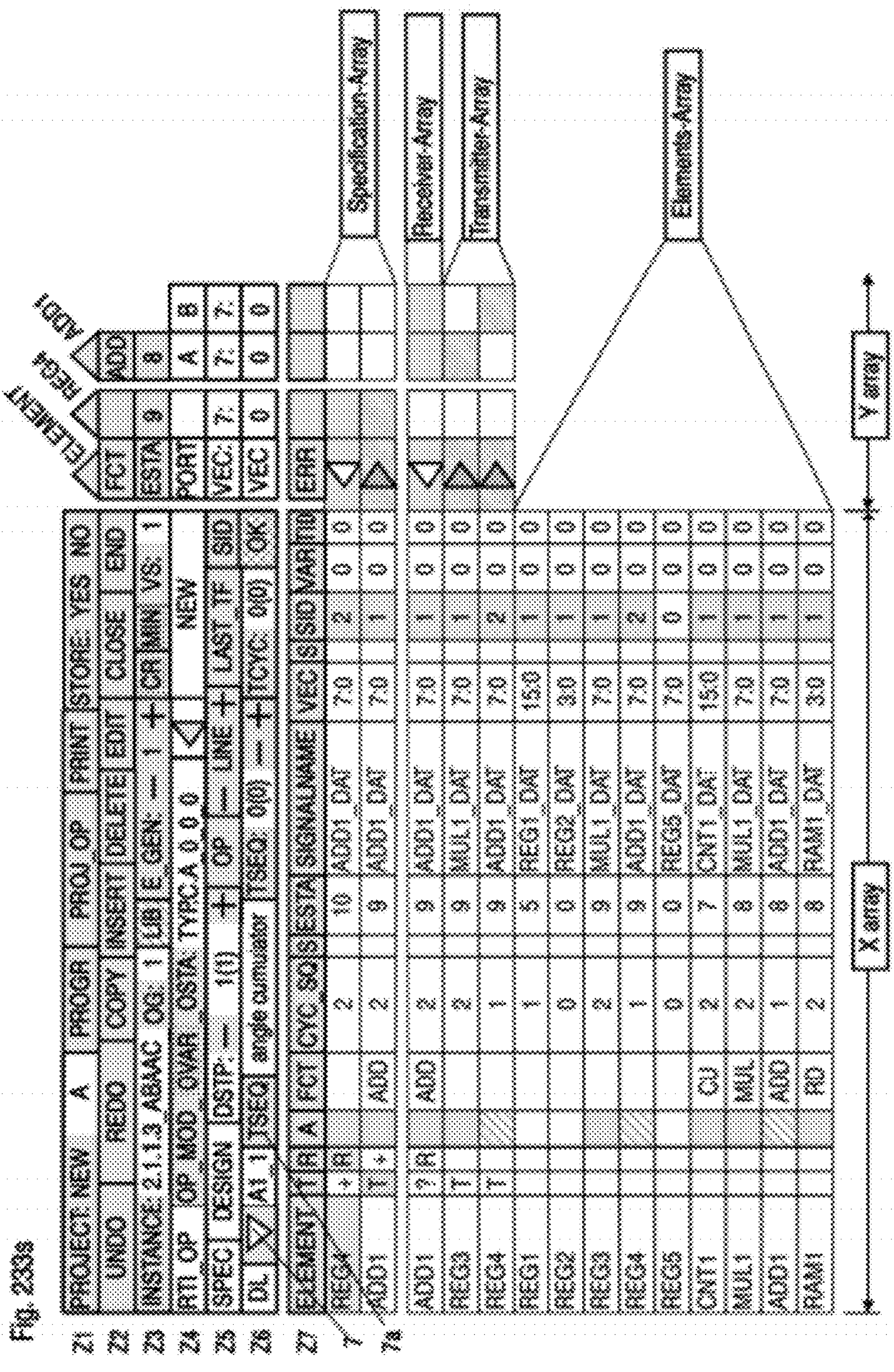
Figure 233T:
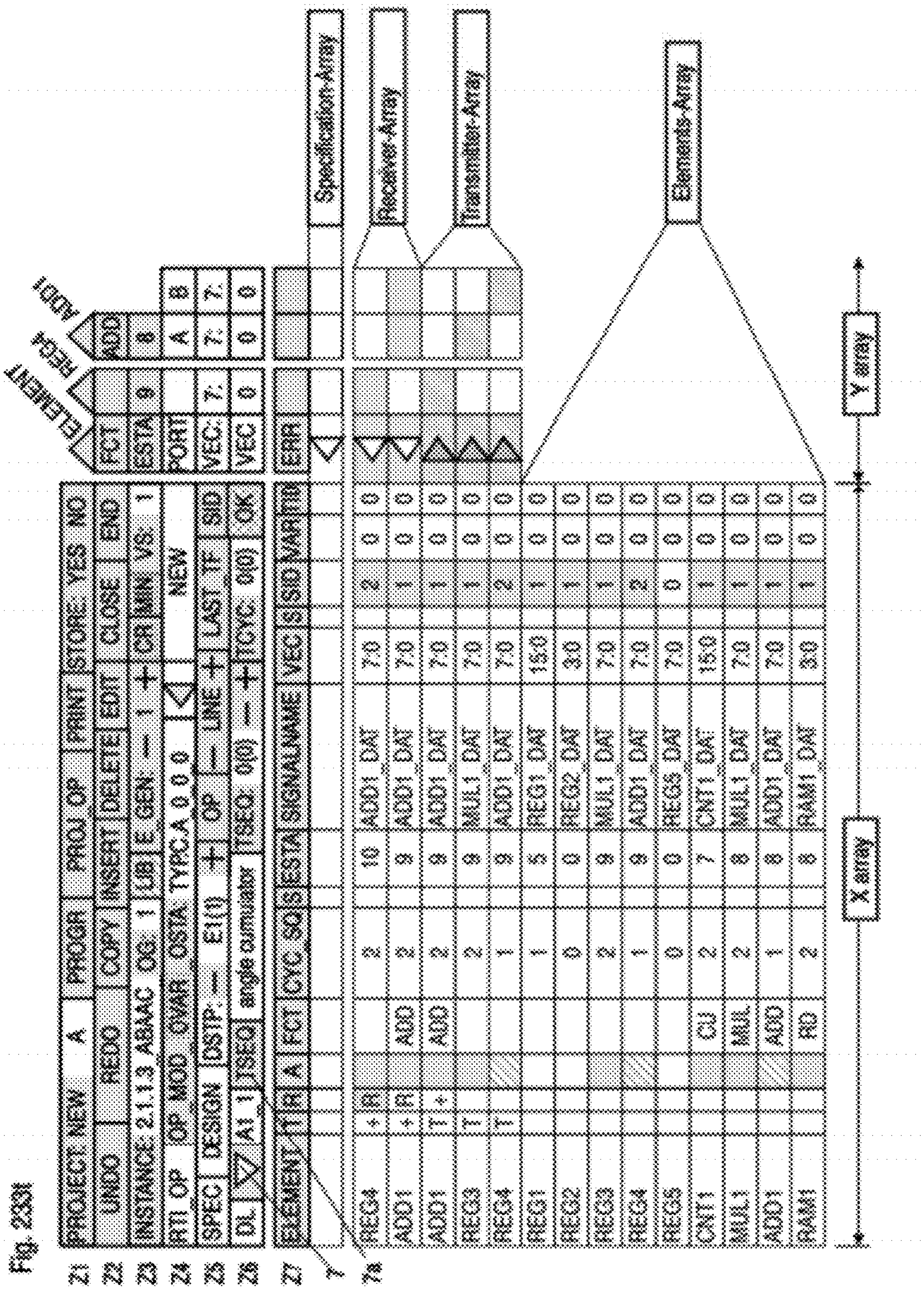
Figure 233U:
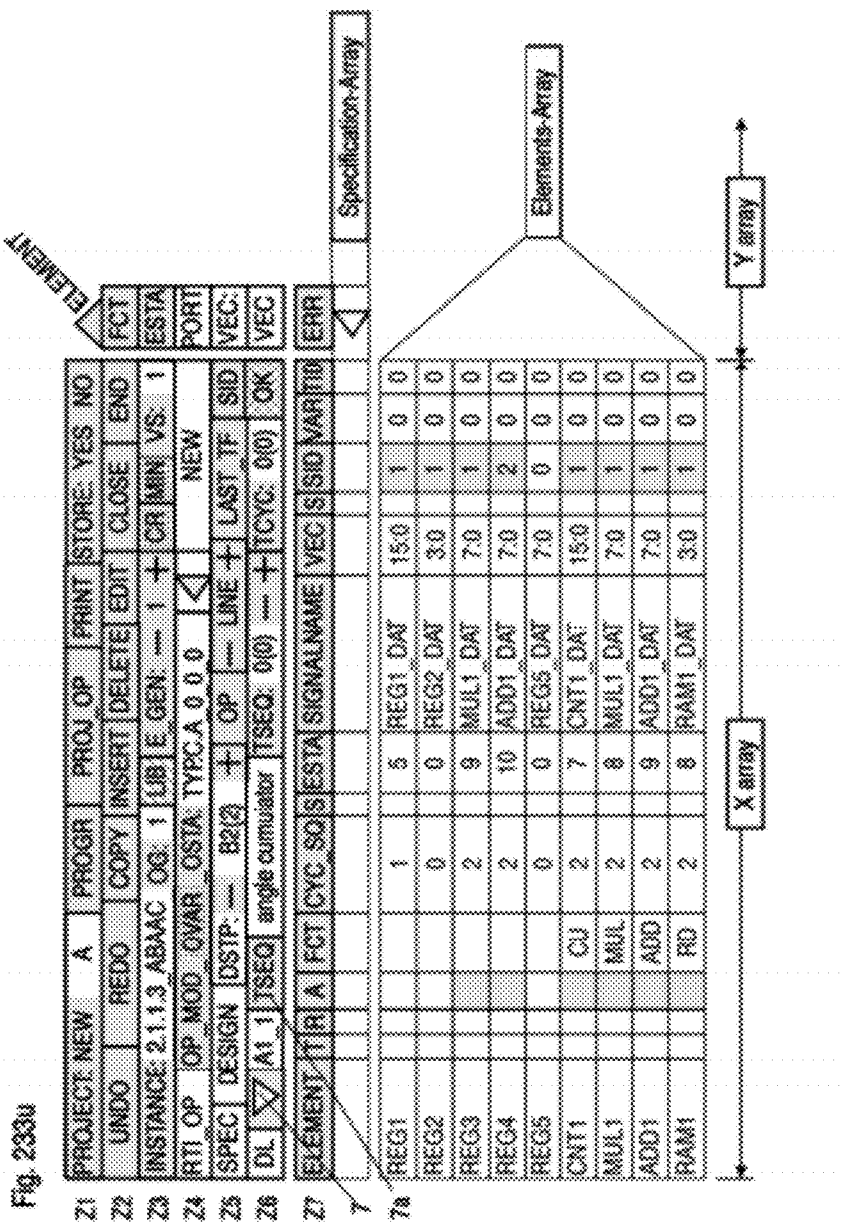
Figure 234A:
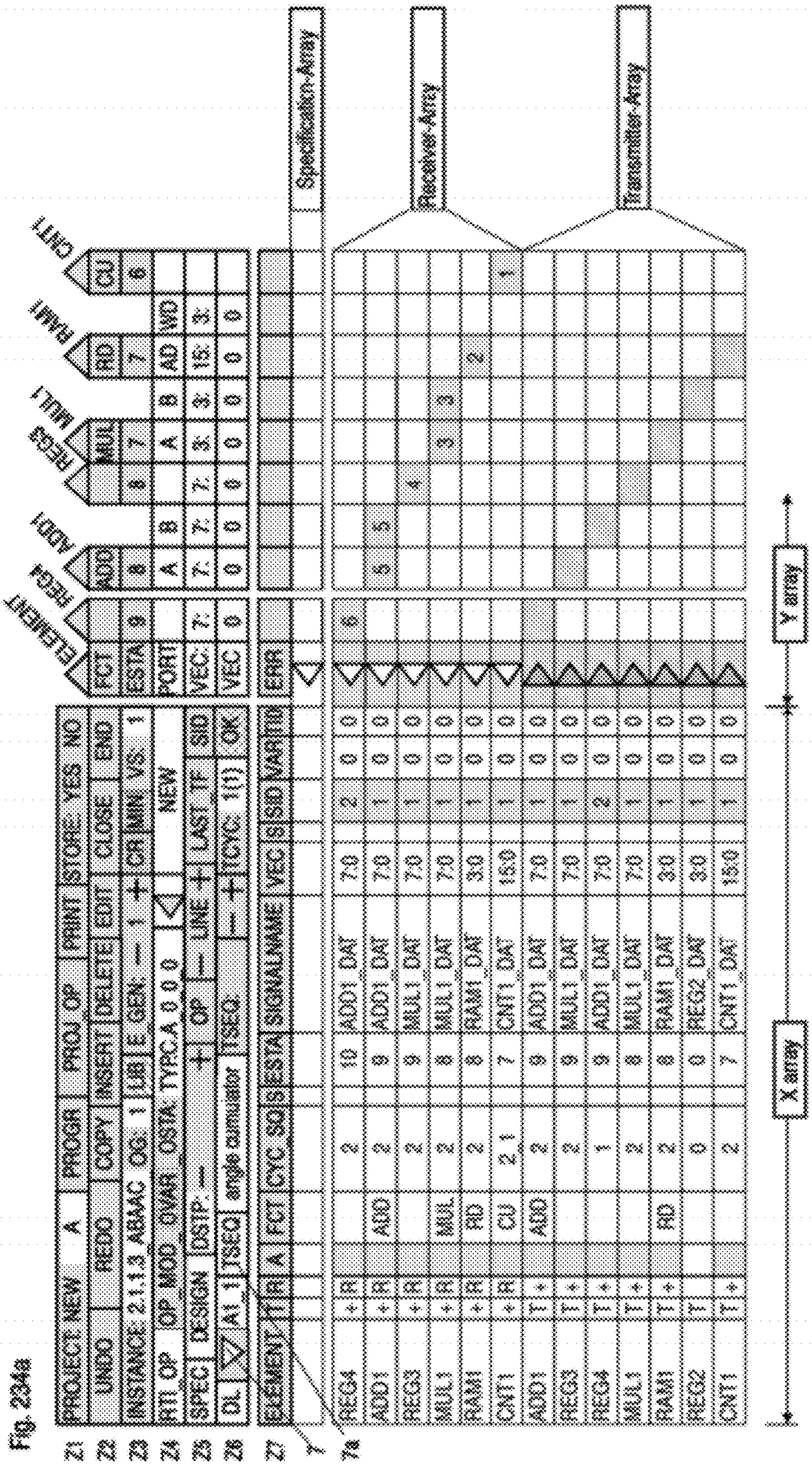
Figure 239A:
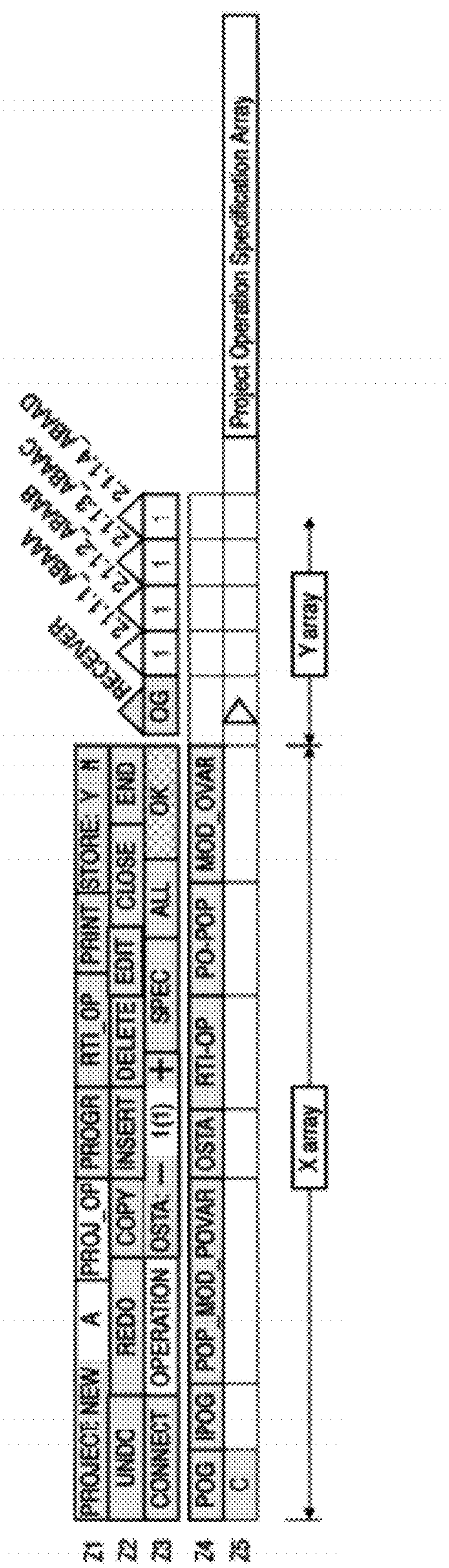
Figure 239B:
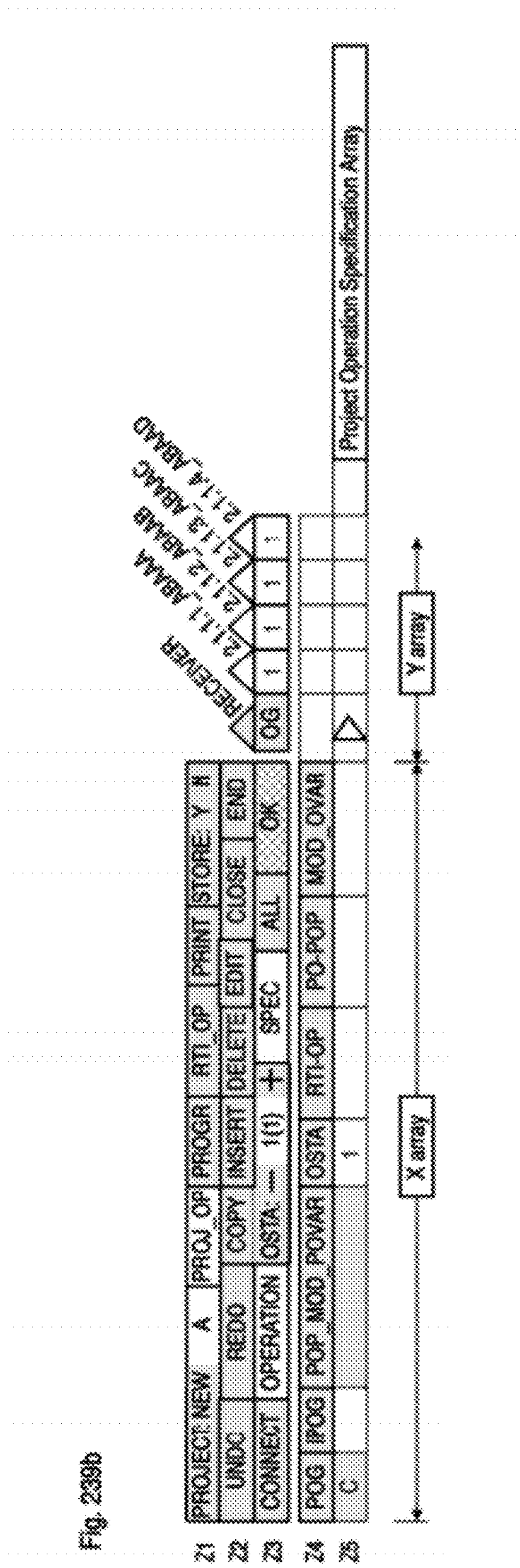
Figure 239C:
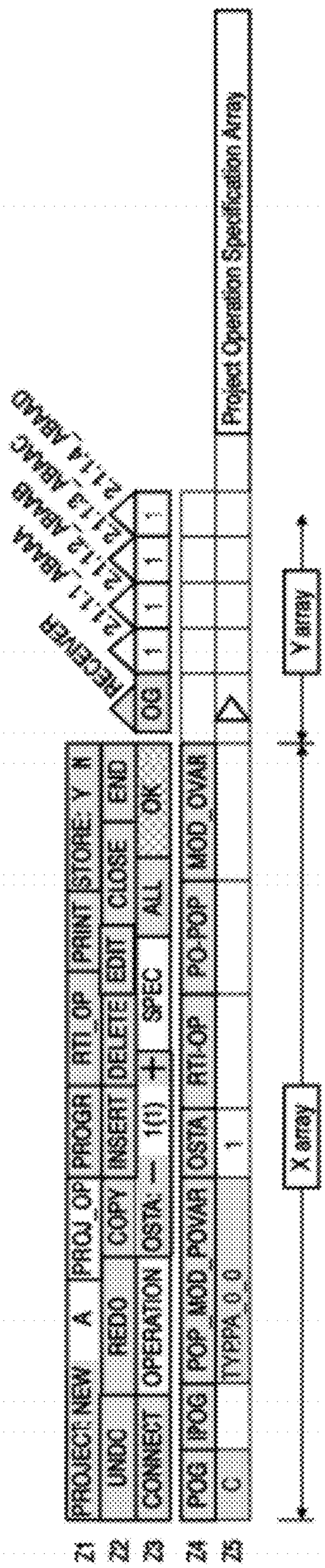
Figure 239D:
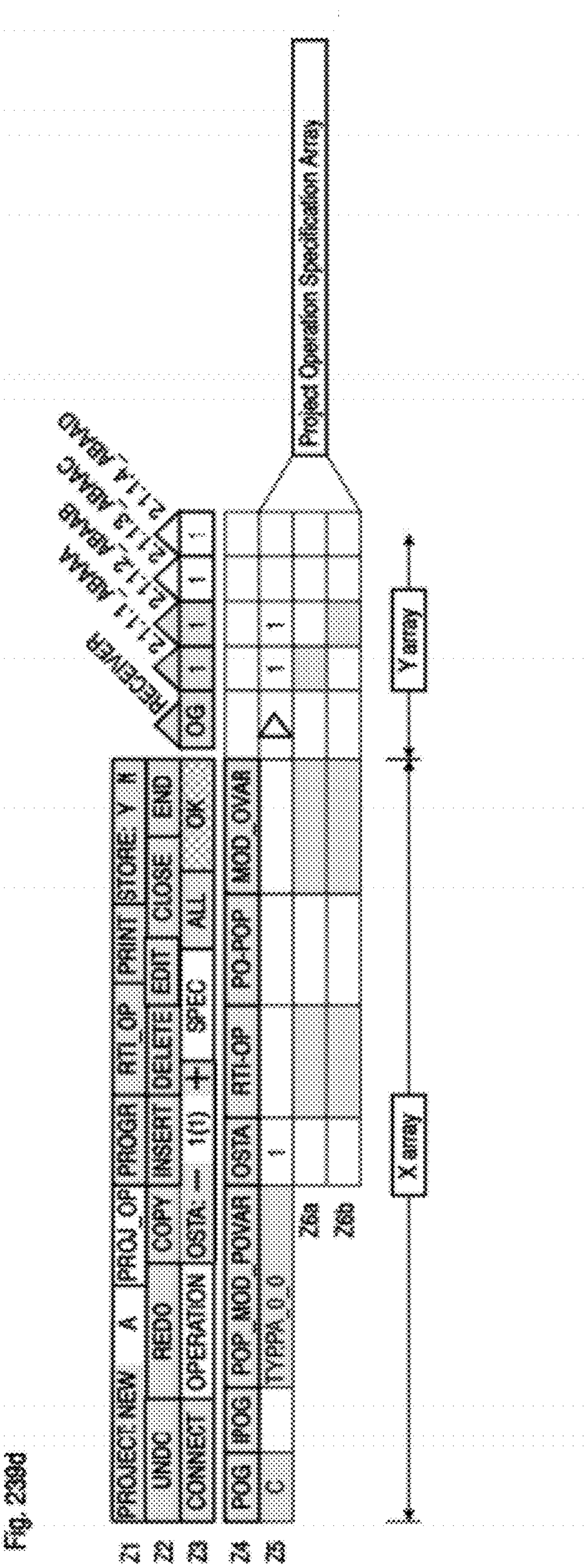
Figure 239E:
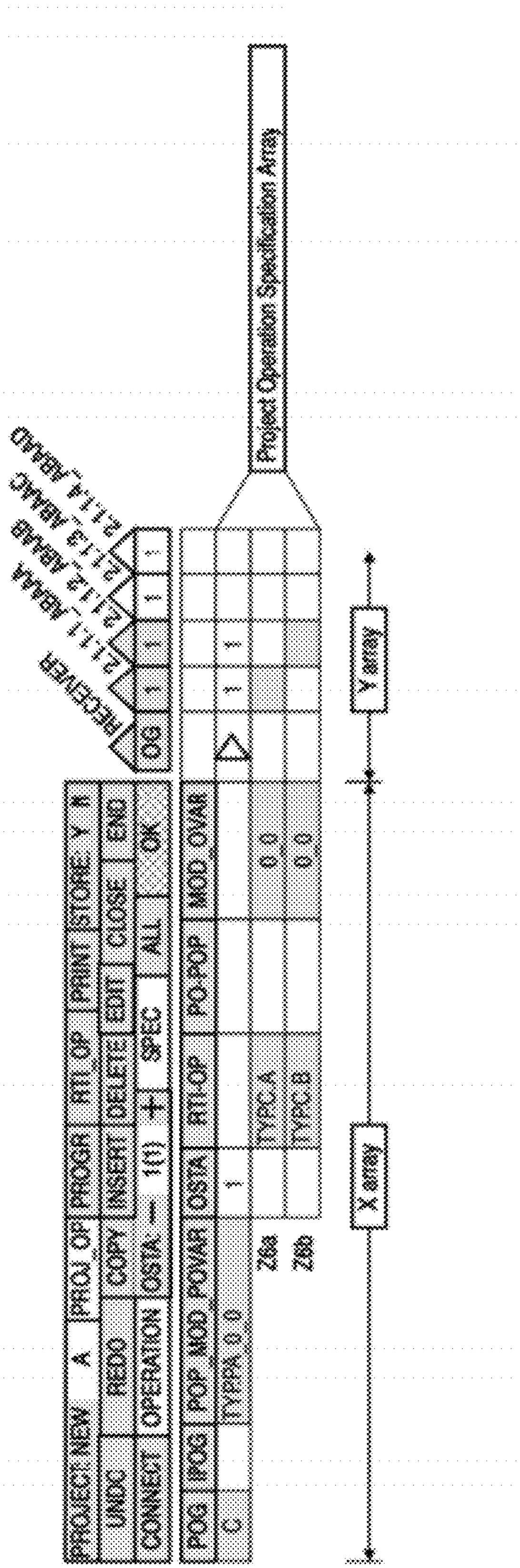
Figure 239F:
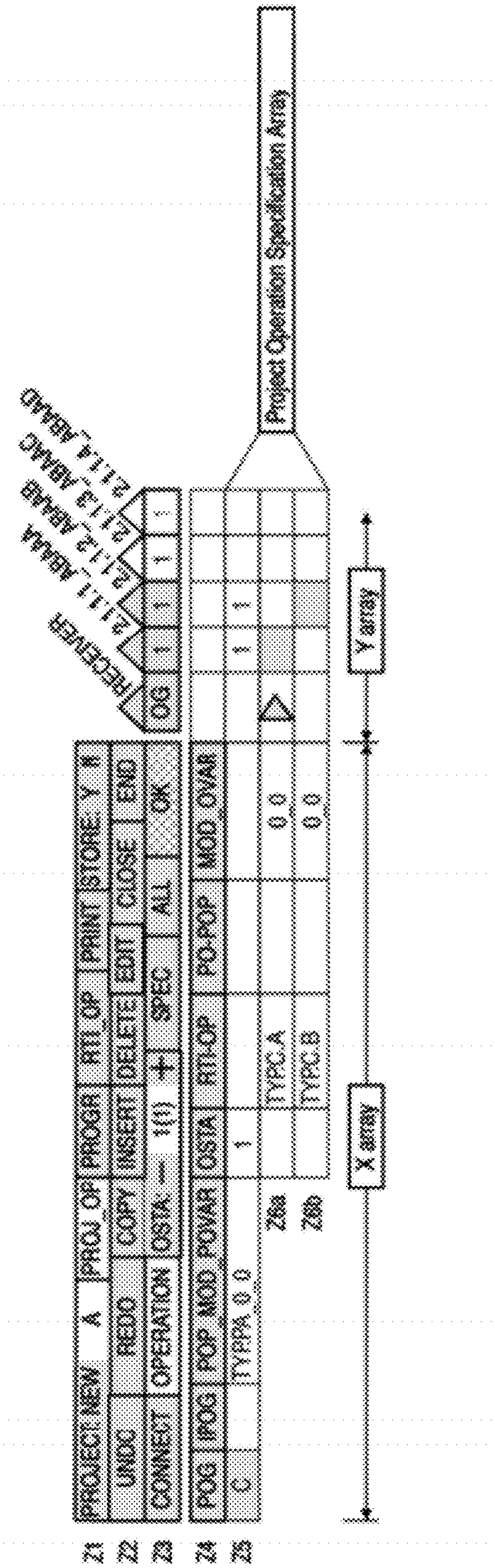
Figure 239G:
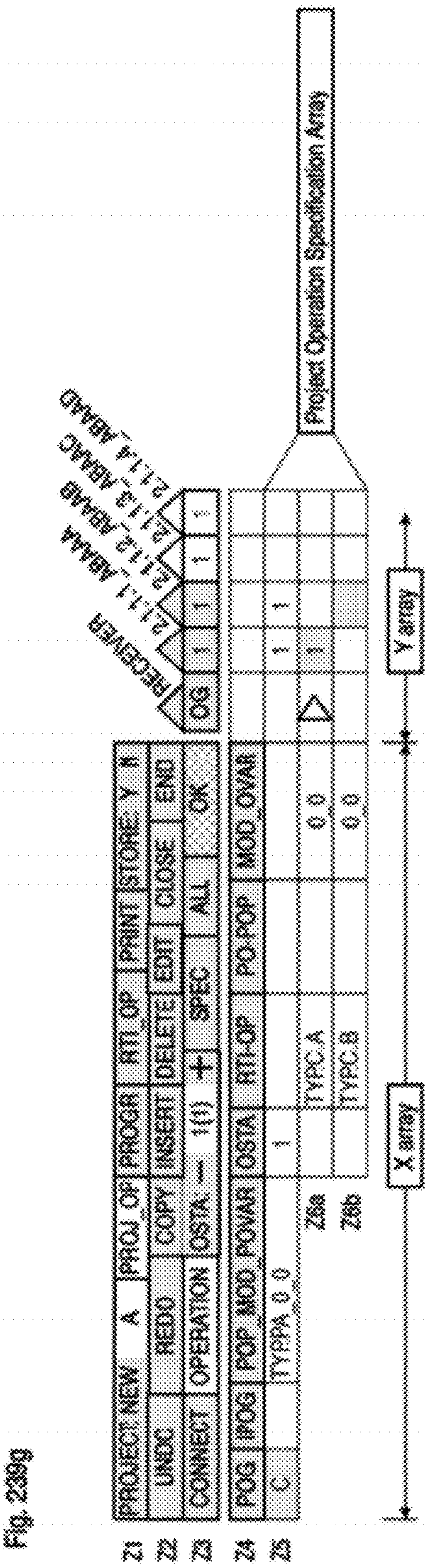
Figure 239H:
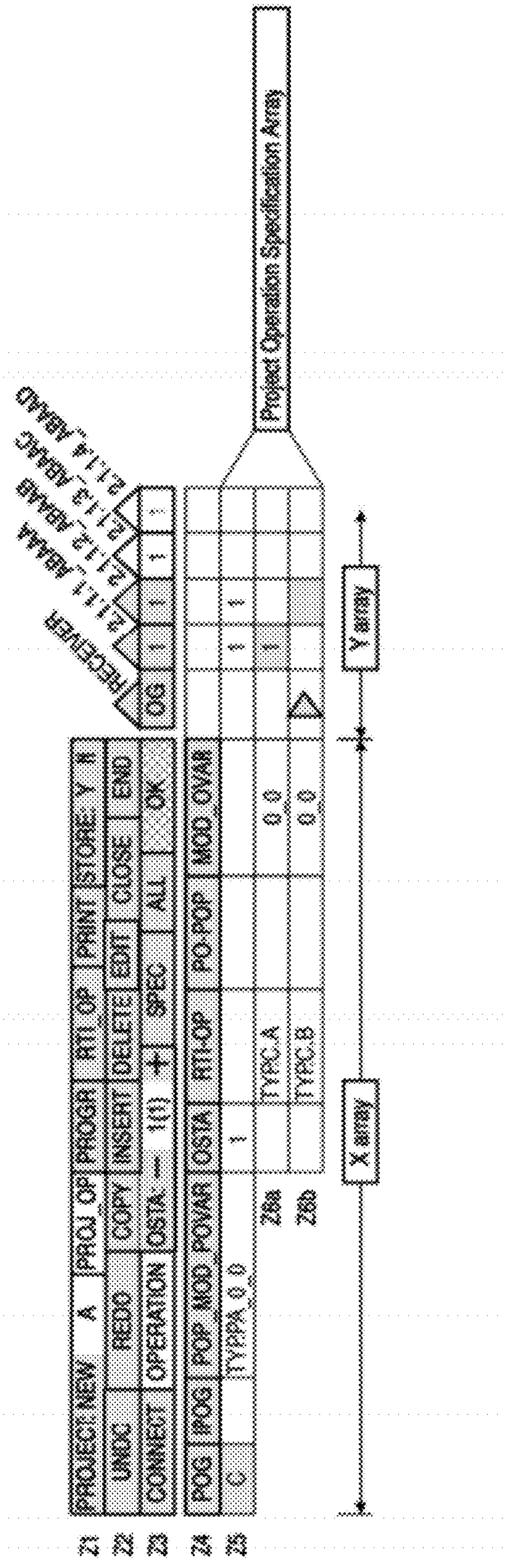
Figure 23L:
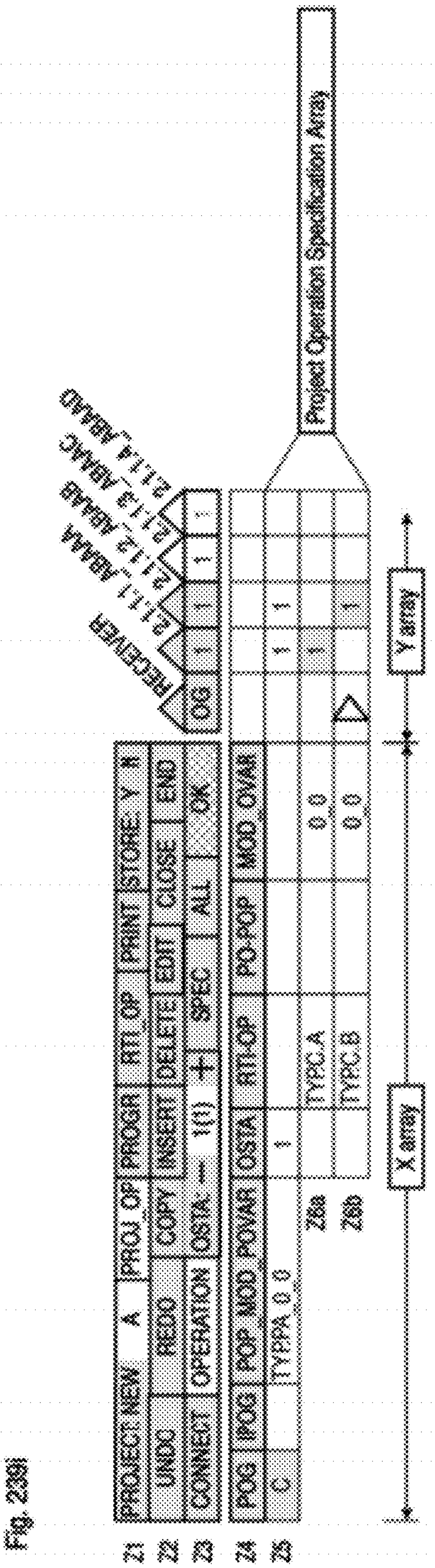
Figure 239K:
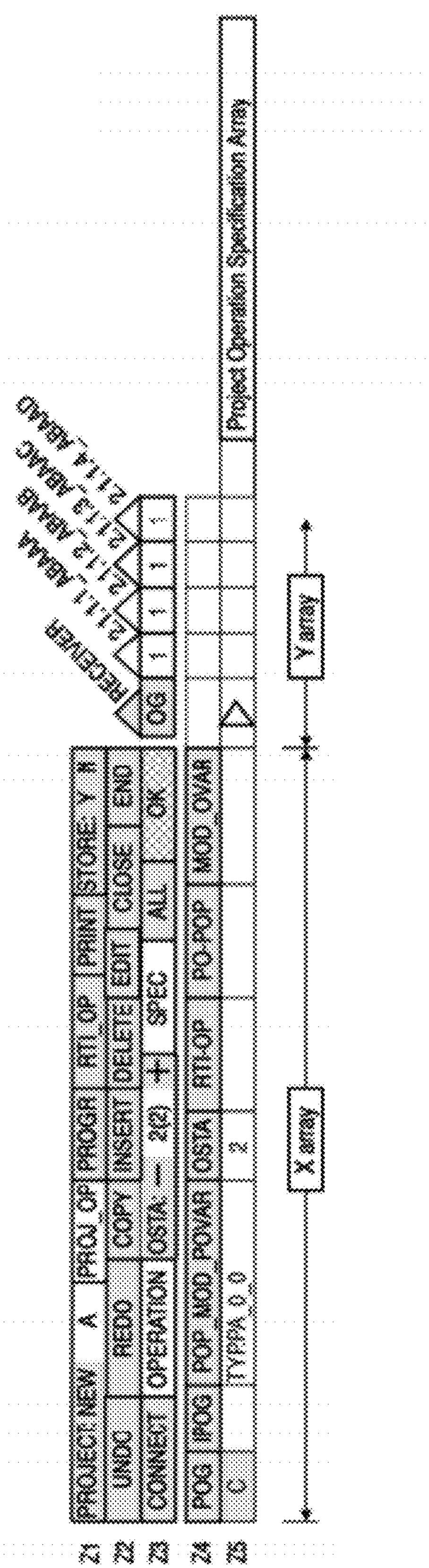
Figure 23L:
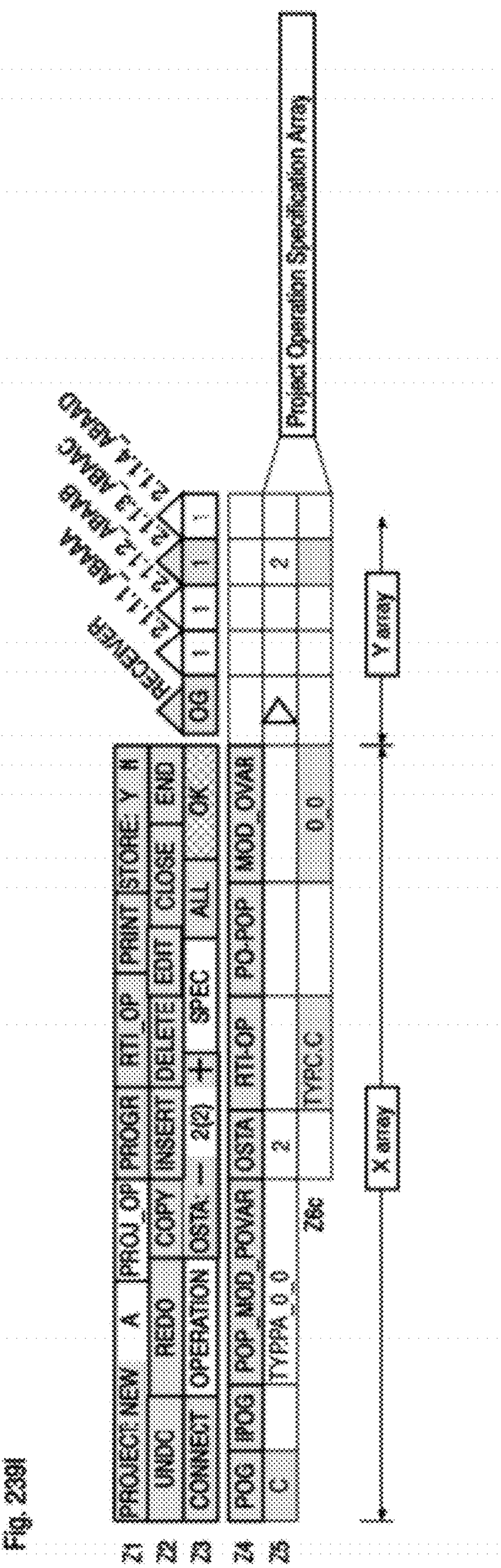
Figure 239M:
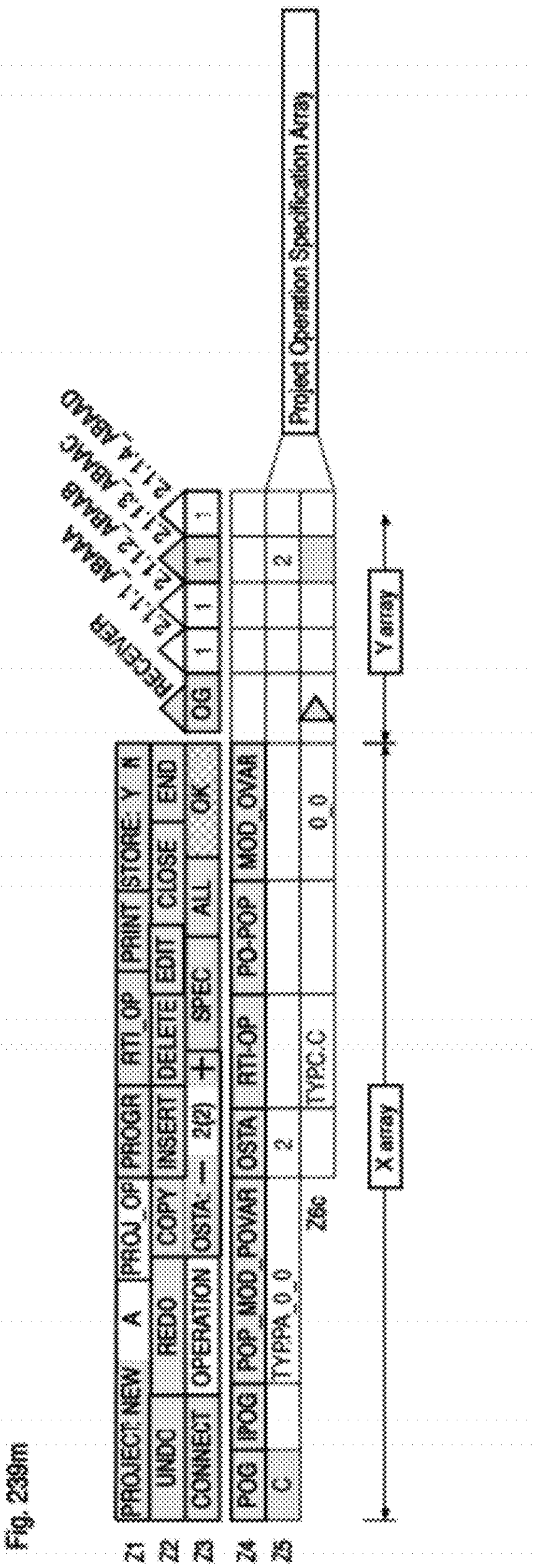
Figure 239N:
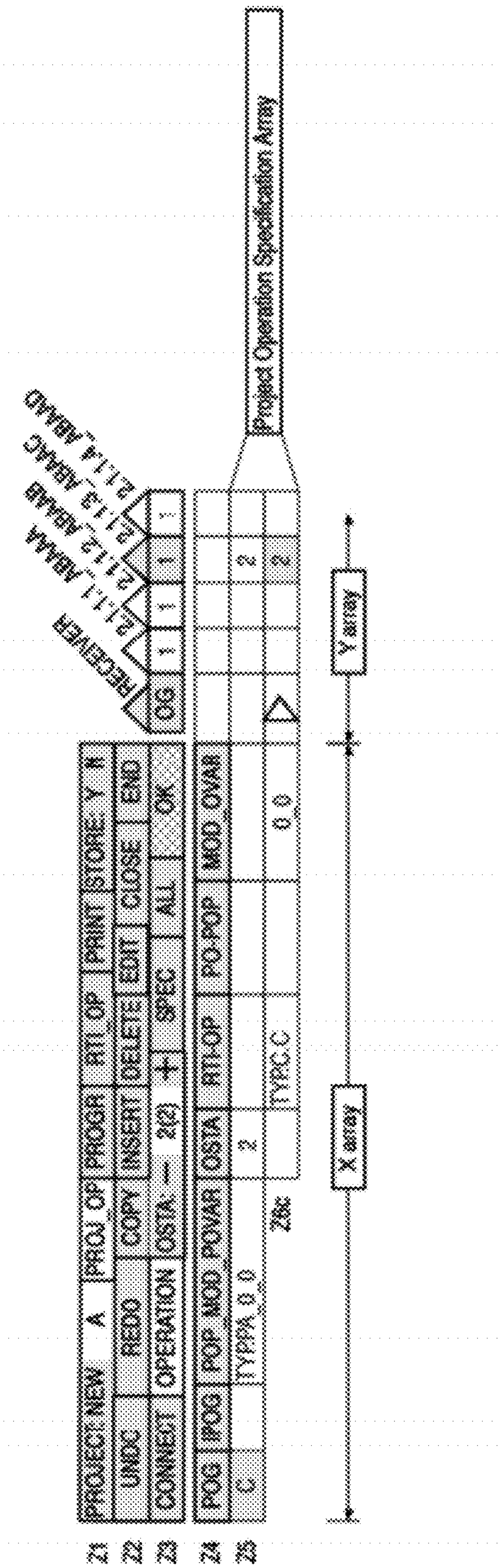
Figure 239O:
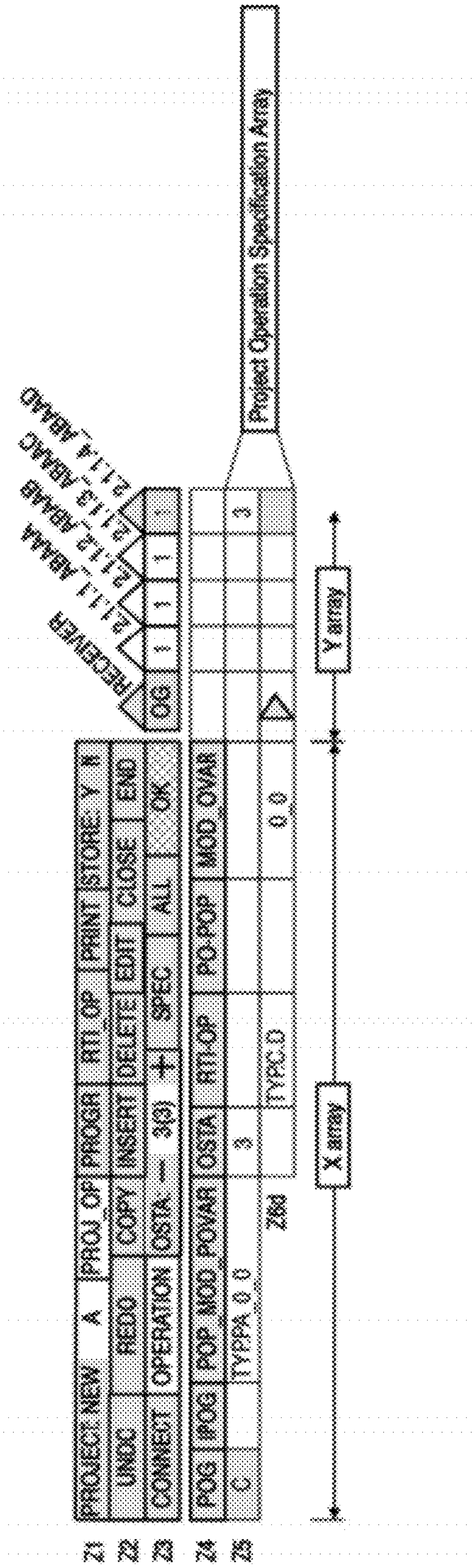
Figure 239P:
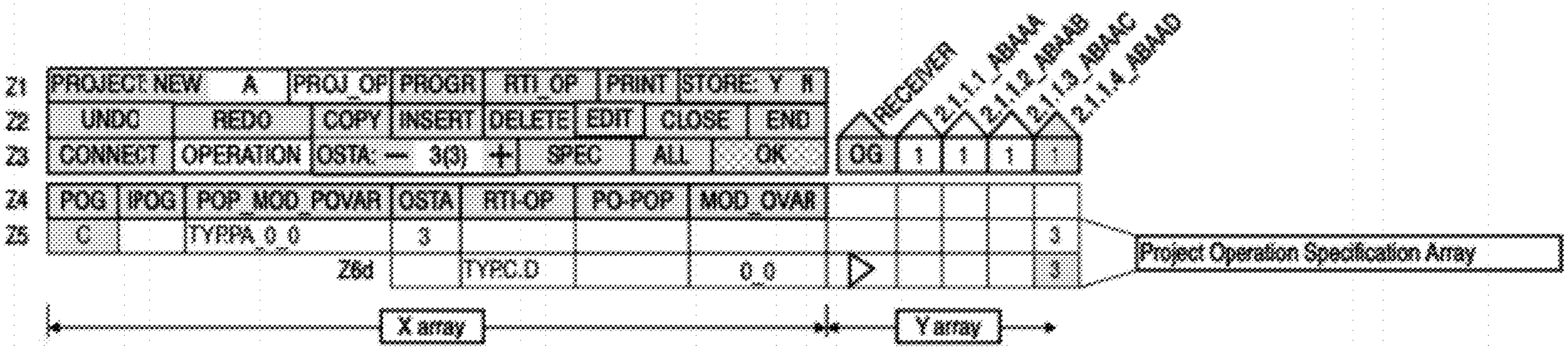
Figure 239Q:
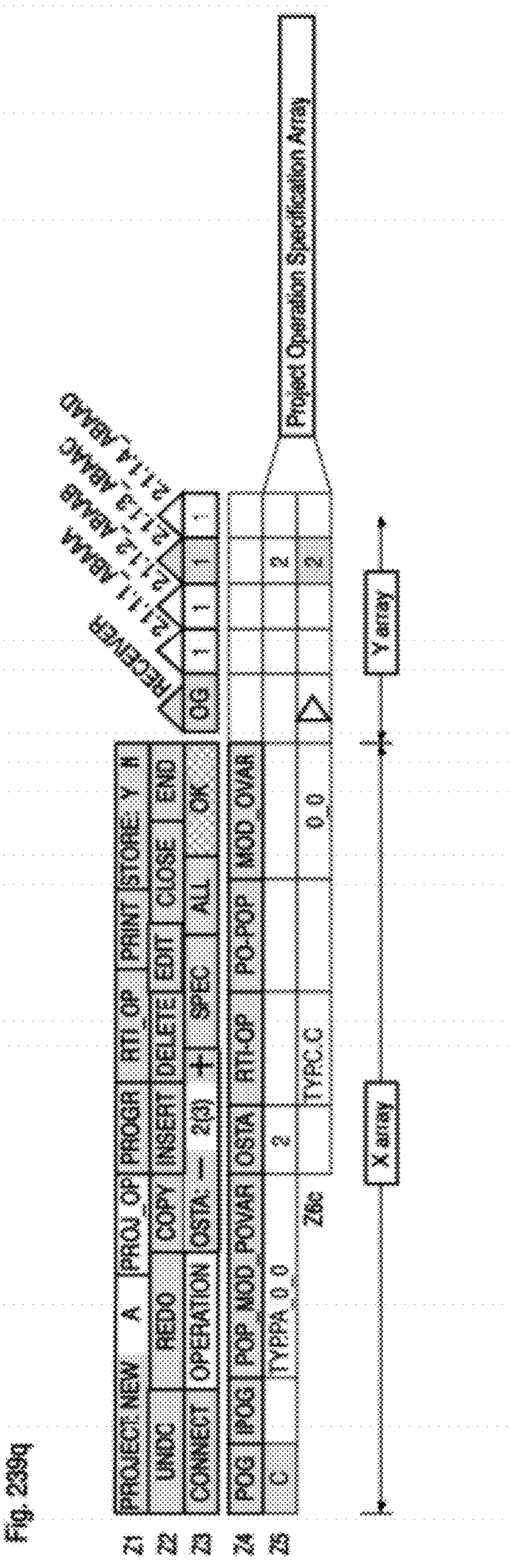
Figure 239R:
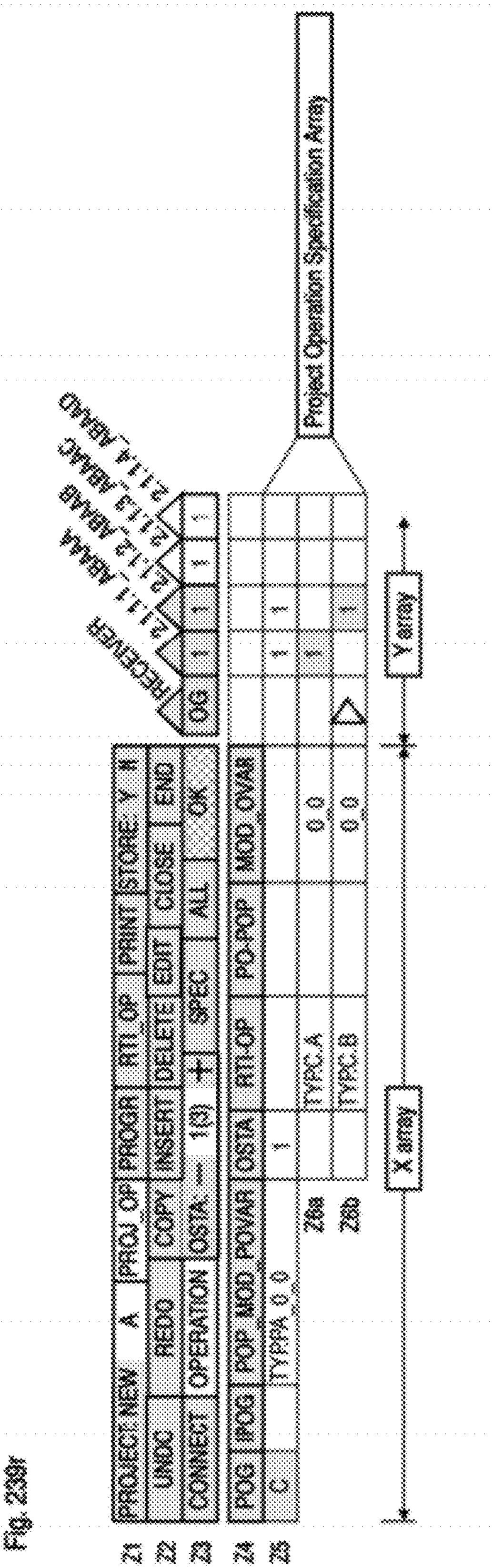
Figure 239S:
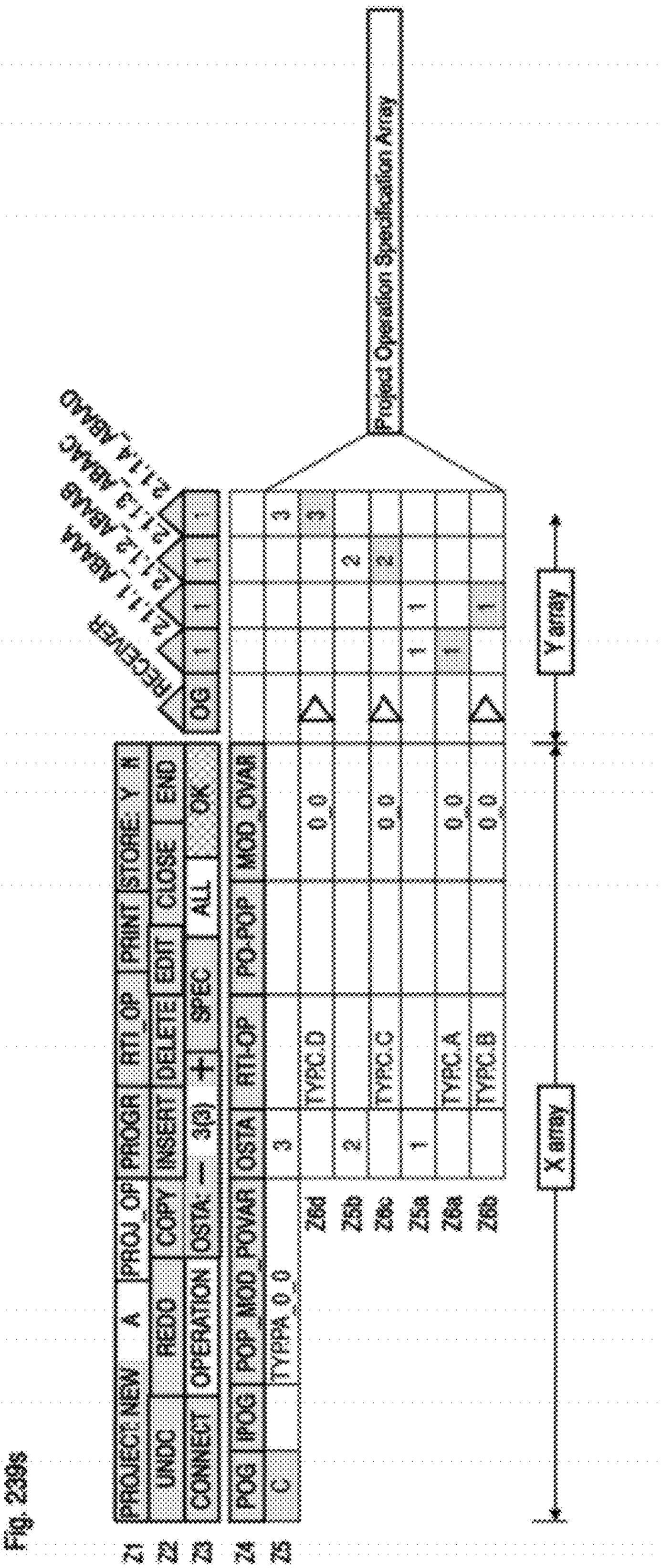
Figure 239T:
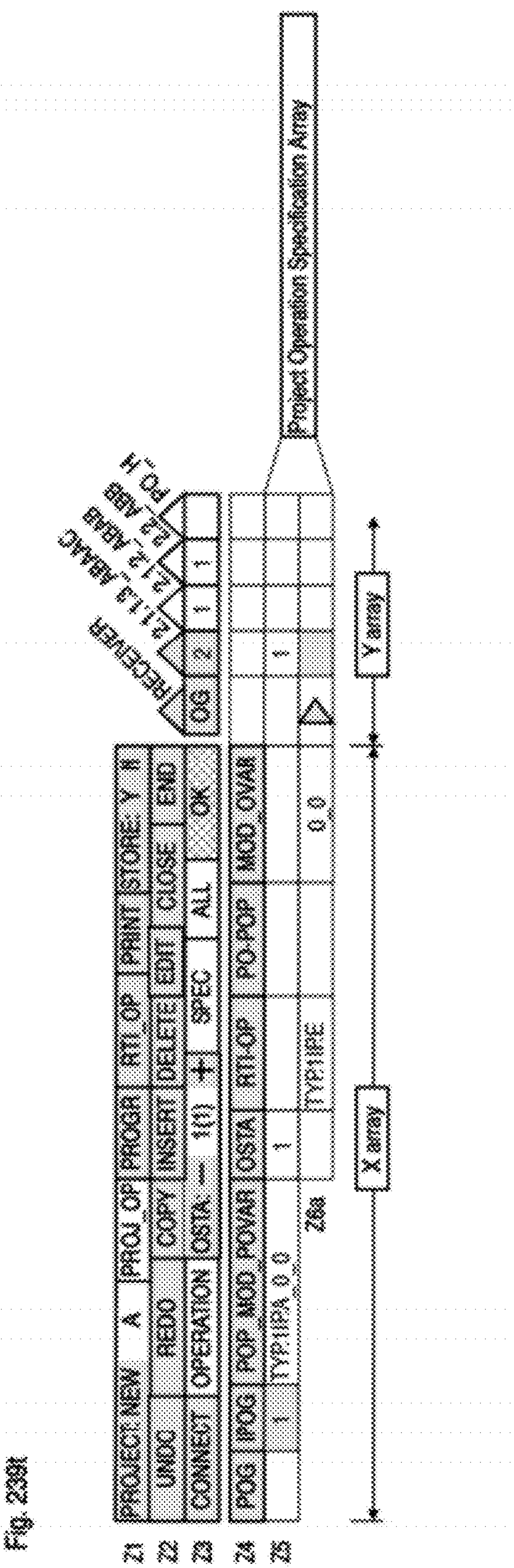
Figure 239U:
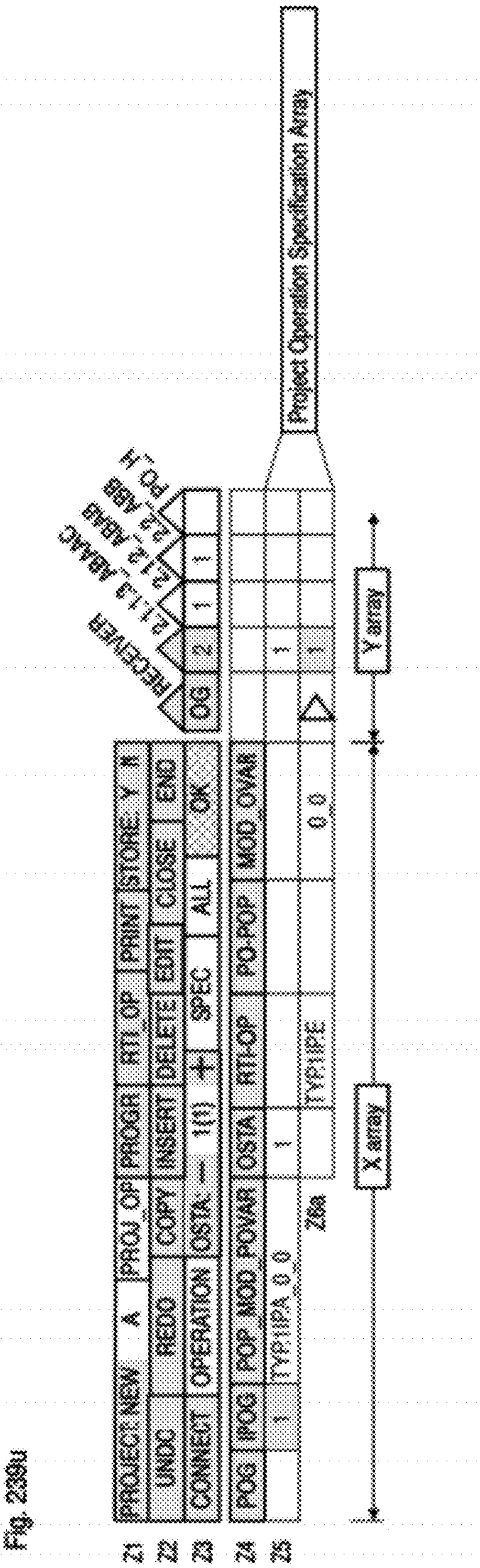
Figure 239V:
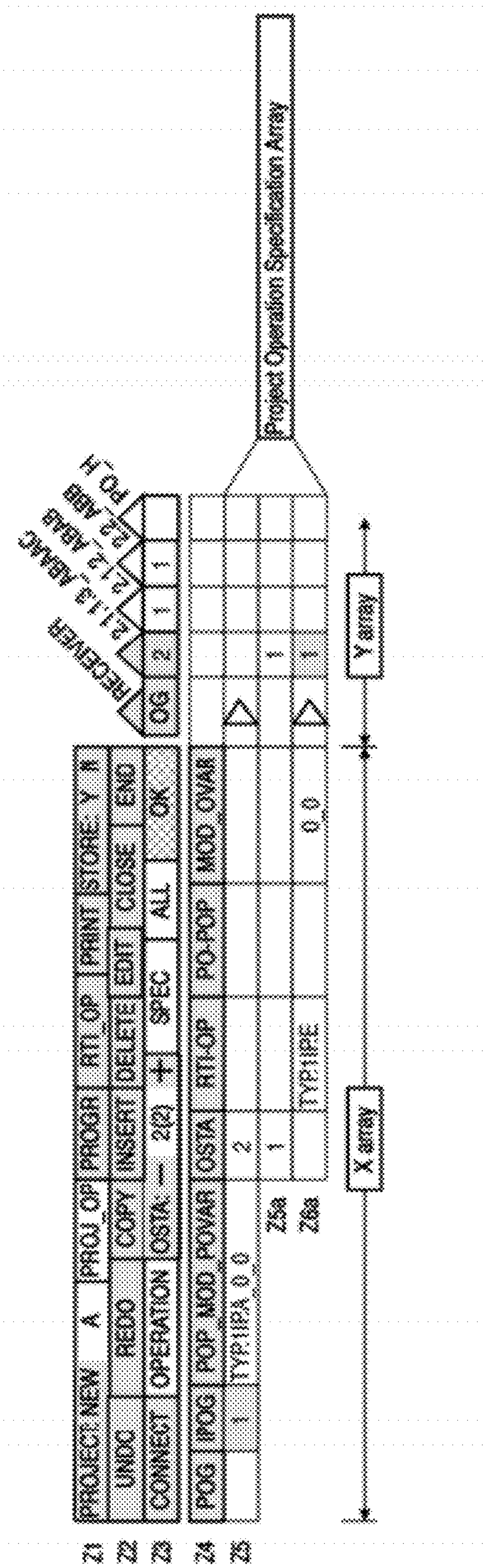
Figure 239W:
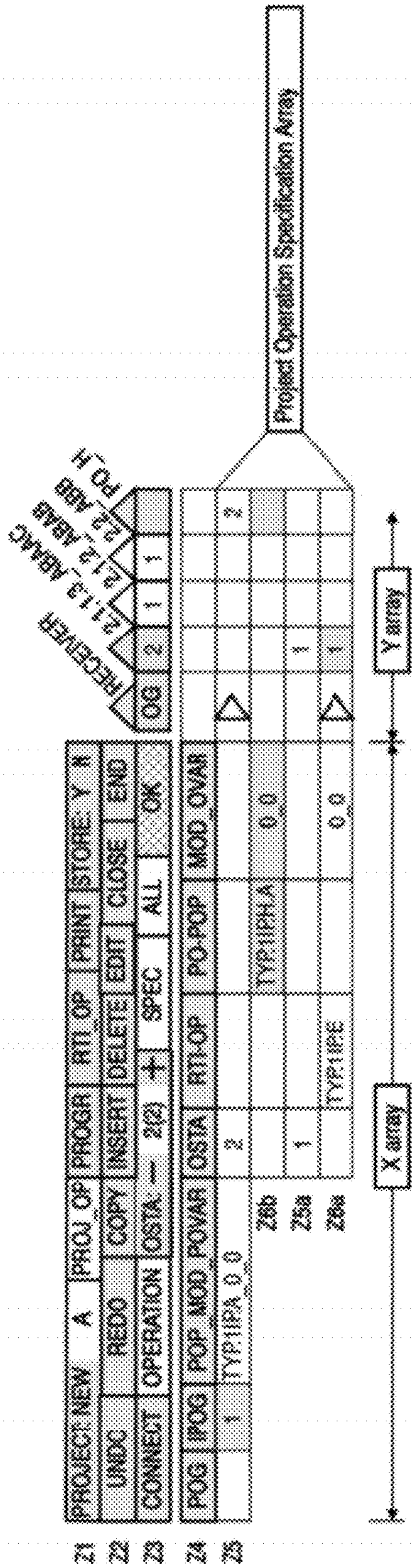
Figure 239X:
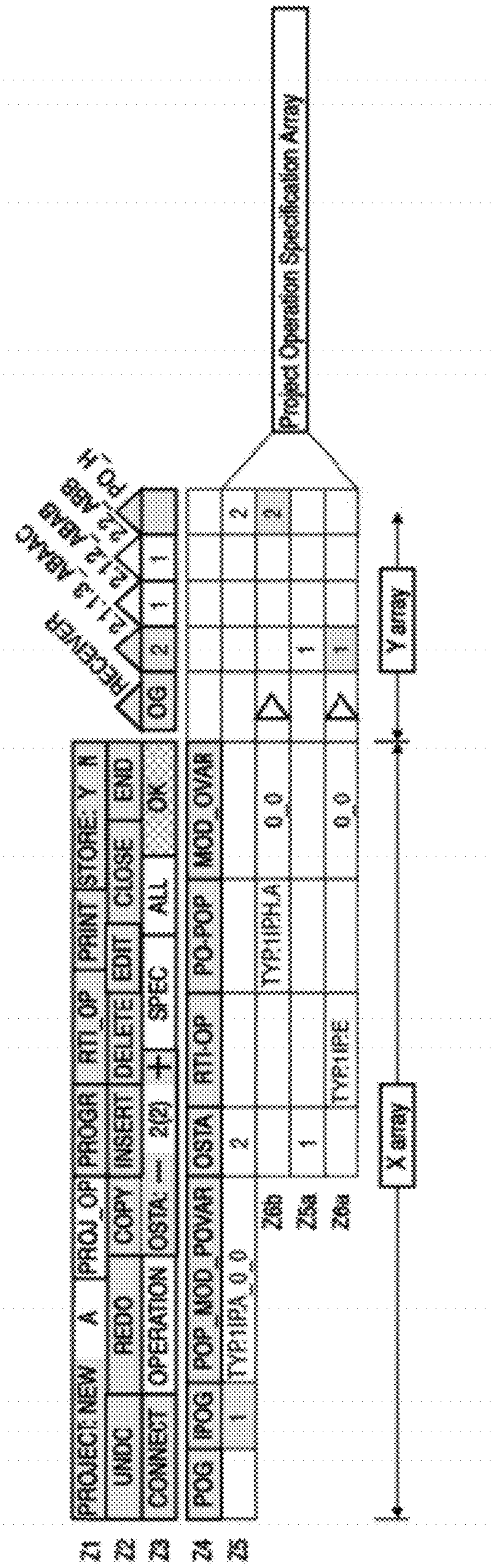
Figure 239Y:
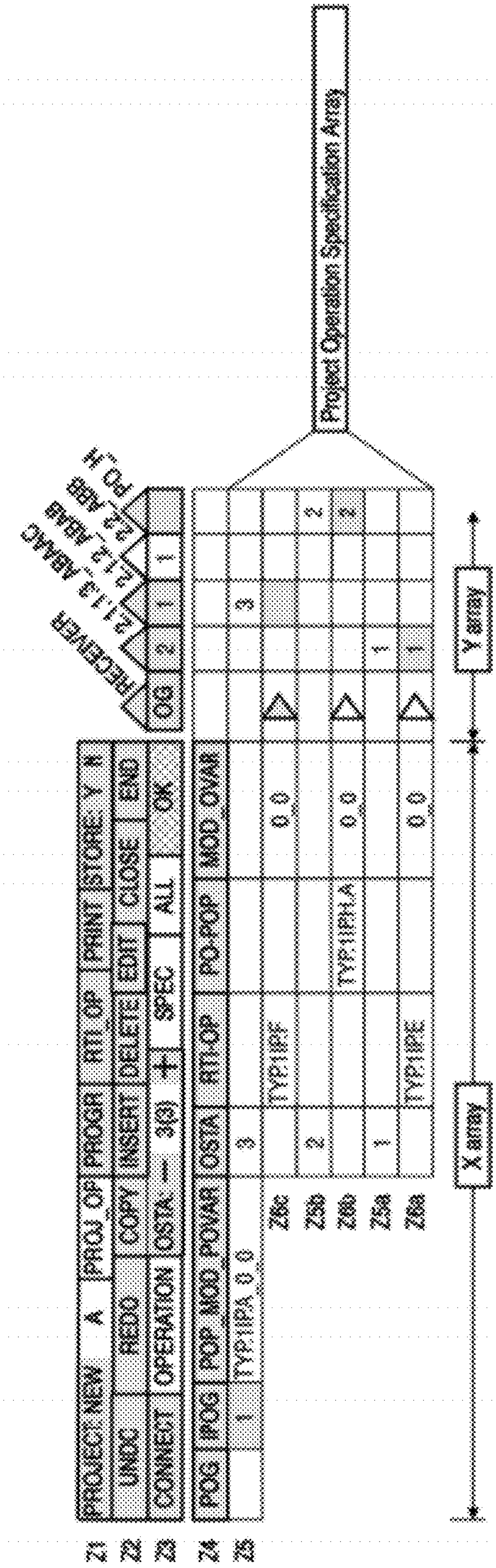
Figure 239Z:
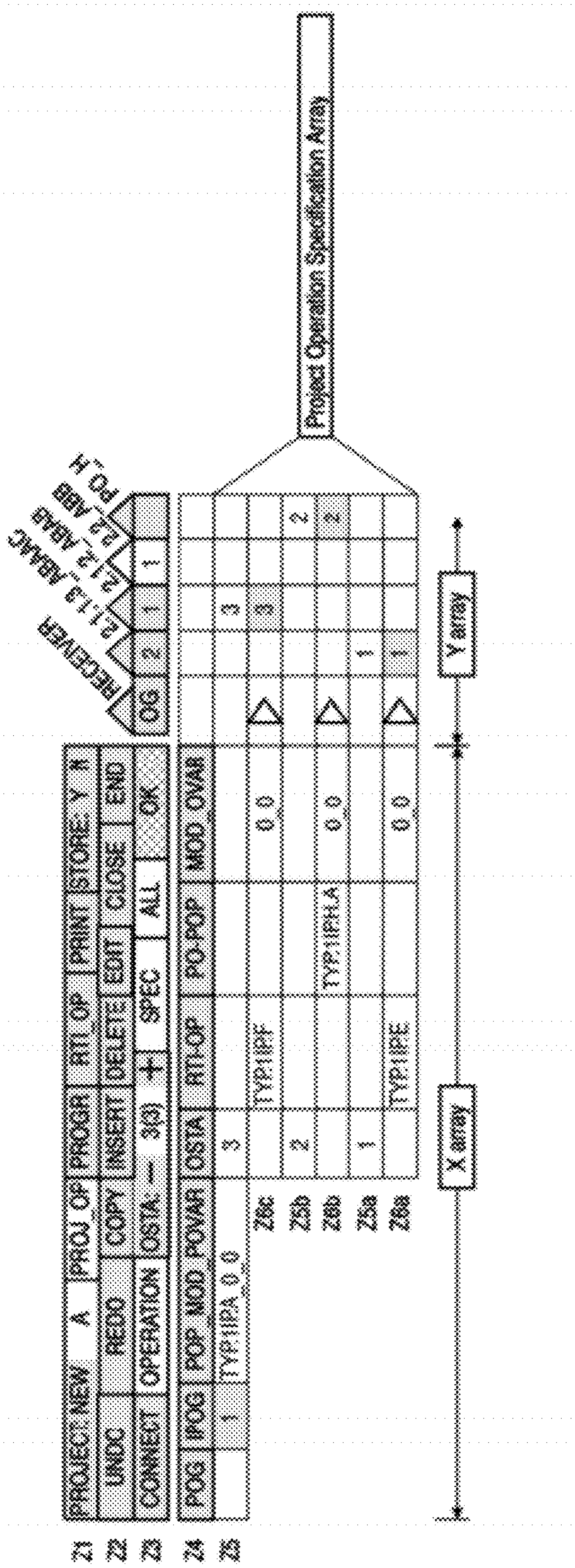
Figure 240C:
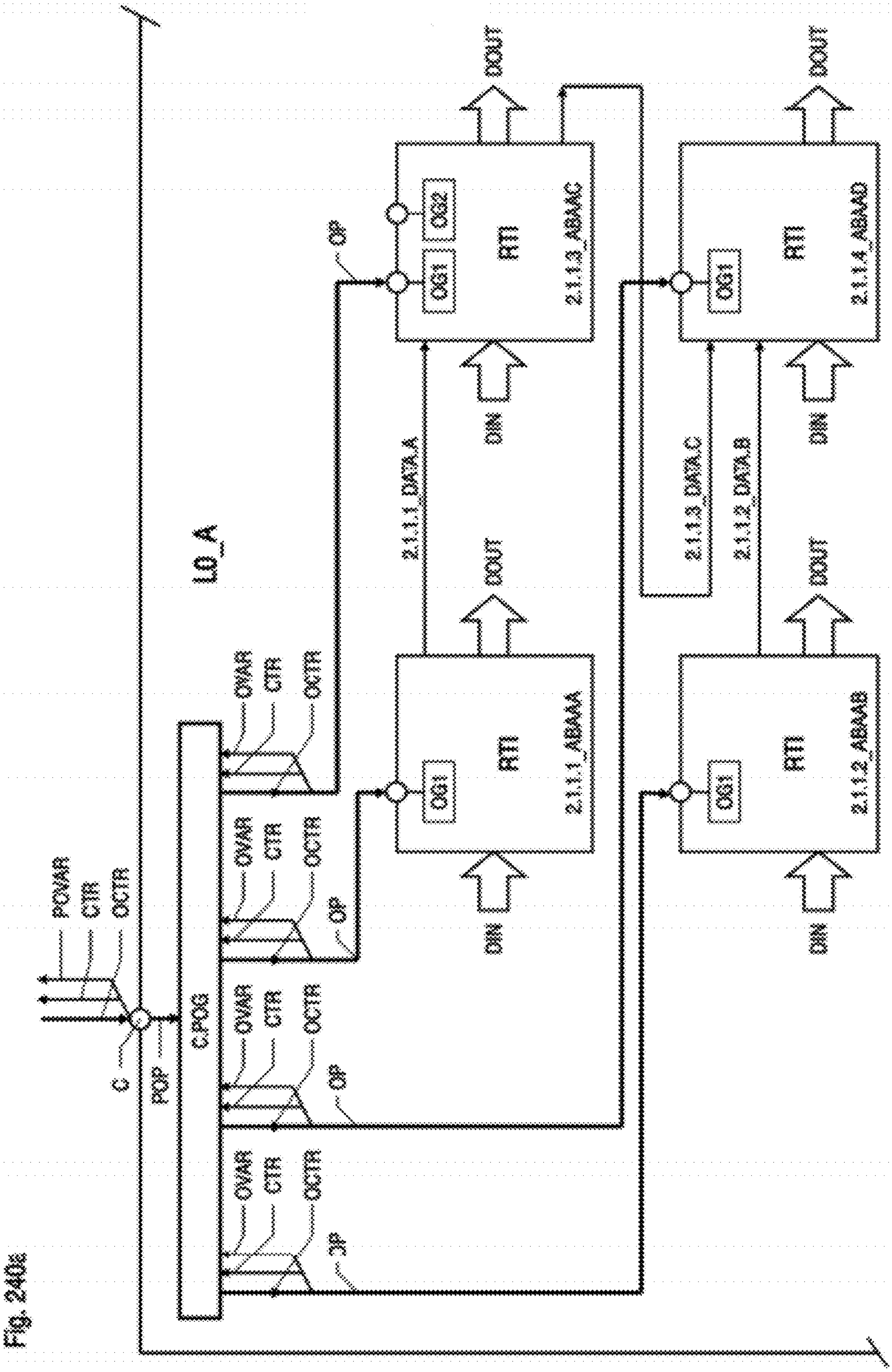

FIG. 57*a* the signal connections of FIG. 56*b* with RTI illustration in the Y array;

FIG. 57*b* the illustration of port names for the library component "ABAAB" in the Y array;

FIG. 57*c* the display "CONNECT" with transmit ports of the sub instances "ABB" and "ABC" and the receive ports of the sub instance "ABAAB" illustrated in the X array. "ABAAB" as a library component has signal names different to the port names;

FIG. 58 the preparation for the adapting of port names to signal names for the instantiated library component "ABAAB". For that the button "NAME:PORT=SIG" in line "Z2.2" is activated;

FIG. 59 the beginning of the adapting of the port names to the signal names for the instantiated library component "ABAAB" by activating the button "CORR" in "Z3". Hereby a "?" is inserted adjacent to "CORR", which is displayed during the adapting process;

FIG. 60 the end of the adapting process of FIG. 59 by automatic deletion of "?" adjacent to "CORR";

FIG. 61 after acknowledgement of the adapting of the port names to the signal names for the library component "ABAAB", the buttons "CORR" and "NAME:PORT=SIG" are automatically deactivated;

FIG. 62 a survey of the project in block structure with interfaces and connected "POGs" and one "IPOG", the top level "A" and its instances and sub instances;

FIG. 63 a system survey in block structure design with interfaces and connected projects 1-5;

FIG. 64-66 the control signal structures for the "C.POG" together with its project interfaces and their connected "RTIs" as block structure design. FIG. 65 additionally shows the internal and external input of the signals "SVAR" and "AVAR" for the RTI "ABAAA" for the generation of "OVAR";

FIG. 67-71 the control signal structures in block structure display for the "D.POG" together with its project interface and its connected "RTIs" and the splitting of "D.POG" into two RTI arrays above "D.1.POG" and "D.2.POG";

FIG. 72-73 the multiplexing of "D.POG" between project interface and "D.1.POG" and "D.2.POG";

FIG. 74-75 the prioritisation of "D.1.POG" and "D.2.POG" to the operation project interface "G";

FIG. 76-77 in block structure design the control signal structures for the "1.IPOG" together with its project interface and its connected "RTIs" and the splitting of "1.IPOG" into two RTI arrays above "1.1.IPOG" and "1.2.IPOG";

FIG. 78 a bi-directional driver field between project interface and "POGs" or/and "IPOGs";

FIG. 79 a block structure design of the control signal structures for the partitions in a project1 and project2 and between the interfaces of project1 and project2;

FIG. 80*a*-86*b* the function of the input/output signal state (SSTA) and of the element state (ESTA) for the elements combiner "COM", register "REG", counter "CNT", shift register "SHR", input port "PI", output port "PO" and random access memory "RAM";

FIG. 87*a*-94*b* the function of the input/output signal state (SSTA) and of the element state (ESTA) as well as the allocation of static and dynamic signal names for the elements input/output port "PI/PO", register "REG", counter "CNT", and shift register "SHR";

FIG. 95*a*-95*i* the functional features for a group of elements in a so-called RTI-cycle-array "A1" with cyclic repeating transfers;

FIG. 96*a*-97*h* for two RTI-cycle-arrays "A2" and "A3" the allocation of data processing steps "DVSTPs", clock sequences "CLK1, CLK2, . . . " and "ESTAs" for the initialisation and cyclic transfers of the cycle arrays "A2" and "A3";

FIG. 98*a*-98*h* for an RTI element array the interrelationship of RTI-base-operation-variant number "OVAR0, OVAR1, OVAR2, . . . " with the element variant number "VAR0, VAR1, VAR2, . . . " and transfer identifier number "TID0, TID1, TID2, . . . ";

FIG. 99*a*-99*s* the RTI operation display "RTI-OP-BS" in group level "GL" with its elements groups input "P_IN", register "REG", counter "CNT", shift register "SHR", combiner "COM", memory "MEM", and output port "P_OUT" as well as the definition and entry of the RTI base operations/RTI-base-operation-variants to specify under designation of the reference operation in the RTI operation window;

FIG. 100-140 the provision of the elements for a specification of an RTI operation in the group level "GL" and design level "DL", as well as the convention of entry and display in the "element array" of "DL" for the function "FCT", cycle sequence array "CYC_SQ", signal name, vector "VEC", vector splitting "S" and signal identifier "SID";

FIG. 141-149 for a specification of an RTI operation the entry and the display in the "element array" of the design level "DL" for "CYC_SQ" with sequence splitting "S";

FIG. 150-163 for a specification of an RTI operation the entry and the display in the "element array" of the design level "DL" for different cycle sequence arrays "CYC_SQ" with sequence splitting "S" in combination with vector (VEC) splitting (S);

FIG. 164-194 a specification of a base operation for an RTI partition composed of the RTI input port "PI1", the shift registers "SHR1", "SHR2" and the RTI output port "PO1";

FIG. 195-215 a specification of an RTI base operation for an RTI partition composed of the RTI input port "PI3", the registers "REG1", "REG2" and the RTI output port "PO3";

FIG. 216-221 the stepwise backward/forward switching of the design steps "DSTP" of the display mode "SPEC/DESIGN" in "Z5" and the switching to the display mode "SHOW/DESIGN";

FIG. 222-228 the display mode "SHOW/PARALLEL" in "Z5" with the parallel steps "PSTP" beginning with "PSTP:B0" and the following parallel steps "PSTP:E0", PSTP:B1", "PSTP:E1", "PSTP:B2", "PSTP:E2" and "PSTP:B3";

FIG. 229*a*-229*p* a specification of an RTI base operation for an RTI partition composed of the RTI input port "PI4", the registers "REG3" to "REG6" and the adder "ADD1";

FIG. 230*a*-230*e* the specification of an RTI base operation of FIG. 229*a*-229*p* with the exception that instead of a 8 bit register "REG6" two 4 bit registers "REG7" and "REG8" are placed on the data input "B" of ADD1;

FIG. 231*a*-231*i* the specification of an RTI base operation of FIG. 229*a*-229*p* or FIG. 230*a*-230*e* with the exception that for the data input of the adder ADD1 only one column is necessary in the Y array;

FIG. 232*a*-232*t* the initialisation of a cycle array "A1" and the entries into a "CYCLE-ARRAY-SURVEY" with cycle array name "CYCLE-ARRAY-NAME" and comment "COMMENT";

FIG. 233*a*-233*u* after initialisation of the cycle array "A1" (FIG. 232*a*-232*t*) the specification of the first A1 transfer cycle;

FIG. 234*a* the illustration of the first, complete A1 transfer cycle in the receiver/transmitter array;

FIG. 234*b*-234*n* for the cycle array "A1" the allocation of definite TSEQ/TCYC values for cycle end "END" and cycle stop1 "ST1" as well as a definite TSEQ value for the continuation of the cycle "GO1";

FIG. 234*o*-234*y* for the cycle array "A1" the stepwise setting of the values for TSEQ/TCYC and the cycle elements related to each step in the specification area, as well as cycle element "R4" as transmitter for the data transfer outside of the cycle array "A1" to register "REG5";

FIG. 235*a*-235*k* for the cycle array "A1" the specification of cycle END/ST1/GO1 based on criteria and in addition the allocation of minimum and maximum absolute values;

FIG. 236*a*-236*k* the extension of the "CYCLE-ARRAY-SURVEY" with cycle array "A1" and operation cycle "OP-CYC=1" by "OP-CYC=2" and additionally by a further cycle array "A2" as well as, after specification of the cycles of the A1 cycle array, the change of "CYCLE-ARRAY-SURVEY" to "RTI-OP-BS" with the display of the minimum and maximum absolute values for the cycle end which depends on criteria;

FIG. 237*a*-237*d* the procedure of changing of, and/or supplements to, specified RTI operations and the specification of RTI-base-operation-variants;

FIG. 238*a*-238*k* the project operation display "PROJ-OP-BS" for the allocation of the RTI operation groups "RTI-OGs" to the internal primary operation groups "IPOGs" or primary operation groups "POGs" or to the "IPOGs" to project interface ports for preparation of a specification of internal primary operations "IPOPs" or primary operations "POPs";

FIG. 239*a*-239*z* for a specification of project operations the project operation display "PROJ-OP-BS" for the allocation of operations "OPs" of internal primary operation groups "IPOGs" or primary operation groups "POGs" to RTI operation groups "RTI-OGs" or of primary operations "POPs" of "IPOGs" to project interface ports;

FIG. 240*a* the primary operation flow of requests from project input port "C" to the primary operation group "C.POG" and the operation request flow from "C.POG" to the "RTIs" "ABAAA", "ABAAB", ABAAC" and "ABAAD";

FIG. 240*b* primary operation variants "POVAR" of "C.POG" because of base operation variants in the "RTIs" "ABAAA", "ABAAB", "ABAAC" and "ABAAD";

FIG. 240*c* the dependence of the base operation variant "OVAR" of RTI "ABAAA" of the coincidences of the signals external-asynchronous-variant "E_AVAR" and the internal-synchronous-variant "SVAR";

FIG. 241-248*b* examples to explain the generation of ESTA, PSTA and PSTA:H;

FIG. 249*a*-250*b* summing up surveys to the examples of generation of ESTA, PSTA and PSTA:H according to FIG. 241*a*-247*b;*

Figure 251:
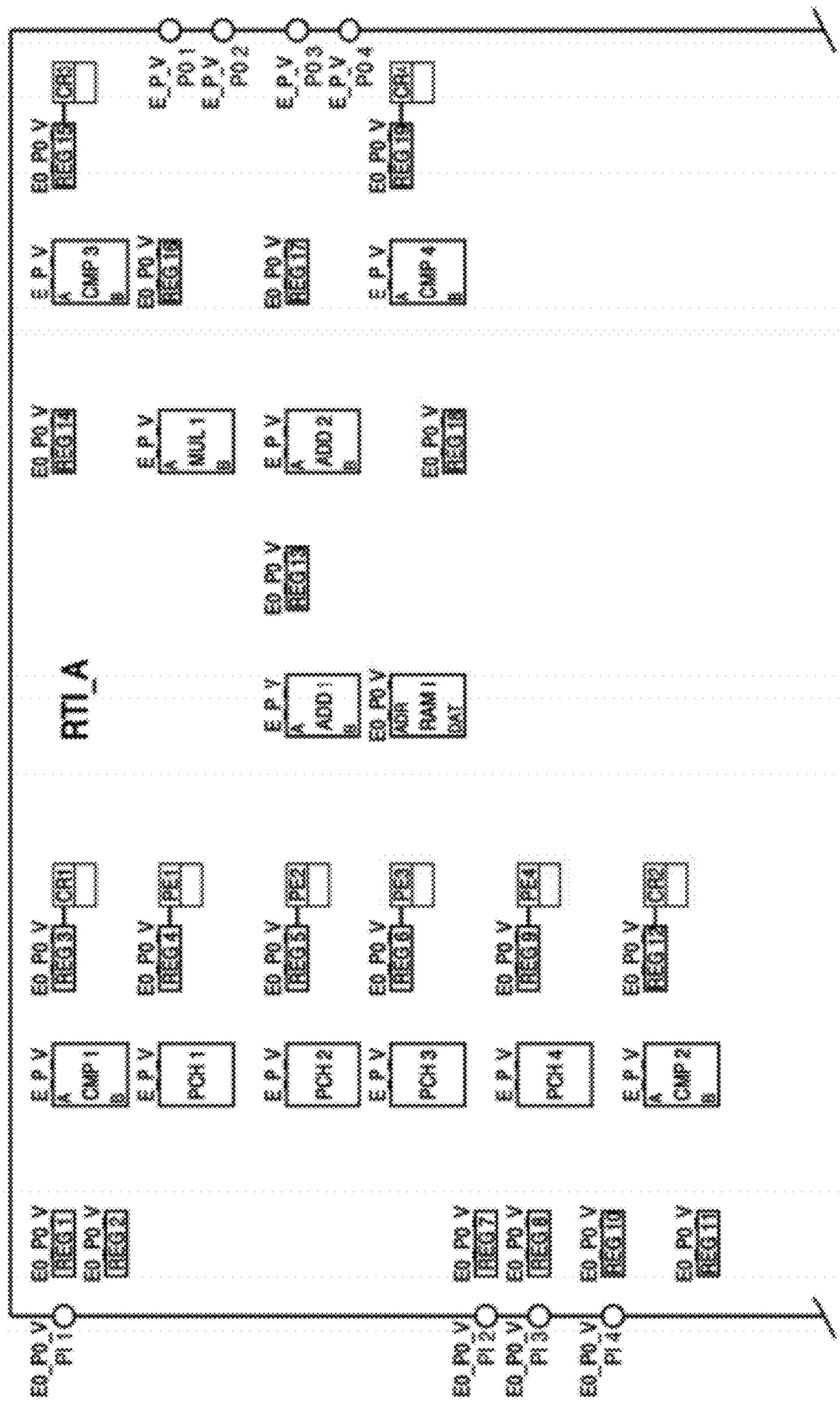
Figure 254:
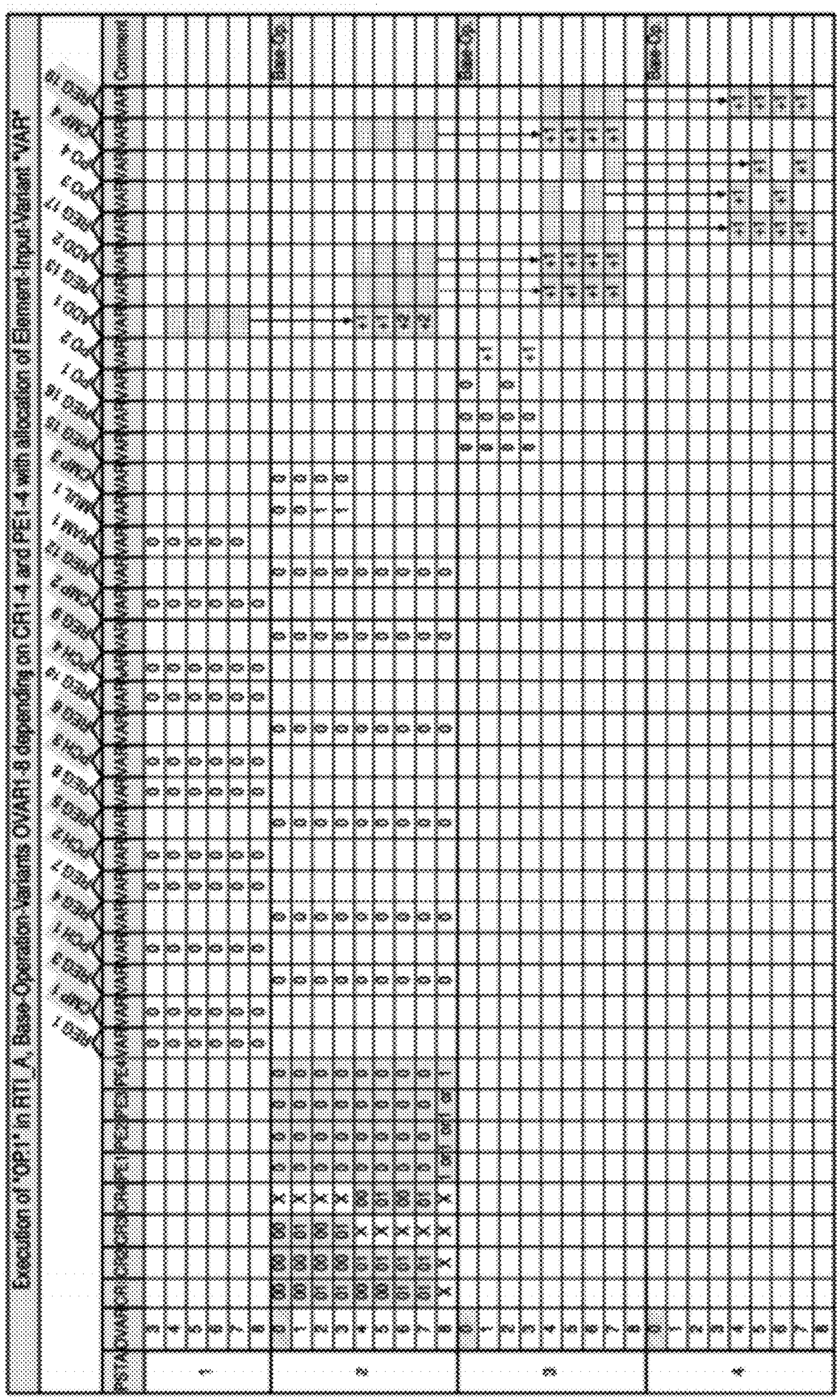

FIG. 251-251*i* an example of a base operation flow "OP.1" in an RTI_A with eight operation variants OVAR1 to OVAR8;

FIG. 252 a survey over the dependence of OVAR of the criteria during the flow of operation OP.1 in the RTI_A (FIG. 251-251*i*);

FIG. 253 for the operation OP.1 in the RTI_A (FIG. 251-251*i*, FIG. 252) the allocation of the data processing activity of each element with its element input variant "VAR" to the parallel state "PSTA" for OVAR0 to OVAR8; and FIG. 254 the adaptation of the elements DVSTPs to the SVAR signal validity.

DESCRIPTION TO FIG. 1-22

As is known, the area of a data/information processing, in the following called data processing, the top level is represented or delimited with its instances and sub instances. FIG. 1 shows an example of a top level with its instances and sub instances in a block structure. For the top level and its instances and sub instances pseudo names have been given. The level "Lx" specifies the hierarchy of an instance. The top level has the highest level "L0", the instances, which are instantiated in its level have the level "L1" and the L1 instances contain L2 instances and so on. The distinction of the instances on the top level or inside of any instance is made by an instance number. With that in FIG. 1 the notation of an instance in the hierarchy is given by "level.instancenumber_instancename". The top level has no instance number, because it exists only once.

In FIG. 1 the components "L1.1_ABA","L1.2_ABB" and "L1.3_ABC" are instantiated on top level "L0_AB". In instance "L1.1_ABA" the components "L2.1_ABAA" and "L2.2_ABAB" are instantiated. The instance "L2.1_ABAA" owns the components "L3.1_ABAAA", "L3.2_ABAAB", "L3.3_ABAAC" and "L3.4_ABAAD".

With the specification method according to the present invention "SPV", a directory, as shown in FIG. 2, instead of a block structure FIG. 1, illustrates the hierarchical classification of the instances. Hereby the levels are arranged horizontally, for example from level 0 to level 4, the numbers of instances are arranged vertically. Its so-called "path" defines each instance. For the notation of the path for the instances the levels have definite locations, which are separated by a dot, beginning from left side with level 0 increasing to the right side with level 1, level 2, level 3 etc. At the locations of the level the appropriate numbers of instances are entered. So, for example, its path number "0.1.1.3" defines the instance "ABAAC" in FIG. 2. An instance, for example "ABAAC", may also be defined by its name of instance path "AB.ABA.ABAA.ABAAC". Since the top level "L0" or its name "AB" is common to all instances, "L0" or "AB" is omitted at the path notation. With that the notation of the path for instance ABAAC is according to the instance number path "1.1.3" and to the instance name path "ABA.ABAA.ABAAC".

A further variant of instance name notation is given, if adjacent to the instance number path the instance name of the last instance number is attached, as shown in the example "ABAAC", with "1.1.3.ABAAC". With that a better recognition of the instance, compared to the pure instance number path, and a shorter length of the path notation is obtained. The lowest instances in the hierarchy at the time, the so-called register transfer instances "RTIs" are identified coloured, for example, in their instance number fields and in their corresponding LEVEL fields, as shown in FIG. 2.

If a top level with its instances and sub instances is instantiated in a higher hierarchy, then for the top level to instantiate a new appropriate level, as well as an appropriate instance number is assigned in this higher level and the paths of its instances and sub instances are accordingly adapted. An example for this is the instantiation of top the level "L0_AB" of FIG. 1 or FIG. 2 in the top level "L0_A" of FIG. 3 (block structure) or FIG. 4 (directory).

In FIG. 4 the instance "AC" is shown without sub instances. In FIG. 1 and FIG. 2 for the instance "ABAAC" the path had the indication "1.1.3". By the instantiation of the component "AB", which was the top level "L0_AB" in FIG. 1 and FIG. 2, into the top level "L0_A", FIG. 3 and FIG. 4 respectively, for the instance "ABAAC" the path notation "2.1.1.3" follows.

By calling the program SPV according to the present invention, on the monitor shows up the menu line "Z1" as seen in FIG. 5. Field1 and field 2 are without any entry. By clicking the button "PROJECT" in Z1 a project window with the buttons "NEW", "WORK-LIB", "PROJ-LIB" and "COMP-LIB" is opened as shown in FIG. 6.

If a new project should be started, then the button "NEW" is activated by a click, as illustrated in FIG. 6. By clicking the button "PROJECT" in "Z1" the project window is closed and project "NEW" is inserted in field1, as illustrated in FIG. 7. Furthermore the project name, "A" in the example, is inserted manually. After the first project handling and the closing of the SPV the generated database is stored into the working library "WORK-LIB". When opening SPV again data out of the working library are ready, therefore the field1 is without entry, and in field2 the project name "A" is indicated. If a project should be transferred to a project library after termination, then in the project window, FIG. 6, the button "WORK-LIB" is activated by a click and by double-clicking the button "PROJ-LIB" a project library is opened, not displayed, in which the terminated project is stored. If a project should be transferred to the component library after terminating, then in project window, FIG. 6, the button "WORK-LIB" is activated by clicking and by double-clicking of "COMP-LIB" a component library is opened, not displayed, in which the finished component is stored. For a transfer of a project or component library to the working library, in the project window, FIG. 6, the designated library is opened, not displayed, by double-clicking the button "PROJ-LIB" or "COMP-LIB" and a project or a component is selected and transferred to working library.

Subsequently the functional features of the SPV display "INSTANCIATE" are explained by the example of project "A", FIG. 3 and FIG. 4 respectively. For this, after opening SPV and project entry, FIG. 7, by clicking the button program "PROGR" in line "Z1" a program window is opened, with the programs instantiate "INSTANCIATE", connect "CONNECT", register transfer instance operation "RTI_OP" and project operation "PROJ_OP" as shown in FIG. 8. Therein the program selection occurs by clicking the button "INSTANCIATE", which gets activated by that. Clicking the button "PROGR" in "Z1" closes the program window and opens the display "INSTANCIATE", as illustrated in FIG. 9. In line "Z1" the project entry with project "NEW" and project name "A" is inserted. In line "Z2" the display "INSTANCIATE" and the project top level with "ARRAY:L0_A" is indicated. The functions of the buttons in "Z1" and "Z2" are explained in the course of this description. The line "Z3" has the following divisions and contents. "LEVEL": for example, minimum range is level0 to level4, by clicking the right arrow 100 expandable to higher levels than 4, by clicking the left arrow 102 reducible till level4; "INSTANCE": top level/component name; "COMP OF LIBRARY": name of components, which were instantiated out of a library; "DEVLP-STATE" (development state): manual entry of version "VERS" and date "DATE"; "COMMENT": any comments. When opening the display "INSTANCIATE", FIG. 9, an instance line for the top level "L0" is generated automatically below the line "Z3" with the component which was inserted under "ARRAY", "Z2". Before a text is entered or modified in an instance line, the instance line is activated by clicking its button and is marked in the column "INSTANCE" as indicated in FIG. 10*a*. Hereby the development state at the beginning of the specification was entered as, for example, version "0.1" and date "Jun. 4, 2004". During the specification the version number may be incremented for example to "02", "03", etc. The release of the specification occurs for example with version "1.0" and may be incremented to "2.0", "3.0" in case of modifications.

In FIG. 10*b* there is an example of an instantiation on the top level "L0_A" with the instances "AA", "AB" and "AC" shown. For an instantiation the instantiation line is activated and marked in which the one or several components should be instantiated, in this example it is the instance line "A" in FIG. 10*a*. Afterwards the instance lines that are needed for the instantiation are generated by clicking the button LINE"+", in this example these are five instance lines, as shown in FIG. 10*b*. The generated instances are automatically activated and marked and are thus prepared for entries.

The instance names "AA", "AB" and "AC" were inserted for the instance numbers "1", "2" and "3" below level "1". The text entries or the modifications of the text are performed with the established means of text editing. In an activated instance line clicking the button "DELETE" in "Z2" can delete all textual entries, by clicking the button LINE"–" in "Z2" the instance line can be deleted. With deletion of one or more instance lines the thereby created gaps are closed automatically and the consistency of instance numbers from high to low is re-established. With pressed shift button several contiguous instance lines can be activated and marked, with pressed control button any, not contiguous, instance lines can be activated and marked by clicking in column "INSTANCE". By clicking separate buttons in one or several instance lines with the shift button and/or control button any buttons can be activated and marked. The text in these activated buttons can be deleted by clicking the button "DELETE" in "Z2". Clicking the button LINE"–" produces no reaction. With a following click into a neutral field of the display the activated and marked buttons are deactivated and unmarked.

If one or more commands should be withdrawn, clicking the button "UNDO" in "Z2" performs this. If the previous commands should be re-established, clicking the button "REDO" in "Z2" does this. By clicking "COPY" in "Z2" the text of an activated button is stored and can be inserted by clicking "INSERT" in "Z2" into any activated button.

FIG. 10*c* shows the instantiated components "AA", "AB" and "AC" on top level "A", the surplus generated instance lines "4" and "5", FIG. 10*b*, were deleted. The button 1*a*preceding the top level "A" indicates, as common in directories, that under "A" further components are instantiated. The button 1*a* is automatically generated with the deactivation of the instance lines "AA", "AB" "AC". The button 1*a* contains a minus (–), if the instantiated components are visible and a plus (+), if they are invisible. With each clicking on button 1*a* it changes its sign and with that its instance display.

In FIG. 11 the instance "AB" is absent, its instance line was deleted. The lines of the components instantiated on the top level have, for example, a distance grid among themselves and to the top level line, as shown by FIGS. 10*b*, 10*c*, and 11. Provided that the components instantiated on the top level own instances and sub instances also, this grid enhances the survey of the instance hierarchy.

In FIG. 12*a* the button "ARRAY" was activated by clicking. Thus the project top level and its instances and sub instances are only represented in the columns "LEVEL" and "INSTANCE" and the top level "L0_A" in "Z2", which is entered under "ARRAY", is marked as being active in the top level line in column "INSTANCE".

Clicking the button "AB" in column "INSTANCE" activates "AB" and marks the button "AB" as being activated, and the top level in column "INSTANCE" is unmarked indicating to be inactive, as shown in FIG. 12*b*. Clicking the button "ARRAY" in "Z2" deactivates it and the project top level "A" is changed to top level "AB", as shown in FIG. 13. Furthermore, in FIG. 13, the components "ABA", "ABB" and "ABC" are instantiated in top level "AB", the button 1*b* with "–" is switched to display, and the state of development of the top level is entered. The procedure of the instantiation is identical to the instantiation described in FIG. 10*a* and FIG. 10*b* with the exception that the top level instance line "AB" is to be activated and that afterwards three instance lines are generated, in which the components "ABA", "ABB" and "ABC" are entered.

Figure 14:
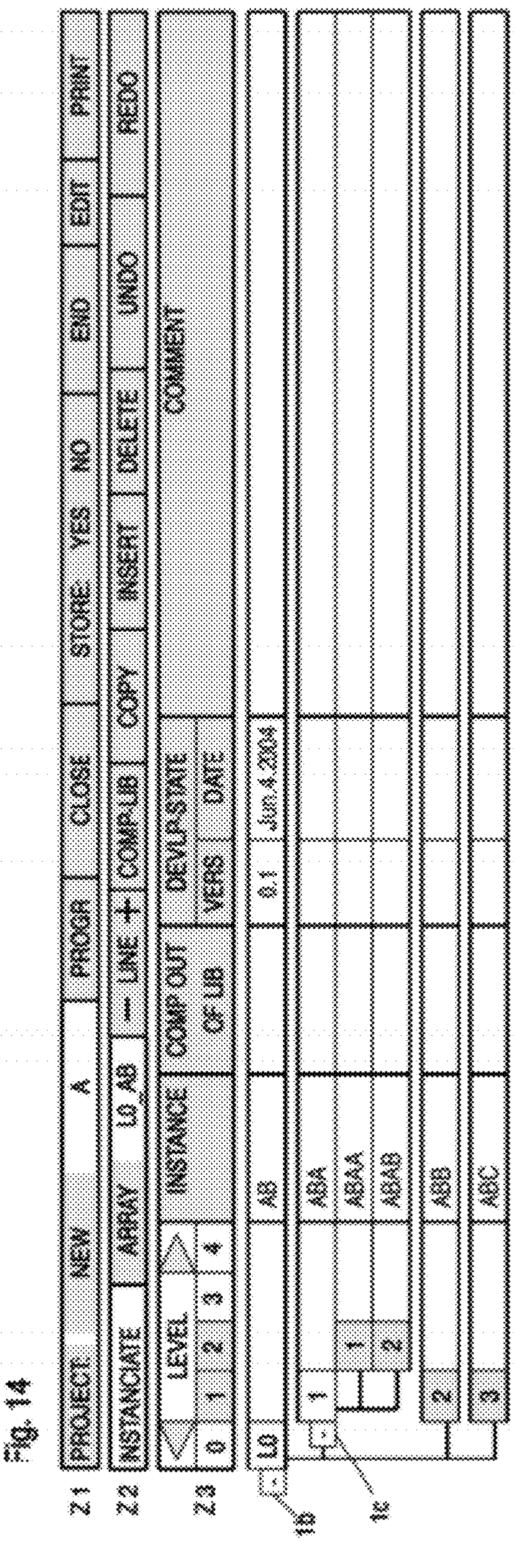

In FIG. 14 the components "ABAA" and "ABAB" were instantiated in the instance "ABA" and switched to display by the button 1*c* with "–". The procedure of instantiation is identical to the instantiation described in FIG. 10*a* and FIG. 10*b* with the exception that the instance line "ABA" is to be activated and that afterwards two instance lines are generated, in which the components "ABAA" and "ABAB" are entered.

Figure 15:
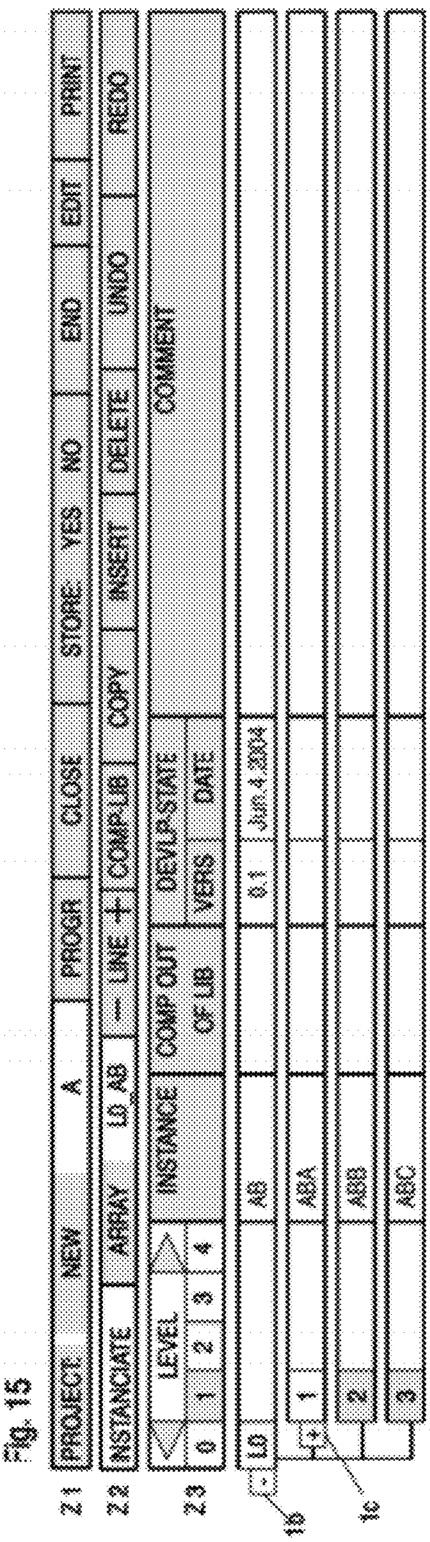
Figure 16:
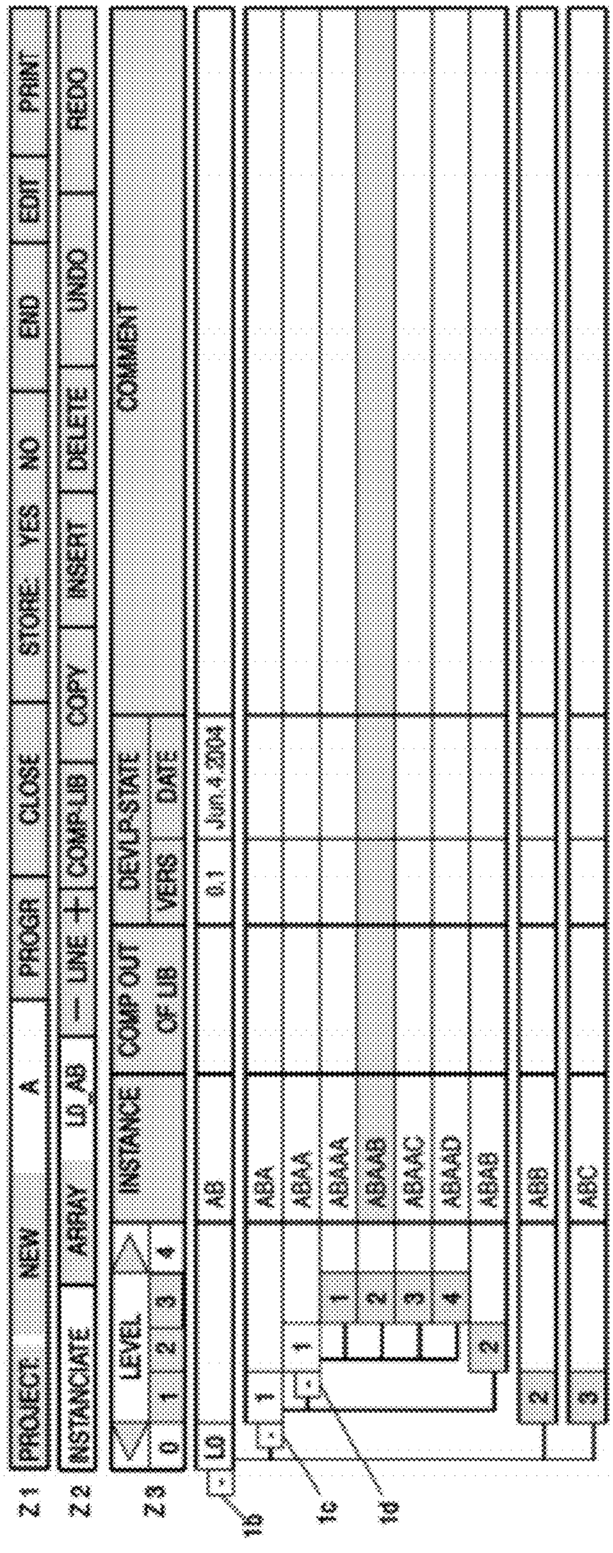

In FIG. 15 by clicking the button 1*c* the display of the instances "ABAA" and "ABAB" was switched off. FIG. 16 shows the complete instantiation on top level "AB" according to FIG. 1 and FIG. 2. Hereby, additionally to FIG. 14 and/or FIG. 15, the components "ABAAA", "ABAAB", "ABAAC" and "ABAAD" under "ABAA" are instantiated and displayed by button 1*d*. For the instance "ABAAB" a already specified component from the component library should be used. For doing that the ABAAB instance line is activated and marked and a component library, not displayed, opened, by clicking the button "COMP-LIB" in "Z2". In the component library the component "CCAJ" with version "3" and date "Feb. 27, 2004" was selected.

Figure 17:
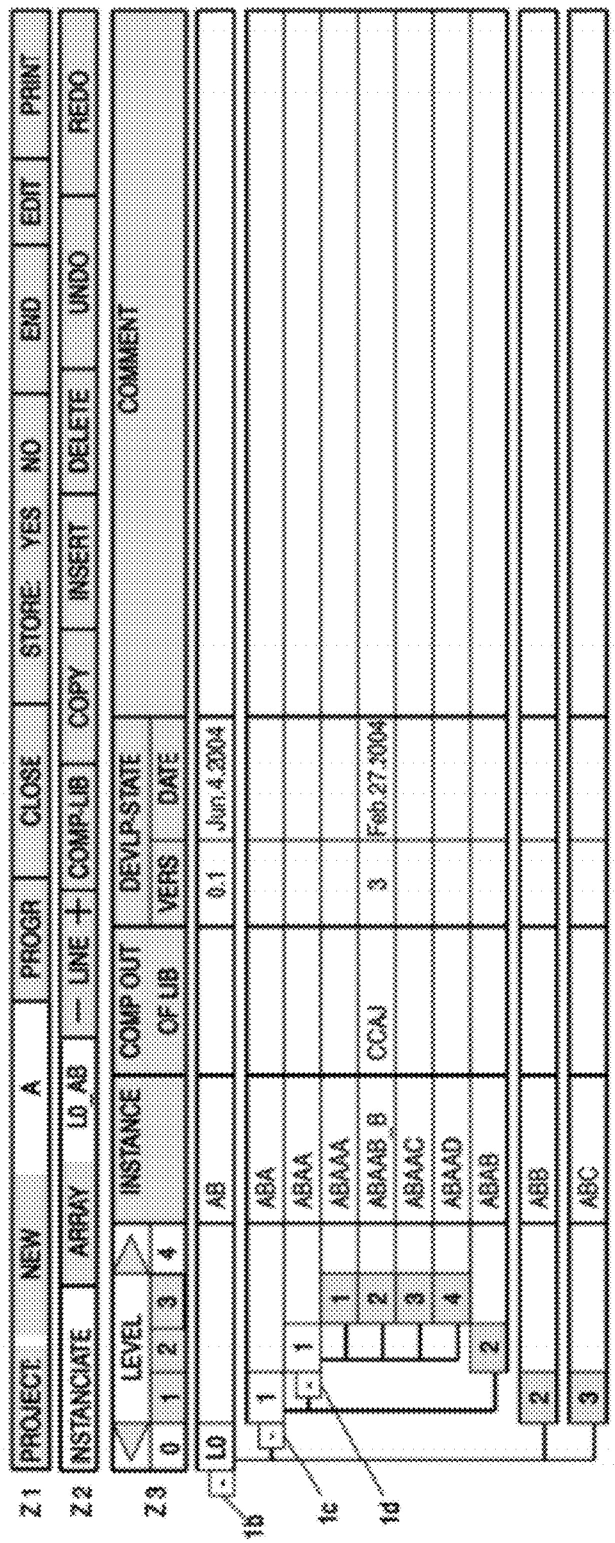

FIG. 17 shows the entry of the transferred component "CCAJ" from the component library. Thereby the instance notation is automatically changed from "ABAAB" to "ABAAB_B" in the column "INSTANCE" and the instance line is deactivated and unmarked. The "B" stands for "Bibliothek", the German word for library, and means a library component. To delete a library component, the name of the concerned library component is marked by a click in the column "COMP OUT OF LIB" and is deleted together with its state of development, language and comment by a succeeding clicking of the button "DELETE". Hereby the instance name automatically returns from "ABAAB_B" to "ABAAB". The change of a name of a library component or, respectively, a change of the state of the development or an entry in the column "LANGUAGES" or comment is not possible in the display "INSTANCIATE". Changes of the arrangement of an instantiation are done by the function "EDIT" and are demonstrated by variants based on the instantiation according to FIG. 17.

Figure 18:
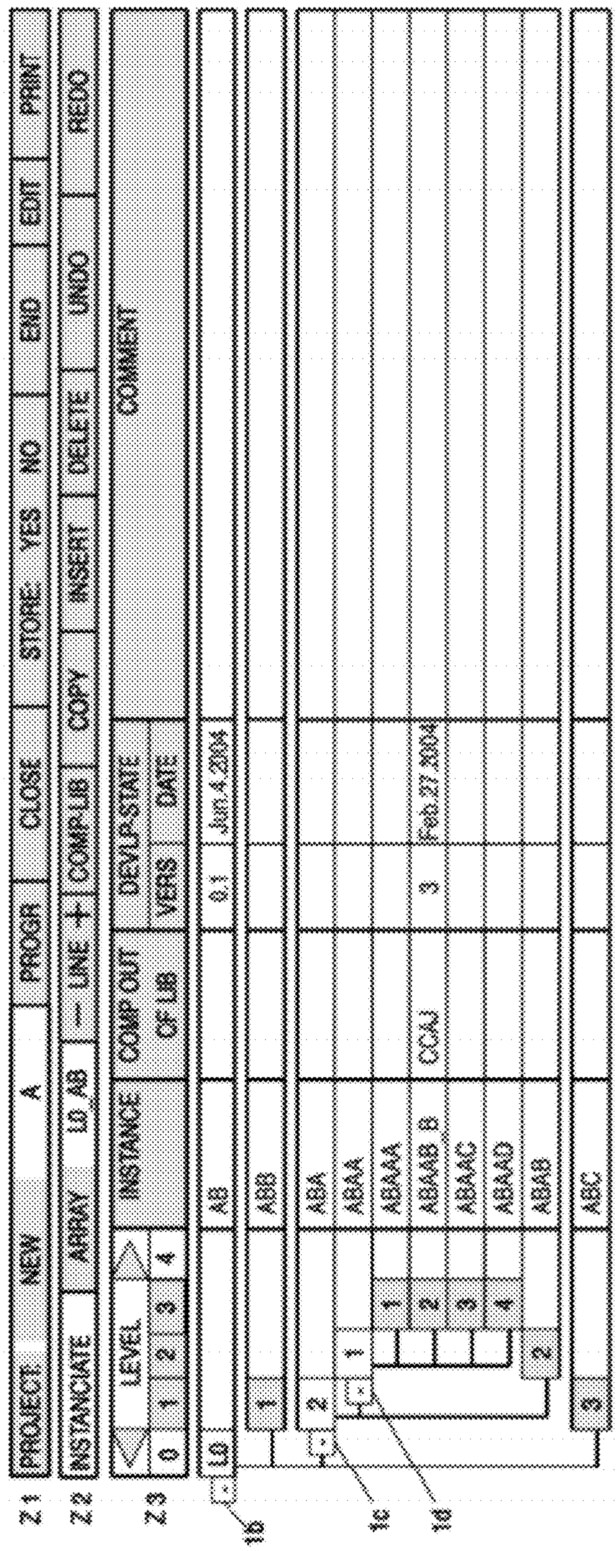

In FIG. 18 the order of the instances ABA-ABB-ABC was changed in the level column L1 to ABB-ABA-ABC. For that the button "EDIT" was activated and highlighted by clicking, the cursor was placed to the field with instance number "2", FIG. 17, in the level column "L1", and this field was shifted with pressed left mouse button to the field with instance number "1", FIG. 17 in the level column "L1" and then the mouse button was released. With that the button "EDIT" was deactivated again. Hereby the instance "ABB" takes the position of instance "ABA", "ABA" gets the position below "ABB", the rest of the instances, in the example only instance "ABC" is placed below in the present order. During the execution of edit the emerging instance gaps are closed automatically and the consistency of the instance numbers from high to low is performed.

Figure 19:
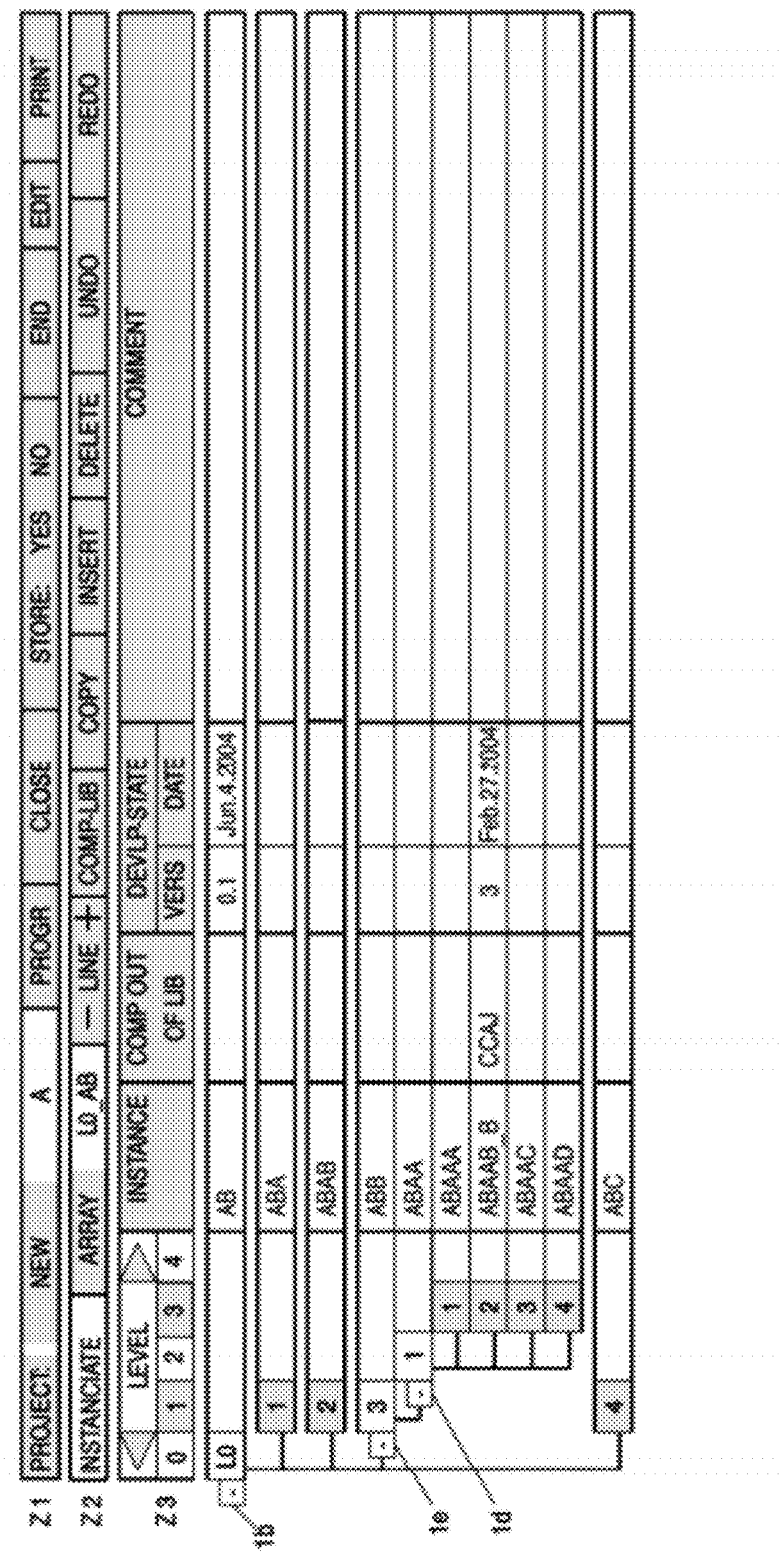

In FIG. 19, compared to FIG. 17, the instance "ABAB" was shifted from level L2 to level L1 and the instance "ABAA" with its sub instances was instantiated in the instance "ABB". For that the instance number 2 in level column 2 of the instance "ABAA" is shifted in the first edit procedure at the height of its instance line from level column 2 to level column 1 and in a second edit procedure the instance number 1 in level column 2 of the instance "ABAA" is shifted to the height of the instance line of instance "ABB". For the instance line "ABA" thereby the button 1*c* is omitted. The new placement of the instances "ABAB" and "ABAA" can be performed in one edit procedure, too. Hereby the shift button is pressed after activating of "EDIT". By pressing and releasing of the left mouse button any number of shift actions can be executed. The release of the shift button deactivates "EDIT".

Figure 20:
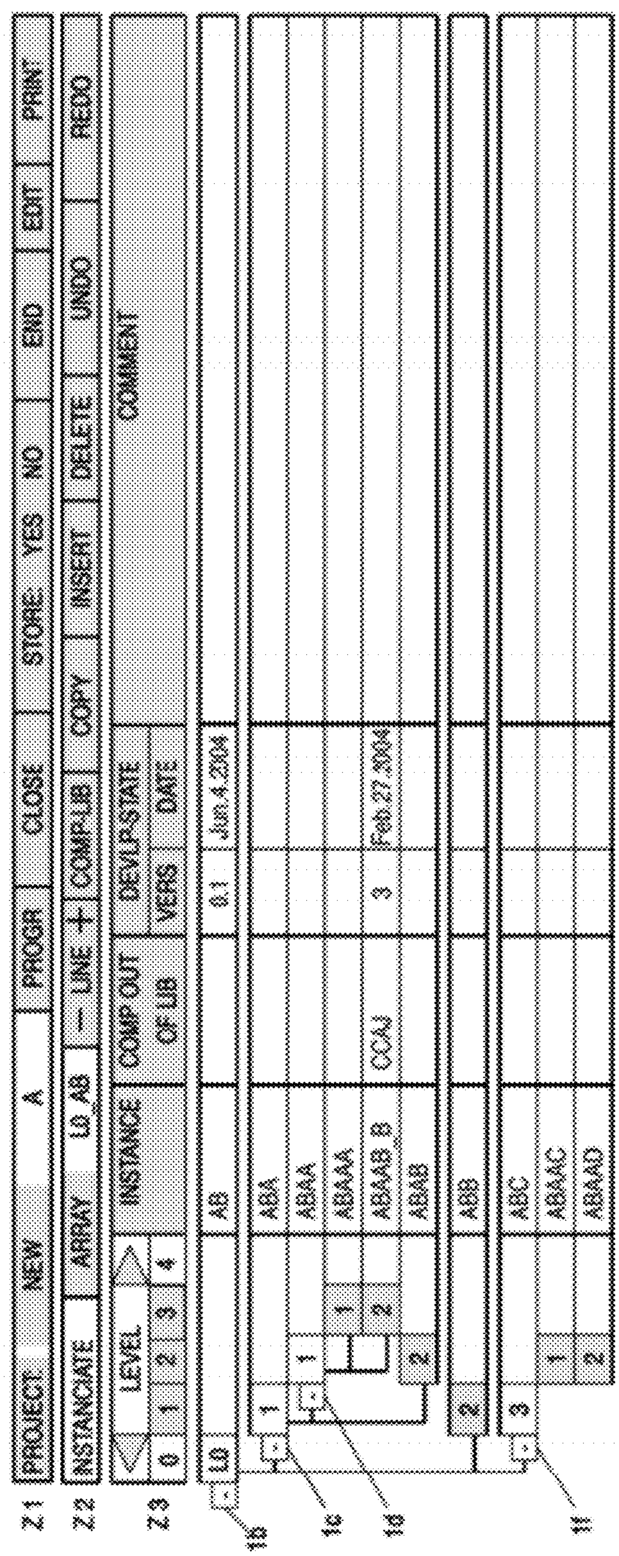

In FIG. 20 the instances "ABAAC" and "ABAAD" which have been instantiated in FIG. 17 in the instance "ABAA" were instantiated in instance "ABC". For positioning both instances can be placed in level column 3 on the height of instance line "ABC". The instance line "ABC" thereby gets the button 1*f*.

Figure 21:
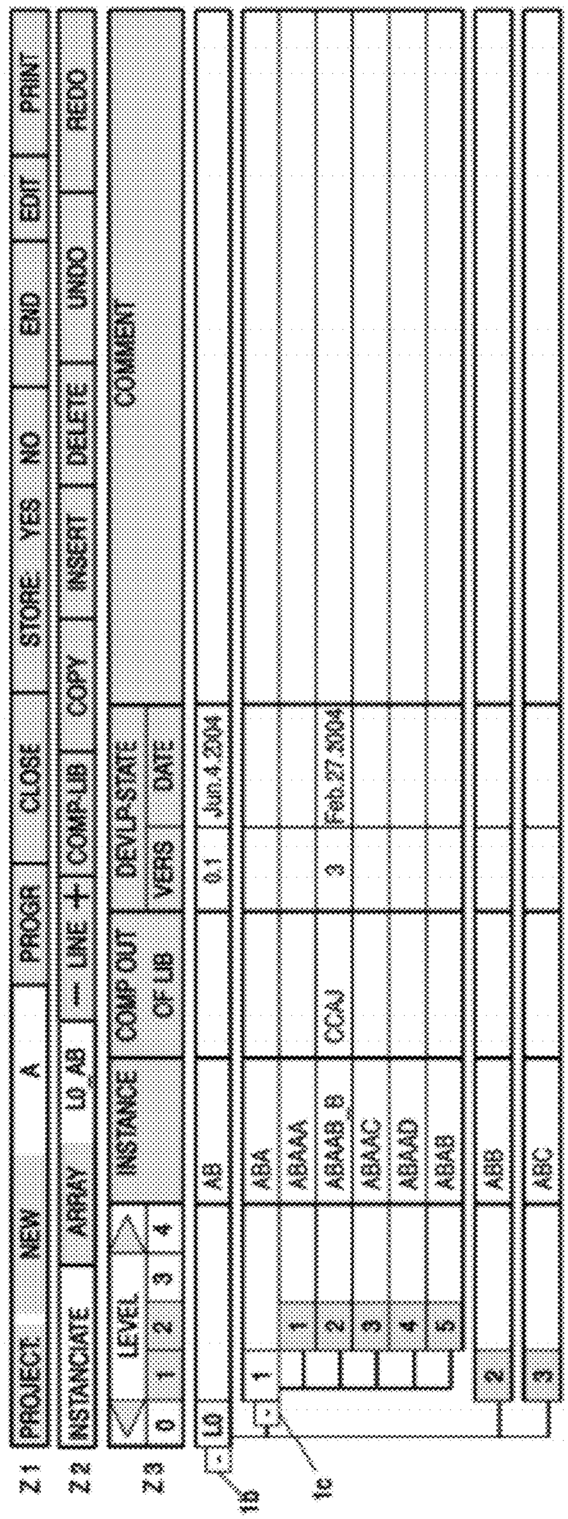

In FIG. 21 compared to FIG. 17 the instance line "ABAA" was deleted, with that the instances "ABAAA", "ABAAB", "ABAAC" and "ABAAD" were automatically instantiated in the instance "ABA", the emerged instance line gaps were closed and the consistency of the instance numbers from high to low in the level column 2 is performed. In general, if an instance line, which has sub instance lines, is deleted then these sub instances are automatically placed one level higher in the instance hierarchy.

In FIG. 22 the top level of project "A" is displayed, which is shown with its instances and sub instances by switching in field "ARRAY" from "L0_AB" to "L0_A". The instance "AA" owns as sub instances the library components "AAAB" and "AABA". The library component "AAAB" is instantiated only once and gets the annex "_B" in the column "INSTANCE". The library component "AABA" was instantiated two times and gets additionally for the differentiation of the instance names in the column "INSTANCE" to the annex "_B" the indexes "1" and "2". The instances "AA", "AAA", "AAB" and "AC" were completed with the buttons 1*g*, 1*h*, 1*i* and 1*k*.

In the following, as supplement, not yet described functions of the SPV display "INSTANCIATE" are explicated. Clicking the button "CLOSE" closes the SPV display "INSTANCIATE" and the SPV menu line "Z1", FIG. 7 remains. Before closing of the SPV display "INSTANCI- ATE" it is checked, whether all program inputs were finished with "STORE" and, if not so, the button "STORE: YES/NO" is highlighted and the SPV display "INSTANCIATE" is closed by clicking the button STORE "YES" or "NO". By clicking "END" the session is finished and SPV is closed. Before closing SPV it is checked, whether all program inputs were closed with "STORE" and, if not so, the button "STORE: YES/NO" is high-lighted and the SPV is closed by clicking the button STORE "YES" or "NO". By clicking the button "PRINT", for example, the printing of the actual display view can be executed.

The functions "COPY" and "INSERT", for example, are used if a component of a library is inserted several times and if this component was fetched only once out of the library. For that the corresponding component is marked with a click in the column "COMP OUT OF LIB" and subsequently copied by clicking the button "COPY". Then one or several fields in which the component is to be inserted are marked by clicking in the column "COMP OUT OF LIB" and the before copied component is inserted by clicking the button "INSERT". During insertion of a component in column "COMP OUT OF LIB" the entry into the columns "DEVLP-STATE" and "COMMENT" occurs automatically.

"COPY" and "INSERT" may also be used in the columns "INSTANCE", "VERS", "DATE" and "COMMENT". If after one or several entries of any kind the previous state or the state of several entries before should be re-established, then that is achieved by clicking "UNDO" once or several times. Corresponding to this with one or several clicks on the button "REDO" the state of the entry before "UNDO" is restored. With the arrangement of the arrows in column "LEVEL" of the double line "Z3" the column "LEVEL" can be expanded by one level with each clicking the right arrow 100, by clicking the left arrow 102 the level can be reduced by one until, for example, the minimum of four levels.

Description to FIG. 23-61

After the instantiation was explained by the SPV display "INSTANCIATE", in the following the generation of signal connections between the instances and between the instances and the top level is described with the SPV display "CONNECT". For a switch of the SPV display from "INSTANCIATE" to "CONNECT" by "clicking with the left mouse button", in the following only called "click" or "clicking", on the button "PROGR" of menu line "Z1", FIG. 8, a program window is opened, in which by clicking the button "CONNECT" the program selection occurs. With another clicking in the button "PROGR" the program window is closed and the SPV display "CONNECT" for the project "A" is opened, as shown in FIG. 23. Hereby the instances "AA" and "AC" own no subinstances; the instance "AB" divides into the sub instances "ABA", "ABB" and "ABC". Compared to the display "INSTANCIATE" the menu line "Z1" and the command line "Z2" are divided into two partial lines "Z1.1/Z1.2" and "Z2.1/Z2.2". The double line "Z3" was adapted to the requirements of the SPV display "CONNECT". In the opened display "CONNECT" the following entries are activated, in line Z1.1: the project identification, for example project "NEW" and the project name "A", in line Z2.1: the program and the display type "CONNECT", in the array "ARRAY" the project level "L0_A" and in the field "DISPLAY" all instances "ALL". The type of display "CONNECT" is organized in form of a X/Y matrix structure. Below the double line "Z3", in X array, FIG. 23 shows the lines for the project level "L0_A" and its instances "AA", "AB" and "AC", which were instantiated with the SPV display "INSTANCIATE" before.

In column "LEVEL" the instance number path is indicated and in column "INSTANCE" the instance name is indicated. Like in the SPV display "INSTANCIATE" the instance indication is controlled by a directory structure. In the example of FIG. 23 the instances of top level "A" are shown, therefore its button 1*a* owns a "–". The sub instances of instance "AB" are not indicated, accordingly their button 1*b* owns a "+". In the Y array the top level with its instances and sub instances is displayed completely, in the example these are "AA", "AB", "ABA", "ABB", "ABC" and "AC". By the level column 2*a*the "LEVEL" is organized horizontally and the instance path number is organized vertically. The instance names are coupled with the vertical instance number paths by an inclination of, for example, 45 degrees, by place saving triangles.

As before in the display "INSTANCIATE" the register transfer instances "RTIs" in "LEVEL" and "INSTANCE-NUMBER" are indicated by marking. Thereby the corresponding triangles in the Y array are also marked for a better survey. In the Y array the top level with its complete instances and sub instances is always displayed, when the button "RTI" in line "Z2.1" is deactivated. When the button "RTI" in line "Z2.1" is activated, in the Y array only the top level with its whole "RTIs", without intermediate instances, is indicated.

For the generation of signal connections in display "CONNECT" the instance "AB" is selected with, for example, its sub instances "ABA", "ABB", "ABC", and its port to port signal connections according to block structure of FIG. 24. This block structure serves only for explanation and is not part of the specification method "SPV" according to the present invention. The top level "AB" is an integral part of the project "A", as shown in FIG. 23, and was instantiated before under the SPV display "INSTANCIATE" with its instances "ABA", "ABB" and "ABC", which still own no sub instances. For generation of signal connections in instance "AB", in field "ARRAY" the entry of "L0_A" is switched to "L0_AB", as explained earlier with the display "INSTANCIATE". Hereby the instance "AB" is indicated as top level in the L0 line and below the instances "ABA", "ABB" and "ABC" are illustrated, as shown in FIG. 25*a*.

Figure 25B:
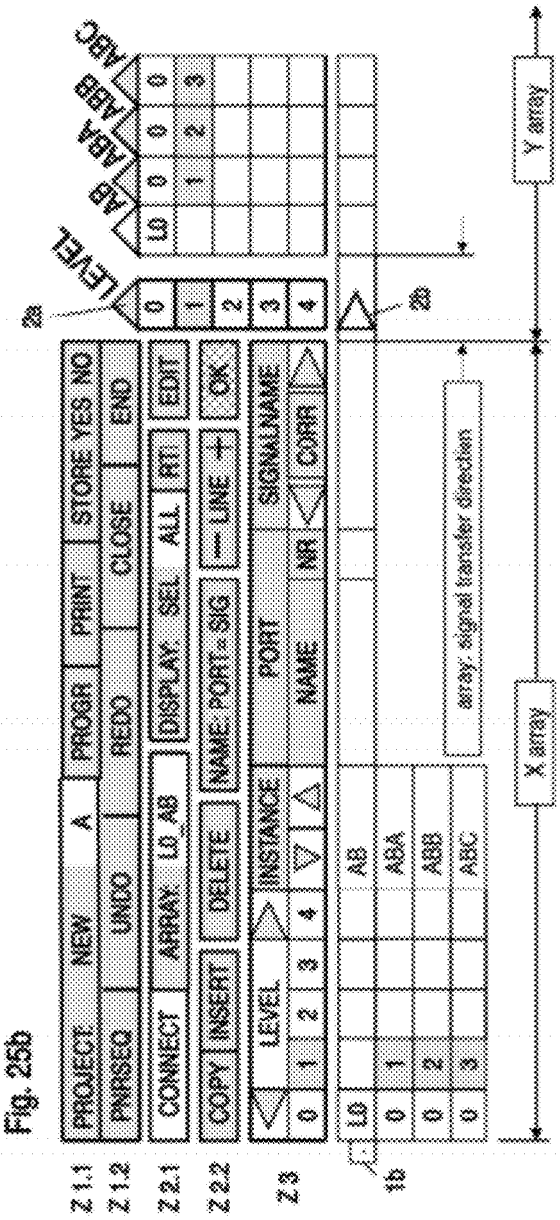
Figure 25C:
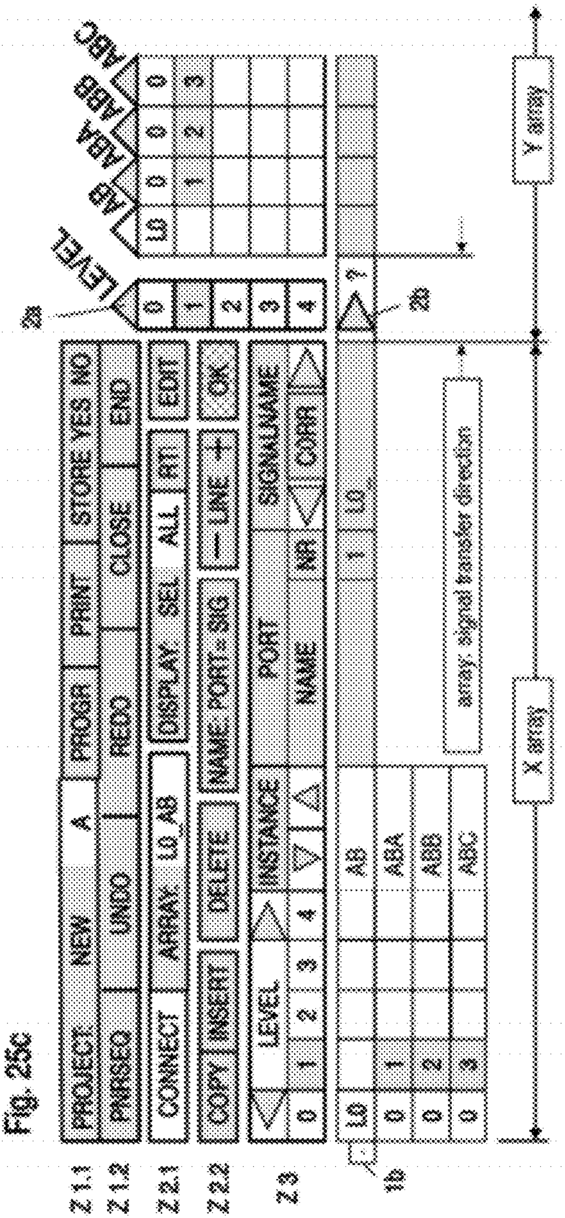

The generation of signal connections according to the block structure of FIG. 24 should be started, for example, with the transmit signals of the top level input ports. By double-clicking the button "AB" in column "INSTANCE" the top level line "AB" is completely indicated by the X array and the Y array and the signal transfer direction from the X array to the Y array is designated by an arrow 2*b*, as shown in FIG. 25*b*. By clicking the arrow 2*b* this one and the complete top level line "AB" is activated and marked, in column "INSTANCE" "AB" is not marked, as shown in FIG. 25*c*. Furthermore the transmitter name with underline "L0_", the port number with "1" and a question mark "?" is entered automatically in the top level line in the X array in column "SIGNALNAME" in "array: signal transfer direction". The "?" means, that still no signal connection was generated.

Figure 26:
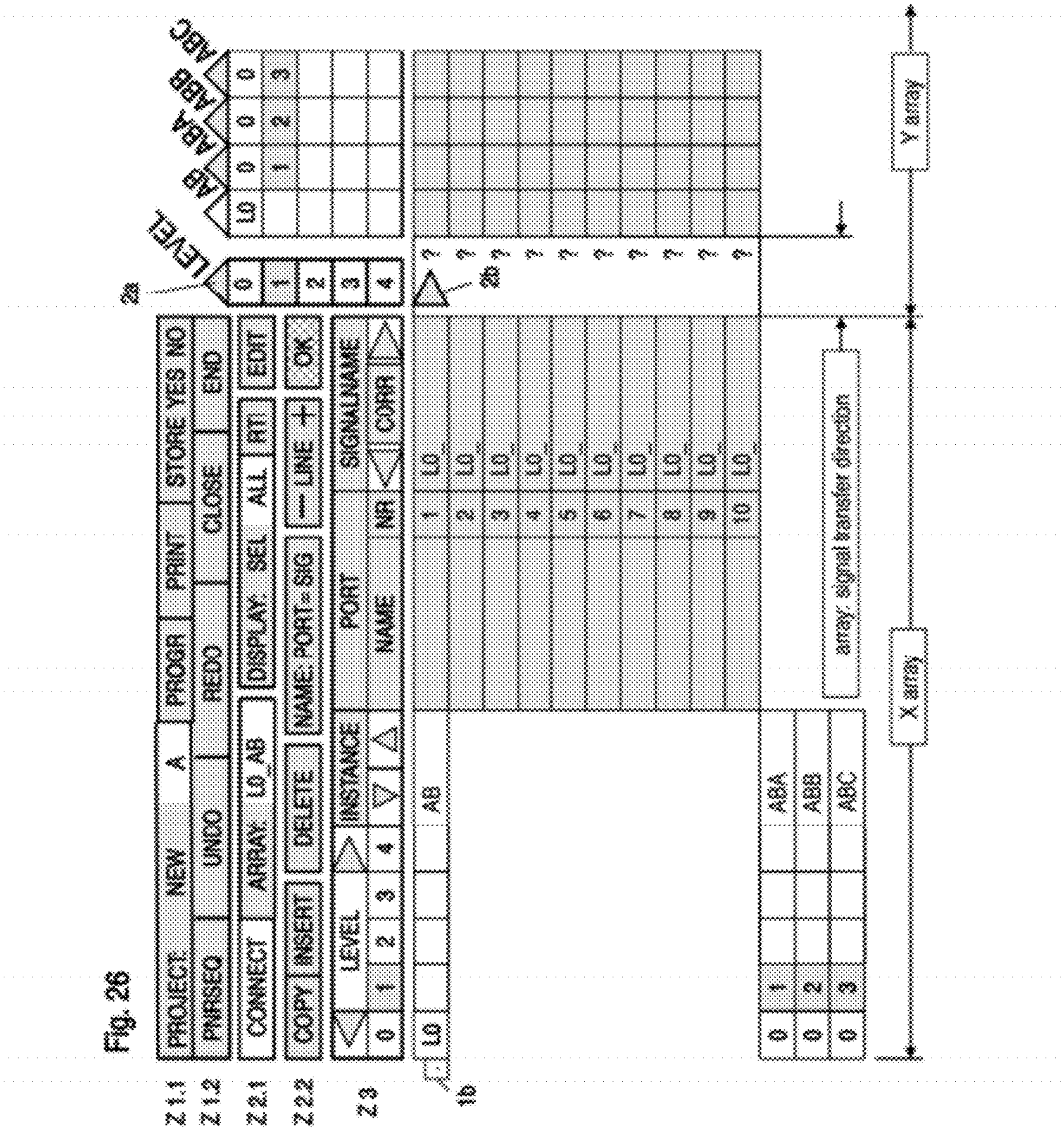

In FIG. 26 nine further signal transfer lines for the top level "AB" were generated by nine times clicking the button LINE"+" in "Z2.2". With this the instances adjacent below are automatically shifted down with the adequate number of lines. The transmitter port numbers in the X array are automatically generated from high to low in an increasing form, beginning with "1".

Figure 27:
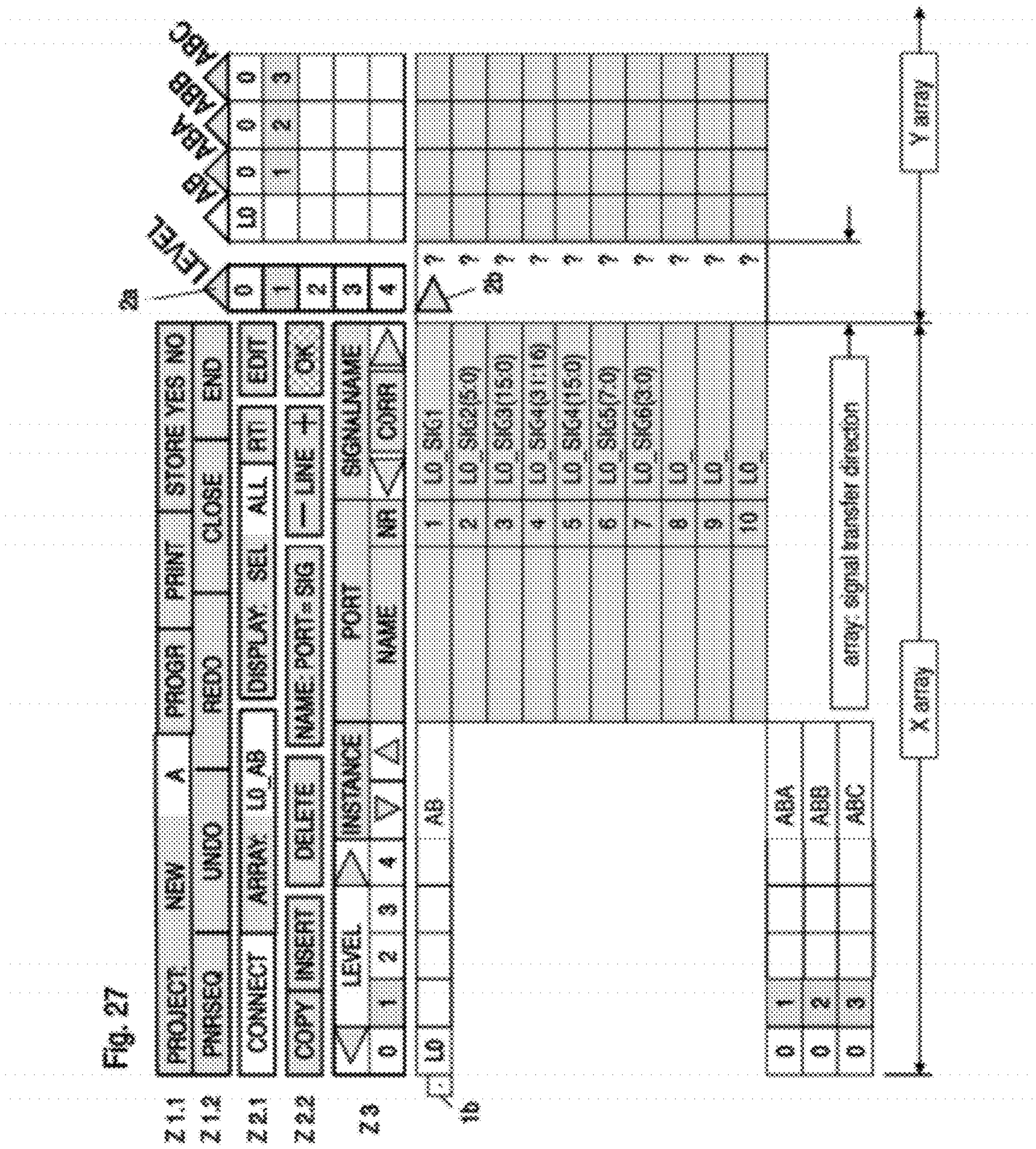

FIG. 27 shows the manually entered signal names for the sender port numbers "1" to "7" in column "SIGNAL-NAME". Manual entries, modifications and deleting of entries can only be carried out in activated connection lines and are performed with the known means of text processing.

Figure 28:
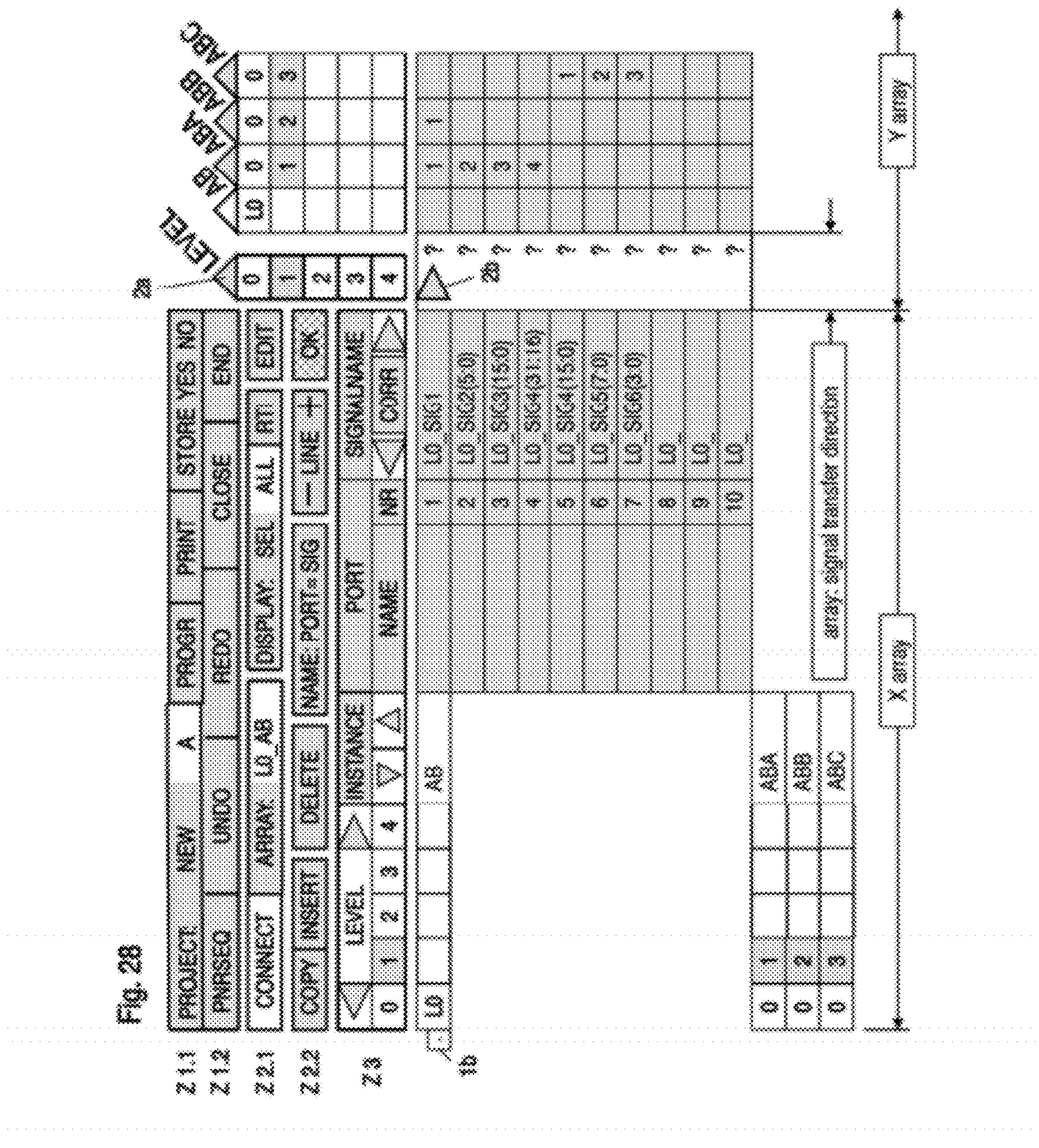

FIG. 28 shows the receiver port numbers in the Y array corresponding to the transmit port numbers in the X array. The signal connections correspond to those of the block structure of FIG. 24. A receive port number in the Y array is generated by clicking the button of an instance column in a signal connection line. In an instance column the port number "1" is generated with the first click, with further clicks the port numbers "2", "3", etc. are generated, independent of the order in the signal connection lines. A click to an existing port number in the Y array, if the signal connection line is activated, deletes this port number, i.e. the related transmitter in the X array is again without receiver. The gaps in the port number continuity, which occur during deletion, are filled automatically with clicking the button "OK" in "Z2.2".

Figure 29A:
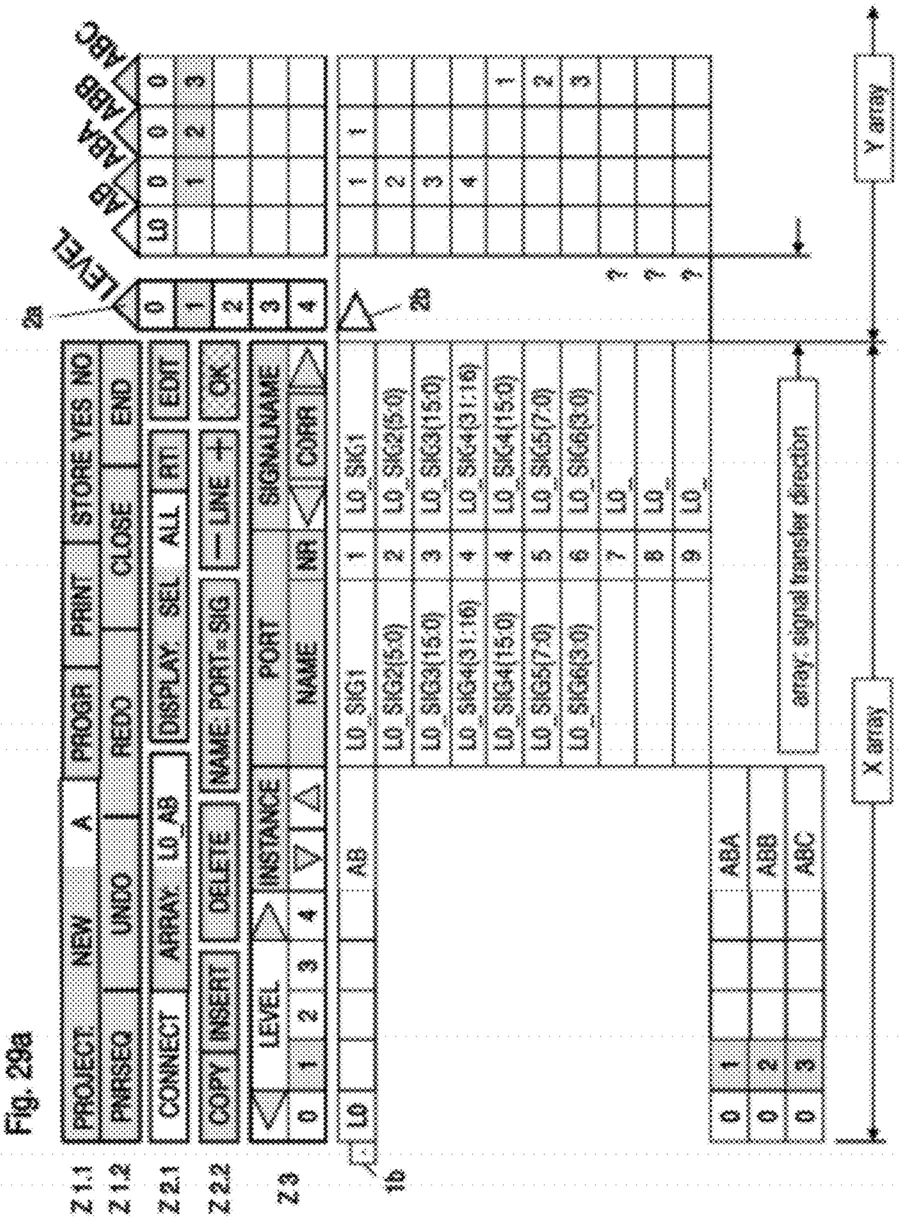

By clicking a button of a before deleted port number of a receive instance, a by one increased port number, compared to the highest existing port number of this receive instance, is assigned. By clicking the button "OK" in "Z2.2" the signal connections for the AB port numbers "1" to "6" become valid, the arrow 2*b* and the signal connection lines are deactivated, also for the AB port numbers "1" to "6" in column "PORT-NAME" the signal names are entered and the question marks "?" are deleted automatically, as shown in FIG. 29*a*. Furthermore the program recognizes automatically, that the signal vector "L0_SIG4(15:0)" of port number "5", FIG. 28, belongs to port number "4", FIG. 29*a*, and is corrected appropriately by acknowledging with "OK". While the order of port numbers in the X array from high to low with "1", "2", "3", etc is automatically ensured, the order in the Y array may be modified manually in any order. For that the button port number sequence "PNRSEQ" in "Z1.2" is activated by a click and afterwards the wanted assignment of the port numbers in the Y array in an instance column is performed by clicking the buttons of the signal connection lines in the appropriate order. For the establishing of a port number sequence the concerned signal connection lines must be activated. By clicking the button "OK" in "Z2.2" the port number gets valid and the concerned signal connection lines and the button "PNRSEQ" in "Z1.2" are deactivated.

Figure 29B:
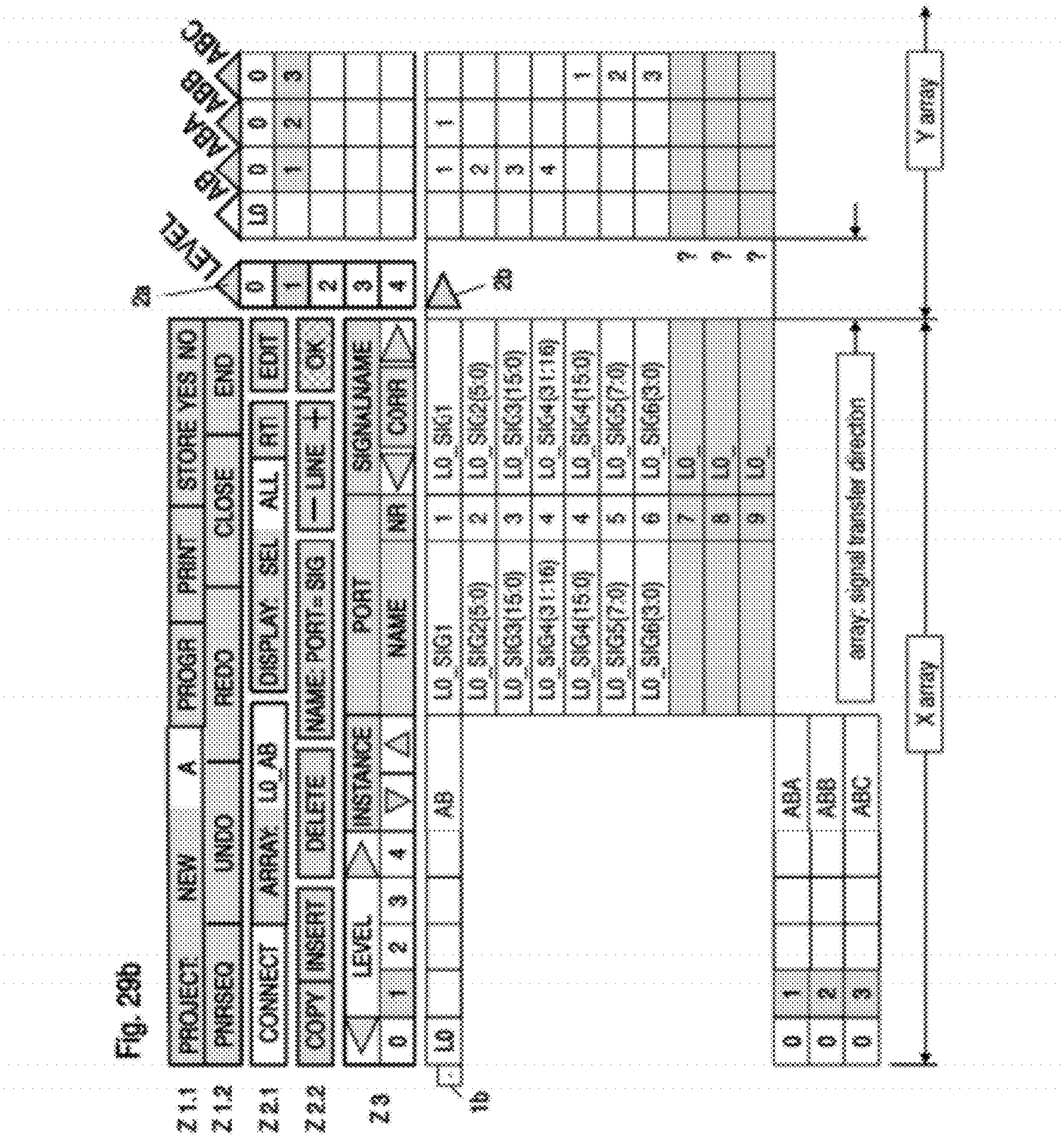
Figure 30:
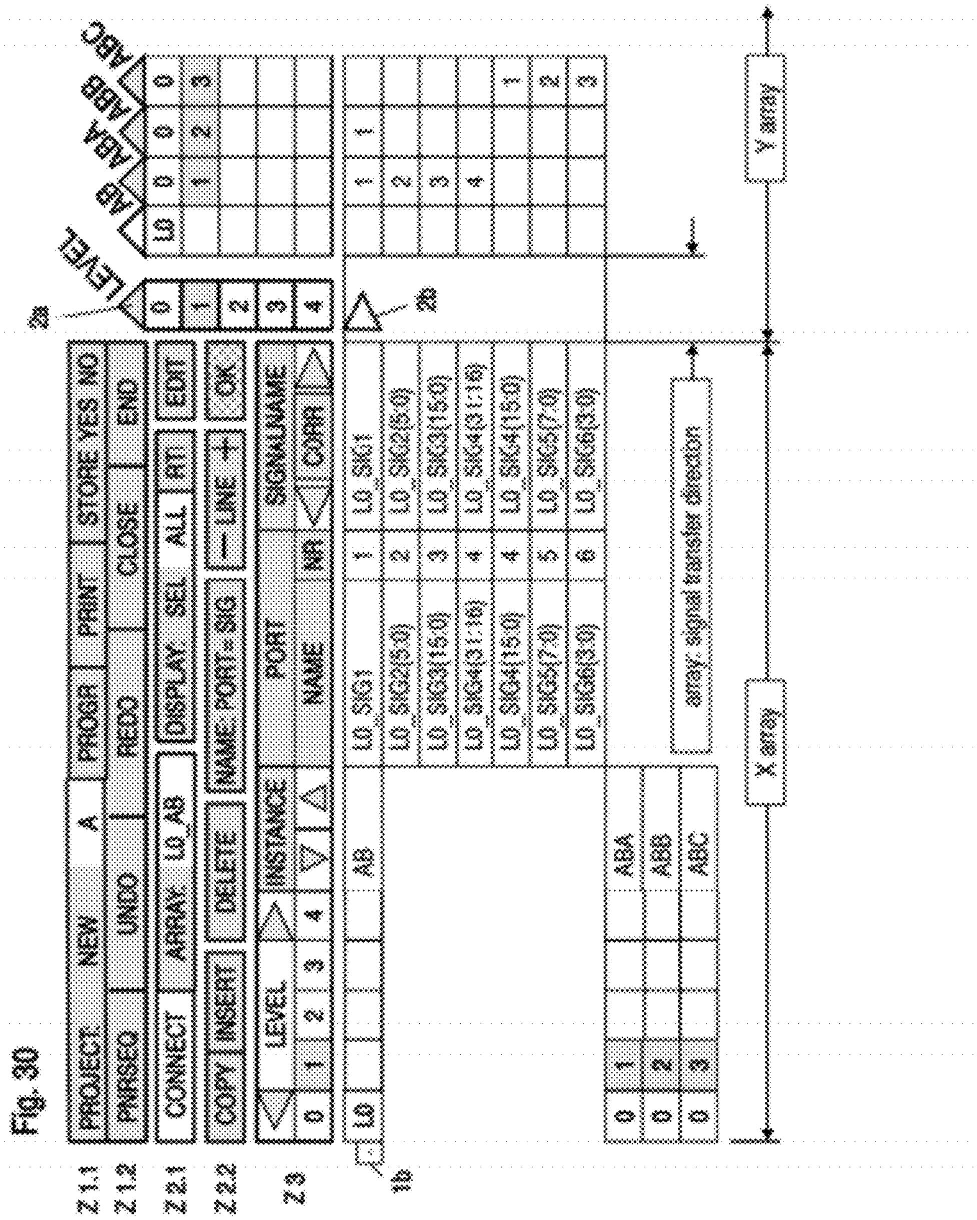
Figure 31A:
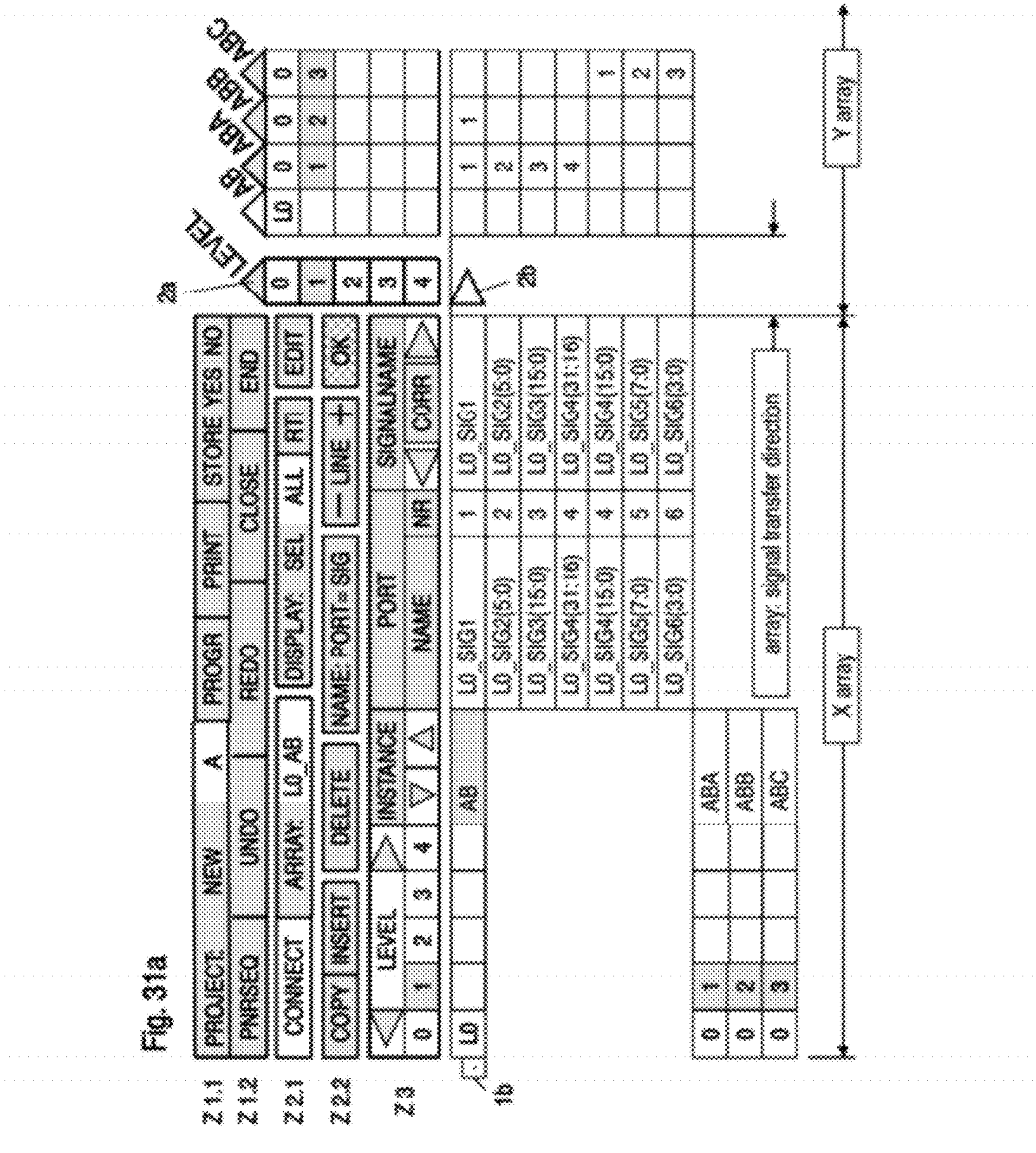
Figure 31B:
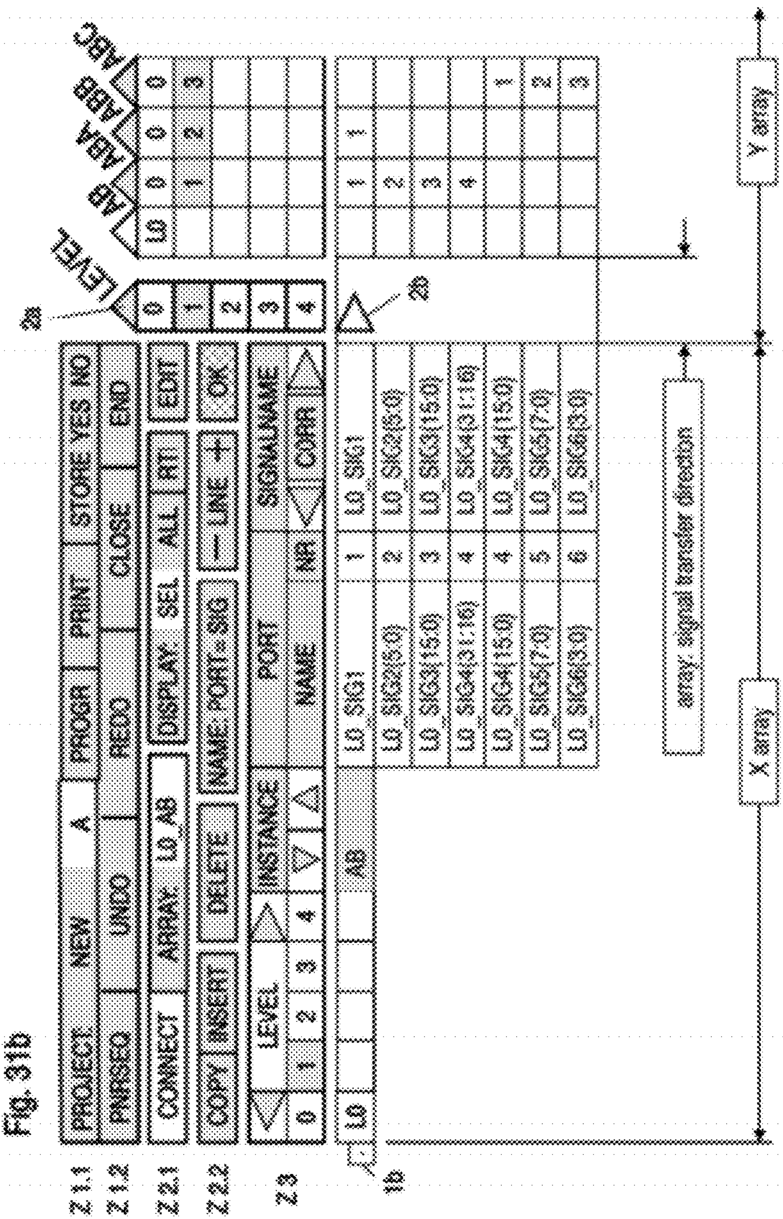

In FIG. 29*b* the signal connection lines of the transmit ports "7", "8" and "9" were activated by clicking their transmit port buttons. Thereby arrow 2*b* is activated automatically, too. By clicking the arrow 2*b* all signal connection lines of top level "AB" would be activated. By clicking the button LINE"–" in "Z2.2" the signal connection lines of port numbers "7", "8" and "9" are deleted, as shown in FIG. 30. In preparation for a selective display of the top level its button "AB" in column "INSTANCE" was activated and marked by clicking, as shown in FIG. 31*a*. In FIG. 31*b* the DISPLAY: "ALL" of FIG. 31*a* in "Z2.1" was switched to DISPLAY:"SEL" by clicking. Hereby the not activated instances "ABA", "ABB" and "ABC" in the X array of FIG. 31*a* were switched off.

In FIG. 32*a* DISPLAY:"SEL" was switched again to DISPLAY:"ALL" and the transmit signals for the instances "ABA","ABB" and "ABC" in the X array were generated, as shown in FIG. 24, and the signal connections in the Y array were terminated. The generation of these signal connections is in its handling identical to the proceeding described in FIG. 25*a* to FIG. 28. In FIG. 32*b* the port names were entered automatically identical to the signal names by clicking the button "OK" in "Z2.2", the signal connection lines and the arrows 2*c*, 2*d*, 2*e* were deactivated and "?" is switched off.

In FIG. 33 the signal connection lines for the top level "AB" were switched off by double clicking the button "AB" in column "INSTANCE". Since the transmit ports and the receive ports begin with port number "1", there is always an overlap of port numbers of one instance. In FIG. 32*b* this occurs on top level "AB" with the ports 1, 2, 3, at the instance "ABA" with the ports 1, 2, 3, at the instance "ABB" with the port 1 and at the instance "ABC" with the ports 1, 2. For a clear illustration and a sure distinction of transmit ports and receive ports of the top level and its instances, the transmit ports get the prefix "T" and the receive ports get the prefix "R", as shown in the block structure, FIG. 34 and in the illustration of the SPV display, FIG. 35. Thereby the signal transfer direction for the top level "AB" and its instances "ABA", "ABB" and "ABC" is oriented from the "X array" to the "Y array", as shown by the arrows 2*b*, 2*c*, 2*e* and 2*e*.

In FIG. 36*a* the signal transfer direction was switched from the Y array to the X array by clicking the arrow 2*g*. In this signal transfer direction the signal connections are indicated only inactively because of simplification and clearness, i.e. no specification of signal connection is possible. One exception is, as shown later, the specification of corrections for existing signal connections. By clicking the arrow 2*f* the signal transfer direction may be switched again from the "X array" to the "Y array", FIG. 35.

In FIG. 36*b* the signal transfer direction for the instance "ABC" was switched selectively from the "X array" to "Y array" by double clicking the arrow 2*e*. Alike the signal transfer direction for the top level "AB" and/or its instances "ABA" and "ABB" can be switched selectively by double clicking the arrows 2*b*, 2*c*, 2*e*.

In FIG. 37 the top level "AB" with its connection lines of FIG. 36*b* was switched away upwards, by clicking the arrow 2*h* the instance "ABA" with its connection lines moves to the position of the first connection line below of "Z3" and the following instances "ABB", "ABC" maintain, without gap, their distance to the instance "ABA". By further clicking the arrow 2*h* the instance "ABA" with its connection lines may by switched away upwards and "ABB" takes the position of "ABA" and so on. By clicking the arrow 2*i* the last recently switched away instance is restored to the position of the first connection line below of "Z3". The instances below the restored instance move down and keep their original distance to the highest instance.

For the top level or for an instance, which is placed in the first signal connection line below of "Z3", FIG. 37, an array with any number of signal connection lines can be moved or made visible by a vertical scroll bar (not demonstrated), as common, on the right side of the display. In doing so the fields in the X array in column "LEVEL" and "INSTANCE" as well as the arrow for the signal transfer direction remain on the position of the first signal connection line below of "Z3". The instances "ABB" and "ABC" below with their signal connection lines thereby are moved synchronously.

Analogue to that, a Y array of any width together with its instances, can be made visible by an horizontal scroll bar (not demonstrated) as shown in FIG. 38. The "X array" and the "array: signal transfer direction" are not moved thereby. By the function "EDIT", whose handling was described under the display "INSTANCIATE", the order of the signal names can be modified. For example, the signal connection lines of the port numbers R5 to R8 in the X array of the instance "ABA" of FIG. 37 and FIG. 38 are moved upwards to the position of the port numbers R1 to R4, as shown in FIG. 39. The instantiation according to the block structure of FIG. 24 and FIG. 34, which was outlined with the SPV display "CONNECT" until now, was extended for the instance "ABA" by the sub instances "ABAA", "ABAAA", "ABAAB", "ABAAC", "ABAAD" and "ABAB".

For that the block structure of FIG. 40 shows the extension of the instantiation and the hitherto existing signal connections. The extended instantiation was generated with the SPV display "INSTANCIATE" before. After switching from SPV display "INSTANCIATE" to SPV display "CONNECT" FIG. 41*a* shows the extended instantiation with the buttons 1*b*"–", 1*c*"–", 1*d*"–" and with that the view of all instances. Thereby the library instance "ABAAB" is characterized by a fortified border around the X and Y array. For the next steps of specification the top level "AB" and the instances "ABA", "ABB" and "ABC" were selected and activated and marked by clicking, as shown in FIG. 41*b*.

In FIG. 42 the "DISPLAY:ALL" in "Z2.1" of FIG. 41*b* was switched to "SEL" by clicking the button "SEL". Thus the not selected instances were switched off. Furthermore, by double clicking the buttons "AB", "ABA", "ABB", and "ABC" in column "INSTANCE" the signal connection lines with the existing connection lines are switched on. In button correction "CORR" in "Z3" a question mark "?" indicates, that the signal connections must be adapted. In the example the instance "ABA" of a "RTI" became an intermediate instance by extension with sub instances and requires therefore an adaptation of the signal connections to and/or from their "RTIs" "ABAAA", "ABAAB", "ABAAC", "ABAAD" or, respectively, "ABAB".

In FIG. 43*a* the button "CORR?" in "Z3" was activated by clicking. Thus the signal lines to be corrected for "ABA" are indicated in the X array by a "?" on position "T" and with a "?" in the Y array on position "R". At first the ABA-input-signal-connections are adapted by clicking the arrows "2*b*", "2*d*" and "2*e*". Hereby the arrows and the signal connections to adapt are activated and marked, as shown in FIG. 43*b*. With that the signal connection lines in the Y array are activated and marked only in the ABA-RTI-columns "ABAAA", "ABAAB", "ABAAC", "ABAAD" and "ABAB".

The block structure of FIG. 44 indicates the signal connections to be adapted. Thereby the notations for the ports are as previously explained, "T" for transmit, "R" for receive and, additionally for intermediate instances, "I" for input and "O" for output. In FIG. 45 the receive ports "R1" to "R8" were entered into the Y array in column "ABAAC" by clicking the buttons of the activated signal connection lines. By clicking the button "OK" in "Z2.2" the adapted signal connection lines and the corresponding arrows for the signal transfer direction are deactivated and unmarked and the adapted signal connections are indicated with transmit "T", input "I" and receive "R", as shown in FIG. 46. Furthermore the button "CORR?" in "Z3" was deactivated, but the "?" remains, because the signal connections in the ABA transmit flow are still to be adapted.

A further clicking the button "CORR?" in "Z3", FIG. 47, the still to be adapted ABA transmit flow in column "PORT-NR" is indicated by activating and marking of the buttons "?1", "?2" and "?3". By clicking the arrow 2*c* for the ABA port numbers "?1", "?2" and "?3" the signal connection lines in the X array and the buttons "R1" to "R3" in column "AB" in the Y array, as well as the arrow 2*c*, are activated and marked as shown in FIG. 48. For a simplified performing of the correction or expansion of the signal connections, according to block structure FIG. 44, it is advantageous, to transfer the AB receive ports "R1", "R2", "R3" with their signal/port names to the X array and to activate the new transmit ports of the RTI "ABAAC" in the Y array. This occurs with activated button "CORR?" in "Z3" by double clicking the arrow 2*c*, FIG. 48, and is illustrated in FIG. 49. Thus the signal connection lines in the X array for the AB port numbers "R1", "R2", "R3", the arrow 2*b* and the port numbers "?1", "?2", "?3" in column "ABA" in the Y array are activated and marked. Furthermore, for example, the buttons of the potential transmit RTIs are activated and marked in the Y array in the corresponding signal connection lines.

In FIG. 50 according to block structure FIG. 44 in the Y array the ABAAC transmit ports "T1", "T2", and "T3" were entered by clicks. Clicking the button "OK" in "Z2.2" the activated and marked buttons of FIG. 50, including "CORR?" in "Z3" are deactivated and unmarked and the complete signal connections of the transmit ports "T" of the RTI "ABAAC" are indicated via the output ports "O" of the instances "ABA" and "ABAA" to the receive ports "R" of top level outputs "AB", as shown in FIG. 51*a*. Because no transmit/receive ports end on the intermediate instances, the question mark "?" is automatically deleted by clicking the button "OK" in "Z2.2". General rule: Ports for transit instances are generated automatically by SPV and clicks in the Y array are only accepted by SPV in RTI ports, clicks in ports of transit instances have no effect. Further rule: If a recently instantiated RTI, which owns transmit or/and receive signal connections, is changed to a intermediate instance, or if a top level, which owns transmit signal connections on input ports or/and has receive signal connections on output ports is instantiated in a higher level, then a question mark "?" is set automatically after the instantiation in the button correction "CORR" with the call up of the program "CONNECT".

In FIG. 51*b* the Y array was illustrated only with the top level "AB" and its RTIs, without intermediate instances, by clicking "RTI" in "Z2.1".

In FIG. 52*a* the display in "Z2.1" was switched from "SEL" to "ALL" and by the buttons 1*b*, 1*c*, 1*d* all instances, sub instances and RTIs of the top level "AB" were illustrated. Thus the instance "ABA" with "O1" to "O3" shows a partial signal connection to the top level "AB" with "R1" to "R3", the whole signal connection is given by the RTI "ABAAC" with "T1" to "T3" to the top level "AB", as it follows also from the Y array of FIG. 51*a*.

In FIG. 52*b* the signal connection lines of "ABA" are switched off by double clicking the button "ABA" in column "INSTANCE".

In the following the top level "AB" with its instances and sub instances of FIG. 44 is instantiated in a higher top level "A", as it is shown in the block structure of FIG. 53*a*. On top level "A" two level 1 instances "AA" and "AB" are displayed. The signal connections in the instance "AB" are identical to those of the top level "AB" of FIG. 44, the path numbers, prefixed to the signal names, which each represent the transmit instance, are adapted to L1 level or, respectively, to the instance path number "2". After instantiation of the components of FIG. 53*a* and after switching to the display of the program "CONNECT", FIG. 53*b* shows the top level "A" with the instances "AA" and "AB" as well as all sub instances of "AB". The instance "AA" is a "RTI", because it has no sub instances. Because of the missing external signal connections on the ports of the intermediate instance "AB", with opening of the program or, respectively, the display "CONNECT" a question mark "CORR?" is automatically set in the button correction "CORR". By clicking the buttons “A”, “AB”, “ABAAC”, “ABB” and “ABC” in the column “INSTANCE” these are selected and activated for further treatment, as shown in FIG. 53*c*. By clicking the button “DISPLAY:SEL” in “Z2.1” the not activated instances were switched off, the buttons 1*a* and 1*b* thereby are without effect for the display of instances, as shown in FIG. 53*d*. By one double click in each case to the buttons of the instances “AB”, “ABAAC”, “ABB”, and “ABC” the signal connections with the adapted path numbers, which were realized according to the block structure of FIG. 44, are illustrated, as shown in FIG. 53*e*.

In FIG. 53*f* clicking the button correction “CORR?” activated this feature. Thus the ports of the AB intermediate instance, which have no external signal connections, are indicated with a mark and a “?” at the locations of “T” and/or “R”. This applies for the six AB input ports in FIG. 53*f*, which transmit to the interior and the three AB output ports, which are controlled from the inside. The AB input port “4” needs two signal connection lines, because it features a vector splitting “(31:16)/(15:0)”.

In the block structure of FIG. 54*a* the signal connections of the instance “AA” to instance “AB” and of the instance “AB” to the output ports of the top level “A” are indicated, which are realized in the following by the display “CONNECT”. Block structures, for example that of FIG. 54*a*, serve only for explanation and are not part of SPV. At first the three signal connections of the transmitter “ABAAC” are corrected and/or completed. For that the three signal connection lines were activated and marked by clicking the arrow 2*c*, as shown in FIG. 54*b*. Thereby, for example, the buttons of the potential receivers “A” and “AA” were automatically activated and marked in the Y array and in column “AB” the receive ports were flagged with a “?”. The indication or activation of the potential receivers in the Y array is not necessary for the correction of signal connection, as it is evident in the precedent description.

In FIG. 54*c* the top level “A” was selected in the Y array as receiver and in the sequence of the clicks to the buttons “R1”, “R2”, “R3” the entries were executed. With acknowledgement of the correction by clicking “OK” in “Z2.2” the ABAAC signal connection lines, the arrow 2*c* and the button “CORR?” in “Z3” are deactivated, as shown in FIG. 54*d*.

In FIG. 54*e* the button “CORR?” in “Z3” was activated by clicking. Thus the remaining signal connections to be corrected are indicated, in the example these are the signal connections of the instance “AB” with the transmit ports “T1” to “T6”. The buttons of these transmit ports are activated and marked and the “T” is replaced by a “?”. According to the demand of FIG. 54*a* the transmit position of the AB port signals which are indicated with “?” are moved to instance “AA”. For the procedure of the correction, for example, the AB ports in the X array become receive ports by clicking the arrow 2*b* with activated button “CORR?” as shown in FIG. 54*f*. Furthermore the AB signal connection lines and the arrow 2*b* are activated and marked and, for example, in the Y array the buttons of potential transmit ports, for example in the instances “A” and “AA”, are activated and marked.

In FIG. 54*g* the transmit ports “T1” to “T6” were entered in the Y array in column “AA” by clicks. By clicking the button “OK” in “Z2.2” the correction is acknowledged, the signal connection lines and the arrow 2*b* is deactivated and unmarked as well as the button “CORR?” is deactivated and the “?” is deleted, as shown in FIG. 54*h*. Furthermore the transmit path in the signal names of the AB receive ports is automatically changed from “2” to “1” and the port type “I” is inserted.

Alternatively, but with more effort, this correction may be performed, as follows: The instance “AA” is placed in the X array and for that the appropriate signal connection lines and signal name entries are generated. Then, the AA transmit ports are allocated to the AB receive ports in the Y array and with acknowledgement by “OK” the correction with all entries is finished. If thereby “AB” in the X array is still indicated as being transmitter, then its ports are indicated as port type “O”, the signal name transmit path is “1”, as shown in FIG. 54*i*.

In FIG. 55 by double clicking the button “AB” in column “INSTANCE” the signal connection lines were switched off and additionally the signal connections of the transmitters “ABB” and “ABC” are displayed.

The block structure of FIG. 56*a* shows new signal connections, no corrections, from RTI “AA”, output port “T7”, “T8”, “T9”, to RTI “ABAAB”. The result is shown in FIG. 56*b*. In FIG. 57*a* the intermediate instances were switched off in the Y array by activating the button “RTI” in “Z2.1”.

In FIG. 57*b* in the Y array, LEVEL“4” for the RTI library component “ABAAB” the column “PORT-NAME” was opened and the port name was indicated by double clicking the boldly framed button “2”. By clicking again this button the column “PORT-NAME” is closed again, as shown in FIG. 57*c*. Furthermore the RTI library component “ABAAB” is indicated as receiver in the X array, according to arrow 2*g*.

In FIG. 58 the buttons “NAME:PORT=SIG” and arrow 2*g* were activated by clicks. Thus the port and signal names were activated and marked in the X array for the RTI library component “ABAAB” and the port names were prepared for a transformation to signal names. “CORR” in “Z3” is activated by clicking and a “?” is inserted, which indicates, that the process of the transformation of port names to signal names is started, as shown in FIG. 59. With this process also the port names used inside the ABAAB library component are transformed to signal names. After the process of adaptation of the port names to signal names is finished, the “?” in button “CORR” in “Z3” is switched off automatically, as shown in FIG. 60.

In FIG. 61 the transformation of port names to signal names for the RTI library component “ABAAB” was acknowledged by clicking the button “OK” in “Z2.2”. Thereby the buttons “NAME:PORT=SIG”, “CORR”, arrow 2*g* and of the port/signal names are deactivated and the port names are entered identical to the signal names into the column “PORT-NAME”.

Subsequently, as supplement, the functions of SPV display “CONNECT”, which were still not described are explained and important features are summarized. By clicking the button “CLOSE” in “Z1.2” the SPV display “CONNECT” is closed and the SPV menu line “Z1”, FIG. 7, remains. By clicking the button “END” in “Z1.2” the session is terminated and SPV is closed. By clicking the button “PROGR” in “Z1.1” a program window is opened with the programs “INSTANTCIATE”, “CONNECT”, register transfer instance operation “RTI_OP” and project operation “PROJ_OP”, as shown in FIG. 8. By clicking the button “CLOSE” in “Z1.2” or “END” in “Z1.2” or “PROGR” in “Z1.1” before execution of a program step it is checked, if all program entries of the SPV display “CONNECT” were terminated with “STORE”, and if not so, the button “STORE YES or NO” is automatically highlighted and by clicking the button STORE “YES” or “NO” the designated program step “CLOSE” or “END” or “PROGR” is executed.

By clicking the button “PRINT”, for example, an actual display view may be printed. By the functions “COPY” in "Z2.2", "INSERT" in "Z2.2" and "DELETE" in "Z2.2" texts in the columns "PORT-NAME" and "SIGNALNAME" may be processed in usual manner. If after one or several entries of any kind the previous state or the state of several entries before should be re-established, then that is achieved by clicking the button "UNDO" once or several times. Corresponding to this with one or several clicks on the button "REDO" the state of the entry before "UNDO" is restored.

Each signal name begins with the transmitter instance, which is indicated by its path notation and which is automatically generated for the transmitter position in the X array. If the top level input ports are the transmitter position, then for the path notation the top level notation "L0" is inserted. Additionally to the path notation of the transmitter instance also the port numbers in the X array are automatically generated from high to low in an increasing form, beginning with "1". A signal connection holds the same signal name in all hierarchies. Also the port names in a signal connection are identical to signal names, with an exception: If a component was instantiated out of a library, then it brings its port name and port number with it. If a top level with its instances and sub instances is instantiated in a bigger/higher array by the program "INSTANCIATE", or if the instance hierarchy is modified, then automatically the adaptation of the path notations in all signal names is accomplished in the program "CONNECT". In the SPV display "CONNECT" the signal connection is generated by choosing the transmit instance, the signal name and the receive instance at the end of the signal connection. The so-called transit instances inside of a signal connection are recognized and their connection ports are generated automatically by SPV. A transmit instance is represented by the input ports of the top level or by the output ports of an RTI or of a library component. The receive instance at the end of a signal connection is represented by the output ports of the top level or by the input ports of an RTI or of a library component.

Description to FIG. 62-79

The preceding description depicted the instantiation of components and the providing of the signal connections between components of a project by the SPV displays "INSTANCIATE" and "CONNECT". In the following the required structures and notations for a specification of an operation are shown and explained in FIG. 62 to FIG. 79. The illustration of the figures only serves for explanation and are not part of the SPV display views. In SPV, per definition, the project is, independent of extent and amount, the upper most unit of a specification, as it arises of the preceding descriptions of the SPV display "INSTANCIATE" and "CONNECT".

FIG. 62 shows the top level "L0_A" for a project "A" with its instances and sub instances. Requests for an operation to a project may be delivered from outside by the project interfaces "Project-SST" or may be generated inside of the project. The project-SSTs are denoted in alphabetic order with A, B, C, etc. An operation, coming from outside by a project-SST, is named primary operation "POP", an operation, which is generated inside is named internal primary operation "IPOP". In FIG. 62 the "POPs" are received, in direction of the arrow, by the project-SSTs "A", "B", "C", "D" and "E" and they are forwarded to a so-called primary operation group "POG", which is indicated accordingly to the connection to project-SST as "A.POG", "B.POG", "C.POG", "D.POG" and "E.POG". An operation is, as is known, generated by control signal coincidences. For generation of "IPOPs", which represent the source of operations in a system composed of several projects, corresponding control signals of one or several internal RTIs and/or of the project-SST are applied to an internal primary operation group "IPOG". The "IPOGs" are distinguished in a project by a prefixed, increasing number as "1.IPOG", "2.IPOG" etc. In FIG. 62 only one "IPOG" is indicated and therefore denoted as "1.IPOG". Diverse POP requests are provided serially to a "POG" one after the other. Also the generation of several "IPOPs" in one "IPOG" is done serially. A "POP" of a "POG" or an "IPOP" of an "IPOG" normally has no timing reference to a "POP" of another "POG" or an "IPOP" of another "IPOG". In a "POG" an arriving "POP" and in an "IPOG" a generated "IPOP", is converted to corresponding operations "OPs" and these are transmitted inside of the project to the concerned "RTIs". According to the number and type of possible "POPs" in a "POG" or, respectively, according to the number and type of possible "IPOPs" in a "IPOG" and to the amount of data processing, one or several "RTIs" are connected to a "POG" or, respectively, to a "IPOG" in a project. The RTIs receive OPs of POGs or of IPOGs by so-called operation groups "OGs", as shown in FIG. 62. The "OG" represent the operation control in an RTI. An RTI can be connected with one or several POGs or/and IPOGs and holds for that a corresponding number of OGs, which are numbered as OG1, OG2 etc. As FIG. 62 shows, for example, the RTIs ABAAA, ABAAB, ABAAC and ABAAD are connected each by an OG1 with C.POG. The 1.IPOG, for example, holds connections to the RTIs/OGs, ABB/OG1, ABAB/OG1 and ABAAC/OG2. As shown in FIG. 79, later on, a POG or IPOG can also transmit "Ops" outward, on request of an RTI, via a project-SST.

In the example of FIG. 62 operations "Ops" are transmitted outwardly to other projects by the 1.IPOG via the project-SST "F" and by the D.POG via the project-SST "G". An operation is received, for example, via the project-SST "I", which is connected with the RTI "ABAB" by "OG2". An IPOG or a POG can transmit operations to multiple project-SSTs, too. An RTI can receive operations of multiple project-SSTs. In an IPOG IPOPs are transformed to POPs, too. An IPOG transmits a POP exclusively to the project-SST and therefore to a POG in another project. FIG. 62 shows a POP transmit flow from 1.IPOG to the project-SST "H". An IPOG can transmit POPs also via several project-SST.

In FIG. 63 there is an example of a block structure of a system configuration, without data paths, with the projects 1 to 5 and the system interfaces for transmit and receive of "POPs" or, respectively, of "OPs". As explained in the following, the "POPs" and/or "OPs" are transmitted with a unified control structure in the projects, in the system and in the interfaces by control signal groups, in direction of control transmission by the operation control type "OCTR" and in opposite direction by the control signal type "CTR" and the operation variant signal type "OVAR". The project1 in FIG. 63 is marked grey and is illustrated in detail by FIG. 62 with top level and hierarchies. The project1-SSTs are designed for transmit and receive of POPs and OPs. By means of the projects "2 to 5" the exemplary operations and the transmit directions of the project-SSTs are illustrated. For project2: POP receive and OP transmit, project3: POP receive and OP transmit/receive, project4 (RAM): OP receive, project5: POP transmit/receive and OP transmit. Communication of operations in the system are possible internally between the projects and externally between project and System-SSTs. If two or more projects are merged to one project, then a new project is formed, on whose top level two or more projects are placed as instances.

FIG. 64 shows control signal groups for the transmission of POPs from the project-SST "C" to "C.POG" and of OPs from "CPOG" to the RTIs ABAAA, ABAAB, ABAAC and ABAAD, with a unified control signal structure. A control signal group consists of the operation control signal type "OCTR" in direction of the operation request and the control signal type "CTR" and the operation variant signal type "OVAR" in the opposite direction. With "OCTR" a POP or OP request is defined and transmitted. Thus via the control signal type "CTR" correspondence signals can be transmitted. Furthermore operation requests can be transmitted by "CTR" from an RTI to a POG or IPOG. Such operation requests are restricted to operations, which are needed in context of an RTI operation for reading or writing of data from or to another RTI as shown in FIG. 79. With "OVAR" modifications of the basic proceeding of operations of an RTI operation are signalled to the POG or IPOG, which requested the operation. By transmission of OVAR the data processing inside of an actual IPOP or POP or/and for succeeding IPOPs or POPs can be specified depending on the result.

Based on the illustration of the connections of the control signal groups in FIG. 64, the transit instances (FIG. 62) were omitted and still will be omitted in the following illustrations, because they are without any function and only pass through the signals by their ports. The port names and the signal names for the control signal groups were chosen exemplary in FIG. 64 as follows: the project SST-ports are designated as "project-SST_control-signal-type" in the example of the project SST port "C" they are named C_OCTR, C_CTR and C_OVAR. The ports of the RTI control signal groups are uniformly named as "Cx_control-signal-type", as shown in FIG. 64. Thereby "x" is the number of the operation group "OGx". In the example of FIG. 64 all four RTIs hold the same operation group "OG1", accordingly the port notations for the control signal groups are "C1_OCTR", "C1_CTR" and "C1_OVAR".

A POG, for example the C.POG in FIG. 64 holds two kinds of port groups, a port group for the reception of POPs, the so-called upper-port-group "U0" and other port groups for transmission of OPs, the so-called lower-port-groups, in the FIG. 64 these are "L1", "L2", "L3" and "L4". Each port group consists of uniform control signal group with the control signal types "OCTR", "CTR" and "OVAR". The signal names in the transmission flow between the project-SST "C" and C.POG or, respectively, between C.POG and the RTIs, are denoted with "transmit port_control-signal-type". The notation for the transmitter for the project-SST follows as project top level "L0"_project-short-name "A". With the RTI transmit signals for "CTR" and "OVAR" the instance name is only information and can be omitted, since its path defines an RTI unambiguously.

In FIG. 65, with the example of RTI "ABAAA", the signal types synchronous variant "SVAR" and the asynchronous variant "AVAR" are illustrated, which are evaluated in "OG1" for the generation of "OVAR". The signal types "SVAR" and/or "AVAR" may be built RTI-inside and/or may be received from the exterior. To distinguish the internal and the external signal types, the external signal types get the prefix "E_". The combination of the signals of type "SVAR" and "AVAR" represent criteria for decisions or/and error events during RTI operations and define with that the flow of RTI operations. Inside of a signal type the signals are distinguished by signal names as "SVAR_SIGNALNAME", "E_SVAR_SIGNALNAME", "AVAR_SIGNALNAME" and "E_AVAR_SIGNALNAME". While the signal type "SVAR" or "E_SVAR" with specified sequences in an RTI operation needs the signal validation, the signal type "AVAR" or "E_AVAR" is only sampled with specified sequences. A detailed description for the generation of RTI operation variants "OVAR" is given in FIG. 98*a* to FIG. 98*h* and by FIG. 237*d*.

FIG. 66 shows, detailed for RTIs, a transmission of OVAR from C.POG to project-SST "C" for the RTIs "ABAAA", "ABAAB", "ABAAC" and "ABAAD". The allocation of the OVAR signals is executed in the C.POG from lower to upper-side with L1 to U0.1, L2 to U0.2, L3 to U0.3 and L4 to U0.4 and from the C.POG-upper side"U0" to project-SST "C" with U0.1 to C1, U0.2 to C2, U0.3 to C3 and U0.4 to C4.

Figure 67:
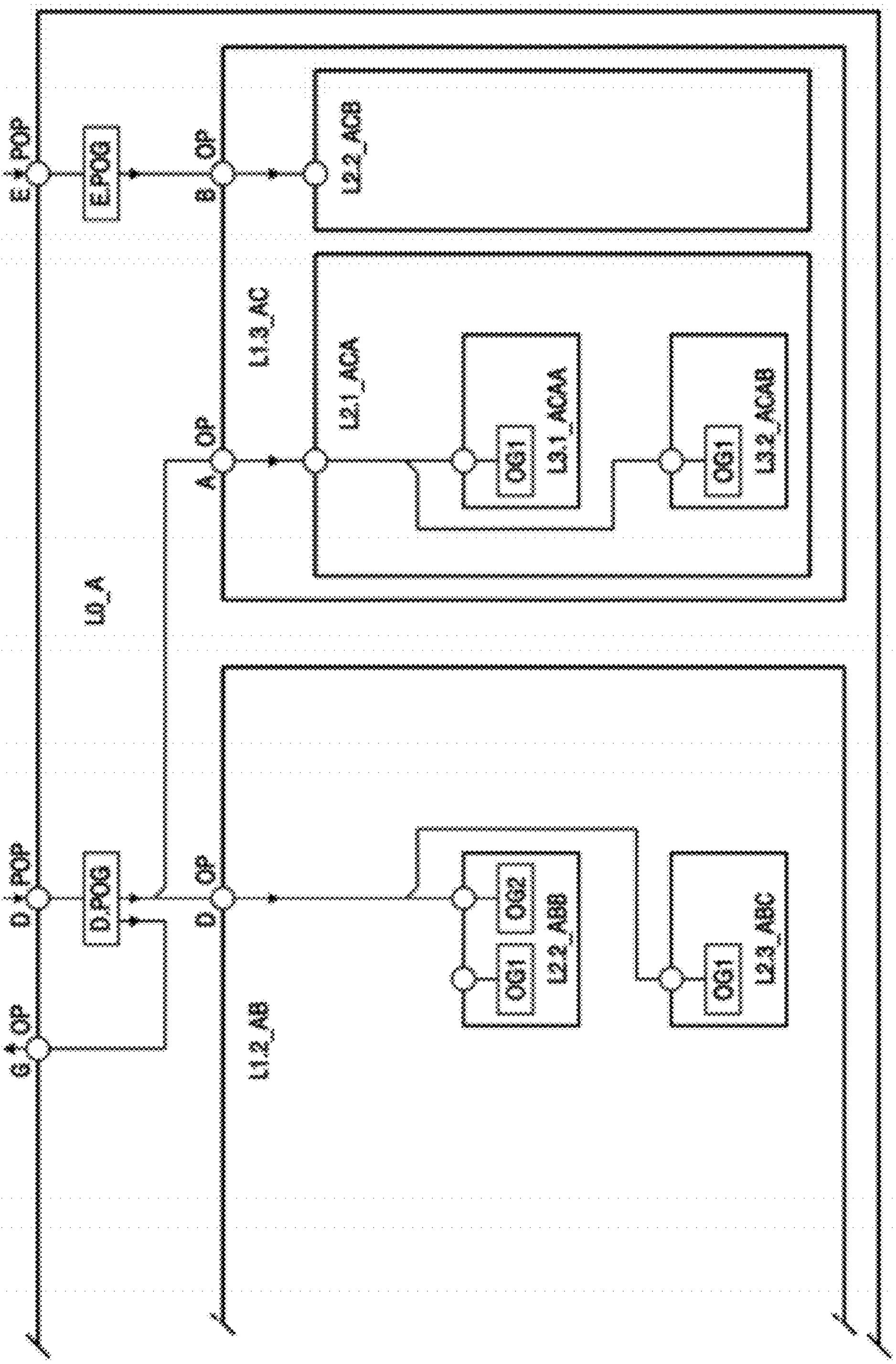
Figure 68:
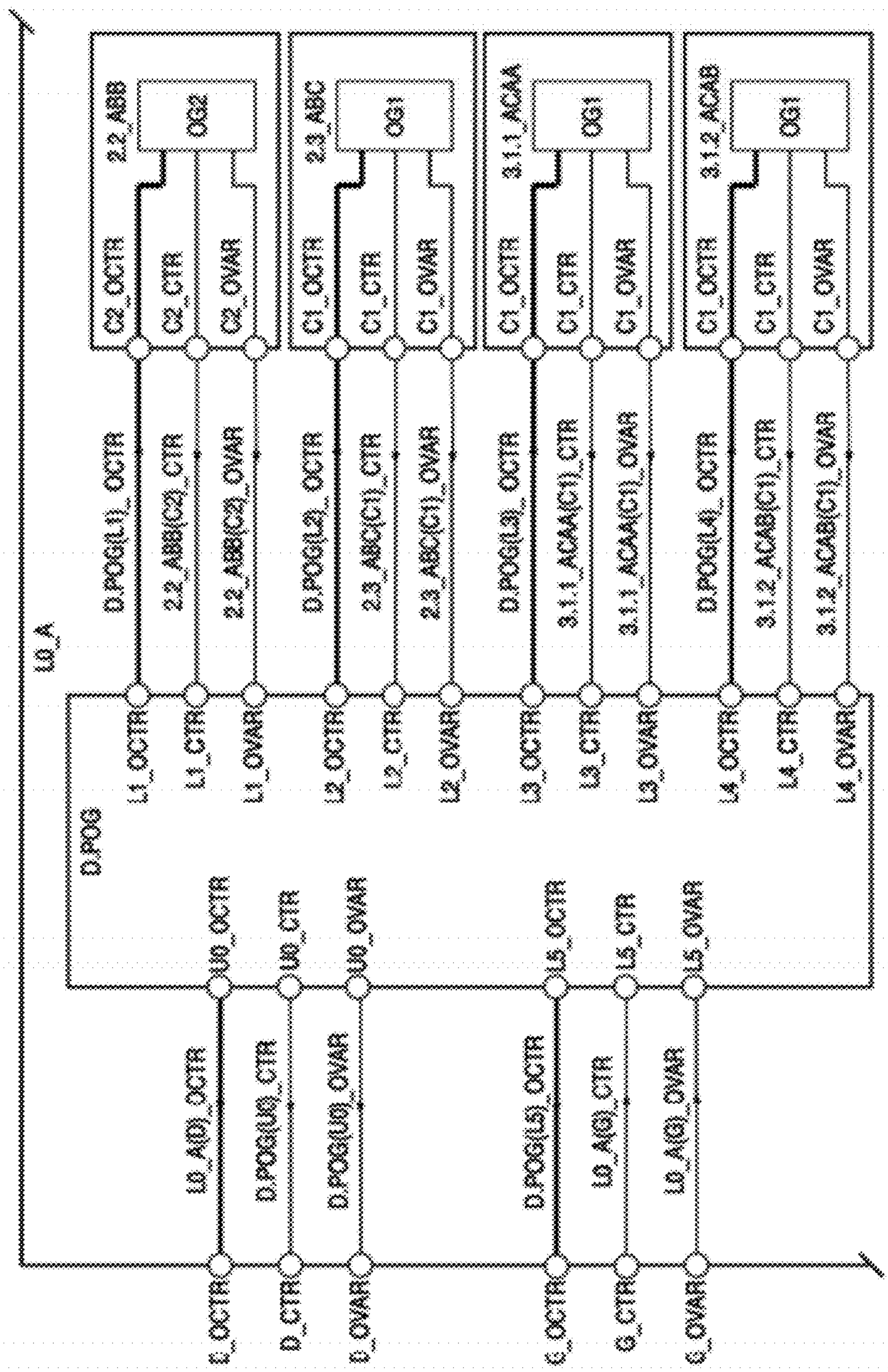

FIG. 67 shows the attachment of D.POG to project-SST ID" and the operational connection to the RTIs ABB, ABC, ACAA, ACAB and to project-SST "G". The corresponding control signal groups are shown in FIG. 68. The generation of port names and signal names for the control signal groups was shown in FIG. 64.

Figure 69:
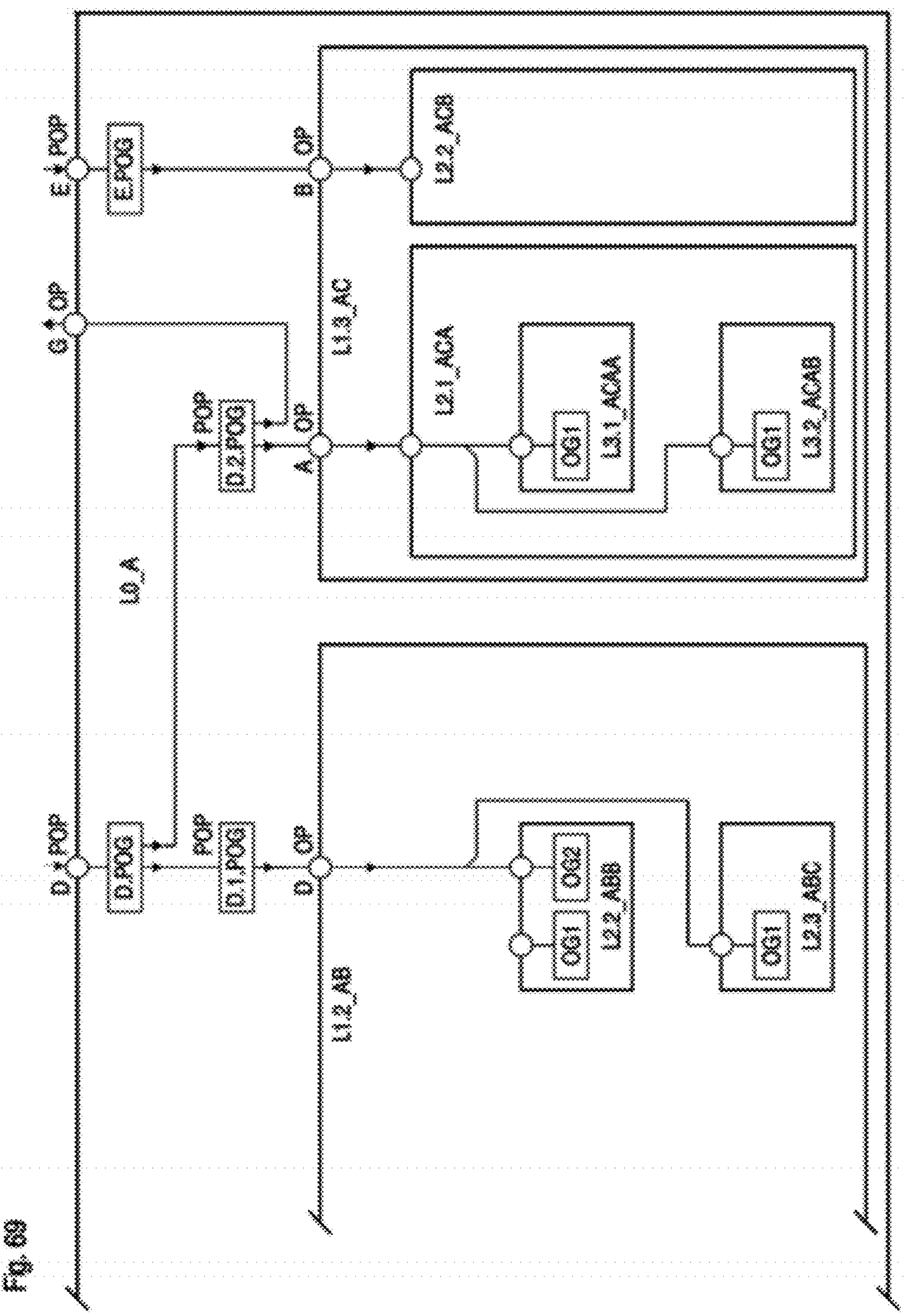

FIG. 69 shows an exemplary configuration for a distribution of POPs of project-SST "D" via D.POG for processing in two RTI groups in "ABB", "ABC" and in "ACAA", "ACAB" with project-SST "G". Hereby certain POPs of D.POG, are distributed for example to D.1.POG, others to D.2.POG. To get a clear specification it is supposed in SPV, that a POP is specified completely in one D.x.POG, in the example in D.1.POG or in D.2.POG.

Figure 70:
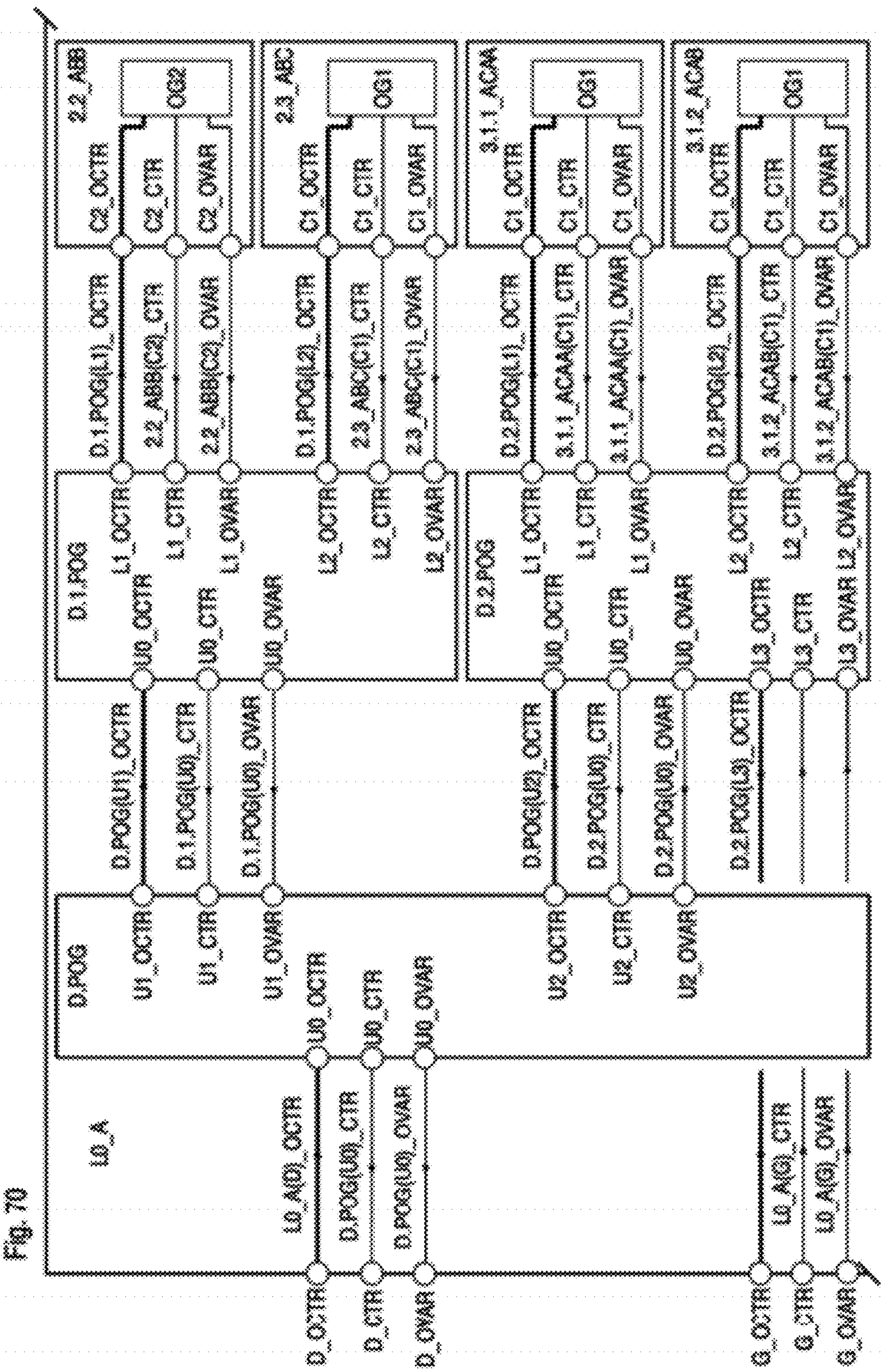

In FIG. 70 the connections of the control signal groups for a configuration according to FIG. 69 are shown.

Figure 71:
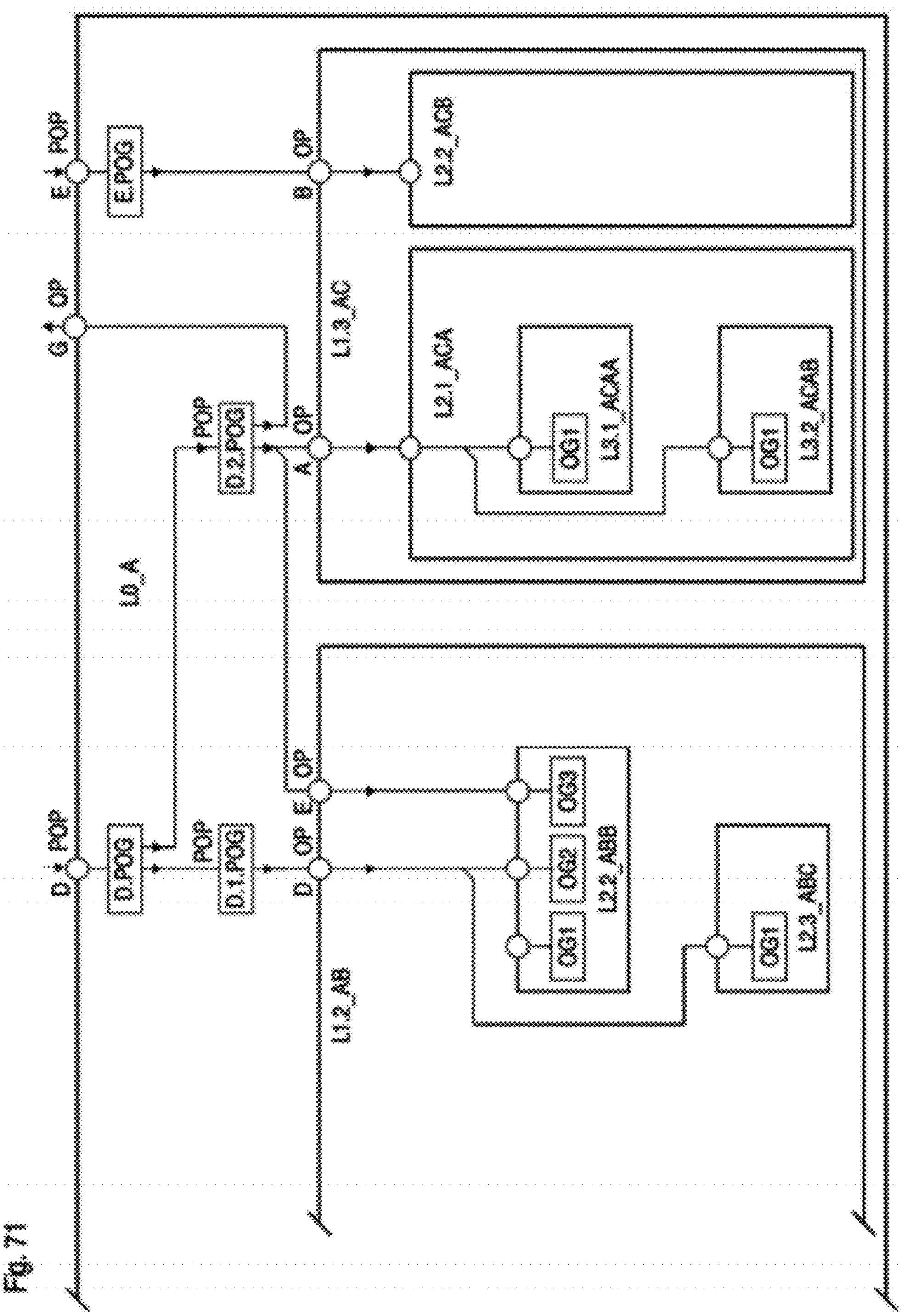

FIG. 71 shows an attachment of RTI "ABB" via OG3 connected with D.2.POG, which is expanded compared to FIG. 69. With that OPs of the D.1.POG and of the D.2.POG can be moved to RTI "ABB". The distribution of POPs from D.POG to D.1.POG and D.2.POG occurs, for example, by a demultiplex/multiplex configuration 3, which executes dependent on type of POP, by a select "SEL", the switching of POP to D.1.POG or to D.2.POG, as shown in FIG. 72. With "SEL=0" the control signals "OCTR" are transmitted from D.POG to D.1.POG or, respectively of "CTR" and "OVAR" from D.1.POG to D.POG, with "SEL=1" "OCTR" is switched from D.POG to D.2.POG, or, respectively, "CTR" and "OVAR" from D.2.POG to D.POG.

In FIG. 73 "OCTR" is put through by a demultiplex configuration 4, as shown in FIG. 72, the control signals "CTR" and "OVAR" are transferred directly and parallel, without multiplexing. Thus a shortening of the operation flow is obtained. An exemplary distribution of POPs of D.POG to D.1.POG or D.2.POG, as shown in FIG. 69 or FIG. 71, is defined in SPV by the specification of the project operation. The generation of an exemplary demultiplex/multiplex configuration 3 is performed automatically by SPV.

In FIG. 74, for example, OPs of D.1.POG and of D.2.POG are transmitted to a project-SST "G" via a component "PRIOR", the therefore needed multiplex/demultiplex configuration "5" is shown in FIG. 75. For such a configuration, in which several POGs or IPOGs transmit to a project-SST, in the example this is the project-SST "G", the priority of OP accesses is to be defined in SPV. The component "PRIOR" with appropriate multiplex/demultiplex configuration, which is needed for the realisation, is generated automatically by SPV.

FIG. 76 shows the connections of the control signal groups of 1.IPOG in FIG. 62. For the generation of IPOPs in an IPOG control signals, from inside of the project "A" and/or from outside the project "A", are supplied to the 1.IPOG port "U0_CTR". The 1.IPOG port "U1" is connected via a control signal group with the project port "H" for a transmission of POPs to another project. The 1.IPOG port "L4" is connected via a control signal group with the project port "F" for the transmission of OPs to an RTI in another project.

FIG. 77 shows IPOG sub components 1.1.IPOG and 1.2.IPOG, which are connected to the main component 1.IPOG. With that certain IPOPs of 1.IPOG can communicate operatively with certain RTI groups, as it was explained for "D.POG" in FIG. 69 and FIG. 70. The project-SST "H" for POPs is connected to 1.1.IPOG, the project-SST "F" for "OPs" is connected to 1.2.IPOG.

FIG. 78 shows a project-SST "Yb" ("b" stands for bi-directional), which is designated for both directions of POP requests, for a so-called master/slave operating. This is obtained by insertion of a bi-directional driver field 6 between project-SST "Yb" and Y.POG or an exemplary 3.IPOG. The selection of the direction of transmission is done by a port output control "OC", which, as is known in the state of the art, is normally controlled by a so-called arbiter. With OC=0 the project-SST "Yb" is in slave mode, i.e. the transmission of the POP request occurs from the top level-SST "Yb" to Y.POG, with OC=1 the project-SST "Yb" becomes master and the transmission of the POP request occurs from the exemplary 3.IPOG to the project-SST "Yb". As is known, a bi-directional driver field 6 can be configured also for several POG slave components and/or for several exemplary IPOG master components. For the SPV specification of operations the project-SSTs and the corresponding slave and master components are to be defined as bi-directional, the requested bi-directional driver field 6 is generated automatically by SPV.

In the following, based on the block structure in FIG. 79, the principles of operation inside of a project and in the system, and beyond the project limits, are explained in summary. Hereby project1 (A) and project2, which is divided in parts, are illustrated on system level. Project1 (A) is illustrated on top level "L0_A", with the internal primary operation group "1.IPOG", the RTI "ABAAC" and the project ports "H" for primary operations "POPs" and "F" for operations "OPs". A complete survey over the project1 (A) is given in FIG. 62 to FIG. 78. The partial array of project2 comprises the primary operation group "A.POG", "RTI1", "RTI2" and the project ports "A" for primary operations "POPs" and "B" for operations "OPs".

In project1 in the "1.IPOG" control signal coincidences from port "U0_CTR" are received and internal primary operations "IPOPs" are generated. An IPOP is converted in an IPOG to primary operations "POPs" or/and in operations "OPs". POPs are transferred by an IPOG in a project exclusively outwardly to a POG in another project. In the example FIG. 79 the transmission route for a POP is from 1.IPOG2 port "U1_OCTR" in project1 via the project1 port "H" to project2 port "A" or A.POG port "U0_OCTR" respectively. OPs, which were converted from an IPOP, are exclusively transferred from an IPOG to RTIs inside of a project. In the example of FIG. 79, the transmission route in project1 for an OP is from 1.IPOG-Port "L1_OCTR" to RTI-Port "C2_OCTR" of the RTI "ABAAC". A POP, which is transferred from the 1.IPOG in project1 to A.POG in project2, is converted in A.POG in project2 to "OPs" and transferred exclusively to RTIs in project2. In the example of FIG. 79, the OP transfer in project2 occurs from A.POG-Port "L1_OCTR" to RTI1-Port "C1_OCTR".

During an RTI operation flow it may be necessary, to read data from an external component and/or to write data to an external component. An external component may be another RTI in the same project or in an other project. In the example according to FIG. 79, for an operation flow in the RTI "ABAAC" in project1 data should be read or written from/to the RTI2 in project2. For this the RTI "ABAAC" in project1 transmits by its control signal port "C2_CTR" a corresponding operation request to the 1.IPOG port "L1_CTR". The 1.IPOG then transmits with its control signal port "L4_OCTR" the operation request, received by the RTI "ABAAC", to the RTI2 control signal port "C1_OCTR" in project2.

The data needed for a read and/or write operation of RTI "ABAAC" are illustrated in FIG. 79 with the memory address "ABAAC_MEM1ADR(15:0)", the write data "ABAAC_MEM1WDAT((7:0))" and the read data "MEM1_RDAT((7:0))". As also described in principle in FIG. 65, the RTI2 signals "MEM1_E_SVAR" and "MEM1_E_AVAR" transmit the operation RTI2-OVAR state to the RTI "ABAAC" in project1, after termination of the RTI2 operation. There the RTI2-OVAR state together with the OVAR state of the RTI "ABAAC" in project1 is evaluated and transmitted after the termination of the operation from port "C2_OVAR" of RTI "ABAAC" to port "L1_OVAR" of "1.IPOG". In this mode of operation no information of input port "L4_OVAR" is evaluated in "1.IPOG."

In case that an RTI for its operation flow has to read data of an external component or/and has to write to an external component, this RTI can be connected directly with external components by a control signal group, consisting of "OCTR", "CTR" and "OVAR". In the example of FIG. 79, then a direct connection would exist via a control signal group between "OG2" of RTI "ABAAC" in the project1 and "OG1" of the RTI2 "MEM1" in project2. As described in FIG. 105, the elements needed for the specification of an RTI operation, which are outside of the RTI, are indicated by the suffix "ex" in the specification matrix of the RTI to specify.

Description to FIG. 80*a*-94*b*

For the specification of an RTI-OP elements types as register "REG", counter "CNT", shift register "SHR", combiner "COM" and memory "MEM" are defined. The elements RTI input port "PI" and RTI output port "PO" were already defined in SPV display "CONNECT" and are ready for the operation specification of RTI.

COM contains only combinational assignments without any storing. Under COM for example may be maintained parity checker "PCH", parity generator "PGN", adder "ADD", subtracter "SUB", multiplier "MUL", divider "DIV", comparator "CMP" etc. MEM may be, for example, a random access memory "RAM", a read only memory "ROM", an EEPROM "EEP", a first in/first out RAM "FIFO" etc. Normally "MEMs" are configured as distinct RTI. The basic functions of a memory are write "WR" and read "RD".

REG has the single function load "LD".

The functions for CNT are load "LD", count up "CU" and count down "CD". SHR has the functions load "LD", shift with least significant bit first in "LF" and shift with most significant bit first in "MF".

The reset of REG, CNT and SHR generally occurs synchronously by the function LD with appropriate data. In SPV the functions of the element types REG, CNT, SHR, COM and MEM are stored in a kind of library and can be completed if required.

A simple and definite allocation of data/signals in a serial and parallel data processing is achieved by introduction of the element state "ESTA" and signal state "SSTA".

In FIG. 80 to FIG. 86 the state functionality of the elements COM, REG, CNT, SHR, RTI input port/output port and MEM is explained.

In FIG. 80*a* an element COM, for example, has three inputs, whose data "DIN1", "DIN2", and "DIN3" generate by combining the output data "DOUT". COM is a pure combinatory element without any memorizing. For the element COM in FIG. 80*b* the state functionality of ESTA and DOUT-SSTA is illustrated depending from the exemplary DIN-SSTA for the working steps WSTP1 to WSTP6. The state values of ESTA and DOUT-SSTA are identical. If in a WSTP a SSTA of DIN1 or/and DIN2 or/and DIN3 is higher than ESTA or, respectively, higher than DOUT-SSTA of the preceding WSTP, then the maximum DIN-SSTA of ESTA, or respectively, of DOUT-SSTA is adopted. If in a WSTP the maximum DIN-SSTA is equal or lower than the ESTA/DOUT-SSTA of the preceding WSTP than ESTA/DOUT-SSTA of the preceding WSTP is incremented by one. At the beginning of an RTI operation the not memorizing elements, for example "COM", hold no ESTA/DOUT-SSTA, they adopt for the first time the maximum ESTA/DOUT-SSTA of the transmitting elements, also ESTA=0.

The element REG, FIG. 81*a*, has an input "DIN" and an output "DOUT". The values of the states of ESTA and DOUT-SSTA are identical. For DIN-SSTA in FIG. 81*b* exemplary values are supposed. If in a WSTP the DIN-SSTA is equal or lower than ESTA/DOUT-SSTA of the preceding WSTP, then the ESTA/DOUT-SSTA of the preceding WSTP is incremented by one. If in a WSTP the DIN-SSTA is higher than the ESTA/DOUT-SSTA of the preceding WSTP, then the ESTA/DOUT-SSTA is incremented by one compared to the DIN-SSTA. At the beginning of an RTI operation the memorizing elements, in the example it is "REG", hold ESTA=0 and DOUT-SSTA=0.

The element CNT is illustrated in FIG. 82*a*, its state functionality is illustrated in FIG. 82*b*. With the function "FCT" load "LD" the state functionality is identical to element REG. With "LD", for example, decimal numbers for DIN-SSTA and DOUT-SSTA are supposed. With the FCTs count up "CU" or count down "CD" the number of count sequences "Count" are noted between brackets behind FCT. With beginning of a new direction of counting, "Count=1" and is incremented continuously. Furthermore the value of the state of ESTA/DOUT-SSTA is incremented by one with each counting sequence. The value of the states ESTA and DOUT-SSTA are identical. At the beginning of an RTI operation a "CNT" holds the value ESTA=0 and DOUT-SSTA=0.

In FIG. 83*a* the element SHR with an exemplary width of 4 bits is shown, its state functionality is explained in FIG. 83*b*. The input data in FIG. 83*a* are denoted as PDIN(3:0), the output data as PDOUT(3:0). The state functionality of FCT "LD" is identical to that of element REG. For FCT "LF" the ESTA, or the data output signal state "PDOUT-SSTA", or the "LFOUT-SSTA", depend on data input signal state "LFIN-SSTA", and for FCT "MF" the ESTA respectively, the data output signal state "PDOUT-SSTA" and "MFOUT-SSTA" depend on the data input signal state "MFIN-SSTA". If in a WSTP the data input SSTA is equal or lower than the ESTA/data output SSTA of the preceding WSTP, then the ESTA/data output SSTA of the preceding WSTP is incremented by one. If in a WSTP the data input SSTA is higher than the ESTA or data output SSTA of the preceding WSTP, then the ESTA or data output SSTA is incremented by one compared to data input SSTA. At the beginning of an RTI operation a "SHR" holds the ESTA=0 and on all data outputs the SSTA=0. The values of the states ESTA and SSTA of the data outputs are identical. With the function "LF" the shift action occurs from the data input "LFIN", SHR-bit3 to the data output "LFOUT", SHR-bit 0. With the FCT "MF" the shift action occurs from data input "MFIN", SHR-bit0 to data output "MFOUT", SHR-bit3. With PDIN, LFIN and MFIN, additionally to the signal state "SSTA", exemplary bit numbers were indicated, which, together with SSTA and FCT at the SHR outputs PDOUT, LFOUT and MFOUT, should illustrate the results of SHR functions more clearly. With PDOUT, thereby, in some cases partly occurs a multiple notation of FCT.Bit, separated by an under score each, behind the SSTA. The SSTA of PDOUT, LFOUT and MFOUT are identical to ESTA, so that ESTA is representative for the SHR. In FIG. 83*b*, the exemplary operation steps WSTP1 to WSTP27 with different FCTs and exemplary chosen PDIN-SSTA, LFIN-SSTA and MFIN-SSTA are illustrated. The notations between brackets "(SSTA_FCT.Bit)" for LFOUT and MFOUT do not correspond with the LFIN or MFIN of the actual related FCT, but with a LFIN or MFIN of the preceding FCT. With the beginning of an RTI operation, for example, it was defined, that the data input of an RTI starts with SSTA=0 and is continuously incremented by one.

FIG. 84*a* shows an RTI input "PI" with its external side "EDIN" and its internal side "IDIN". FIG. 84*b* shows the state functionality for EDIN-SSTA, IDIN-SSTA and PI-ESTA.

FIG. 85*a* shows an RTI output port "PO" with its internal side "IDOUT" and its external side "EDOUT". FIG. 85*b* shows the state functionality of OPORT-ESTA and EDOUT-SSTA corresponding to IDOUT-SSTA. The PO-ESTA is identical to EDOUT-SSTA. If in a WSTP the IDOUT-SSTA is higher than the PO-ESTA or EDOUT-SSTA of the preceding WSTP, then IDOUT-SSTA is adopted by the PO-ESTA or EDOUT-SSTA respectively. If in a WSTP the IDOUT-SSTA is equal or lower than the PO-ESTA or EDOUT-SSTA of the preceding WSTP, then the PO-ESTA or the EDOUT-SSTA, respectively, of the preceding WSTP is incremented by one. At the beginning of an RTI operation PO-ESTA and EDOUT-SSTA have no value. With the first data transmission of "IDOUT" the value of IDOUT-SSTA is adopted by PO-ESTA and EDOUT-SSTA. Also the value "0" is adopted.

In FIG. 86*a*, for example, a RAM out of the group memory elements "MEM" is illustrated with "WR" (write) and "RD" (read) together with its common address "ADR". The RAM input data are "ADR(15:0)" and write data "WDAT((7:0))", the RAM output data are read data "RDAT ((7:0))". The state functionality for a RAM of FIG. 86*a* is shown in FIG. 86*b*. If at a FCT "WR" in a WSTP the ADR-SSTA or/and the WDAT-SSTA is higher than the ESTA of the preceding WSTP, then the ESTA is incremented by one, compared to the maximum value of ADR-SSTA or/and WDAT-SSTA. If with a FCT "WR" in a WSTP the ADR-SSTA or/and WDAT-SSTA is lower or equal to ESTA of the preceding WSTP, then the ESTA of the preceding WSTP is incremented by one. With the FCT "RD" RDAT-SSTA is identical to ESTA. If with the FCT "RD" in a WSTP the ADR-SSTA is higher than the ESTA of the preceding WSTP, then the ESTA and RDAT-SSTA is incremented by one compared to ADR-SSTA. If with the FCT "RD" in a WSTP the ADR-SSTA is equal or lower than the ESTA of the preceding WSTP, then the ESTA of the preceding WSTP is incremented by one and RDAT-SSTA adopts the value of ESTA.

For an optimum illustration and recognition of the transferred type of data/signal, the signal identifier "SID" is introduced. For "SID=0" the connection name between transmitter and receiver, the so-called "static signal name", is defined. For SID1, SID2, SID3, etc. different transferred types of data/signal connections, so-called "dynamic signal names" may be defined in a data/signal connection. Thereby it is possible, to maintain the "static signal name" additionally as "dynamic signal name".

In the following in FIG. 87 to FIG. 94 exemplary "dynamic signal names" are illustrated and explained for RTI input port, RTI output port, register, counter and shift register. The thereby illustrated state functionality for "ESTA" and "SSTA" is explained in detail in FIG. 80 to FIG. 86.

In FIG. 87*a* an RTI input port "PI" is shown, which receives data "EDIN((7:0))" on the external side and which transmits data "IDIN((7:0))" from the internal side to the data processing elements of the RTI. FIG. 87*b* shows for SID0 on "EDIN((7:0))" and "IDIN((7:0))" an exemplary identical static signal name "DAT((7:0))". Concerning SID1 to SID8, it is defined for "IDIN", that "IDIN" adopts all exemplary dynamic signal names and bit vectors of "EDIN". In FIG. 87*c* IDIN with SID1 to SID3 adopts of "EDIN" only the exemplary dynamic signal names with the vector width "((7:0))".

In FIG. 88*a* an RTI output port "PO" is illustrated, which receives data of data processing elements of the RTI at the internal side "IDOUT((7:0))" and which transmits outwardly at the external side "EDOUT((7:0))" the data from the RTI. FIG. 88*b* shows for SID0 on "IDOUT((7:0))" and on "EDOUT((7:0))" an exemplary, identical static signal name "DAT((7:0))". For SID1 to SID8 it is defined that "EDOUT" adopts all exemplary dynamic signal names and bit vectors from "IDOUT". In FIG. 88*c* "EDOUT" with SID1 to SID3 adopts only the exemplary dynamic signal names with its vector width "((7:0))" of "IDOUT". For the IDOUT signal state "SSTA" in FIG. 88*b* and FIG. 88*c* exemplary values were supposed.

FIG. 89*a* shows a register "REG" with data input "DIN (15:0)" and data output "DOUT(15:0)". In FIG. 89*b* an exemplary static signal name "REF(15:0)" for the REG data output "DOUT(15:0)" was chosen. The static signal name of the REG input port "DIN(15:0)" depends on its connection to the transmitter. For SID1 to SID8 it is defined for "DOUT(15:0)", that all exemplary dynamic signal names and bit vectors adopt their names from "DIN(15:0)". In FIG. 89*c* "DOUT" with SID1 to SID5 adopts only the exemplary dynamic signal names with their vector width "(15:0)" of "DIN". For the DIN signal state "SSTA" exemplary values were chosen.

Figures 90A, 90B:

In FIG. 90*a* an element "CNT" with a data input "DIN ((7:0))" and a data output "DOUT((7:0))" is illustrated. In FIG. 90*b* an exemplary static signal name for the CNT data output "DOUT((7:0))" was chosen as "DAT((7:0))". The static signal name of CNT input "DIN((7:0))" depends on its transmitter connection. With "FCT=LD" it is defined for SID1 to SID5 of "DOUT((7:0))" that in the processing steps "WSTP: 1, 9, 16, 17, and 21" all exemplary dynamic signal names and bit vectors of "DIN((7:0))" are adopted. In the example of FIG. 90*b*, in a counter action with "CU" or "CD", following after "LD", the dynamic signal names and bit vectors at "DOUT" remain unchanged. For the DIN signal state "SSTA" exemplary values were chosen. In the column "DOUT-decimal" for "LD" exemplary decimal values were chosen.

Figures 91A, 91B:
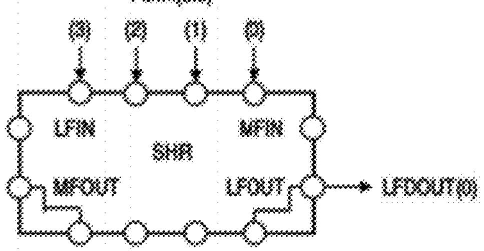

FIG. 91*a* shows a 4 bit shift register "SHR" for a parallel/serial data conversion with the parallel input "PDIN (3:0)" and the serial output "LFDOUT(0)". In FIG. 91*b* an exemplary static signal name for SHR serial output "LFDOUT(0)" was chosen as "LFDAT(0)". The static signal name of SHR parallel input "PDIN(3:0)" depends on its transmitter connection. As shown in FIG. 91*b*, the "SHR" was loaded by the function "LD" in "WSTP1" with "ADR (3:0)", in "WSTP5" with "ADR(7:4)", in "WSTP9" with "DAT(3:0)", in "WSTP13" with "DAT(7:4)", in "WSTP17" with "DAT(11:8)" and in "WSTP21" with "DAT(15:12)". After each SHR load the SHR bit "0" is available on the serial output "LFDOUT(0)", after following LF shift in three steps the SHR bits "1", "2", and "3" are available, one after the other. The PDIN-SSTAs for SHR load "LD" were exemplarily chosen. SID1 to SID24 were defined, as FIG. 91*b* shows, for the display of all dynamic signal names with bit vector at LFDOUT.

Figures 92A, 92B:
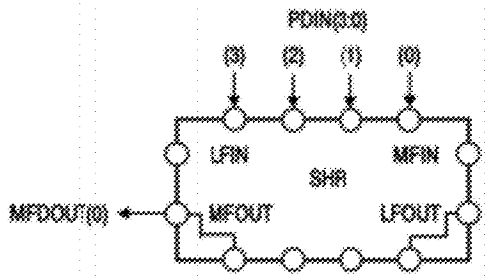

FIG. 92*a* shows a 4 bit shift register "SHR" for a parallel/serial conversion with the parallel input "PDIN(3:0)" and the serial output "MFDOUT(0)". In FIG. 92*b* an exemplary static signal name for the SHR serial output "MFDOUT(0)" was chosen as "MFDAT(0)". The static signal name of the SHR parallel input "PDIN(3:0)" depends on its transmitter connection. In FIG. 92*b*, the SHR function "LD" is identical to that of FIG. 91*b*. The bit order at "LFDOUT", FIG. 91*b*, was bit 0-1-2-3, at "MFDOUT" it is the order Bit3-2-1-0, as shown in FIG. 92*b*. Compared to LF shift in FIG. 91*b* the MF shift in FIG. 92*b* was merged in one line. The definition "SID" is identical to that in FIG. 91*b*.

Figures 93A, 93B:
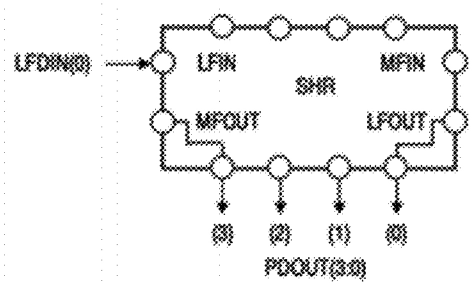

FIG. 93*a* shows a 4 bit shift register "SHR" for a serial/parallel conversion with the serial input "LFDIN(0)" and the parallel output "PDOUT(3:0)". In FIG. 93*b* an exemplary static signal name for the SHR parallel output "PDOUT(3:0)" was chosen as "PDAT(3:0)". The static signal name of the SHR serial input "LFDIN(0)" depends on its transmitter connection. In FIG. 93*b* in each line a serial data input with 4 steps "LF(1:4)" is shown, corresponding to the bit order in brackets in the column "LFDIN dynamic (bit)" with "ADR(0:3)", "ADR(4:7)", etc. Thereby the values between the brackets mean the bit order (bit0 to bit3), (bit4 to bit7), etc. With SID1 to SID6 all dynamic signal names for PDOUT with their bit vectors can be built of LFDIN. The LFDIN-SSTAs were exemplary chosen.

Figures 94A, 94B:
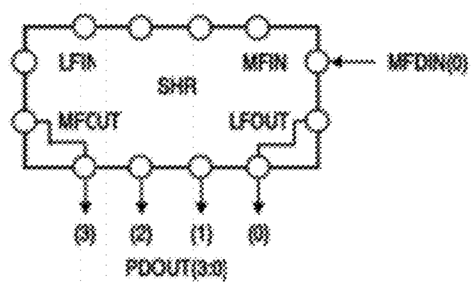

FIG. 94*a* shows a 4 bit shift register "SHR" for serial/parallel data conversion with the serial input "MFDIN(0)" and the parallel output "PDOUT(3:0)". In FIG. 94*b* an exemplary static signal name for the SHR parallel output "PDOUT(3:0)" was chosen as "PDAT(3:0)". The static signal name of the SHR serial input "MFDIN(0)" depends on its transmitter connection. The contents and functional features shown in FIG. 94*b* are identical to that of FIG. 93*b*, with the exception, that on "MFDIN(0)" the bits are transferred in inverse order with bit3 to bit0.

As it is shown in FIG. 80 to FIG. 94, the element state ESTA of an element is always identical to the signal state "SSTA" of the element output signal. Because there are element functions, in which no element output signal or, respectively, no output-SSTA, but always a ESTA is generated, as for example during a RAM write action, the data operation steps in an RTI operation flow are defined or, respectively, coordinated exclusively by the element state "ESTA". Therefore the SSTA is not used in SPV. ESTA is generated for all elements, which are involved in an RTI operation. For the generation of ESTA four element groups are distinguished, there are the RTI input ports "PI", RTI output ports "PO", combinational elements "COM" and memorizing elements "REG", "CNT", "SHR", and "MEM".

At the beginning of an RTI operation all memorizing elements hold the "ESTA=0". For "PI" the element state "ESTA=0" with the first signal input of an RTI operation, with following signal inputs ESTA is continuously incremented, to ESTA=1, ESTA=2, ESTA=3, etc.

COM elements and RTI output ports "PO" hold no ESTA at the beginning of RTI operations, they adopt the ESTA of the transmitting elements with the first reception of a signal, that may also be "ESTA=0".

If in a memorizing element a function step without any signal input is executed, as it is for example in a counter with the function "CU" or "CD", then its ESTA is incremented by one with each function step.

A conceivable alternative to the preceding description of the ESTA generation would be, to increment the ESTA of an element by "one", with each data reception or each data processing or each function step independent of the ESTA of the sending elements, which deliver the data input for the data processing of an element. The disadvantage of this alternative for the generation of ESTA is, that with an RTI operation the serial preceding data processing steps and/or function steps, and with that the logical depth, cannot be seen by the ESTA value of an element. The recognition of the logical depth out of the ESTA value is needed, if in time critical systems huge logical depths must be shortened by parallel data processing.

In FIG. 241 to FIG. 248 the generation of the parallel state "PSTA" is defined and illustrated by examples. In SPV, for each RTI operation, base operation or base operation variant, with PSTA it is defined during the data processing flow, which elements operate quasi simultaneously. A survey over the data processing steps for the generation of ESTA is illustrated with the examples of FIG. 241 to FIG. 248 by FIG. 249*a* and FIG. 249*b* and for the generation of PSTA by FIG. 250*a* and FIG. 250*b*.

In FIG. 251, FIG. 251*a* to FIG. 251*i* exemplary RTI data processing flows for a base operation "OP.1" (OVAR0) with eight base operation variants (OVAR1 to OVAR8) are shown, for which criteria and/or error events are specified in FIG. 252. FIG. 253 shows for this the data processing steps of all concerned elements together with the assignment to the element input variant "VAR" and to PSTA, still without consideration of the validation PSTA of the criteria or error events. FIG. 254 shows the data processing steps of all concerned elements with assignment to element input variant "VAR" and to PSTA with consideration of the validation PSTA of criteria or error events.

Description to FIG. 95*a*-97*h*

The following description concerns the specific features and attributes of a cyclic repeated transfer in a group of elements with definite connections, which are denoted a "cycle array". The description bases on the figures FIG. 95*a* to FIG. 95*k*, FIG. 96*a* to FIG. 96*f* and FIG. 97*a* to FIG. 97*h*. The structures of these figures serve explicitly for explanation of specific features and attributes and are not topics of SPV displays.

Figures 95A, 95B:
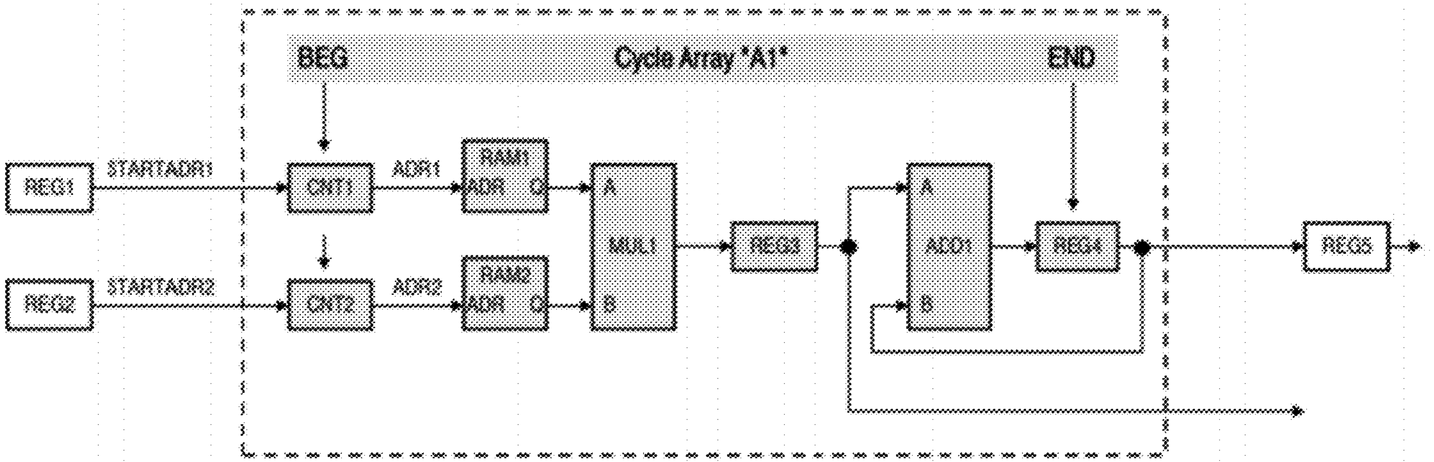

FIG. 95*a* shows a block structure, whose marked elements build a "cycle array". The marked elements are involved in a certain number of transfer cycles "TCYC". The cycle array is designed as "A" and contains a cycle array number, in the example it is "A1". Further cycle arrays in an RTI are named "A2", "A3", etc. As illustrated in FIG. 95*a*, the cycle array has elements with which the transfer cycle begins "BEG", in the example these are CNT1 and CNT2, or, respectively, ends "END", in the example that is REG4. A cycle array may contain any number of elements for "BEG" or "END". During the execution of transfer cycles resulting data of the cycle array may be transferred outward and may be processed there. In FIG. 95*a*, for example, the data outputs of "REG3" and "REG4" are carried outward.

Before a cycle in a cycle array starts, normally an initialising occurs from outside or/and inside, as illustrated for example in FIG. 95*b*. For example, with "WSTP1" the start addresses "STARTADR1" and "STARTADR2" are loaded with "REG1" and with "REG2" by the function "LD" in "CNT1" and "CNT2"; with "WSTP2" the address data "ADR1" and "ADR2" are transferred with the function "RD" to "RAM1" and to "RAM2". With "WSTP3" the read data of RAM1/RAM2 are multiplied by MUL1 and are stored with "WSTP4" in REG3. With "WSTP5" the REG3 data and REG4 data are added by ADD1 and are stored in REG4 with "WSTP6". At the beginning of the initialising, for example, for all elements "ESTA=0" was assumed.

FIG. 95*c* shows a cycle procedure of, for example, seven transfer cycles, "TCYC1" to "TCYC7" in a cycle array "A1" in FIG. 95*a*. The TCYC is entered as "ESTA_TCYC" for all involved elements in the column ESTA. The base for the generation of ESTA is the ESTA of the preceding instantiation in FIG. 95*b*, and is illustrated in FIG. 95*c,e,g,i*, in the line "WSTP=0". The first transfer cycle "TCYC1" begins at CNT1 and, respectively, at CNT2 with "CU" (count up) for incrementing ADR1 and ADR2 by one, and continues sequentially with read "RD" RAM1 and RAM2, multiplying of RAM1/RAM2 data by MUL1, data transfer to REG3, addition of REG3/REG4 data by ADD1 and the closing data transfer to REG4. In SPV the first transfer cycle TCYC1 is to be specified step by step, the following transfer cycles TCYC2, TCYC3 etc. are generated automatically by SPV, as it is shown later by the specification of RTI operations.

For the data transfer from the cycle array outward, for example, a connection from REG4 to REG5 is illustrated in FIG. 95*a*. In FIG. 95*c* the transfer from REG4 to REG5 occurs, for example, with "WSTP13".

As shown before, a TCYC consists of several steps, the so-called transfer sequences "TSEQ" in a cycle array. The transfer sequences are numbered in order of the parallelly executed data processing steps as "TSEQ1", "TSEQ2", "TSEQ3", etc. In example in FIG. 95*a* "TSEQ1" stands for CNT1 and CNT2, "TSEQ2" for RAM1 and RAM2, "TSEQ3" for MUL1, "TSEQ4" for REG3, "TSEQ5" for ADD1 and "TSEQ6" for REG4.

FIG. 95*d* shows for the cycle array "A1" of FIG. 95*a* the correlation of the processing steps "WSTP" for TCYC1 to TCYC7 under assignment of TSEQ1 to TSEQ6.

FIG. 95*e* illustrates the flow of FIG. 95*d* in the array of TCYC1 to TCYC7 under direct assignment of TSEQs to the elements. With the cycle criteria "TCYC" and "TSEQ" the stopping "STOP" and terminating "END" of a cycle can be clearly illustrated.

In FIG. 95*f* for example, a "STOP" or "END" in TCYC3 at TSEQ6 is illustrated. The TSEQs between brackets in TCYC4 to TCYC7 are not executed.

In FIG. 95*g* the flow of FIG. 95*f* in the range from TCYC1 to TCYC3 under direct assignment to the TSEQs to the elements is shown. The TCYCs, TCYC4 to TCYC7 between brackets are not executed.

FIG. 95*h* shows a cycle array identical to FIG. 95*a*, which executes a cycle control by comparing the values of ADD1_DAT((7:0)) with REG6_REF1((7:0)). The criterion for cycle STOP or, respectively, cycle END is for example "REG7_CR1(1:0):ADD1_DAT((7:0))>REG6_REF1((7:0))". The elements "REG6", "CMP1" and "REG7" for the generation of the criterion "CR" by data comparison, in the example "CR1", are not displayed in SPV but are defined by text as for example with "R_CR1:ADD1_DAT ((7:0))>REF1((7:0))". Thereby the "R" means storing of CR1 in a register "REG". For CR and REG a running number in the sequence order of execution or, respectively, of definition of criteria is allocated automatically by SPV.

A cycle control by comparison of data can occur in a cycle array at any locations. Furthermore criteria for cycle control may be specified by combination of any data/signals of inside or/and outside the cycle area. With specification of a STOP criterion always a corresponding GO criterion is to specify. A detailed description of the specification of cycle arrays is given later in context of the specification of an RTI operation.

FIG. 95*i* shows an ESTA flow from TCYC1 to TCYC7 of the cycle array "A1" of FIG. 95*a* for a "RAM1-ESTA=7" at the beginning of the transfer cycle, in line "WSTP=0".

Figure 96A:
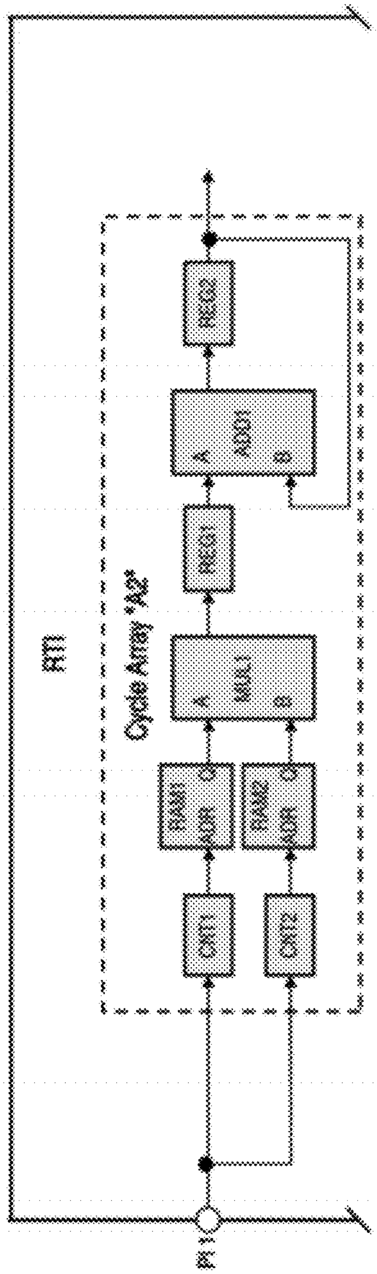

In FIG. 96*a* a cycle array "A2" is shown.

FIG. 96*b* shows the initialising of the cycle array "A2" in specified data processing steps "DVSTP1" to "DVSTP8". As shown later with the specification of the RTI operation, the order of "DVSTPs", in context of the order of generation of results, is arbitrary for the developer. FIG. 96*b*, for example, shows the following order of DVSTPs: DVSTP1: RAM1 start address of PI1 to CNT1 (function "LD"), DVSTP2: RAM1-start address from CNT1 to RAM1 (function "RD"), DVSTP3: RAM2-start address from PI1 to CNT2 (function "LD"), DVSTP4: RAM2-start address from CNT2 to RAM2 (function "RD"), DVSTP5: MUL1-multiplication of RAM1-data with RAM2-data, DVSTP6: MUL1 result transfer to REG1, DVSTP7: ADD1-addition of REG1-data with REG2-data, DVSTP8: ADD1 result transfer to REG2. At the beginning of the initialising for all elements in the example of FIG. 96*b* is ESTA=0.

FIG. 96*c* shows the initialising of the cycle array "A2" with real clocks "CLK1" to "CLK5". The transformation of specified data processing steps to real clocks is done in SPV automatically by a compiler.

Figure 96D:
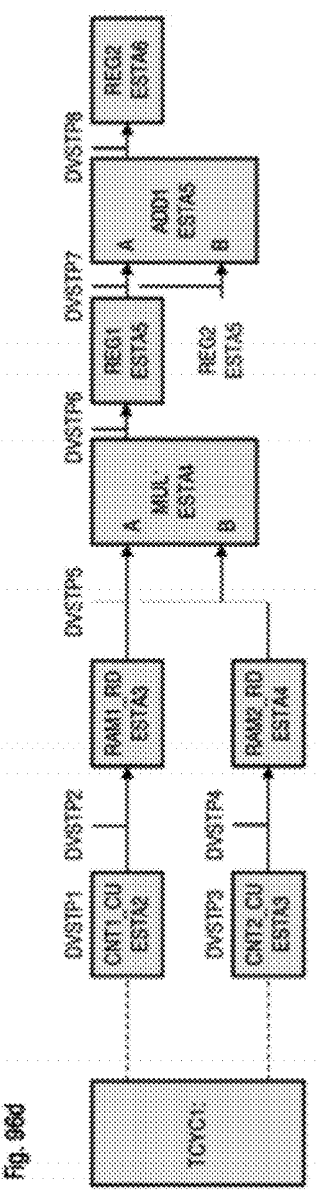

For the cycle array "A2", FIG. 96*a*, in FIG. 96*d* the first transfer cycle "TCYC1" is illustrated with the specified data processing steps "DVSTP1" to "DVSTP8" in an exemplary order. Thereby the RAM addresses are incremented by one by CNT1 with DVSTP1 and by CNT2 with DVSTP3 (function "CU"), the further transfer is identical to the transfer during initialising, as described in FIG. 96*b*. The generation of ESTA is based on the precedent initialising. The following transfer cycles, "TCYC2", "TCYC3", etc. are generated automatically by SPV.

Figure 96E:
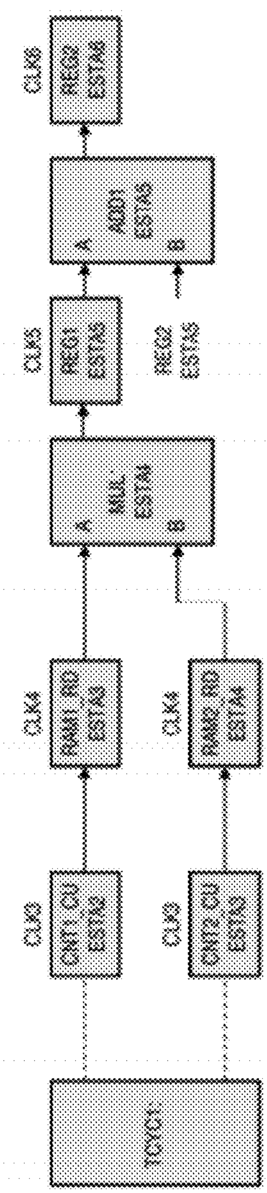
Figure 96F:
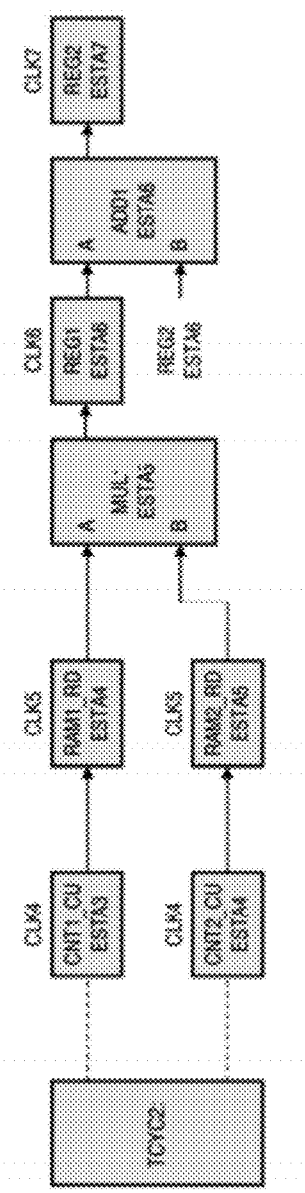

FIG. 96*e* shows the real clocks for "TCYC1" of the cycle array "A2". Thereby "TCYC1", taking into account the initialisation, can begin at the earliest with "CLK3". "TCYC2", FIG. 96*f*, "TCYC3", etc. start with a clock, each incremented by one "1". For distinction of the elements at initialising, the elements were marked during the transfer cycle.

Figure 97A:
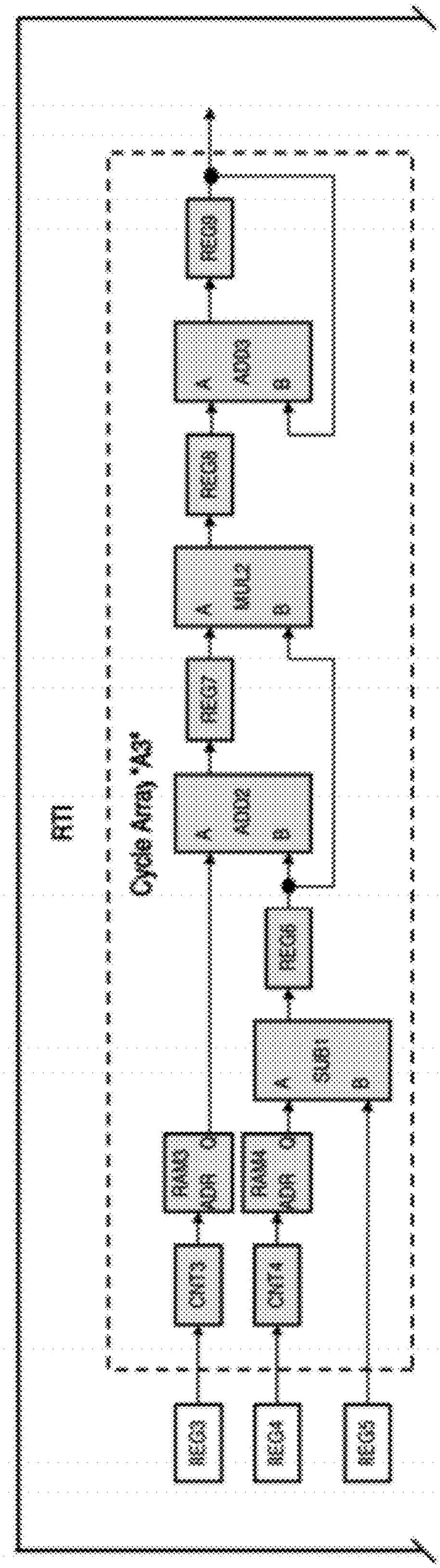
Figure 97B:
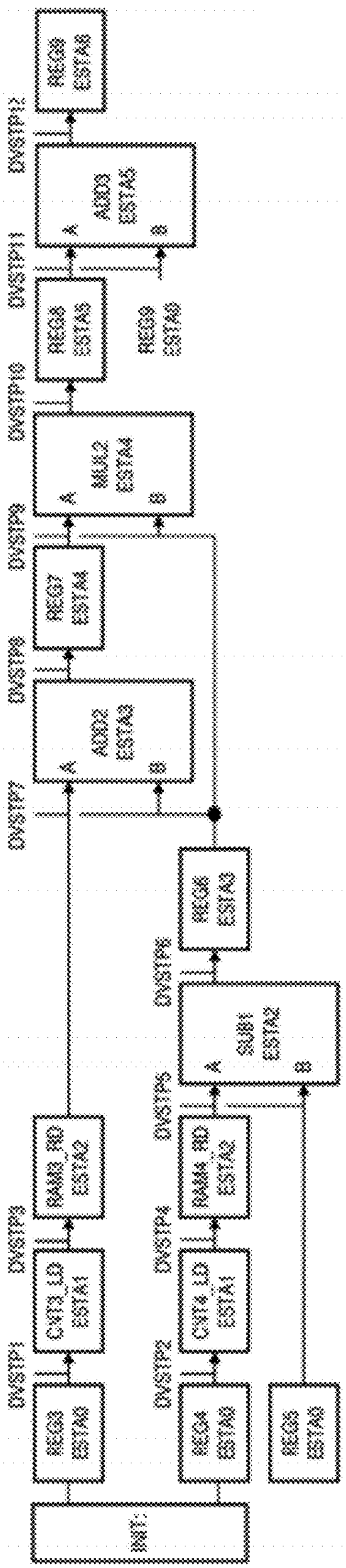
Figure 97C:
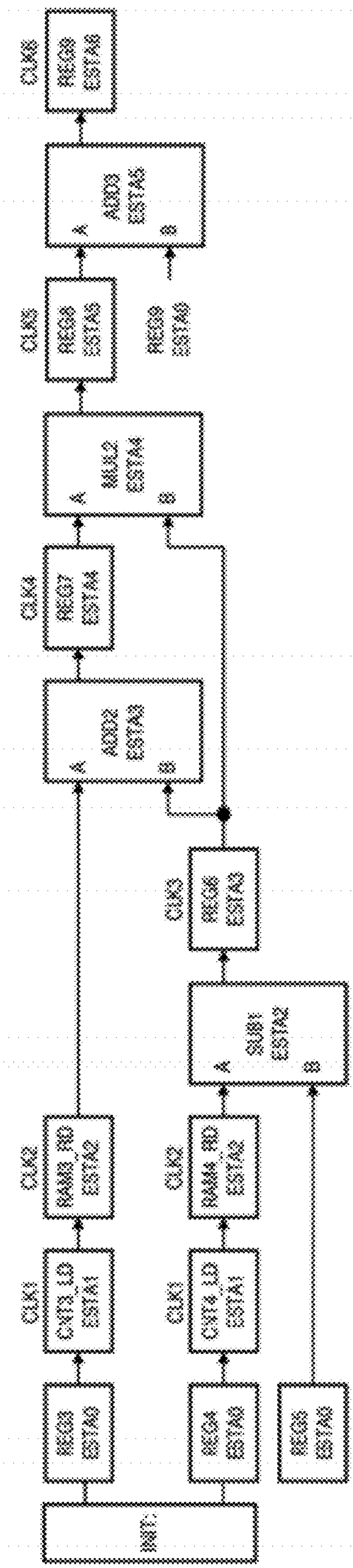

In FIG. 97*a* there is an exemplary cycle array "A3". FIG. 97*b* shows the initialising of the cycle array "A3" with the specified data processing steps "DVSTP1" to "DVSTP12" in an exemplary order. FIG. 97*c* shows the initialising of the cycle array "A3" with real clocks "CLK1" to "CLK6".

Figure 97D:
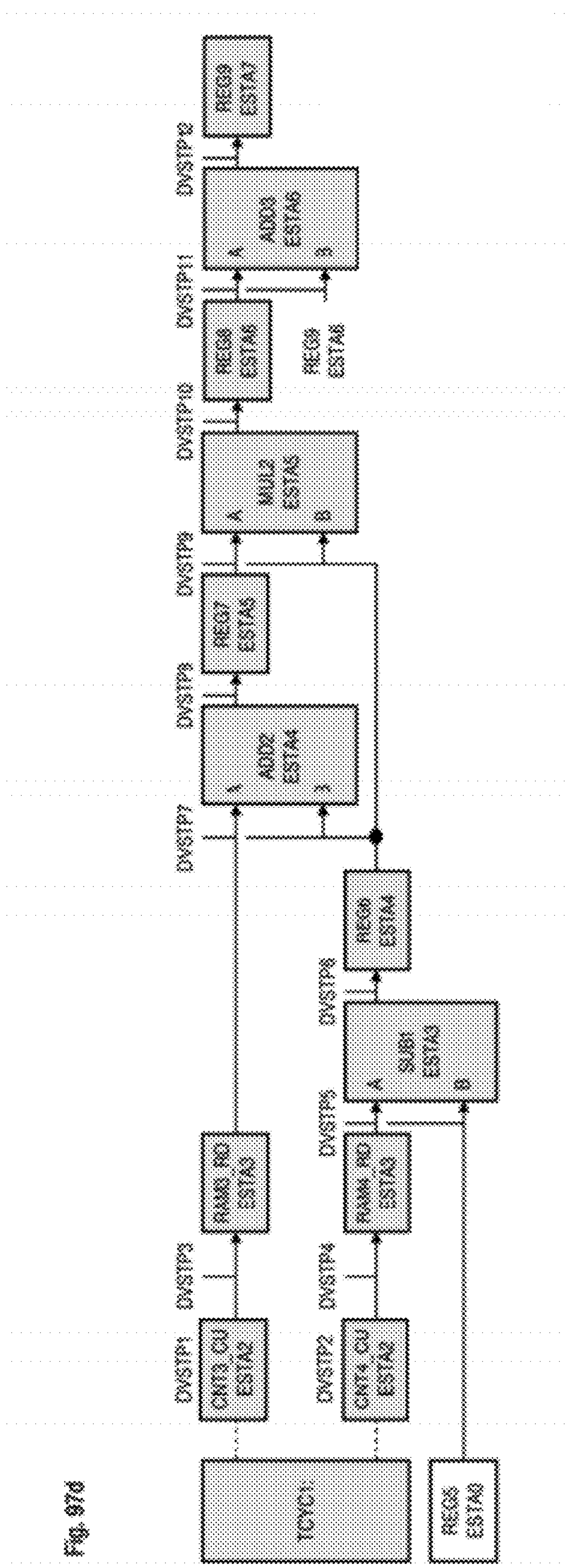

For the cycle array "A3", FIG. 97*a*, in FIG. 97*d* the first transfer cycle "TCYC1" with the specified data processing steps "DVSTP1" to "DVSTP12" in an exemplary order is illustrated. Thereby the RAM addresses are incremented by one by CNT3 with DVSTP1 and by CNT4 with DVSTP2 (function "CU"), the further transfer is identical to the transfer during initialising, FIG. 97*b*. Subsequently to the initialising for CNT3 and CNT4 results the ESTA=2.

Figure 97E:
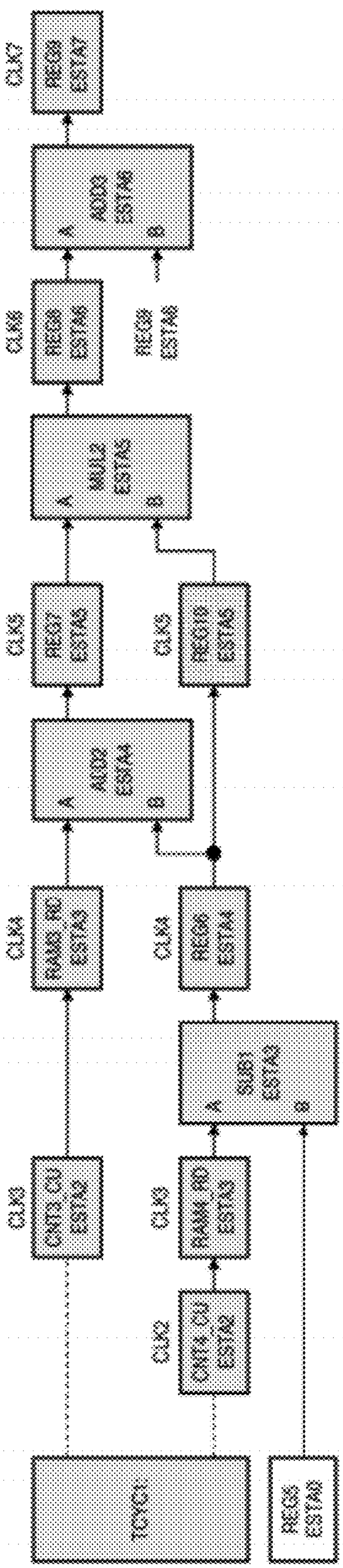

FIG. 97*e* shows the real clocks "CLK2" to "CLK7" for "TCYC1" of the cycle array "A3". Thereby the "TCYC1", taking into account the initialising, can begin at the earliest with "CLK2". For a "TCYC" in a cycle array it is a general rule, that all data/signals, which are processed in coincidence by one element, must be sent with the same clock by the preceding memorizing elements. In the example of data processing by "MUL2", FIG. 97*e*, data of "REG7" and data of "REG6" were not delivered for processing with the same clock. To obtain the clock identity for the data, which should be sent to MUL2, by SPV, for example, a register "REG10" is inserted automatically.

Figure 97F:
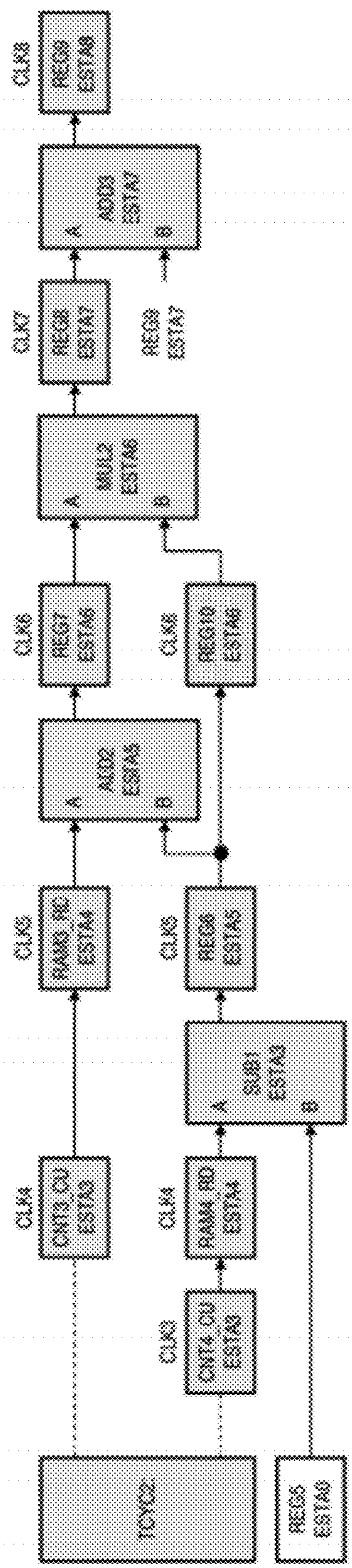
Figure 97G:
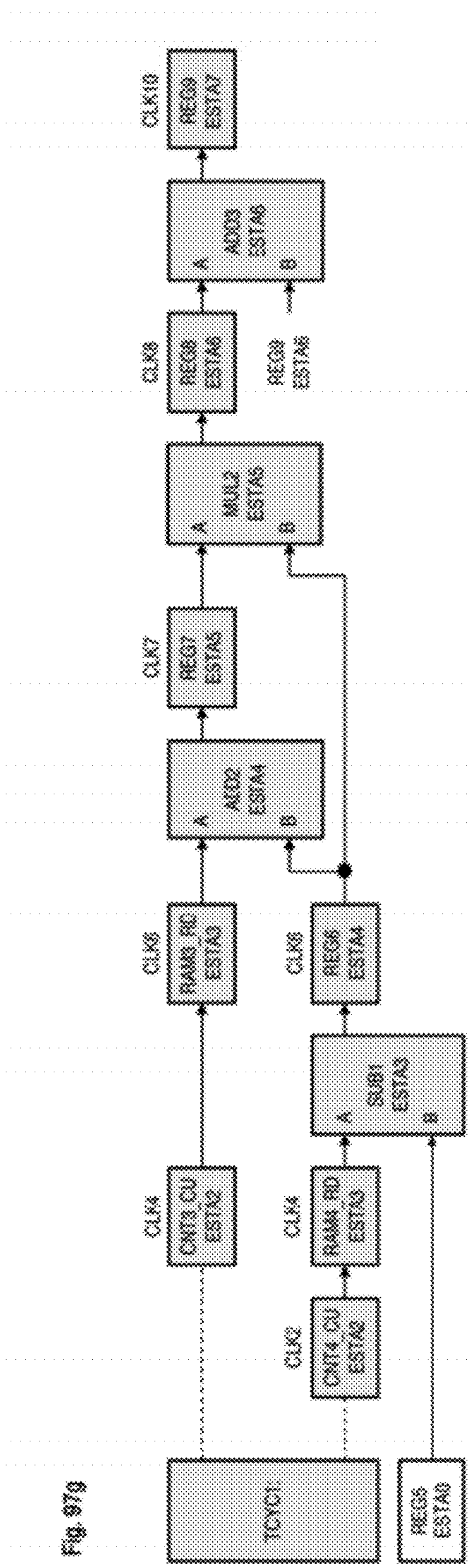
Figure 97H:
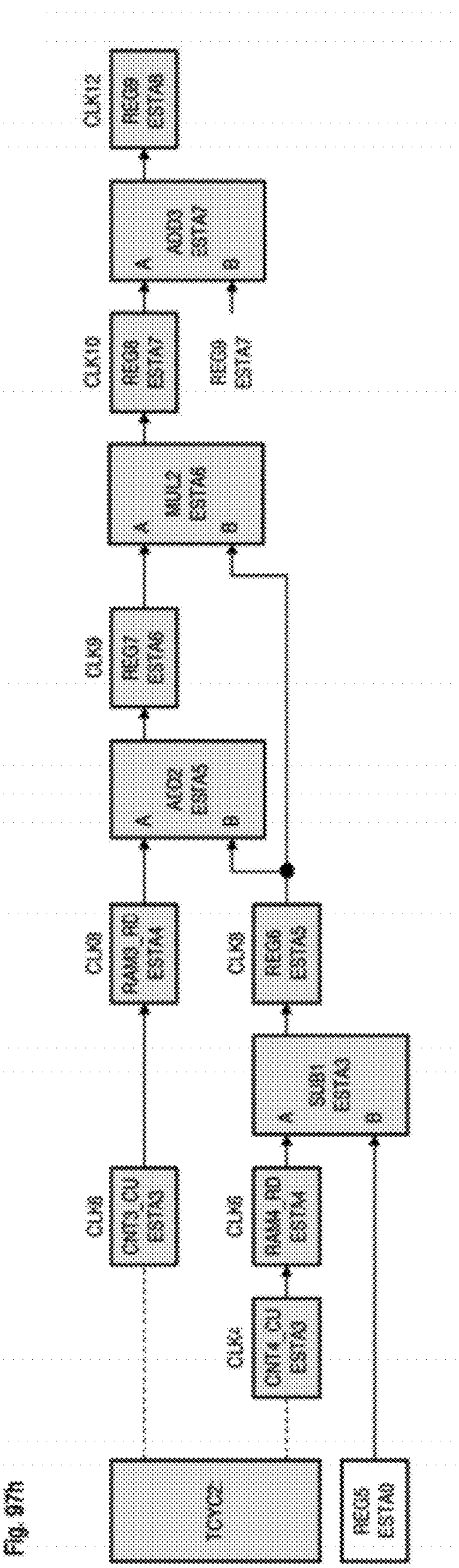

In FIG. 97*f* "TCYC2" begins with a clock incremented by one "1" compared to "TCYC1", i.e. with "CLK3". An alternative to the insertion of register "REG10", FIG. 97*e* and FIG. 97*f*, is to process the succeeding sequences with a distance of two clocks, and to process the activation of MUL2 with the distance of one clock, as shown in FIG. 97*g* and FIG. 97*h*.

Description to FIG. 98*a*-98*h*

An RTI base operation in its flow can be influenced or varied by error events or/and decision criteria, as shown in FIG. 65. An RTI base operation represents the standard RTI operation flow. This flow is without any impact of error events and is executed quasi with standard decision criteria. An RTI operation variant number zero "OVAR0" is allocated to an RTI base operation. Thereby all signals of type "SVAR" and "AVAR", which build the RTI operation variant, are not true. The RTI base operation is always specified first. After that individual RTI operation variants, which hold the OVAR type name "OVAR1", "OVAR2", etc. can be specified. Thereby each single OVAR type is an individual, distinctive combination of one or several coincidences of SVAR and/or AVAR signals, which are defined by error events and/or decision criteria causing a modified RTI operation flow compared to the base operation.

In the following, compared to the RTI base operation with OVAR0, different RTI-base-operation-variants with "OVAR1", "OVAR2" and "OVAR3" are illustrated and defined. FIG. 98*a*, FIG. 98*b*, FIG. 98*c* and FIG. 98*d* show a partial configuration of an RTI with the elements PI1, PI2, REG1, REG2, REG3 and ADD1, on which the generation of "OVAR1", "OVAR2" and "OVAR3" is explained subsequently.

Figures 98A, 98B, 98C, 98D:
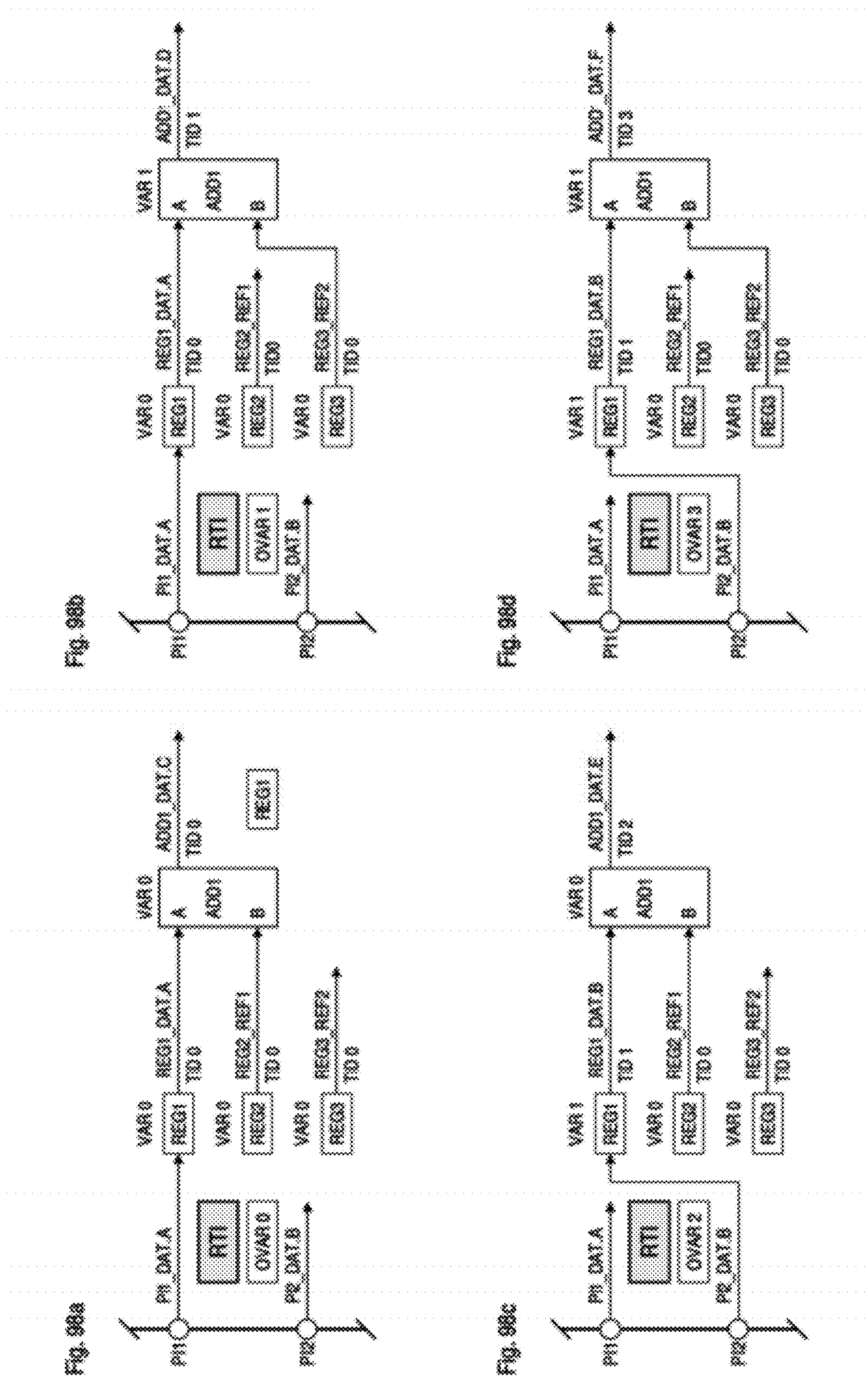
Figure 98E:
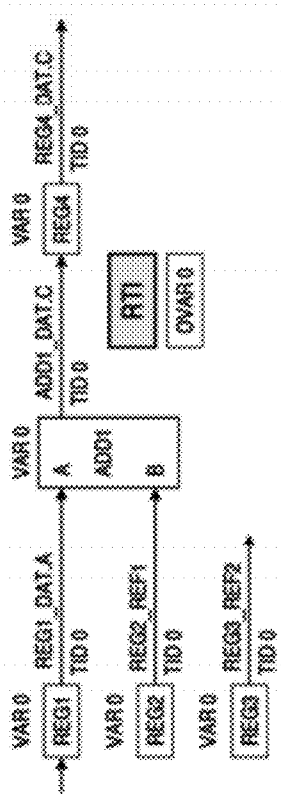
Figure 98F:
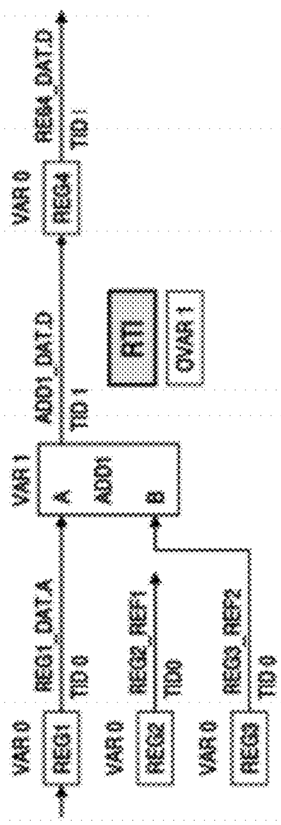
Figure 98G:
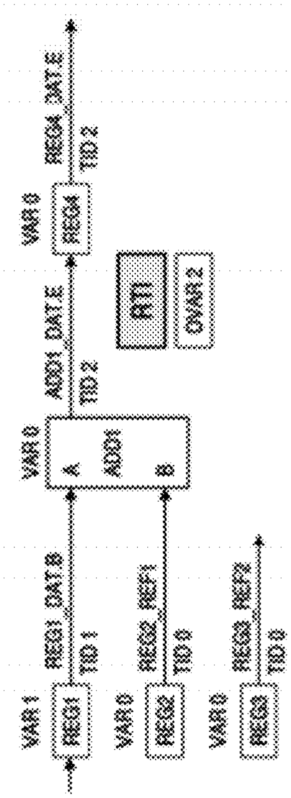
Figure 98H:
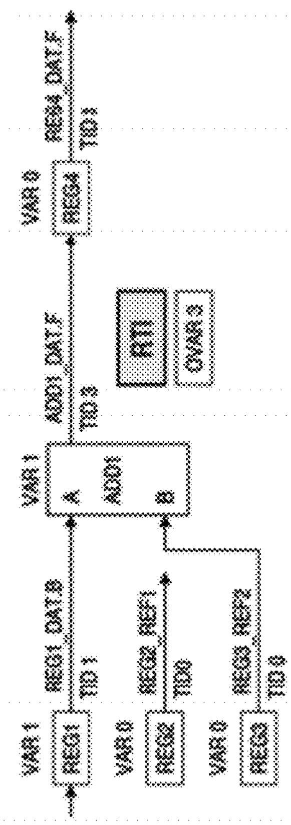

FIG. 98*a* shows the flow of an RTI base operation with "OVAR0". Therein all elements hold the variant number zero "VAR0". In difference to the RTI output ports the RTI input ports, in the example PI1, PI2, have no VAR allocation, since their data define the RTI base operation type, too, and cannot be varied by the data processing.

In FIG. 98*b* a first exemplary RTI operation variant "OVAR1" is shown. Thereby a first ADD1 variant "VAR1" for a certain ESTA was generated by allocation of the transmitter "REG3" instead of "REG2" at ADD1, input "B". If in the RTI operation variant "OVAR1" for a consecutive higher "ESTA", compared to "OVAR0", a further ADD1 variant would occur, then this ADD1 variant holds, related to the higher "ESTA", the variant number "VAR1", too. As there is a new result type at the ADD1 output, a new dynamic signal name basis "DAT.D" was chosen.

Generally applies:

For an RTI base operation all involved elements and each element for all ESTA values hold the VAR number zero "VAR0".

The VAR number of an element represents the data input of an element, which consists of the allocation to, or, respectively of the combination of the elements, which transmit the data input.

The VAR number of an element inside of an RTI operation variant can get for one "ESTA" values between "0" and the OVAR number of the RTI operation variant.

In FIG. 98*c* shows a second exemplary RTI operation variant "OVAR2". Thereby ADD1 again holds with "VAR0" a combination or allocation of the elements, which transmit the data input of "OVAR0". At REG1 "VAR1" follows from changing the input from transmitter "PI1" to transmitter "PI2", according to that, the signal name basis at REG1 output results as "DAT.B".

In FIG. 98*d* a third exemplary RTI operation variant "OVAR3" is illustrated. Herein "REG1" and "ADD1" have, corresponding to their input, the variant number "VAR1".

A new combination respectively the allocation of the data transmitting elements on a data input of an element modifies the type of result generation at this element output and on the involved, following element outputs in direction of the transfer and is covered by a so-called transfer identifier "TID". FIG. 98*a* shows the flow of an RTI base operation with "OVAR0", therein all element outputs have the TID number zero "TID0".

In FIG. 98*b* a first exemplary RTI operation variant "OVAR1" is shown. ADD1 hereby holds "VAR1" and "TID0" is connected to both ADD1 inputs, accordingly the "TID1" is valid at the ADD1 output for a certain "ESTA". If in an RTI operation variant "OVAR1" for a successive higher "ESTA", compared to "OVAR0", a further ADD1 variant would occur, then the ADD1 output, related to the higher "ESTA" also holds the TID number "TID1". The dynamic signal name basis was chosen as "DAT.D".

Generally applies:

For an RTI base operation all involved elements and each element for all ESTA values at the element output get the TID number zero "TID0".

The TID number of an element output represents the data input of this element, which consists of the combination or of the allocation to the data input transmitting elements and its TID.

The TID number of an element output inside of an RTI operation variant can get for one "ESTA" the values between "0" and the OVAR number of the RTI operation variant. For a clear illustration of the result type of an element, a corresponding dynamic signal name basis may be chosen for each TID number at the element output.

In FIG. 98*c* a second exemplary RTI operation variant "OVAR2" is illustrated. Thereby ADD1 holds the variant number "VAR0", the input at "A" is charged with "TID1", so that compared to FIG. 98*b* a new TID allocation arises at ADD1 input "A" and that thereby the TID at ADD1 output is incremented by one to TID2. The dynamic signal name basis at ADD1 output was chosen as "DAT.E".

In FIG. 98*d* a third exemplary RTI operation variant "OVAR3" is shown. Herein because of a new combination or allocation at the ADD1 input the TID at ADD1 output is increased to "TID3" and the dynamic signal name basis is chosen as "DAT.F".

The contents of FIG. 98*e* to FIG. 98*h* correspond to the contents of the sequence of FIG. 98*a* to FIG. 98*d*, with the exception, that in FIG. 98*e* to FIG. 98*h* the REG4 is placed behind ADD1 and that the input ports "PI1", "PI2" with their signal names are not displayed. In FIG. 98*e* to FIG. 98*h* it can be seen, that the dynamic signal name basis sent by ADD1 is transferred to the REG4 output.

Generally applies:

With the acceptance of data from elements with only one data input to the element output, always the dynamic signal name basis is taken over from the element input to the element output.

"VAR" and "TID" are automatically generated by SPV during the specification of the RTI operation.

The signal name in a "RTI" generally consists of "transmitter-element-name_signal name-basis (vector)". In FIG. 98*a* to FIG. 98*h* the vector was not displayed.

Figure 237A:
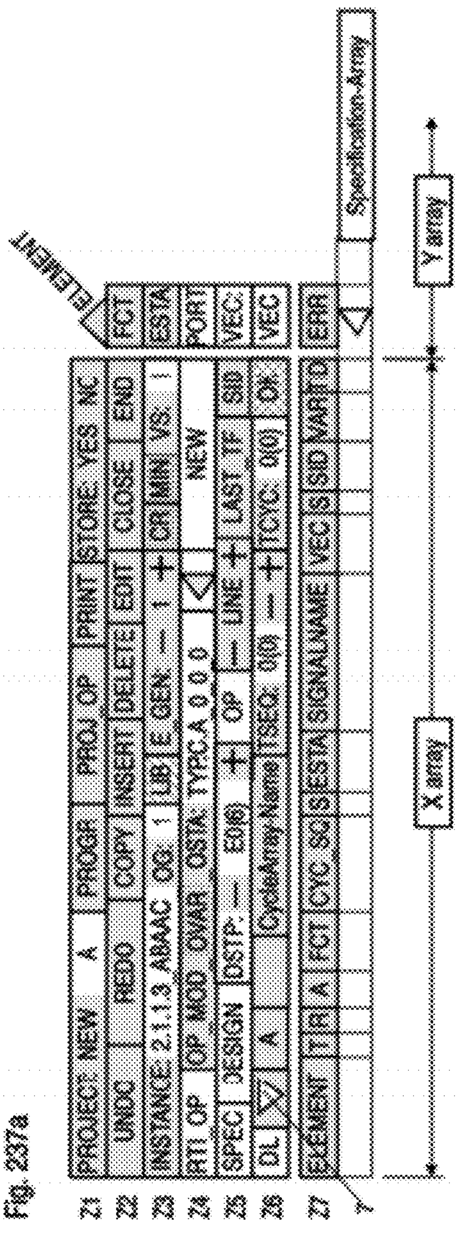
Figure 237B:
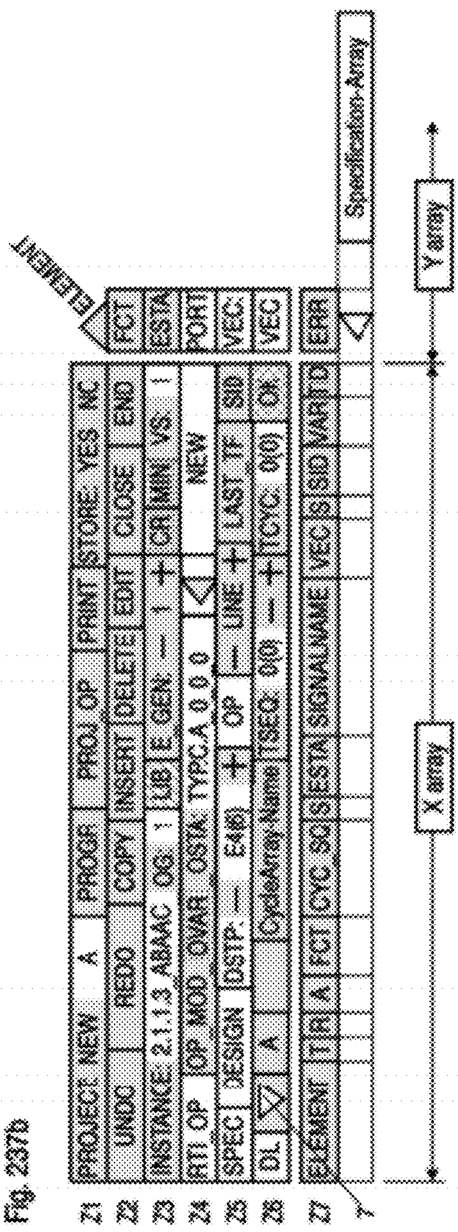
Figure 237C:
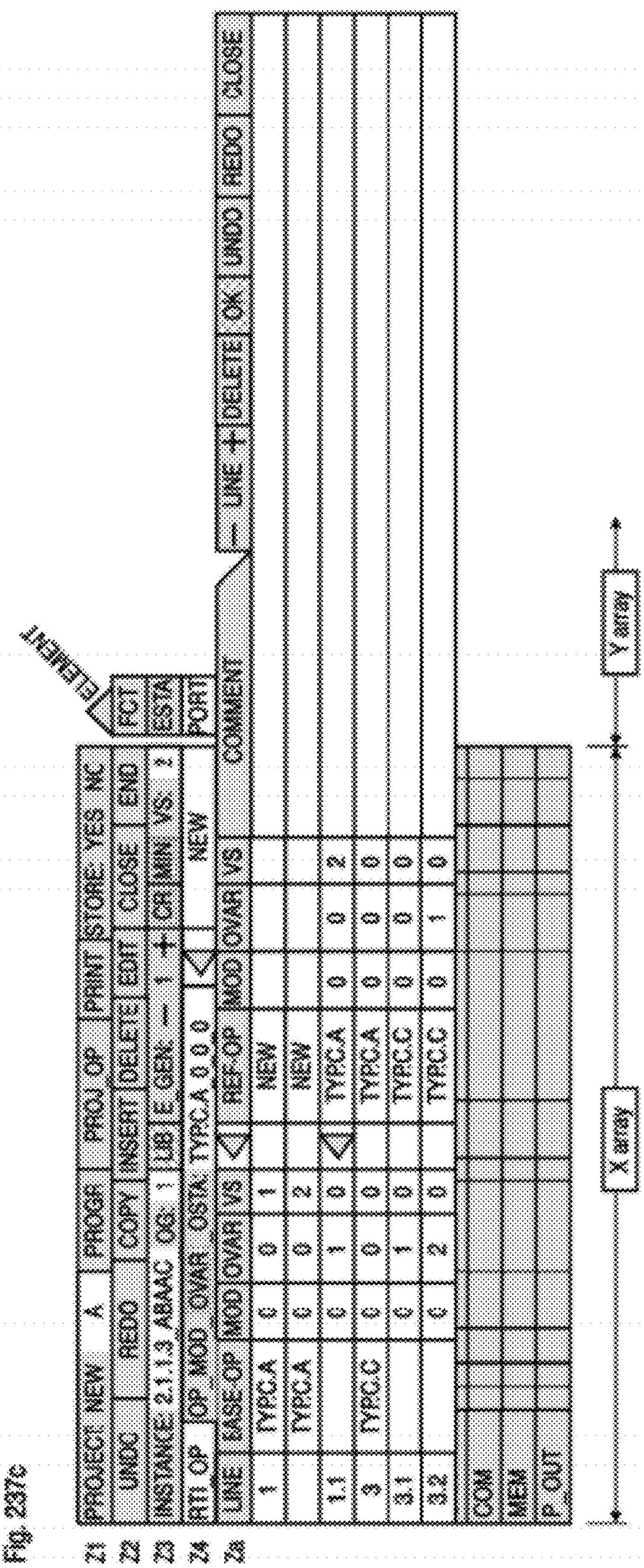
Figure 237D:
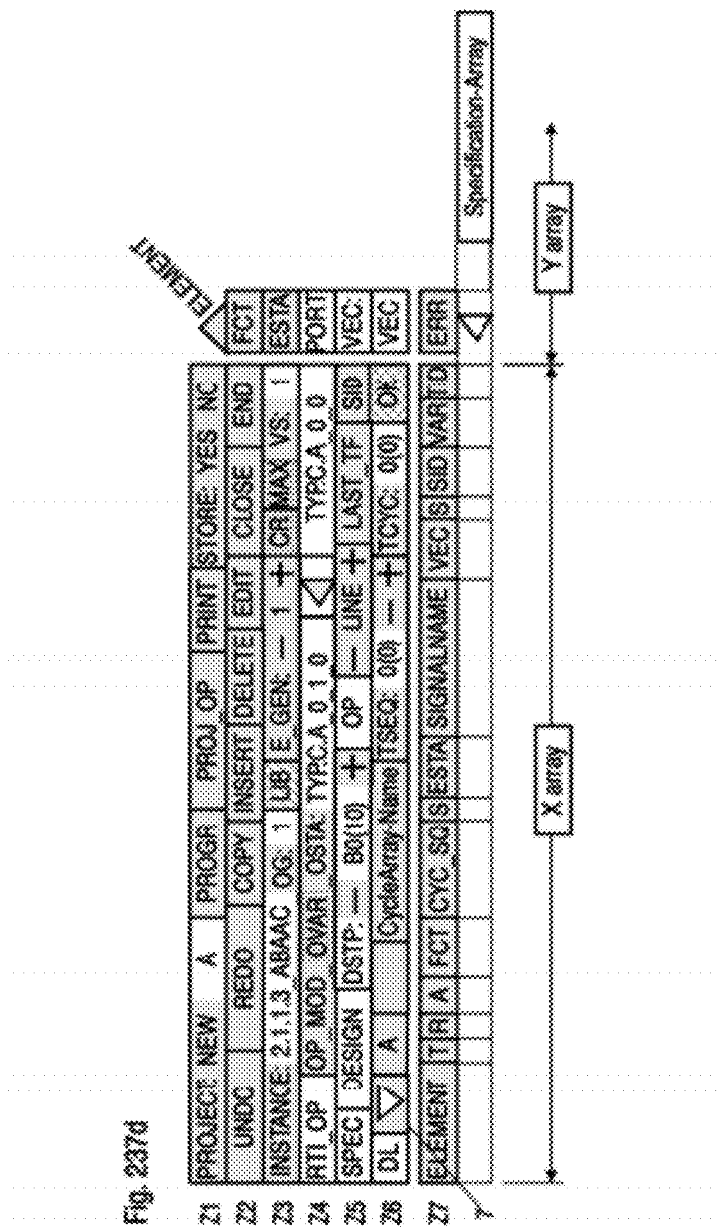

The generation of RTI base operation variants is described in FIG. 237*d.*

Description to FIG. 99*a*-99*s*

In the following an RTI operation specification "RTI-OP-SP" is described in the specification method "SPV" according to the present invention. For that by clicking the button "PROGR", FIG. 8, the SPV program window is opened and by clicking the button RTI operation "RTI_OP" the RTI operation display "RTI-OP-BS" in the so-called group level is opened, as shown in FIG. 99*a*. The group level is indicated by the button "GL" in line "Z6". The group level uses the so-called "X array" in "RTI-OP-BS". The group level holds the element groups needed for the specification of RTI operations as Input-Port "P_IN", register "REG", counter "CNT", shift register "SHR", combiner "COM", memory "MEM" and Output-Port "P_OUT". The element types of the element groups "REG", "CNT", "SHR", "COM" and "MEM" are selected out of a library and are transferred to the element groups of the group level, as shown later. P_IN and P_OUT were generated before by the SPV program "CONNECT" and are ready with port name/vector for each RTI. In the Y array the RTI-OP-BS has a vertical element column 8, whose line layout is explained in context with the RTI operation specification. The functions of the display and switch areas (buttons) in lines "Z1" and "Z2" were explained with the display "CONNECT", with exception of the button "PROJ_OP". By clicking the button "PROJ_OP" it is possible to switch directly to the project operation display "PROJ-OP-BS", as shown later contiguously. In "Z3" in the button "INSTANCE" the actual RTI is shown, for example this is the RTI "ABAAC" with path "2.1.1.3" and the operation group "OG1".

If any other RTI should be brought to the "RTI-OP-BS", then by clicking the button "INSTANCE" a survey over the RTIs for the project "A" is opened, from which the corresponding RTI is selected, and which is transferred to the RTI-OP-BS by closing RTI survey. The RTI survey was not illustrated. In "Z4" with RTI_OP the program for the specification of RTI operations is displayed. Furthermore in "Z4" for "OP_MOD_OVAR_OSTA:", on the left of the arrow, the actual entry of the RTI-OP-BS, is shown, for example as "TYP.C.A_0_0_0". Thereby, for example, "OP" stands for the RTI operation with "TYP.C.A", "MOD" for the RTI operation mode with "MOD=0", and "OVAR" for the RTI operation variant with "OVAR=0". The operation state "OSTA" is always "0", if in "PROJ-OP-BS" no project operation, POP or IPOP is specified, as it will be explained later. On the right of the arrow in "Z4" the entry "NEW" means, that the actual RTI operation on the left of the arrow is/was newly generated, and was not derived from a reference operation. The further displays and switch areas are explained in the context of the RTI operation specification.

By clicking the button "OP_MOD" in "Z4" the "RTI operation window" is opened, as shown in FIG. 99*b*. The RTI operation window holds in line "Za" the column "LINE", RTI base operation "BASE-OP" with mode "MOD", RTI-base-operation-variant "OVAR", version "VS" of the RTI operation specification state, "ARROW", reference operation "REF-OP" with mode "MOD", reference RTI-base-operation-variant "OVAR", version "VS" of the reference operation specification state and "COMMENT", as well as the buttons line generation "−LINE+", delete "DELETE", acknowledge "OK", action back "UNDO", action repeat "REDO" and close RTI operation window "CLOSE".

In column "LINE" automatically a running line number is introduced, beginning in the first line with "1", as FIG. 99*b* shows. The entries in line 1 of the RTI operation window in the example correspond to the entries in line "Z4" of the group level in FIG. 99*a*, VS=1 in line 1 of the operation window corresponds to the display "VS:1" in "Z3" of the group level in FIG. 99*b*, if the RTI operation specification was already in progress and was at least one time stored by clicking the button "STORE" in "Z1"; before in the RTI operation window VS=0 is indicated. The marked arrow in line 1 of the operation window in FIG. 99*b* points to the actual RTI operation to specify. On the right of the marked arrow in line1, in column "REF-OP" "NEW" means, that the RTI base operation "TYP.C.A" was new and was not derived from a reference operation. In column "COMMENT" any entries or notes regarding to "BASE-OP" or/and "REF-OP" may be entered.

For a further entry in the RTI operation window a new line was generated, as FIG. 99*c* shows. For that in the column "LINE" by clicking the button in line "1" this button is activated and marked as being active and by a further click on button "LINE" in "Za" this line is activated and prepared for the generation of a line. By a following click on the button LINE"+" in "Za" a line below the line "1" is generated. If the button "LINE" in "Za" is deactivated and a by clicking in the column "LINE" in the button of line1, no new line is generated below, but the line1 is marked, and in line1 optional modifications in the entries may be executed.

In the new, marked line, below line1, for example, the entries shown in FIG. 99*d* were made. By clicking the button "OK" in "Za" the entries are acknowledged, in column "LINE" for the new line with the new entries the line number with "2" and VS with "0" is generated, the marks in the lines are deleted, and the button "LINE" in "Za" deactivated, as FIG. 99*e* shows. VS=0 means, that the specification of this RTI operation has not yet begun or was not stored. If operation entries of line2 for a specification should be provided, then a click in column "ARROW" in line2, is made, which puts the marked arrow to this location, as shown in FIG. 99*f*. By clicking the button "CLOSE" in "Za" the RTI operation window is closed, and the entries from the "RTI operation windows" of line2 are moved to the group level, line4, as FIG. 99*g* shows.

For inputting of further operations to be specified the RTI operation window is opened again by clicking the button "OP_MOD" (Z4), as shown in FIG. 99*h*. By activating the buttons line2 in column "LINE" and "LINE" in "Za" with successive five clicks on the button LINE"+" in "Za" five new lines were generated and prepared for an entry by marking. With one or several clicks on the button LINE"−" in "Za" beginning from low to high one or several lines can be deleted.

In FIG. 99*i* exemplary entries in the four lines following line2 are illustrated. By clicking the button "OK" in "Za" the entries are acknowledged, the line numbers in column "LINE" generated, the marks in the lines and the line without entries deleted, and the button "LINE" in "Za" deactivated, as FIG. 99*k* shows. The numbering of the lines in column "LINE" hereby is effectuated structured. The RTI base operations with "MOD=0" and "OVAR=0" are numbered with 1, 2, 3 continually. For not-RTI-base-operations, i.e. with "MOD" or/and "OVAR" different to "0", behind the line number of the RTI base operations the index "1", "2", etc. is set; in column "BASE-OP" no entry is effectuated. If one or several lines should be deleted, then the lines to be deleted are marked by clicking in the column "LINE", thereby the button "LINE" in "Za" must be deactivated, and deleted by clicking the button "DELETE" in "Za". The thereby arising gaps in the lines are closed automatically and the thereby arising discontinuity in the line numbering is corrected automatically. If one or several entries should be cancelled, then this is done by one or several clicks on the button "UNDO" in "Za". In case that the cancelled entries should be restored, then this is done by clicks to the button "REDO" in "Za".

Preparing for a transfer of the operation "TYP.CB" with "MOD=0" and "OVAR=1" or of the corresponding reference operation "TYP.CB" with "MOD=0" and "OVAR=0" to the group level in Z4, the arrow is placed by clicking the button in column "ARROW" in line "2.1" to this location, as FIG. 99*l* shows. For a placing of the arrow it is required, that the version "VS" of the reference operation is equal or higher than "1", i.e. the reference operation must be specified. By clicking the button "CLOSE" in "Za" the operation window is closed and the operation, chosen by the arrow in column "ARROW", or, respectively, the reference operation, is moved to the group level (Z4), as shown in FIG. 99*m*.

For "POP" or "IPOP" operation flows, different to the operation flow in the so-called base mode with "MOD=0", by mode adjustment different to "MOD=0", diverse operation flows can be specified. For POP or IPOP operations with base mode "MOD=0", all RTIs, which are included in the operation, hold the base mode "MOD=0". For a POP or IPOP operation, which differs from the base mode "MOD=0", at least one RTI involved in the POG or IPOG, has an operation mode setting which differs from "MOD=0". The storing of operation mode adjustments can be effected completely in a POG or IPOG. If the storing of operation mode adjustments is effected completely or partly in the RTIs, then the operation mode adjustments, which are stored in the RTIs, are transferred from the OGs of the RTIs to the corresponding POG or IPOG in an appropriate fashion, for example in a coded form. Subsequently, in the RTI operation windows, for example, operations with a mode different to "0" are entered. Hereby the RTI operation window is opened out of the group level, FIG. 99*m*, as FIG. 99*n* shows, and the lines needed for the entry are generated. FIG. 990 shows the exemplary entries. In FIG. 99*p* the entries after acknowledgement by clicking "OK" in "Za" are illustrated. The arrow in column "ARROW" indicates the line, whose entries are identical to that of the group level in line "Z4". An operation, whose mode is different to "0", is automatically put between brackets in the column "BASE-OP", because this name is no operation name, but serves only for explanation. For example, in line 1.2 the operation is defined by "TYP.C.A" and by "MOD=2" and is additionally explained by "TYP.C.A.B". If this operation should be maintained as RTI base operation, then it is to enter in the column "BASE-OP" with "TYP.C.A.B" and in column "MOD" with "0".

In column "ARROW" by clicking the button of line "3.3" a new operation for the specification is provided, as shown in FIG. 99*q*, which is moved by clicking the button "CLOSE" in "Za" to the group level, FIG. 99*r*. If for a "BASE-OP-Modification" as shown in FIG. 99*q*, line 3.3, "TYP.C.C" with "MOD=1", a modification name is defined, in the example, "TYP.C.C.A", then, for example, this modification name in group level, FIG. 99*r*, can be superimposed by contact of the cursors with the display "TYP.C.C_1_0_0" in "Z4", in this location as "TYP.C.C.A_0_0_0".

In the following the transfer of element types out of a library to the element groups is explained. FIG. 99*s* shows the RTI-OP-BS in the group level with an RTI operation, which should be specified "OP_MOD_OVAR_OSTA: TYP.C.A_0_0_0<NEW".

Description to FIG. 100*a*-140

Figure 100A:
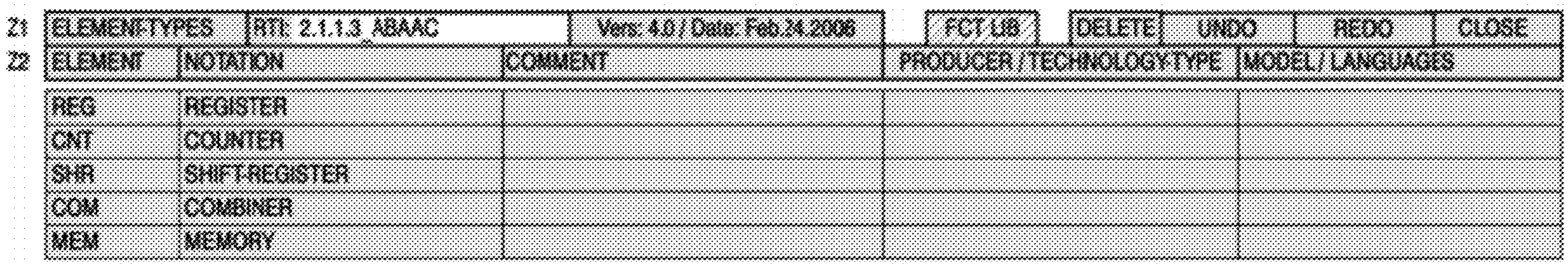

Clicking the button "LIB" in Z3, FIG. 99*s*, a library window "ELEMENT-TYPES" is opened, FIG. 100*a*, which contains the element groups "REG", "CNT", "SHR", "COM" and "MEM". The element groups are still without element types. In line "Z1" there are, from left to right, the title of the library window "ELEMENT-TYPES", the automatically generated entry of the RTI, from which the request came, in the example that is the RTI "2.1.1.3_ABAAC", version of creation and date of the library window "Vers:/ Date:" are entered manually, the button function library "FCT-LIB", the buttons "DELETE" for deleting the entries, "UNDO" for cancelling input "REDO" for repeating input and "CLOSE" for closing the library window. In line "Z2" there are the columns "ELEMENT", "NOTATION" of the element, "COMMENT", "PRODUCER/TECHNOLOGY-TYPE" and "MODEL/LANGUAGES".

Figure 102:
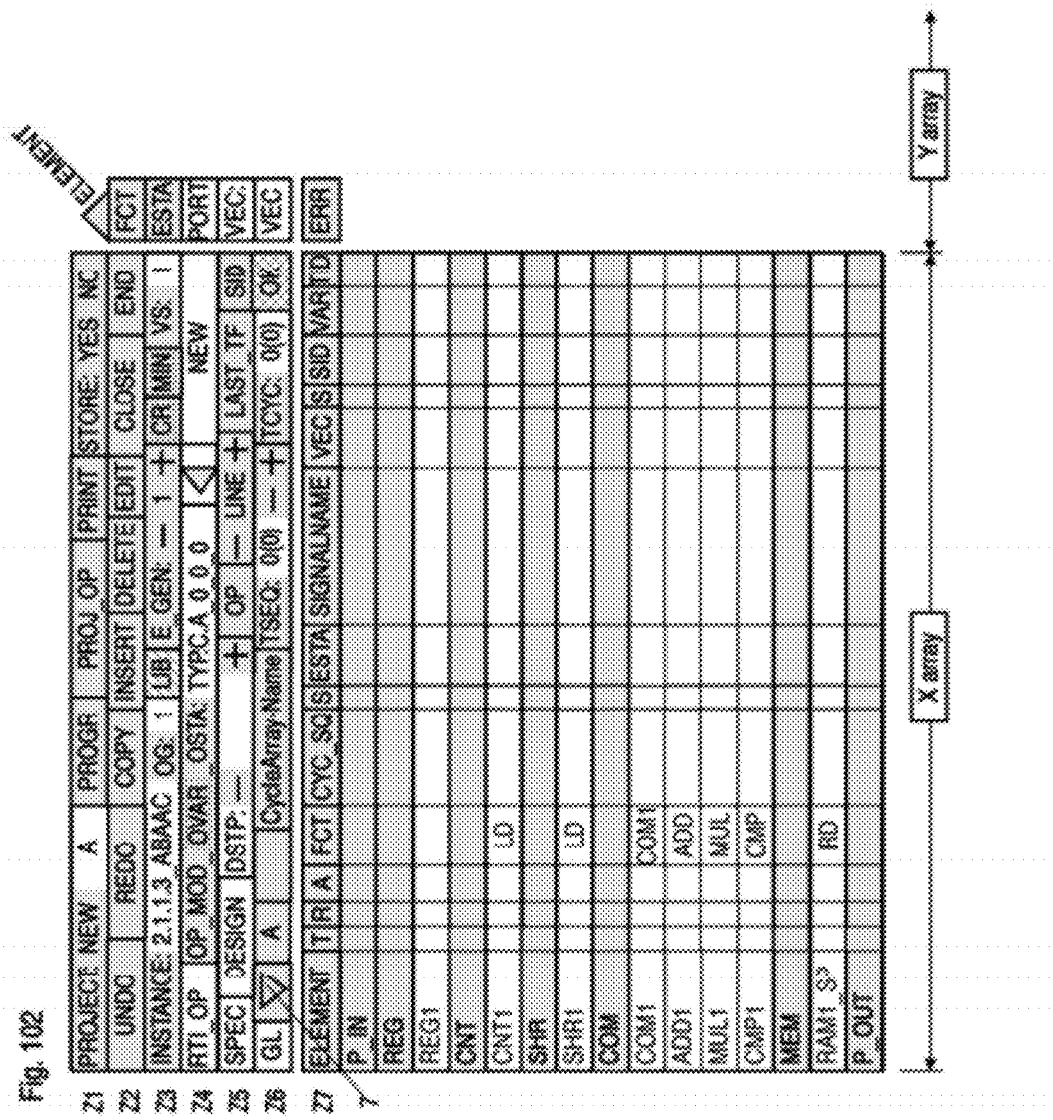

By clicking the button "FCT-LIB" the function library is opened, not illustrated, in which the element types needed for the RTI-OP specifications are available. After selection of the element types for the instance "ABAAC" and closing of the function library, the changing to the library window is done automatically with the exemplary element types shown in FIG. 100*b*. The element types are stored as models in a certain language, for example, "VHDL", "System-C" etc. The element type "COM" (standard) can be used functionally free in the RTI-OP specification and therefore still has no function description. The element type "COM" (standard) can be described functionally during or after the RTI-OP specification, after the switching to the function library. The element types "LOG_0", "LOG_1" and "LOG_X" represent transmitter with static, logical signals, which can be allocated to element inputs. For minimizing the element types in the function library, the number of the inputs and outputs of an element type is defined during RTI-OP specification. The elements in the library window for the RTI-OP-BS are selected by clicking in column "ELEMENT" of the selected element line. Hereby the selected elements are indicated by marking, as FIG. 101*a* shows. The selected element types are "REG", "CNT" (standard), "SHR" (standard), "COM" (standard), "ADD", "MUL", "CMP" and "RAM_SP" (standard). By clicking the marked button in column "ELEMENT" the mark is deleted and the element selection is deactivated. By double-clicking in column "ELEMENT" a complete element line is marked and can be deleted by clicking the button "DELETE" in "Z1". By clicking the button "CLOSE" in "Z1" the library window is closed and the selected element types are transferred to the group level of RTI-OP-BS, as shown in FIG. 102.

If, for example, the function description for a COM standard element should be generated, in the example it is "COM1", then this is done in the function library. The changing from RTI-OP-BS to the function library is done in the example by double-clicking on COM1 line in column "FCT". After the description of the function of "COM1" the element gets a modified name, for example "COM1_F", "F" stands for function and is transferred to RTI-OP-BS by closing the function library. There, "COM1_F" replaces the COM standard name "COM1". The elements of each type in RTI-OP-BS, FIG. 102, are numbered, therefore a "1" is placed adjacent to each element name, which was transferred from the library window, FIG. 101*a*, to the group level of RTI-OP-BS. Furthermore, in the group level standard exemplary function presetting is automatically entered in column "FCT" as: "CNT1", load "LD", shift register "SHR1" load "LD", "ADD1" addition "ADD", "MUL1 multiplication "MUL", "CMP1" compare "CMP" and "RAM1_SP" read "RD".

When returning to the library window by clicking the button "LIB" in "Z3", FIG. 101*b*, the element types, which were earlier selected and transferred to the group level, are illustrated as activated, for example hatched, and additional element types for the group level can be selected or/and deactivated. Element types, which are already used with the RTI operation specification, cannot be deactivated in the library window.

Figure 103:
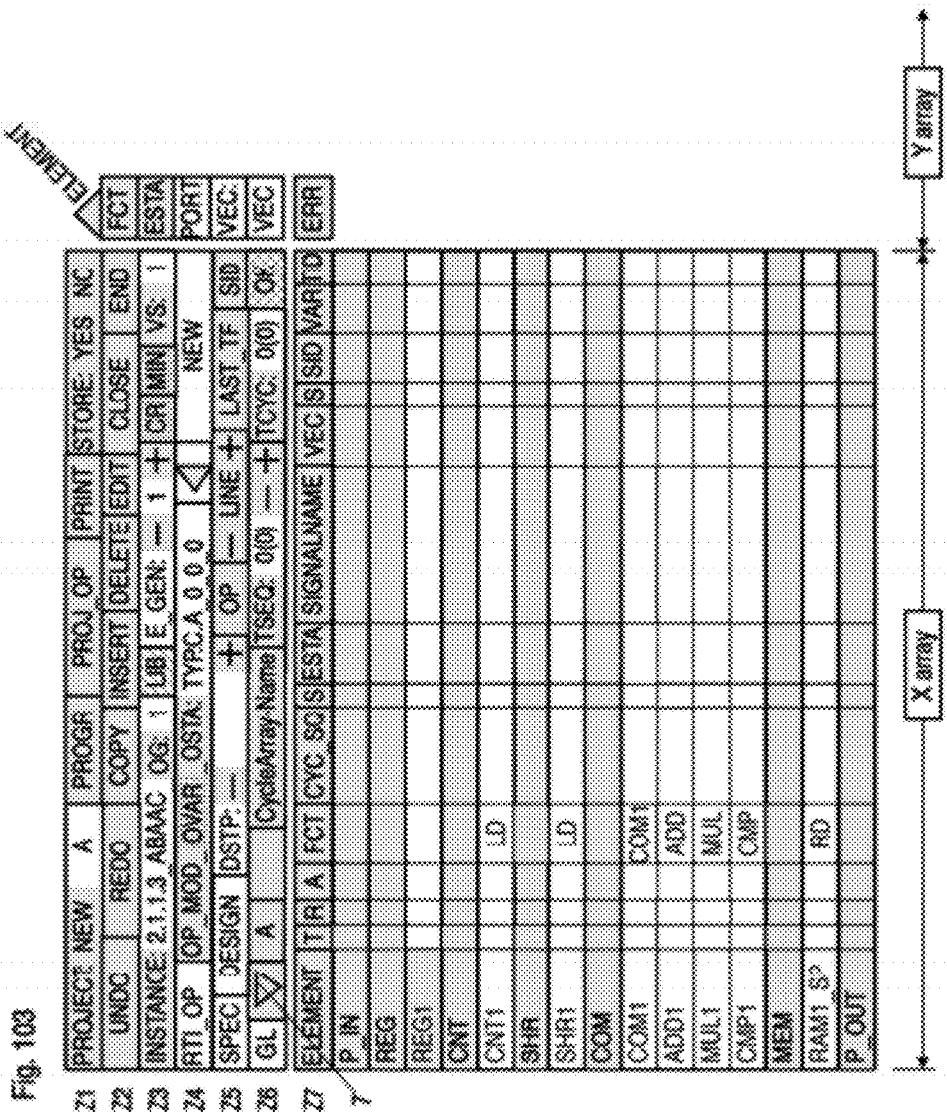

In the group level for each element type any number of elements can be generated. For that the button of the designated element type, for example "REG1", is activated and marked by clicking and additionally the button "E_GEN:" in Z3 is activated by clicking, as FIG. 103 shows.

Figure 104:
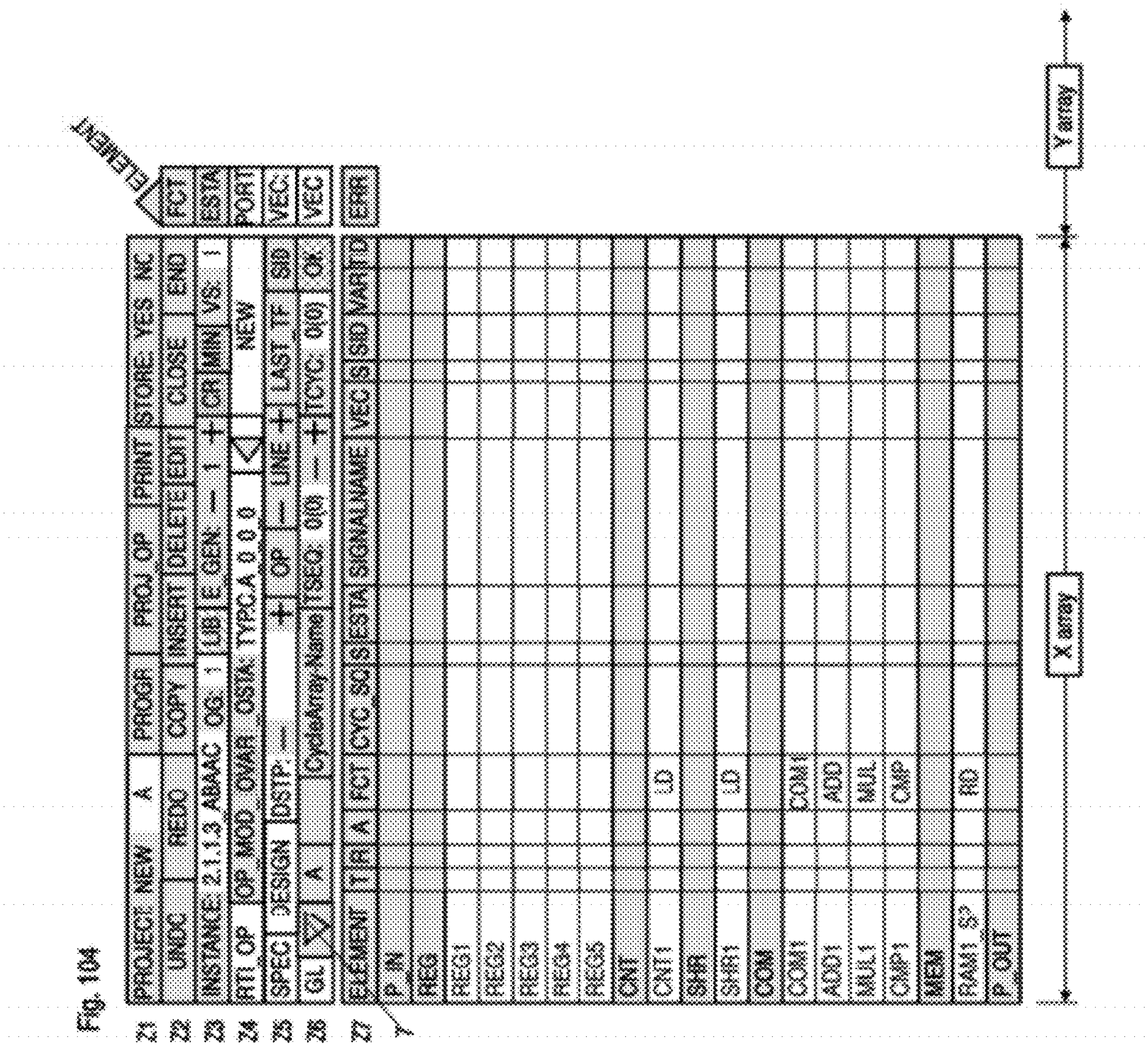

The number "1" adjacent to the button "E_GEN:" indicates, that one element of the element type "REG" is present. If instead of "1" a "5" is entered, or by four clicks on button "+", the number of REGs is increased from "1" to "5" and acknowledged by clicking "OK" in Z6, then four additional registers REG2 to REG5 are entered in the element group "REG", as shown in FIG. 104. Thereby the button "E_GEN" in "Z3" is deactivated.

Figure 105:
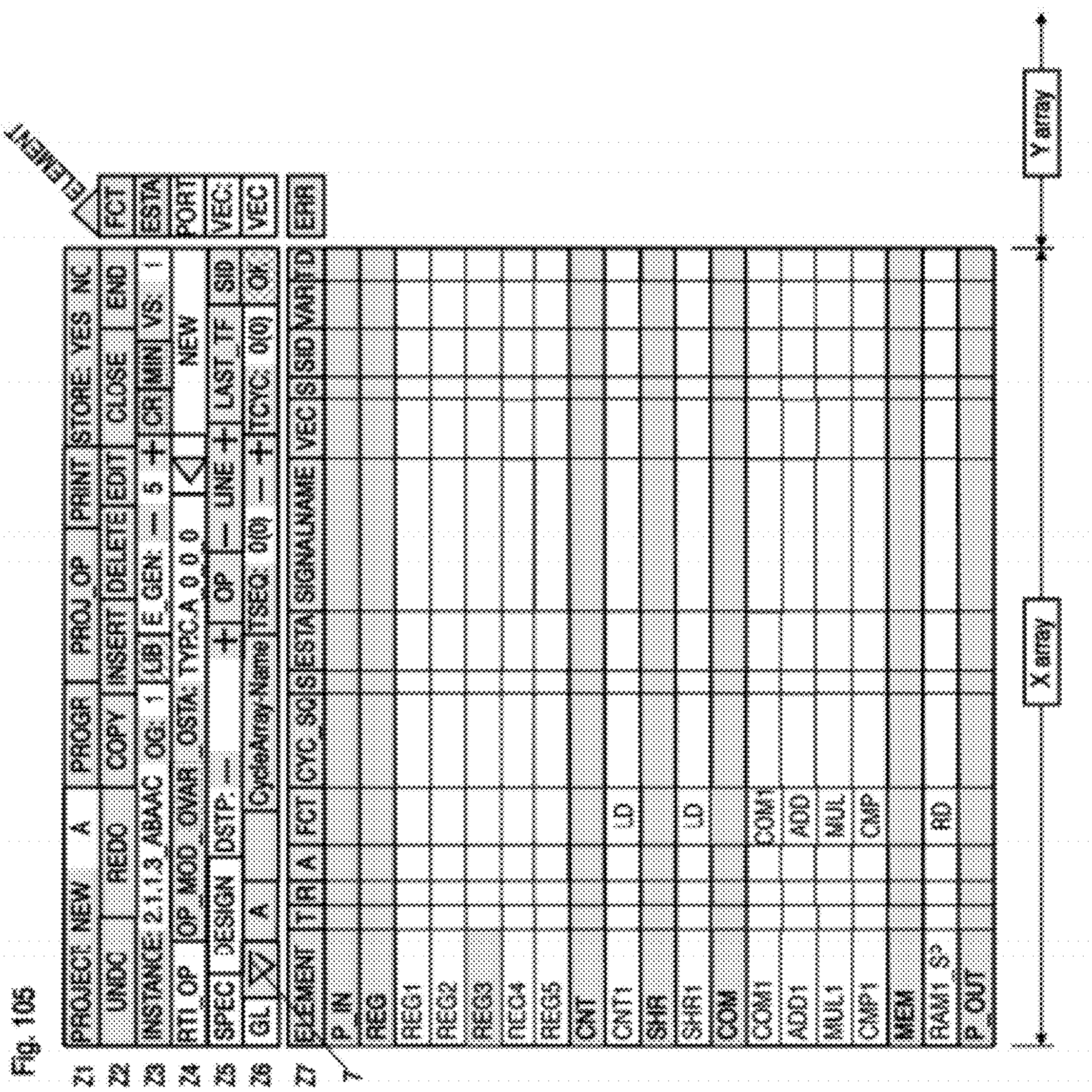

If the button "E_GEN:" and an arbitrary button REG element is activated again by clicks as shown in FIG. 105, then for the button "E_GEN" the number of REG elements is indicated as "5" and the number of REG elements can be increased by clicking "+" or decreased by clicking "–". The decreasing of the number of elements is effected continuously from the highest number to lower numbers. The usage of elements for the specification in design level "DL", as shown successively, always begins with the element digit "1" and is continued in increasing order. Elements, which were used in the specification, cannot be deleted in the group level. The element generation "E_GEN" for arbitrary element groups or element types is identical to the generation of "REG", as described before.

If one or several RTI external components for an RTI operation specification are needed, as described in FIG. 79, then these are transferred from the function library to the group level "GL" of the RTI-OP-BS. For example, instead of, or additional to "RAM1_SP", FIG. 105, the memory "MEM1", FIG. 79 could be transferred as "MEM1_ex" into the group level "GL" of RTI-OP-BS. For the usage of a component outside of an RTI it is assumed, that the function description and the connection parameters are stored in the function library or in SPV, respectively.

Figure 106:
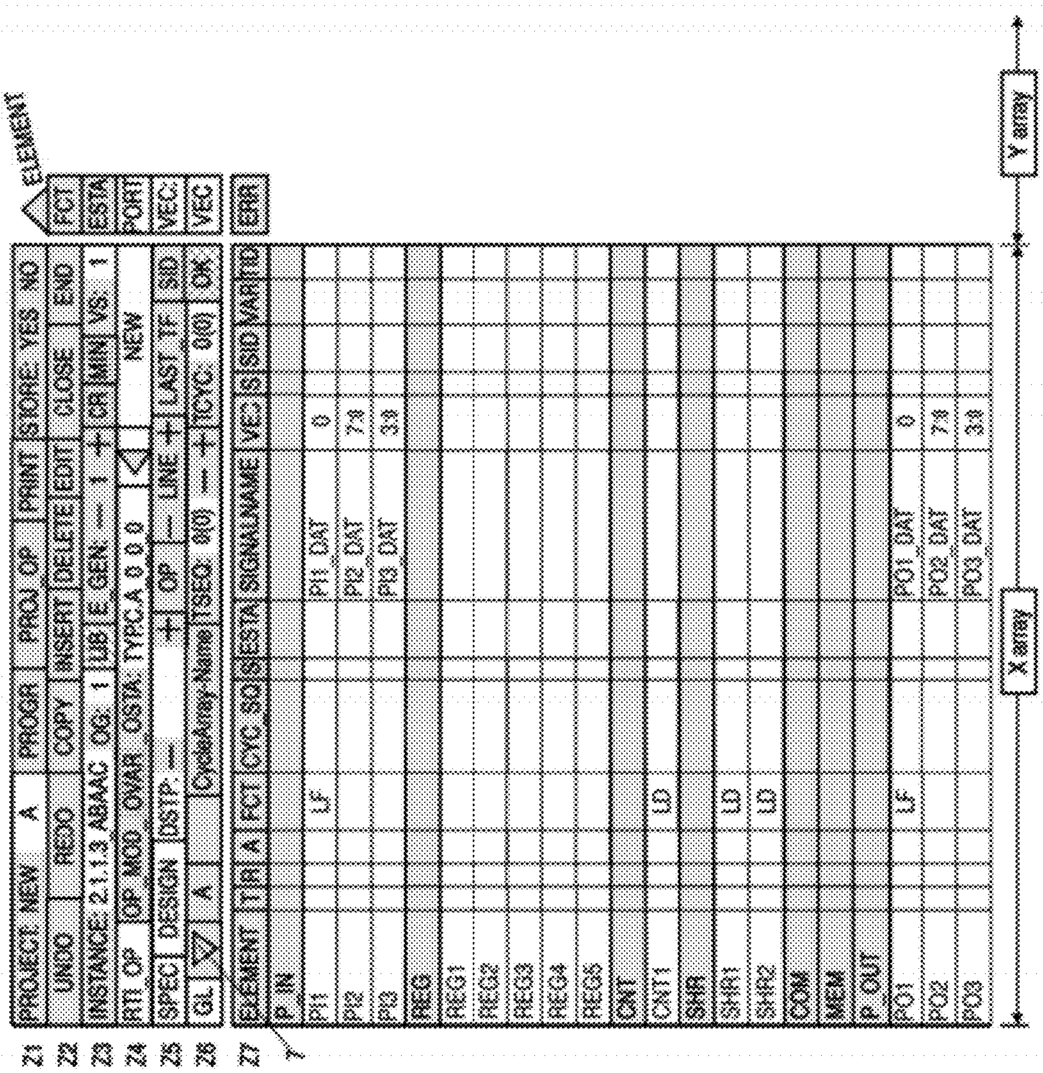

By one click on each marked lines in the element groups "COM" and "MEM" these element groups were closed and with one click on each marked line of the element groups "P_IN" and "P_OUT" these element groups are opened, as shown in FIG. 106. Generally applies for open and close of element groups: A closed element group is opened by clicking at any position in its marked line, and is closed again with a subsequent click. For the one-bit-vector signals "PI1" and "PO1", for example, the default function "LF" (least bit first) was chosen, as it will be explained in connection later.

Figure 107:
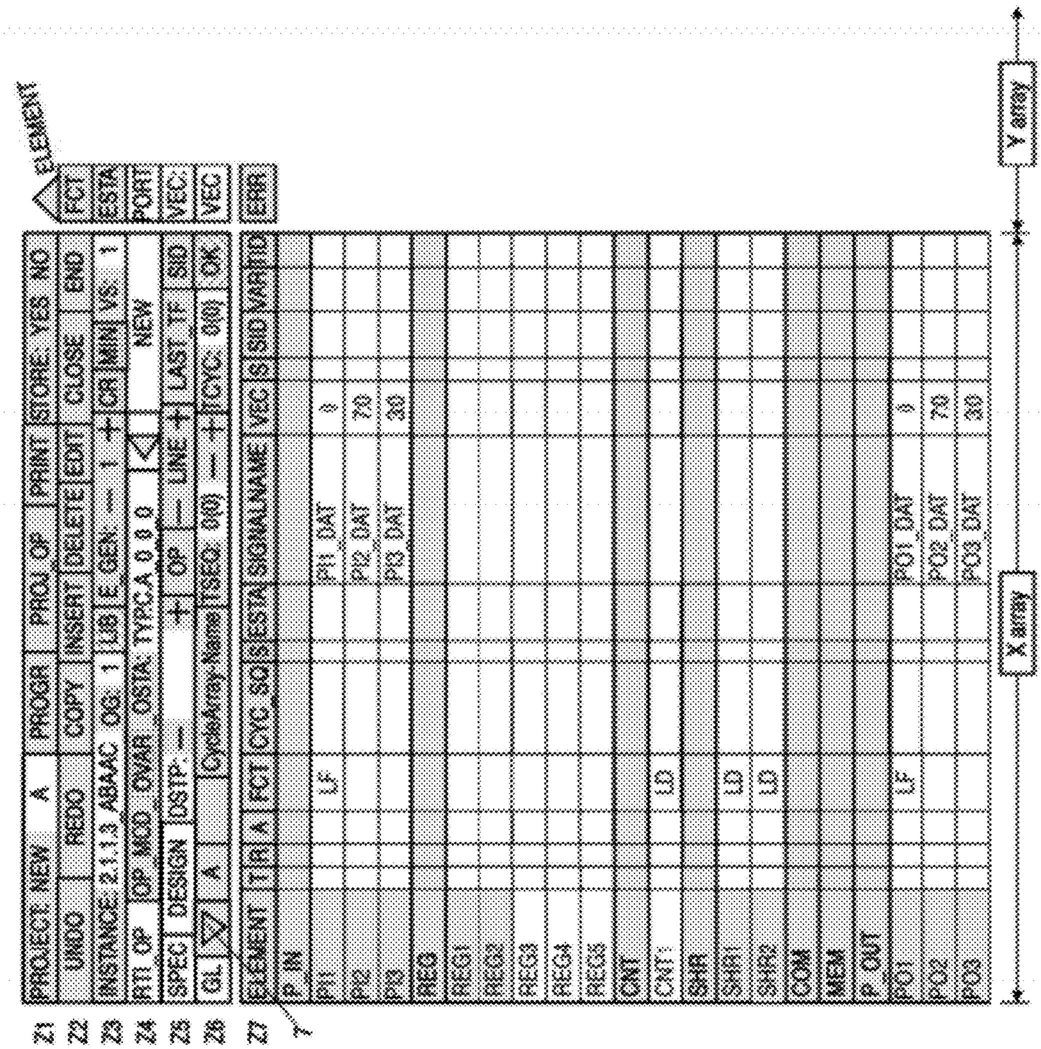

In FIG. 107, the elements marked by clicks in the column "ELEMENT", were selected for the design level. By clicking the button "GL" in Z6 the switching to the design level with the indication "DL" is effected and the elements selected in the group level "GL" are transferred to the design level "DL" and are indicated in the "element array", as FIG. 108 shows.

In "DL" the RTI operation is specified. Until now no design step was executed, therefore in line "Z5" the design step indicator is in its start position with "DSTP:B0(0)". "B" stands for begin. With opening of the design level the still missing entries are indicated by question marks "?". The RTI input ports "PI1", "PI2", "PI3" and the RTI output ports "PO1", "PO2", "PO3" hold already, because of the preceding SPV process "CONNECT", their static signal names and vectors. Before beginning of the RTI operation specification all elements hold the cycle "CYC=0" in column "CYC_SQ", as well as the element state "ESTA=0" in the column "ESTA". The output ports "PO1", "PO2", "PO3" still hold no "ESTA", as explained before, because this is not defined until the first data reception and therefore can be "ESTA=0". In column function "FCT" the entry for the elements occurs automatically by default and is adopted by "GL".

Figure 108:
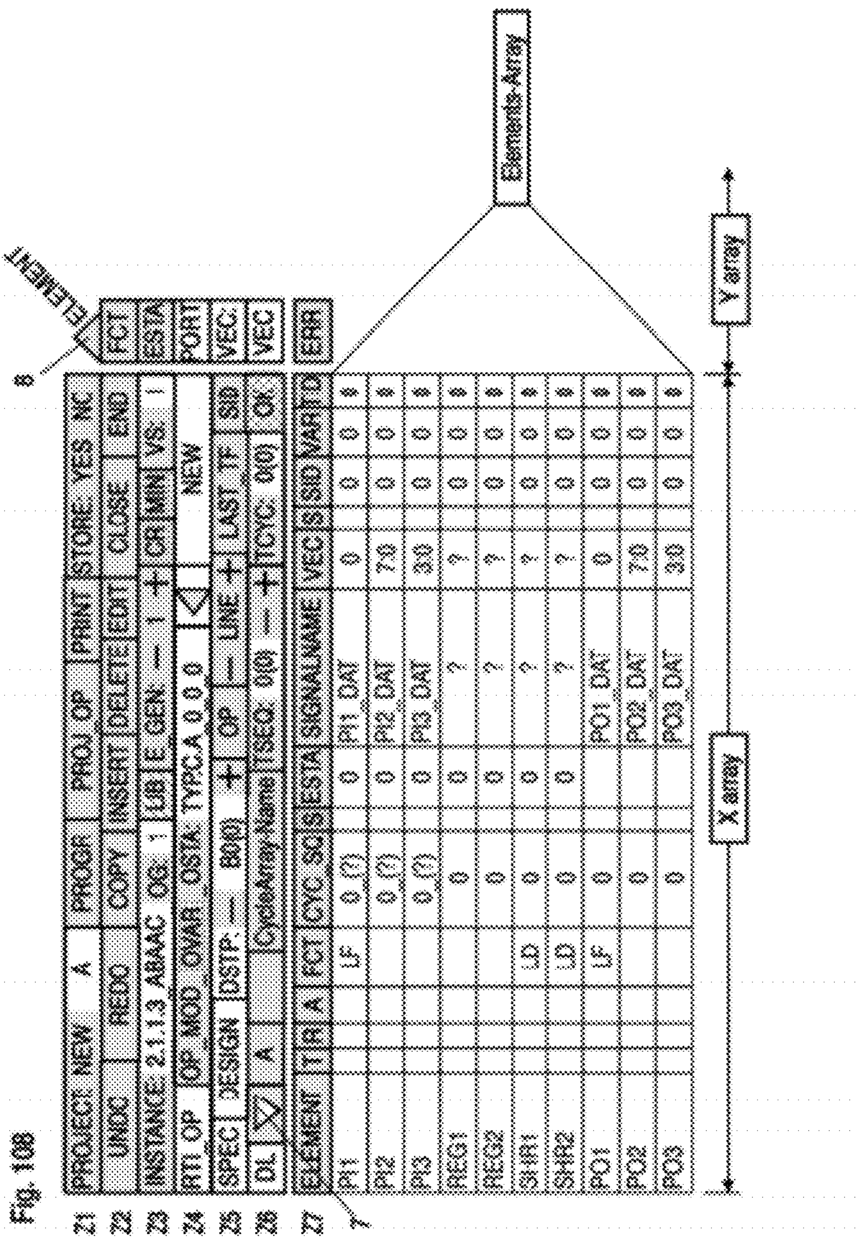

As FIG. 108 shows, the FCT defaults for the 1bit ports "PI1" and "PO1" are entered for a streaming begin with the least significant bit, least first "LF". Ports with more than one bit get the FCT default "No Entry". FCT defaults are defined, for example, for shift register "SHR" and counter "CNT" with load "LD", for memories "MEM", for example for a "RAM", with read "RD". Registers "REG" have only the function load "LD", therefore no entry occurs in column "FCT". The manual switching of functions of the elements in column "FCT" is generally effected in a round robin manner by clicking on the corresponding buttons, for input and output-ports with "LF", "MF", "No Entry", "LF", etc., for shift register with "LD", "LF", "MF", "LD", etc., for counter with "LD", "CU", "CD", "LD", etc., for RAMs with "RD", "WR", "RD", etc. If one or several elements in an element group, for example in the element group "MEM", contain other or/and additional functions, then the corresponding FCT defaults are to be specified in the function library. The element lines, which are illustrated in the "X array" of the design level "DL", FIG. 108, represent exclusively element output signals. In the Y array the RTI-OP-BS has a vertical ELEMENT column 8, whose line layout is explained in the context of the RTI operation specification.

Figure 109:
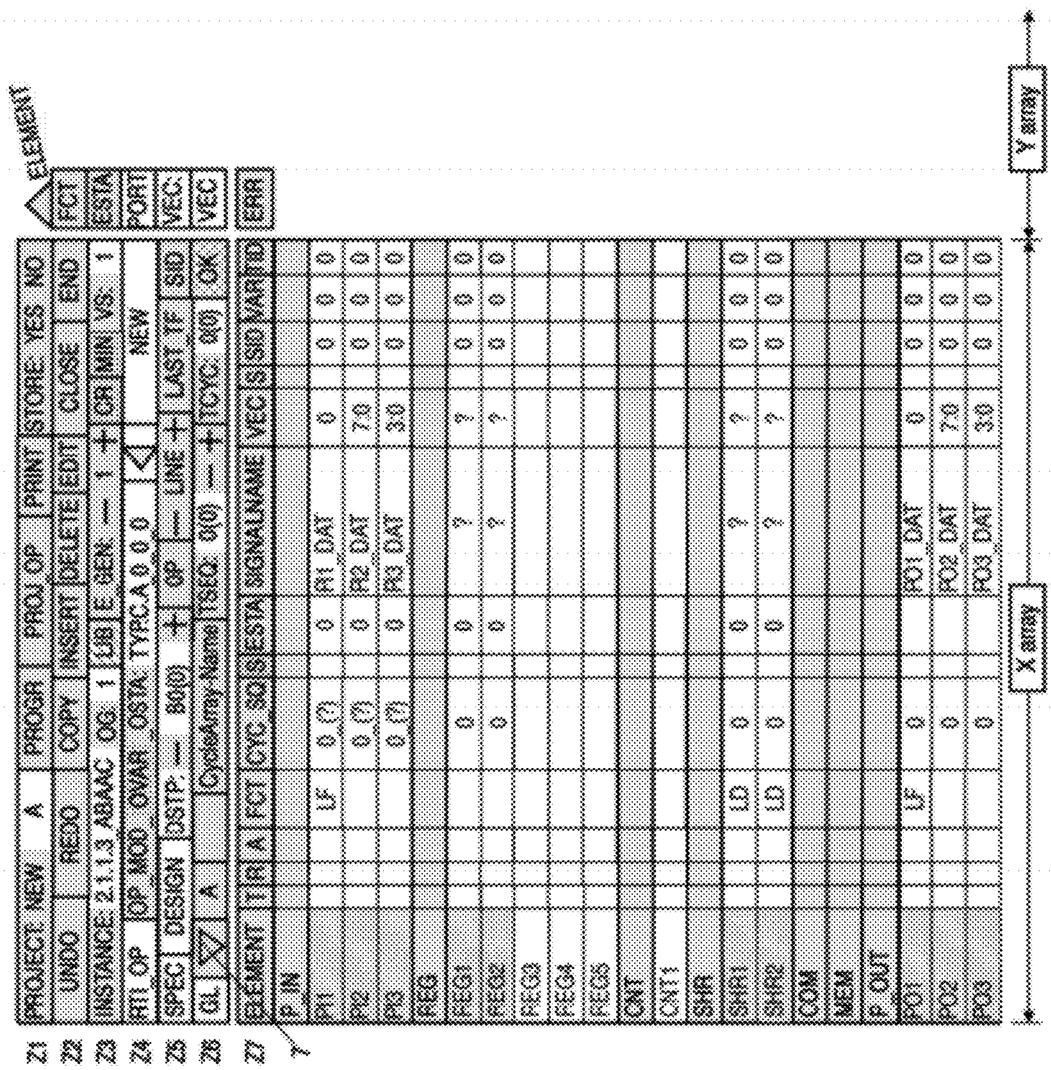

In FIG. 108 by clicking the button "DL" in "Z6" the switching into the group level "GL" is effectuated, as FIG. 109 shows. In the "GL" all elements, which are configured in the design level "DL", are indicated, for example, as hatched. In the "GL" additional, new selected elements are, in contrast to the already in "DL" existing hatched elements, marked all over. Furthermore the entries of the element lines in "DL" are mapped identically in "GL".

Figure 110:
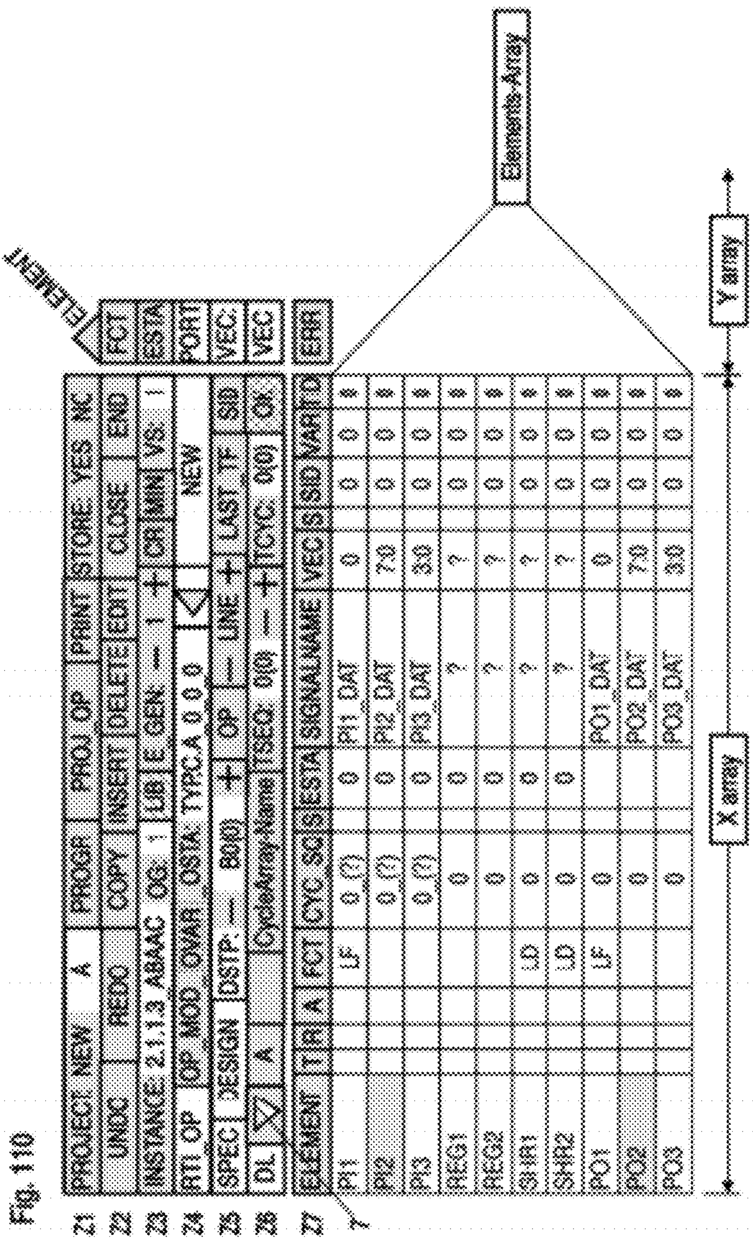
Figure 111:
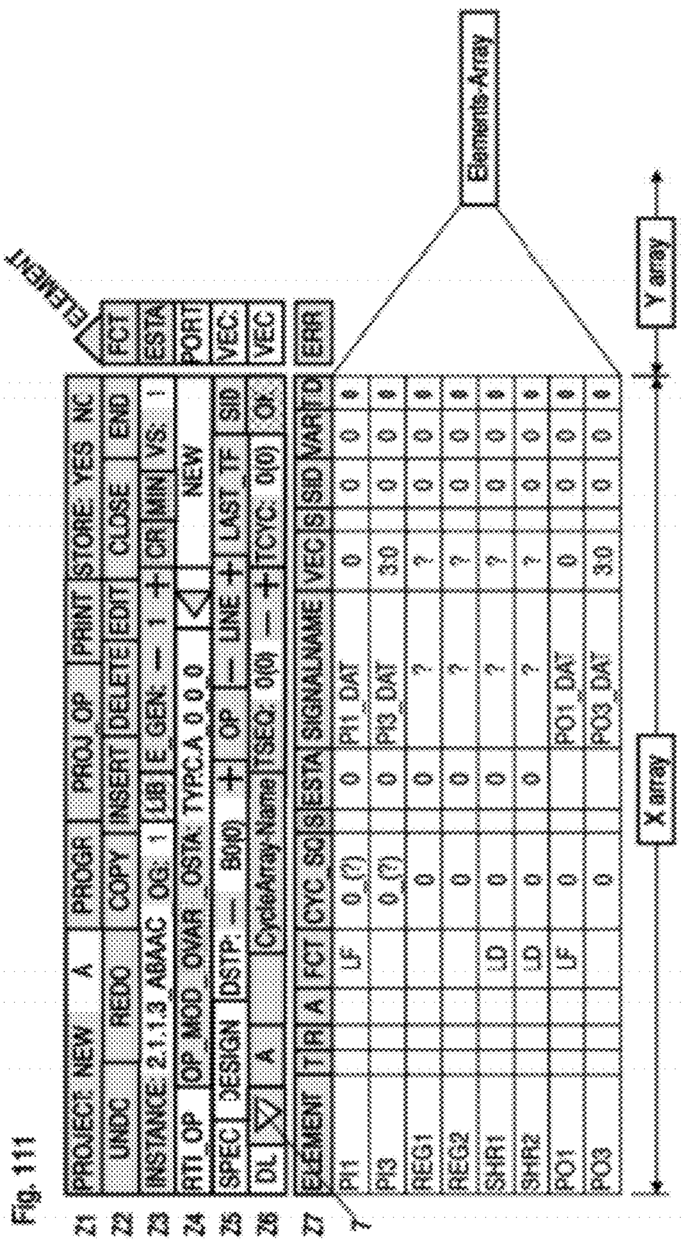
Figure 112:
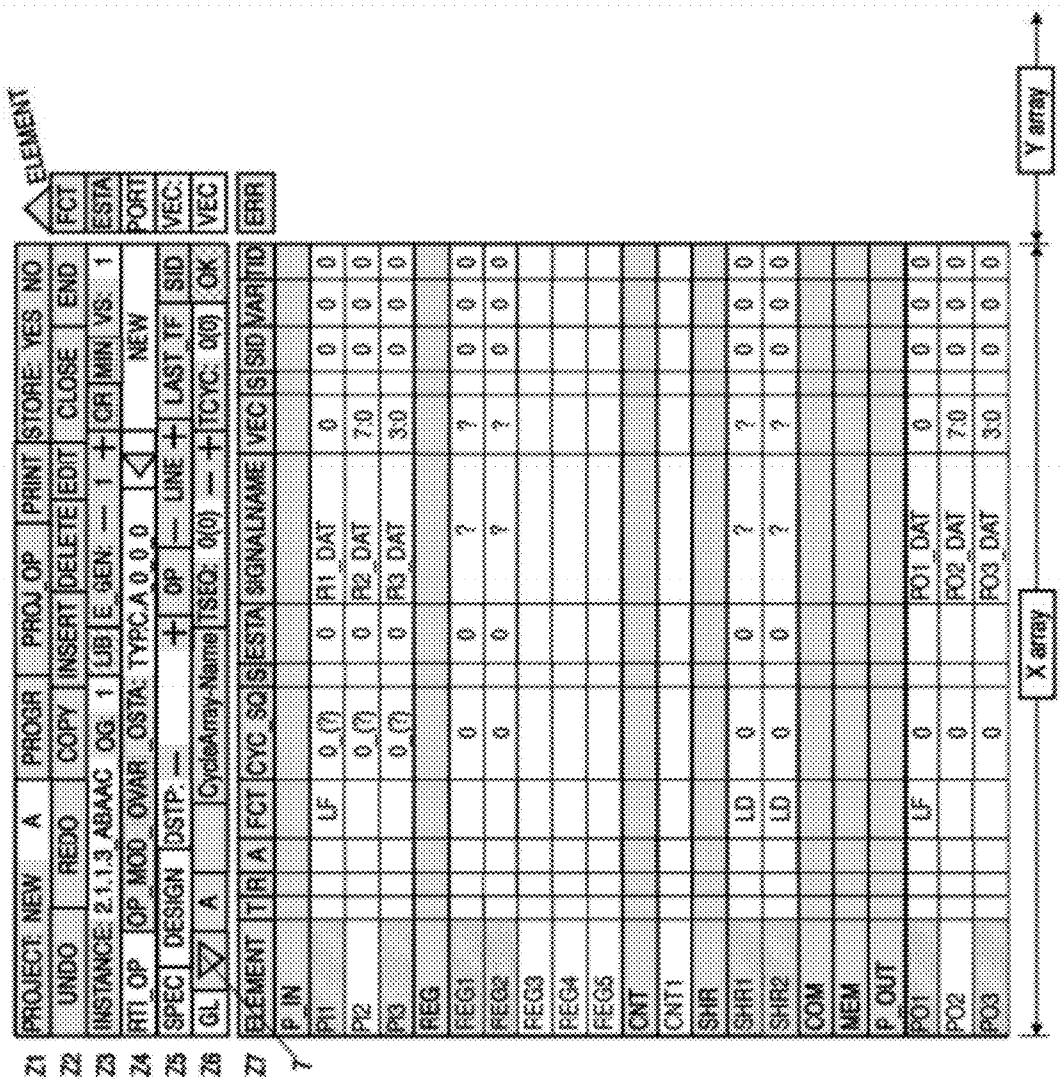

After switching to the "DL", FIG. 110, in the column "ELEMENT" the elements "PI2" and "PO2" are marked by clicks. By clicking the button of the arrow "7", the marked elements "PI2" and "PO2" are removed from the design level "DL" as shown in FIG. 111. After a new switching to the group level "GL", FIG. 112, "PI2" and "PO2" are not hatched and indicate with this, that they are no more in the design level "DL".

Figure 113:
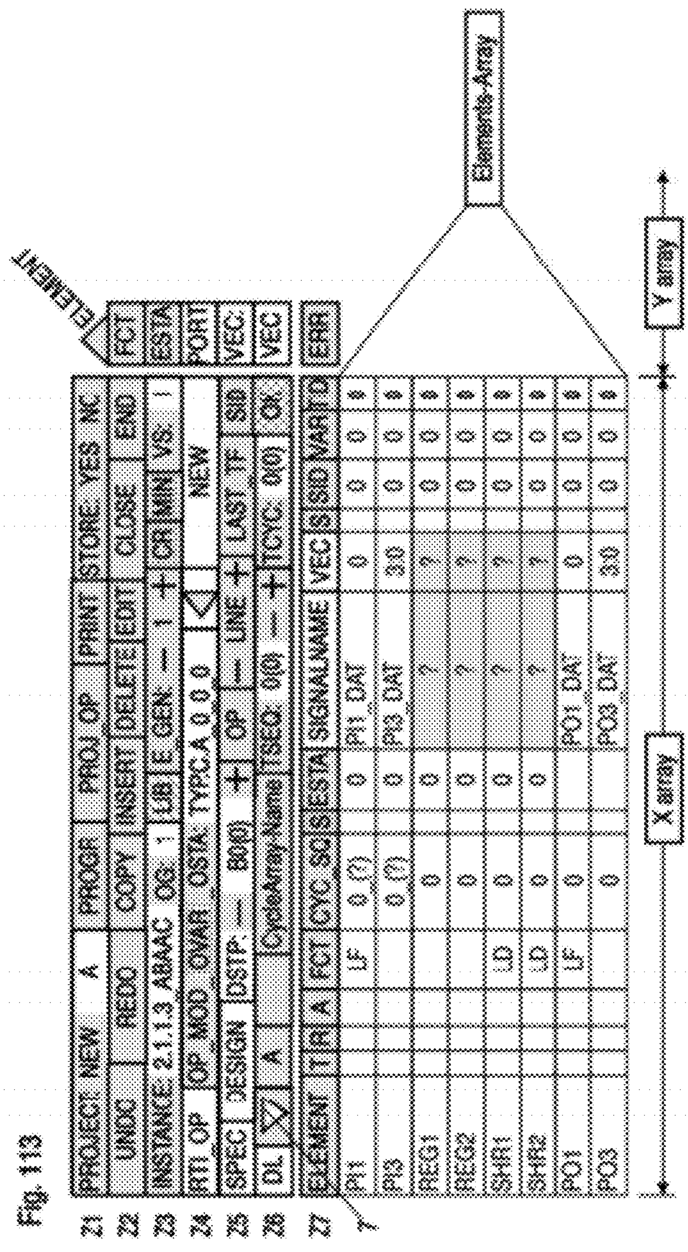
Figure 114:
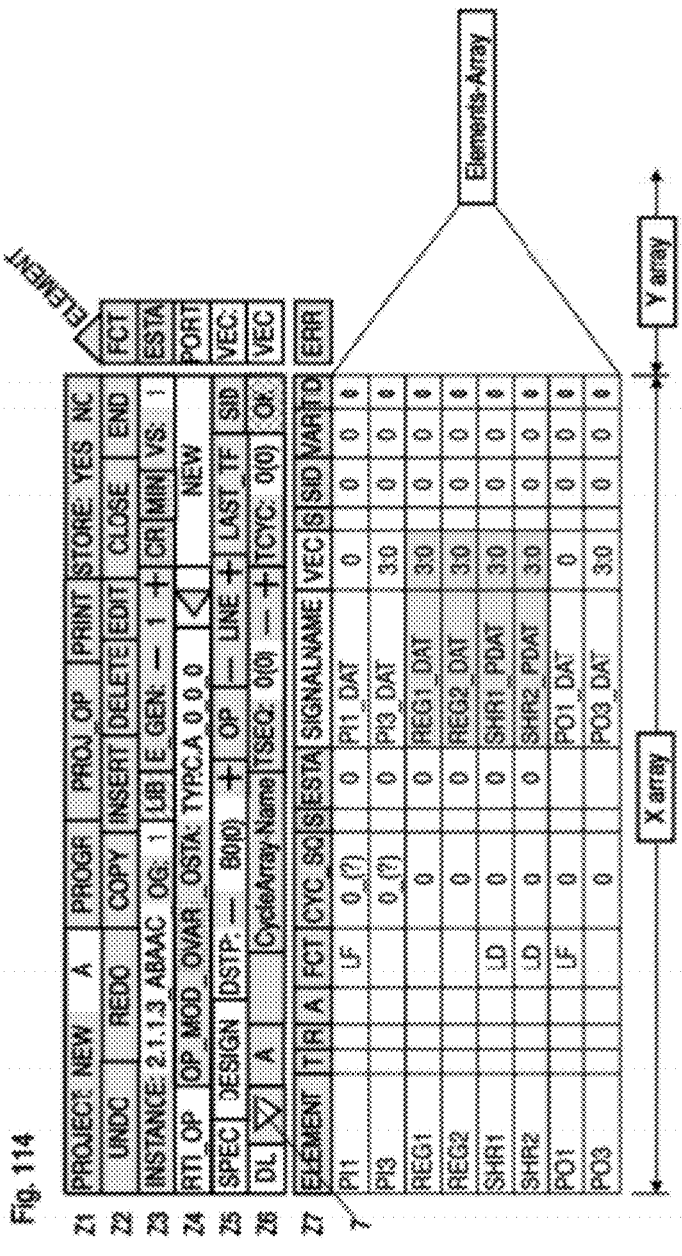
Figure 115:
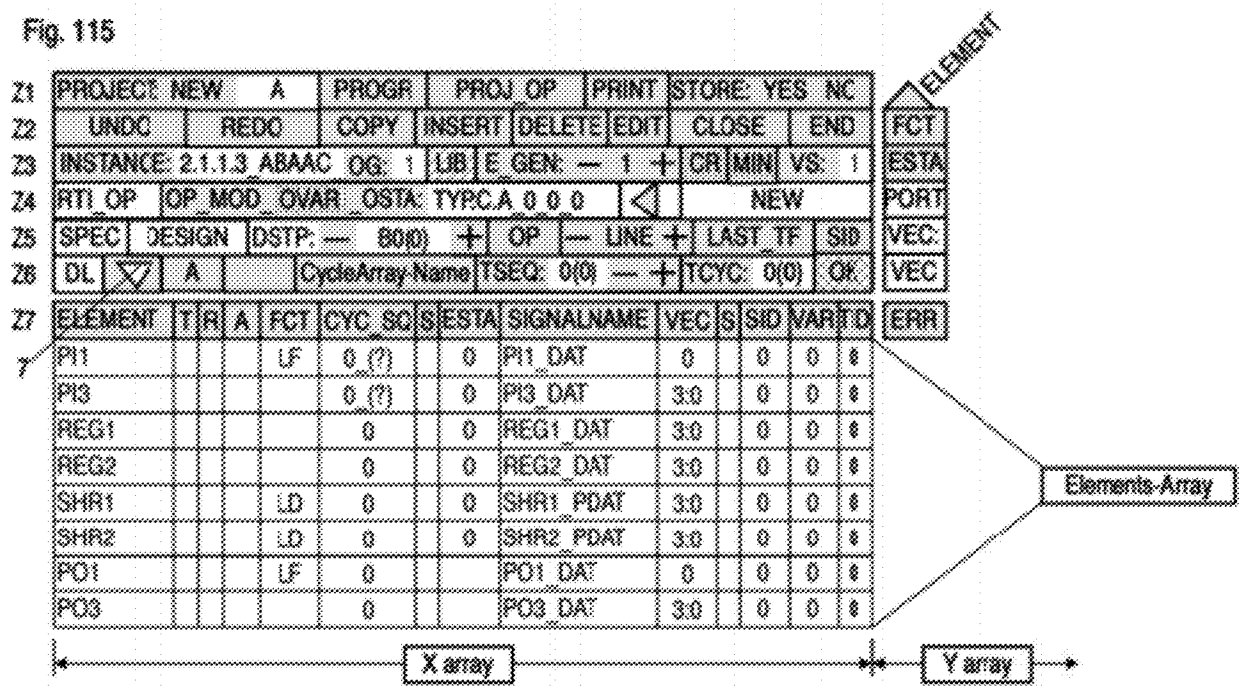

For an entry of static output signal names with vector at the location of the "?" in FIG. 111, by clicking the button "SIGNALNAME" or "VEC" both buttons in line "Z7" are activated and the element lines with "?" in the columns "SIGNALNAME" and "VEC" are prepared for entries by marking, as shown in FIG. 113. FIG. 114 shows exemplary entries in column "SIGNALNAME" and "VEC". By clicking the button "OK", "Z6", the buttons in "Z7" "SIGNALNAME" and "VEC" are deactivated and the marks are deleted in columns "SIGNALNAME" and "VEC", as shown in FIG. 115.

If subsequent signal names or/and vectors are modified, then this is done by a renewed activating of the buttons "SIGNALNAME" or/and "VEC" in "Z7", and by the activating of the button in the corresponding element line in column "SIGNALNAME" or/and "VEC", in which the modification should occur. Until now, for the "DL" only static signal names, indicated by "SID=0" were entered. The static signal names are needed only in tools or in compilers, which transform the specification in real elements or in components. For the RTI operation specification only dynamic signal names are used.

Figure 116:
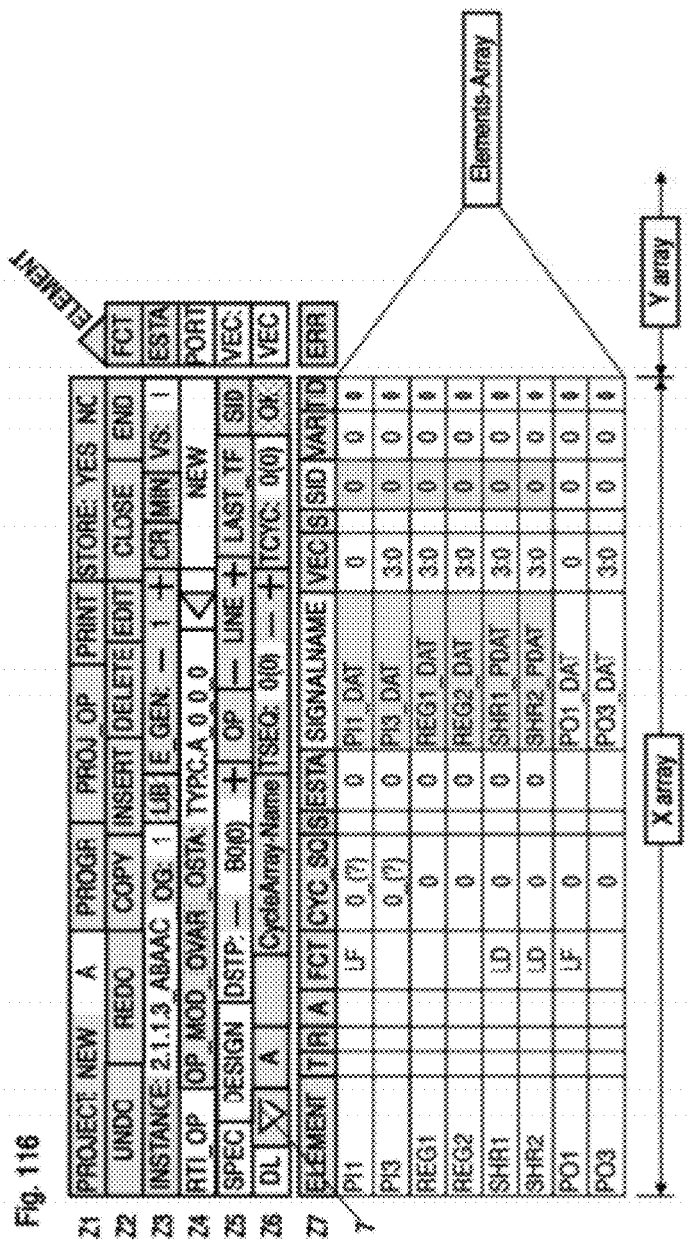

For the definition of dynamic output signal names of elements the button signal identifier "SID" in line "Z7" is activated by a click. With that the button "SIGNALNAME" in "Z7" is automatically activated, too. Subsequently the elements are selected, in which the dynamic output signal names should be entered, by clicking the button in column "SID" of the corresponding element lines. Thereby the selected element lines in column "SID" and additionally in column "SIGNALNAME" are activated and marked as shown in FIG. 116.

Figure 118:
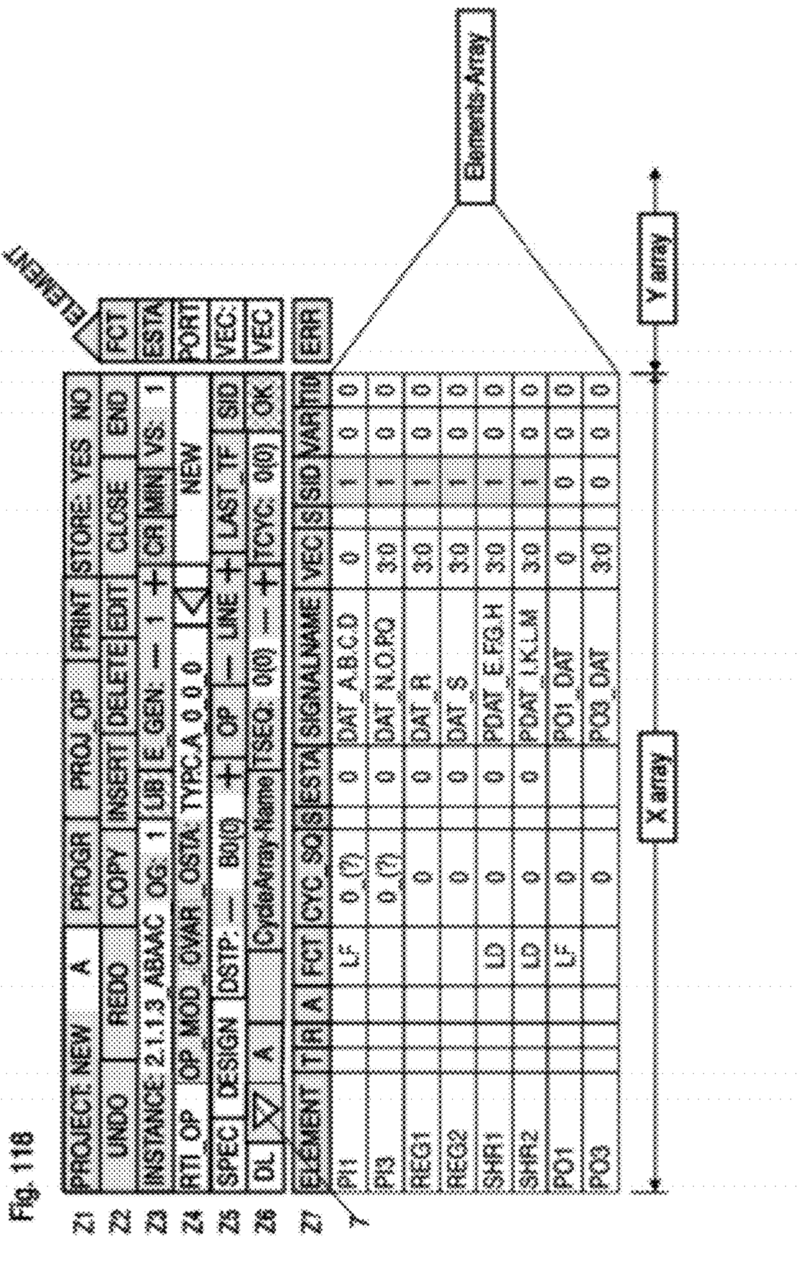

In FIG. 117 exemplary dynamic output signal names were entered in column "SIGNALNAME" into the marked buttons. By clicking the button "OK", "Z6", the entries were acknowledged and the buttons "SIGNALNAME" and "SID" in line "Z7" as well as in column "SIGNALNAME" were deactivated, as FIG. 118 shows. Furthermore the first SID number "SID=1" was automatically allocated by SPV in the activated buttons in column "SID". If thereby a static output signal name is acknowledged with "OK", then this name is also maintained as dynamic output signal name "SID=1". By repetition of this procedure also several, different dynamic output signal names for an element may be specified, for which the SPV allocates the SID numbers 2, 3, etc. If, by accident, an already existing dynamic output signal name is entered and acknowledged with "OK", then automatically the allocation of the SID number of the already existing dynamic output signal name is effectuated. Element outputs with more than one dynamic signal name are normally outputs of a streaming element with a sequence range of at least two streams.

Figure 119:
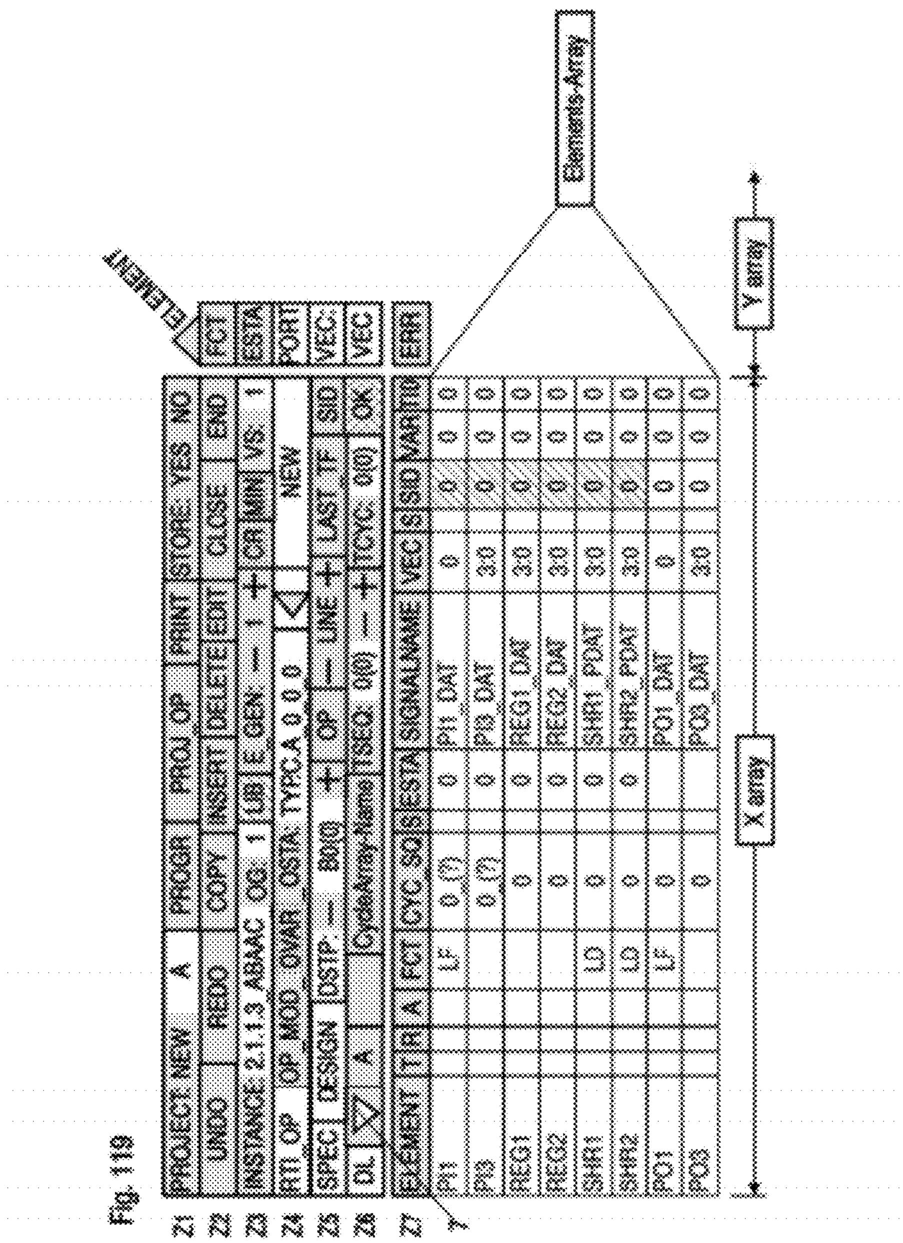
Figure 120:
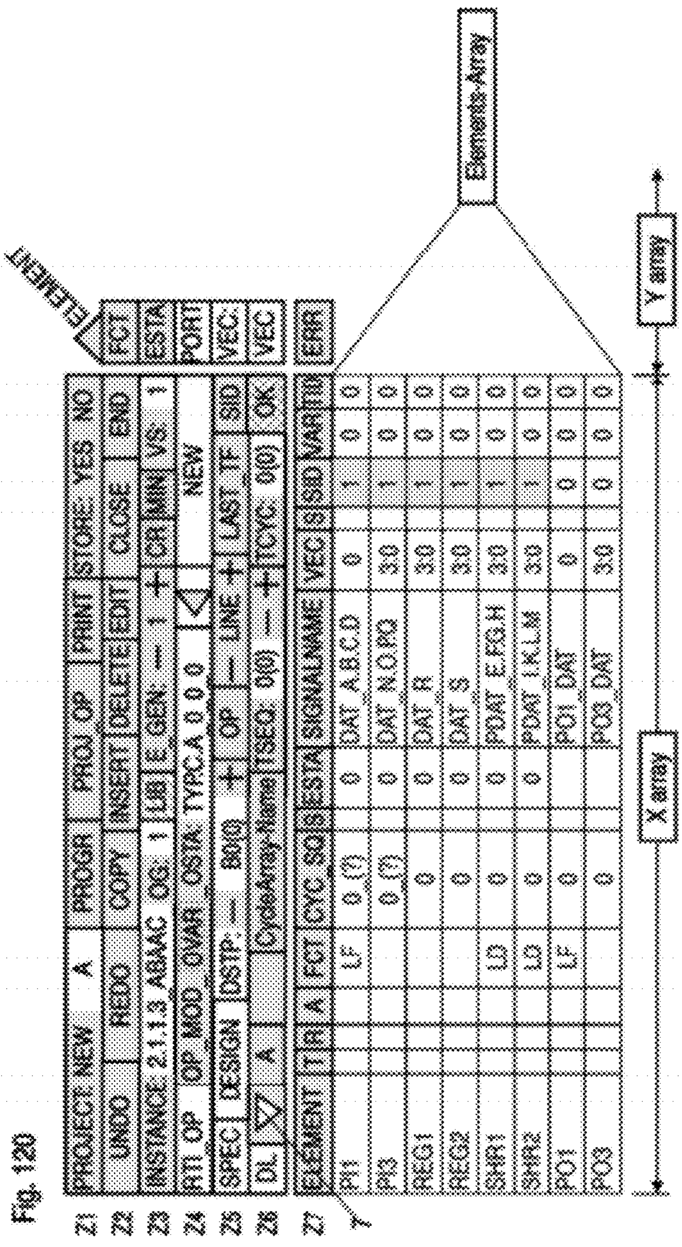

As is shown later with an RTI operation specification, the entry of dynamic signal names is only needed with transmitting elements with "ESTA=0". With transmitting elements with data streaming, dynamic signal names, beginning with "ESTA=0" are entered for the corresponding sequence arrays and sequences. The receiving elements adopt the dynamic signal name of the transmitter. If an element receives data from more than one transmitter, then a dynamic signal name for the receiver output port may be generated manually. If at the location of the dynamic output signal names, FIG. 118, again the static output name should be indicated, then this can be effectuated in column "SID" by one click each at the marked buttons or by two consecutive clicks on the button "SID" in line "Z5", as shown in FIG. 119. With the first click on "SID" in "Z5" "SID" is activated and with the second click it is deactivated again. The hatched buttons in FIG. 119 in column "SID" with SID=0 indicate, that the elements hold at least one dynamic output signal name. The button "SID" in "Z5" is activated by clicking and for all elements the dynamic output signal names are indicated, as FIG. 120 shows. Thereby generally for each element the dynamic output signal name with the highest SID number is indicated. If for an element all dynamic output signal names should be shown, then this can be effectuated consecutively by clicks on an element line in column "SID". Thereby the output signal names are indicated in a round robin mode of SID numbers, for example SID=1, 2, 3, 0, 1 etc. Alternatively all output signal names of one element can be indicated and selected by clicking the element line in column "SID", in a so-called "SID window" (not illustrated).

Figure 121:
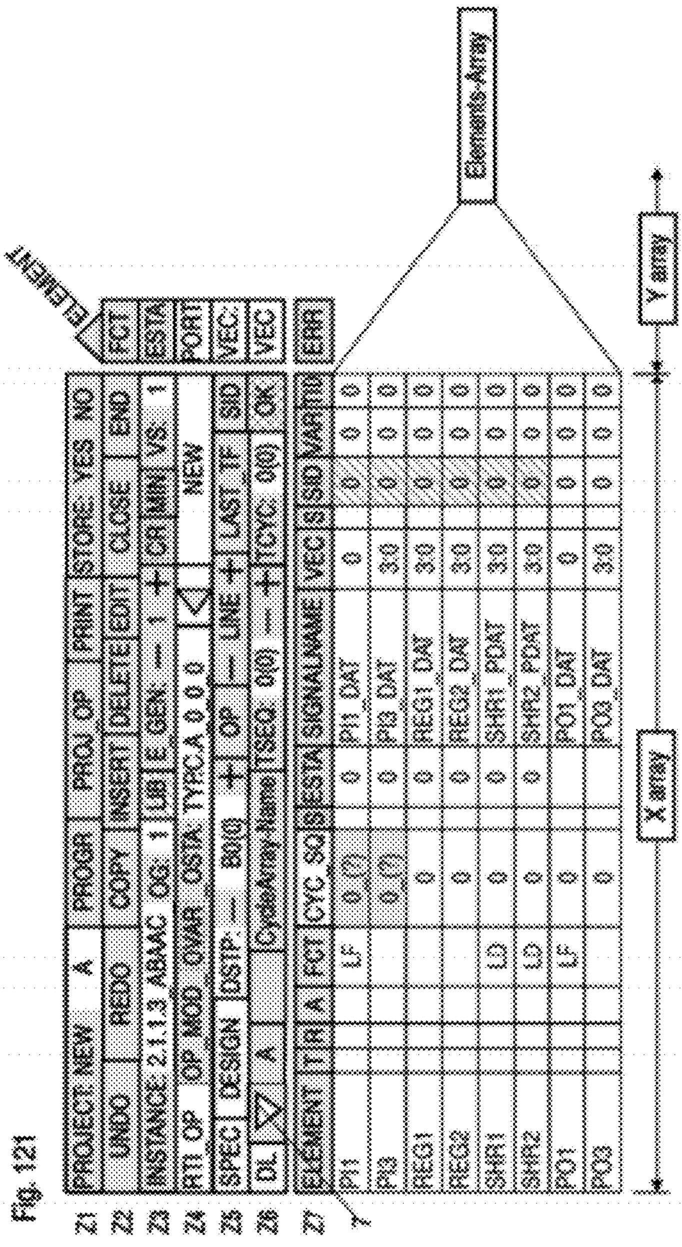

In the column "CYC_SQ" the question mark between brackets "(?)" indicates, that for PI1 and PI3 the maximum data streaming sequence was not defined yet. Preparing for an entry of the maximum data streaming sequence at the position of the "?", FIG. 120, "CYC_SQ" in line "Z7" is activated by clicking and thus in column "CYC_SQ" the buttons for "PI1" and "PI3" are prepared for writing by automatic marking, as shown in FIG. 121. Furthermore in FIG. 121 the button "SID" in line "Z5" was deactivated by clicking and therefore the display in column "SID" was changed.

Figure 122:
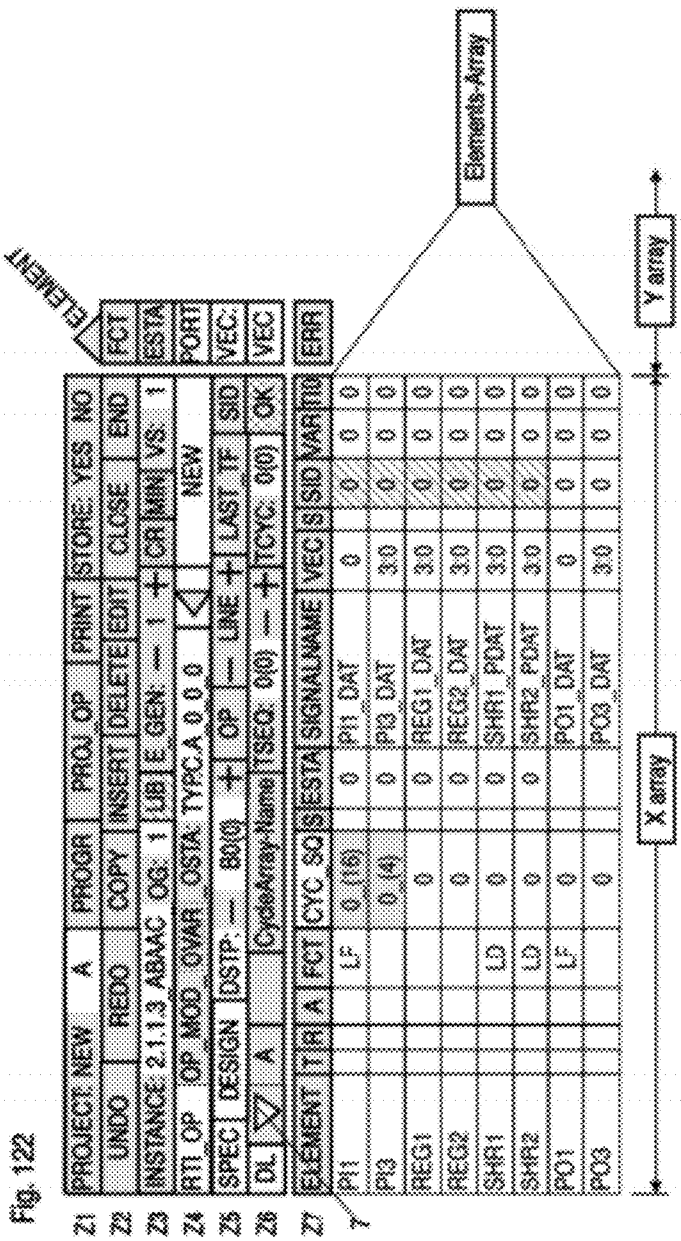
Figure 123:
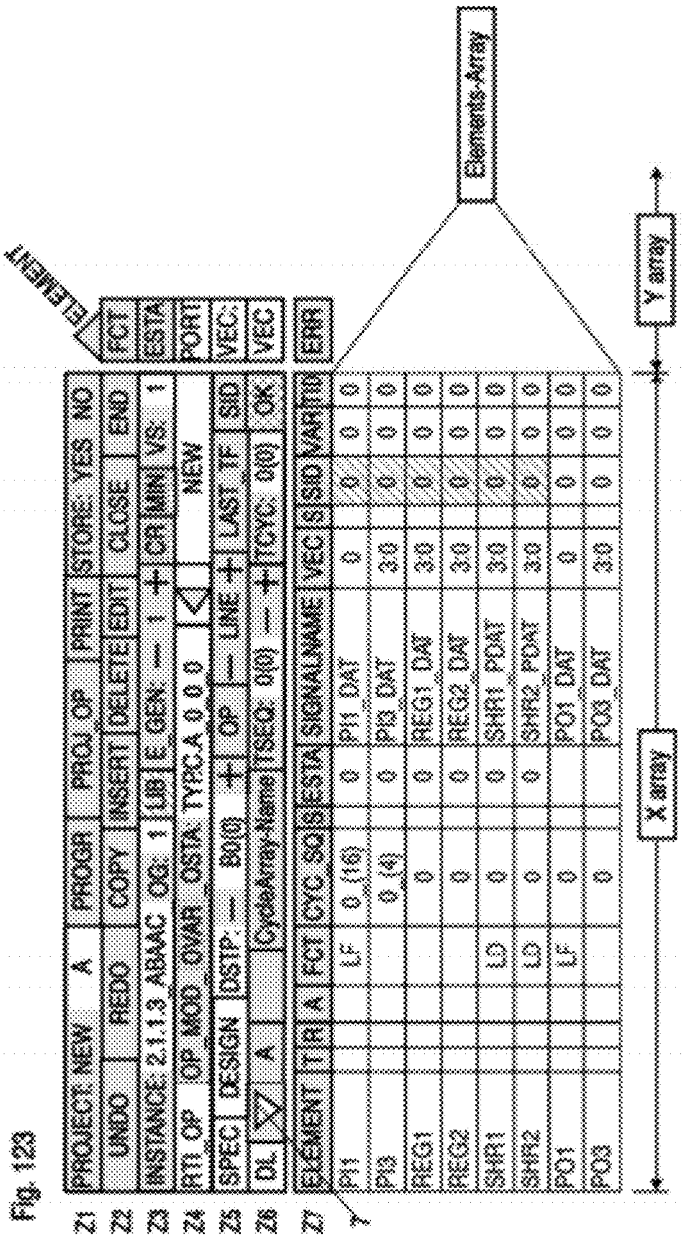

FIG. 122 shows the entries of the maximum data streaming sequences for "PI1" and "PI3". With acknowledging of these entries by clicking the button "OK" in "Z6" the buttons "CYC_SQ" in "Z7" and the buttons "PI1", "PI3" in column "CYC_SQ" are deactivated, as shown in FIG. 123.

Figure 124:
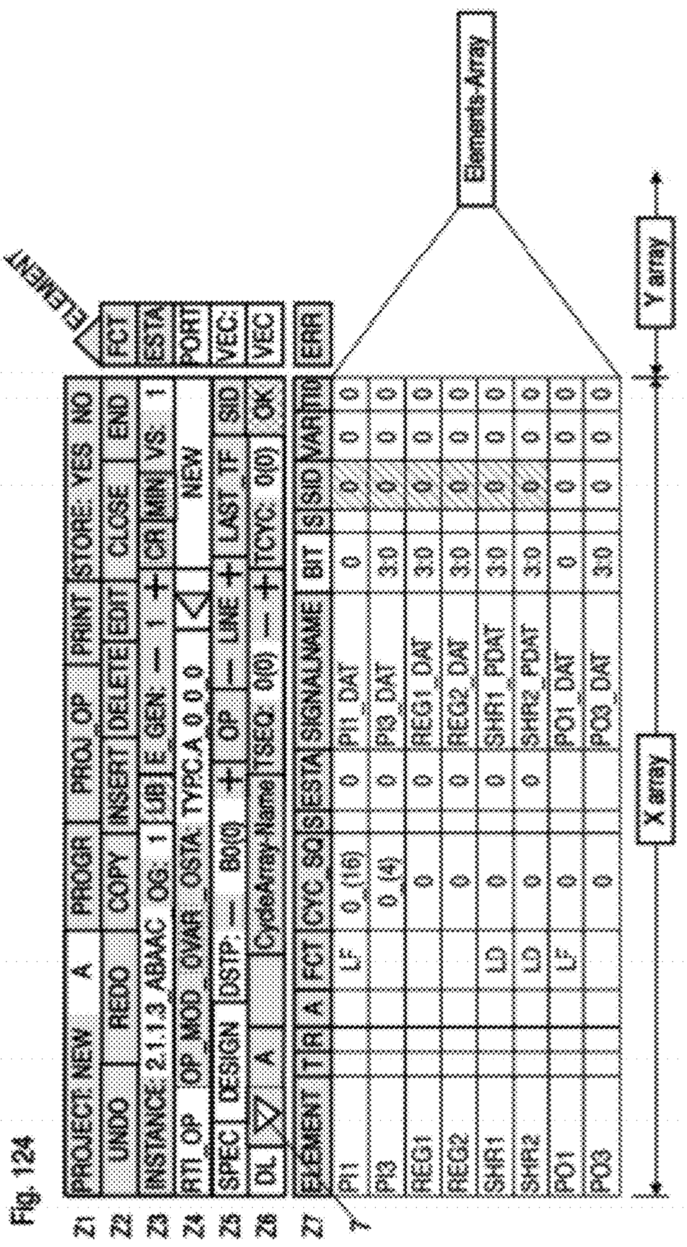
Figure 125:
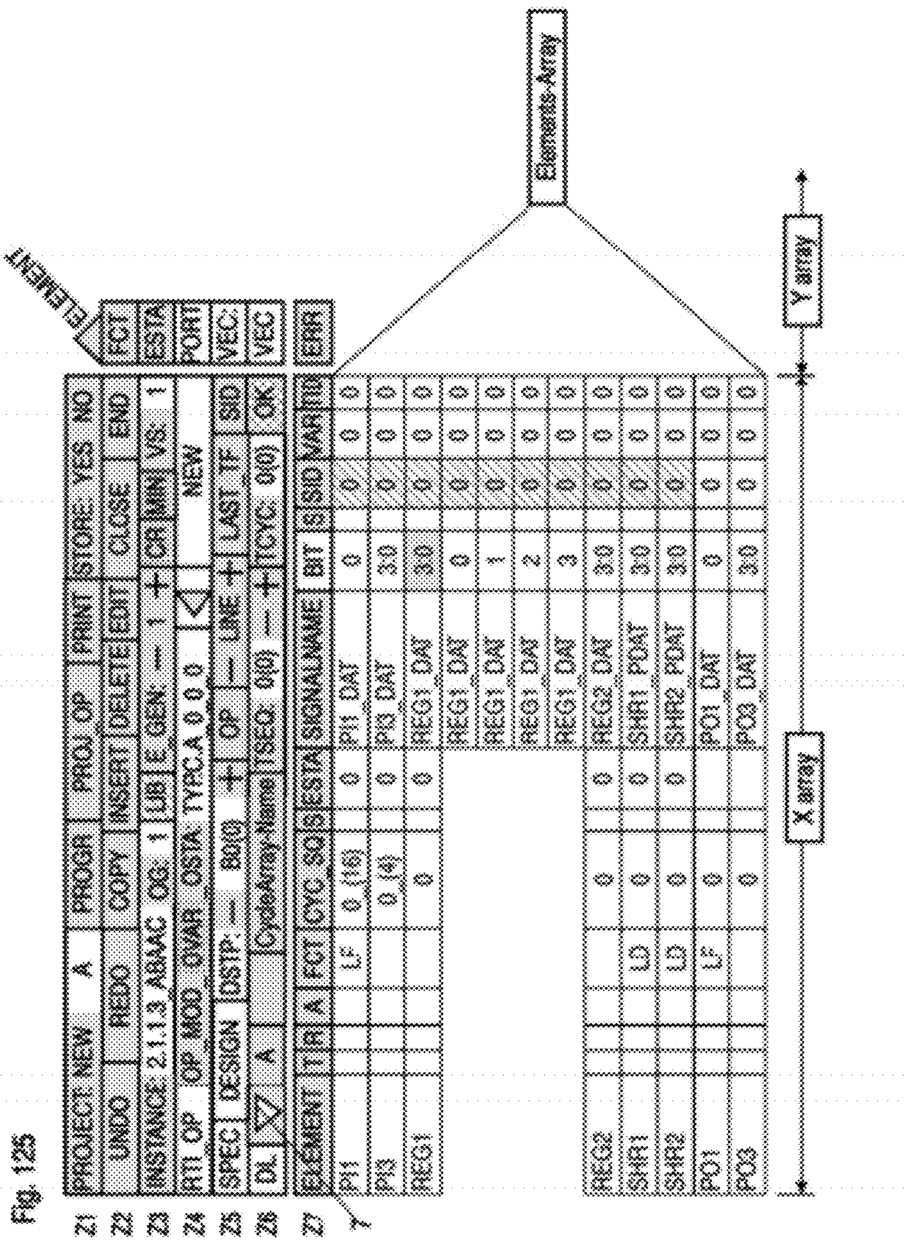

In the following for "REG1" the bit display with entry of dynamic signal names and the "vector splitting" should be demonstrated. For that by clicking the button "VEC" in "Z7" this button is switched from "VEC" to "BIT", as FIG. 124 shows. Subsequently by clicking the button of the REG1 line in column "BIT", this button is activated and marked and the REG1 bits "0 to 3" are indicated, as FIG. 125 shows. Thereby in column "SIGNALNAME" the signal name of the bits "0 to 3" of the REG1 line is shown.

Figure 126:
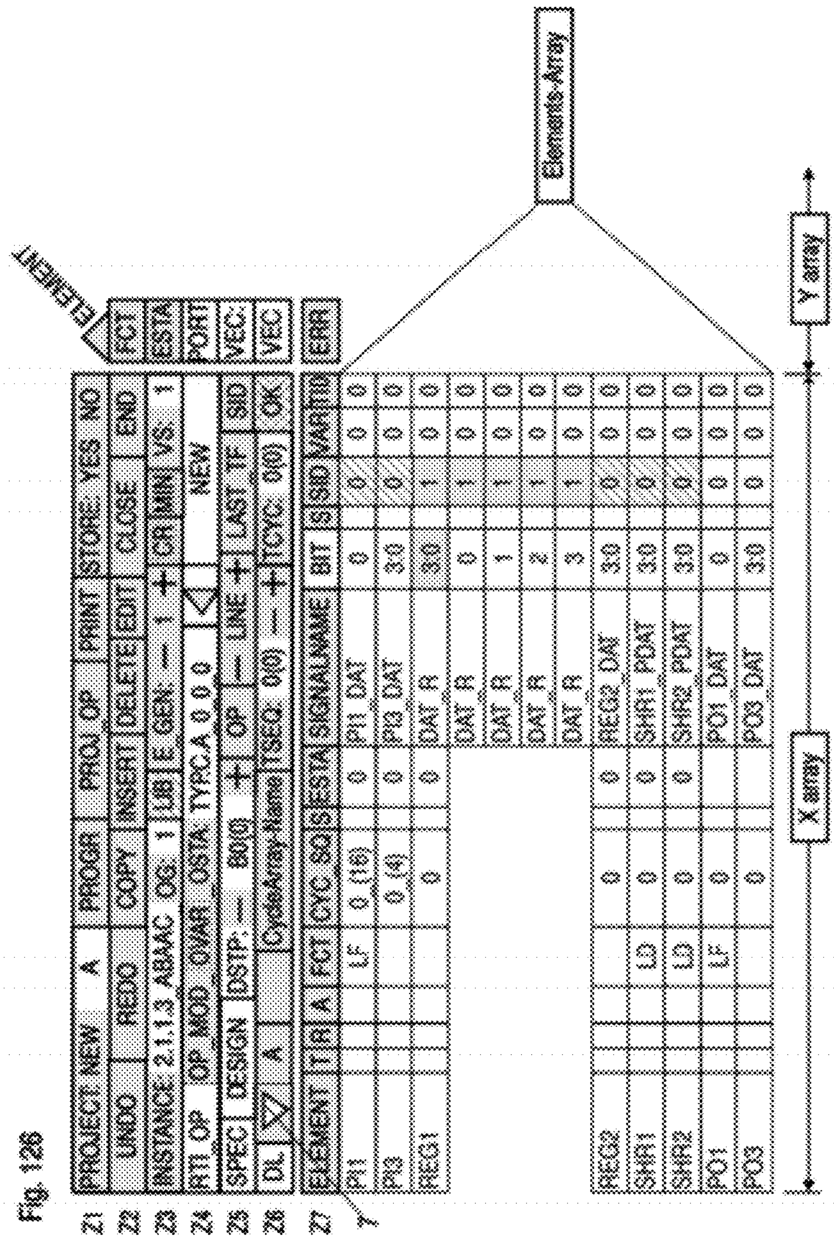
Figure 127:
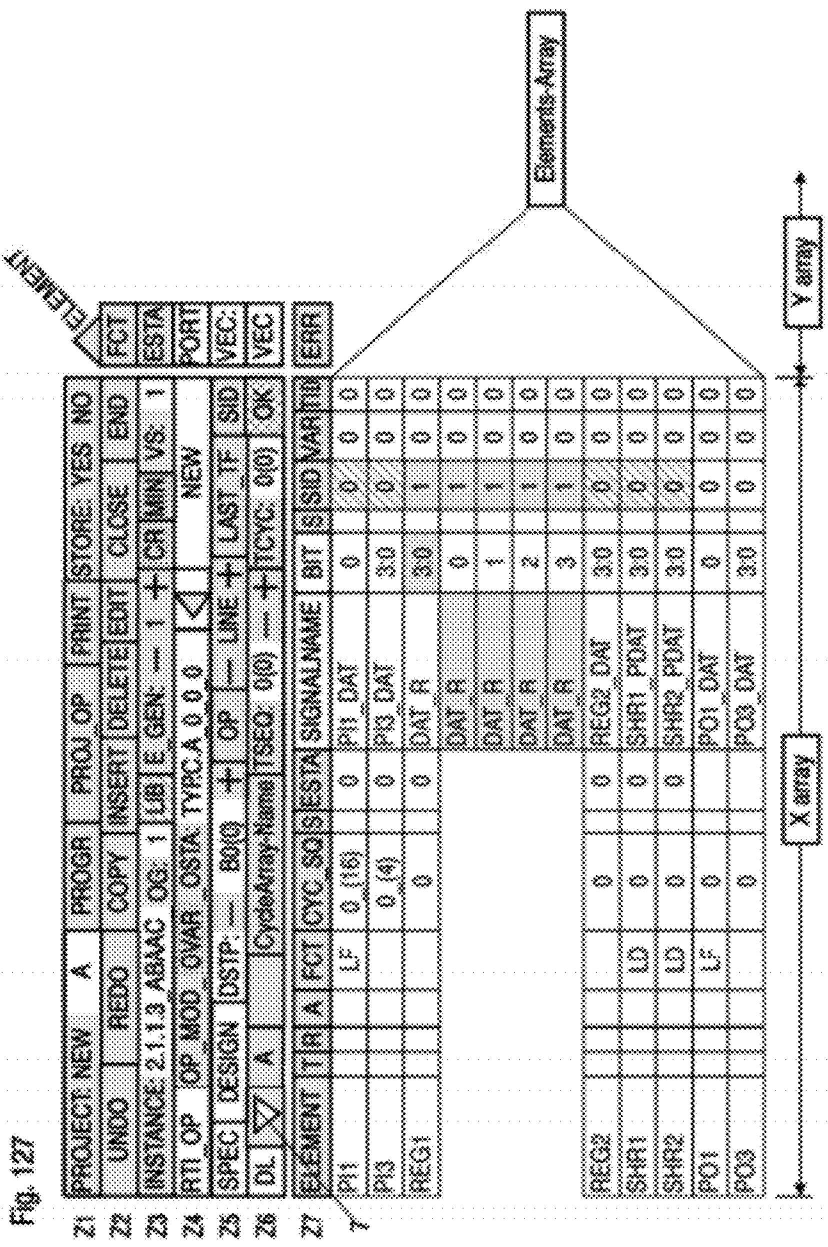

In FIG. 126 "REG1" was switched to the dynamic signal name by clicking the button in REG1 line, on column "SID". Thereby the REG1 bits "0 to 3" adopt this dynamic signal name. If single bits or all bits of REG1 should get own dynamic signal names, as this is necessary, for example, in signal bundles, the so-called "RECORDs", then preparing for a signal name modification, the button "SIGNALNAME" in "Z7" and the buttons of the concerned bits in the column "SIGNALNAME" are activated by clicks, as shown in FIG. 127.

Figure 128:
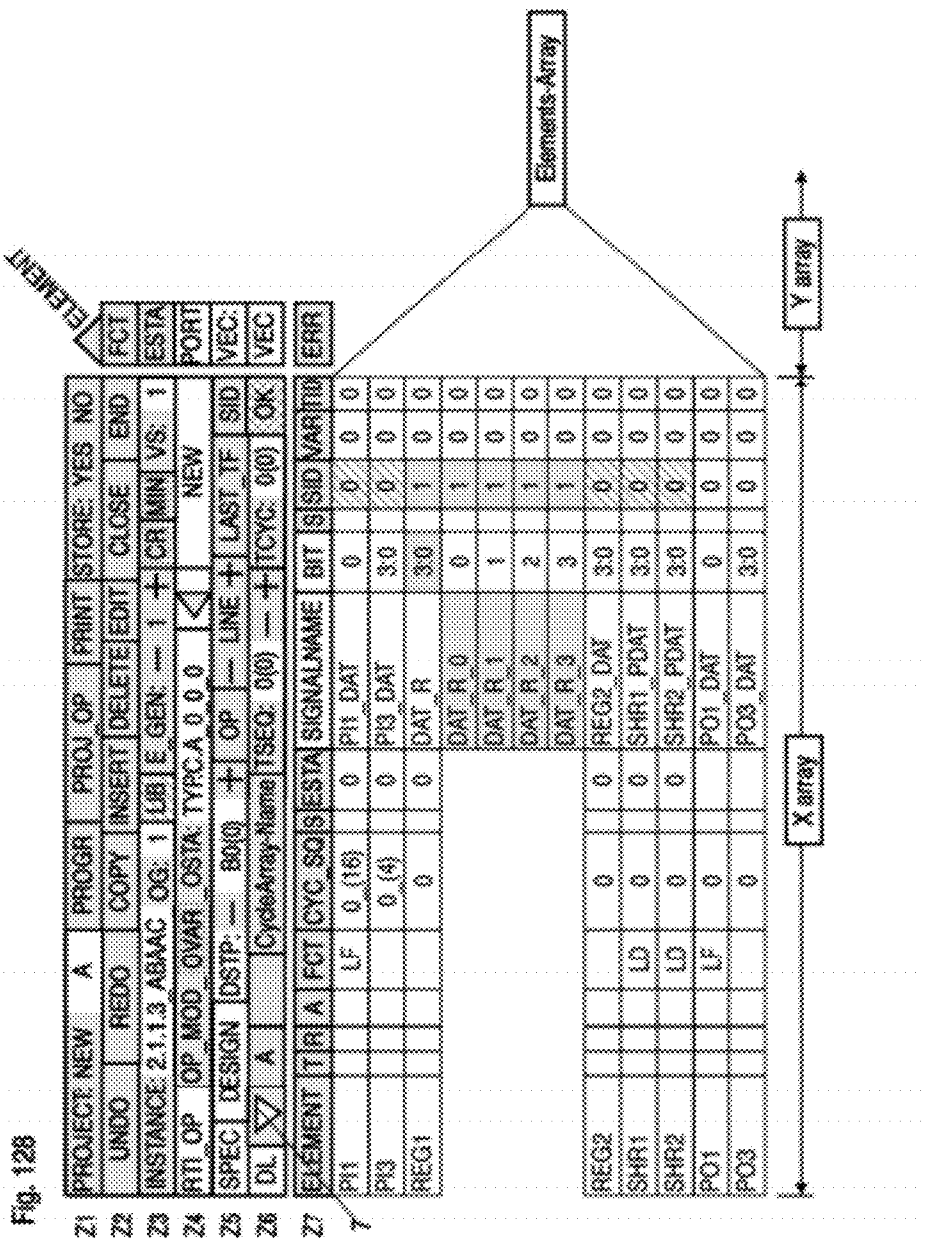
Figure 129:
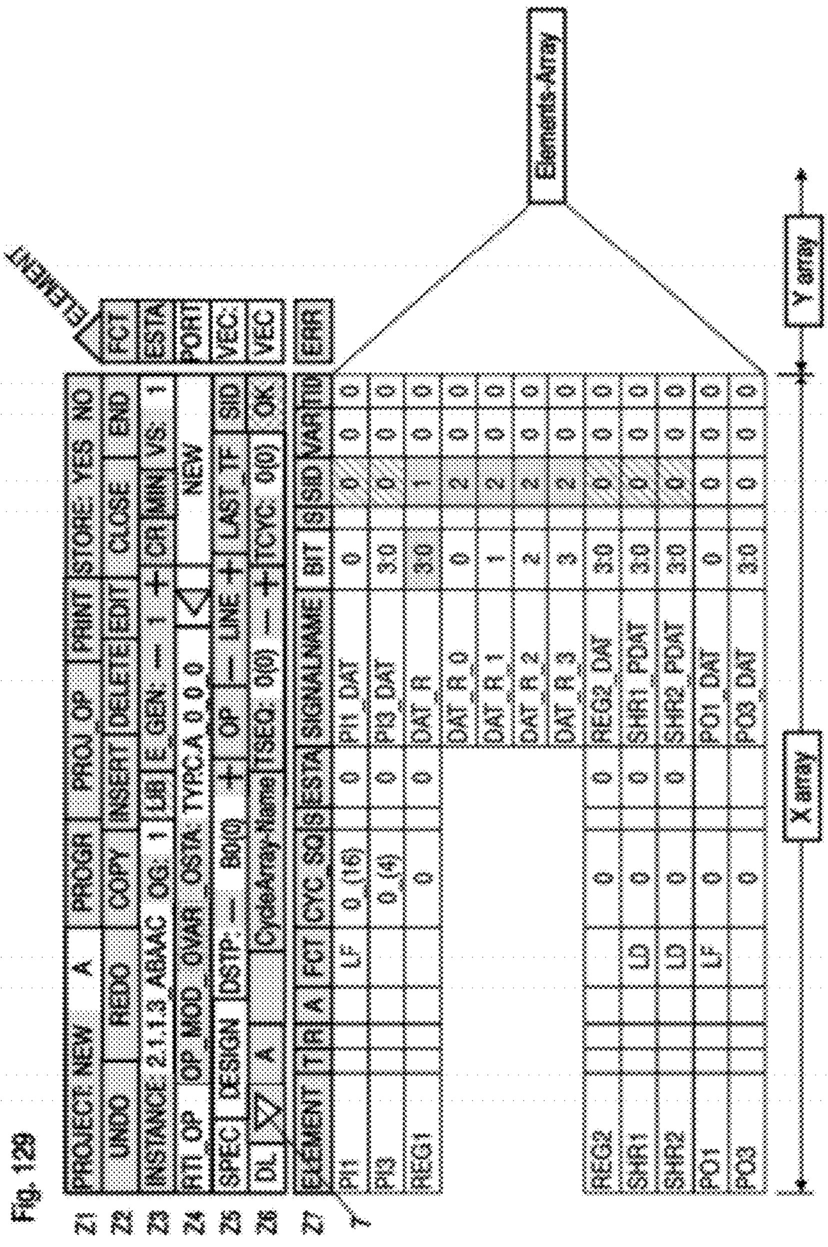
Figure 130:
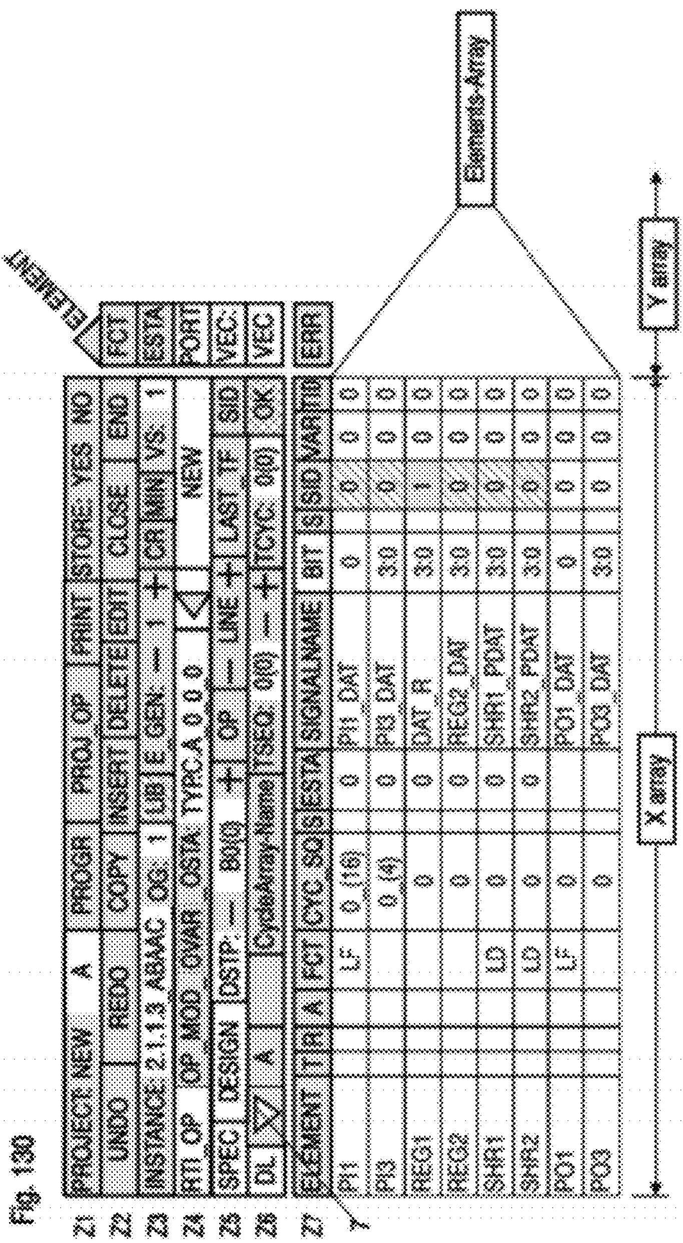
Figure 132:
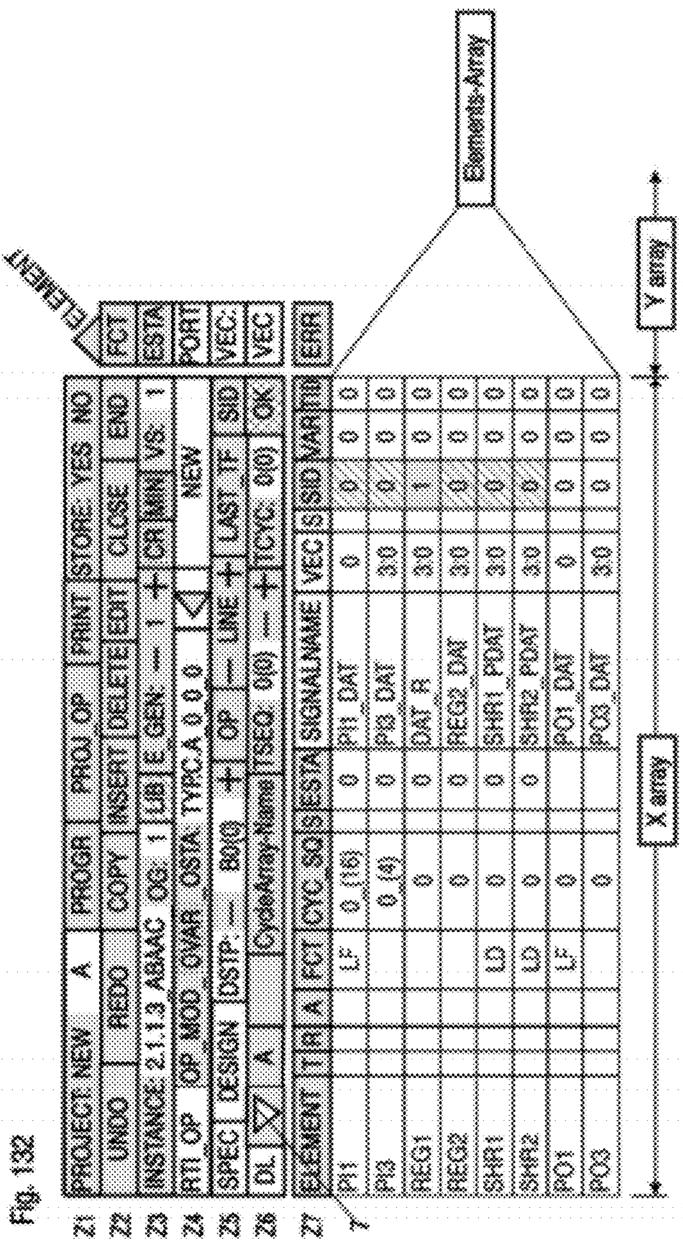

In FIG. 128 for the REG1 bits "0 to 3" exemplary dynamic signal names were entered. By clicking the button "OK" in "Z6" this write action is acknowledged and the buttons "SIGNALNAME" in "Z7" as well as in column "SIGNALNAME" are deactivated, as shown in FIG. 129. As the dynamic signal name "DAT_R" for the vector bits 0 to 3 was defined with SID=1, by acknowledgement of the modification of the dynamic signal names for the vectors bits 0 to 3, SID is automatically increased by one to SID=2. By clicking the button in the REG1 line on column "BIT", this button is deactivated and the REG1 bits "0 to 3" are switched off, as FIG. 130 shows. By clicking the button "BIT" in "Z7" this button is switched back to "VEC", as shown in FIG. 131.

Figure 133:
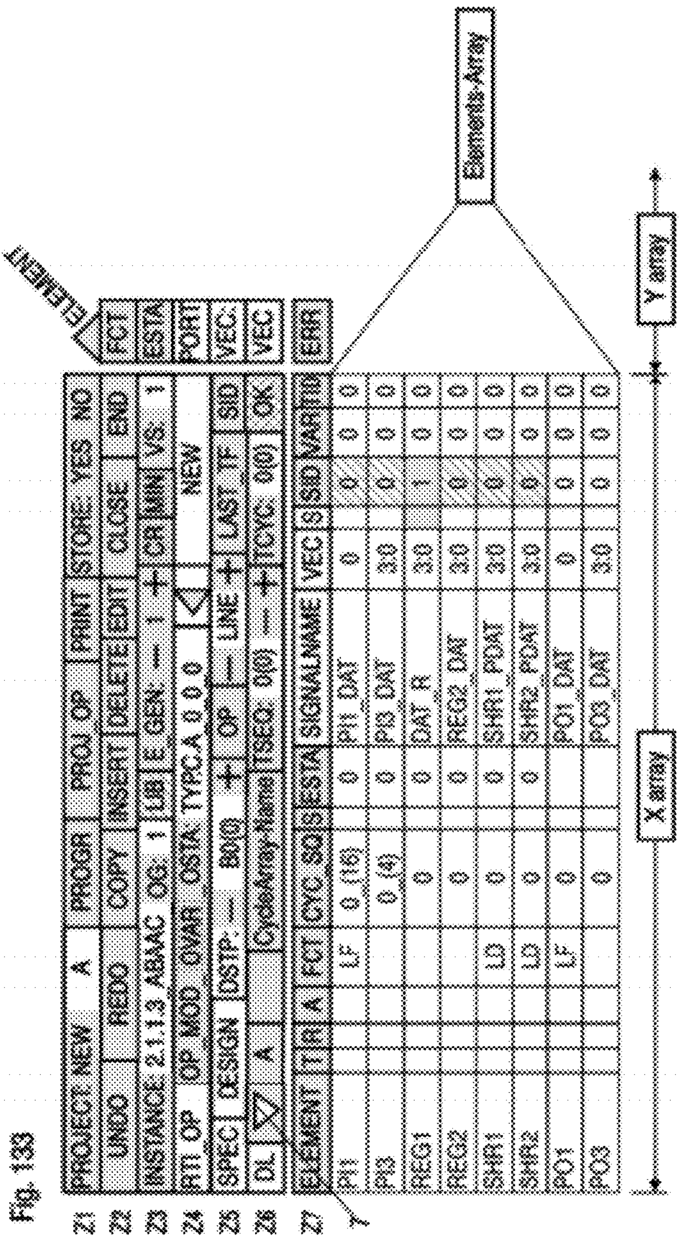

With an RTI operation specification it is possible, to use only a part of a vector (partial vector) of an element signal output. Subsequently with the element "REG1" it is demonstrated, how a signal-output-partial-vector is built out of a whole vector by a so-called "vector splitting". For this purpose in FIG. 132 in line "Z7" the button "vector-splitting" "S" besides of "VEC" is clicked and activated and with that the buttons "VEC" and "SIGNALNAME" in "Z7" are activated automatically, too. Afterward the button of the REG1 line in column vector splitting "S" is activated and marked. By that in line "Z5" the button "LINE" is activated, as FIG. 133 shows.

Figure 134:
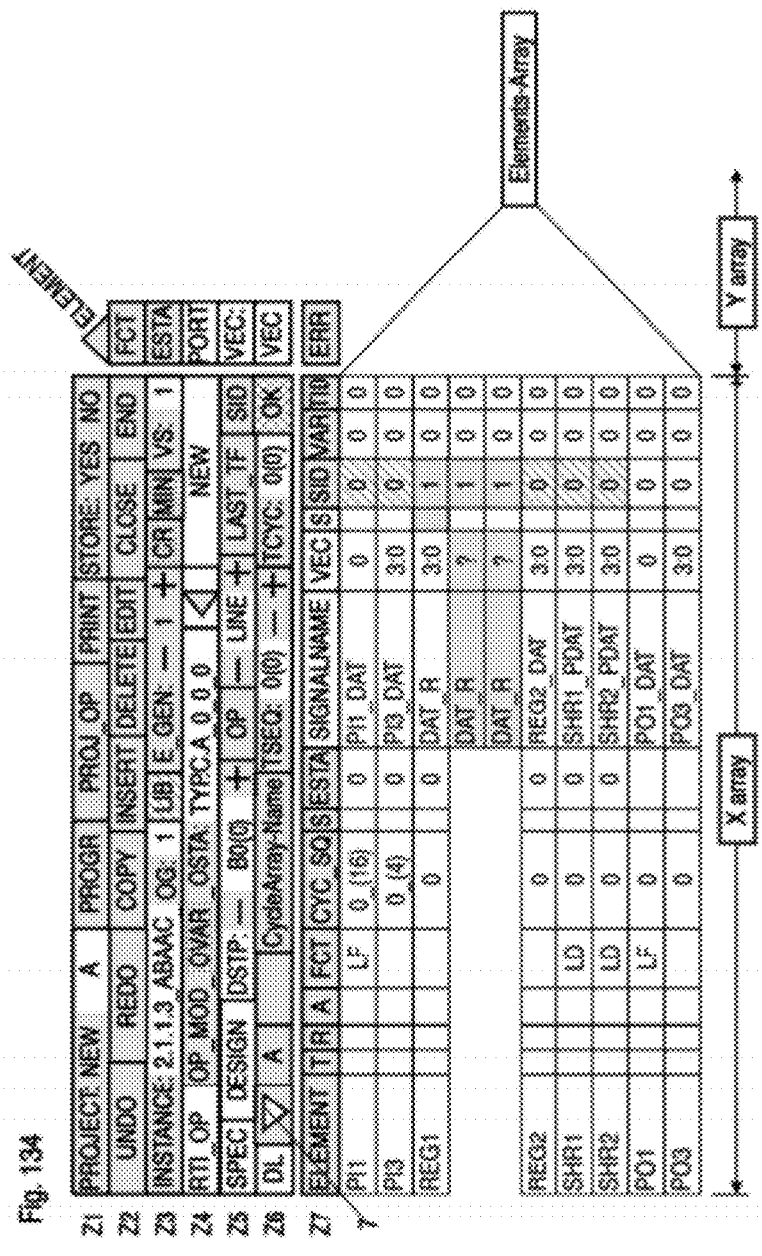

In FIG. 134 in "Z5" by two clicks in LINE"+" for "REG1" two vector splitting lines were generated, each of which holds in the column "VEC" a question mark "?" and which have adopted the dynamic signal name of REG1 line.

Figure 135:
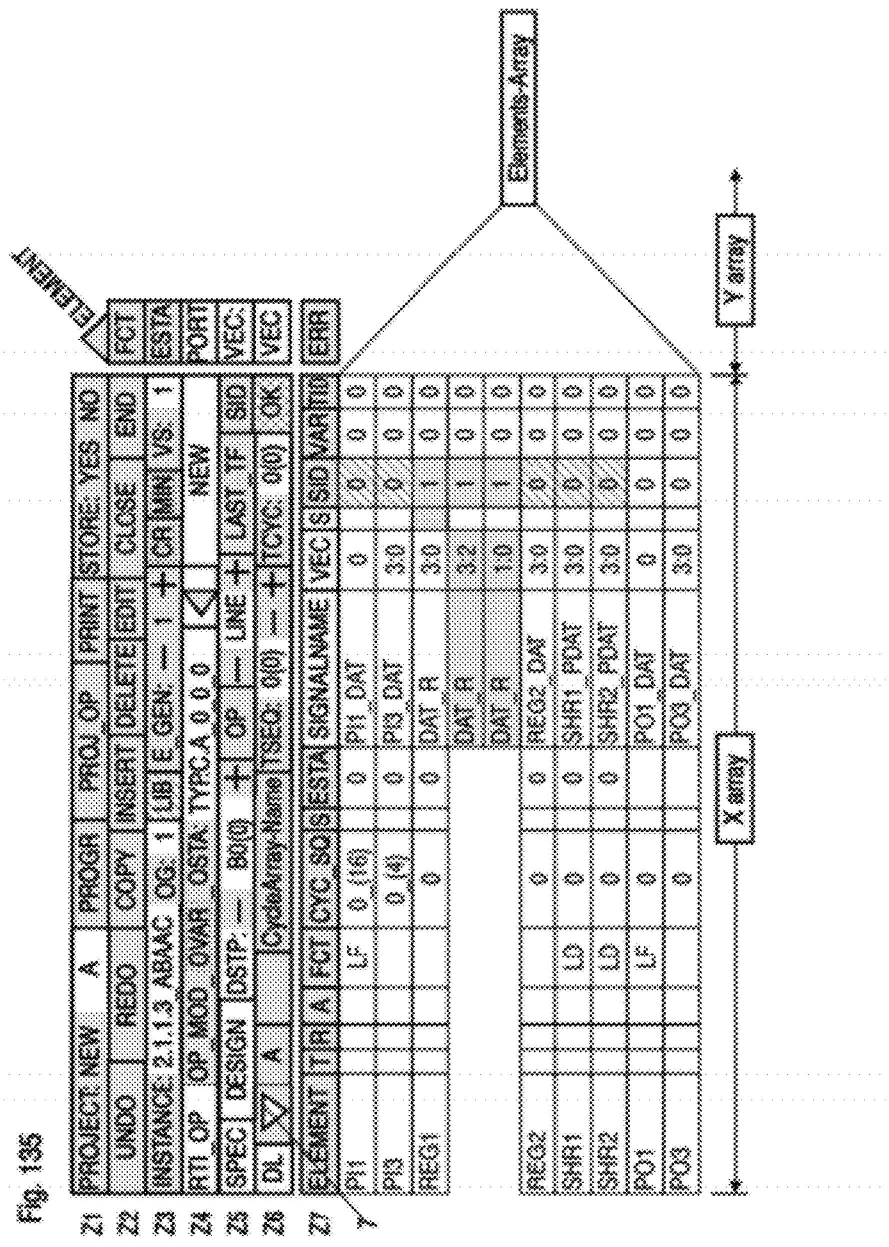
Figure 136:
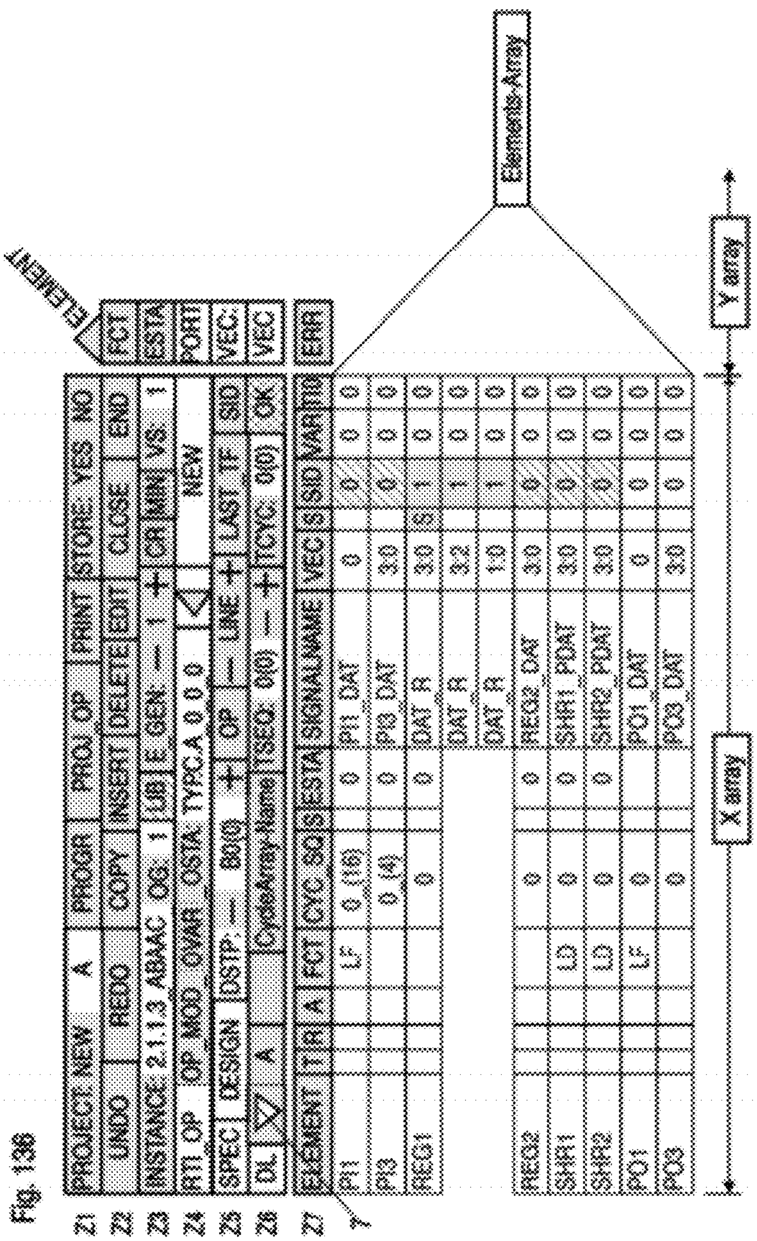

FIG. 135 shows the entries for the REG1 vector splitting with the partial vectors "3:2" and "1:0". With acknowledging by clicking the button "OK" in"Z6", in "Z5" the button "LINE" and in "Z7" the buttons "SIGNALNAME", "VEC", and vector splitting "S", as well as the REG1 vector splitting lines are deactivated and in REG1 line in column "S" a "S" for vector splitting is entered, as FIG. 136 shows. By clicking the button of the REG1 line in column vector splitting "S", REG1 is shown again without vector splitting display in FIG. 137. Thereby the button "S" is unmarked and indicates, that a vector splitting exists but is not displayed. By clicking again on the button vector splitting "S" of the REG1 line the "S" is marked again and REG1 vector splitting is indicated, as illustrated in FIG. 136.

Figure 138:
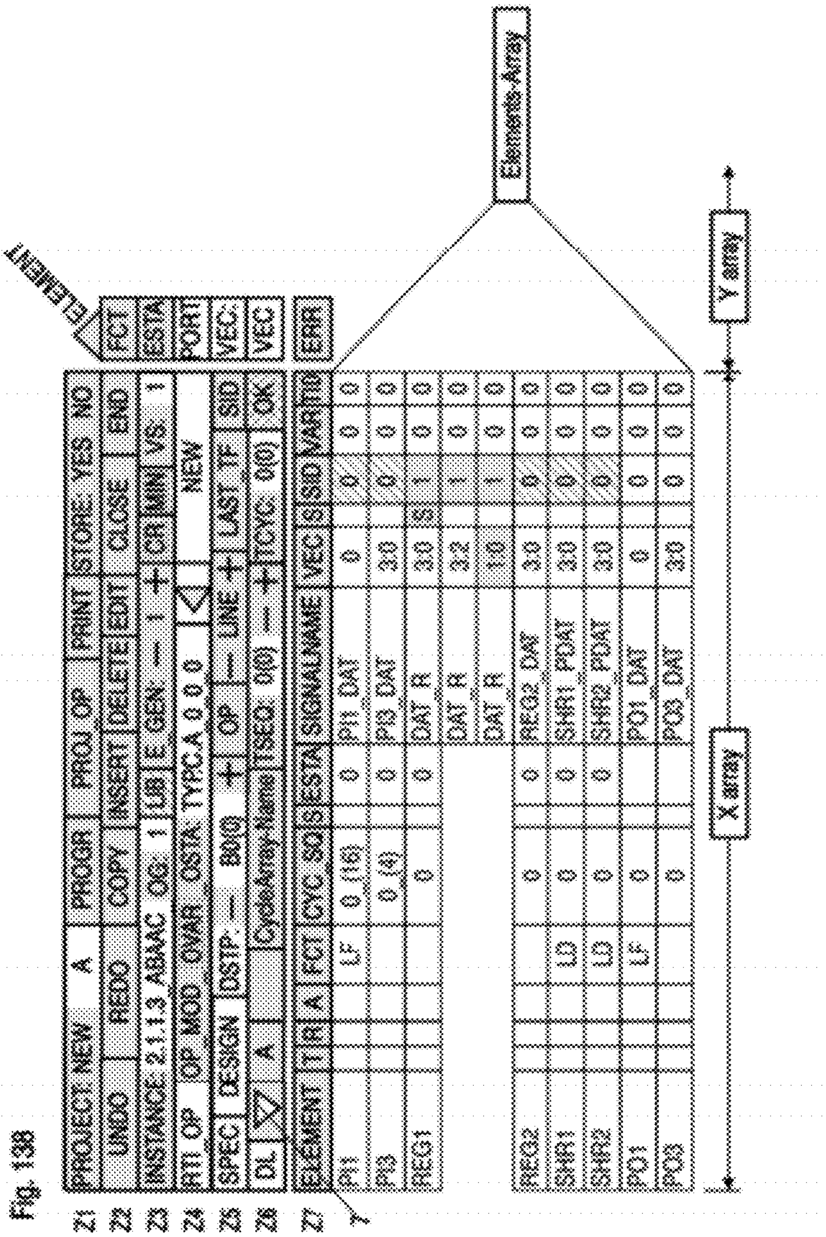
Figure 139:
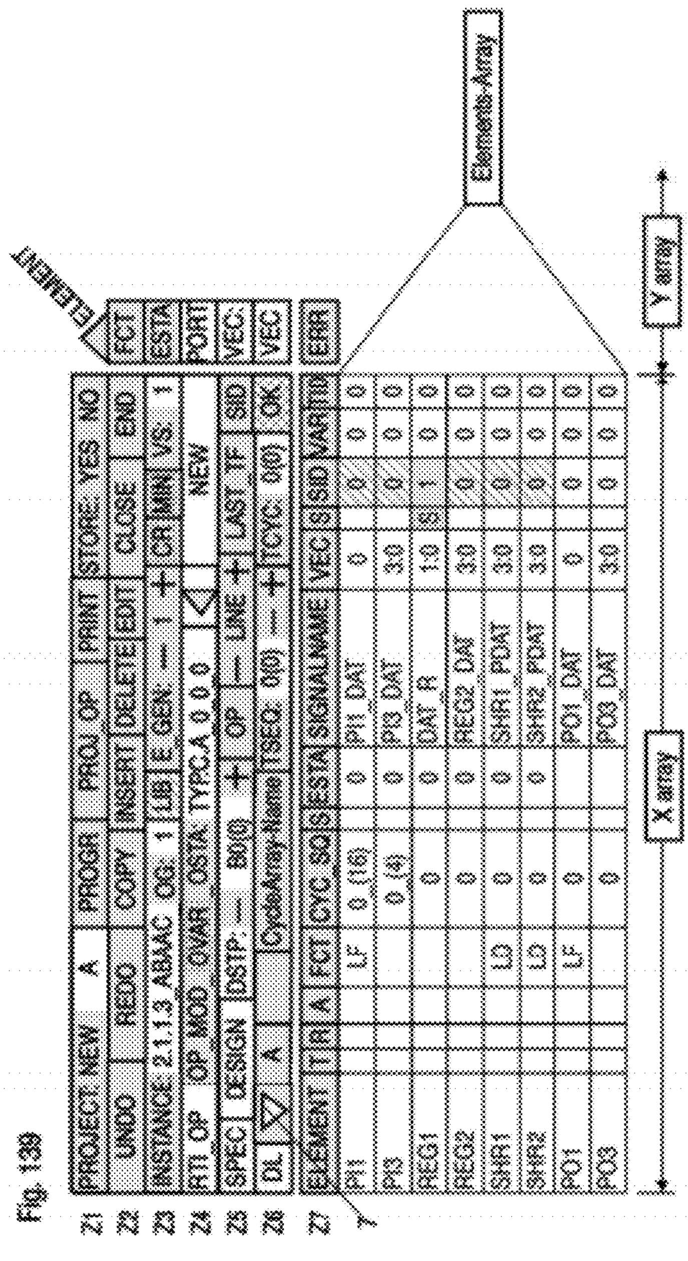
Figure 140:
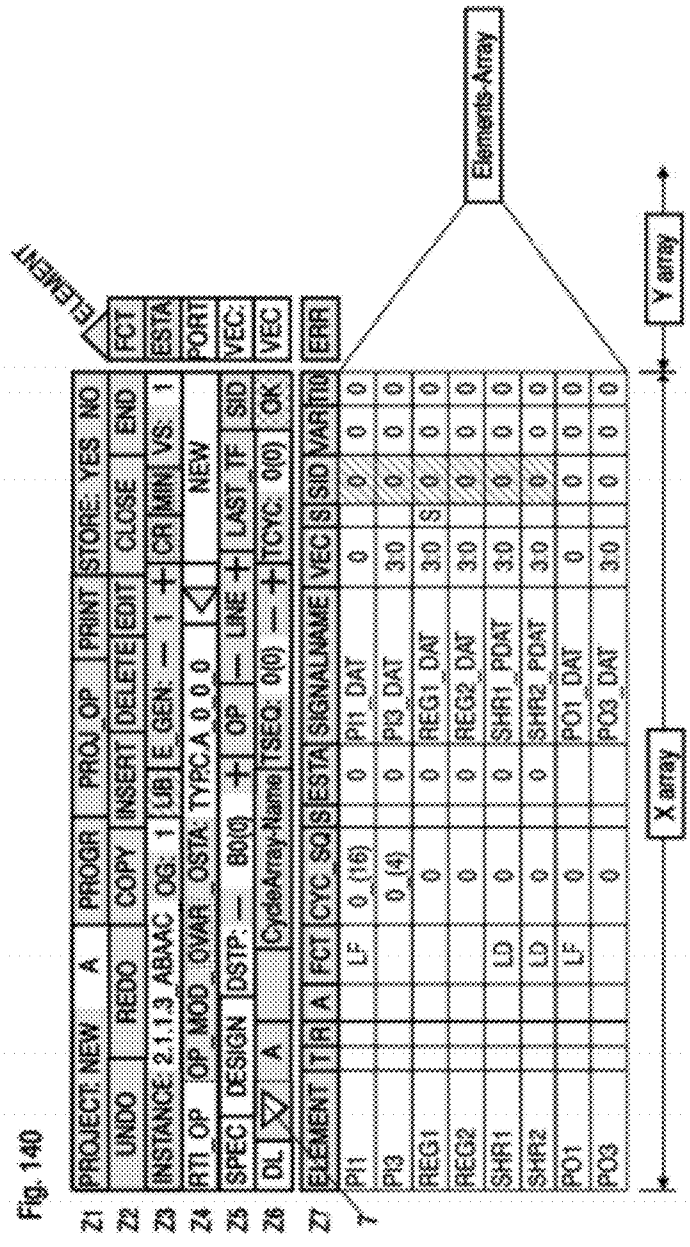

If only one partial vector should be indicated, then by clicking in a vector splitting line on column "VEC" a partial vector is selected and marked, in the example of FIG. 138 this is the partial vector "1:0". By clicking in REG1 line on column vector splitting "S", in REG1 line the partial vector "1:0" is indicated, as FIG. 139 shows. Thereby the "S" in column "S" in REG1 line is marked, for example by a chequered background, and with that it is indicated, that only one partial vector is displayed. By a succeeding click in REG1 line on column vector splitting "S" again the complete REG1 vector splitting according to FIG. 136 is illustrated and by a further click on this button the display is according to FIG. 140. Furthermore, by clicking in REG1 line on column "SID", in "REG1" the dynamic signal names were switched to static signal names.

Description to FIG. 141-149

Figure 141:
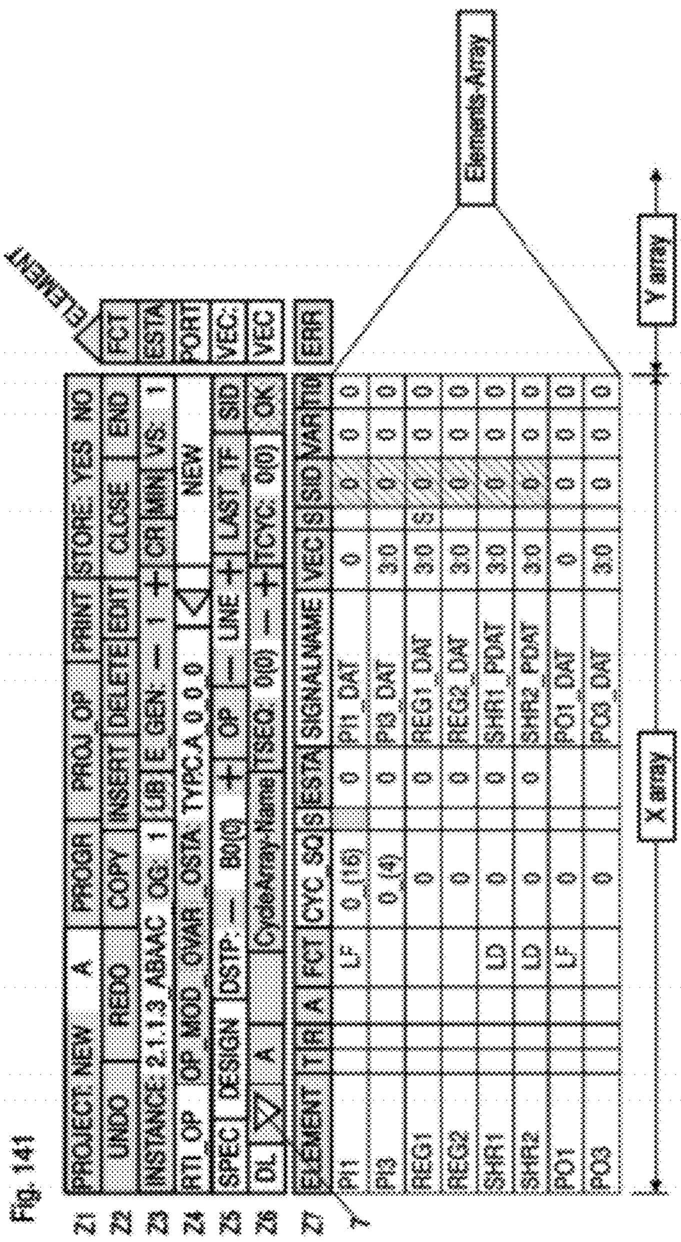

Subsequently, a sequence splitting for the input port "PI1" should be entered, preparing the following RTI operation specification for the input port "PI1". By clicking the button sequence splitting "S" adjacent to "CYC_SQ" in line "Z7", the buttons "CYC_SQ", "S" and "SIGNALNAME" in "Z7" are activated, as FIG. 141 shows. An additional click on the button of line "PI1" in column "S" activates and marks "S" and also activates the button "LINE" in "Z5". Then the lines for a sequence splitting are to be generated.

Figure 142:
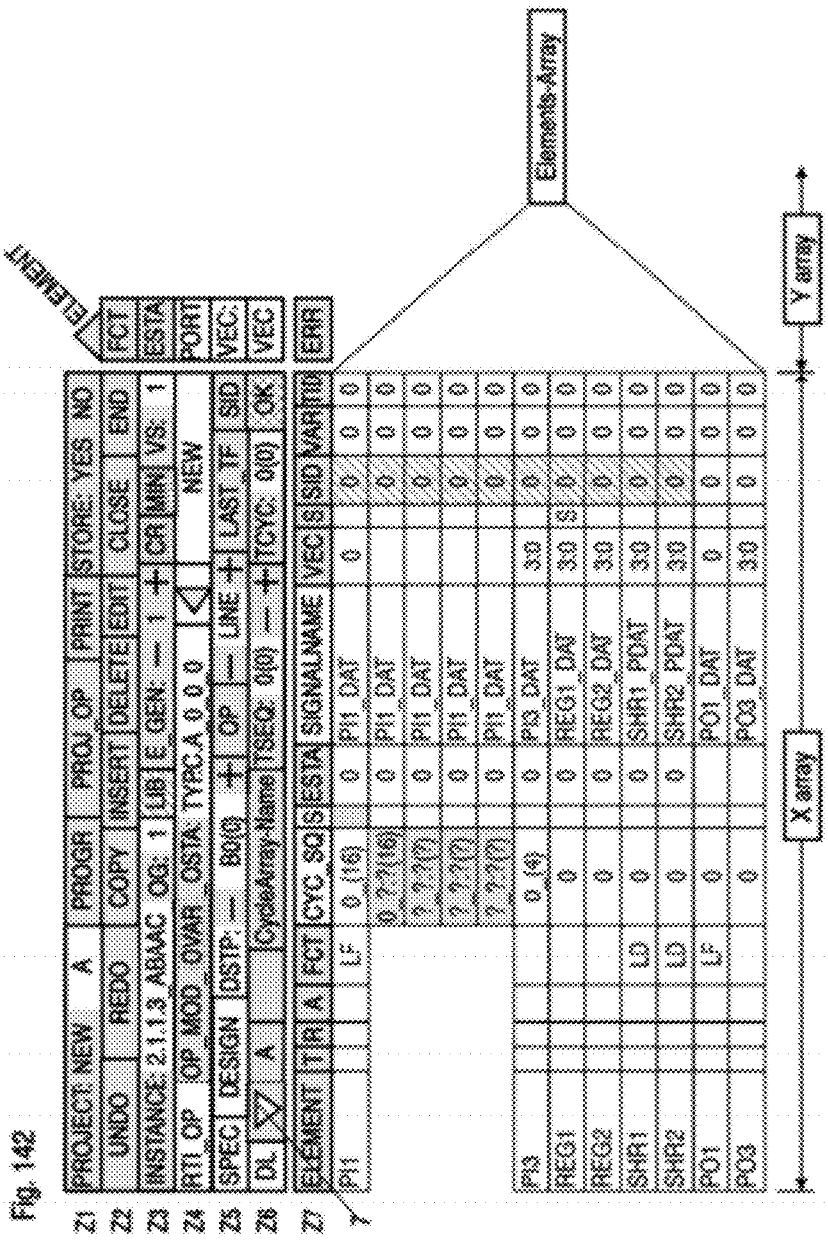

In FIG. 142 by four (4) clicks on the button LINE"+" four (4) sequence splitting lines are generated. Thus in the first sequence splitting line the already known parameters "CYC=0" and "maximum streaming sequences (16)" are entered automatically, the locations which hold "?" are still to be entered manually. The one bit vector "0" of PI1 is indicated in column "VEC", for example, only in the PI1 line, but not in the sequence splitting lines. By one or several clicks on the button LINE"–" corresponding sequence splitting lines can be deleted from low to high.

Figure 143:
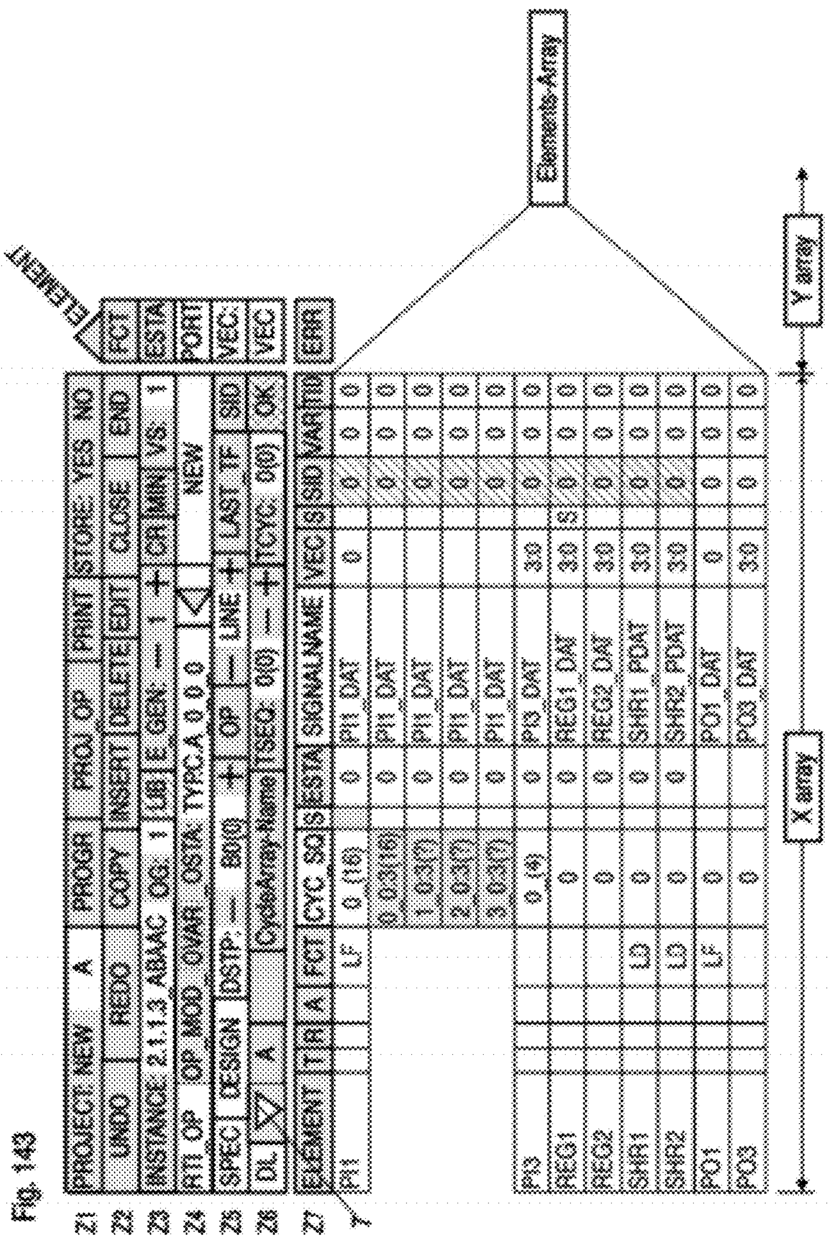

In FIG. 143 in the sequence splitting lines in column "CYC_SQ", for example, cycles "CYC" and sequence array "SQ" were entered, the maximum sequences between brackets were entered automatically only after the acknowledgement with "OK". With an RTI operation specification the sequence splitting for an input port begins always with the CYC number "0". The subsequent CYC numbers are assigned continuously increasing as "1", "2", "3" etc. Independent of the example in FIG. 143, to individual CYC numbers an arbitrary sequence array "X:Y" can be allocated and to one CYC number also several sequence arrays can be allocated. As shown later during the RTI operation specification, the CYC number of a transmitter, in the example this is "PI1", is increased automatically by one after finishing of the design step "DSTP", in which the transmitter was used. If a transmitter, for example "PI1", holds several sequence arrays for one CYC number, then for each data processing step "DVSTP", in which the transmitter within a "DSTP" is involved, a corresponding sequence array is to be selected.

Figure 144:
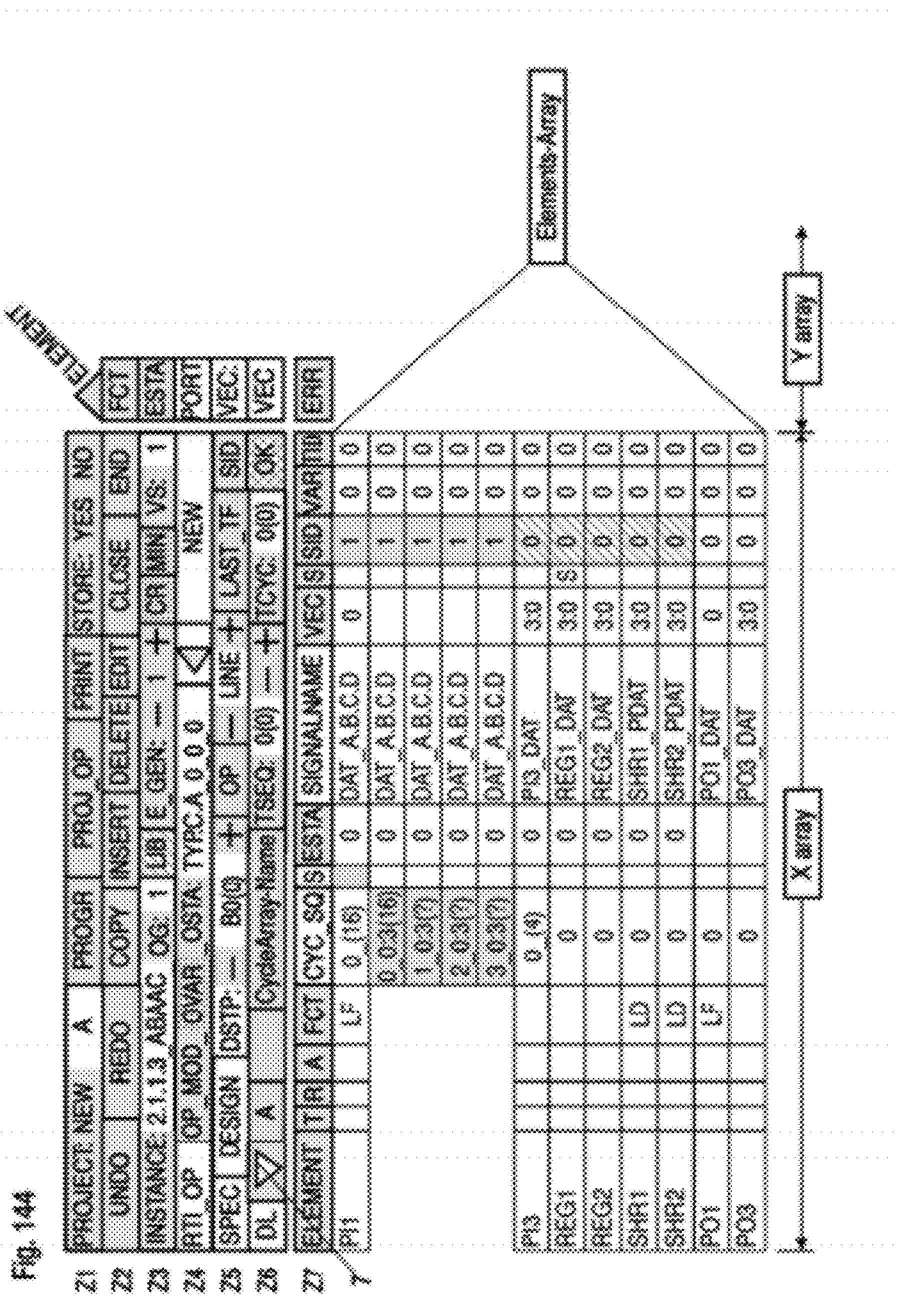

In FIG. 144 "PI1" was switched to the dynamic signal name, which is automatically adopted also into the sequence splitting lines, by clicking in PI1 line on the button in column "SID".

Figure 145:
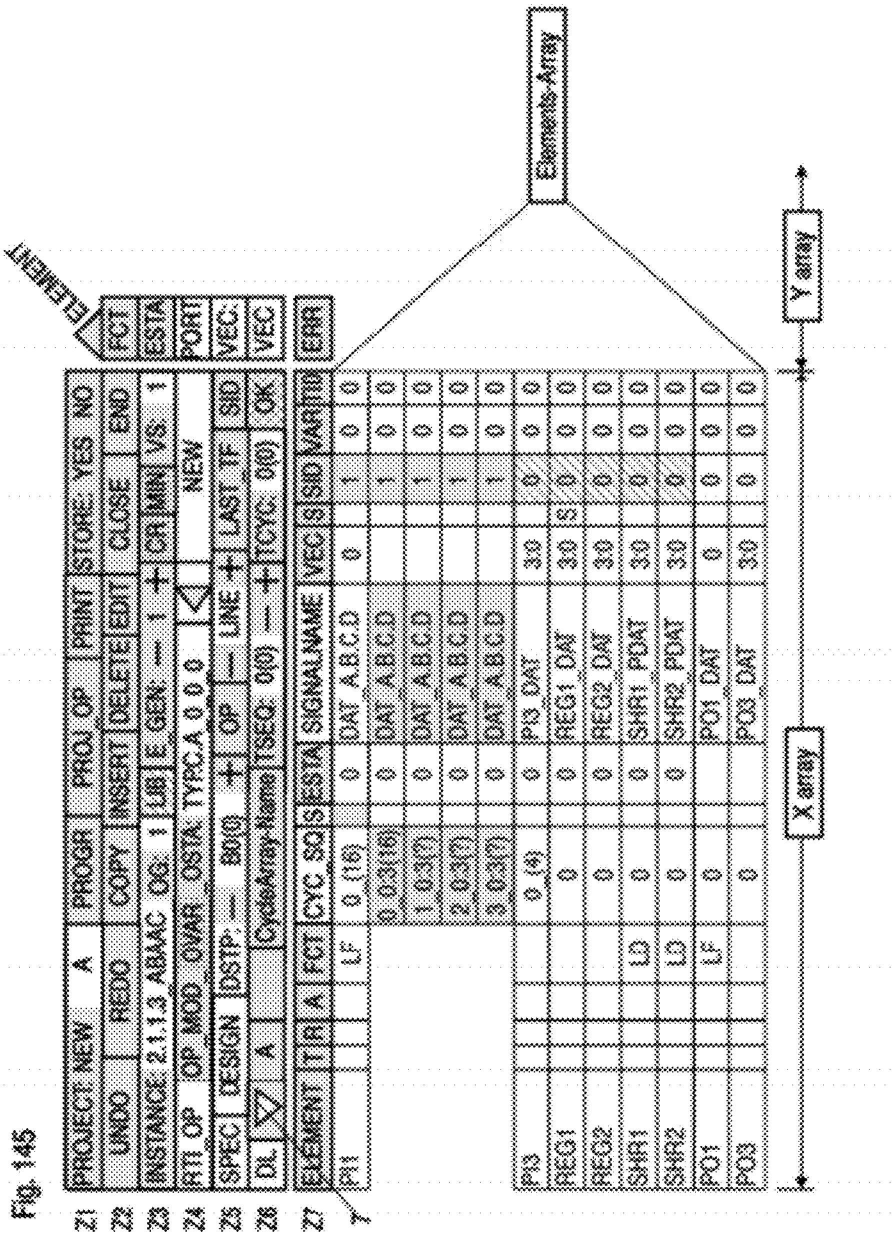
Figure 146:
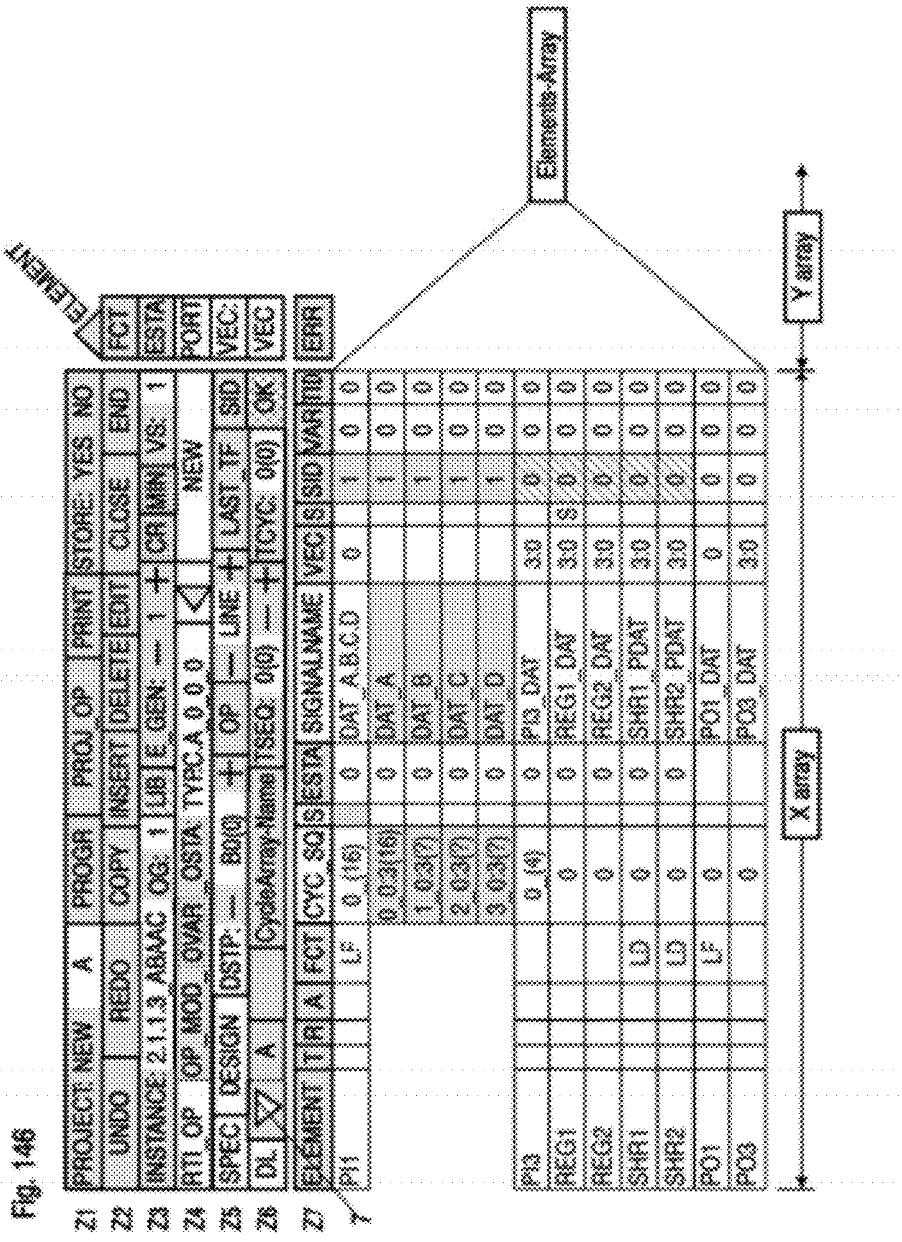

In FIG. 145 the buttons of PI1 sequence splitting in column "SIGNALNAME" were activated and marked by clicks, in which a modification of the dynamic signal name should be effectuated. FIG. 146 shows the newly entered dynamic signal names.

Figure 147:
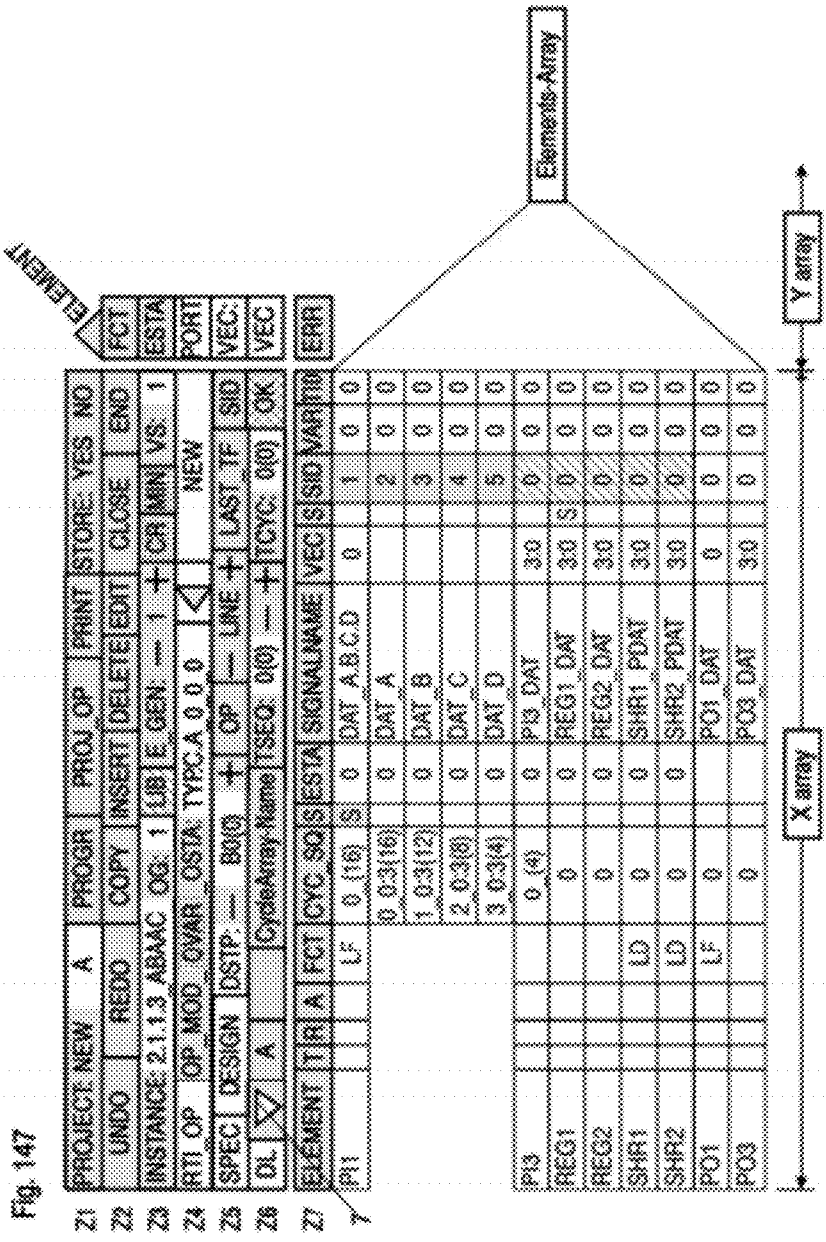

In FIG. 147 the RTI-OP-BS after clicking the button "OK" in "Z6" is illustrated. Compared to FIG. 146 the buttons "LINE" in "Z5", "CYC_SQ", "S" and "SIGNALNAME" in "Z7", as well as the PI1 sequence splitting lines in the columns "CYC_SQ" and "SIGNALNAME" were deactivated and unmarked and in column "CYC_SQ" the maximum sequences "SC)" between brackets "( )" were entered. Furthermore in the PI1 line, in column sequence splitting "S" automatically a "S" was inserted and in the sequence splitting lines in column "SID" for the new dynamic signal names automatically the SID numbers "2", "3", "4" and "5" were entered.

Figure 148:
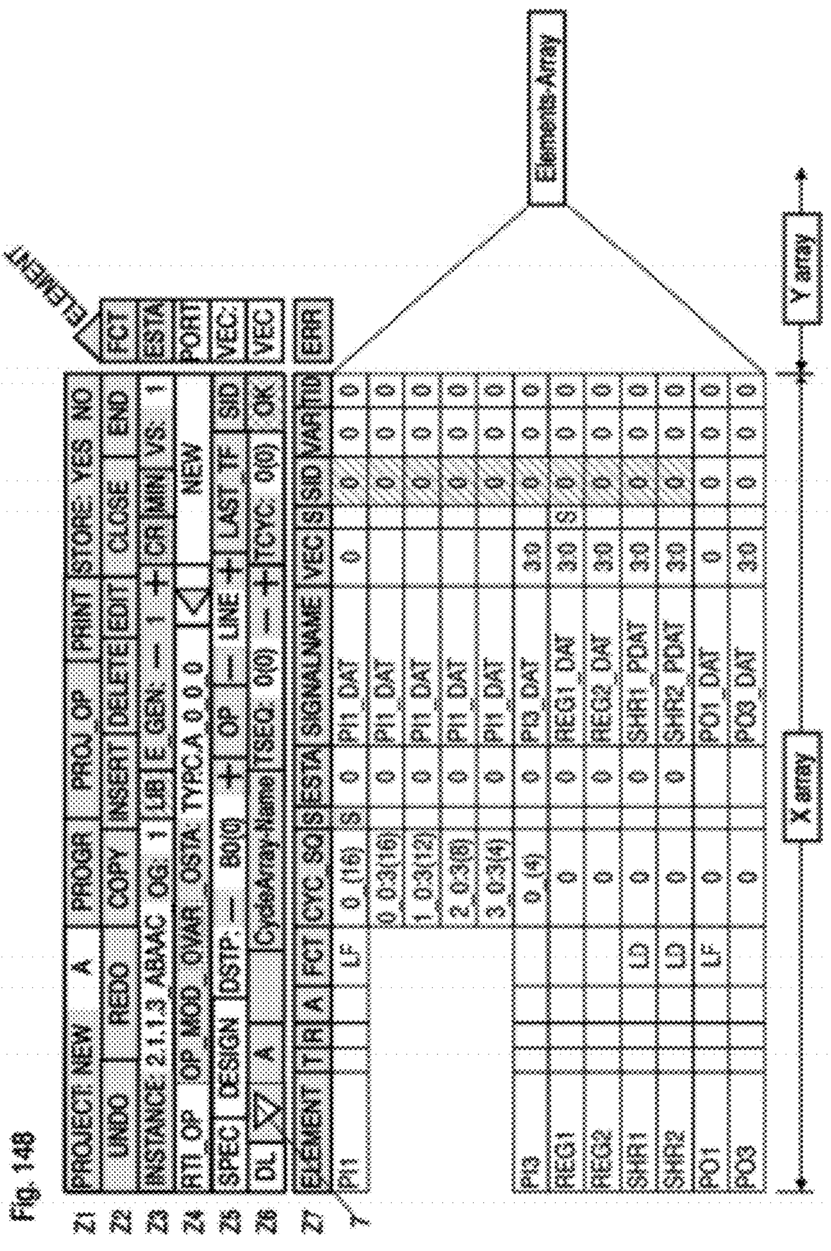
Figure 149:
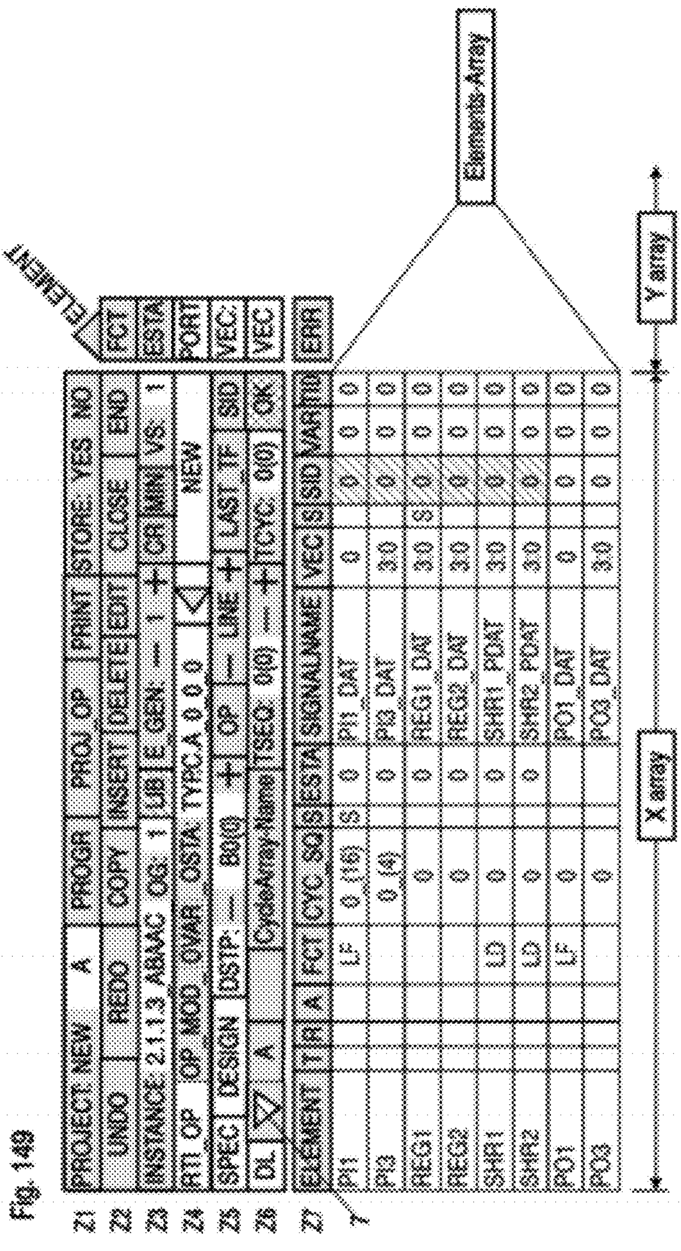

By a click on the button in the PI1 line in column "SID" again the static signal name in the PI1 line and in the PI1 sequence splitting lines is indicated, as shown in FIG. 148. By a further click in PI1 line on column "SID" again the dynamic names are indicated. By clicks in the PI1 sequence splitting line on column "SID", static and dynamic signal lines alternatingly can be switched on and off. By clicking the button "SID" in "Z5", SID is switched from deactivated to activated and the dynamic signal names of all elements with their highest SID number in column "SID" are displayed. By a further click on the button "SID" in "Z5" "SID" is switched from activated to deactivated and again the static signal names of all elements are displayed in column "SID". By click on the button of the PI1 line in column sequence splitting "S" the PI1 sequence splitting lines are switched off and the button is unmarked, as FIG. 149 shows.

Description to FIG. 150-163

Figure 150:
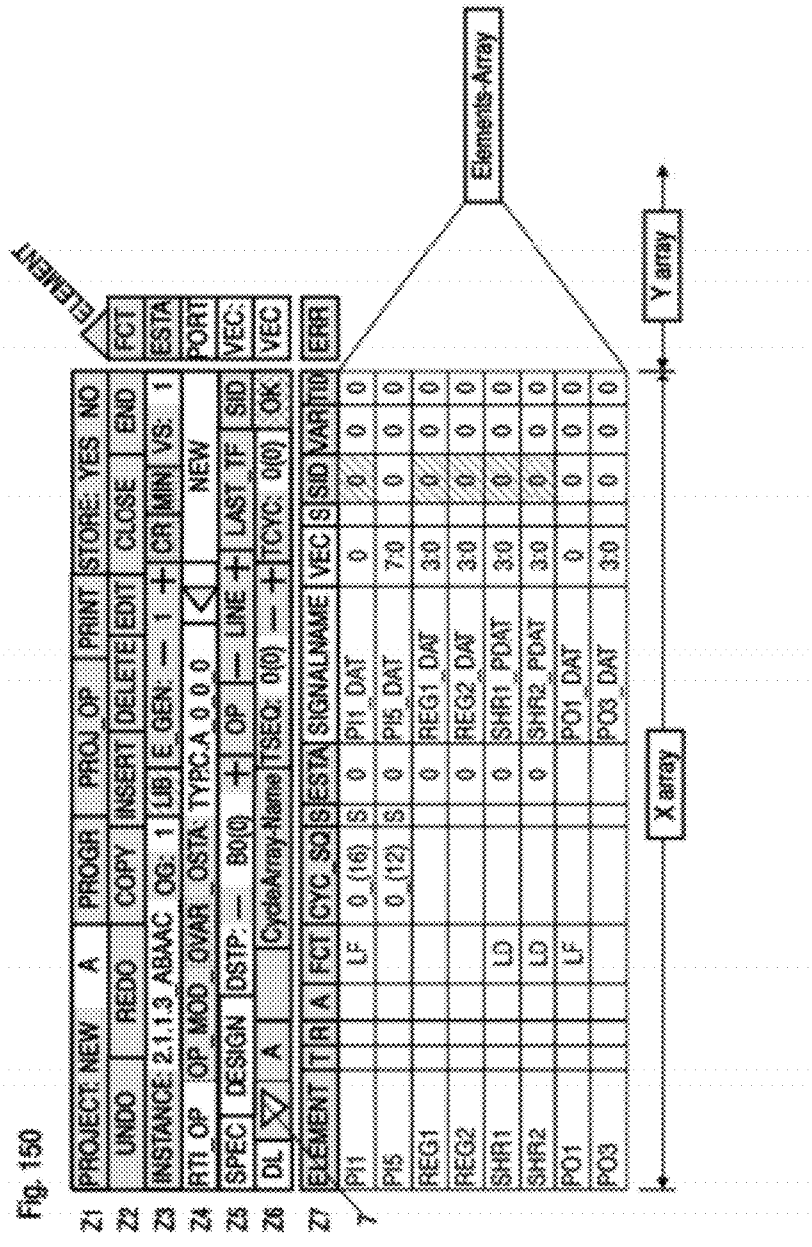
Figure 151:
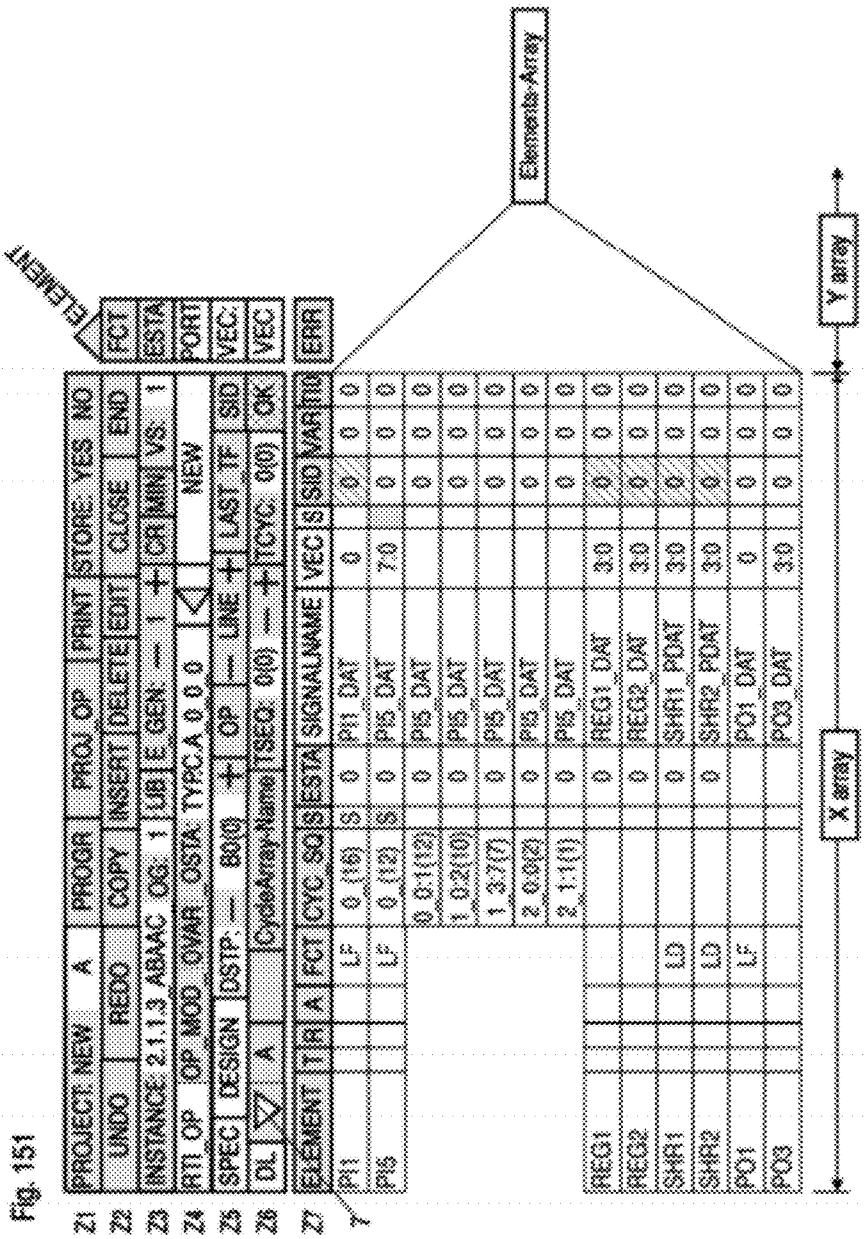
Figure 152:
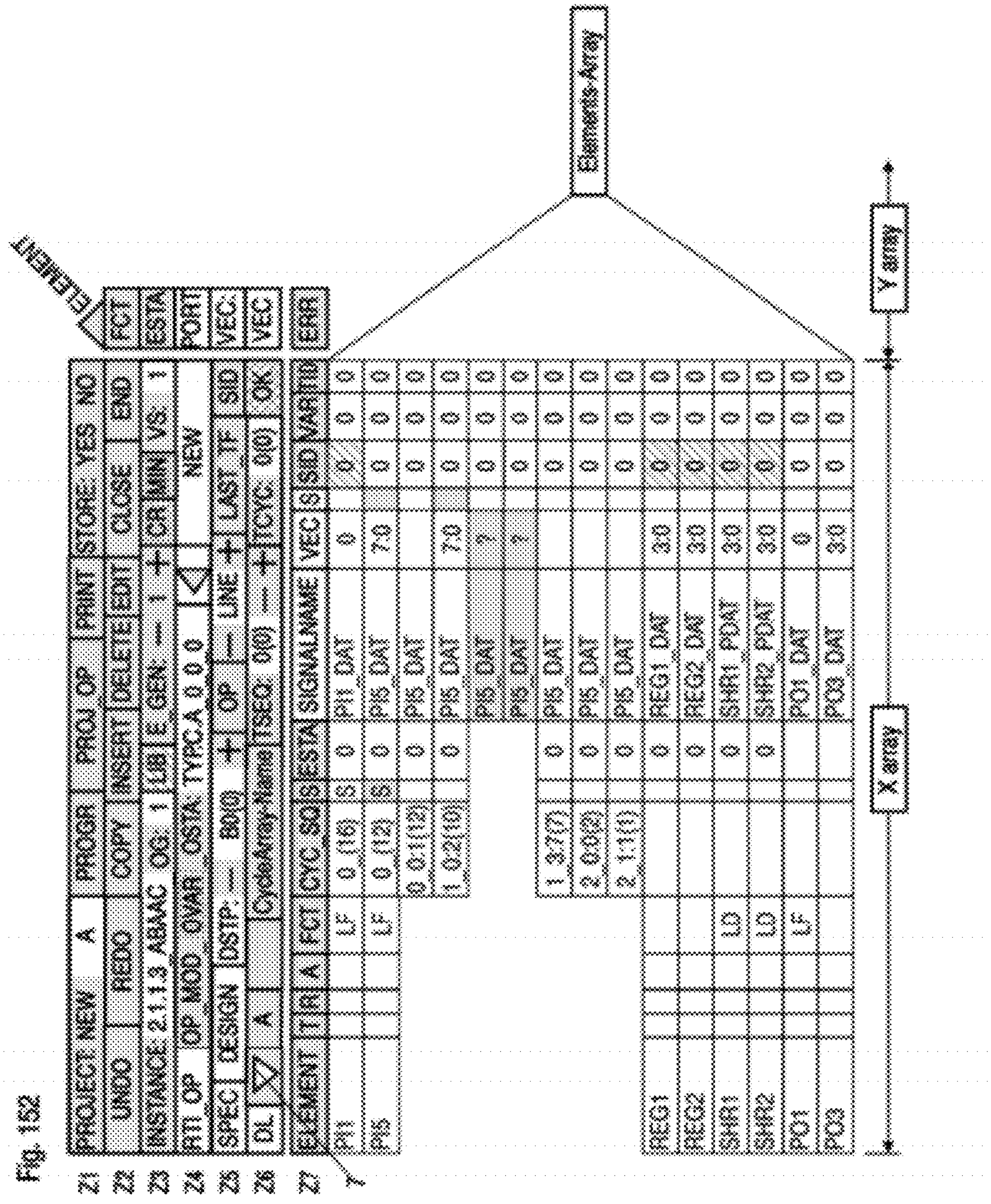

In the following a vector splitting should be explained at the input port "PI5" with an 8 bit vector and sequence splitting, FIG. 150. Preparing for a vector splitting in line "Z7" the button vector splitting "S" besides "VEC" is activated by a click, thereby the buttons "VEC" and "SIGNALNAME" in "Z7" are activated, as shown in FIG. 150. Additionally in FIG. 151 by clicking the button in PI5 line on column vector splitting "S" this button was activated and marked and the element "PI5" was selected for a vector splitting. Thereby the exemplary PI5 sequence splitting is opened automatically. By clicking on the button of the PI5 sequence splitting line "1_0:2(10)" in column vector splitting "S", this button and the button "LINE" in "Z5" are automatically activated, as FIG. 152 shows. Furthermore in FIG. 152 by two additional clicks on the button LINE"+" for the PI5 sequence splitting line "1_0:2(10)" two vector splitting lines were generated, which are marked in the columns "SIGNALNAME" and "VEC" and which hold a "?" each in column "VEC". Thereby the signal name of the PI5 sequence splitting line "1_0:2(10)" is taken over into the generated vector splitting lines.

Figure 153:
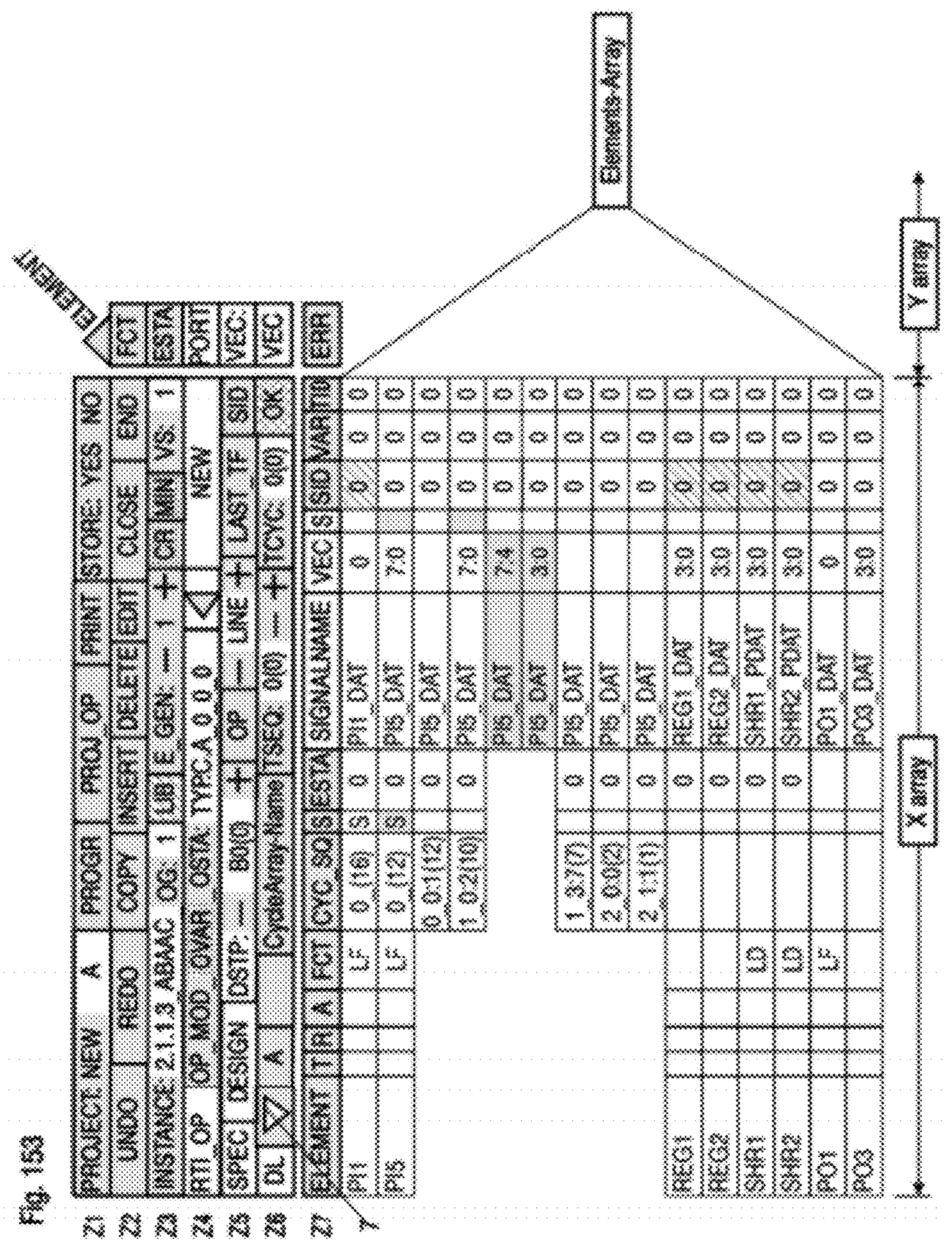
Figure 154:
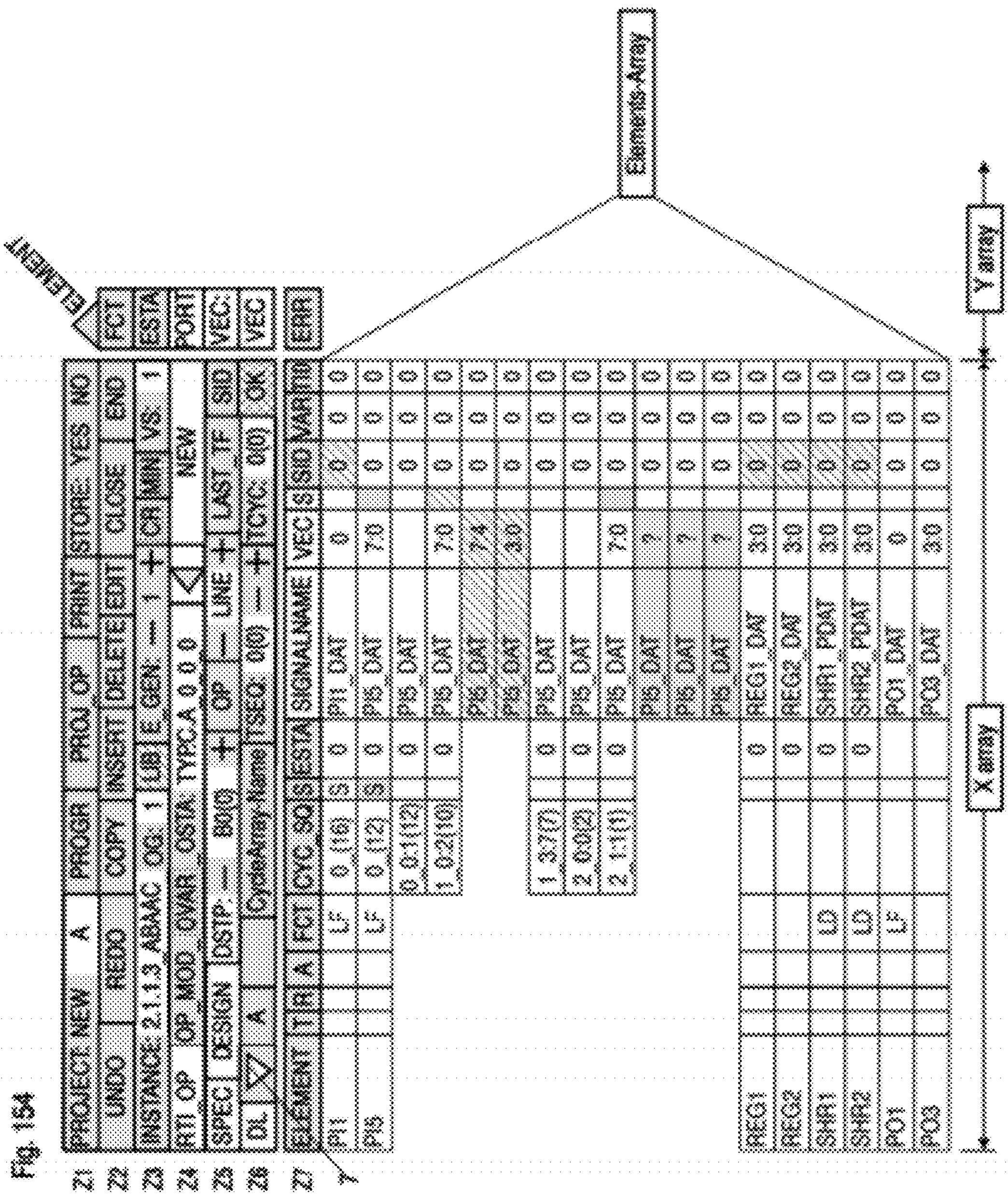

FIG. 153 shows for that the vector splitting entries "7:4" and "3:0", which are valid for cycle "CYC=1" in the whole sequence array "0:2". In FIG. 154 three vector splitting lines for the sequence splitting line "2_1:1(1)" were generated. Thereby the switch from "active" to "passive" or, respectively, from "marked all over" to "marked hatched", is automatically effectuated by clicks on the buttons in the sequence splitting line "2_1:1(1)" in column vector splitting "S", for the button of the sequence splitting line "1_0:2(10)" in column vector splitting "S" and for the buttons in the corresponding vector splitting lines in the columns "SIGNALNAME" and "VEC".

Figure 155:
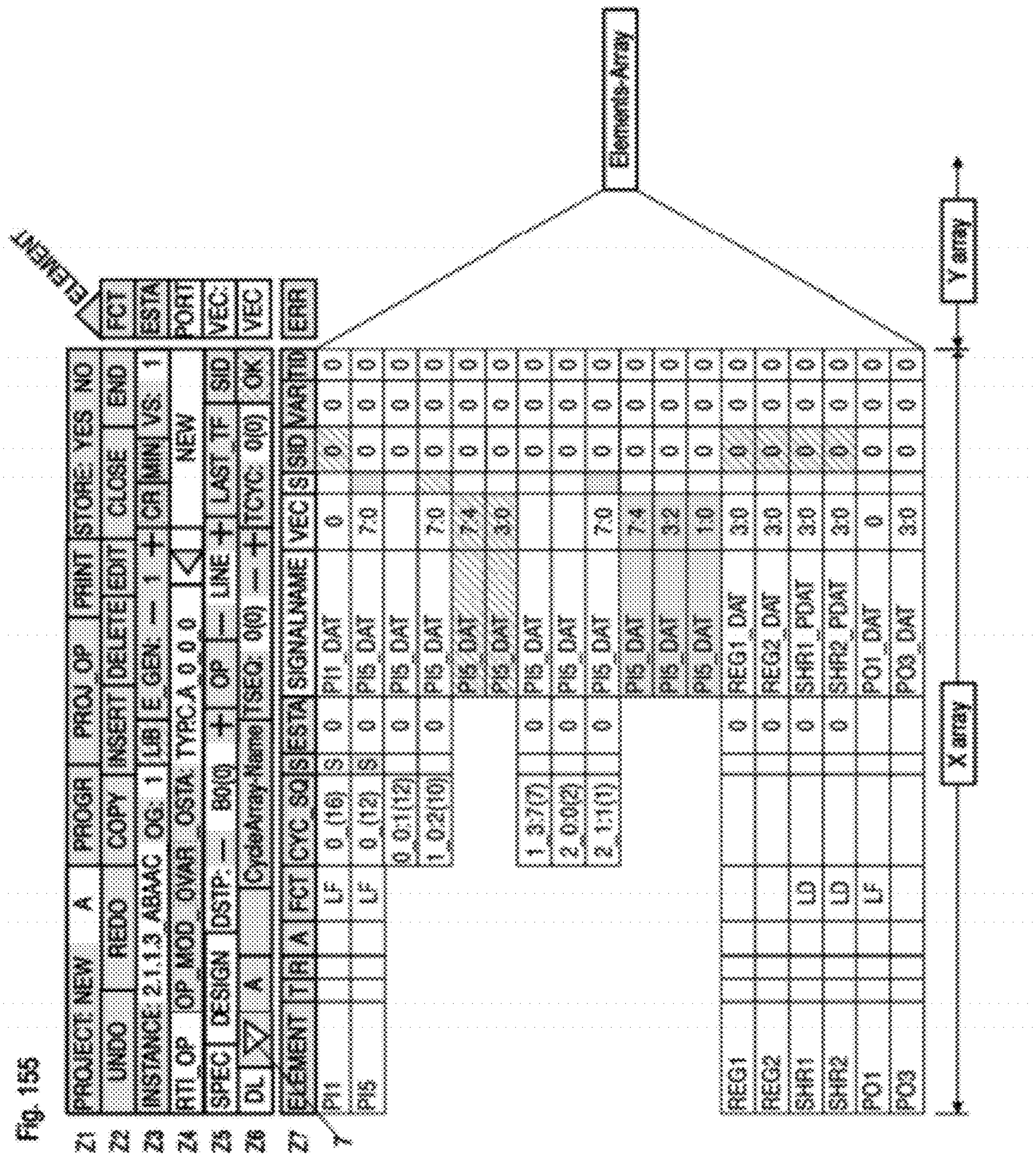

FIG. 155 shows the vector splitting entries "7:4", "3:2" and "1:0" for the sequence splitting line "2_1:1(1)".

Figure 156:
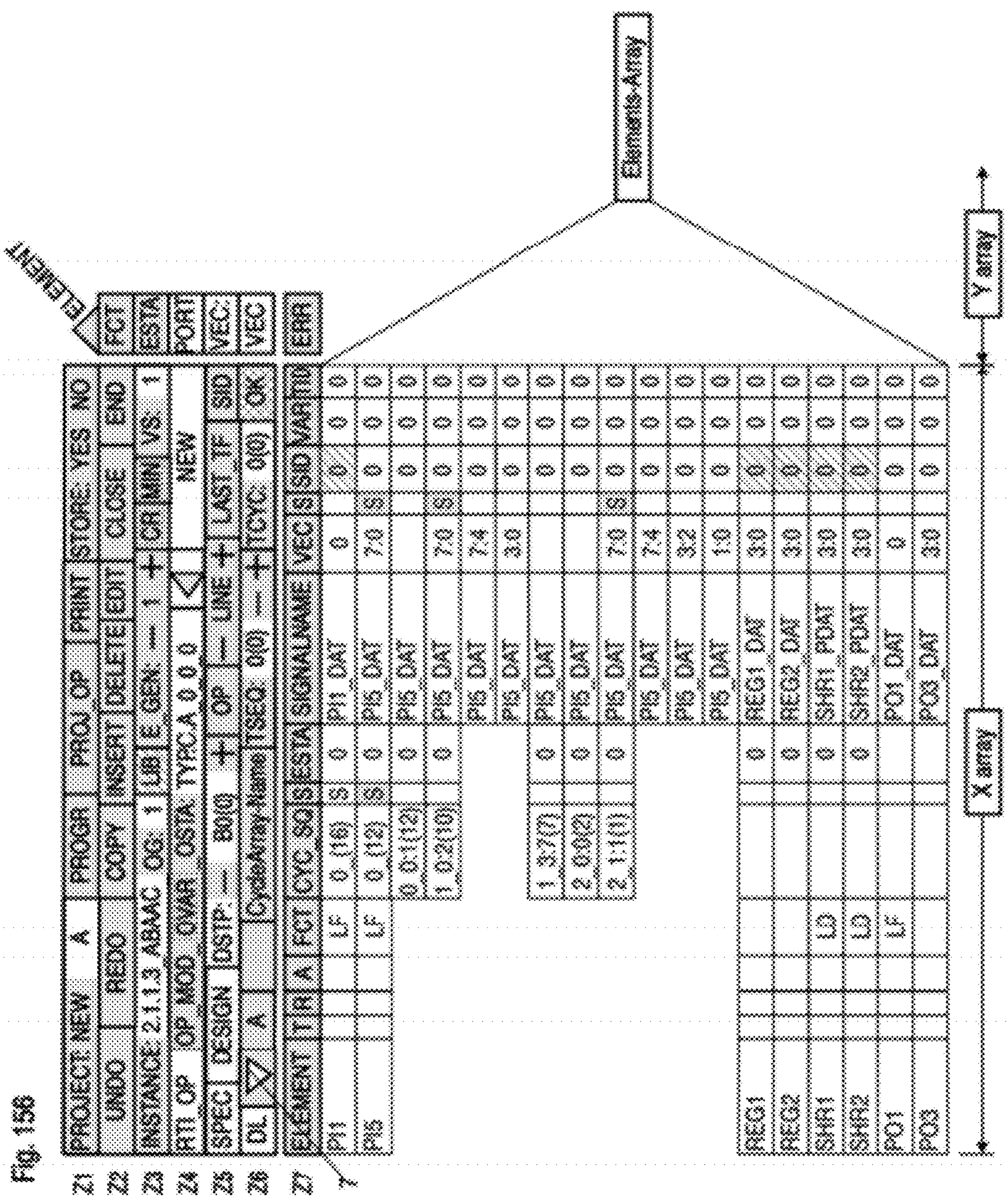
Figure 157:
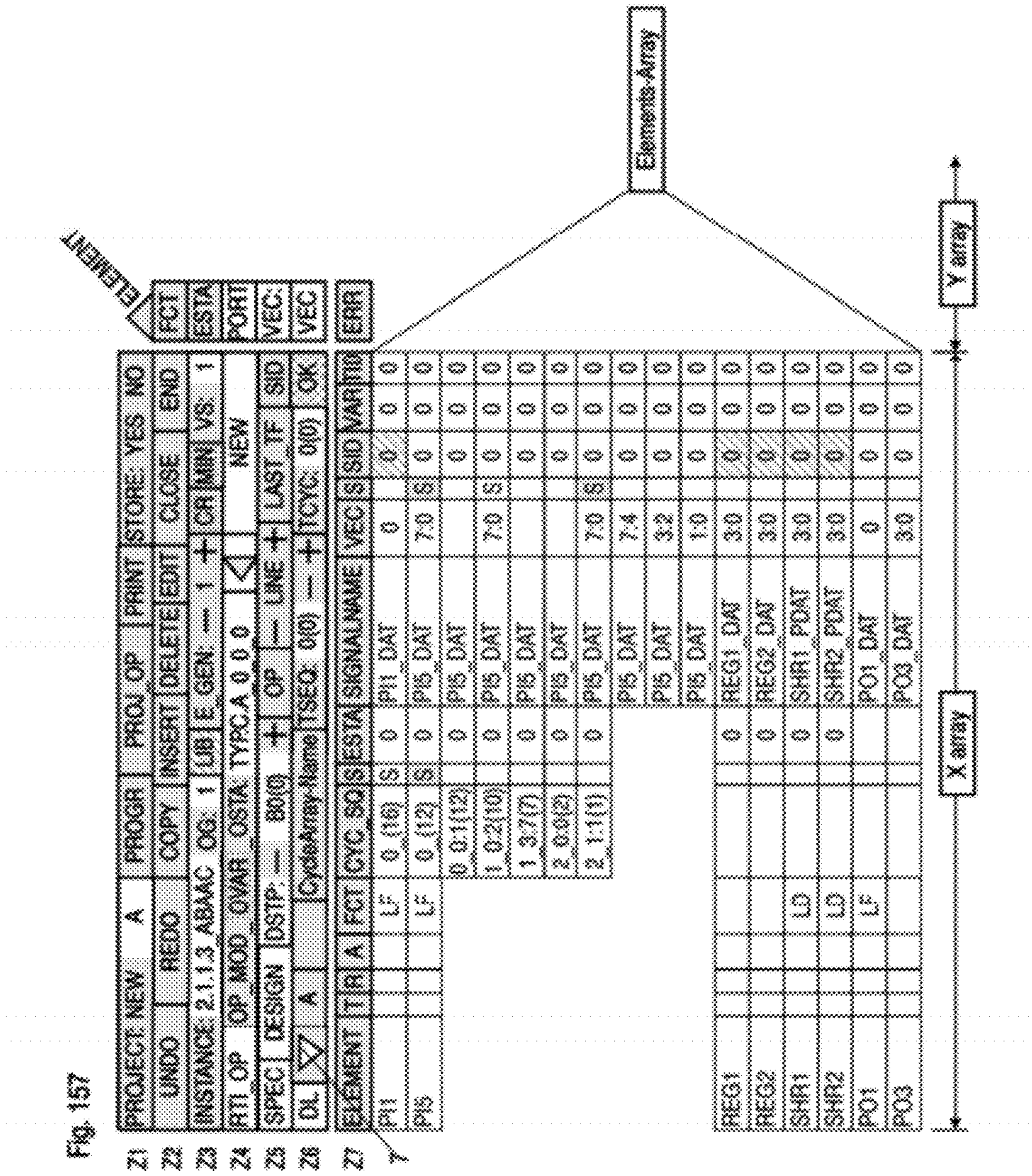
Figure 158:
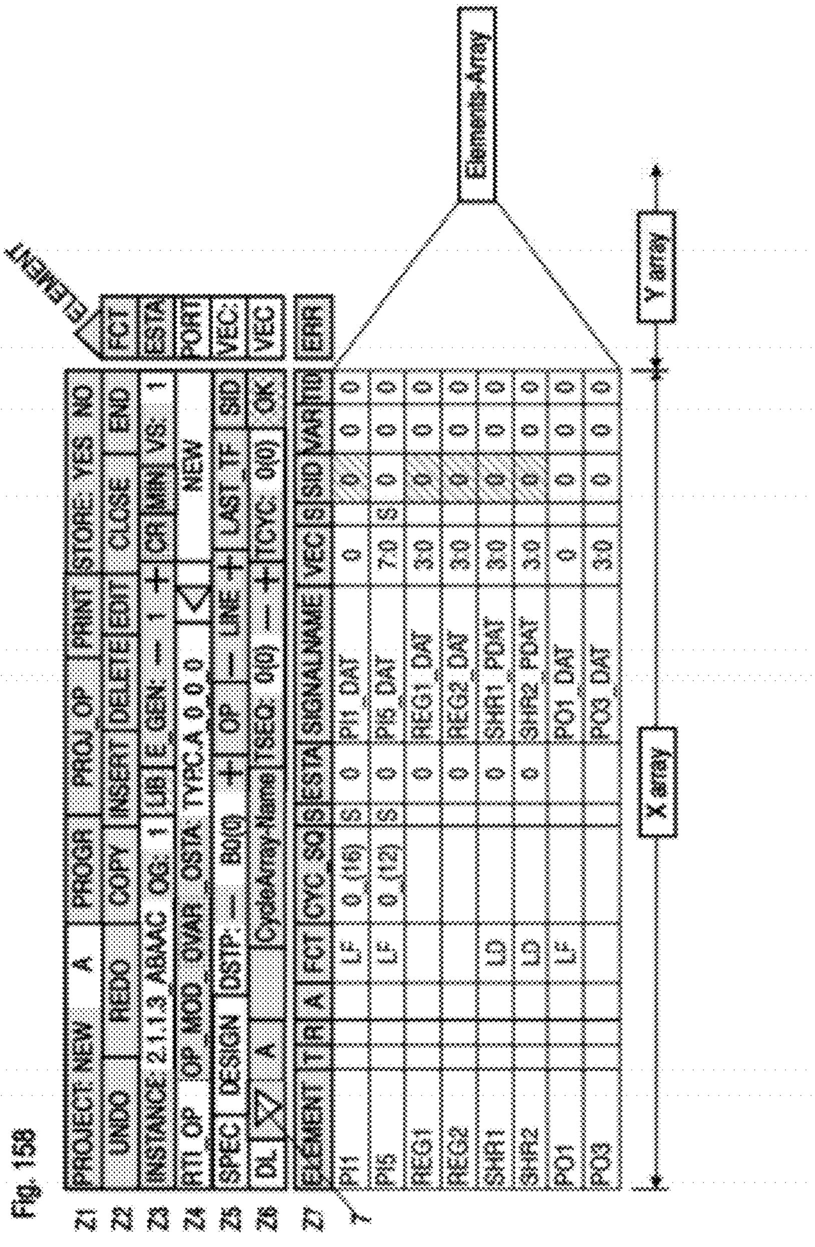

In FIG. 156, by clicking the button "OK" in "Z6" the buttons "LINE" in "Z5" and "SIGNALNAME", "VEC" and "S" in "Z7" are deactivated as well as all activated buttons are deactivated and unmarked in the columns "SIGNALNAME" and "VEC". Furthermore in the PI5 line and in the sequence splitting lines "1_0:2(10)" and "2_1:1(1)" in column vector splitting "S" an "S" was entered in each line. By clicking in a sequence splitting line on the column vector splitting "S" the corresponding vector splitting lines are switched off and the button "S" is unmarked, as shown for the sequence splitting line "1_0:2(10)" in FIG. 157. The "S" without marked background means, that the line holds a vector splitting, but does not display it. With a subsequent click on this button the "S" gets again a marked background and the vector splitting is indicated. In FIG. 157, by clicking the button in the PI5 line on column vector splitting "S", the PI5 vector splitting and PI5 sequence splitting are closed and the buttons "S" in the columns vector splitting "S" and sequence splitting "S" are deactivated and unmarked, as FIG. 158 shows.

Figure 159:
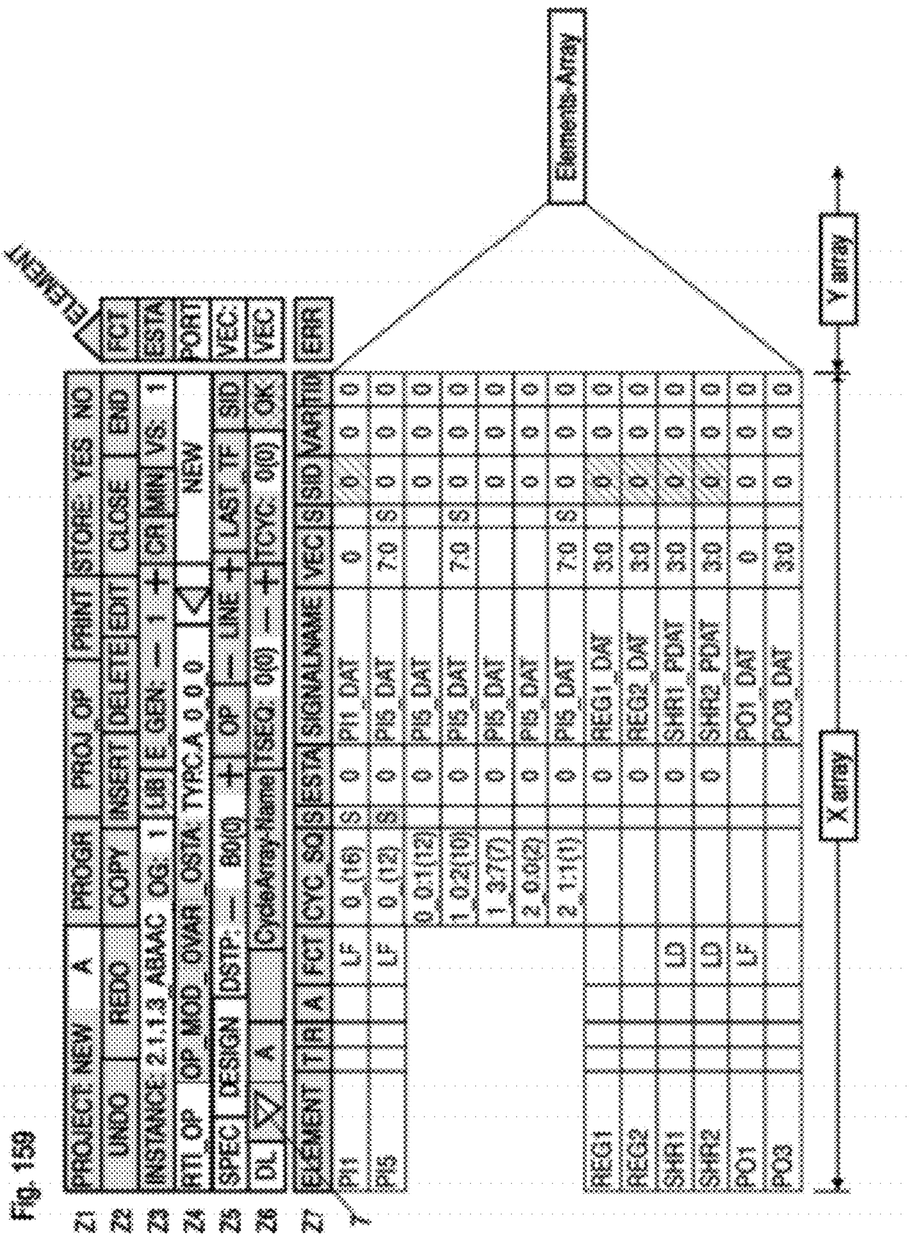
Figure 160:
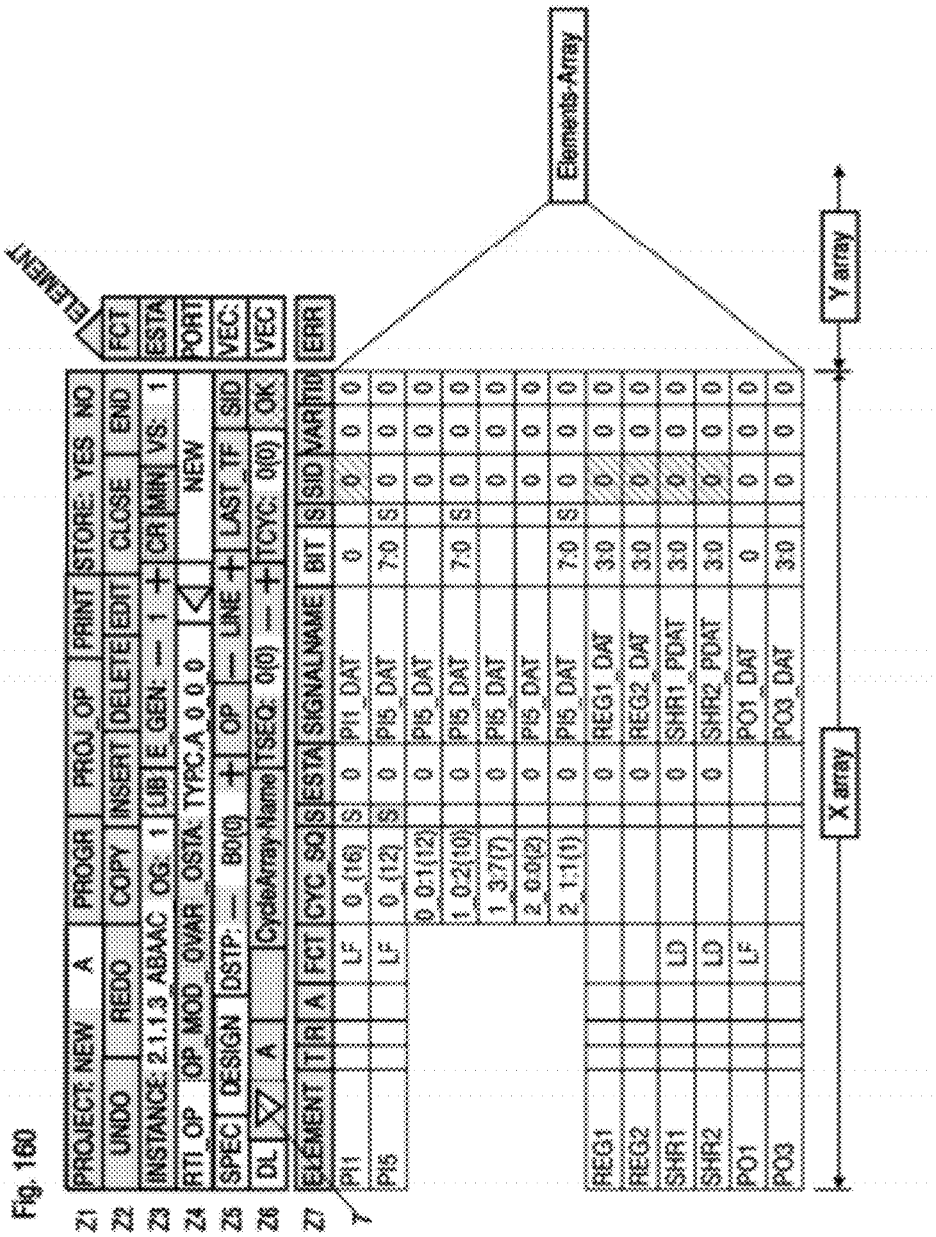
Figure 161:
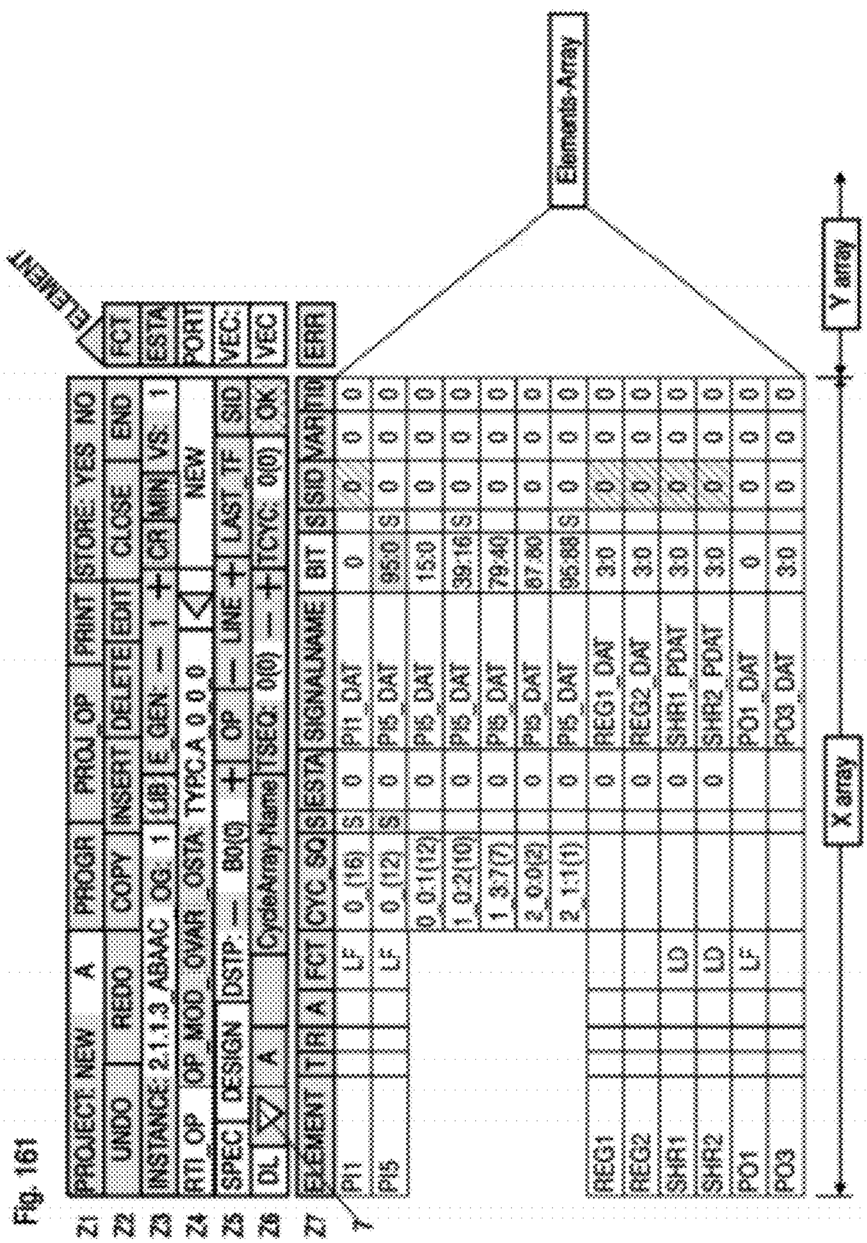
Figure 162:
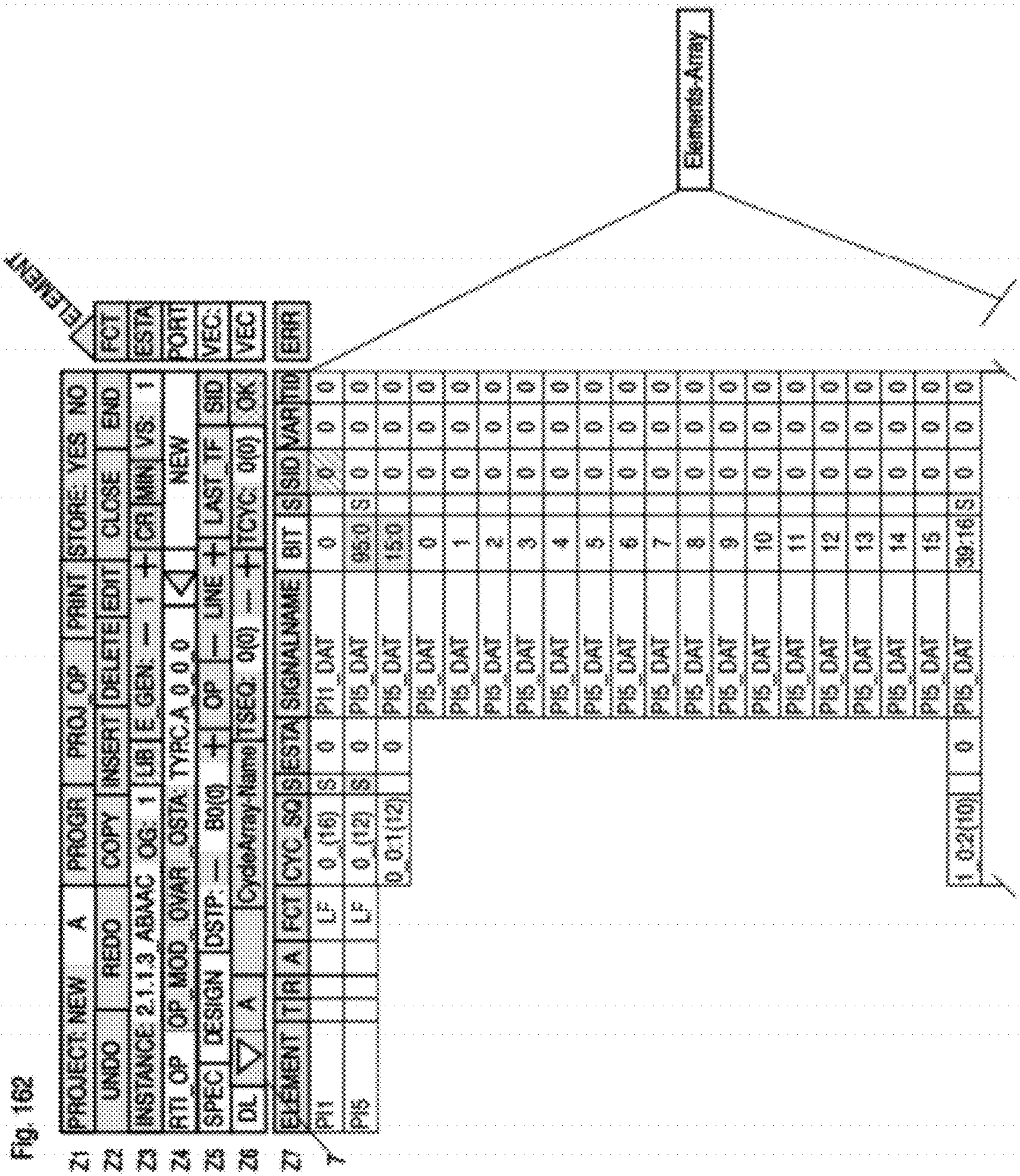

In FIG. 159 by clicking the button "S" of the PI5 line on column sequence splitting "S", the PI5 sequence splitting was opened. Preparing for the display of individual bits in a sequence array in FIG. 159 the button "VEC" in "Z7" was changed by clicking the button "BIT", as FIG. 160 shows. By a following click on the button of the PI5 line in column "BIT" for the PI5 sequence splitting the bit arrays and no longer the vector are indicated in column "BIT", as shown in FIG. 161. By clicking on the button of the sequence splitting line "0_0:1(12)" in column "BIT" below this sequence splitting line the lines with the bits "0" to "15" are indicated, as FIG. 162 shows. By a further click on the button of the sequence splitting line "0_0:1(12)" in column "BIT" the lines with the bits "0" to "15" below this sequence splitting line are switched off again. In FIG. 162 the lines below the sequence splitting line "1_0:2(10)" are not displayed any longer.

Figure 163:
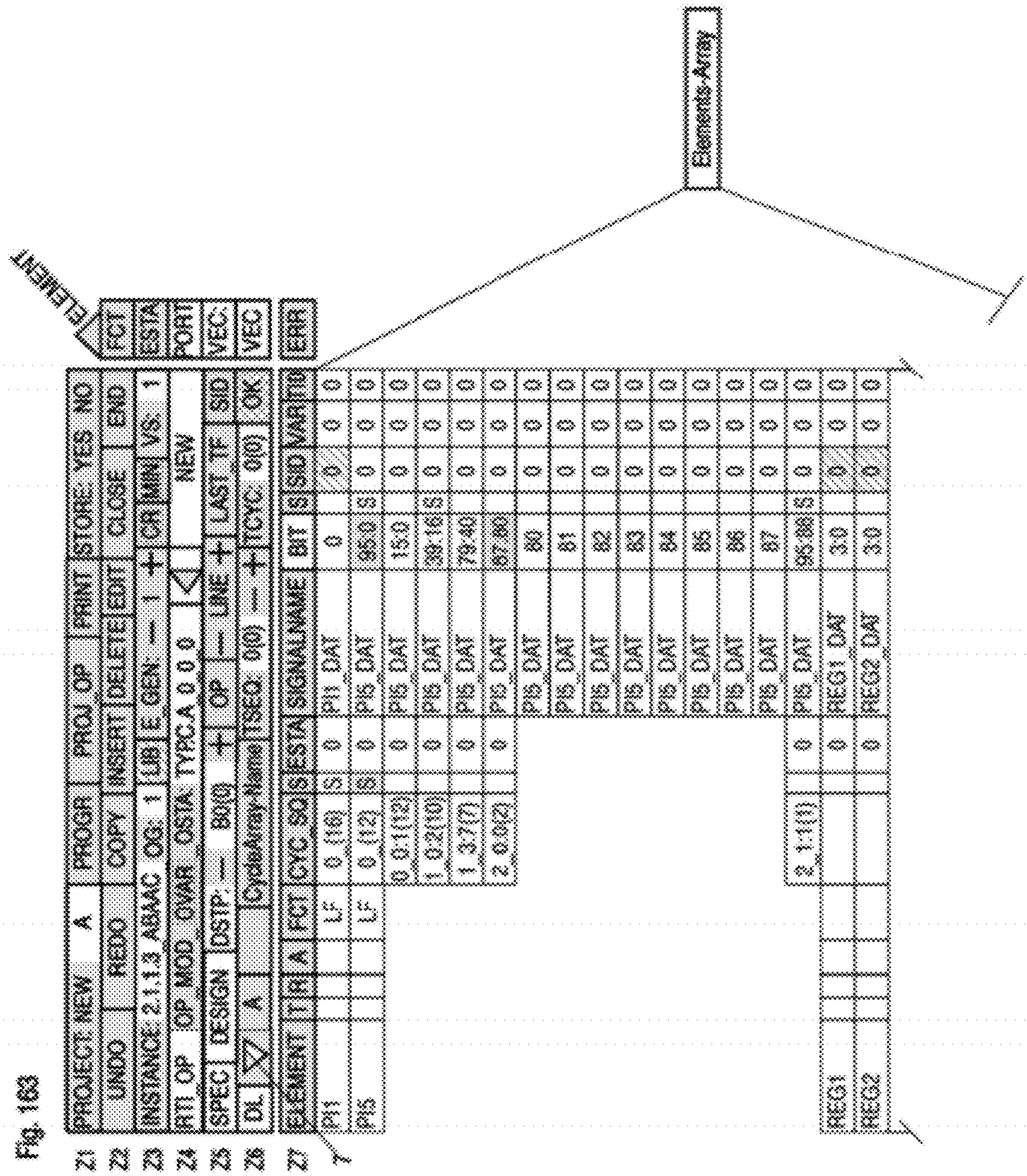

In FIG. 163 by clicking on the button of the sequence splitting line "2_0:0(2)" in column "BIT", below this sequence splitting line, the lines with the bits "80" to "87" are displayed. In FIG. 163 the elements below "REG2" are not displayed any longer. In the displays "sequence splitting" or/and vector splitting, with or without "bit display", corresponding dynamic signal names may be allocated, as explained before.

Description to FIG. 164*a*-194

In the following the functional features and attributes of the RTI operation display "RTI-OP-BS" for an RTI operation specification "RTI-OP-SP" are described.

Figures 164A, 164B:
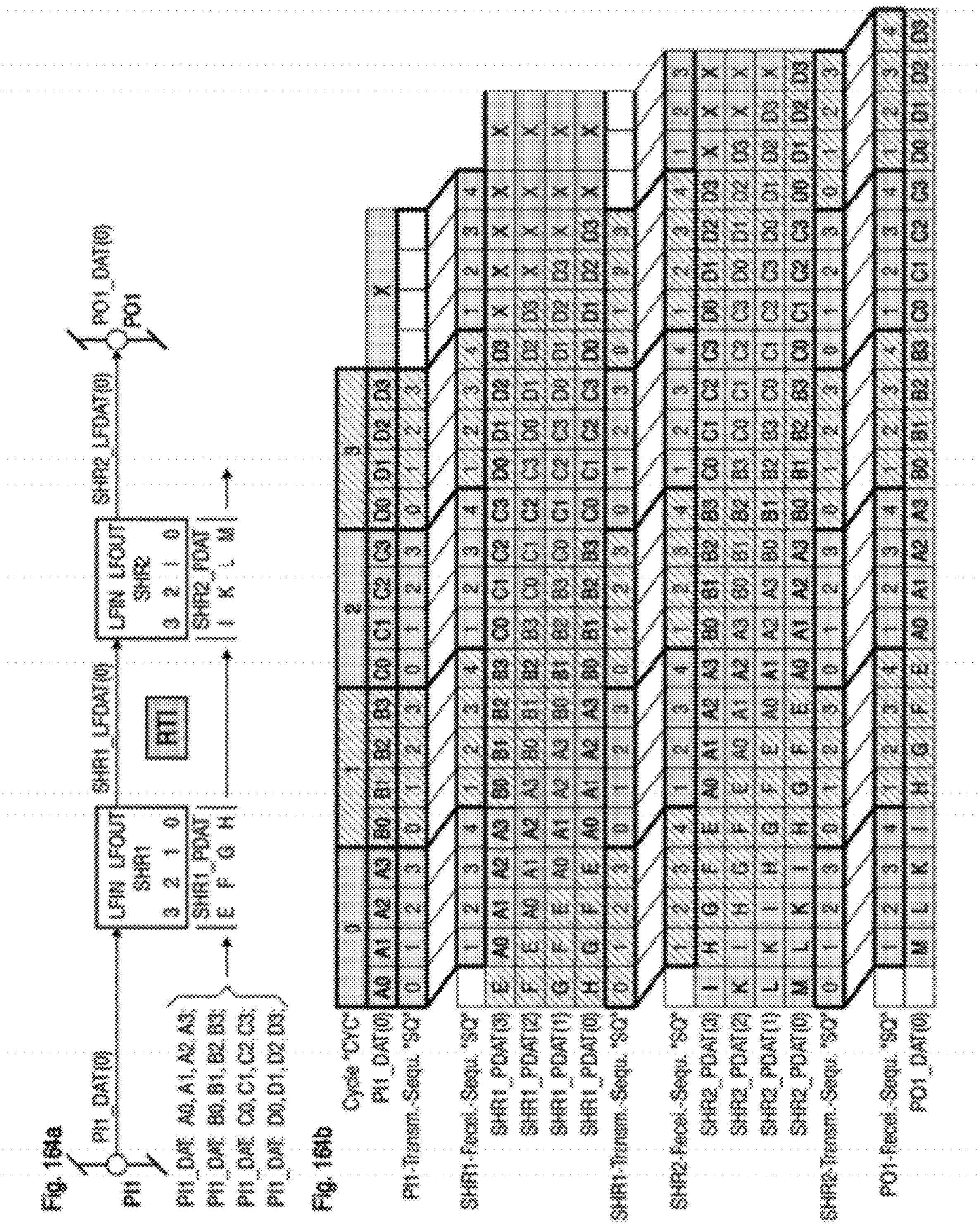

A first example for an RTI-OP-SP is illustrated in the block structure of FIG. 164*a*. The flow charts FIG. 164*b* to FIG. 164*e* show the data transfer of FIG. 164*a*. The block structure and the flow charts serve only for explanation and are not part of RTI-OP-BS or of the specification method "SPV".

In the block structure of FIG. 164*a* the transfer is effectuated with a data bit width=1, corresponding a vector "(0)" in four cycles with four sequences each, from input port "PI1" to shift register "SHR1", from shift register "SHR1" to shift register "SHR2" and from "SHR2" to the output port "PO1". The real data transfer in the block structure, FIG. 164*a*, is illustrated by the flow chart in FIG. 164*b*.

Figure 164C:
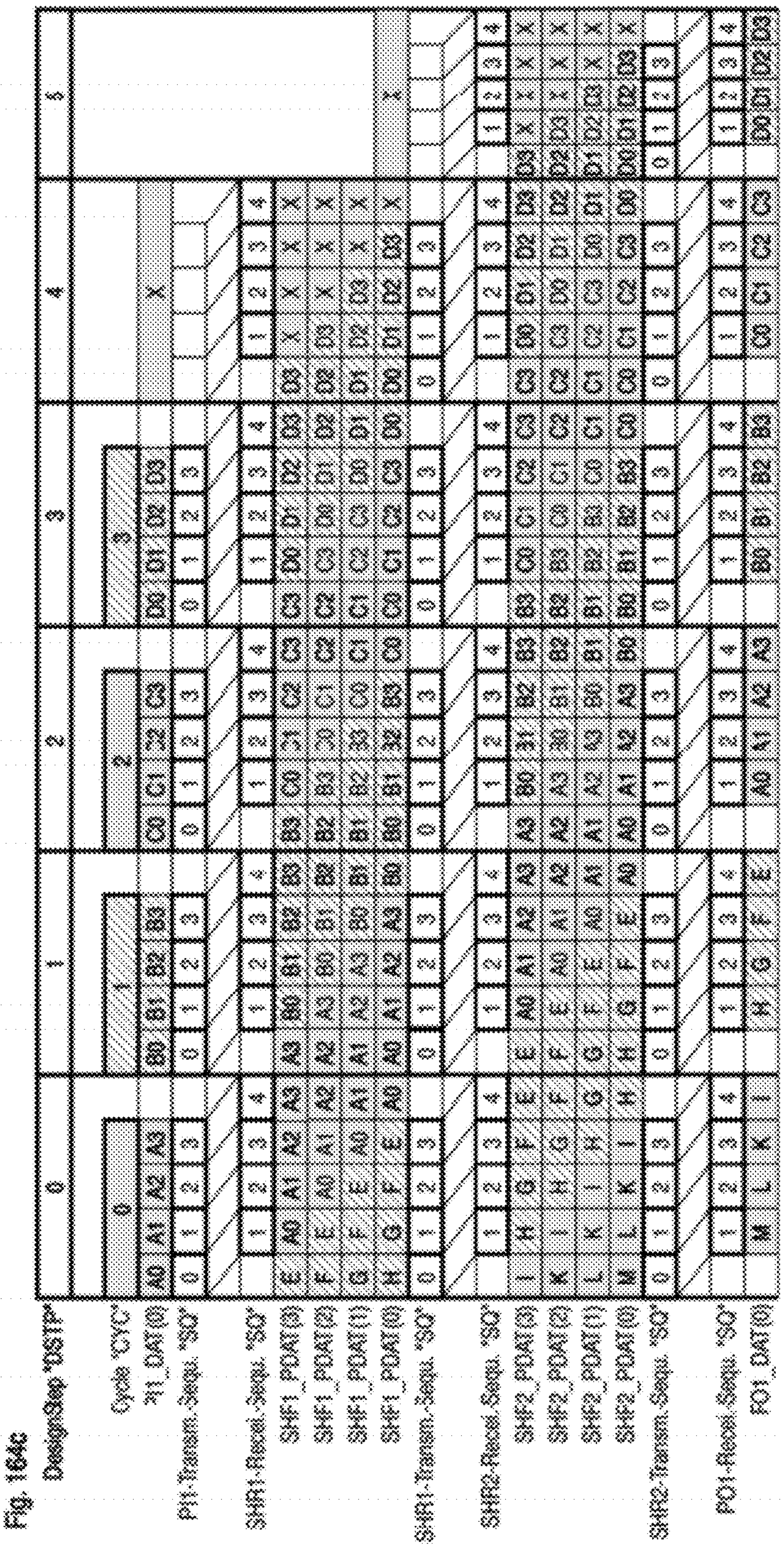
Figure 164D:
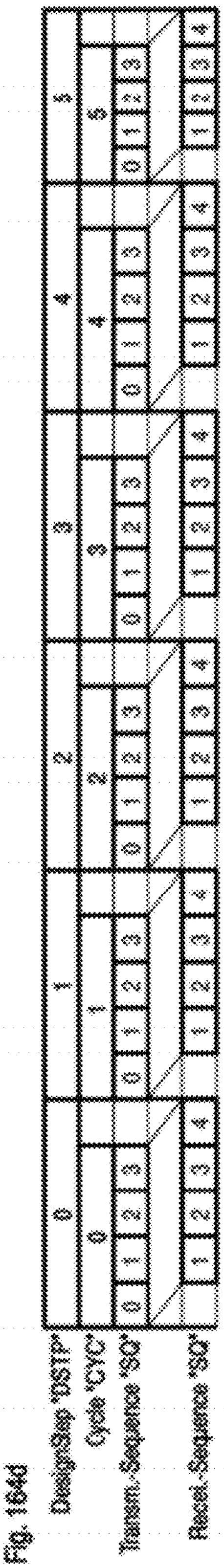

In FIG. 164*c* the real data transfer of FIG. 164*b* was structured for an "RTI-OP-SP". For that a so-called design step "DSTP" was introduced, which will be explained in detail later with the specification of the transfer of FIG. 164*a*. In FIG. 164*c* one "DSTP" contains, for example, three (3) data processing steps "DVSTPs": "DVSTP1" from PI1 to SHR1, "DVSTP2" from SHR1 to SHR2 and "DVSTP3" from SHR2 to PO1. The complete transfer is processed in the design steps "0" to "5", as FIG. 164*c* shows. In every cycle "CYC" the transmit sequence begins with zero "SQ=0", the receive sequence begins with one "SQ=1", as FIG. 164*d* shows. Generally applies, that data from a transmitter with the sequence "SQ=n" are received by a receiver with the sequence "SQ=n+1".

Figure 164E:
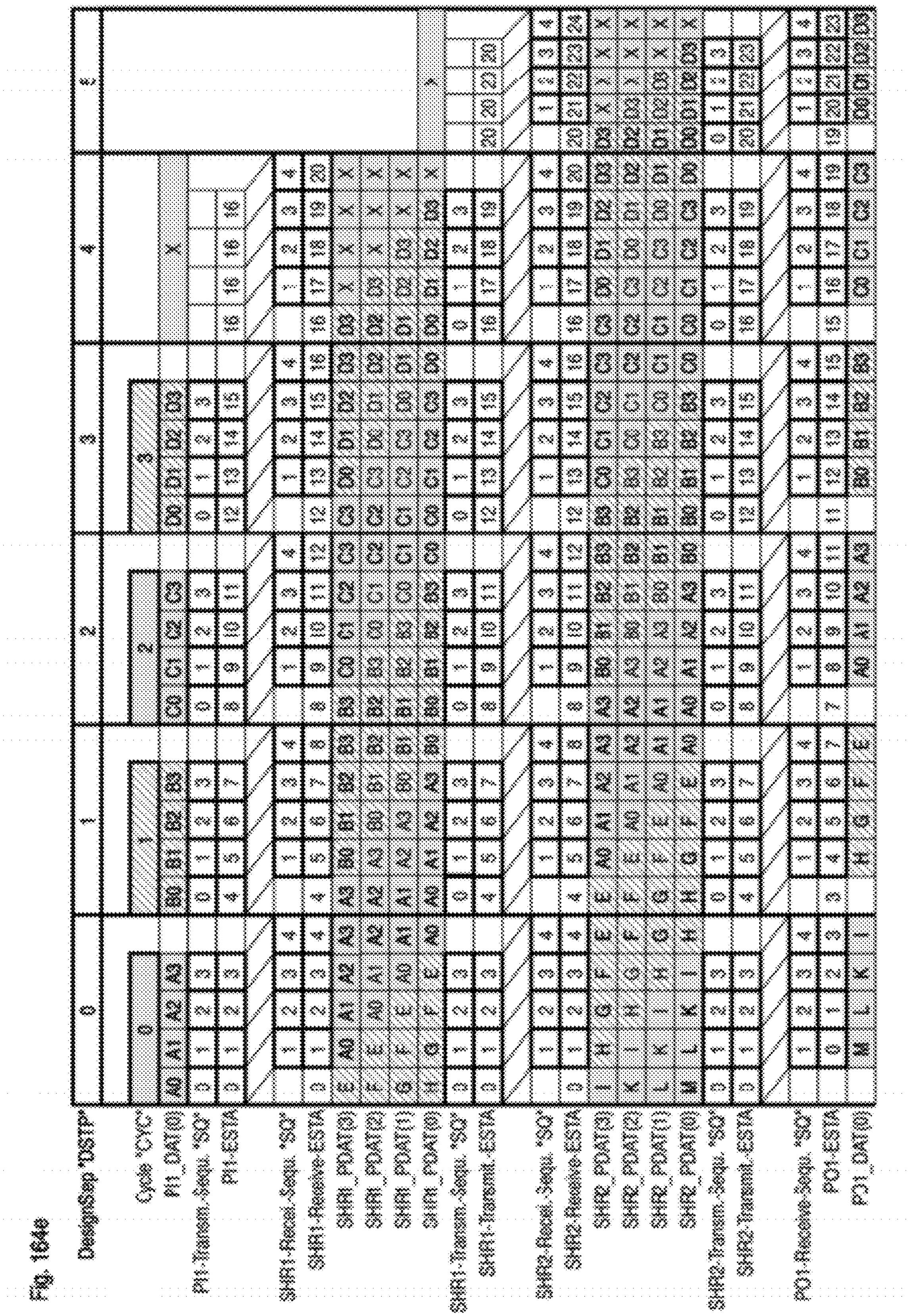

In FIG. 164*e* the transfer flow corresponds to that of FIG. 164*c*, but the element state "ESTA" was added to the illustration. Subsequently the RTI transfers of the block structure in FIG. 164*a*, corresponding to the flow in FIG. 164*e*, will be specified on the basis of the RTI-OP-BS displays in FIG. 165 to FIG. 194.

Figure 165:
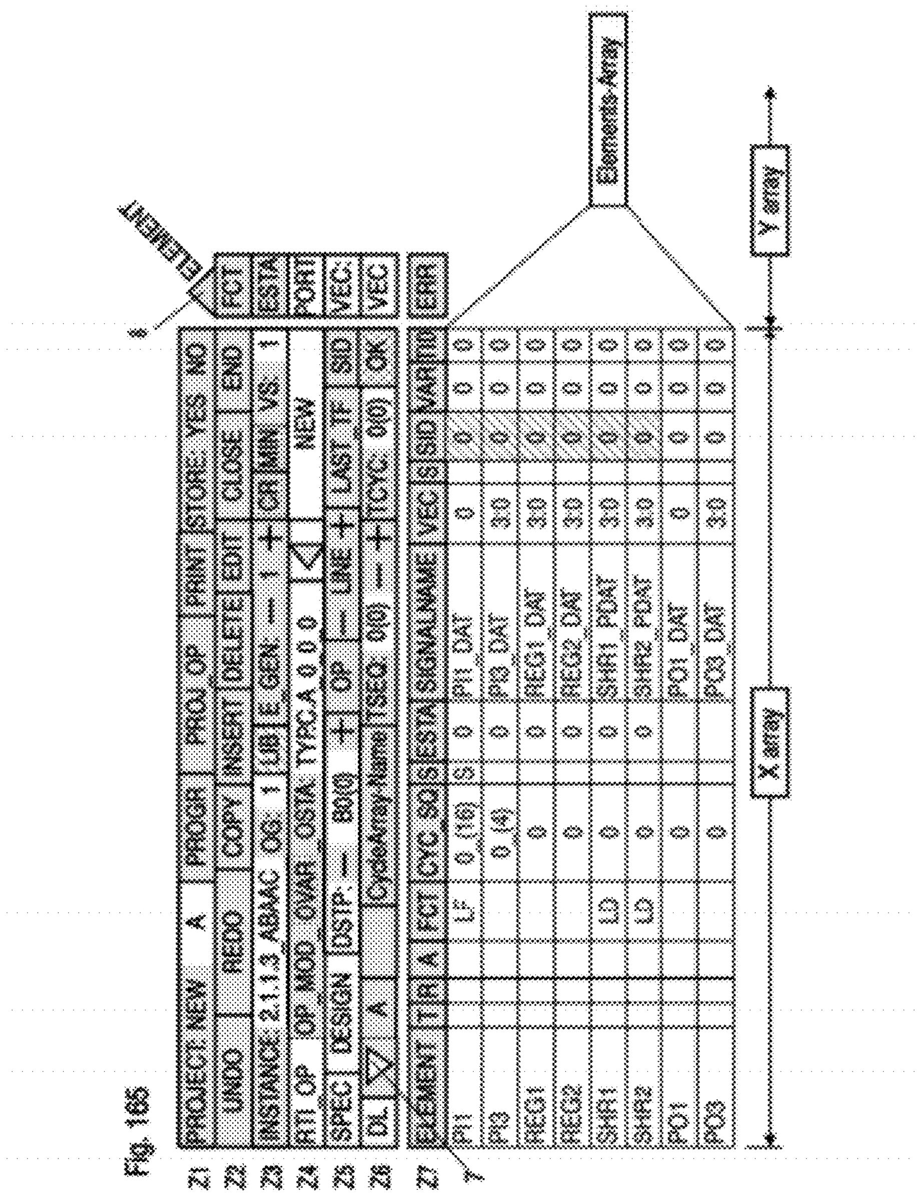
Figure 166:
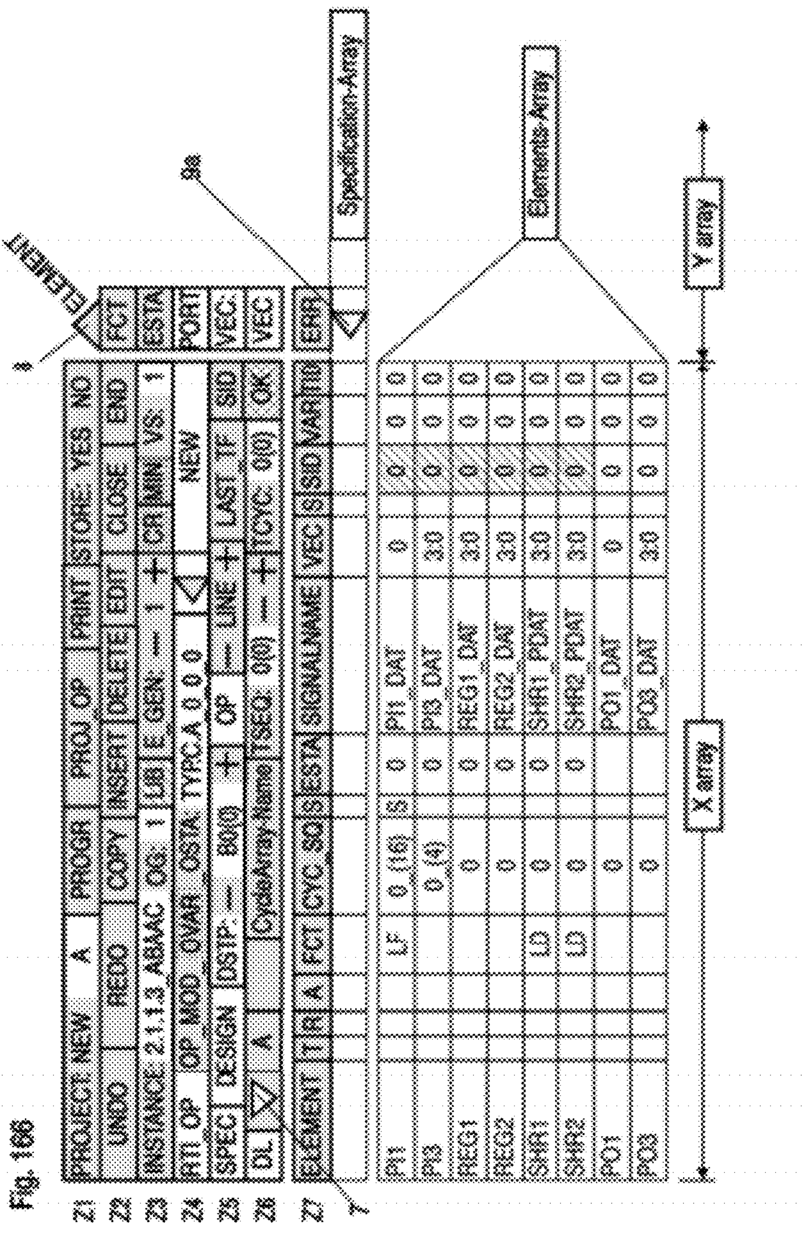

FIG. 165 shows amongst other things the elements "PI1", "SHR1", "SHR2" and "PO1" of the block structure in FIG. 164*a*. The shift registers "SHR1" and "SHR2" are automatically set to FCT=LD before a specification starts and therefore they have no entry in column "CYC_SQ" between the brackets for the maximum sequence "SQ". The RTI operation to specify, for example, has in line "Z4" the entry "OP_MOD_OVAR_OSTA: TYP.C.A_0_0_0". This operation has the entry "NEW" in line "Z4", i.e. it is generated newly and is not derived from an existing operation. In line "Z5" the button operation "OP" is still passive and the design step still is on the initial state "DSTP:B0(0)". "B0" means the beginning "B" of the first design step "0", the value between brackets "( )" stands for the so far executed, maximum design steps, in the example it is the first design step with the value zero between brackets "(0)". The buttons in "Z5", specification "SPEC" and design "DESIGN" are already prepared for an RTI-OP-SP by the request of design level "DL" in "Z6". An RTI-OP-SP begins by clicking the button "OP" in "Z5", which is activated by this, as FIG. 166 shows. With the activation of "OP" below of line "Z7" automatically the first line of the "specification area", which is generally reserved to a receiver element, is indicated.

Figure 167:
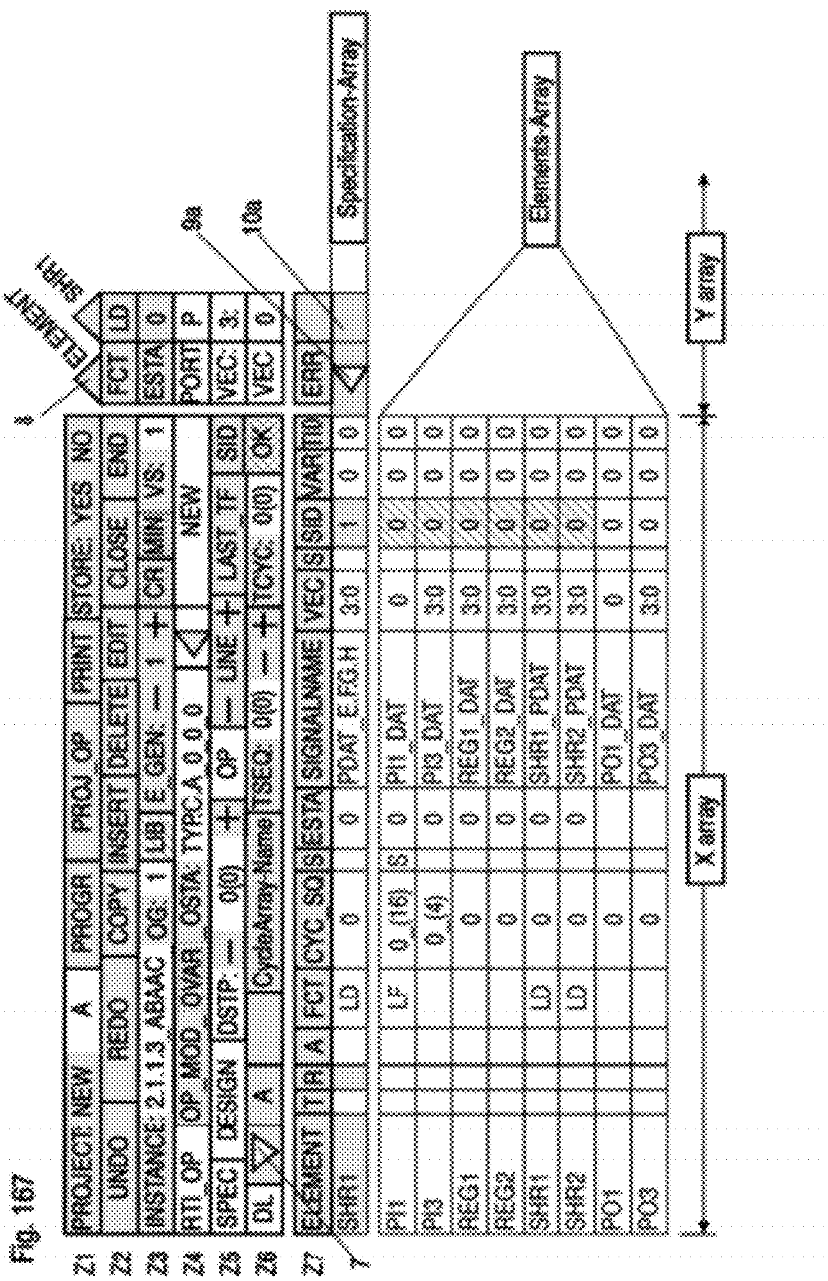

In the example of FIG. 167 "SHR1" is the receiver element of the first data processing step "DVSTP1". The transfer of a receiver element from the element array to the specification area is done by clicking in the element array on the button of the corresponding element line in the column "R" (receiver), in the example of FIG. 167 this was the element line "SHR1". The receiver element in the specification array is automatically activated and marked on the buttons of the columns "ELEMENT" and "R". Generally the dynamic signal name with the highest SID number is automatically entered, in the example this is "PDAT_E.F.G.H" with "SID=1". In case, that no dynamic signal name has existed yet, the static signal name with "SID=0" is entered automatically for a receiver in the specification array. The entries in the specification array in the columns "FCT", "CYC_SQ", "ESTA", "VEC", "VAR" and "TID" are adopted from the element array. With the first receiver transfer in the X array from the element array to the specification array in the DSTP display the "B" is automatically switched off, i.e. the "DSTP" is in progress, in the example of FIG. 167 the "DSTP" in "Z5" changes from "B0(0)" to "0(0)". With a transfer of a receiver element in the X array from the element array to the specification array, the receiver element is automatically displayed in the Y array; in the example of FIG. 167 this is the "SHR1". While the element lines in the X array represent exclusively element output signals, the receiver elements in the Y array hold only element input signals. The illustration of a receiver element in the Y array is organized in lines by the element column "8". It means: denoted diagonally on the edge of the triangle the element type, in the lines from high to low: Element function "FCT", element state "ESTA", input port type "PORT", the most significant input vector digit "VEC:", the least significant input port vector digit "VEC". According to that the resulting entry, FIG. 167, in the Y array for the receiver element "SHR1": FCT=LD, ESTA=0, PORT=parallel port "P", VEC:=3, VEC=0. As FIG. 167 shows, the direction of the data processing for an element, "input port" in the Y array to "output port" in the X array, is indicated by the arrow 9*a* on a marked background together with the marked "coordinates field" 10*a*. Thus the specified data processing steps "DVSTPs" can be indicated in a well arranged way in the matrix of the X/Y array, as it is shown later.

Figure 168:
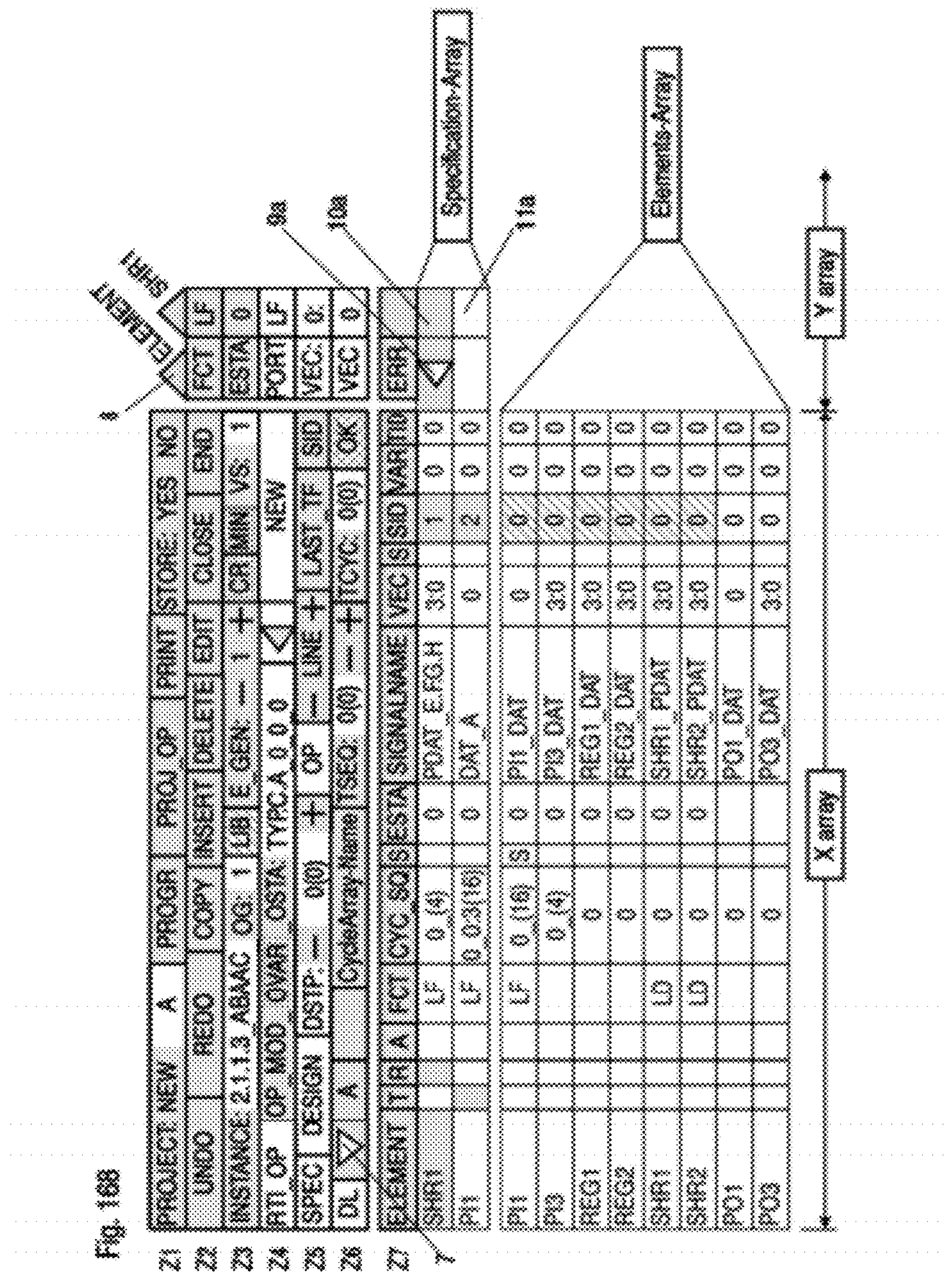

The transfer of a transmitter element from the element array to the specification array is done by clicking in the element array on the button of the corresponding element line on the column "T" (transmitter), in the example of FIG. 168 this is the element line "PI1". For the transferred transmitter element "PI1" in the specification array automatically the button in column "T" is activated and marked and in column "CYC_SQ" the first cycle "CYC=0" is entered with its sequence array "SQ=0:3" and its still full, maximum sequence or streaming number "(16)", as it was defined before manually and which is shown in FIG. 147. Furthermore for "CYC_SQ=0_0:3" the prepared, corresponding dynamic signal name with its SID number is automatically displayed, in the example this is "DAT_A" with "SID=2".

The dynamic signal names for "PI1" can already be indicated in the element array and can be allocated to "CYC_SQ", as shown above. In case, that one transmitter, for example PI1, has two or more sequence arrays for CYC=0, then for the first DVSTP of PI1 the first sequence array is automatically displayed in the specification array. During the next following DVSTP of PI1 in the same DSTP again the first sequence array or the second sequence array can be needed. Therefore then in the specification array all PI1 sequence arrays for "CYC=0" are displayed and either the first or the second sequence array is selected manually. If the second PI1 sequence array was selected, then a selection has to be done for the following DVSTP in the same DSTP between of the second or the third PI1 sequence array, etc. The manual selection of a sequence array in the specification array is done by clicking on the button in the selected sequence array in column "CYC_SQ", which is activated and marked by that. By a following click on the button of the selected sequence line in column sequence splitting "S" the selected sequence array is allocated to the PI1 line, the remaining PI1 sequence arrays are switched off in the specification array. The selection procedure for the transmitter sequence arrays applies for all DSTPs and CYC-values. If a transmitter still holds no dynamic signal name in the specification array, then a dynamic signal name can be entered as described before, or the static signal name is inserted automatically as dynamic signal name with "SID=1".

A receiver with only one data input port adopts always with an acknowledged data processing step "DVSTP", the dynamic signal name of the transfer transmitter, as it will be shown later. If with one "DVSTP" a receiver gets transfers of more than one transmitter, then a dynamic receiver output signal name can be generated, as shown later.

In the specification array in column "FCT" of the X array, FIG. 168, for the receiver element "SHR1" the function "LF" was selected and set. Hereby, for the "SHR1" is automatically indicated, in the X array, in column "CYC_SQ" the maximum sequence "(4)" and in the Y array the adoption of FCT=LF, PORT=LF and VEC=0:0. In the X array for a shift register, independent of its function in column "FCT", the data of the parallel output port are indicated in the columns "SIGNALNAME" and "VEC", in the example in FIG. 168 these are the dynamic signal names "PDAT_E.F.G.H" and the vector "3:0". Hereby an easier, enhanced survey over the resulting data is achieved, independent of the shift register function.

Figure 169:
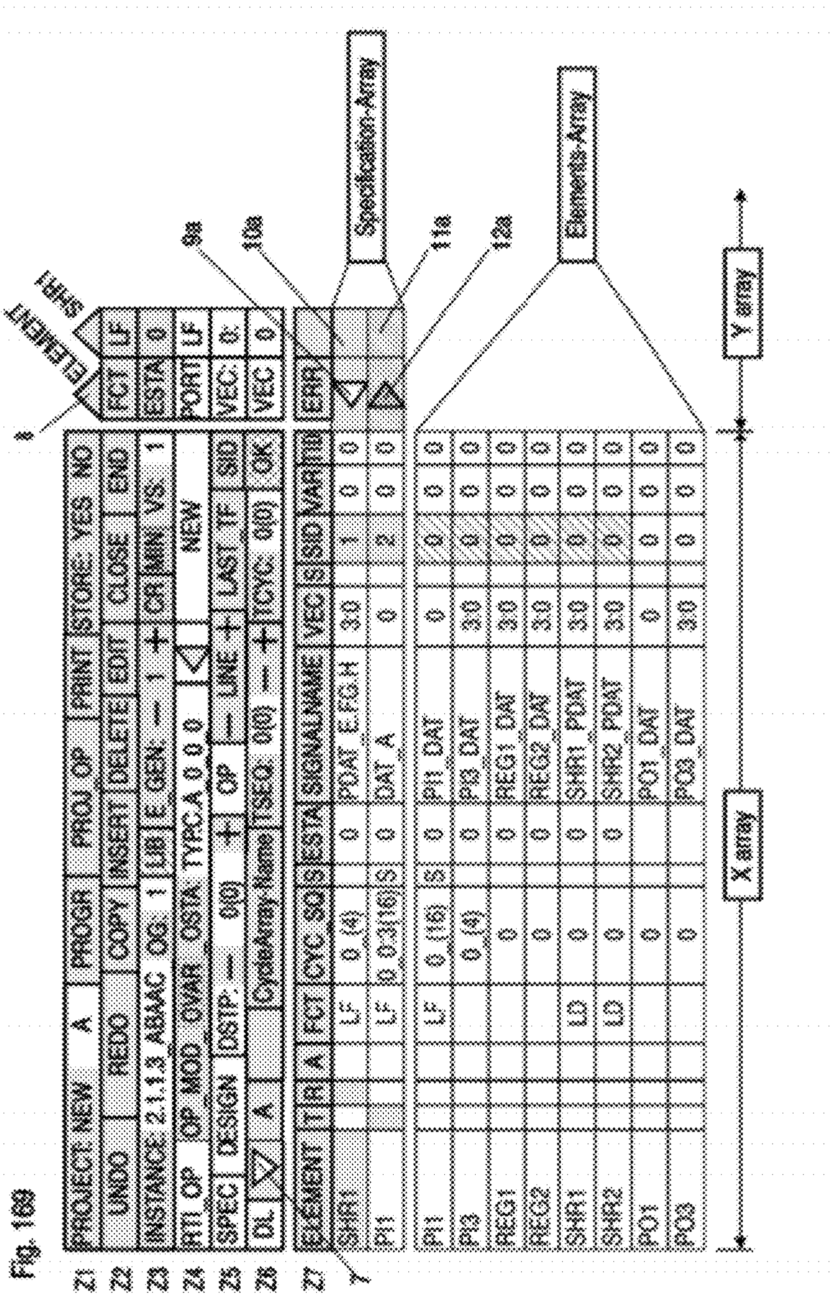

As shown in FIG. 168, the element array remains unchanged during a transfer of a receiver element or of a transmitter element from the element array into the specification array. If a receiver element, for example "SHR1" in FIG. 168, should be removed from the specification array before acknowledging of the data processing step "DVSTP", then that is achieved by clicking on the button of SHR1 line on column "ELEMENT". Thereby again an empty receiver line below the line "Z7" arises, an already existing transmitter line remains unchanged. If a transmitter element, for example "PI1" in FIG. 168, should be removed from the specification array before acknowledging of the data processing step "DVSTP", then that is achieved by clicking on the button in the PI1 line in column "T". Thereby the complete transmitter line is removed of the specification array. The allocation of the PI1 output signals to the SHR1 input port is done by clicking on the "coordinate field" 11*a*, which hereby, for example, is marked hatched, as FIG. 169 shows. With that the coupling of the transmitter "PI1" in the X array to the receiver "SHR1" in the Y array is indicated by the automatic generation of the arrow 12*a*, which points to the coordinate field 11*a*. The area of arrow 12*a* is, for example, marked all over and is displayed on a hatched background.

Figure 170:
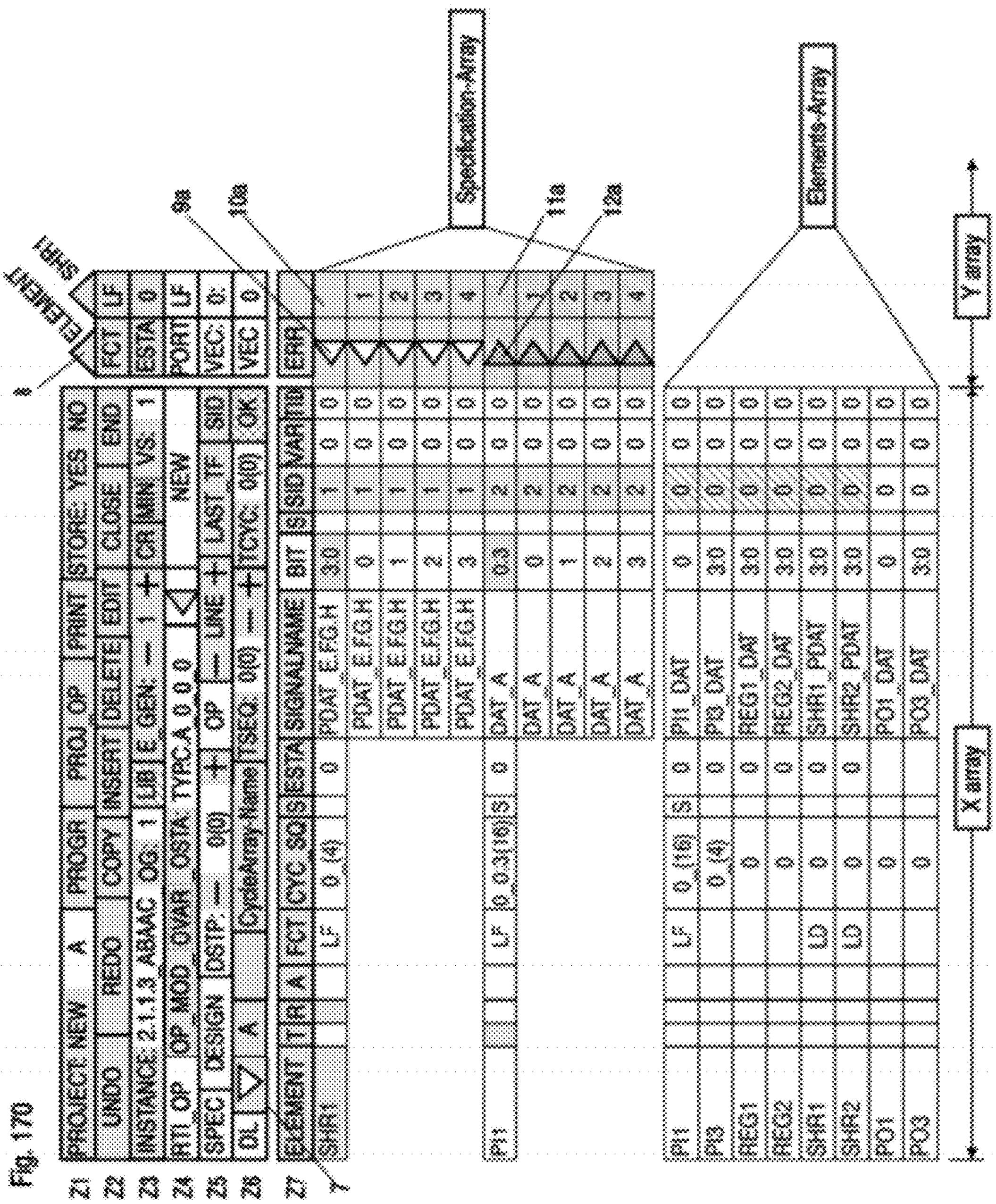

In FIG. 170 "SHR1" and "PI1" were switched to the bit display. Thereby generally the bit allocation of the receiver to the transmitter is effectuated in the receiver column of the Y array, in the example in FIG. 170 with the digits "1 to 4". If PI1 would transmit the bit streaming with "MF" and if the SHR1 function would be "LF", then the bit allocation PI1/SHR1 would be 3/0, 2/1, 1/2, 0/3. The element lines of "SHR1" and "PI1" which were selected for the bit display, hold in the column "BIT" exclusively bit arrays, no vector arrays. Of a shift register, in the example "SHR1", generally the parallel output port is displayed, as explained above. The parallel output bits hold the same order in the VEC and BIT display. At the input port "PI1" in the PI1 line in column "BIT", FIG. 170, the bits for "FCT=LF" are arranged in the order of the bit streaming as "0:3", for "FCT=MF" in the order "3:0".

Figure 171:
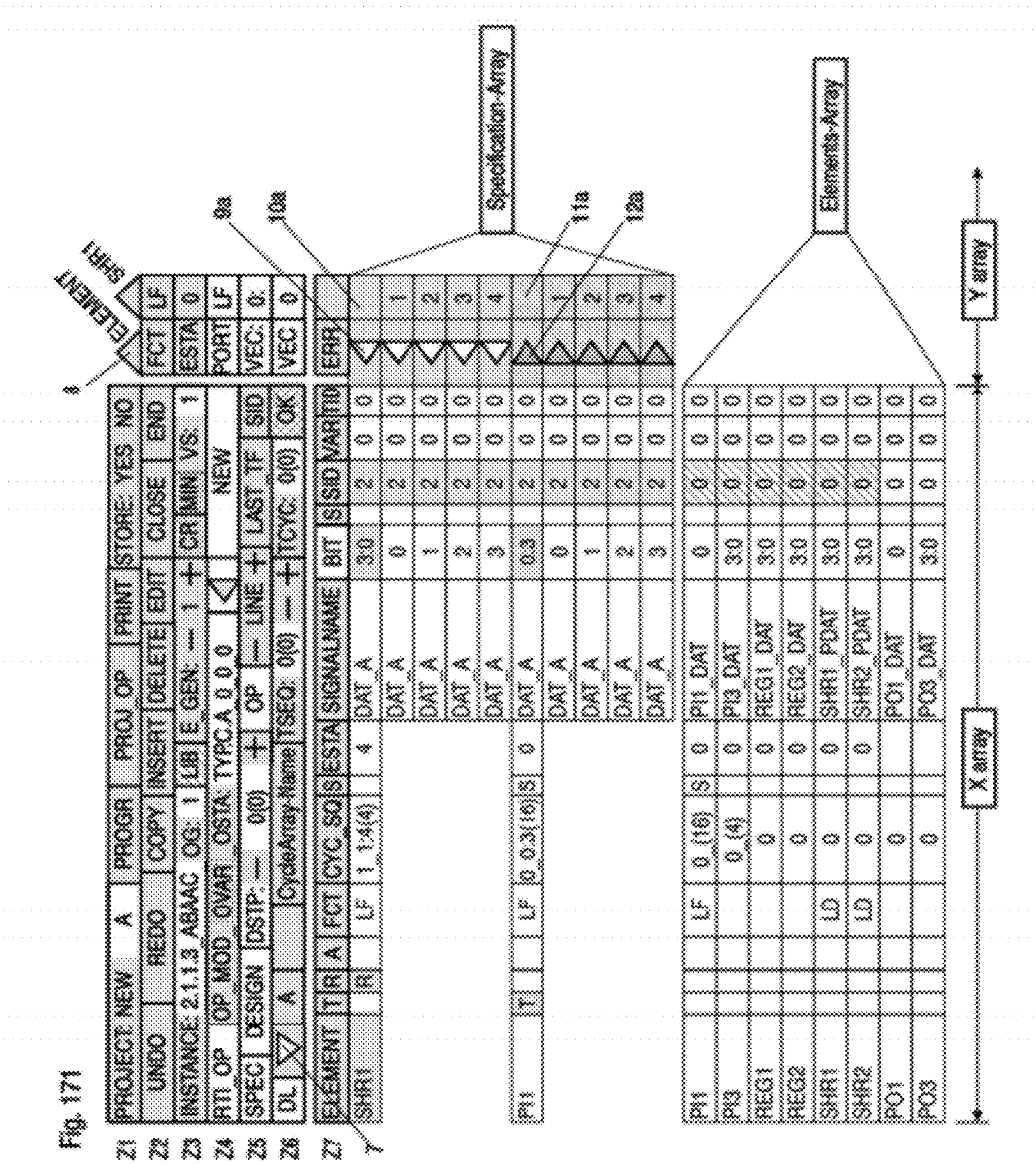

In FIG. 171 the transfer from "PI1" to "SHR1" was acknowledged by clicking the button of the SHR1 line, in column "R". With this, in the specification array, the PI1 transmit data with their dynamic signal names are adopted by the receiver "SHR1" and the "SID" is accordingly automatically increased by one and furthermore for "SHR1" in column "R" the receive indication "R" and for "PI1" the transmit indication "T" in column "T" are automatically entered. Additionally in the specification array, in the receive element "SHR1" in column "CYC_SQ" the cycle is increased from "0" to "1" automatically and the receive sequence array is inserted as "SQ=1:4", as well as in column "ESTA" the new element state "ESTA=4" is generated and displayed automatically. The entries of the transmitter in the specification array, in the example this is the PI1 line, remains unchanged.

Figure 172:
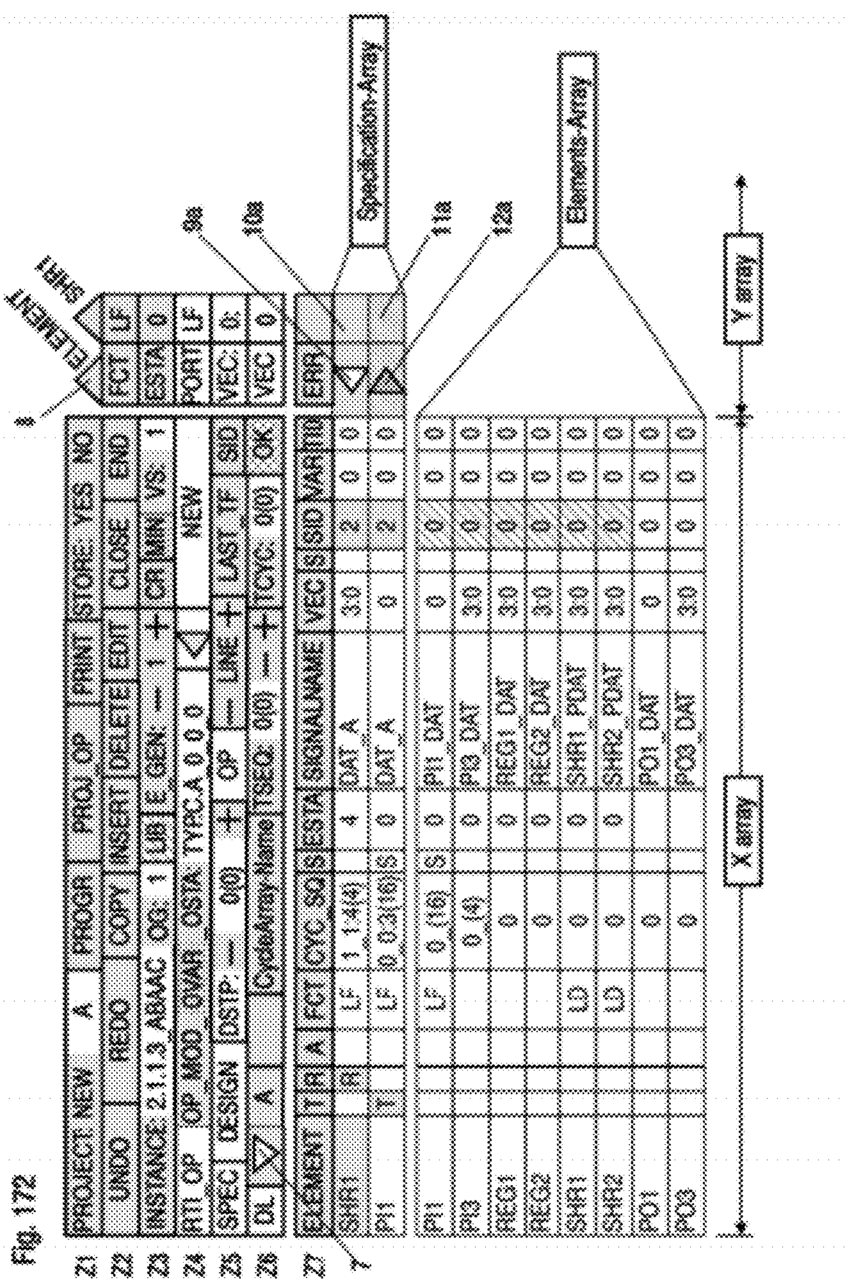

By clicking the button "BIT" in "Z7" the display is switched again to "VEC", as FIG. 172 shows. In FIG. 171 by clicking the button on column "BIT" of the SHR1 line or/and of the PI1 line the bit lines "0" to "3" can be switched off, the buttons thereby are deactivated and unmarked. If in the specification array, FIG. 172, an already acknowledged "DVSTP" should be modified, then by clicking on the button in the receiver line in column "R", the acknowledgement is deleted again. Alternatively the acknowledgement of a "DVSTP" can be deleted by clicking the button "UNDO" in "Z2". With that any modifications can be effectuated in the specification array, as described before.

Figure 173:
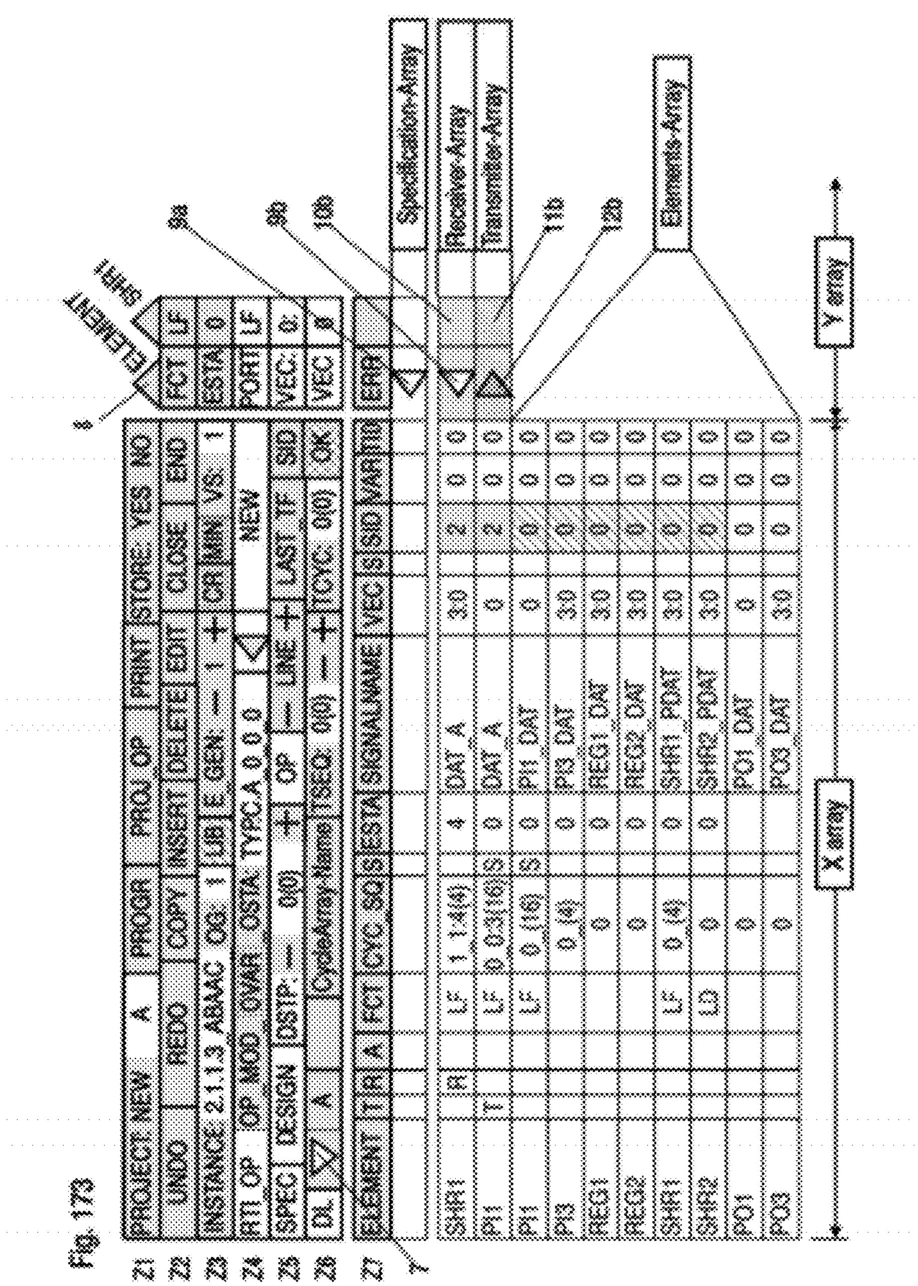

Because in the first design step "DSTP0" the first data processing step "DVSTP1" is terminated, by clicking on the button of the receive line "SHR1" in column "ELEMENT", the SHR1 line is moved automatically from the "specification array" to the "receiver array" and the PI1 line is moved from the "specification array" to the "transmitter array" as shown in FIG. 173. Thereby an empty line arises again below the line "Z7" in the specification array. In the receiver array in column "R" and in the transmitter array in column "T" the entries are indicated, for example, without marks. The arrow 9*a* and the coordinate field 10*a* of the SHR1 line in the specification array, FIG. 172, are denoted in the receiver array, FIG. 173 as arrow 9*b* and coordinate field 10*b*, the arrow 12*a* and the coordinate field 11*a* in the PI1 line in the specification array, FIG. 172, are denoted in the transmitter array as arrow 12*b* and coordinate field 11*b*, FIG. 173. For the elements, which were involved in the element transfer from specification array to receiver/transmitter array, FIG. 173, in the element array an automatic adaptation of the function is effectuated, in the example for SHR1 the function is changed from "LD" to "LF". The reason for this adaptation is: During one "DSTP" an element can be used with only one function.

If a DVSTP should be modified or cancelled, whose elements are already located in the receiver or/and in the transmitter array, then the elements must be moved out of the receiver array or/and transmitter array to the specification array again. This is done by clicking the button of the selected receiver line in column "R" in the receiver array. Thereby the transmitters belonging to the DVSTP are transferred to the specification array, too.

Figure 174:
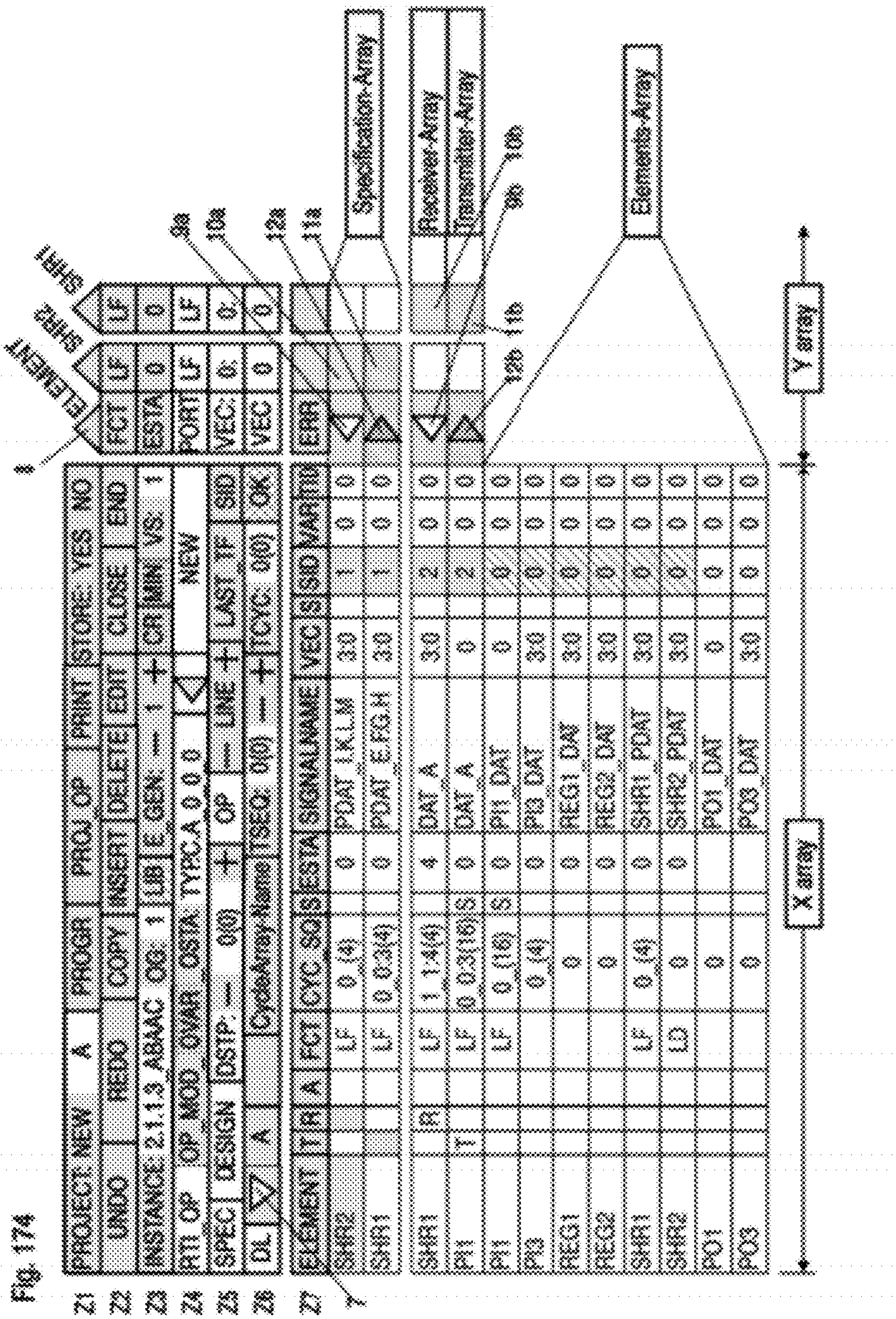
Figure 175:
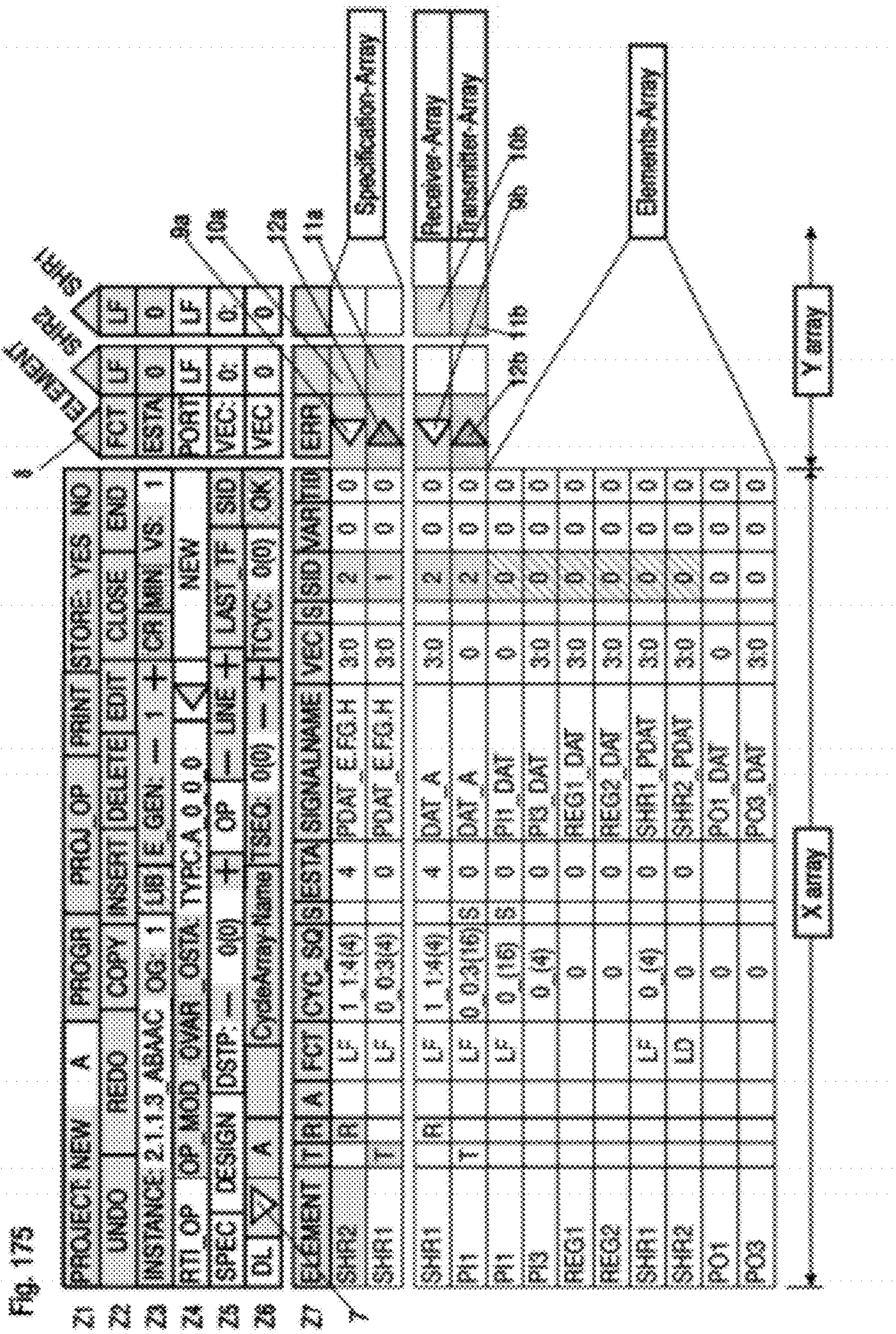
Figure 176:
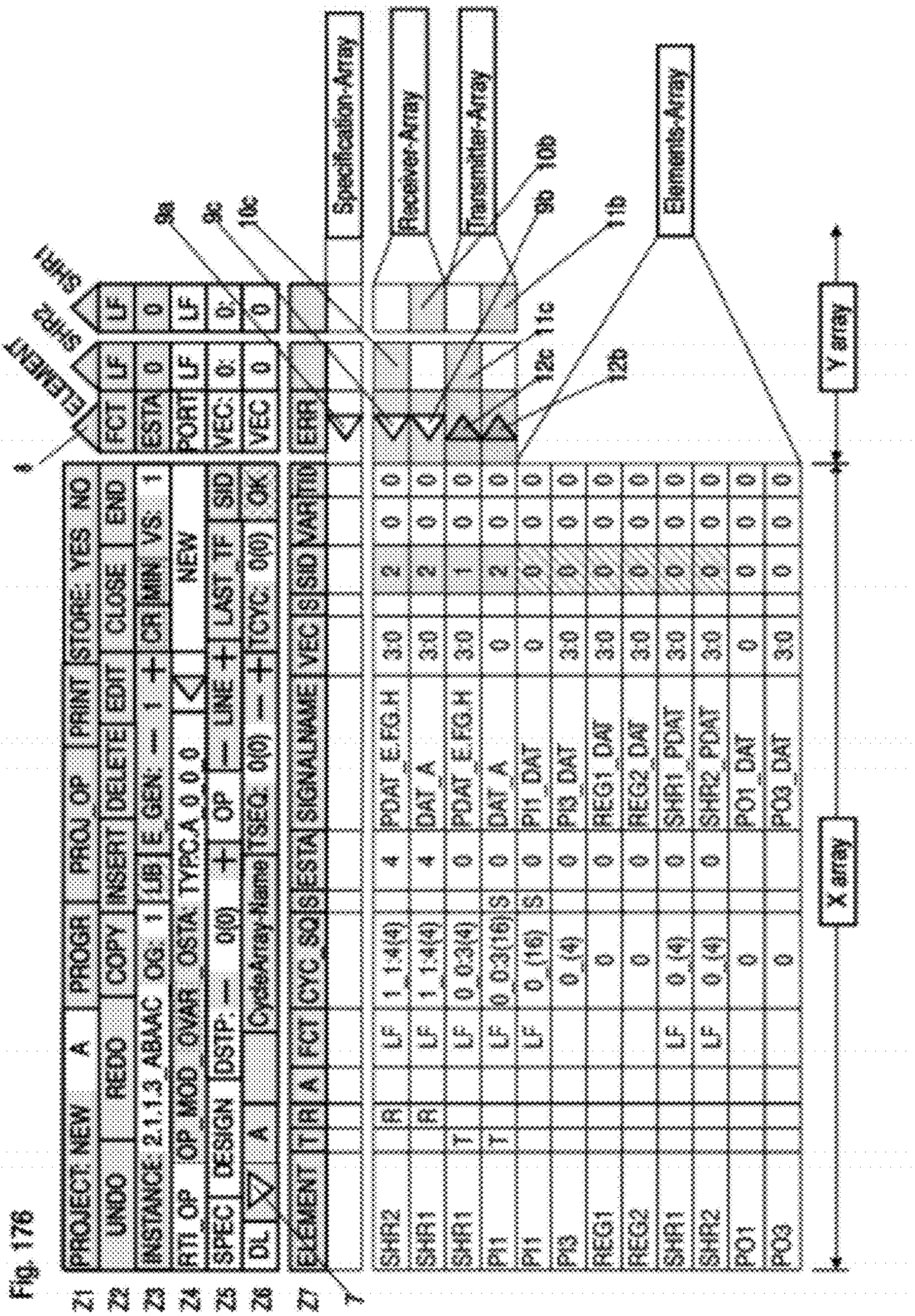

FIG. 174 shows within the first design step "DSTP0" the second data processing step "DVSTP2", which was acknowledged and with that terminated in FIG. 175. In the "DVSTP2", during the transfer of the receiver element "SHR2" from the element array to the specification array, FIG. 174, "SHR2" was automatically placed in the Y array adjacent to column "8"; "SHR1" of "DVSTP1" thereby is shifted to the right and is placed, for example, with a little gap, besides of "SHR2".

Generally in the Y array, the actual receiver is located in the specification array right to the column "8", an already existing receiver group is shifted to the right and is located besides the actual receiver. The "DVSTP2" corresponds in its procedure to the first "DVSTP" explained before i.e. "SHR2" and "SHR1" were transferred from the element array to the specification array and by clicking on the button of the SHR2 line in column "R" the "DVSTP2" was acknowledged and terminated and in the specification array the according entries in the SHR2 line were generated, as shown in FIG. 175. After termination of "DVSTP2" in the specification array, by clicking the button in the SHR2 line on column "ELEMENT", the SHR2 line is transferred to the highest line of the receiver array and the SHR1 line is transferred to the highest line of the transmitter array. Already existing lines in the receiver array or, respectively, in the transmitter array are moved downward by one line In the example of FIG. 176 this concerns only the receiver line "SHR1" and the transmitter line "PI1". With the transfer of the lines out of the specification array to the receiver or transmitter array below the line "Z7" in the specification array automatically an empty line is generated, which takes a receiver for a following "DVSTP". The arrow 9*a* and the coordinate field 10*a* of the SHR2 line in the specification array, FIG. 175, are denoted in the receiver array, FIG. 176, as arrow 9*c* and coordinate field 10*c*; the arrow 12*a* and the coordinate field 11*a* of the SHR1 line in the specification array, FIG. 175, are denoted in the transmitter array, FIG. 176, as arrow 12*c* and coordinate field 11*c*.

Figure 177:
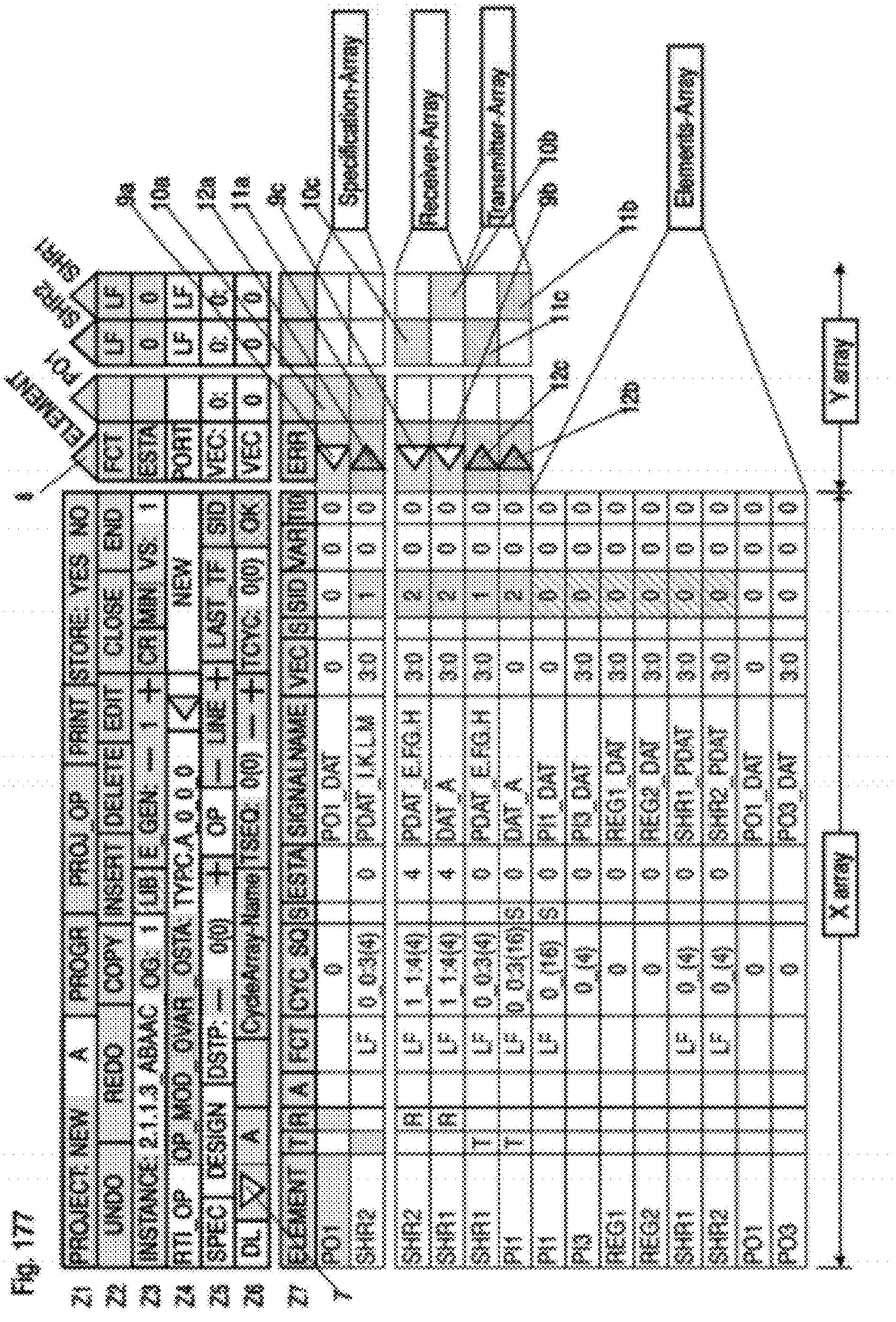

In FIG. 177 within the "DSTP0" the third and last "DVSTP" with receiver "PO1" and transmitter "SHR2" is shown. The receiving output port "PO1" still holds no dynamic signal names, because it is in the RTI array at the end of a transfer chain and receives exclusively data with dynamic signal names.

Figure 178:
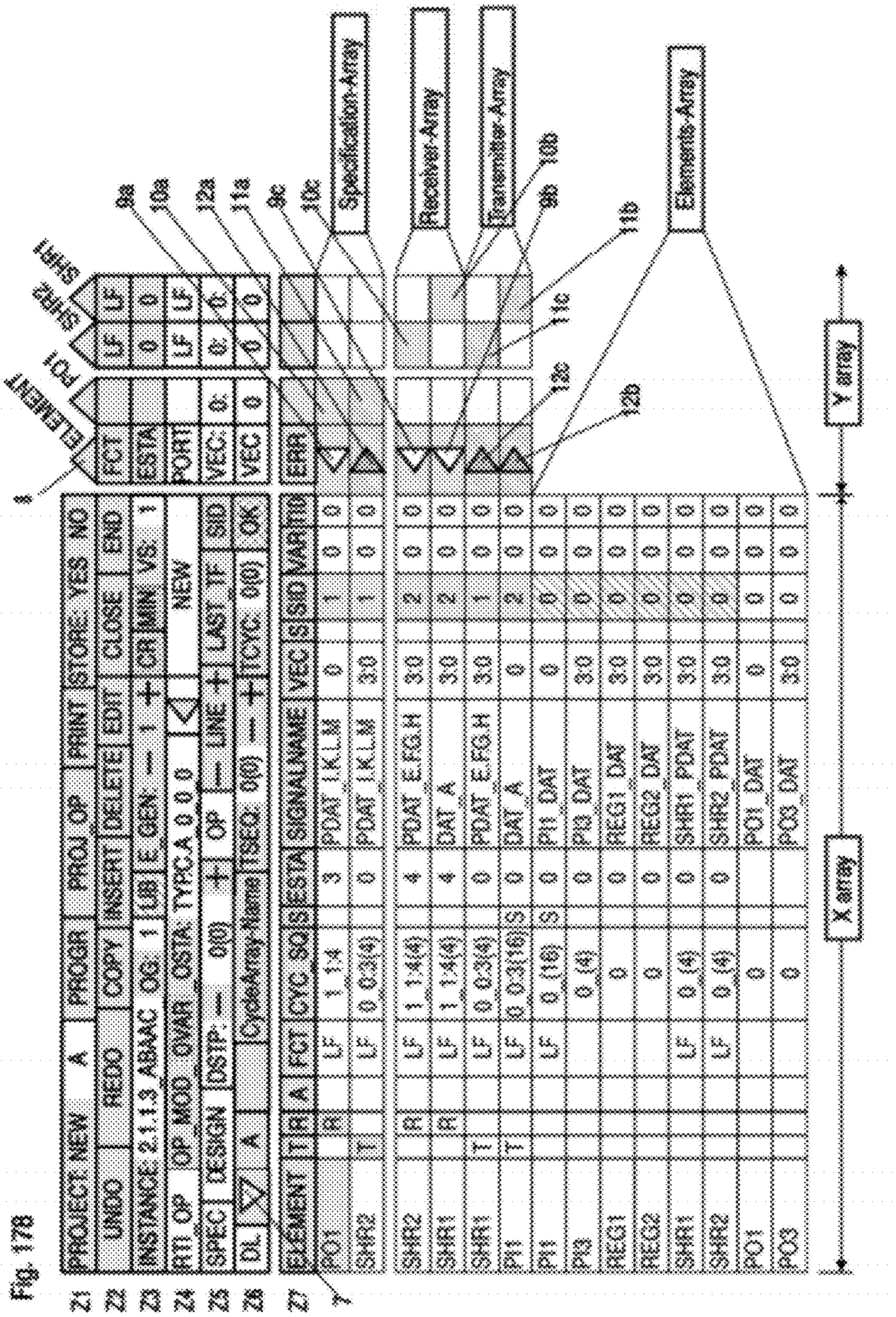

FIG. 178 shows the situation of the specification array after acknowledgement of "DVSTP3". Thereby the receiver "PO1" adopted the function "LF" and the dynamic signal name "PDAT_I.K.L.M" of the transmitter "SHR2" with "SID=1". Furthermore for "PO1" the first receive cycle "CYC=1" with the sequence array "1:4" for a fourfold streaming and "ESTA=3" is indicated automatically. "ESTA=3" results of the adoption of the transmitter ESTAs with the order "ESTA=0", "ESTA=1", "ESTA=2" and "ESTA=3".

Figure 179:
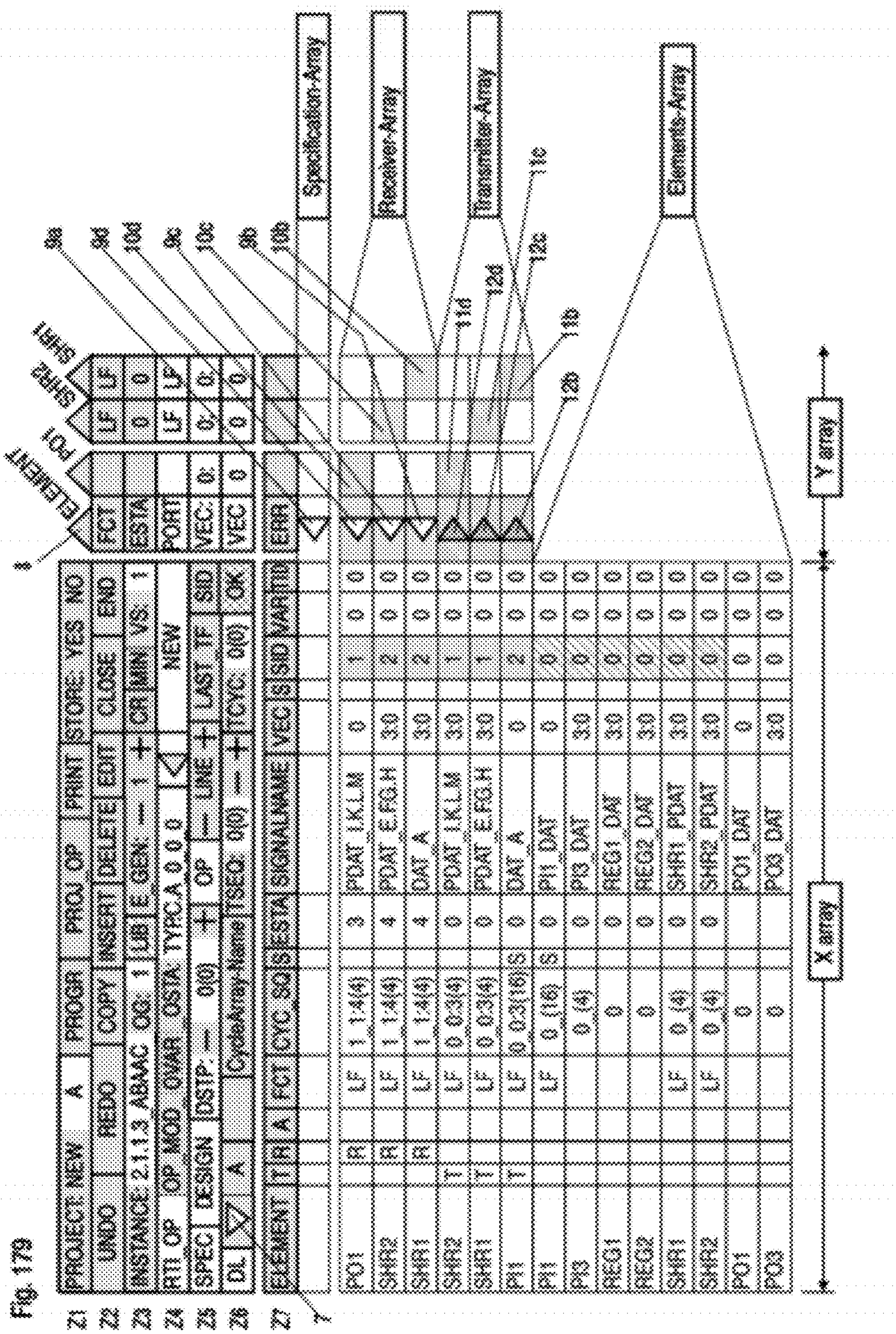

The receiver and respectively the transmitter of the specification array of FIG. 178 were transferred in FIG. 179 to the receiver and respectively to the transmitter array. The arrow 9*a* and the coordinate field 10*a* of the PO1 line in the specification array, FIG. 178, are denoted in the receiver array, FIG. 179, as arrow 9*d* and coordinate field 10*d*; the arrow 12*a* and the coordinate field 11*a* of the SHR2 line in the specification array, FIG. 178, are denoted in the transmitter array, FIG. 179, as arrow 12*d* and coordinate field 11*d*.

Figure 180:
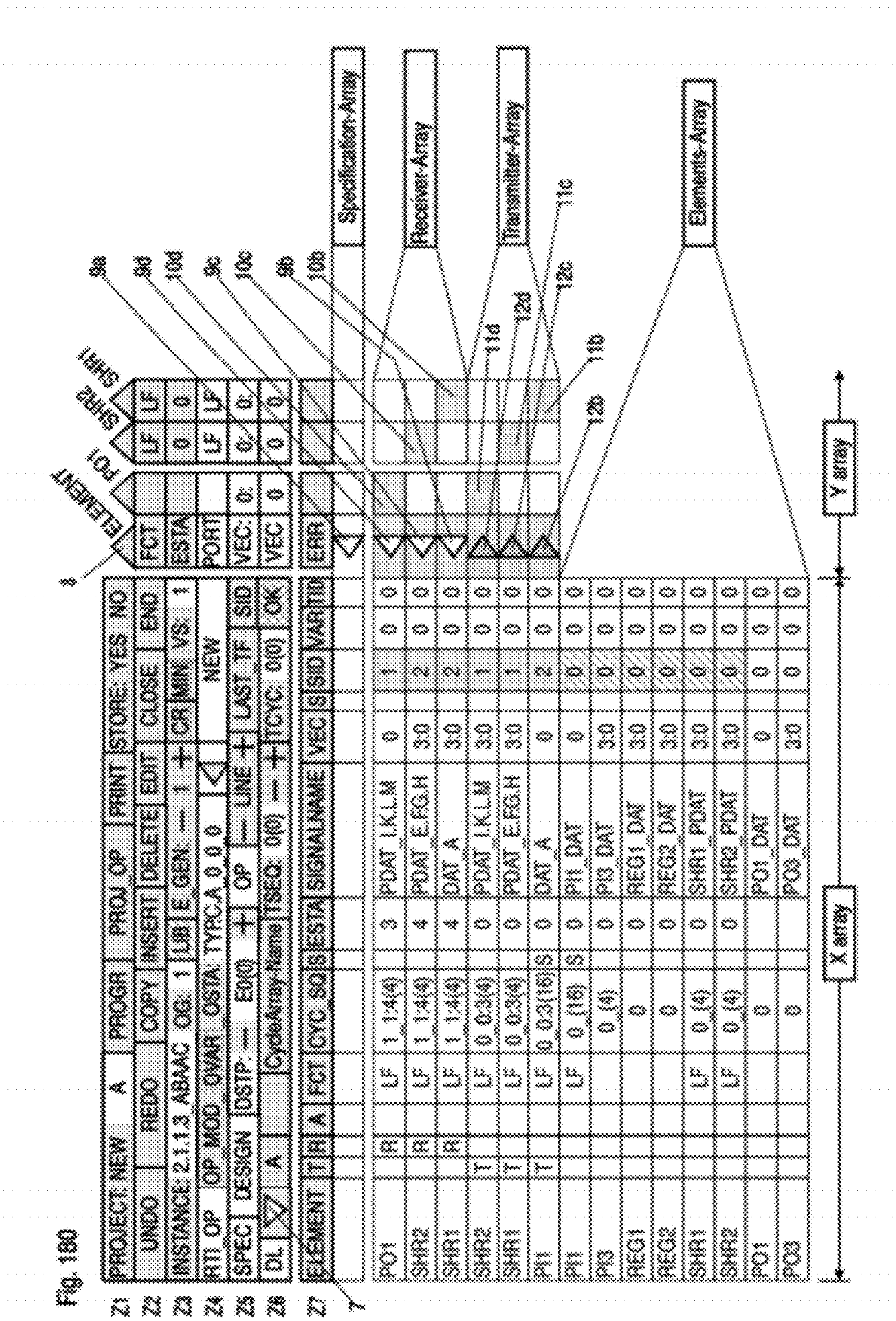

By clicking the button "OK" in "Z6" the "DSTP0" is acknowledged and terminated and accordingly it is switched from "DSTP: 0(0)" to "DSTP:E0(0) in line "Z5", as FIG. 180 shows. The "E" in "DSTP:E0(0)" stands for "End".

Figure 181:
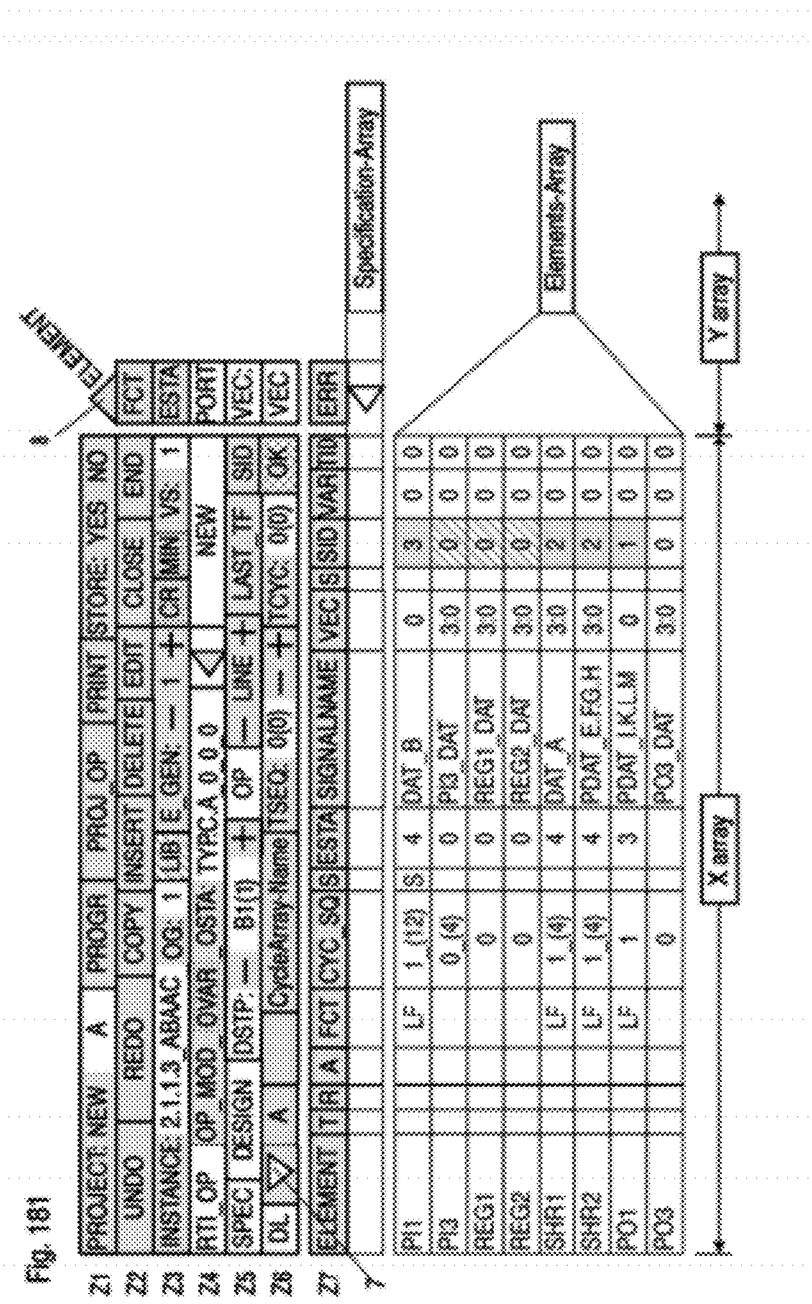

By a succeeding click on the button "OK" in "Z6" the beginning of the second design step is indicated with "DSTP:B1(1)", FIG. 181. Hereby "SHR1", "SHR2" and "PO1", which were receivers in the design step"0", bring their actual parameters with them. "PI1" was transmitter in the design step"0", FIG. 180, and actualises therefore automatically its parameters at the beginning of design step "1", FIG. 181. The parameters are: "CYC=1", the remaining maximum streaming "(12)", "ESTA=4" and the data "DAT_B" with "SID=3", which corresponds to the beginning of "CYC=1". The adoption of the parameters of the receiver elements from a "DSTP" to a following, new "DSTP" and the actualising of the parameters of transmitter elements at the beginning of a new "DSTP" is shown in FIG. 164*e*.

Figure 182:
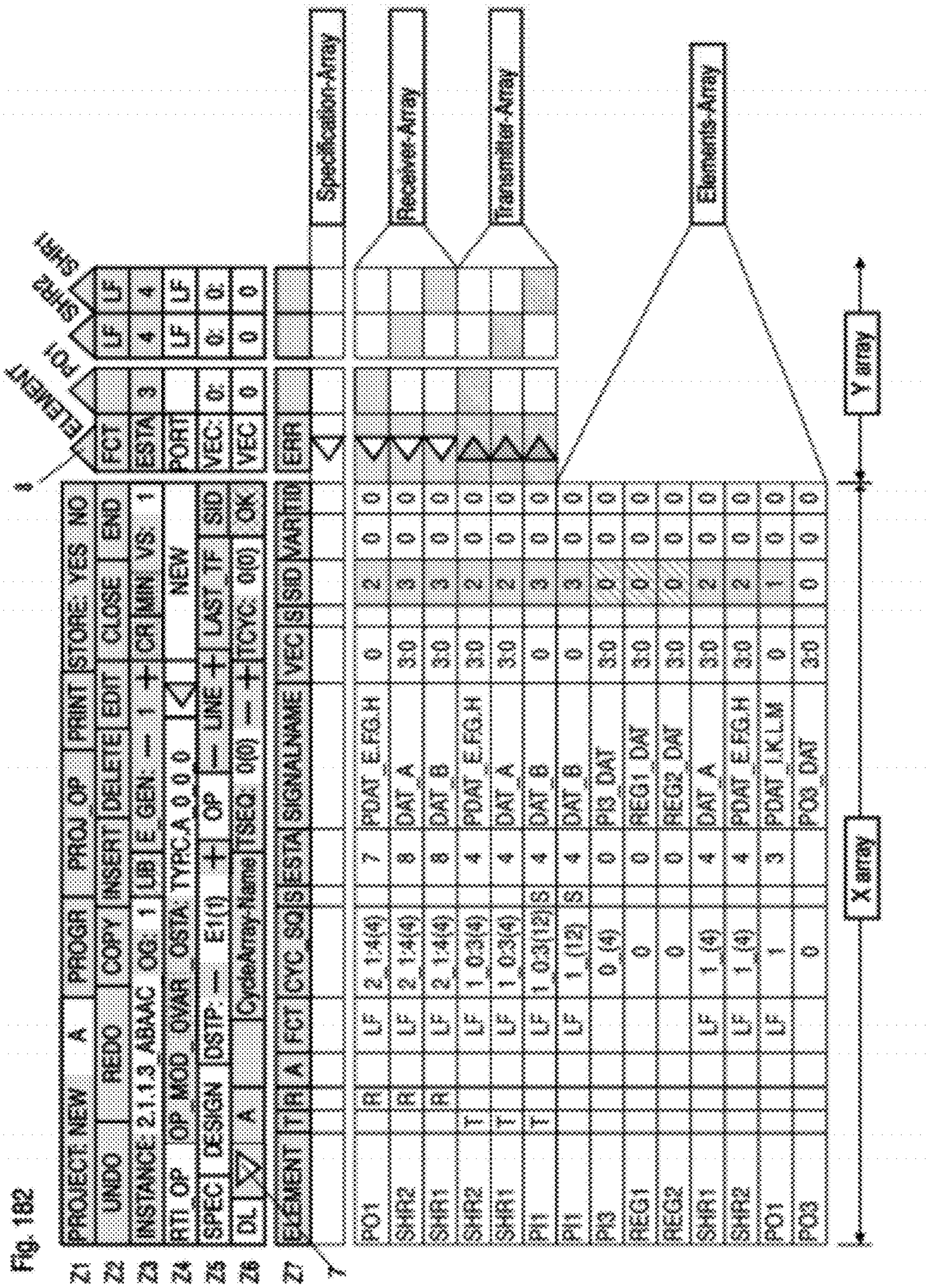

In FIG. 182 all DVSTPs and transfers of the "DSTP1" are displayed in the receiver/transmitter array and acknowledged with "OK" in "Z6" and are indicated in line "Z5" with "DSTP:E1(1)". In the design step "1" the transfers and the DVSTPs in the order from "PI1" to "SHR1", from "SHR1" to "SHR2" and from "SHR2" to "PO1" were acknowledged each by a click on the button in the receiver line of the specification array in the column "R".

Figure 183:
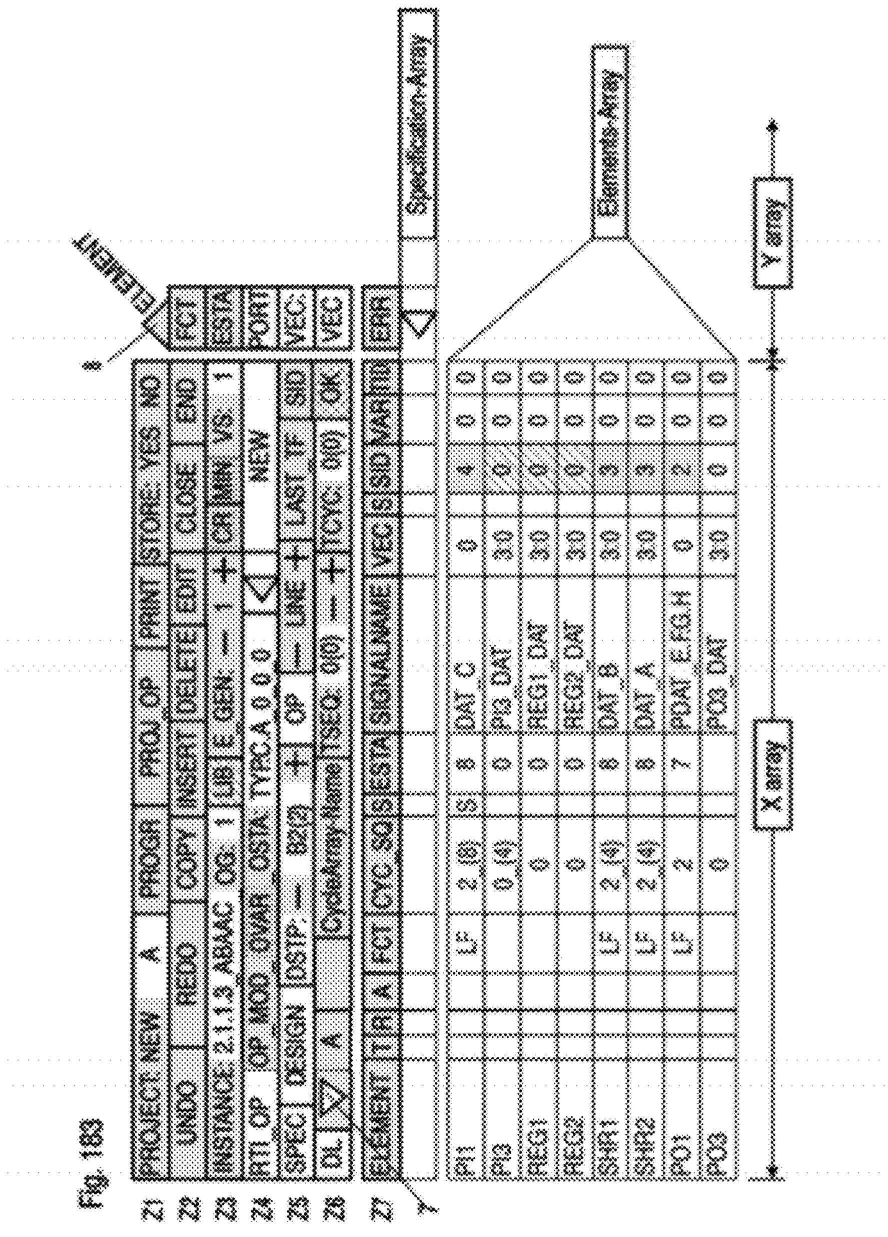

With a following click on the button "OK" in "Z6", in line "Z5" of "DSTP:E1(1)" it is switched to the beginning of the new design step "DSTP:B2(2)", as FIG. 183 shows. Thereby "PI1" holds a maximum data steaming of "(8)".

Figure 184:
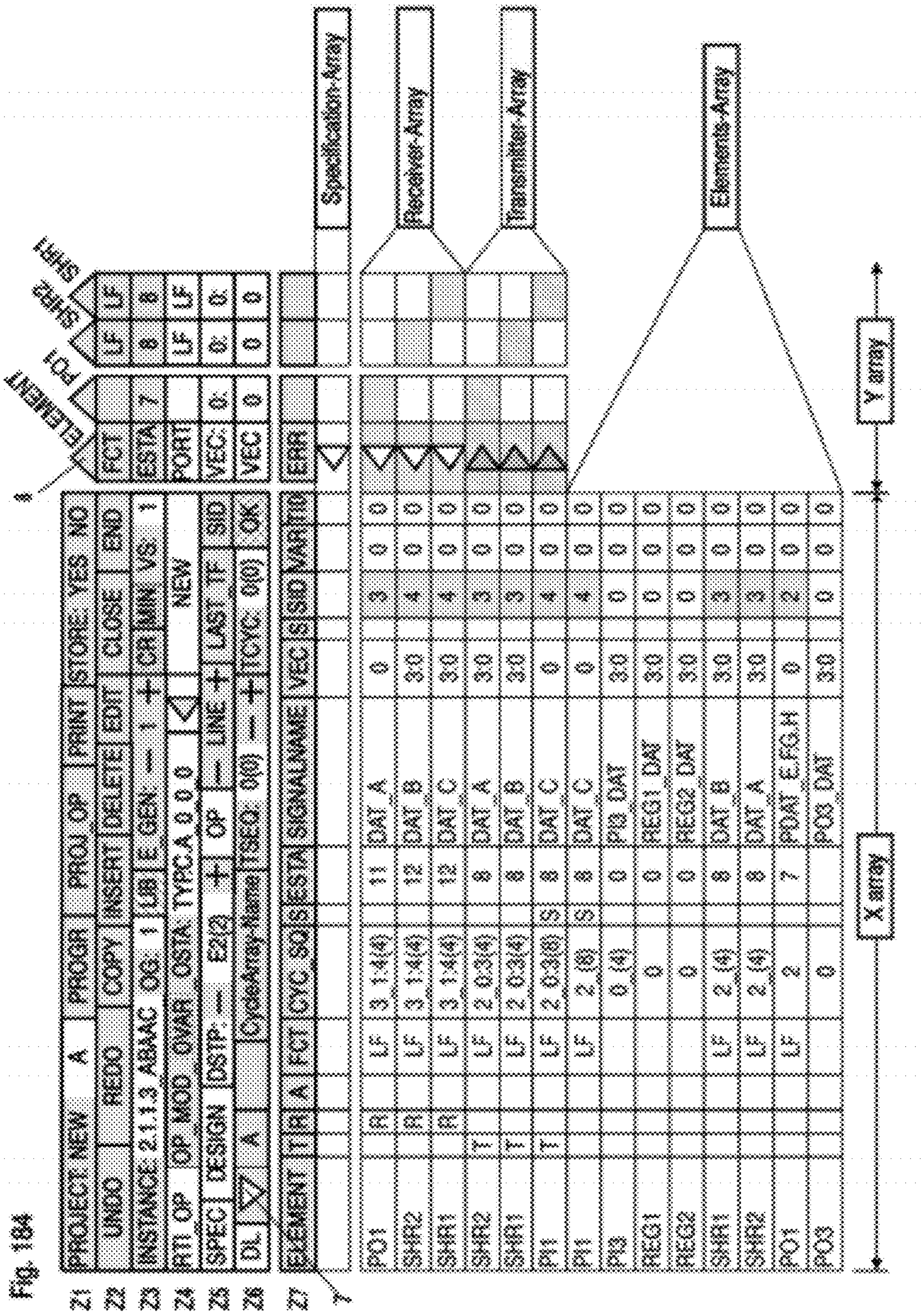

FIG. 184 shows with "DSTP:E2(2)" in "Z5" the end of design step"2" with the corresponding transfers in the receive/transmit array.

Figure 185:
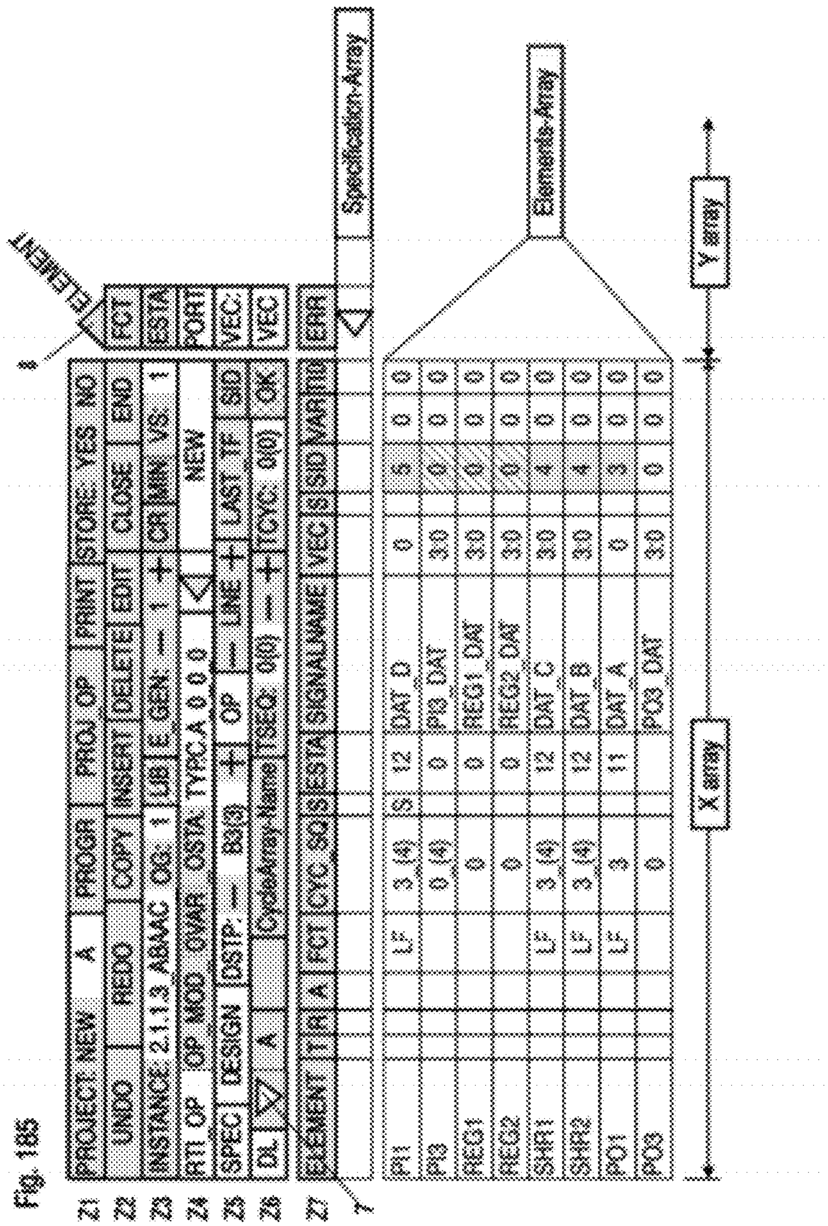

By clicking the button "OK" in "Z6" it is switched from design step end "DSTP:E2(2)" to the design step beginning "DSTP:B3(3)", as FIG. 185 shows.

Figure 186:
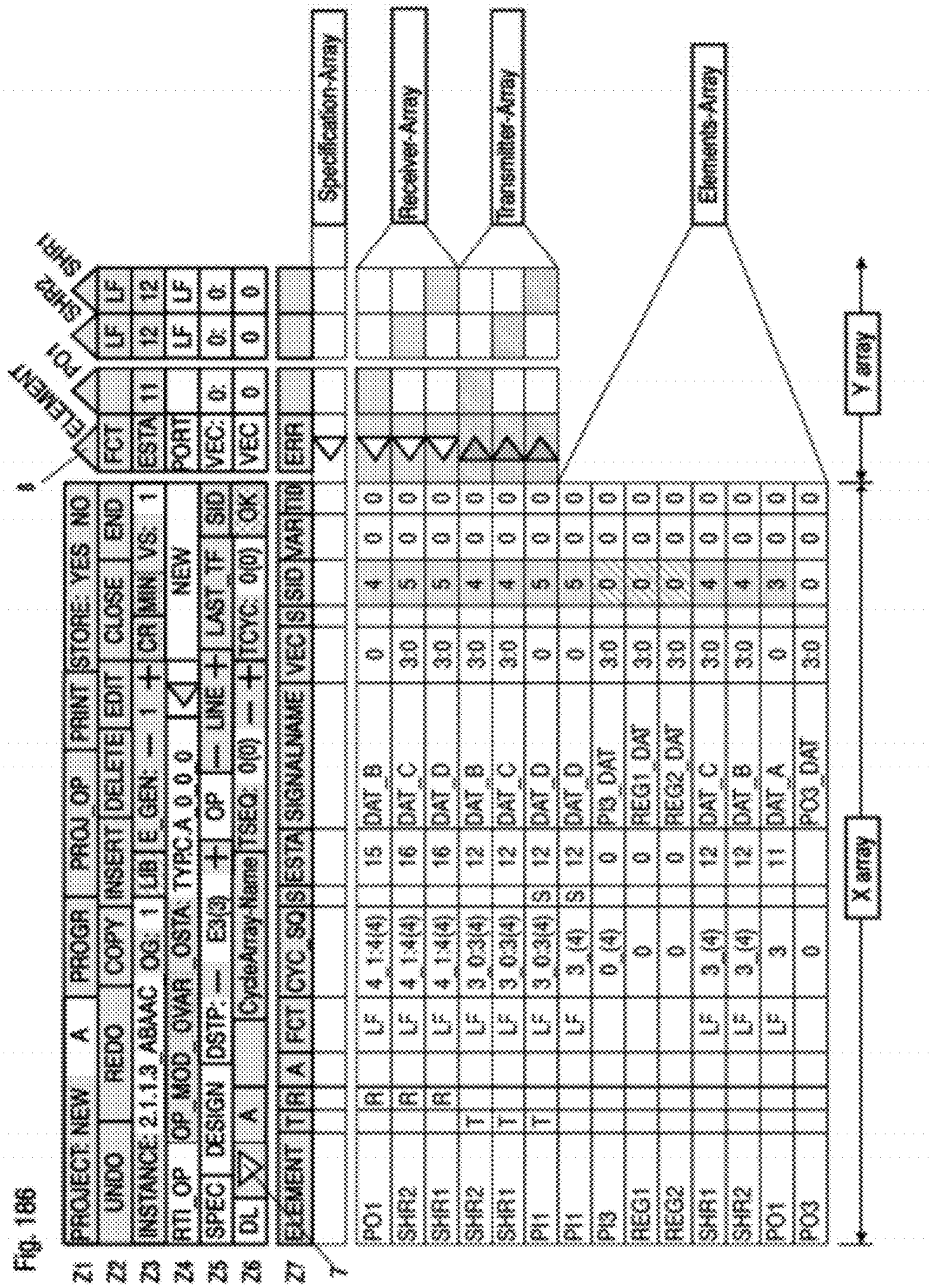

FIG. 186 shows the design step end "DSTP:E3(3)". In design step"3" still the complete amount of transfers was effectuated, from "PI1" to "SHR1", from "SHR1" to "SHR2" and from "SHR2" to "PO1", as shown in FIG. 164*e*.

Figure 187:
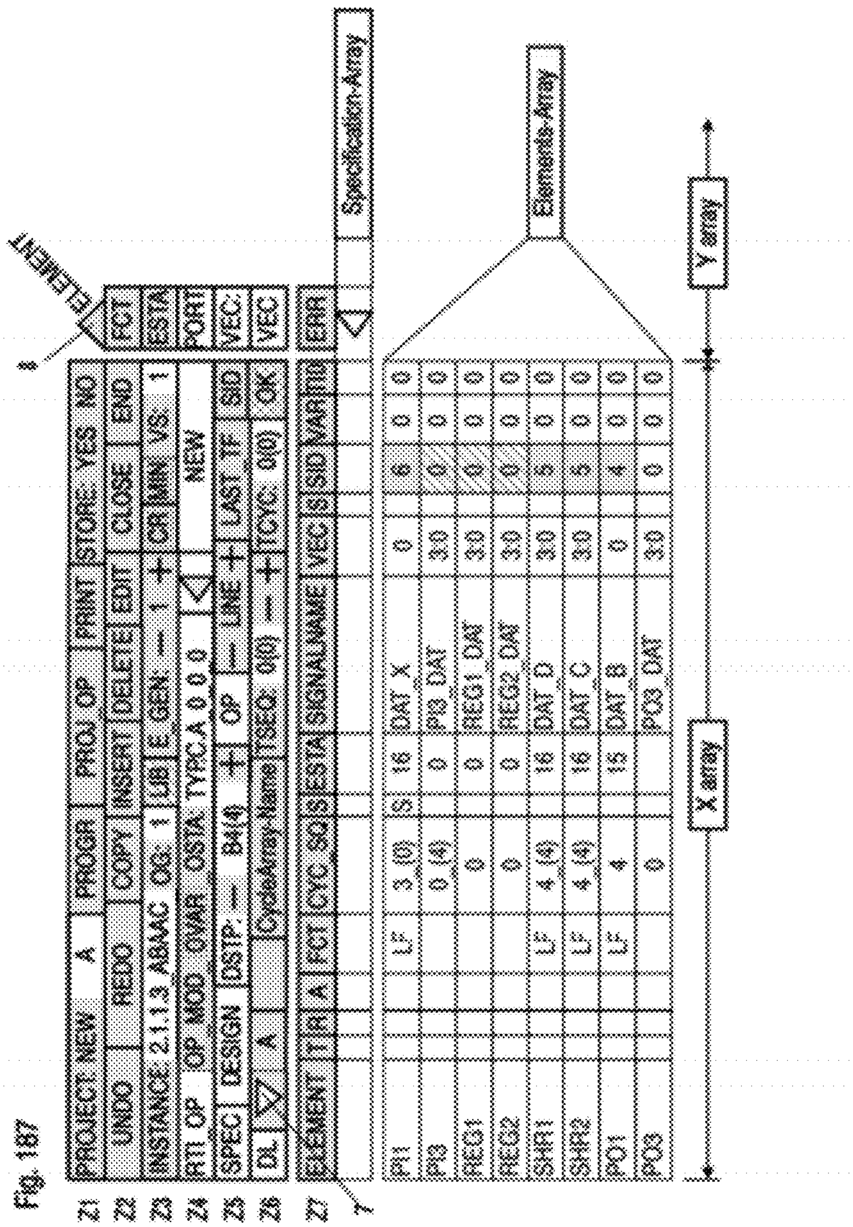

By clicking the button "OK" in "Z6" the switching to the beginning of a new design step "DSTP:B4(4)" is done, as it is shown in FIG. 187. In design step "0 to 3" all PI1 data were transmitted, so that in design step"4" in column "CYC_SQ" with "(0)" no PI1 streaming occurs any longer. Furthermore in FIG. 187 it was supposed for example for PI1, that the transmit data become undefined i.e. "DAT_X" and that therefore SID and ESTA are increased by one to "SID=6" and "ESTA=16", as shown (without SID) in FIG. 164*e*.

Figure 188:
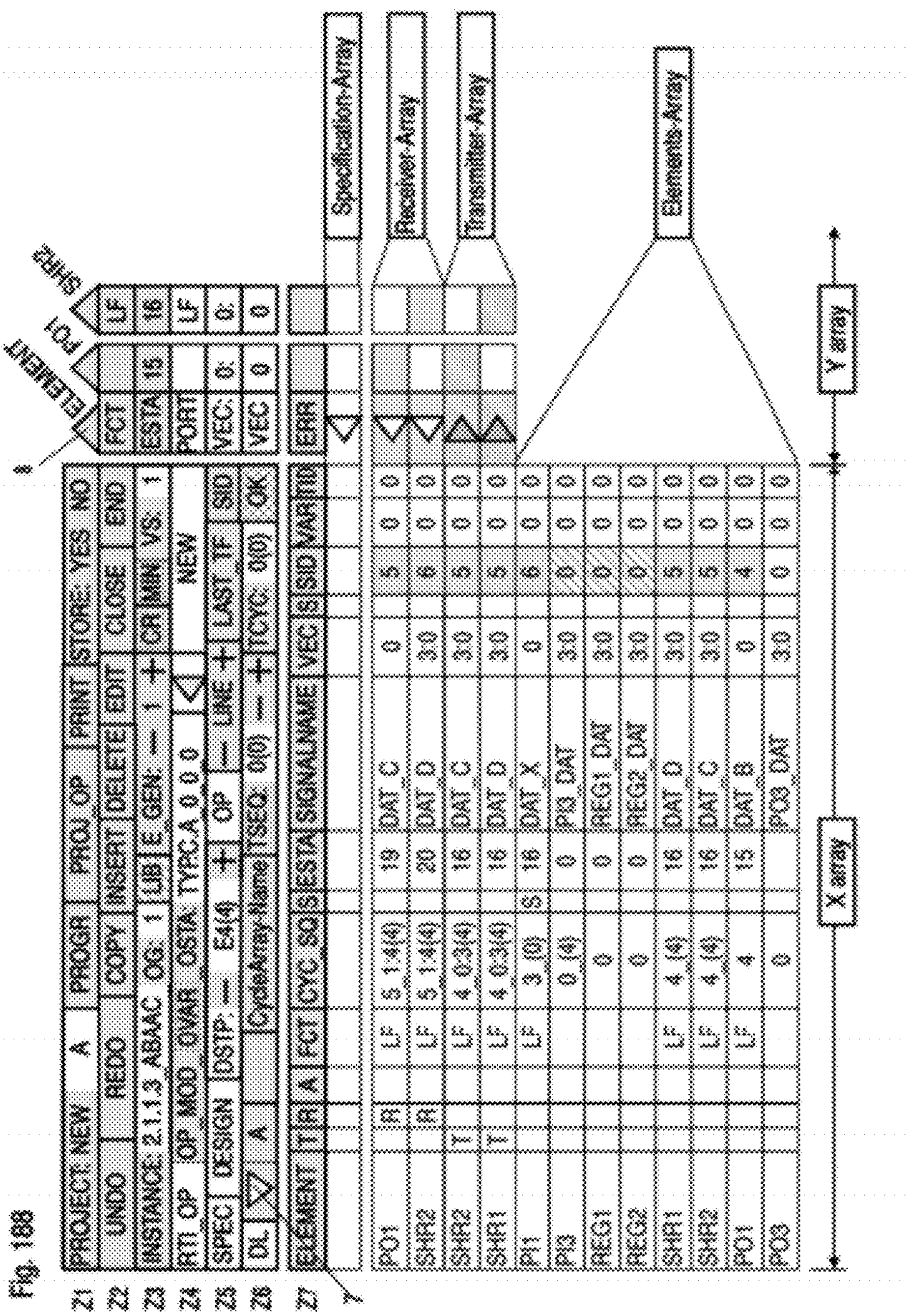

In design step "4" only the transfers from "SHR1" to "SHR2" and from "SHR2" to "PO1" are executed, as it is shown with "DSTP:E4(4)" in FIG. 188.

Figure 189:
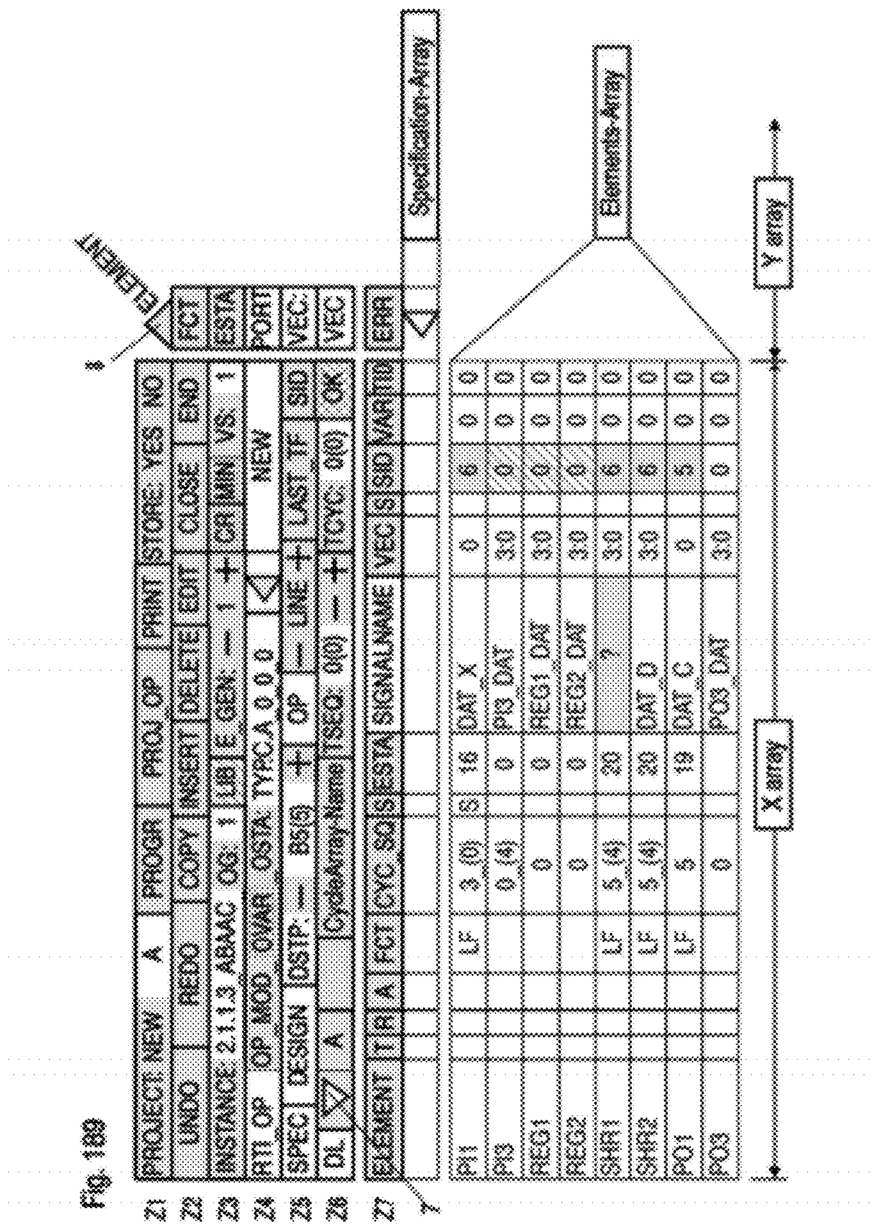

By clicking the button "OK" in "Z6" the display in "Z5" is switched from "DSTP:E4(4)" to "DSTP:B5(5)", as FIG. 189 shows. Because shift register "SHR1" was only a serial transmitter and did not receive data, for example, in FIG. 189 in column "SIGNALNAME" the display area was marked and a "?" was set automatically. Furthermore in "Z7" the button "SIGNALNAME" automatically was activated, the button "OP" in "Z5" was deactivated and with that an entry of a signal name for "SHR1" was prepared.

Figure 190:
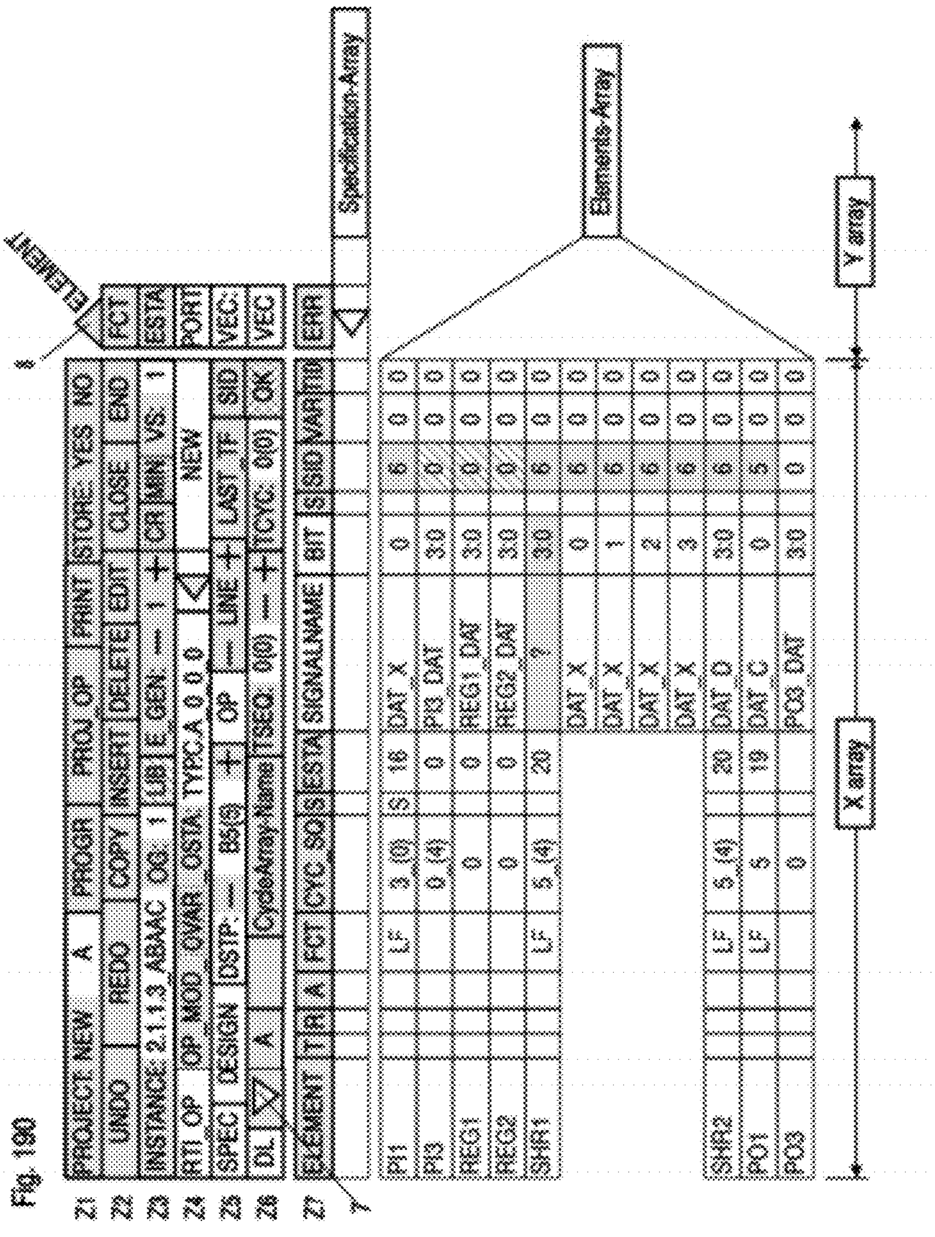
Figure 191:
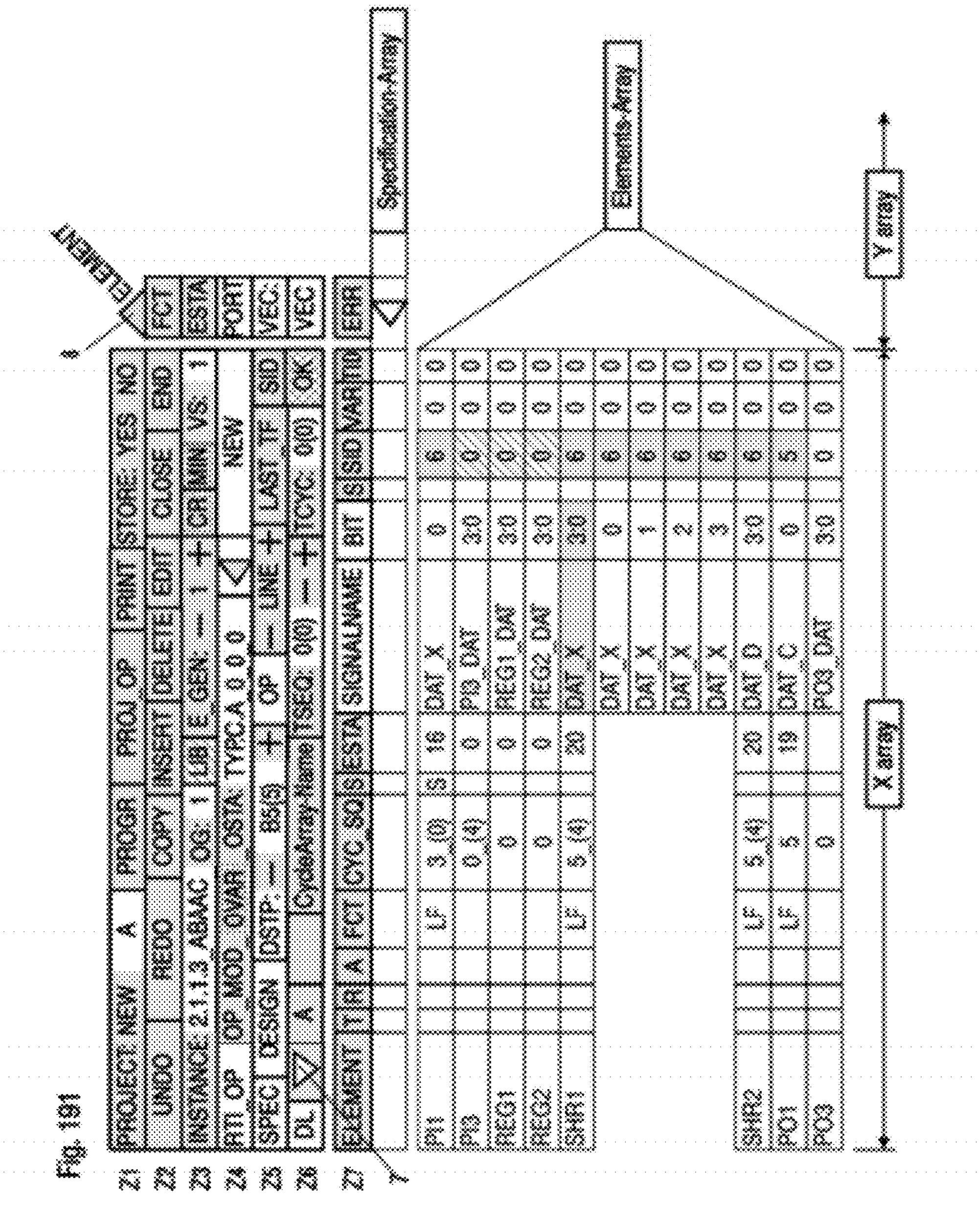

By clicking the button "VEC" in "Z7" this button is switched to "BIT", as FIG. 190 shows. For the bits "0" to "3" which are undefined, a dynamic name, for example, "DAT_X" is appointed, which is displayed automatically. Corresponding to that, in the SHR1 line, in column "SIGNALNAME", FIG. 191, "DAT_X" was entered manually. In case, that all shift register bits are "DAT_X", the signal name entry in the shift register line, in the example in the SHR1 line, can be entered automatically as "DAT_X".

Figure 192:
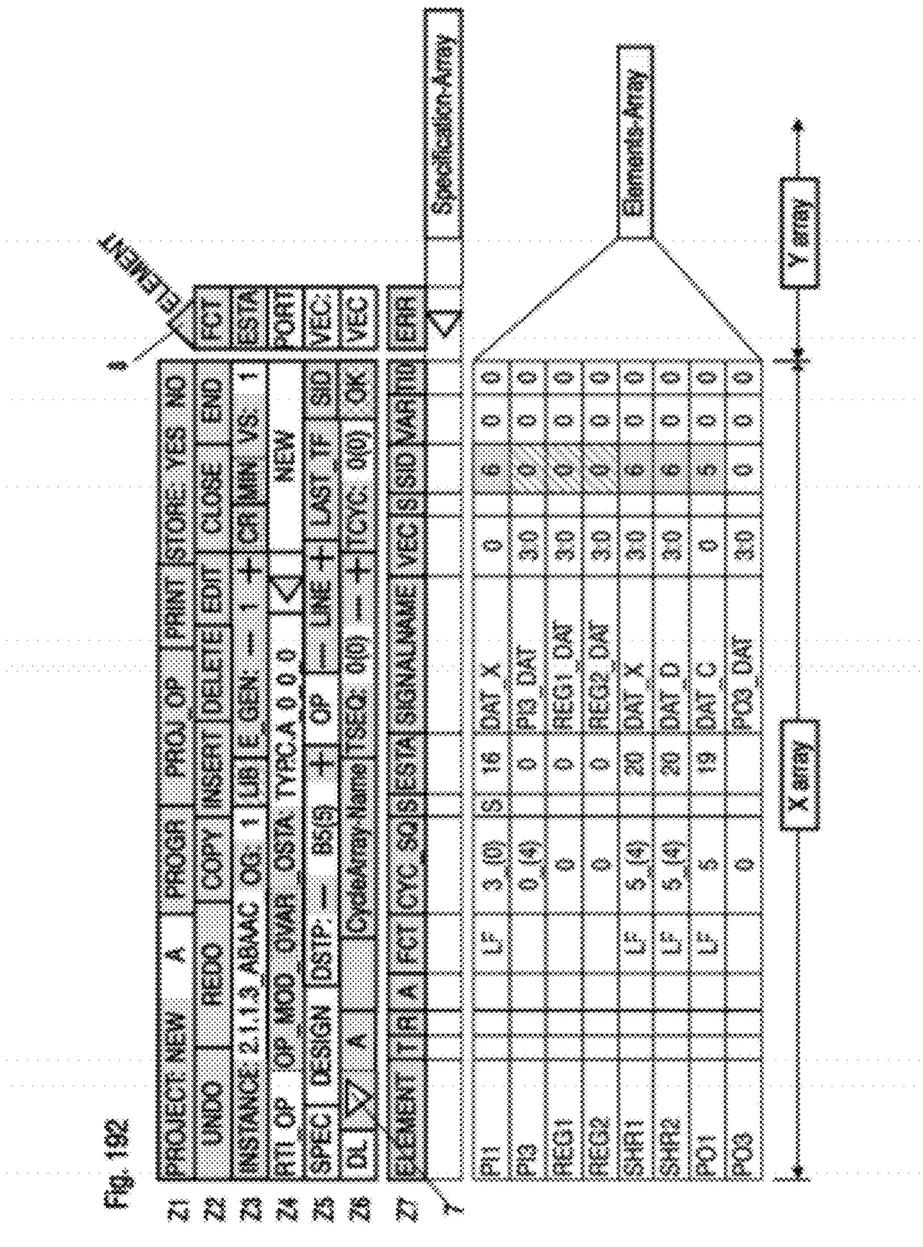

FIG. 192 shows the element array after acknowledgement by "OK" and after switching from BIT to VEC display. Thereby automatically the button "OP" in "Z5" is reactivated and the button "SIGNALNAME" in "Z7" is deactivated.

Figure 193:
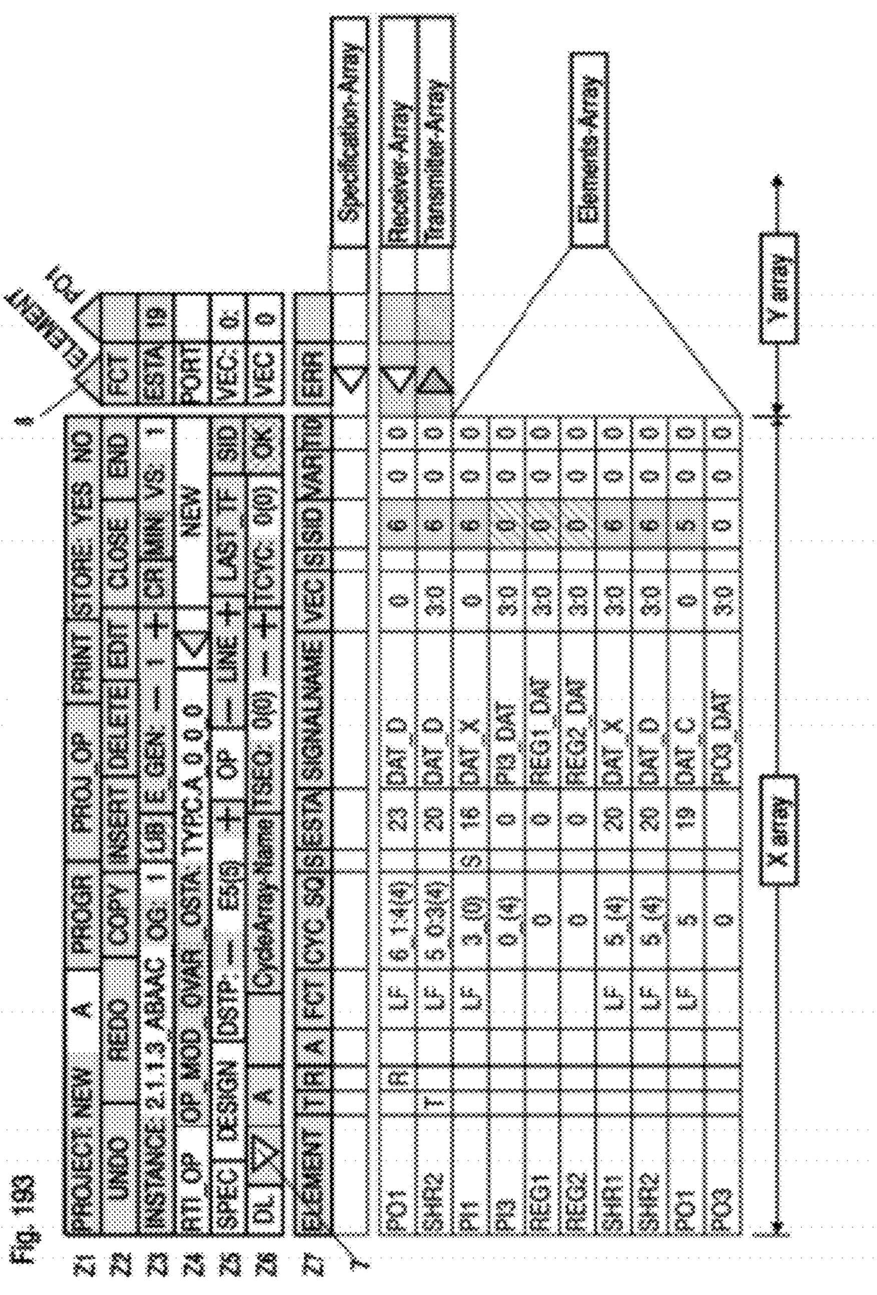
Figure 194:
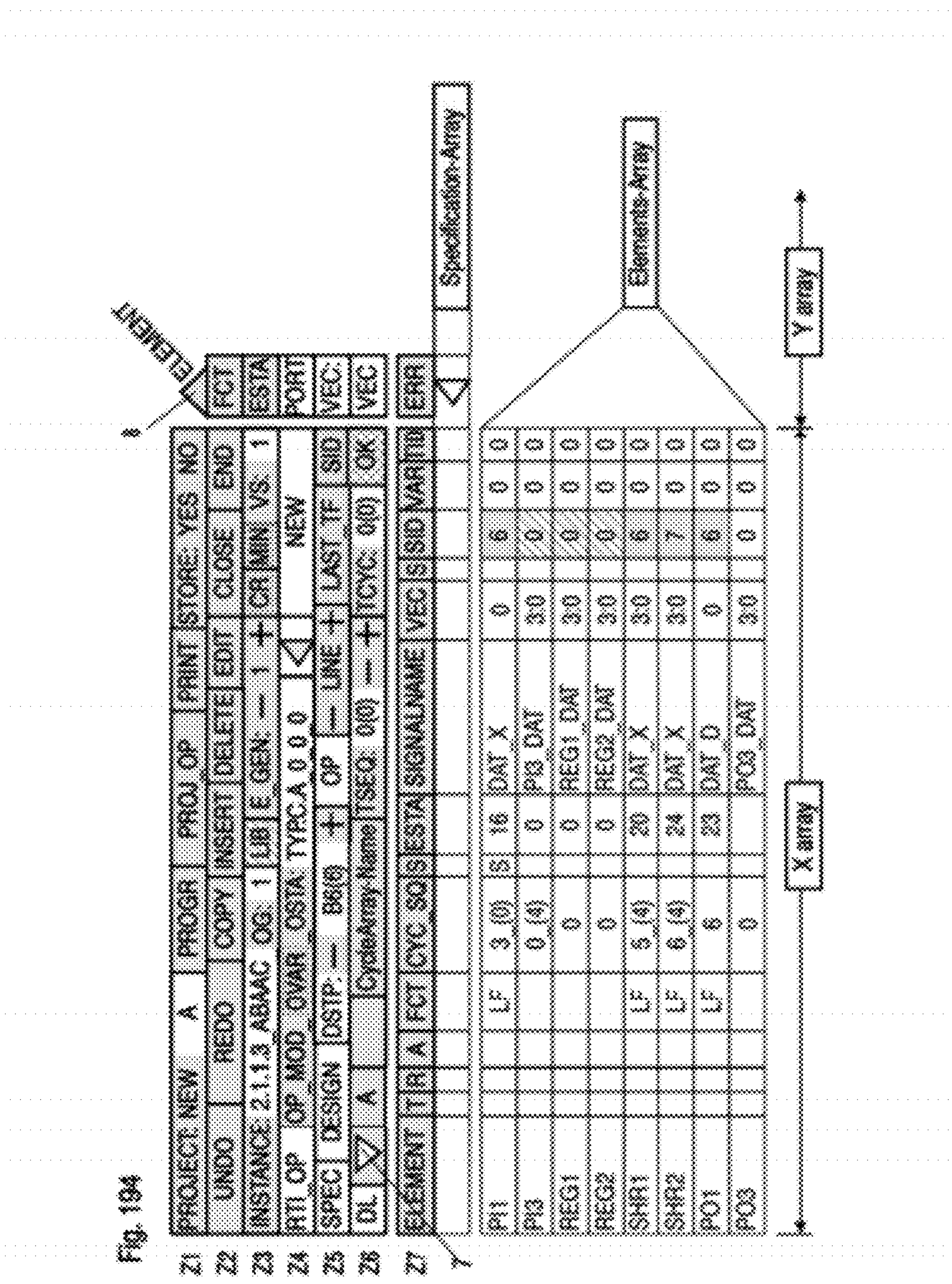

In FIG. 193 the end of the last "DVSTP" with the transfer of the data from "SHR2" to "PO1" is illustrated with "DSTP:E5(5)" for the block structure in FIG. 164*a* with flow diagram FIG. 164*e*. After acknowledgement with "OK", in "Z5" the switching from "DSTP:E5(5)" to "DSTP:B6(6)" is done and the entries of the receiver array are transferred to the element array and the entries of the transmitter array are generated for the element array, as shown in FIG. 194. Thereby the signal name for "SHR2" was entered automatically as "DAT_X" and the "SID" was increased from "6" to "7".

Description to FIG. 195*a*-215

In the following, with the block structure in FIG. 195*a* a second example of an RTI operation specification is described. The RTI data transfer is executed in a width of 4 bit from input port "PI3" to register "REG1", from "REG1" to register "REG2" and from "REG2" to the output port "PO3".

Figure 195A:
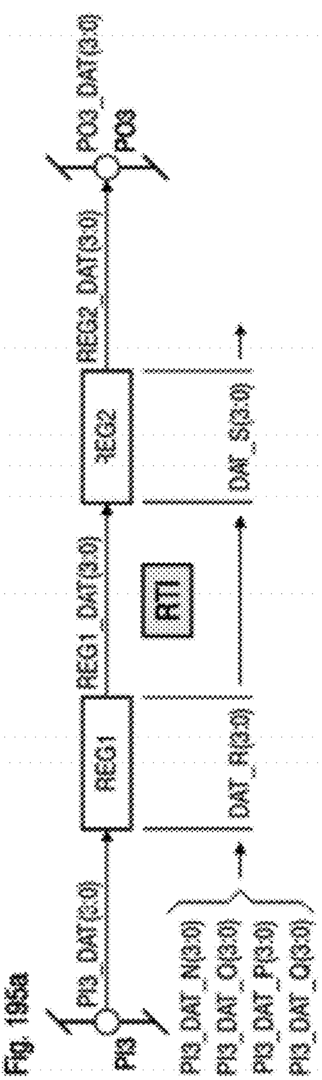
Figure 195B:
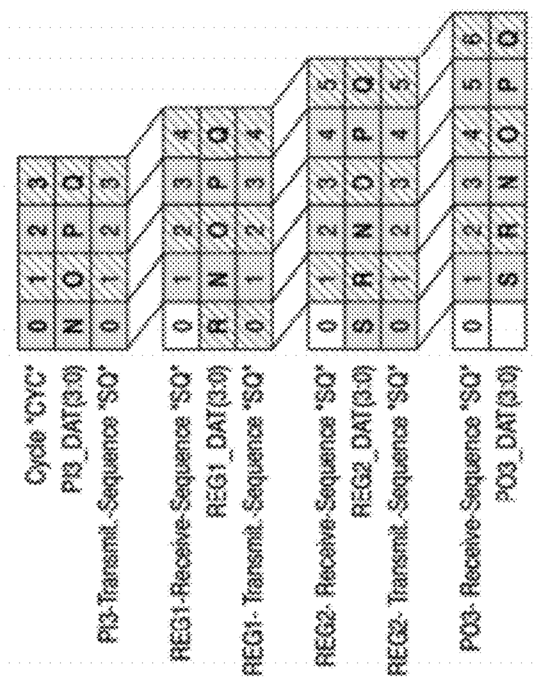
Figure 195E:
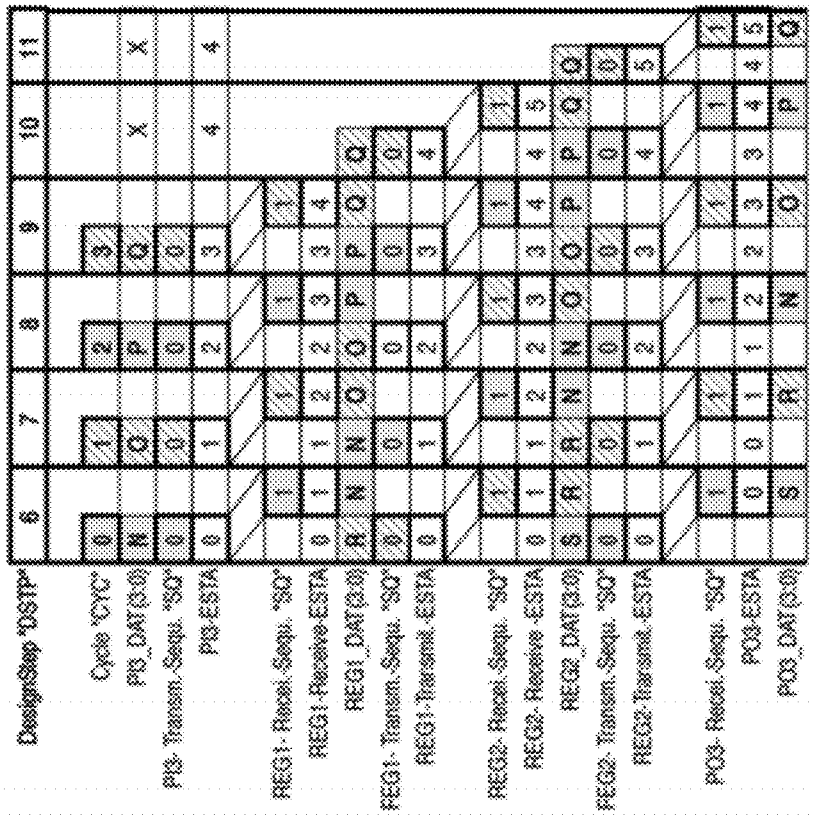
Figure 195C:
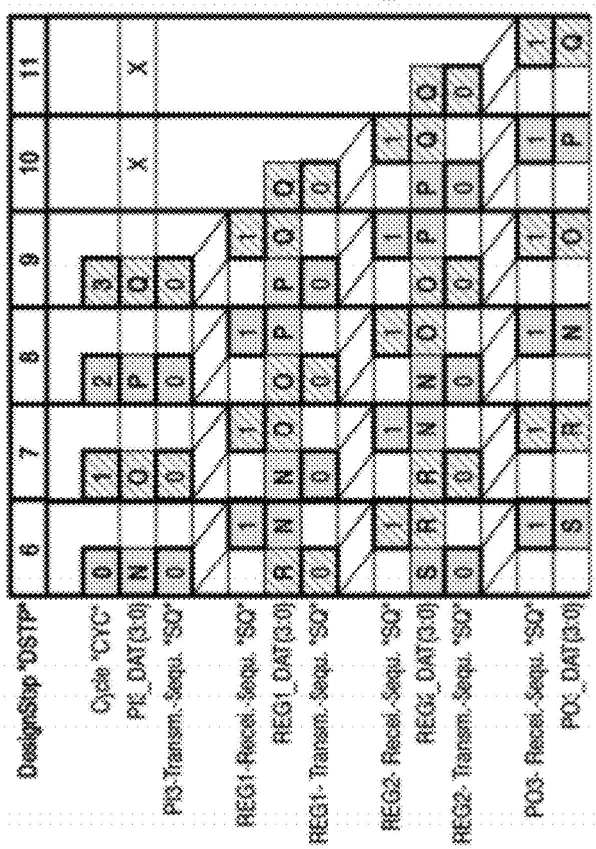
Figure 195D:
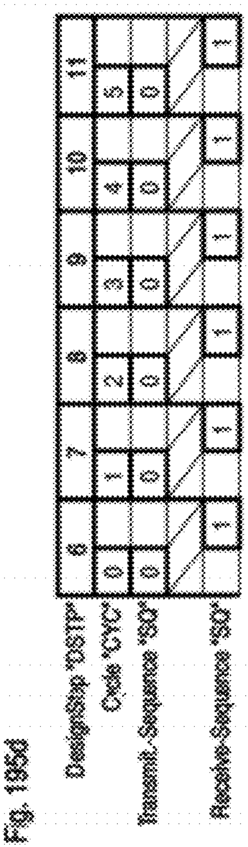

The real data transfer of the block structure in FIG. 195*a* is illustrated by the flow diagram in FIG. 195*b*. Continuing the "RTI-OP-SP" for the block structure in FIG. 164*a* with the design steps "0" to "5", FIG. 164*c*, FIG. 164*d* and FIG. 164*e*, the "RTI-OP-SP" for the block structure in FIG. 195*a* occurs with the design steps "6" to "11" as shown in the flow diagrams FIG. 195*c*, FIG. 195*d* and FIG. 195*e*.

Figure 196:
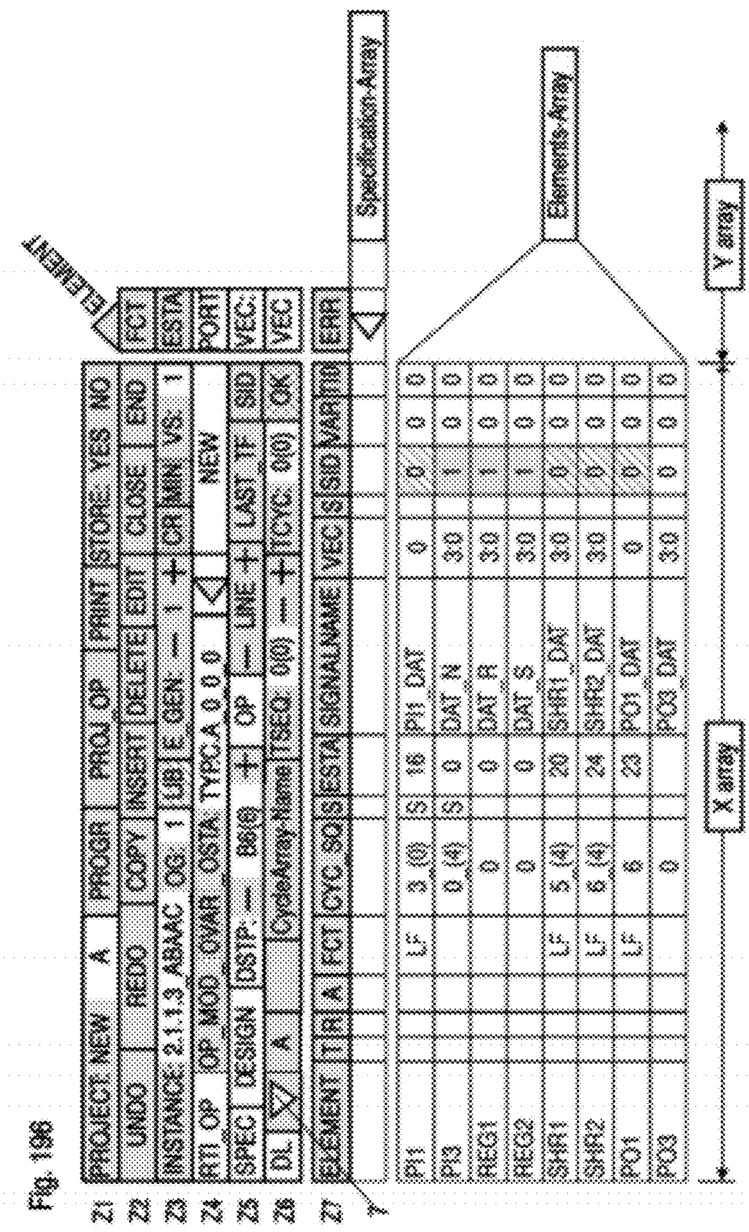

FIG. 196 shows the RTI-OP-BS with the beginning of design step "DSTP:B6(6)" in line "Z5". The elements involved in the data transfer are "PI3", "REG1", "REG2" and "PO3". With exception of "PO3" dynamic signal names were already allocated. For "PI3" the sequence splitting was defined in advance for "CYC_SQ" with "0_0:0(4)", "1_0:0(3)", "2_0:0(2)" and "3_0:0(1)", and the corresponding dynamic signal names were appointed.

Figure 197:
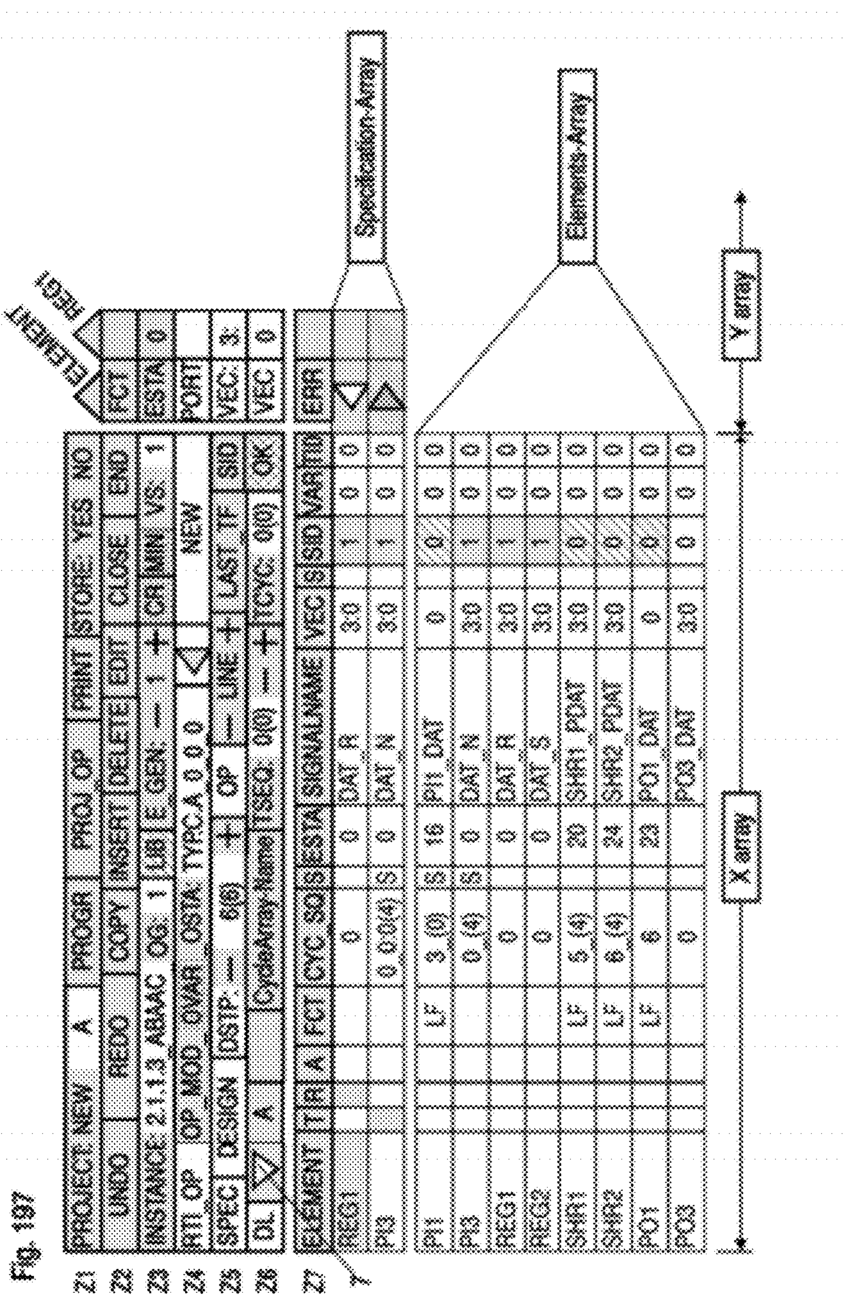
Figure 198:
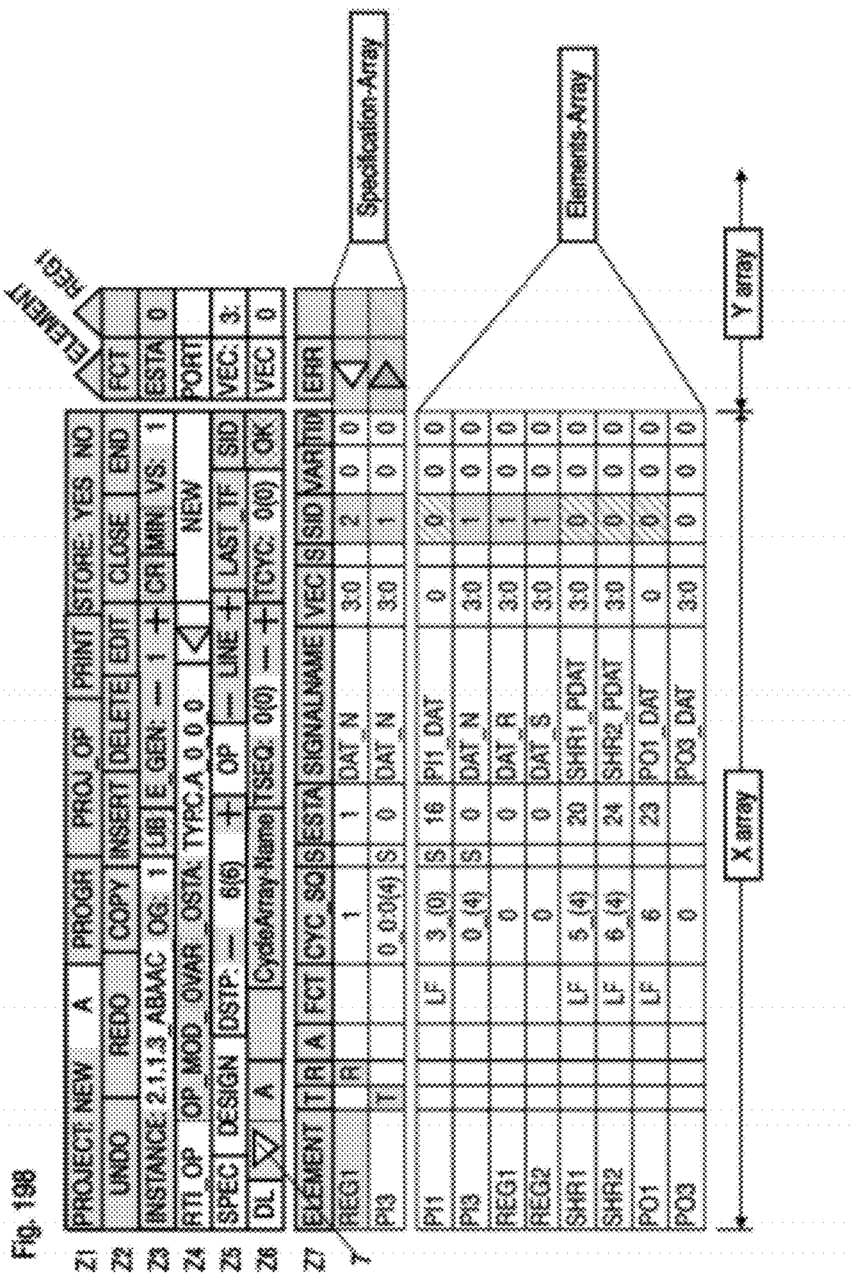
Figure 198:
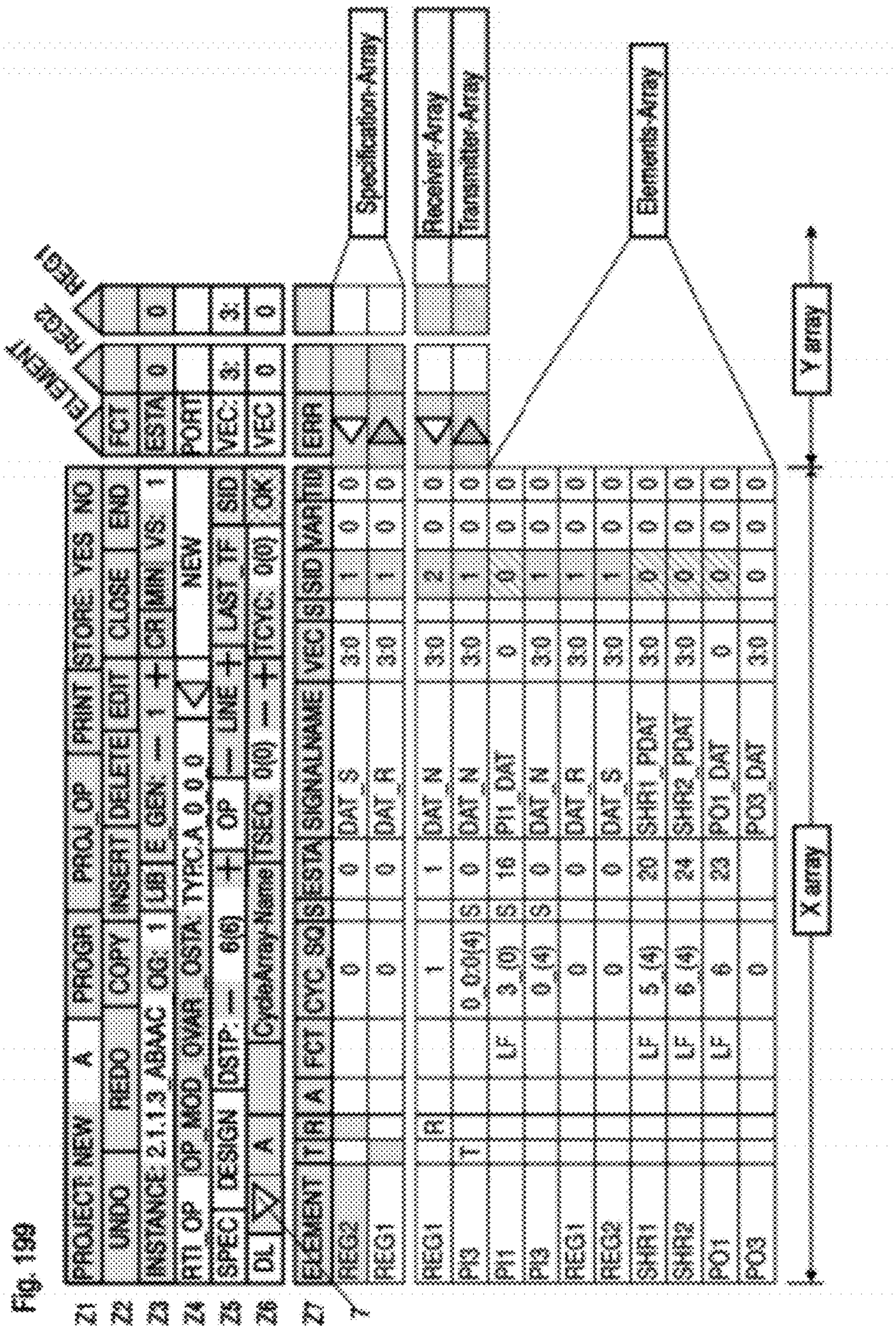
Figure 200:
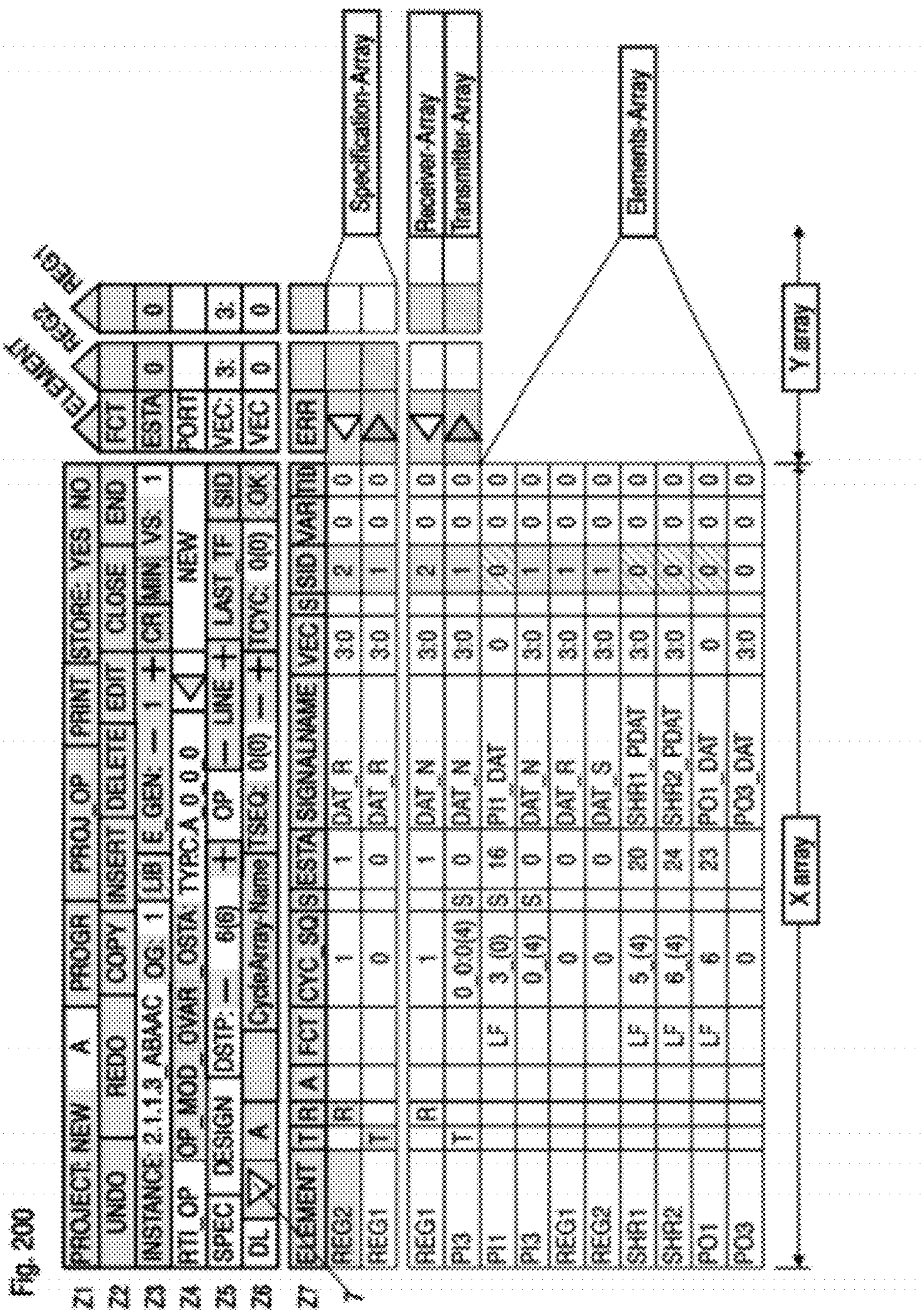

FIG. 197 shows the first data processing step "DVSTP1" with the transfer from "PI3" to "REG1", which was acknowledged in FIG. 198.

In FIG. 199 the elements of the specification array of FIG. 198 were transferred to the receiver array and transmitter array and for the "DVSTP2" the receiver element "REG2" and the transmitter element "REG1" were placed in the specification array. The acknowledging of the "DVSTP2" is displayed in FIG. 200.

Figure 201:
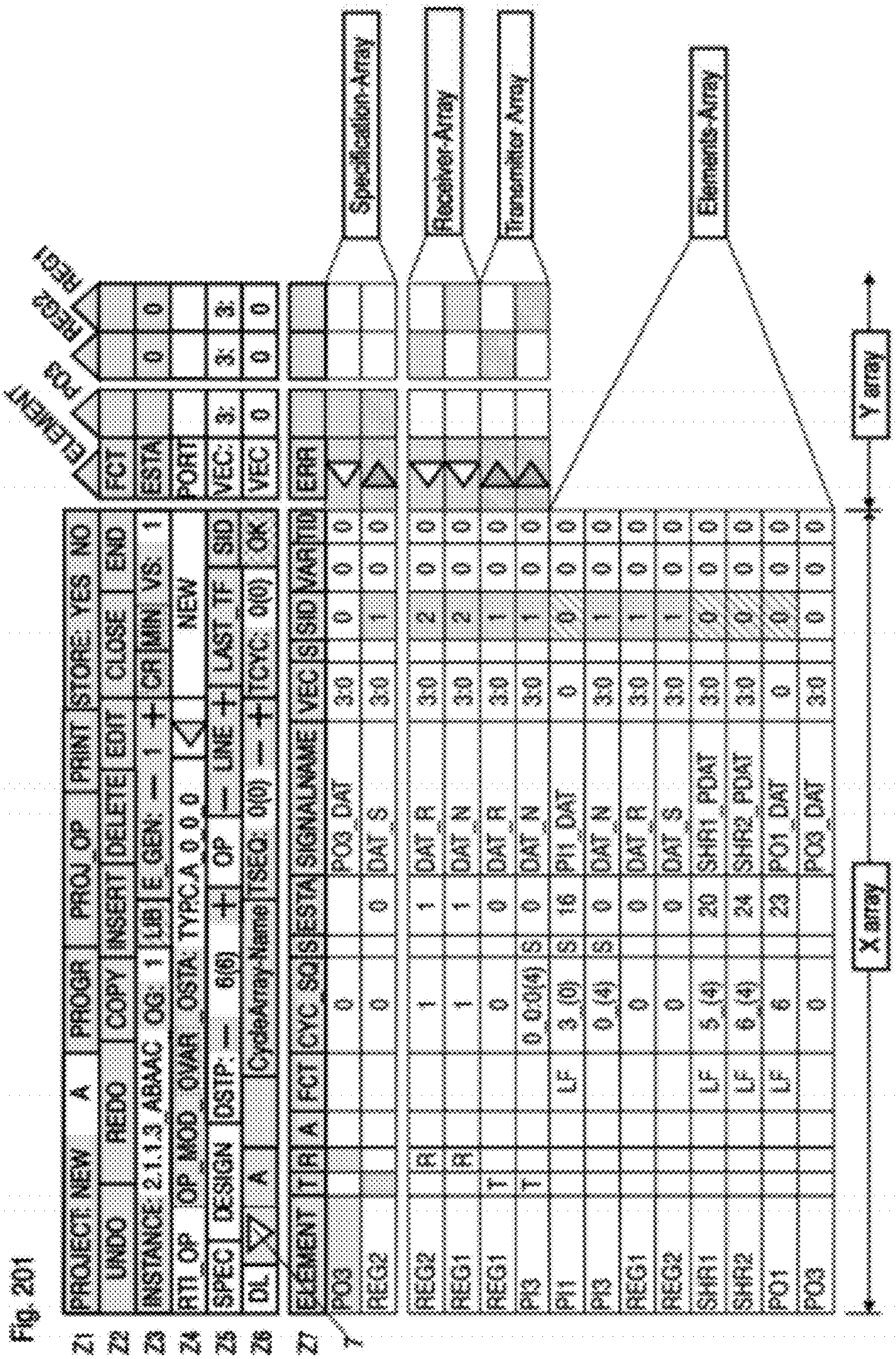
Figure 202:
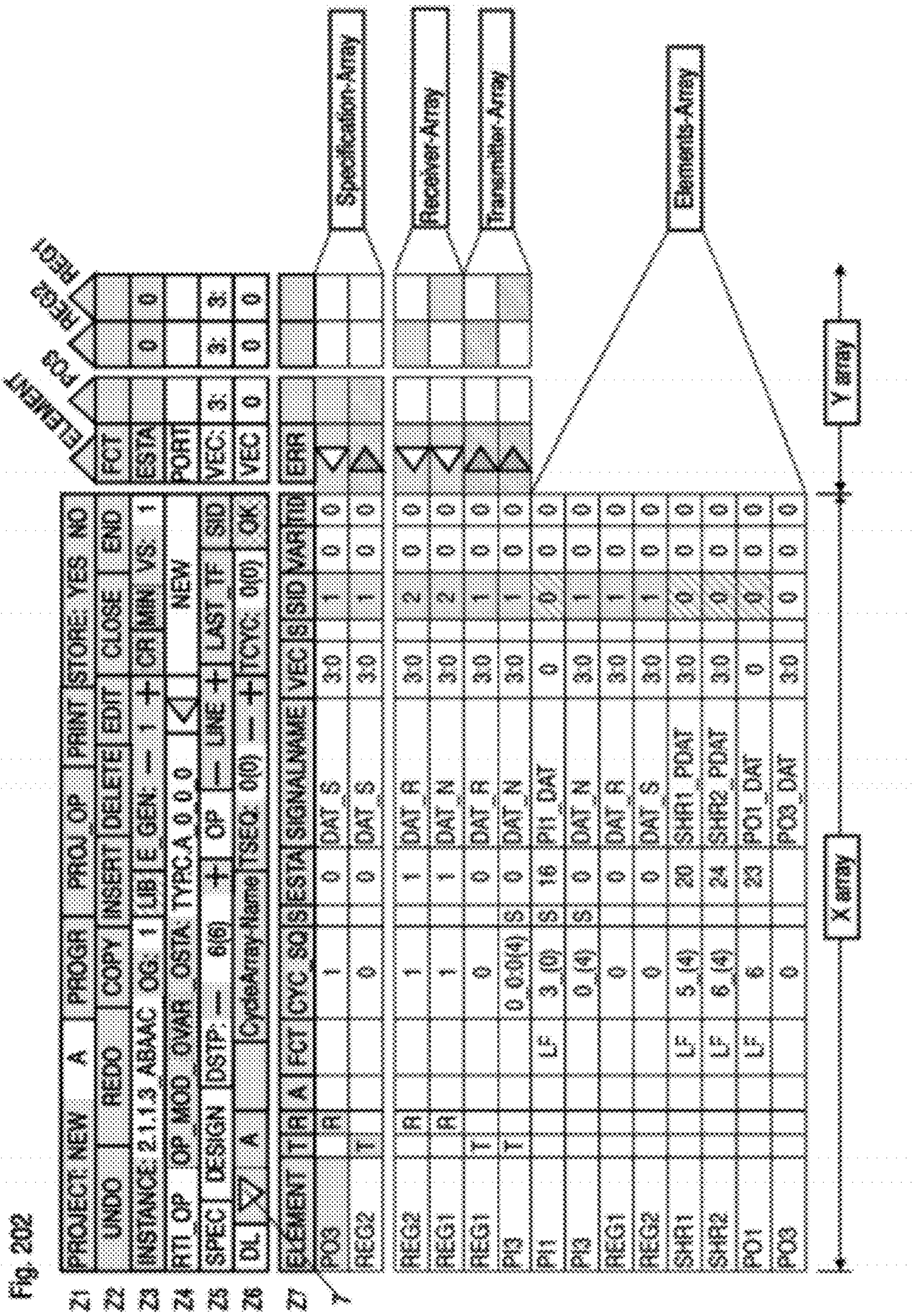

FIG. 201 shows the "DVSTP3" with receiver "PO3" and transmitter "REG2". The transfer elements of "DVSTP2", FIG. 200, were transferred to the receiver array or to the transmitter array, respectively. In FIG. 202 the "DVSTP3" was acknowledged.

Figure 203:
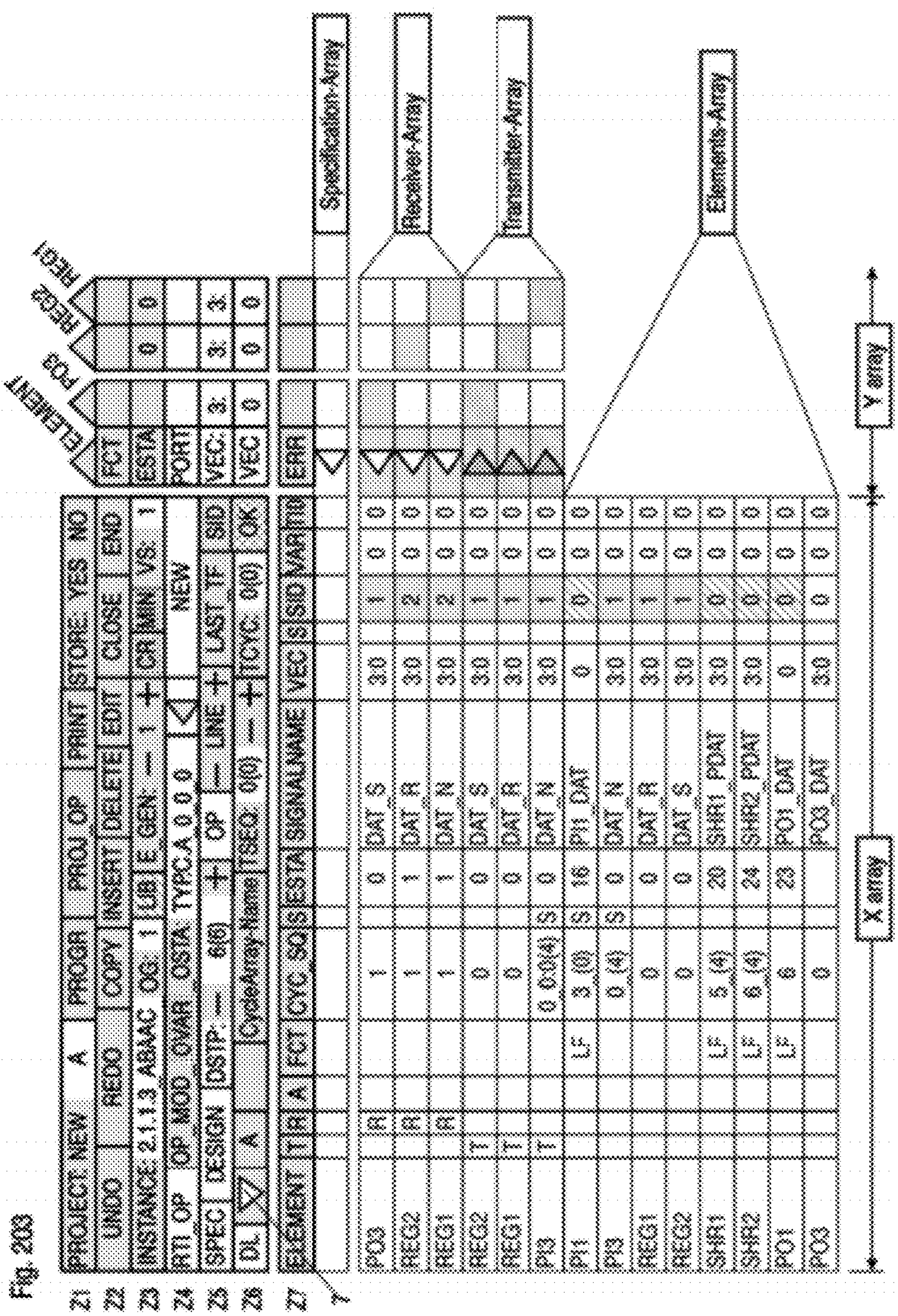
Figure 204:
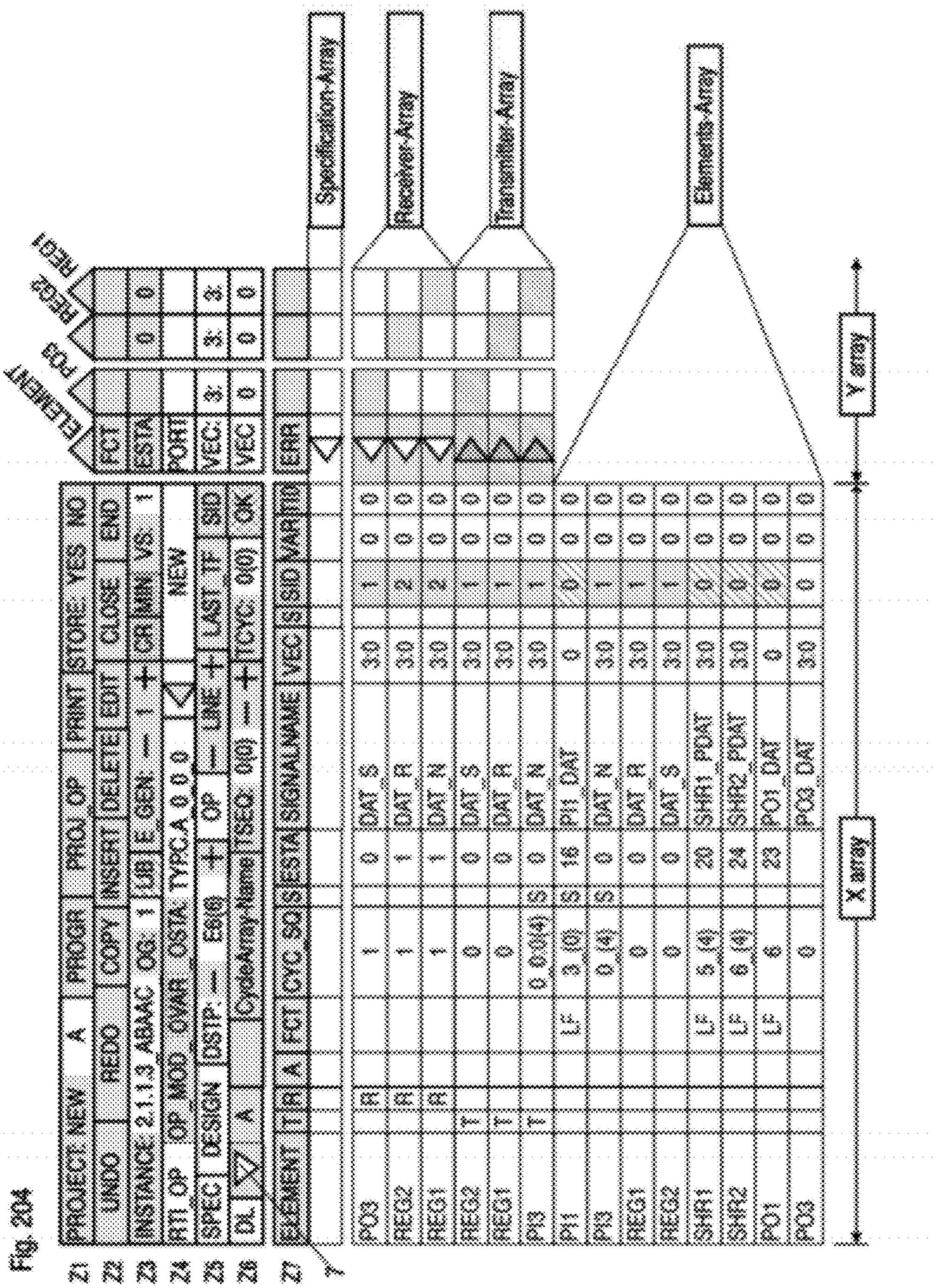
Figure 205:
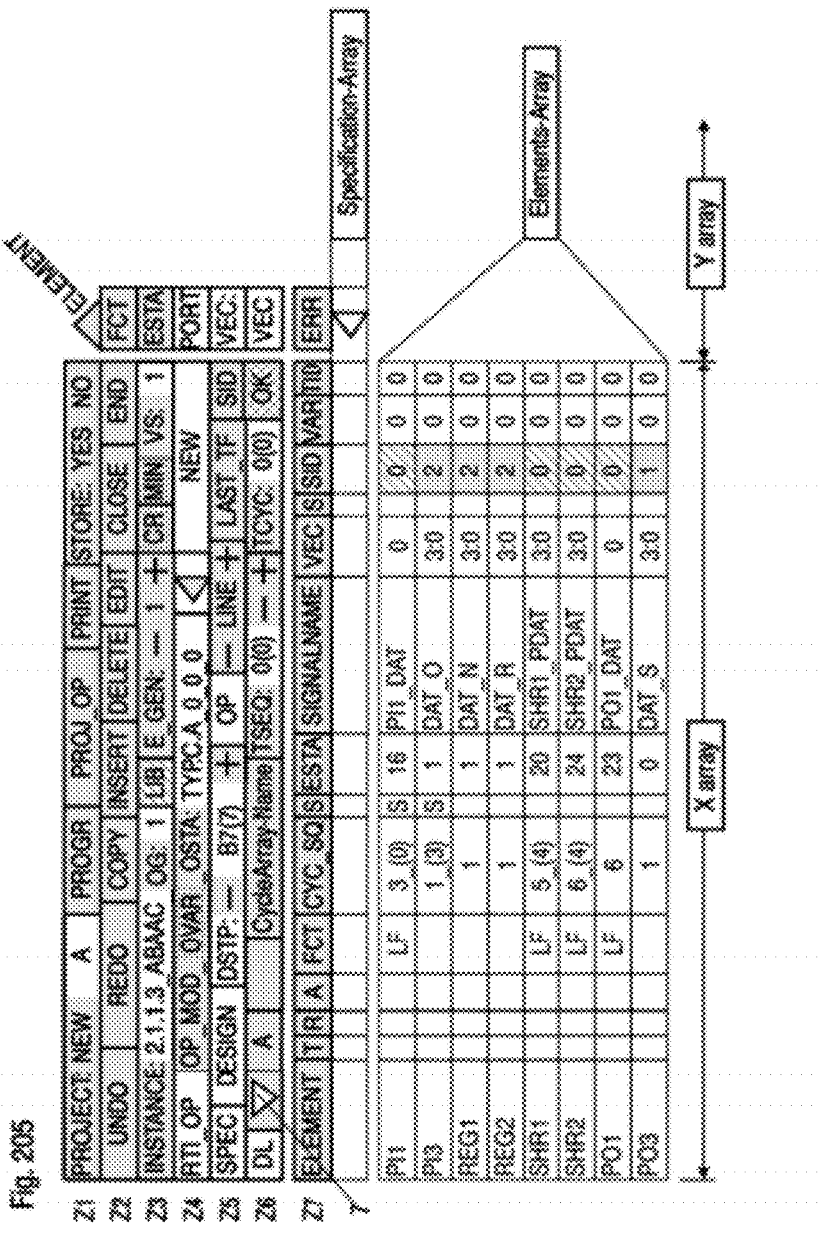

In FIG. 203, in the receiver/transmitter arrays, the transfers of "DVSTP1", "DVSTP2" and "DVSTP3" are illustrated. With acknowledging the design step "DSTP6" by clicking the button "OK" in "Z6", in "Z5" the design step is switched from "DSTP:6(6)" to design step end "DSTP:E6(6)", as FIG. 204 shows. By a repeated click on button "OK" in "Z6", in "Z5" "DSTP:E6(6)" is switched to "DSTP:B7(7)", as shown in FIG. 205.

Figure 206:
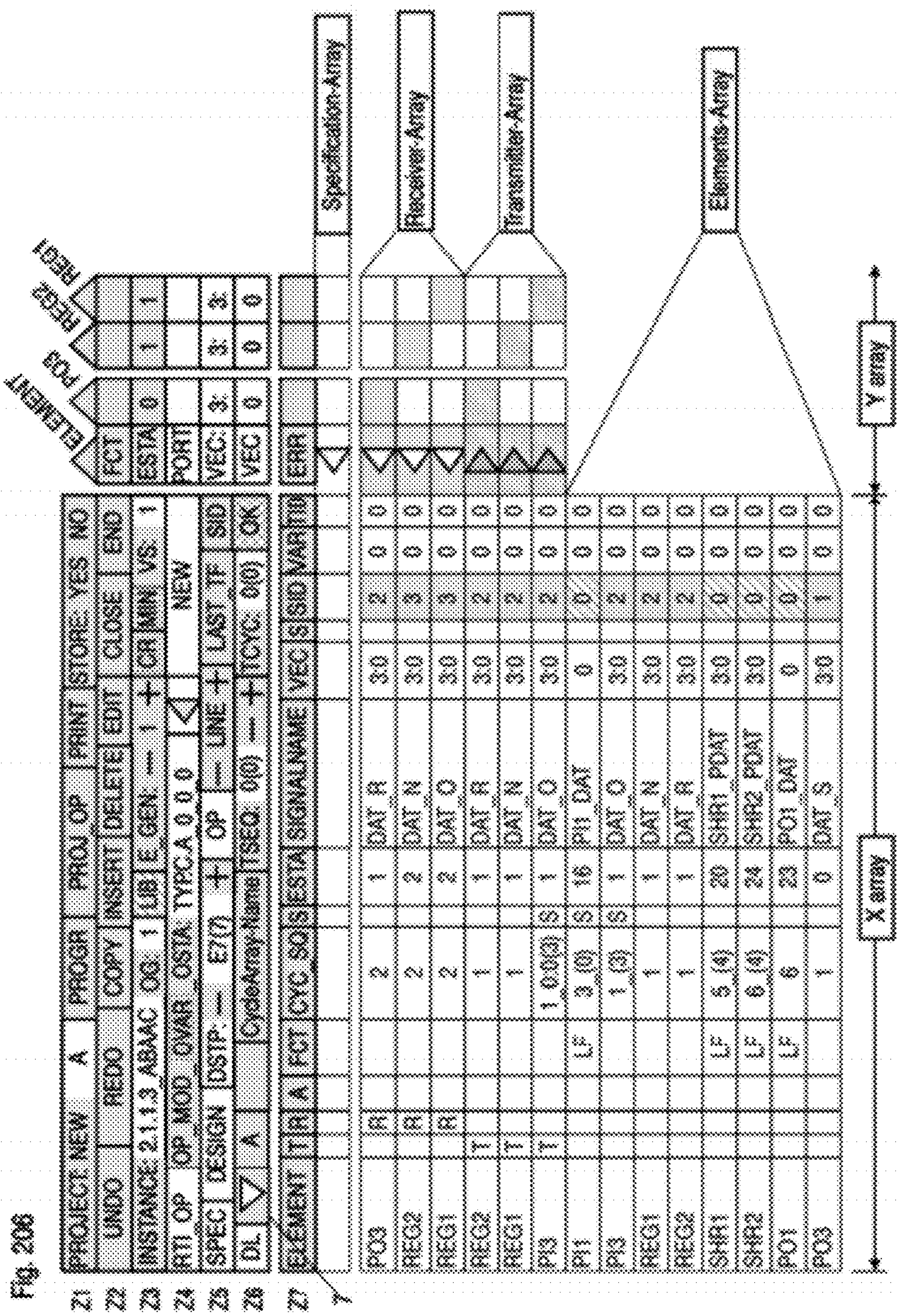
Figure 207:
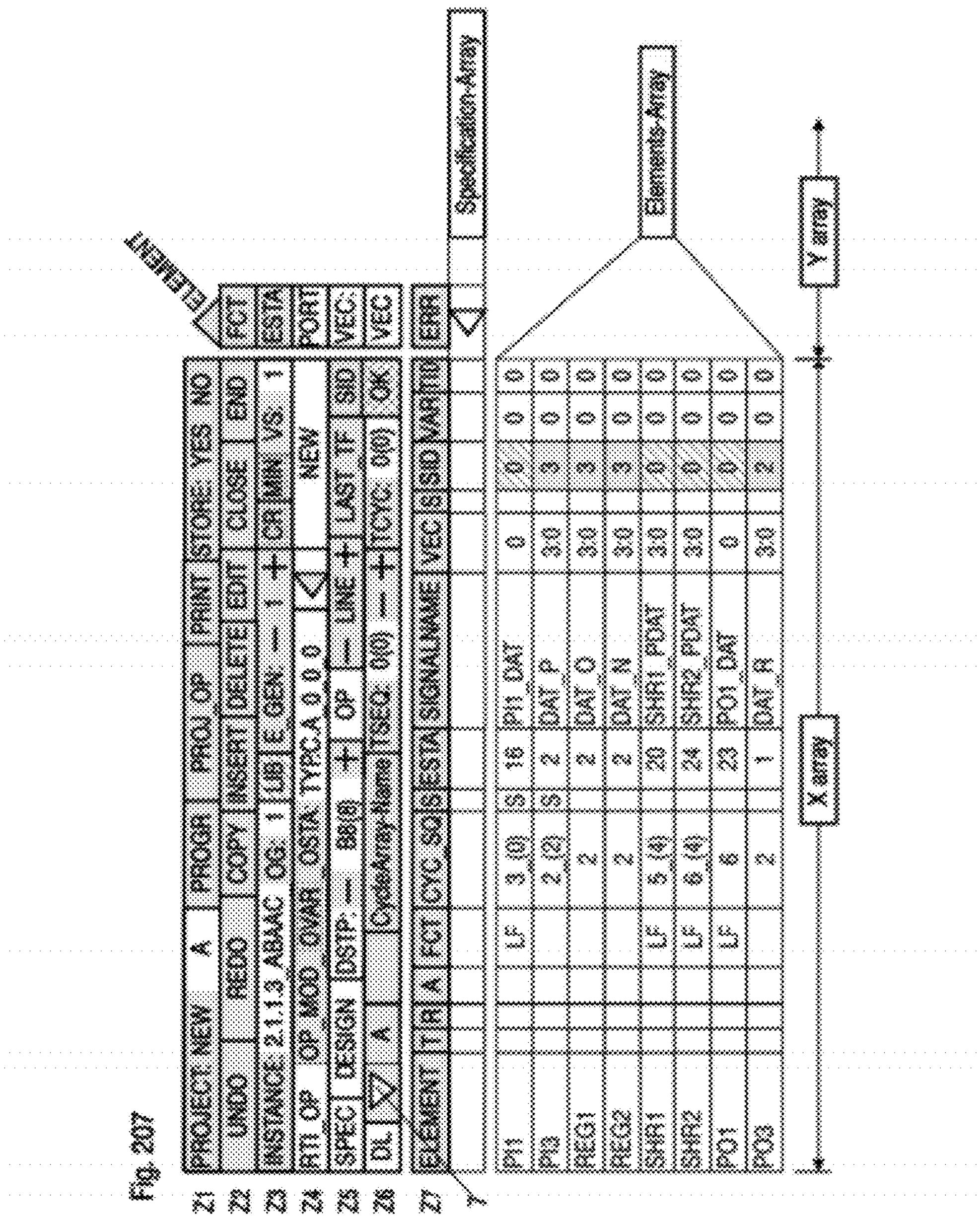
Figure 208:
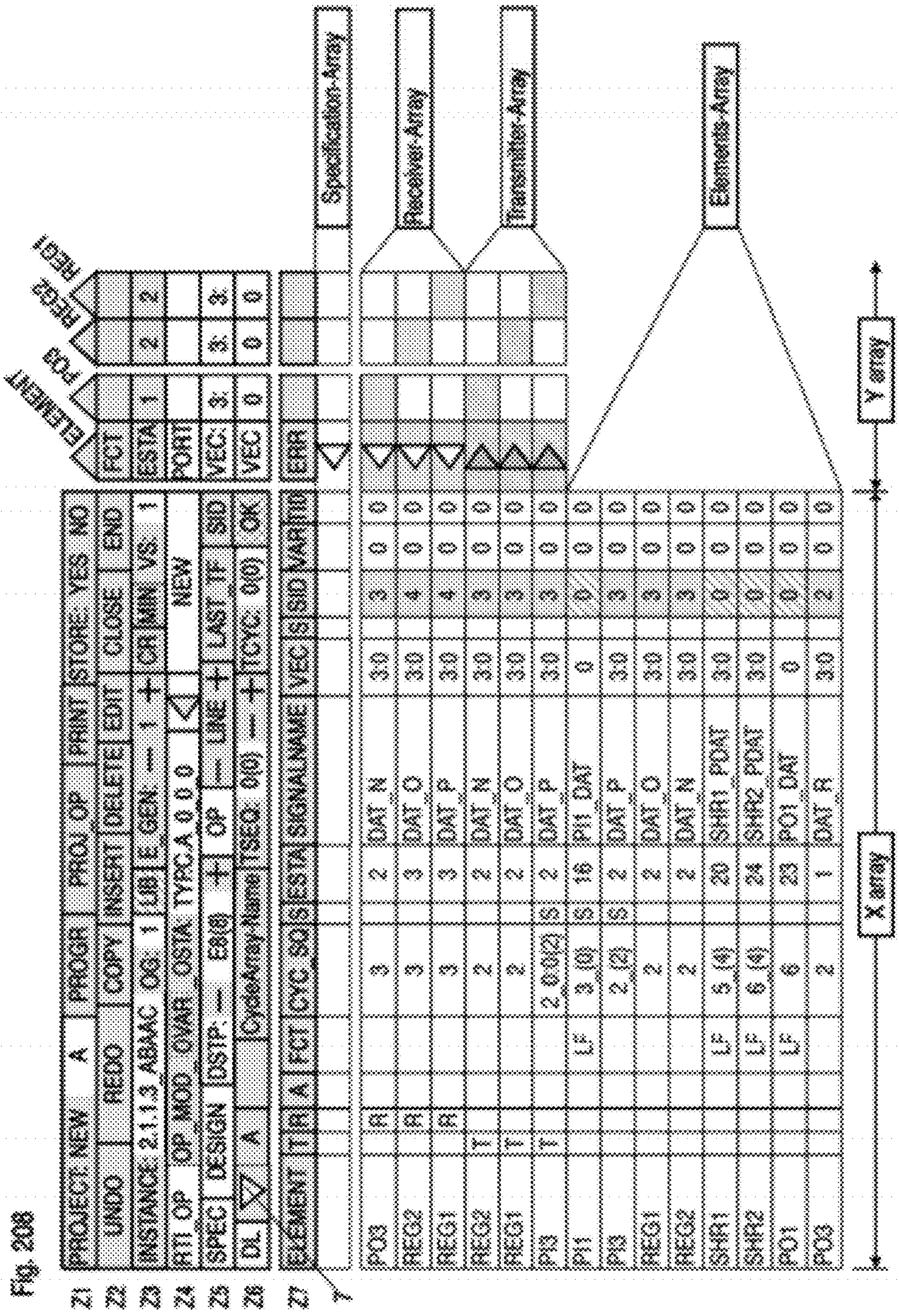

FIG. 206 shows at the end of "DSTP7" all transfers, which were specified in "DSTP7". In FIG. 207 the element array is displayed after switching to beginning of "DSTP8" by click on the button "OK" in "Z6". FIG. 208 shows all transfers of "DSTP8" after finishing.

Figure 209:
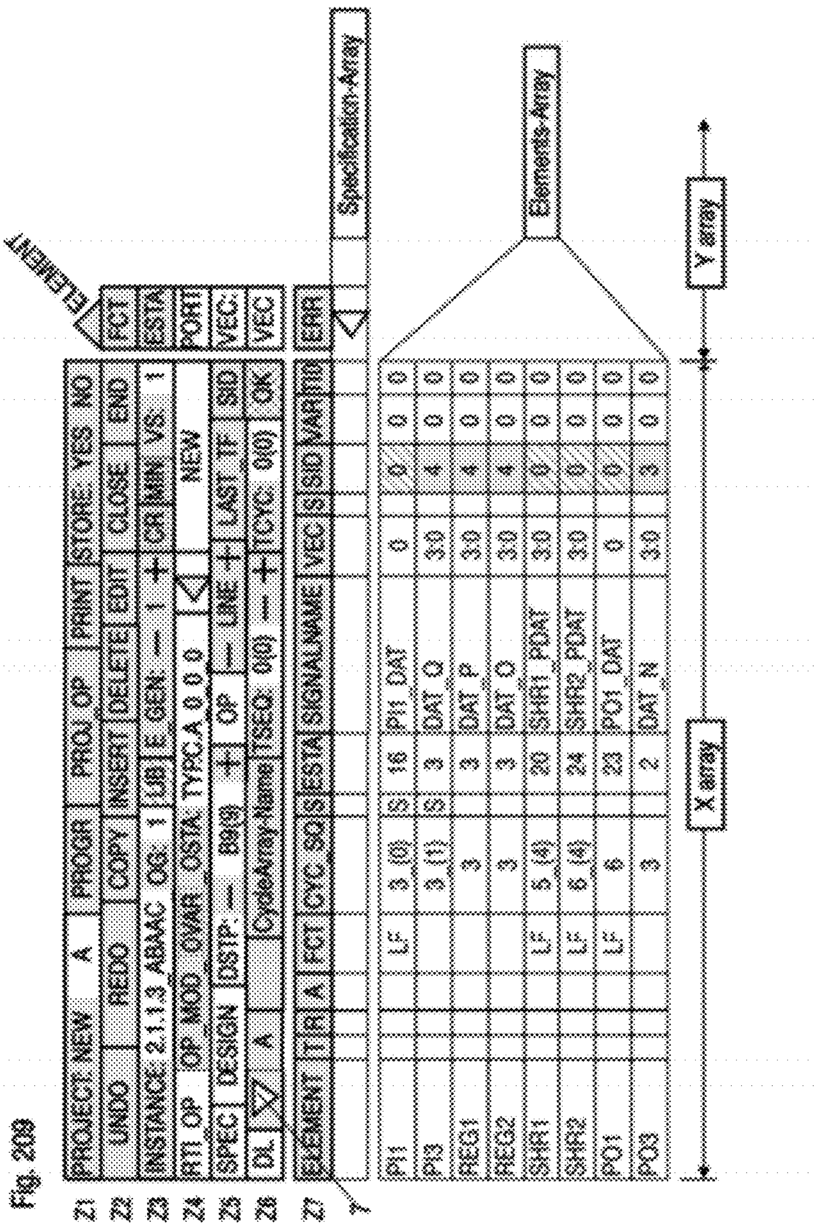
Figure 210:
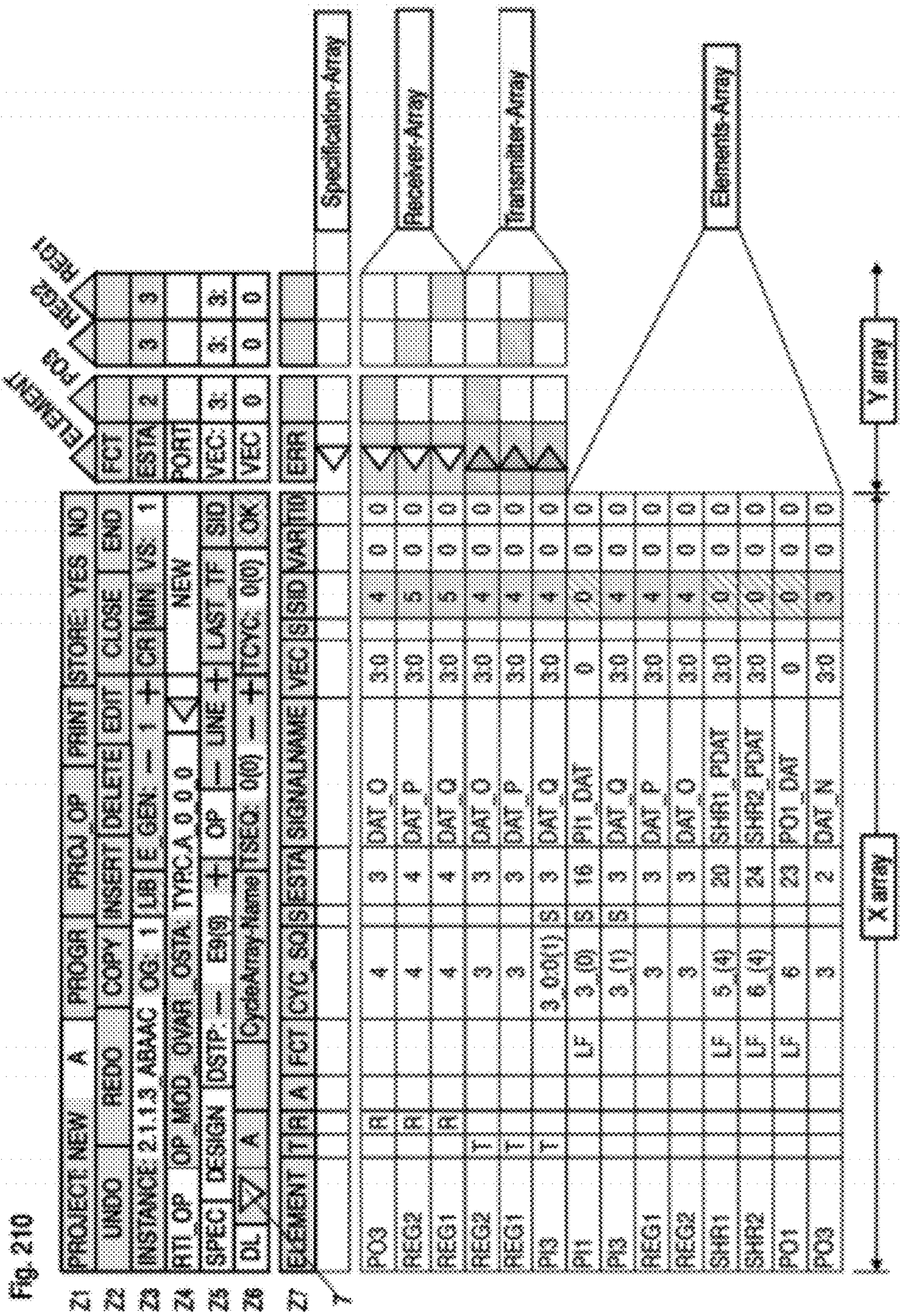
Figure 211:
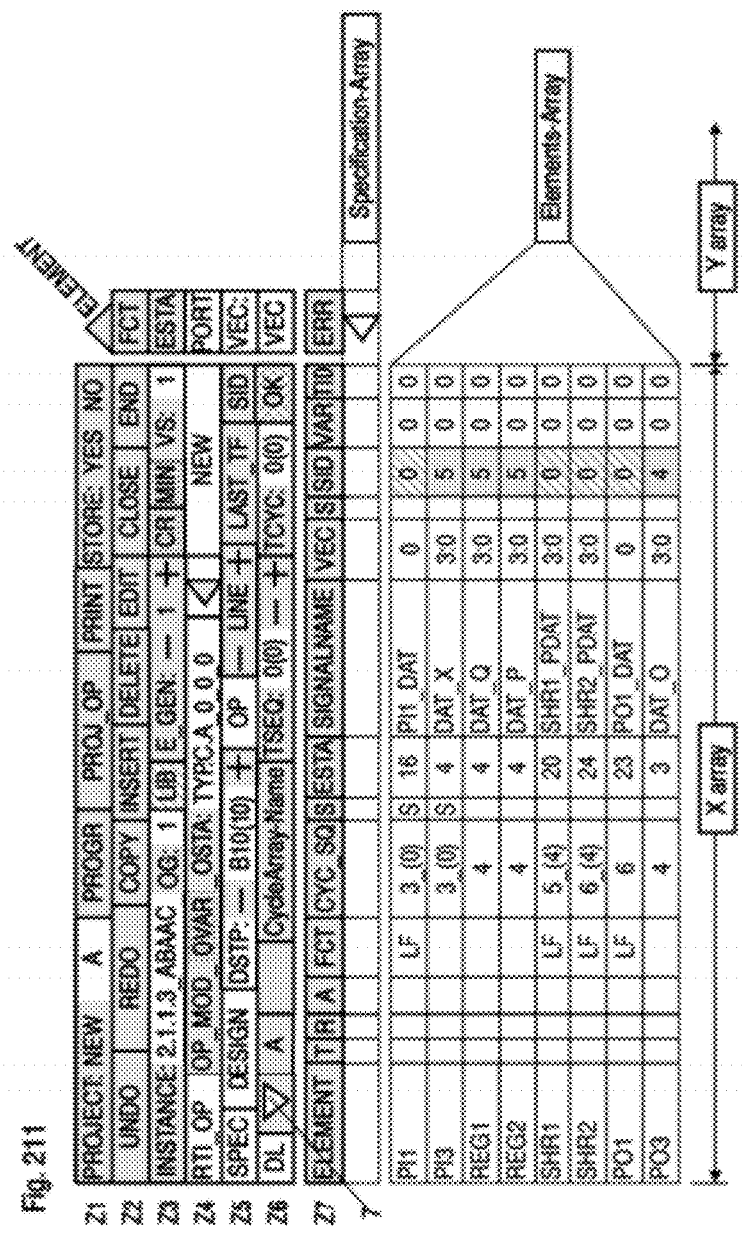
Figure 212:
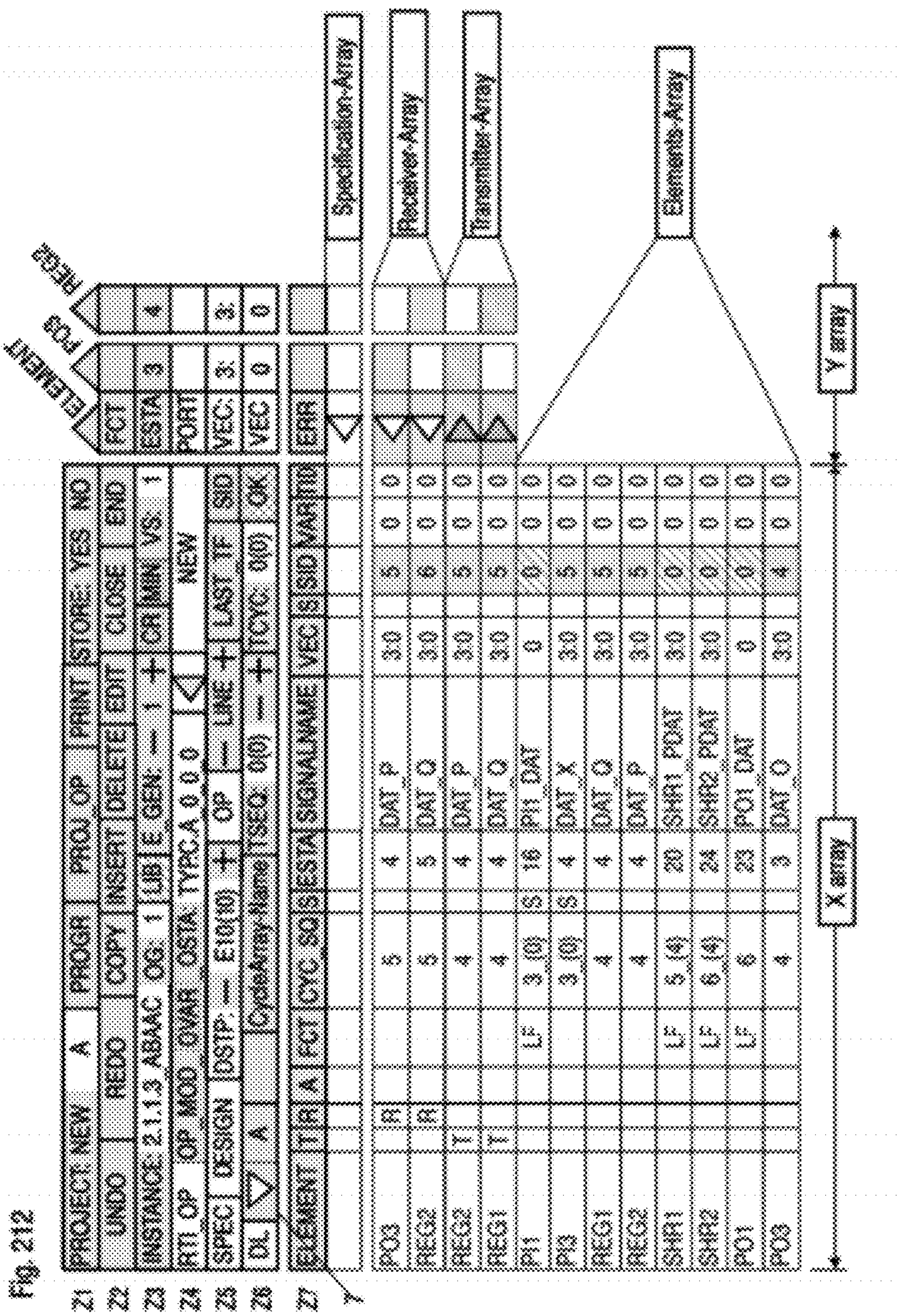
Figure 213:
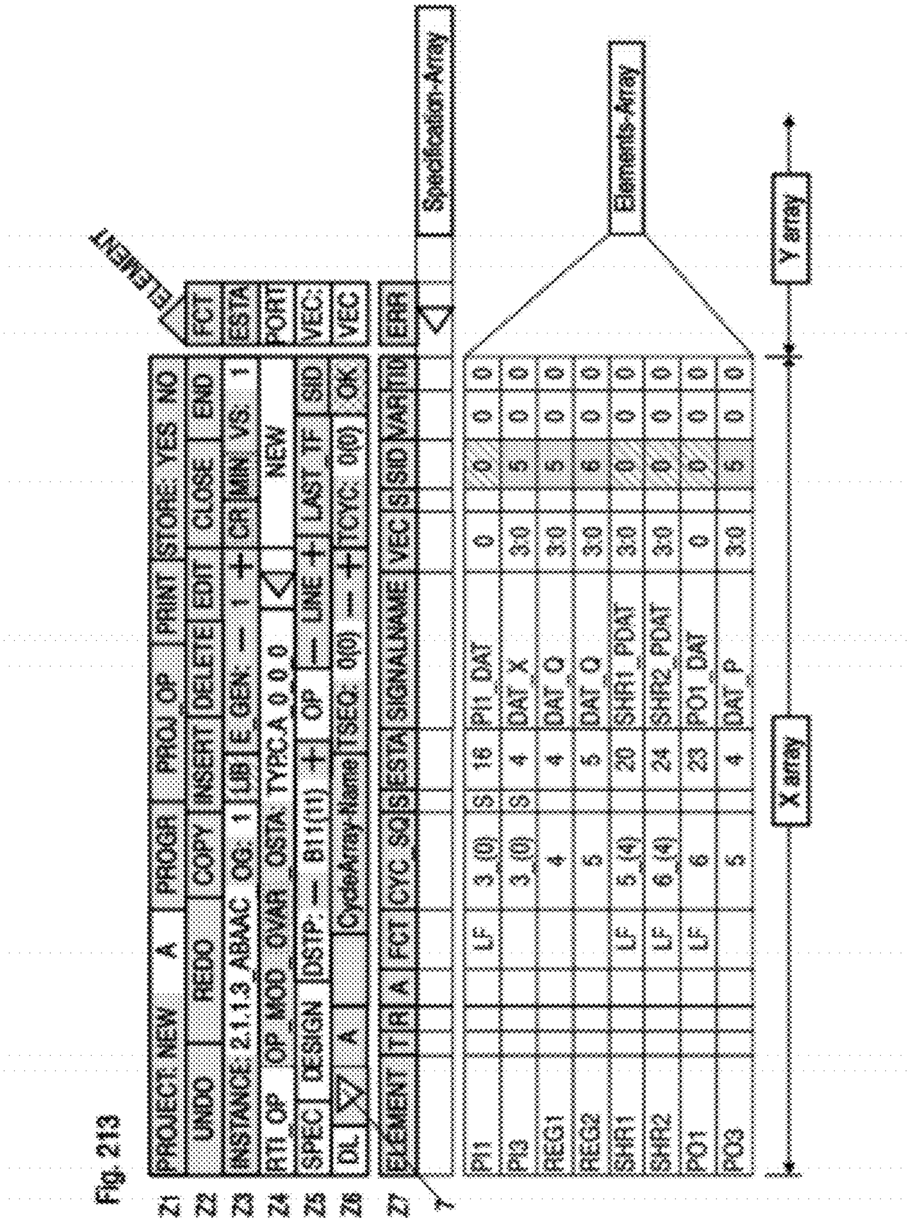
Figure 214:
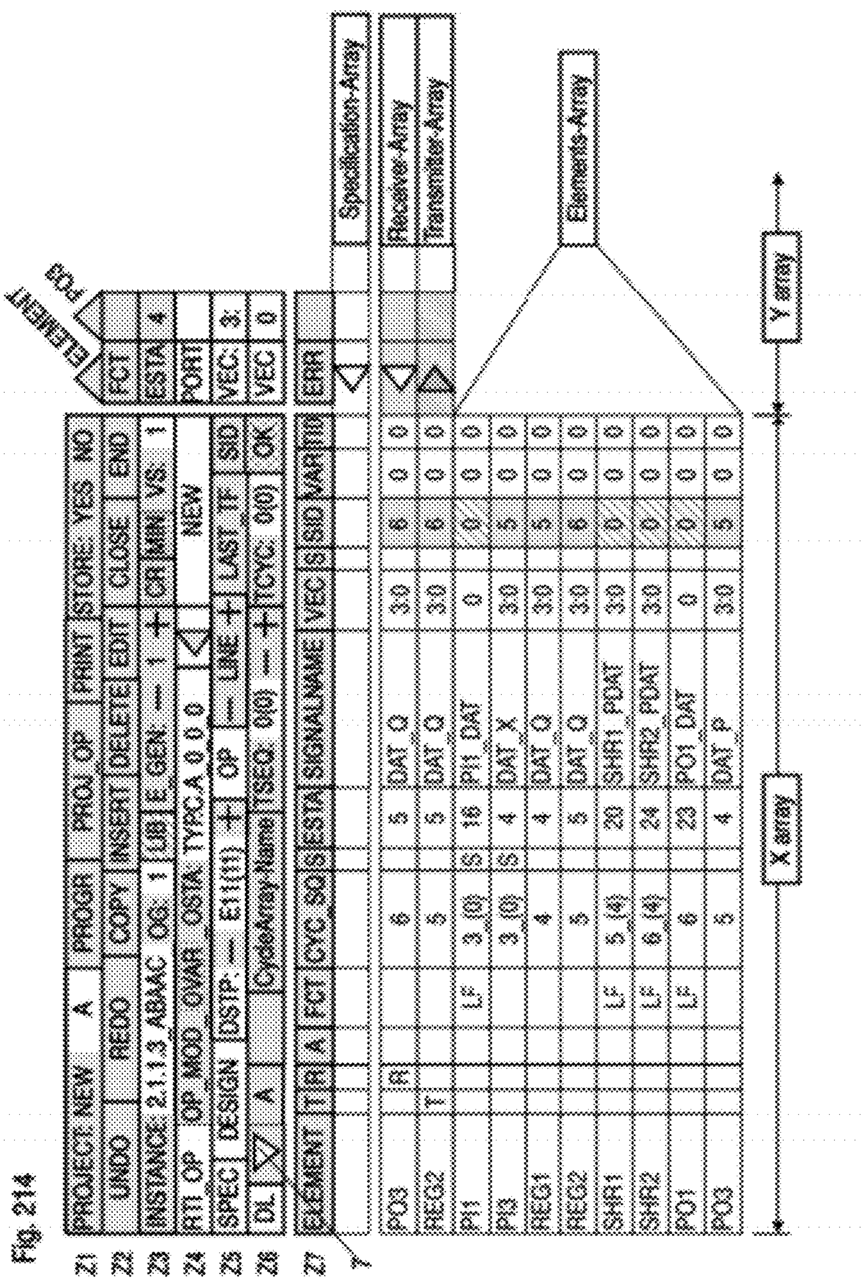
Figure 215:
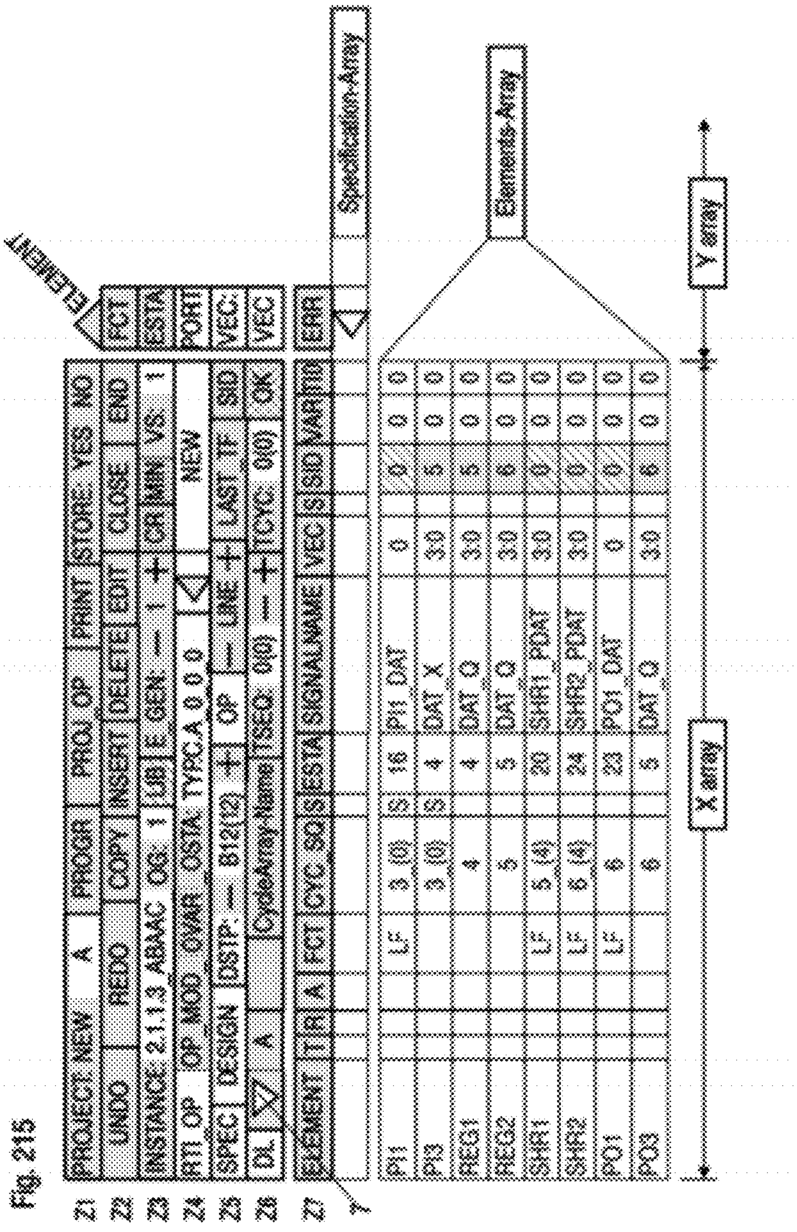

In FIG. 209 the newly generated element array after switching by "OK" from "DSTP:E8(8)" to "DSTP:B9(9)" is illustrated. In the subsequent figures the contents of the specification are illustrated for the design step end and for the design step beginning in the order of the design steps. It is shown in FIG. 210 the design step end "DSTP:E9(9)" with all transfers, in FIG. 211 the design step beginning "DSTP:B10(10)" with the new element array, in FIG. 212 the design step end "DSTP:10(10)" with all transfers, in FIG. 213 the design step beginning "DSTP:B11(11)" with the new element array, in FIG. 214 the design step end "DSTP:E11(11)" with all transfers, and in FIG. 215 the design step beginning "DSTP:B12(12)" with the new element array.

Description to FIG. 216-221

Figure 216:
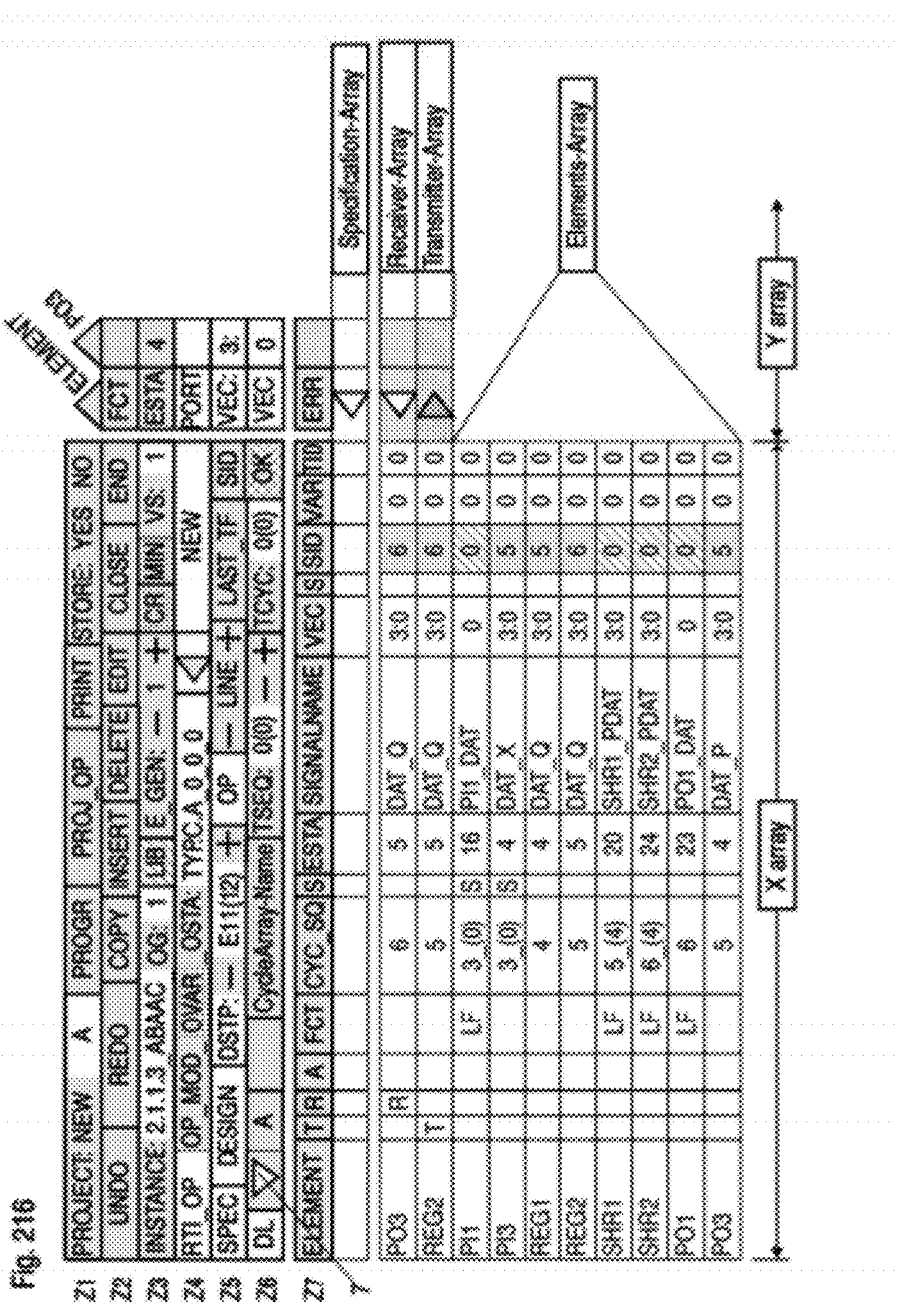
Figure 217:
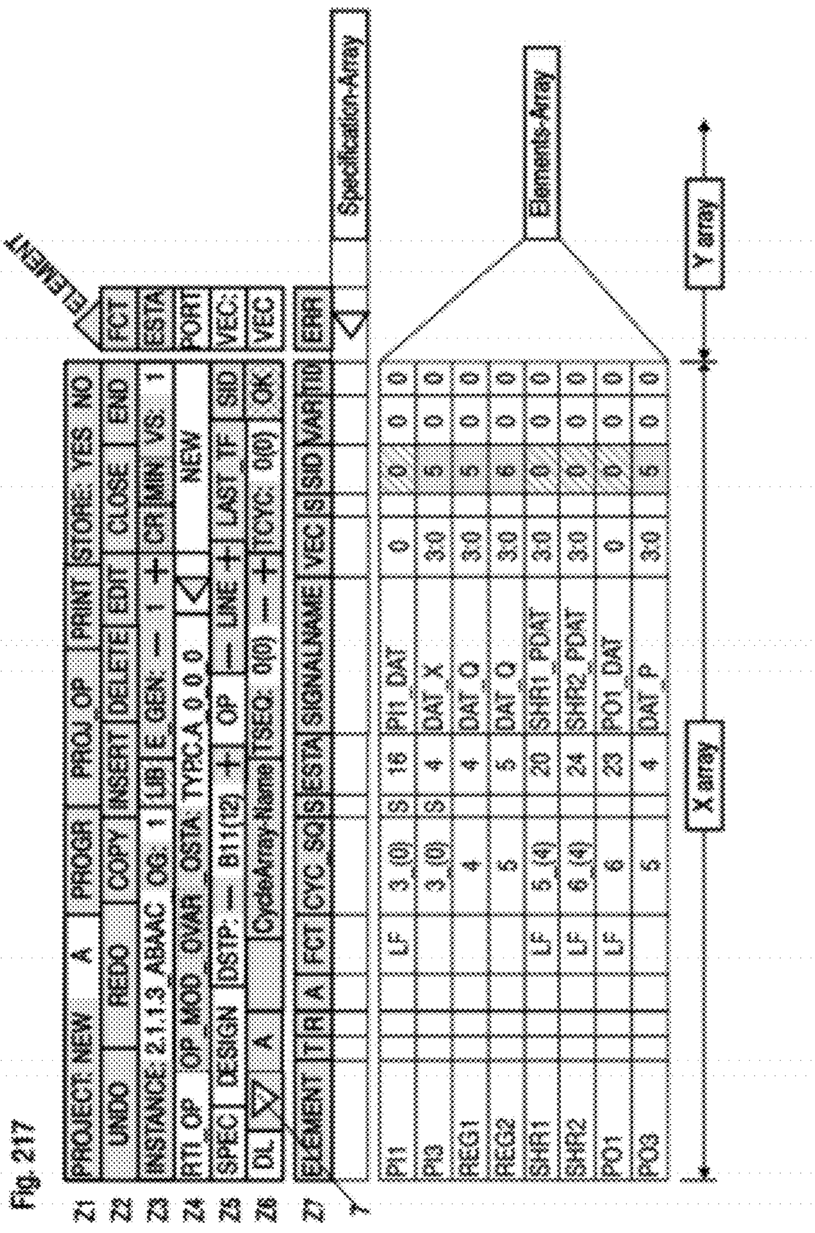

If the preceding design steps should be displayed, then this can be achieved by an according number of clicks on the button DSTP:"−" in "Z5". In FIG. 216 by clicking the button DSTP:"−" the display of "DSTP:B12(12)" was switched to "DSTP:E11(12)". By a further click on the button DSTP:"−" the display is switched from "DSTP:E11(12)" to "DSTP:B11(12)" as FIG. 217 shows. By further clicks on button DSTP:"−" the display is switched sequentially to "DSTP:E10(12)", "DSTP:B10(12)", "DSTP:E9(12)", "DSTP:B9(12)", "DSTP:E8(12)", etc. If the button DSTP:"−" remains pressed, the display runs back to the beginning of "DSTP:B0(12)". The switching of the display in reverse order happens identically by clicks on the button DSTP:"+" in line "Z5". If during increasing of the design steps the last design step was not yet finished, then the last design step is shown in its actual working state.

Figure 218:
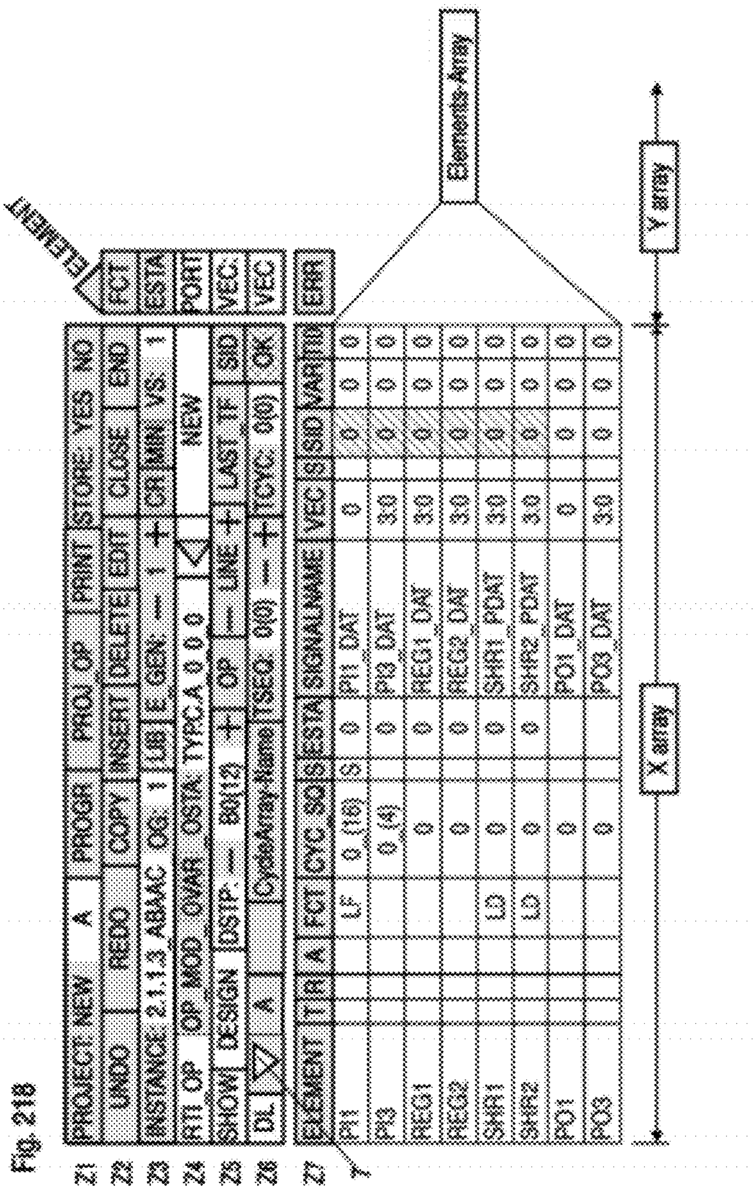
Figure 219:
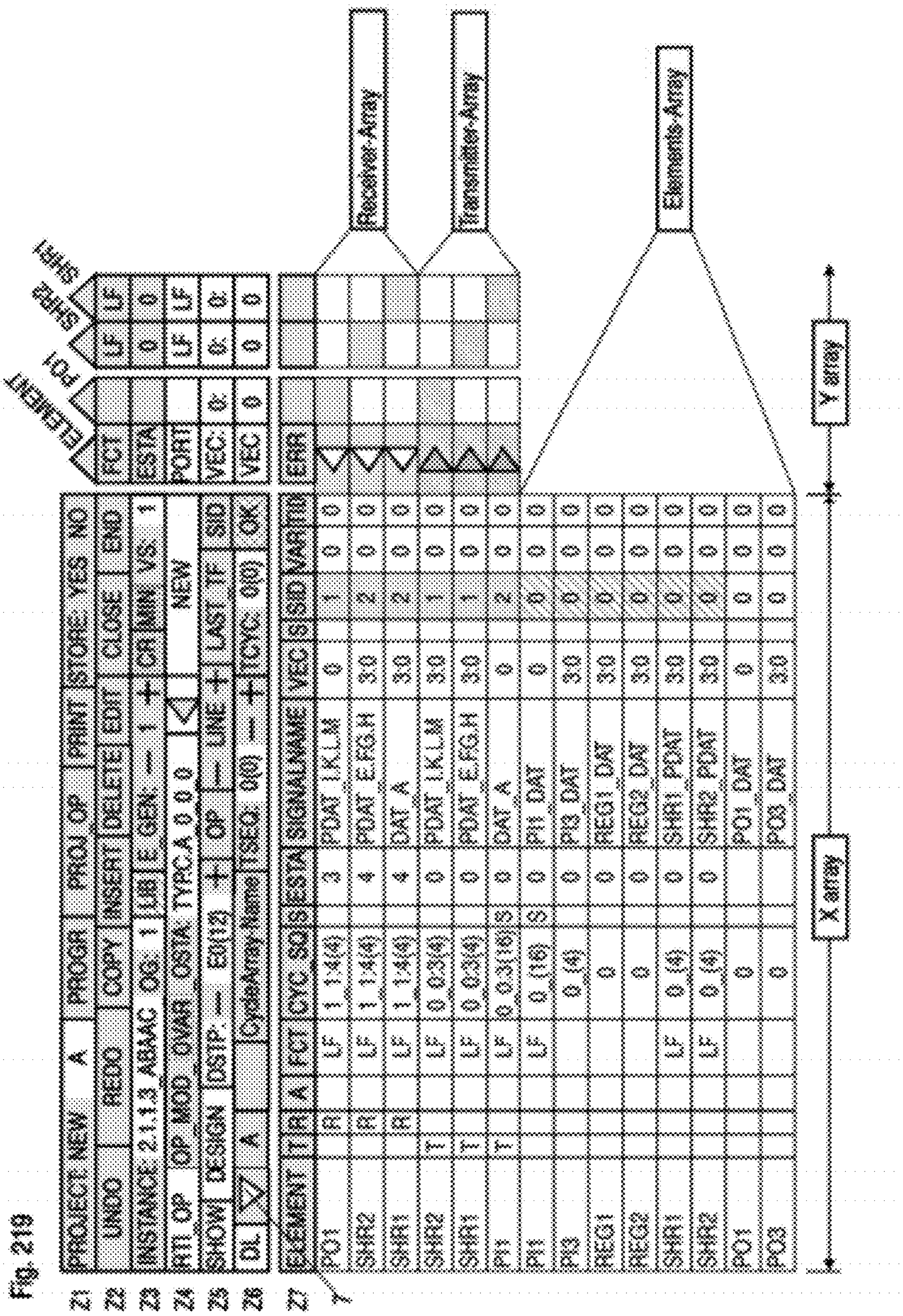
Figure 22O:
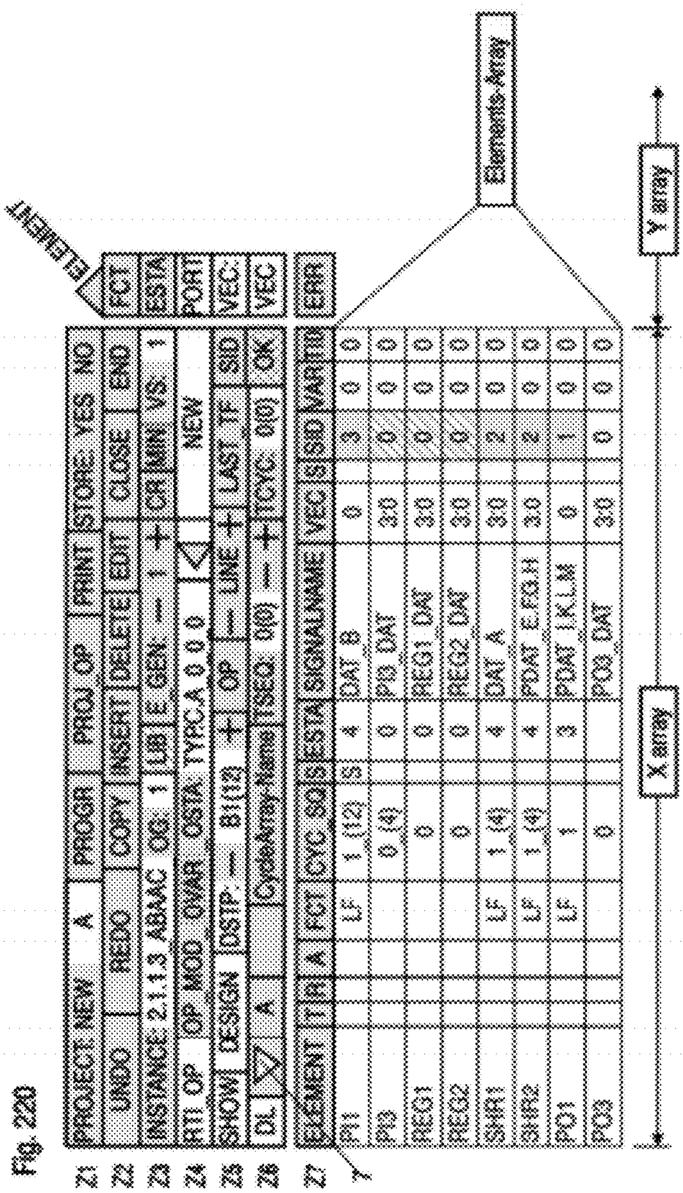
Figure 221:
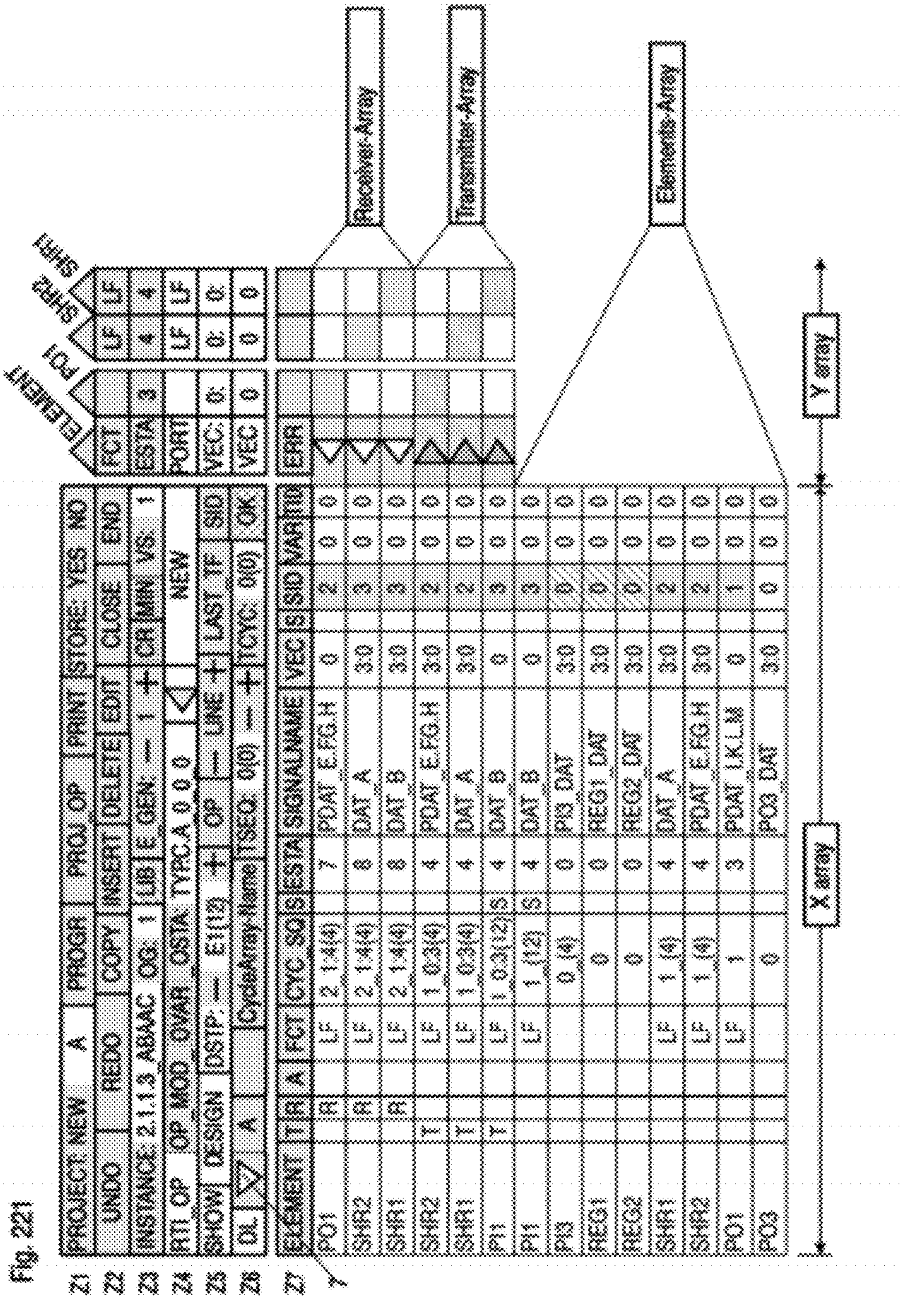

By clicking the button "SPEC" in line "Z5" the display changes from specification mode "SPEC" to display mode "SHOW", as FIG. 218 shows. Thereby the design step, for example, is set to the beginning "DSTP:B0(12)" and the display of the element array in SHOW mode in FIG. 218 is thus identical to the display in SPEC mode in FIG. 166. In SHOW mode the button operation "OP" in "Z5" is deactivated automatically. Thus in SHOW mode the RTI operation specification can be displayed, but cannot be continued or modified. The increasing or decreasing of the DSTP in SHOW mode is achieved, like in SPEC mode, by the buttons DSTP:"+" or DSTP:"−" in "Z5". With identical design step the status of the RTI operation specification in SHOW mode and SPEC mode is identical, for example "DSTP:E0": SHOW mode FIG. 219 is identical to SPEC mode FIG. 180, "DSTP:B1": SHOW-mode FIG. 220 identical to SPEC-mode FIG. 181, "DSTP:E1": SHOW-mode FIG. 221 is identical to SPEC-mode FIG. 182.

Description to FIG. 222-228

Figure 222:
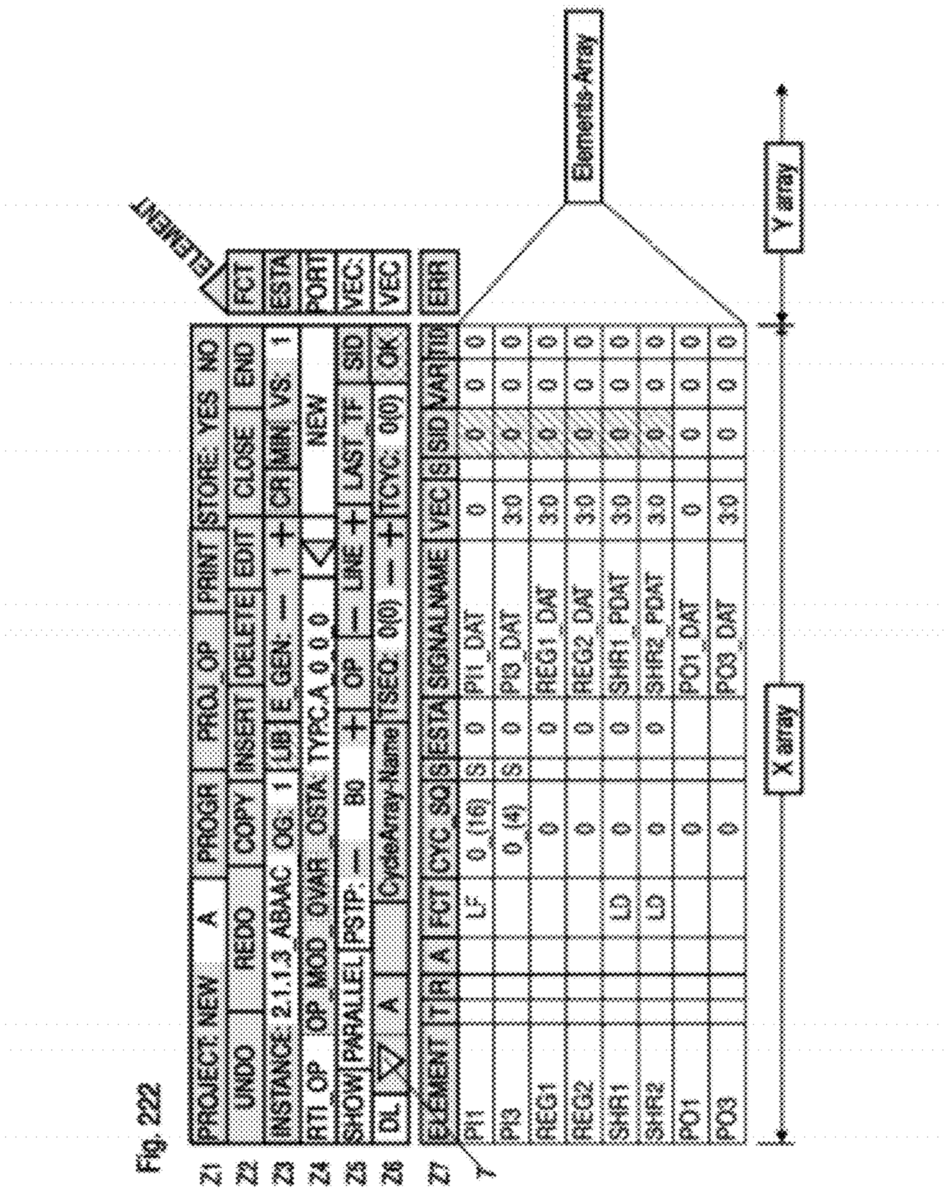

With the RTI operation specification the developer can specify partial designs, in relation to the arising RTI general design, in any order. A partial design may contain any number of design steps "DSTPs". A "DSTP" can contain any number of data processing steps "DVSTPs". Independent of the order of the specification of partial designs and allocation of the "DSTPs" and "DVSTPs", in the so called "SHOW-PARALLEL mode" the simultaneously effective "DVSTPs" in the already specified RTI partial designs or, respectively, in the RTI total design can be displayed step by step. For that in SHOW mode by clicking the button "DESIGN" in "Z5" the button is switched from "DESIGN" to "PARALLEL" and the button design step "DSTP:" is switched to parallel step "PSTP:", as shown in FIG. 222. Thereby the beginning "B" of the first parallel step "0" with "PSTP:B0" and the "element array" with state before an RTI operation specification is displayed in "Z5".

Figure 223:
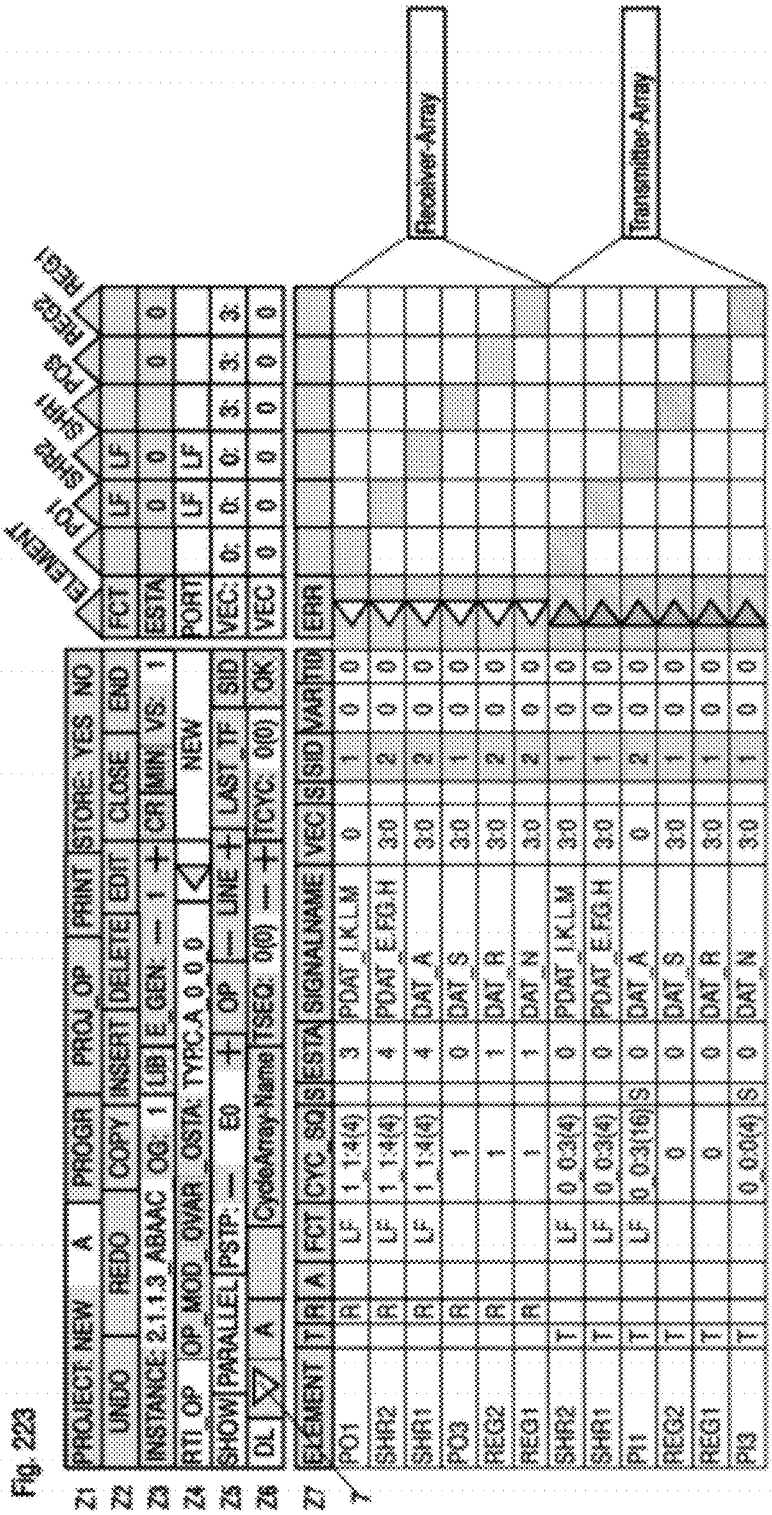

Clicking the button PSTP:B0"+" in "Z5" switches to the end "E" of the first parallel step "0" with the display "PSTP:E0", as FIG. 223 shows. Herein all simultaneously, parallel effective data processing steps "DVSTPs" in the first parallel step "0" of the until now specified RTI design corresponding to the block structures of FIG. 164*a* and FIG. 195*a* are indicated by the transfer order in "transmitter/receiver array". The involved partial design specifications with their simultaneous, parallel effective "DVSTPs" are illustrated in FIG. 180 with "DSTP:E0(0)" and FIG. 204 with "DSTP:E6(6)". In the block structure of FIG. 164*a* the data are transferred simultaneously from "PI1" to "SHR1", from "SHR1" to "SHR2" and from "SHR2" to "PO1". Simultaneously to the transfer in block structure FIG. 164*a*, the transfer in block structure FIG. 195*a* from "PI3" to "REG1", from "REG1" to "REG2" and from "REG2" to "PO3", is processed, as it was displayed at the end of the first parallel step "PSTP:E0" in FIG. 223. If the data transfer in the block structure of FIG. 164*a*, for example, would be effectuated not by a data shift, but would be done stepwise, in the first step from"PI1" to "SHR1", in the second step from "SHR1" to "SHR2", etc., then in FIG. 223, instead of transfers from "PI1" to "SHR1", from "SHR1" to "SHR2" and from "SHR2" to "PO1", only the transfer from "PI1" to "SHR1" would be illustrated.

Figure 224:
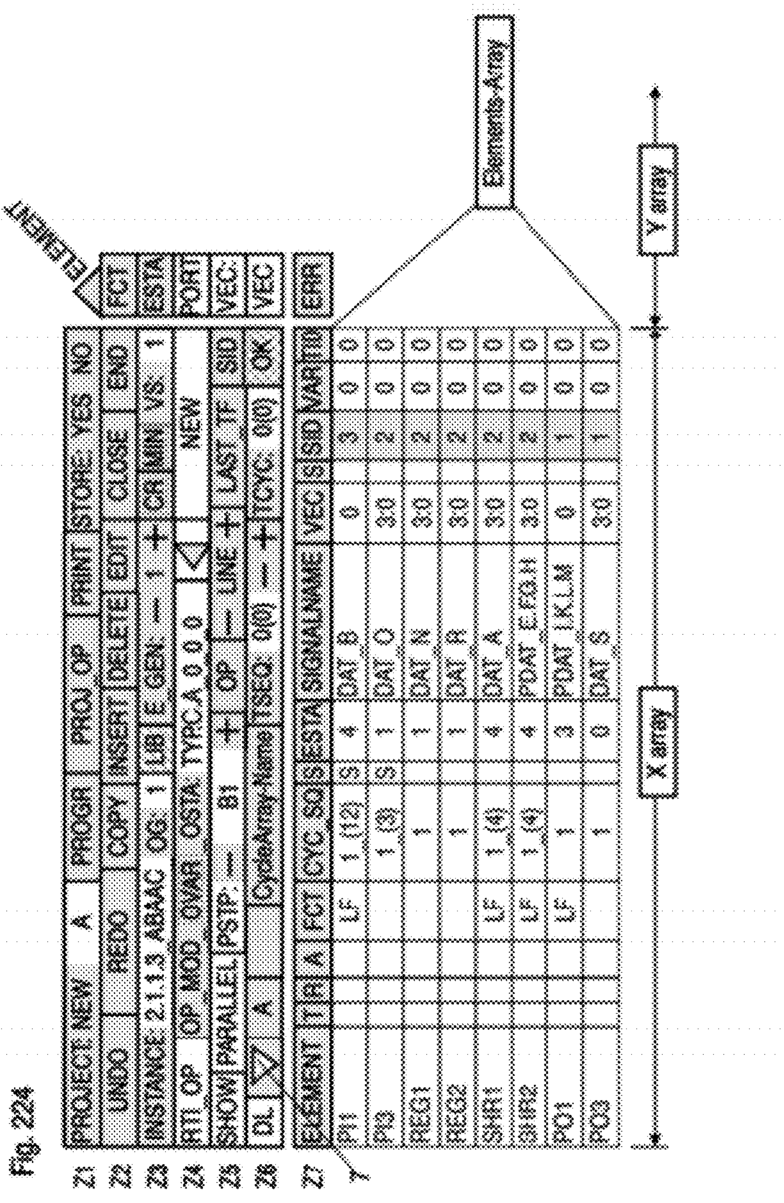

Clicking the button PSTP:E0"+" in "Z5" switches to the beginning "B" of the second parallel step with the display "PSTP:B1", illustrating the parameters in FIG. 181 with "DSTP:B1(1)" and in FIG. 205 with "DSTP:B7(7)", as FIG. 224 shows.

Figure 225:
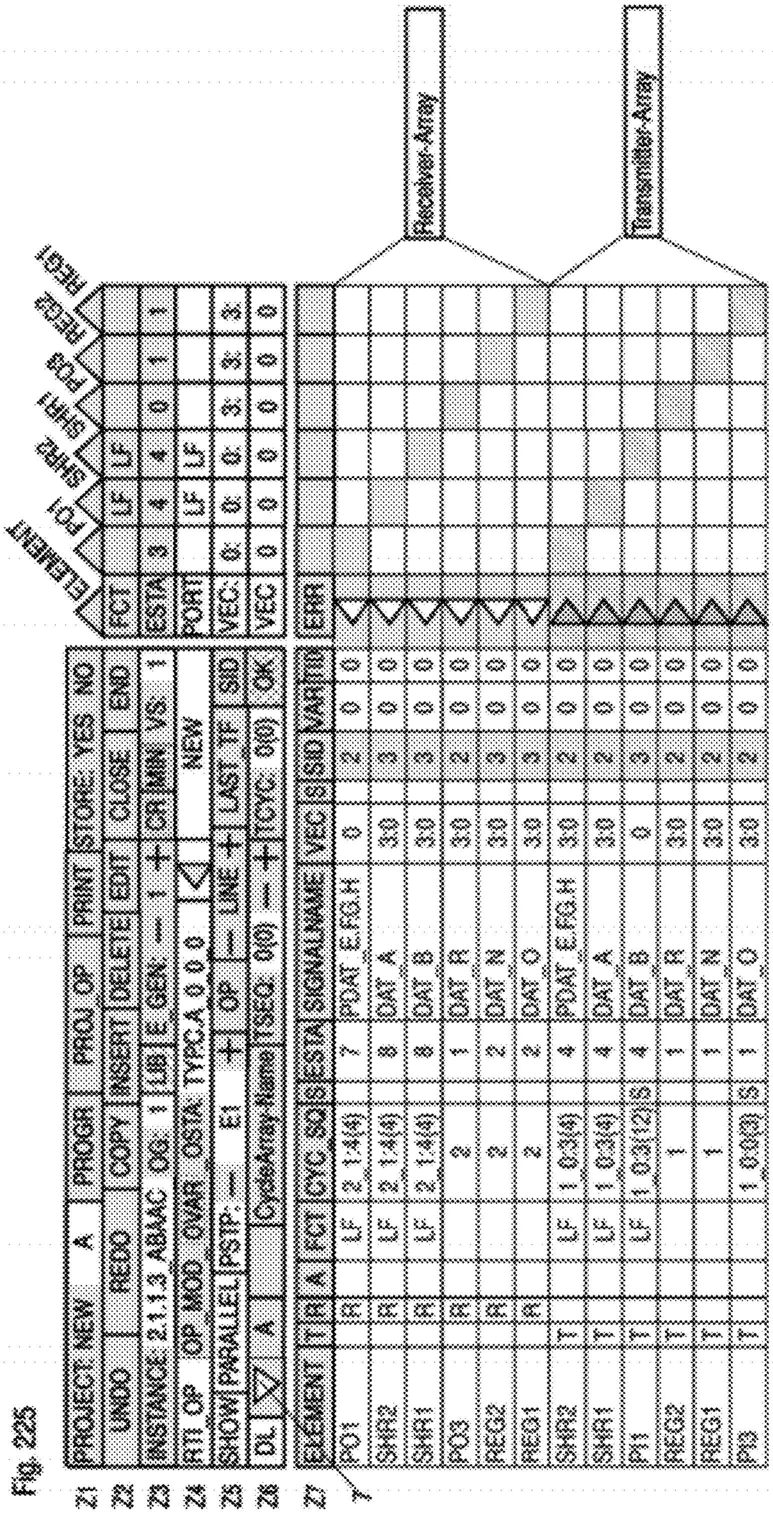

Clicking the button PSTP:B1"+" in "Z5" switches to parallel step end "PSTP:E1", illustrating the transfers in FIG. 182 with "DSTP:E1(1)" and in FIG. 206 with "DSTP:E7(7)", as FIG. 225 shows.

Figure 226:
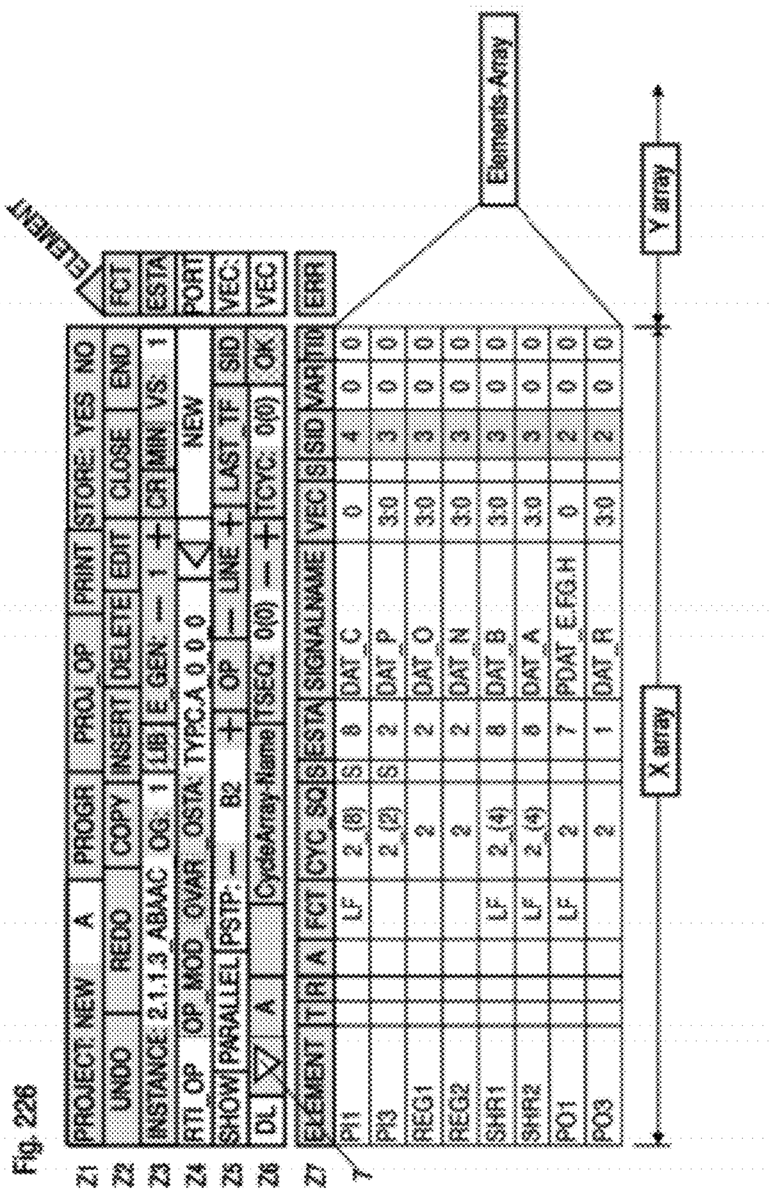

Clicking the button PSTP:E1"+" in "Z5" switches to the beginning "B" of the third parallel step with the display "PSTP:B2", illustrating the parameters in FIG. 183 with "DSTP:B2(2)" and in FIG. 207 with "DSTP:B8(8)", as FIG. 226 shows.

Figure 227:
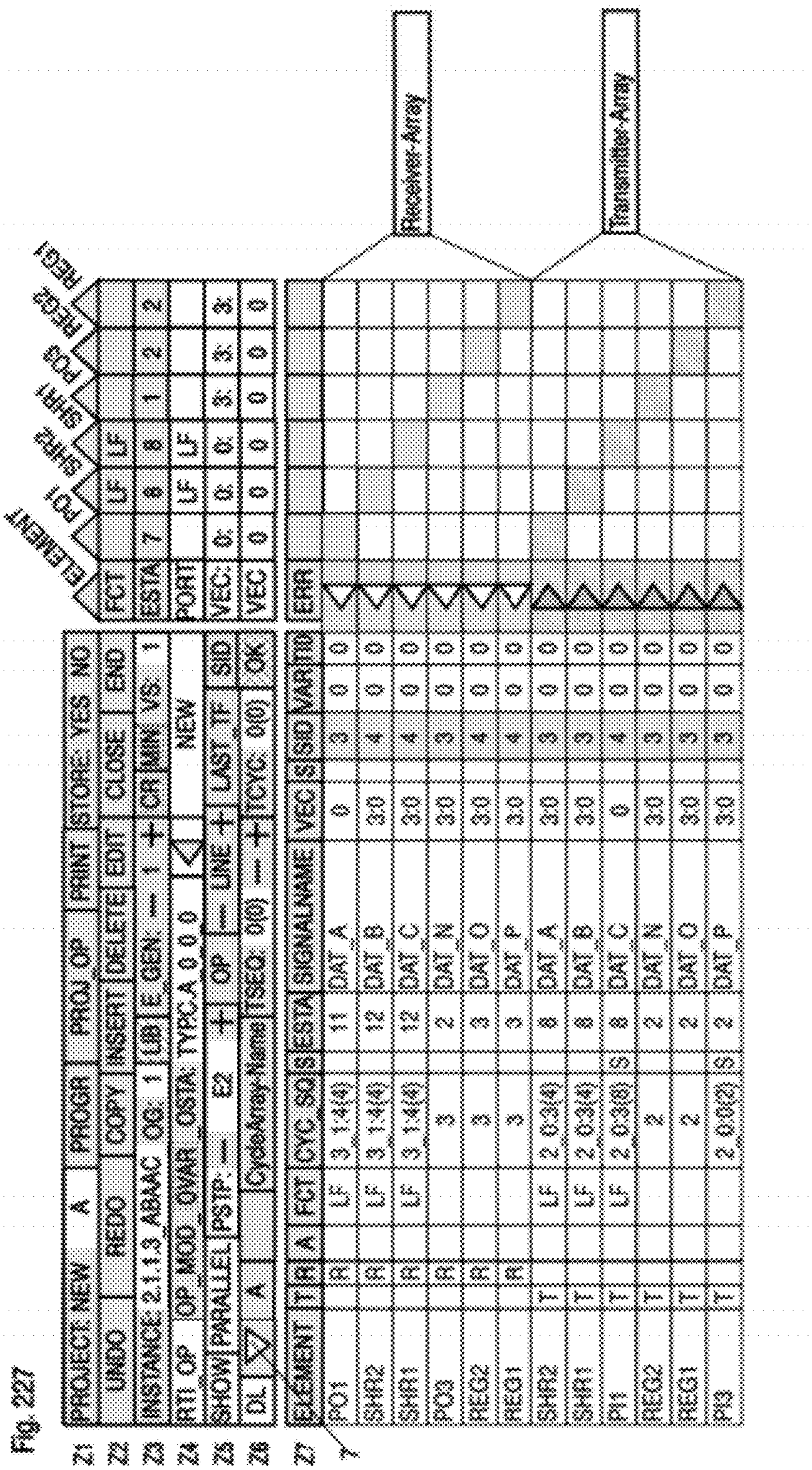

Clicking the button PSTP:B2"+" in "Z5" switches to parallel step end "PSTP:E2", illustrating the transfers in FIG. 184 with "DSTP:E2(2)" and in FIG. 208 with "DSTP:E8(8)", as FIG. 227 shows.

Figure 228:
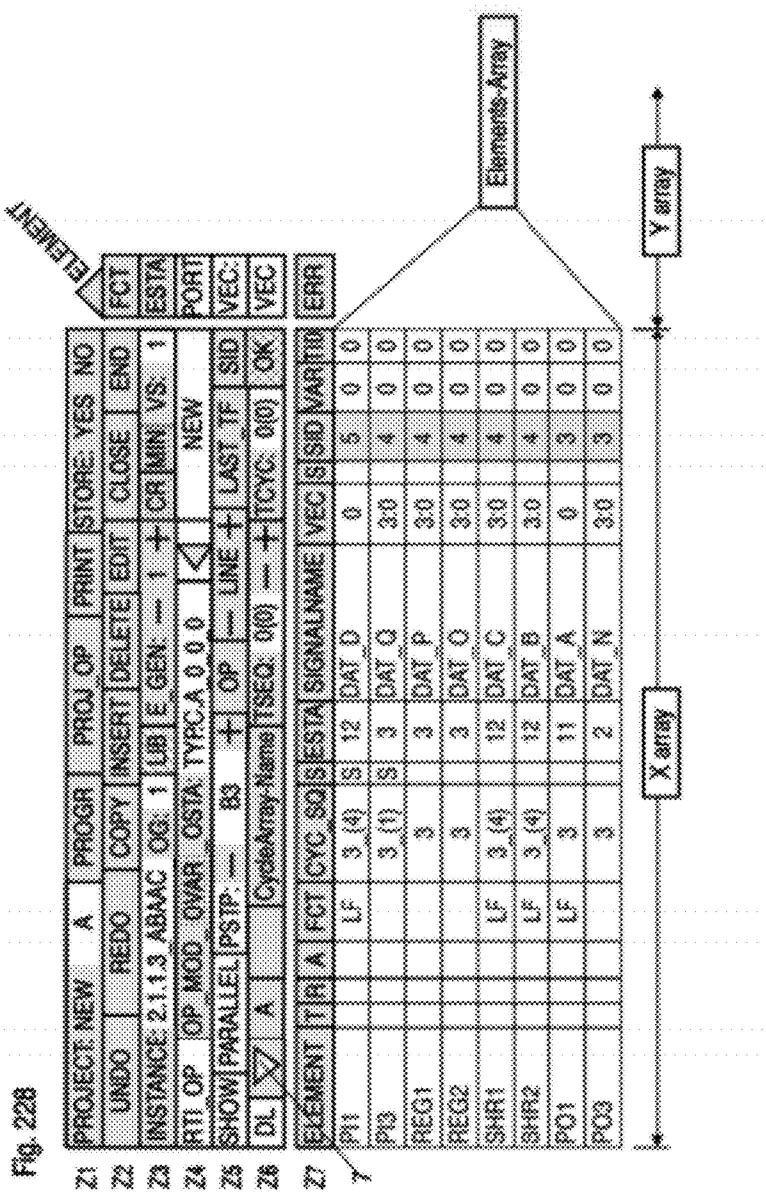

Clicking the button PSTP:E2"+" in "Z5" switches to the beginning "B" of the forth parallel step with the display "PSTP:B3", illustrating the parameters in FIG. 185 with "DSTP:B3(3)" and in FIG. 209 with "DSTP:B9(9)", as FIG. 228 shows. Clicking the button PSTP:B3"+" in "Z5" switches to parallel step end "PSTP:E3", with the corresponding further parallel "DVSTPs", etc.

If the usage of a receiver element should be illustrated in the DVSTP before the actual DVSTP then the button last transfer "LAST_TF" in line "Z5" of the RTI-OP-BS is to be activated by click. By placing the cursor in the X array in column "ELEMENT" to the receiver element, for which "LAST_TF" should be indicated, the display shows the complete lines and parameters in the X array and the complete columns and parameters in the Y array for the selected receiver element and the corresponding transmitter elements of the "LAST_TF", without any optical overlap with the display of the actual transfers in the X and Y array. The display "LAST_TF" of the receiver elements can be indicated in the specification array or in the receiver array with the mode settings in "Z5" as "SPEC, DESIGN" or "SHOW, DESIGN" or "SHOW, PARALLEL".

Description to FIG. 229*a*-229*p*

The specification of the data processing steps for the block structure of FIG. 229*a* is illustrated in FIG. 229*b* to FIG. 229*q*. Hereby the transfers are effectuated in the DVSTP order from "PI4" to "REG3", from "REG3" to "REG4", from "REG3" and "REG6" to "ADD1", and from "ADD1" to "REG5". All "DVSTPs" are executed in one design step, in the example this is "DSTP:0(0)".

FIG. 229*b* shows the beginning of design step "DSTP:B0(0)" with dynamic signal names for "PI4", "REG3" and "REG6". The dynamic signal names of "REG1" and "REG8" are described in the following example of a specification under block structure FIG. 230*a*. "PI4" holds in column "CYC_SQ" a "(1)", which means, that the maximum stream number is 1.

In FIG. 229*c* the first "DVSTP" is prepared with receiver "REG3" and transmitter "PI4" in the specification array, in FIG. 229*d* it is terminated by acknowledgement with clicking on the button in REG3 line in column "R". Thus the "SID" was increased by one to "SID=2" corresponding to the received dynamic signal name "RAM.A.ADR".

FIG. 229*e* shows the preparation of the second "DVSTP" with receiver "REG4" and the transmitter "REG3" in the specification array, thus the old data contents "RAM.A.ADR" is transferred from "REG3" to "REG4". The elements "REG3" and "PI4" of the first "DVSTP", FIG. 229*d*, were transferred by clicking in the button in the REG3 line in column "ELEMENT" from the specification array to the receiver array or, respectively, to the transmitter array.

In FIG. 229*f* the second "DVSTP" was acknowledged by clicking in the button in the REG4 line in column "R".

In FIG. 229*g* the elements "REG4" and "REG3" of the second "DVSTP", FIG. 229*f*, were transferred from the specification array to the receiver array, or respectively, to the transmitter array and with the receiver "ADD1" and the transmitters "REG3", "REG6" the third "DVSTP" was prepared in the specification array. Thereby the transmitter "REG3" with the new data "RAM.B.ADR" was transferred from the receiver array to the specification array by clicking the button in column "T". If in a "DSTP" already received, new data are sent, then in the corresponding element line, in the receiver array in column "T" automatically the character "+" is inserted, in the example, FIG. 229*g*, this is the REG3 line in the receiver array. Additionally in the specification array, for the transmitter with the already received, new data, in column "R", automatically the character "+" is entered, in the example this is "REG3". In the Y array, FIG. 229*g*, the element "ADD1" is illustrated with both receive ports "A" and "B". As it will be shown later, the port design can be realised alternatively with one column. The element group "COM", in the example this is "ADD1" in FIG. 229*g*, and output ports, as explained before, hold before the first reception in an RTI operation specification still no "ESTA", so that also an "ESTA=0" can be adopted from the transmitter side.

In FIG. 229*h* the third "DVSTP" was acknowledged, the dynamic output signal name in the ADD1 line is undefined because of inputs from two transmitters; therefore in the column "SIGNALNAME" automatically a question mark "?" is set on marked background, the button "SIGNALNAME" in "Z7" is activated and the button "OP" in "Z5" is deactivated.

In FIG. 229*i* for "ADD1" the dynamic output signal name "RAM.B.ADR0" was entered manually and acknowledged with "OK". Hereby the button "SIGNALNAME" in "Z7" is deactivated, the button "OP" in "Z5" activated and in ADD1 line in column "SIGNALNAME" the display button is unmarked.

By clicking the button in the ADD1 line in column "ELEMENT", the receiver "ADD1" is transferred from the specification array to the receiver array and the transmitters "REG3" and "REG6" are transferred to the transmitter array, as FIG. 229*k* shows. For a better survey during specification, the result output of COM elements, for example of "ADD1", is to be stored before design step end in a memory element, or to be transferred to an RTI output port. This is true also for read data from a memory, as it will be shown later. To ensure a following transfer of the ADD1 result data, a question mark "?" in the ADD1_line in column "T" is set, FIG. 229*k*. If the column "T" in the receiver array holds one or more "?", then the "OK" for a DSTP termination is inoperative.

In FIG. 229*l* the transfer from "ADD1" to "REG5" is illustrated in the specification array and is acknowledged in FIG. 229*m*.

In FIG. 229*n* the receiver "REG5" was transferred from the specification array, FIG. 229*m*, to the receiver array and the transmitter "ADD1" was transferred to the transmitter array. By the transfer of "ADD1" from the specification array to the transmitter array, for "ADD1" the question mark "?" in column "T" in the receiver array was deleted automatically and replaced by "+".

By clicking the button "OK" in "Z6", FIG. 229*o*, with "DSTP:E0(0)" in "Z5" the end of design step "0" is indicated. By a further click on the button "OK" in "Z6" it is switched to the beginning of design step "1" with the indication "DSTP:B1(1)" in "Z5", as FIG. 229*p* shows. Hereby the element array parameters are automatically entered accordingly, as explained before. "PI4" holds in column "CYC_SQ" with "(0)" no data stream anymore, therefore, the dynamic signal name, for example "DAT_X", for undefined PI4 data is entered automatically and the SID number is increased to "SID=2".

Description to FIG. 230*a*-230*e*

Figure 230A:
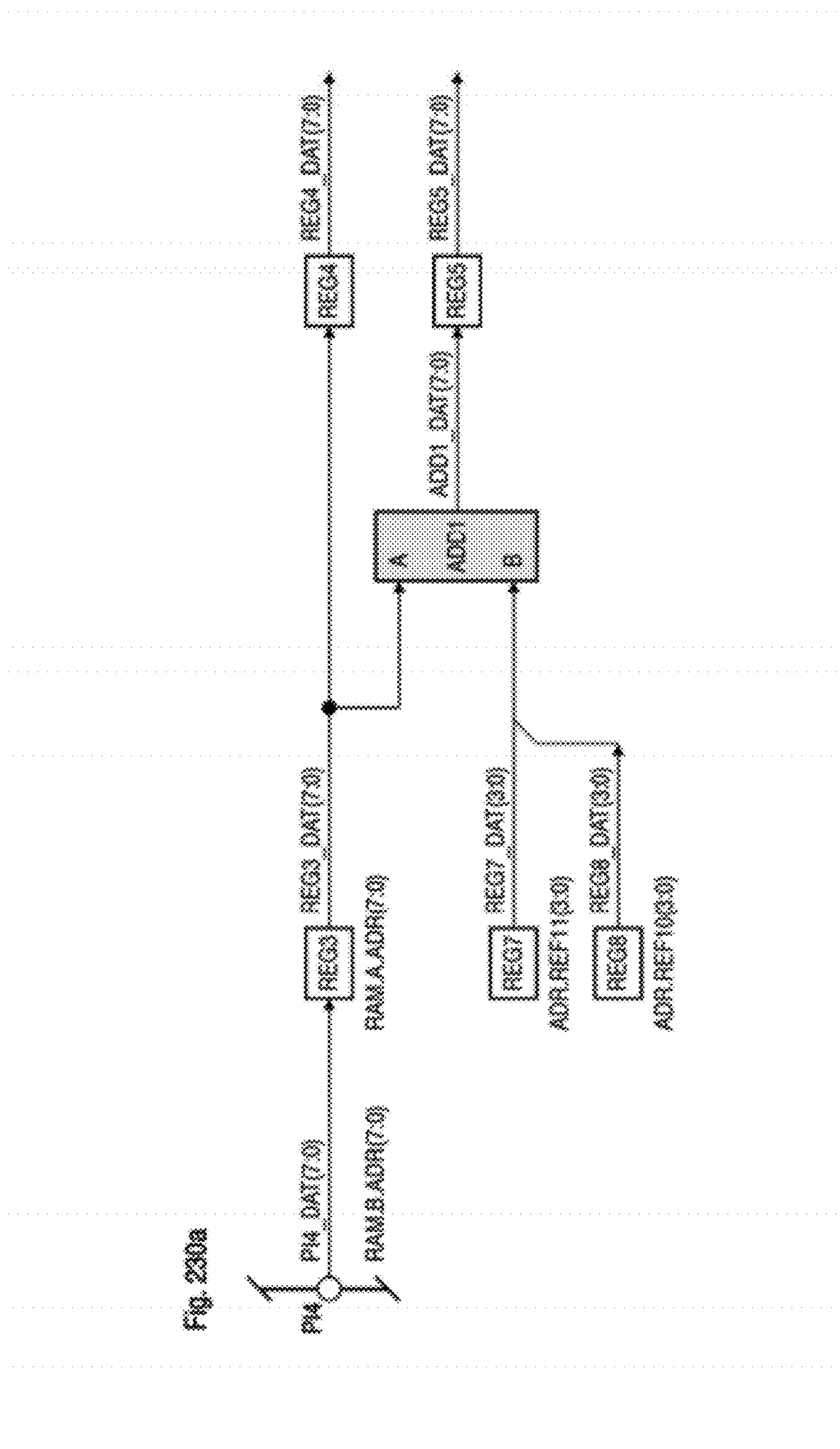
Figure 230B:
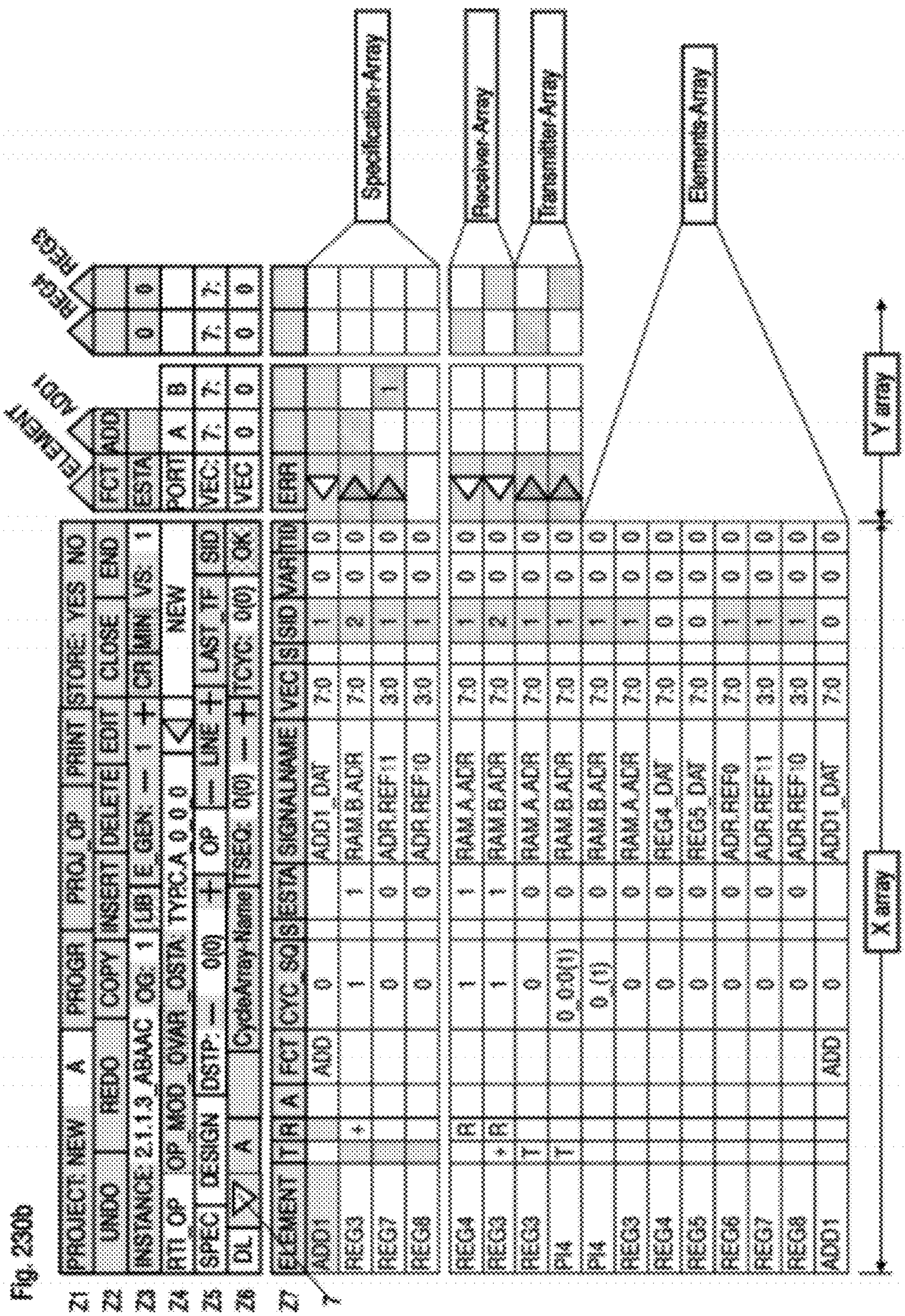
Figure 230C:
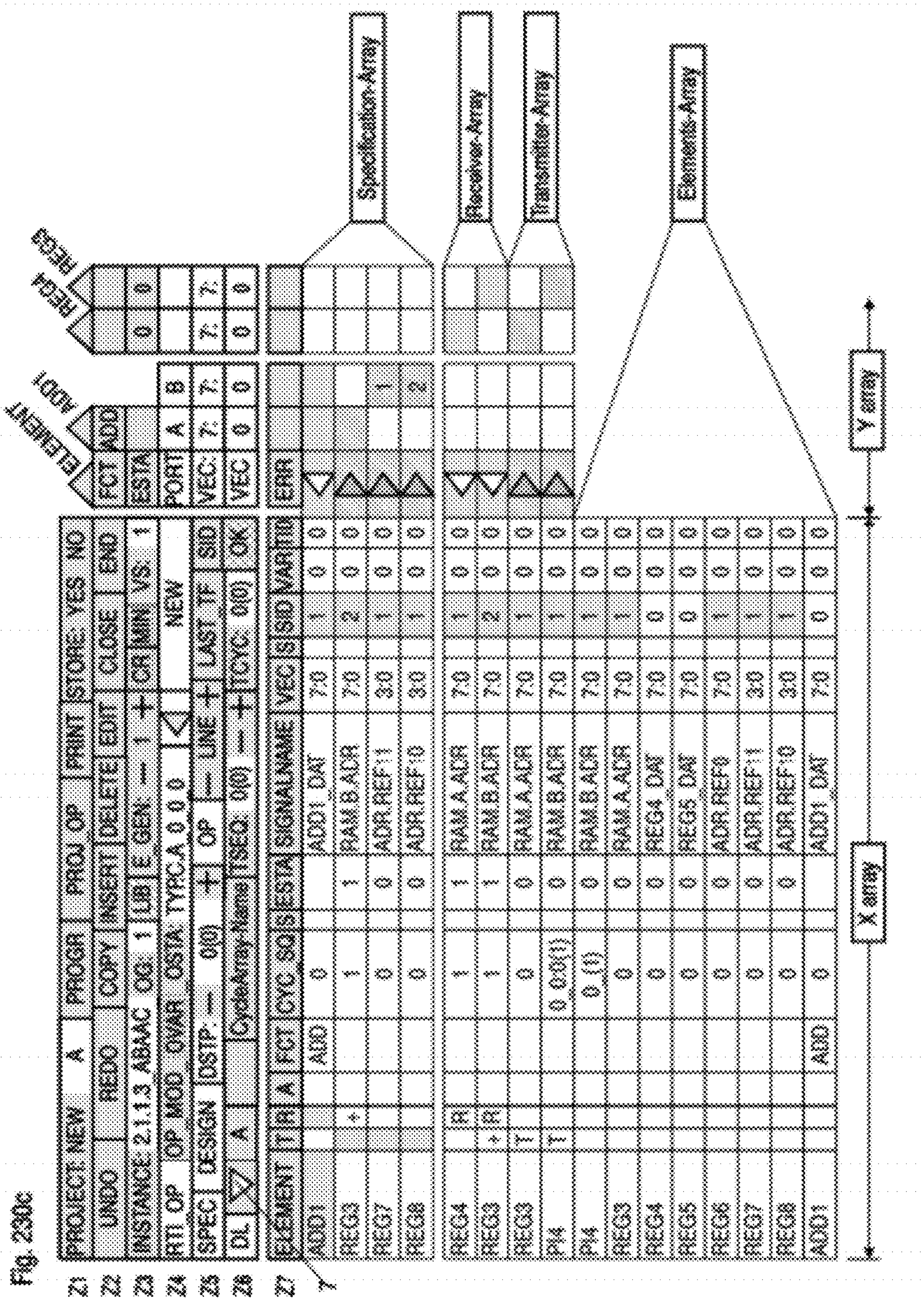

In the following the RTI operation specification for the block structure in FIG. 230*a* is described by the FIG. 230*b* to FIG. 230*e*. The specification of "DVSTPs" according to block structure in FIG. 230*a* differs compared to the block structure in FIG. 229*a* only in that "REG6" with 8 bit, FIG. 229*a* is replaced by "REG7" and "REG8" with 4 bit each, FIG. 230*a*. In FIG. 230*b* in the specification array the receiver "ADD1" and the transmitters "REG3", "REG7" and "REG8" are displayed. Furthermore transmitter "REG3" is allocated to port "A" of "ADD1" and the transmitter "REG7" is allocated to port "B", partial bit vector "7:4" of "ADD1", automatically identified by a "1" in the allocation coordinate field. A "1" in the allocation coordinate field means, that the transmitter bit vector is placed to the most significant position of the receiver bit vector, in the example the REG7 bit vector "3:0" is allocated to the ADD1 partial bit vector "7:4". FIG. 230*c* shows the allocation of REG8 bit vector "3:0" to the ADD1 partial bit vector "3:0", automatically identified by "2" in the allocation coordinate field. Generally applies, that if more than one transmitter transmits to one receiver port, then the first transmitter bit vector is allocated to the most significant partial receiver bit vector, the second transmitter bit vector is allocated to the next significant partial receiver bit vector etc. and the last transmitter bit vector is allocated to the least significant partial receiver bit vector, automatically identified in the allocation coordinate field with a "1" for the first transmitter allocation, "2" for the second transmitter allocation, "3" for the third transmitter allocation etc.

Figure 230D:
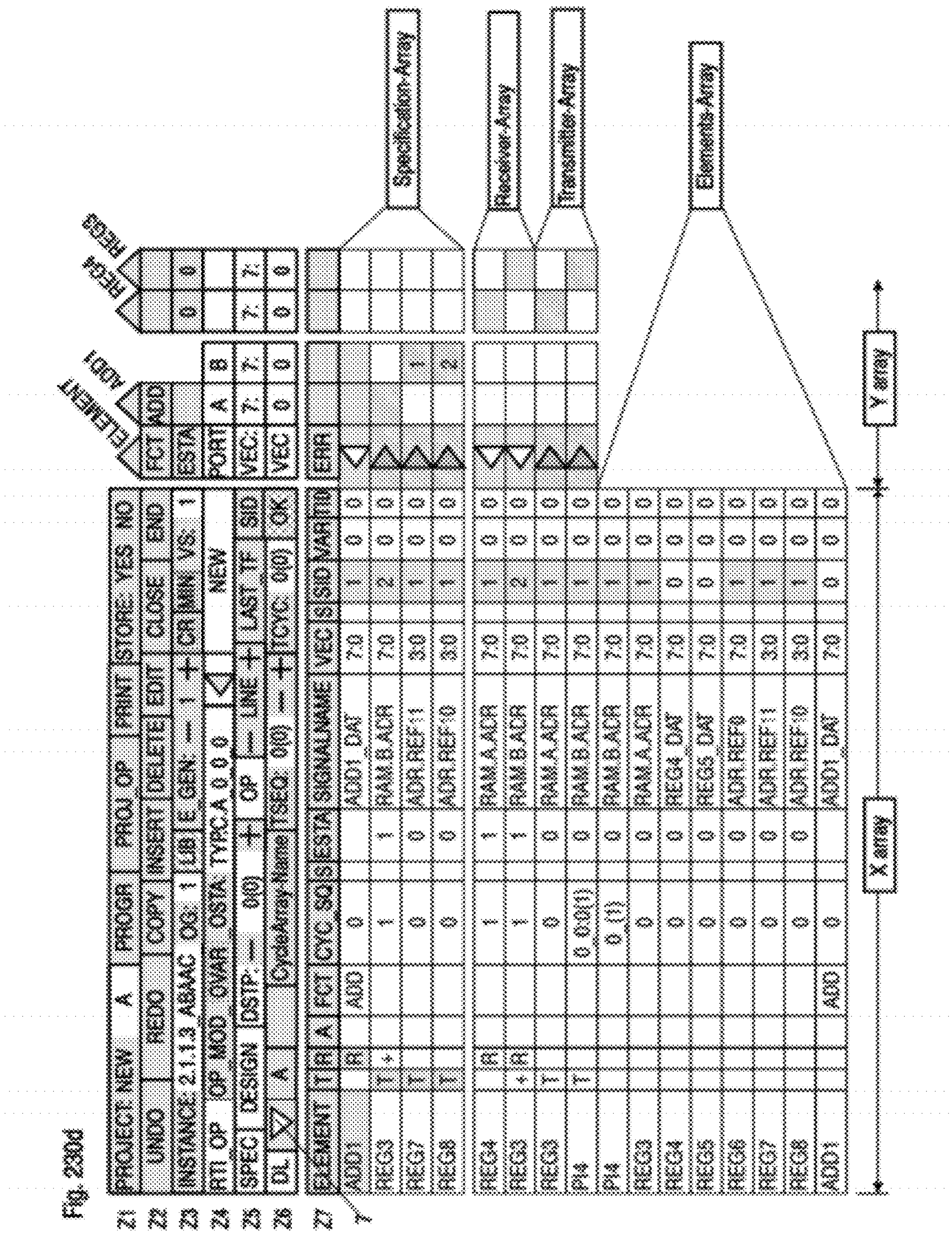
Figure 230E:
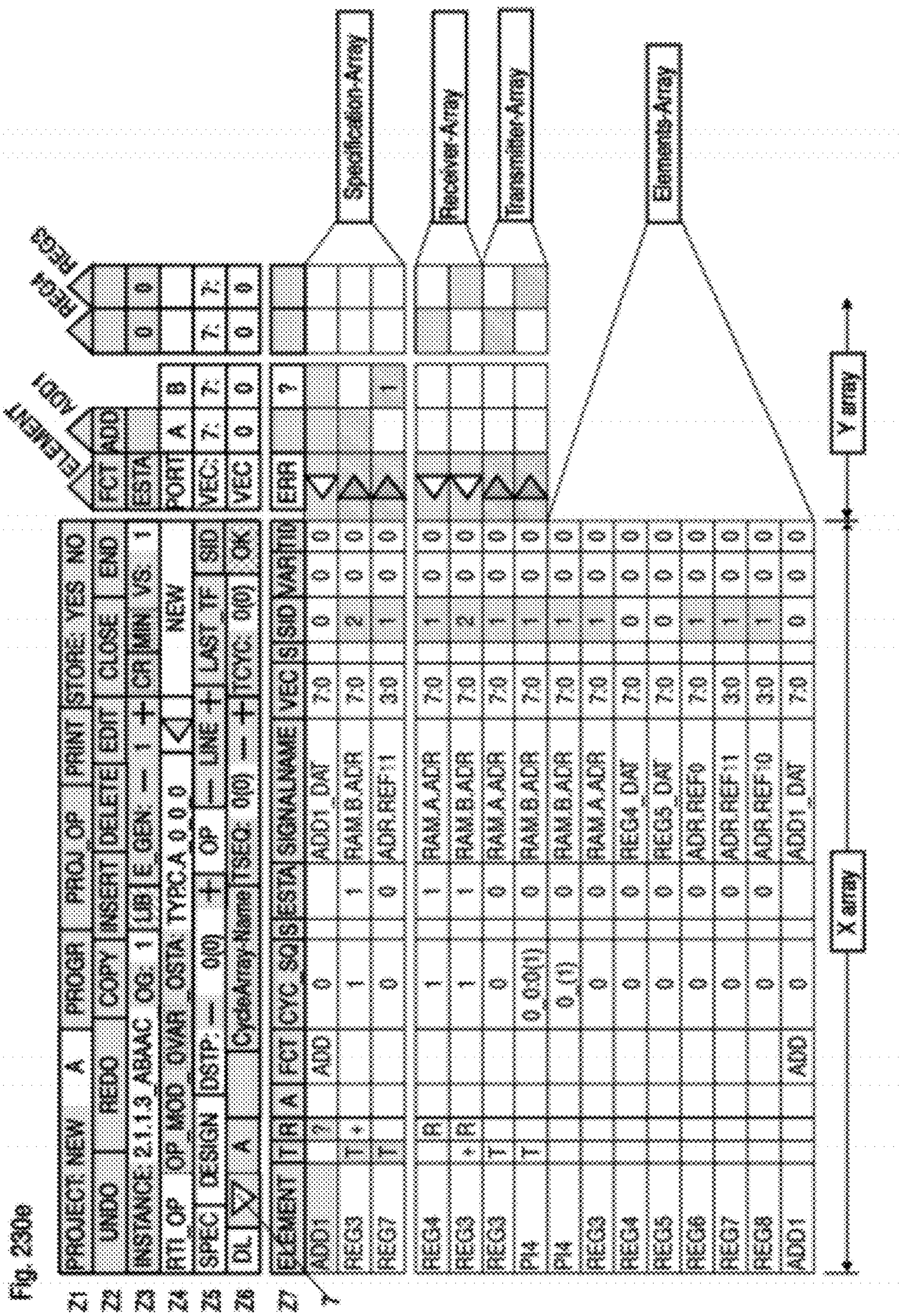

In FIG. 230*d* the transfer was acknowledged by clicking the button in the ADD1 line in column "R" and the ADD1 output signal name "ADD1_DAT" was defined manually or kept. If the transfer is acknowledged and still a transmitter bit vector is missing, in the example in FIG. 230*e* the allocation of the REG8 bit vector or the REG8 transmitter line in the specification array, respectively, is missing, then in the Y array in line "Z7" the display areas are activated with error "ERR" in column "ELEMENT" and with question mark "?" in column "ADD1-PORT-B". Furthermore in the X array in ADD1 line in column "R" instead of acknowledging with "R" a question mark "?" is entered. The "DVSTP" can only be terminated, when the error is eliminated.

Description to FIG. 231*a*-231*i*

Up to now in RTI-OP-BS the input ports "A" and "B" of the element "ADD1" of FIG. 229*a* and FIG. 230*a* were displayed with one column each in the Y array. In the following it is shown, that in RTI-OP-BS elements with any number of input ports can be displayed with only one column in the Y array.

Figure 231A:
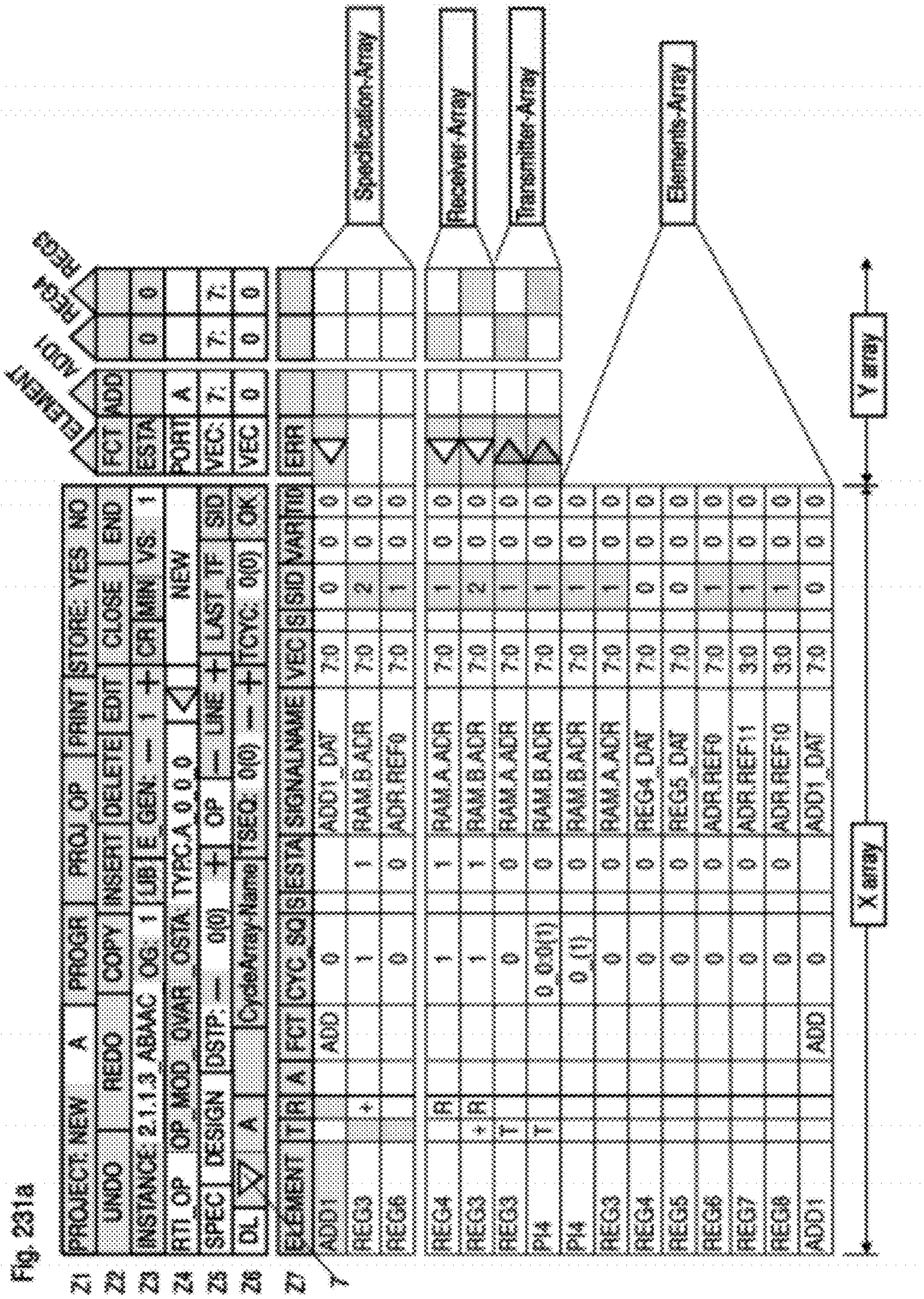
Figure 231B:
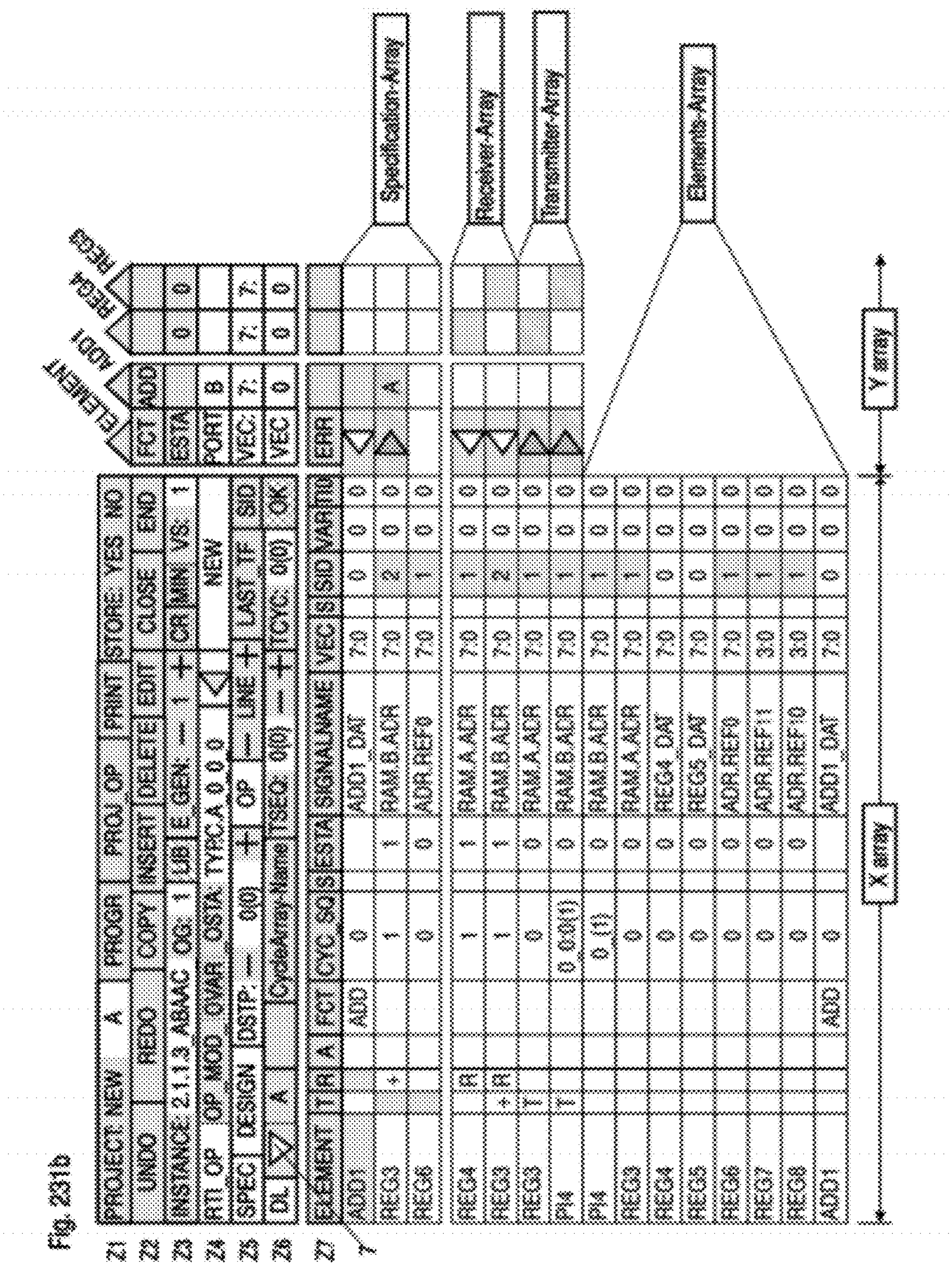

FIG. 231*a* shows in the Y array a configuration for the ADD1 input ports "A" and "B" in one column. Thereby applies, that the specification of a transfer always begins with the first port, in the example with the ADD1 input port "A", as indicated in the Y array in line "PORT", column "ADD1". Based on the block structure in FIG. 229*a*, in FIG. 231*b* the first allocation of data of "REG3" to ADD1 port "A" is performed, automatically identified by the port notation "A" in the allocation coordinate field. Thereby the port notation changes automatically from "A" to "B" in the Y array in line "PORT", column "ADD1".

Figure 231C:
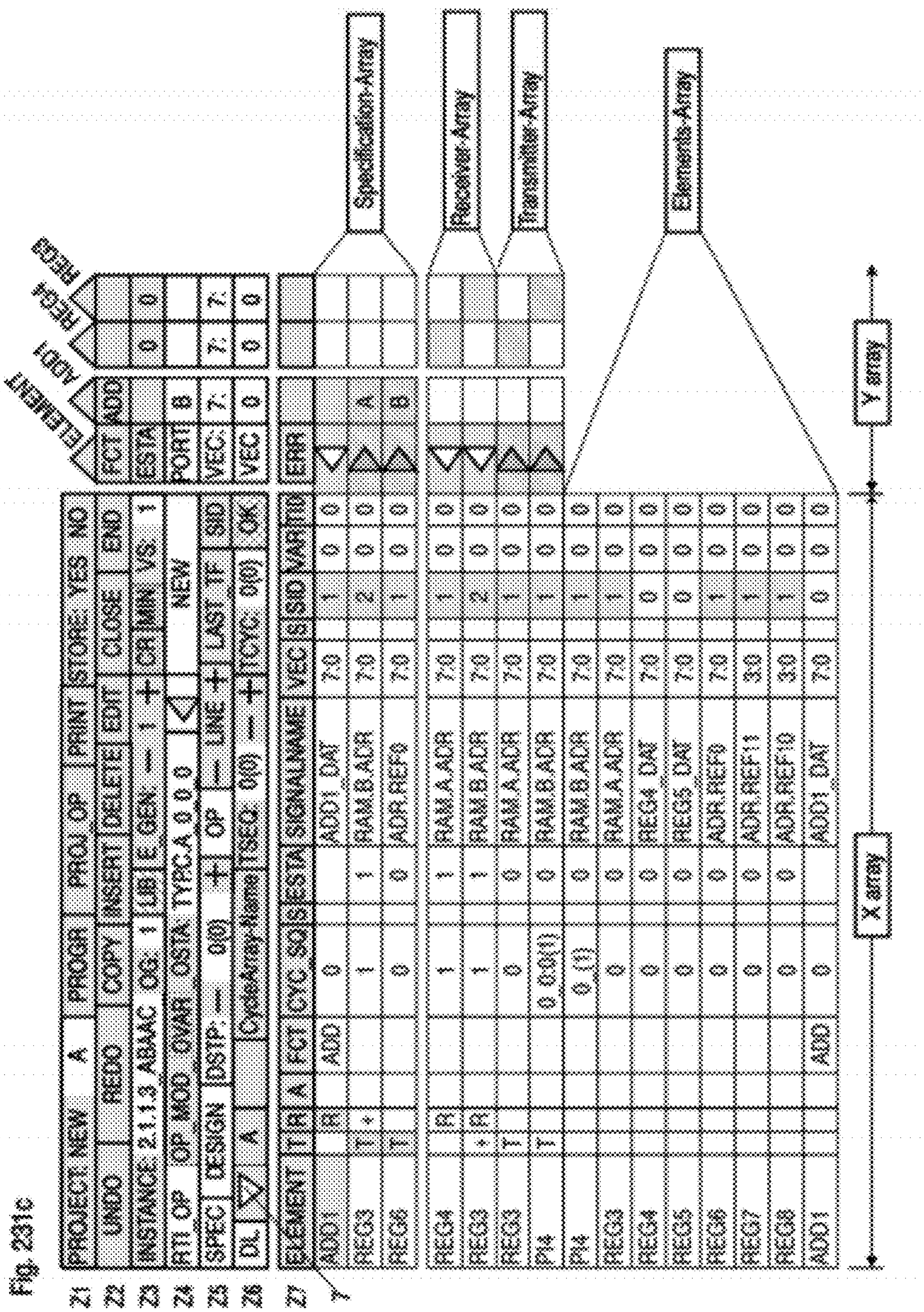
Figure 231D:
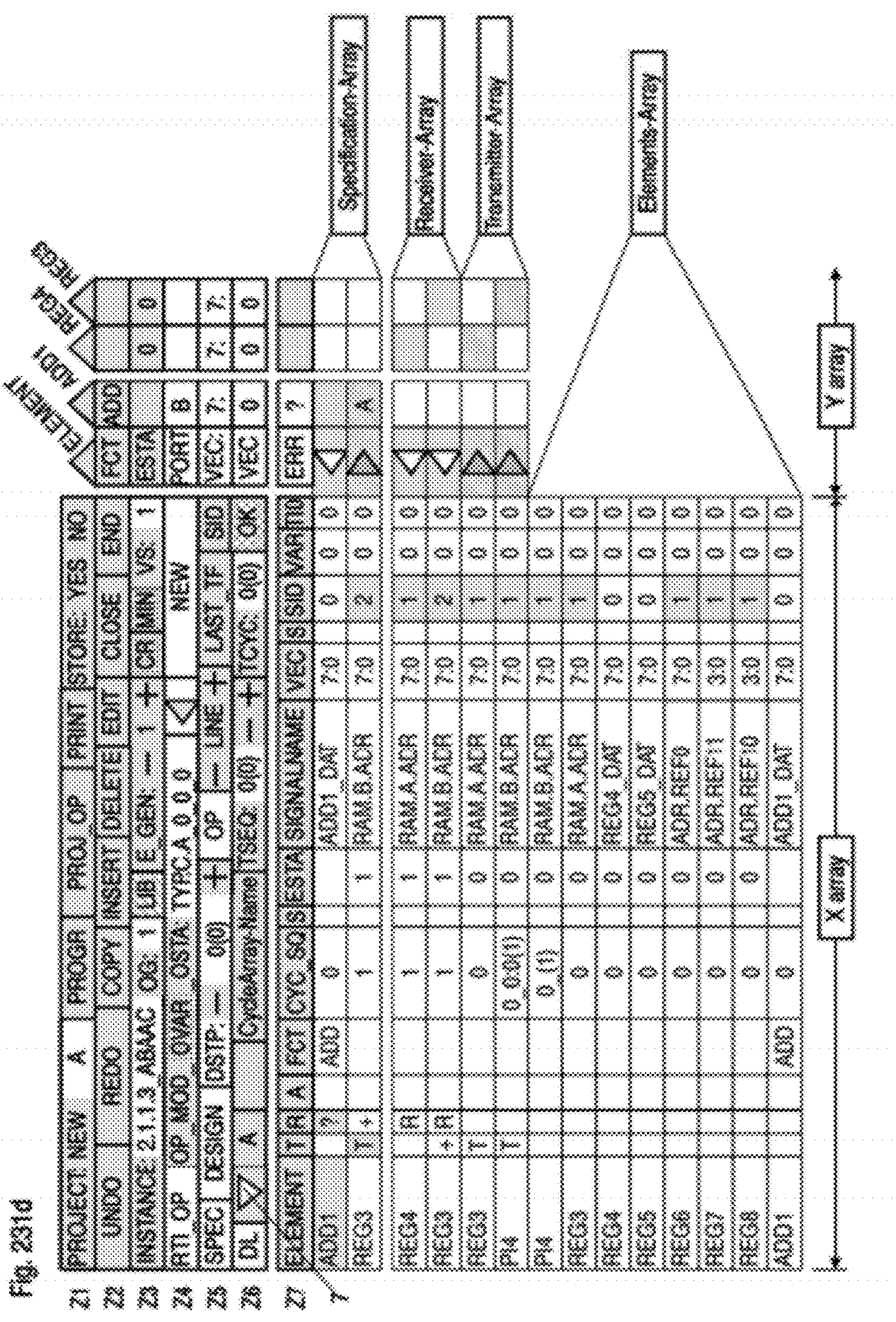

FIG. 231*c* shows the second data allocation of "REG6" to ADD1 port "B" with acknowledgement of the transfer. If the acknowledgement for transfer is performed and the allocation of one or of several transmitters is still missing, in the example in FIG. 231*d* the transmitter for an allocation to ADD1 port "B" is not provided, then in the Y array in line "Z7" the display areas are activated with "ERR" in column "ELEMENT" and with a "?" in column "ADD1". Furthermore in the X array in the ADD1 line in column "R" a "?" is set. The "DVSTP" can be terminated only when the error is eliminated.

Figure 231E:
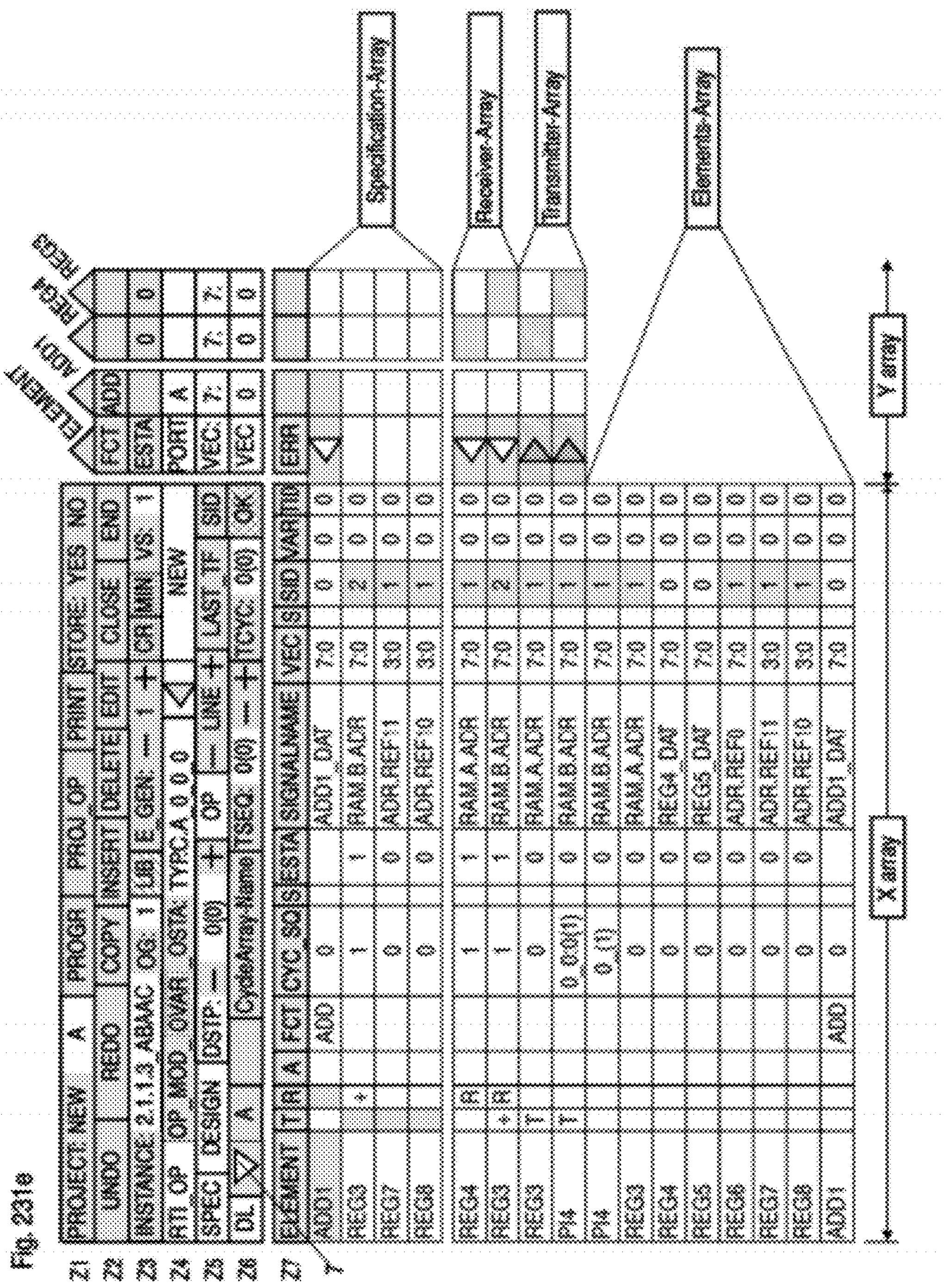
Figure 23I:
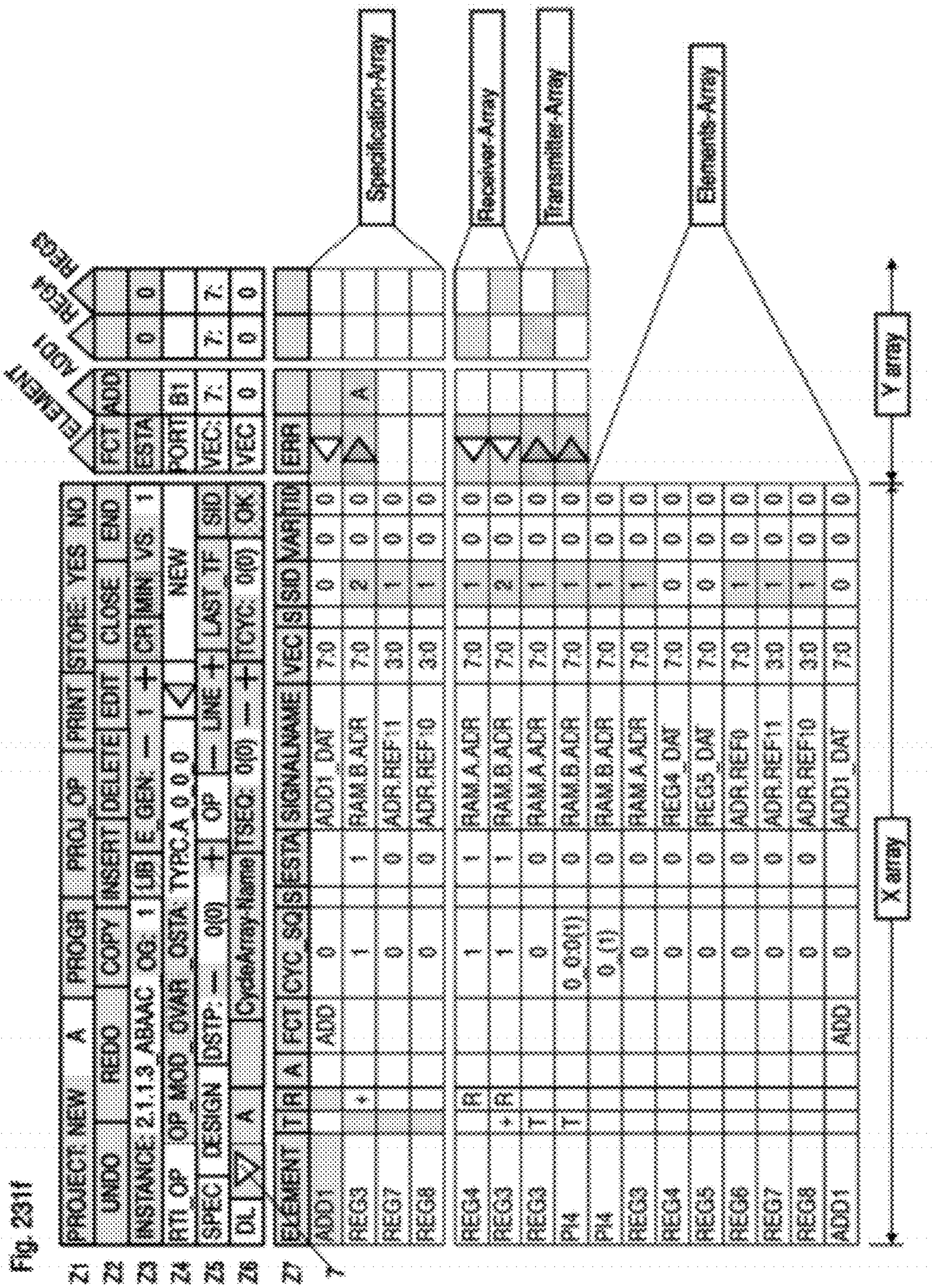

Based on the block structure in FIG. 230*a*, in FIG. 231*e* in the specification array the transfer with the receiver "ADD1", the 8-bit-transmitter "REG3" and the 4-bit-transmitters "REG7", "REG8" is prepared. The first data allocation of "REG3" to ADD1 port "A" is shown in FIG. 231*f*. Thereby in the Y array in line "PORT", column "ADD1" the port notation changes automatically from "A" to "B1". Thereby "B1" means the B partial vector "7:4".

Figure 231G:
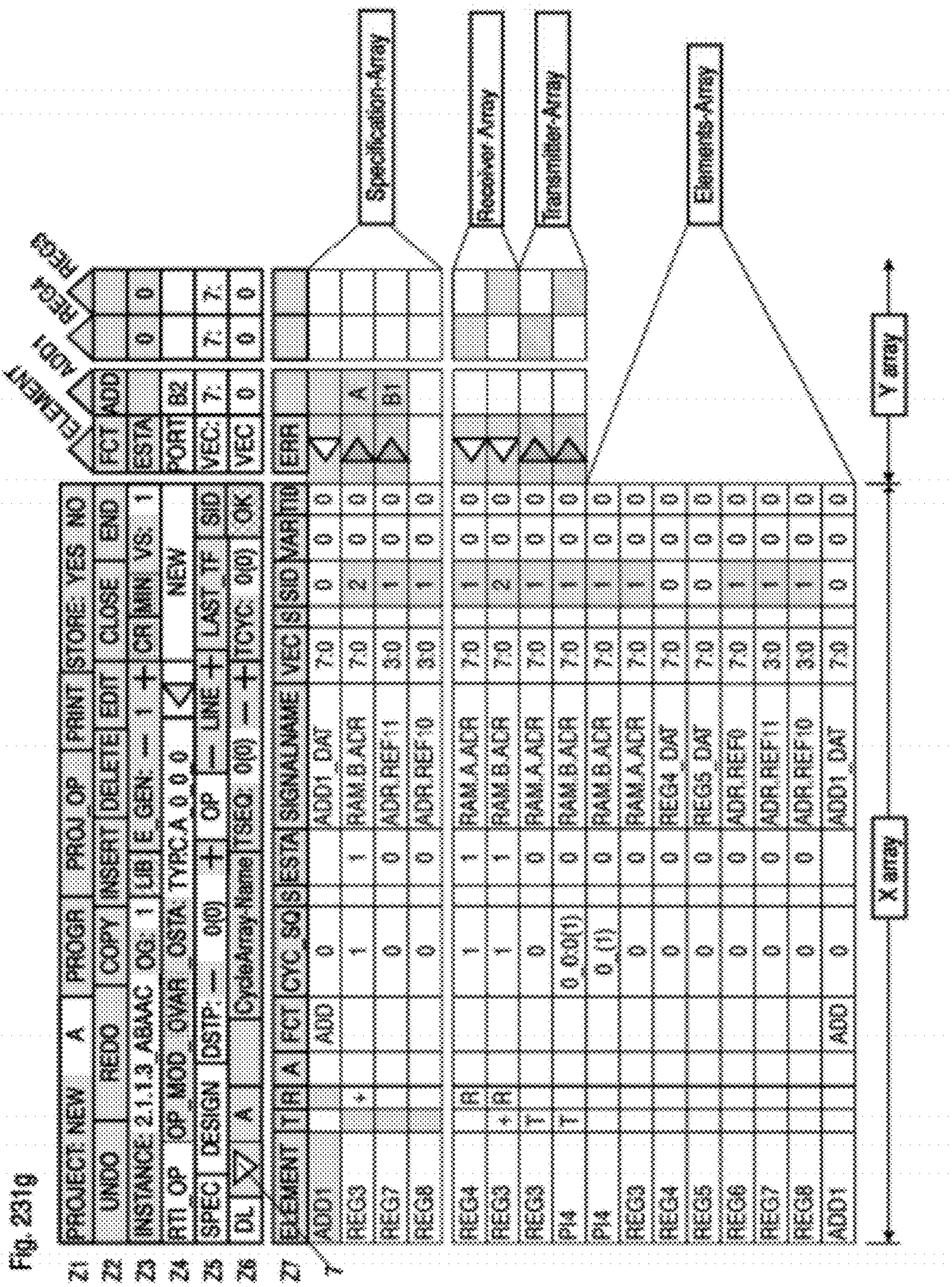
Figure 231H:
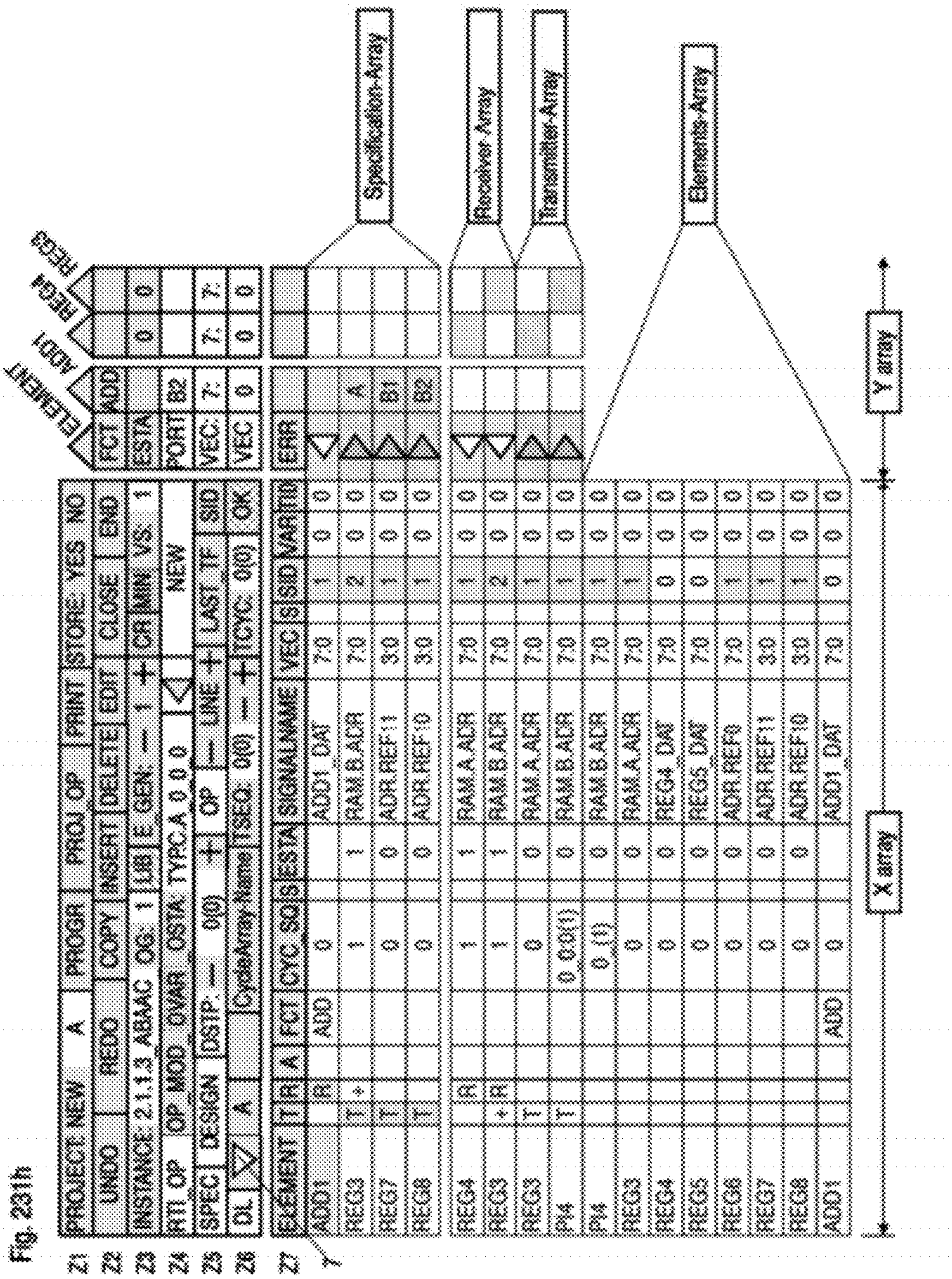

FIG. 231*g* shows the second data allocation of "REG7" to the ADD1 port "B1". Thereby the REG7 vector "3:0" is allocated to the B1 partial vector "7:4" of "ADD1" and is automatically entered in the allocation coordinate field as "B1". Furthermore in the Y array in line "PORT", column "ADD1" the port notation changes from "B1" to "B2". With the third data allocation, FIG. 231*h*, of "REG8" to ADD1 port "B2" the transfer was terminated and acknowledged. Thereby the REG8 vector "3:0" is allocated to the B2 partial vector "3:0" of "ADD1" and is entered automatically in the allocation coordinate field as "B2".

Figure 231I:
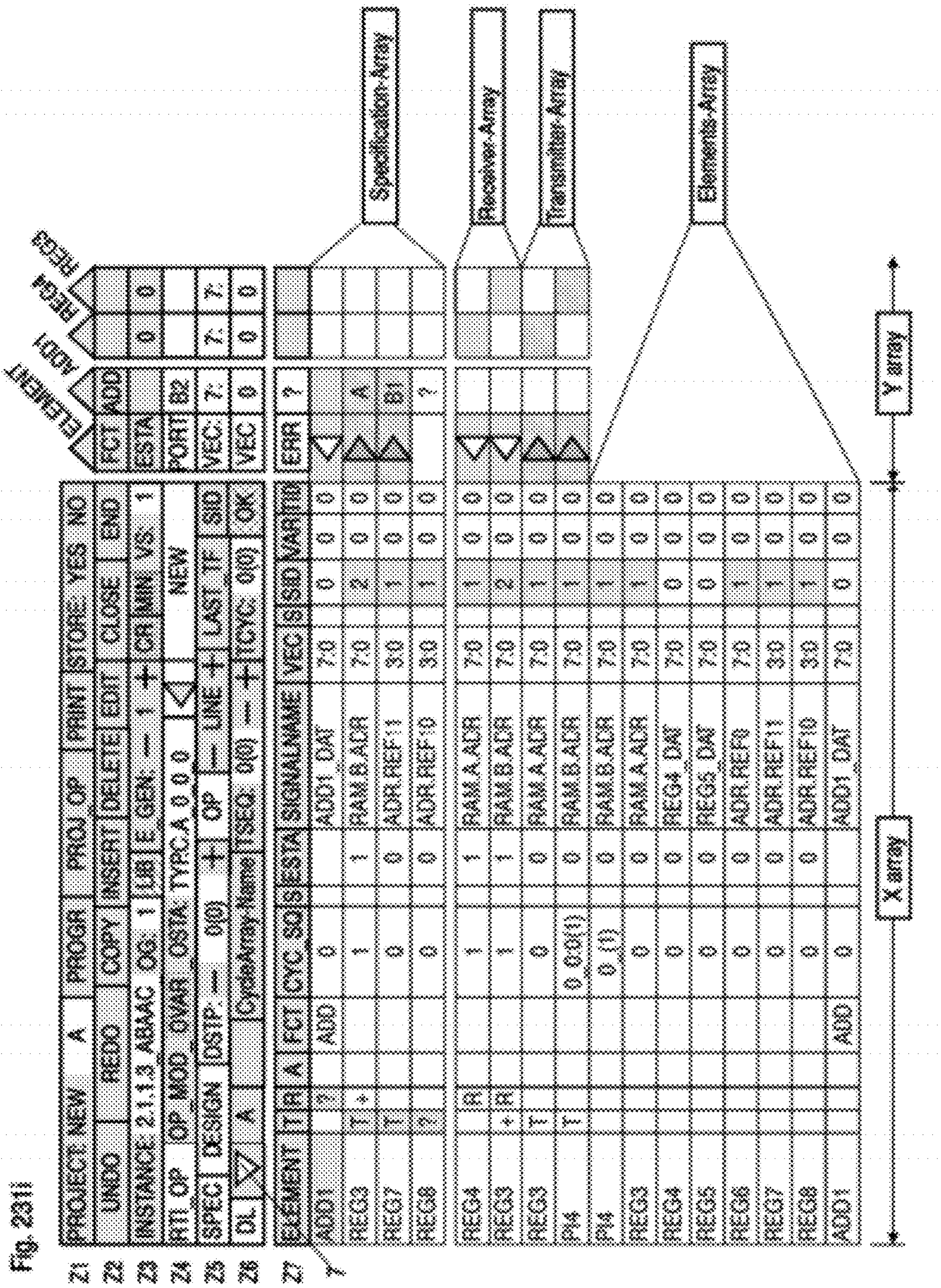

In FIG. 231*i* the transfer was acknowledged incomplete, in the example the allocation of "REG8" to ADD1 port "B2" is missing, therefore in the Y array in line "Z7", the display areas were automatically activated with error "ERR" in column "ELEMENT" and with a question mark "?" in column "ADD1". Additionally in the Y array in the allocation coordinate field of the REG8 line in column ADD1, in the X array in ADD1 line in column "R" and in the REG8 line in column "T" in each a question mark "?" is set. A "DVSTP" can be finished only when all errors are eliminated, i.e. in case of an error a DVSTP acknowledge has no effect.

Description to FIG. 232*a*-232*t*

In the following the specification of a cycle array "A1" is explained for an RTI operation "OP_MOD_OVAR: TYP.C.A_0_0". The cycle array "A1" is illustrated in a block structure in FIG. 232*a*. The block structure serves only for explanation and is not part of the SPV. The functional properties of a cycle array were described in FIG. 95, FIG. 96 and FIG. 97. The different cycle arrays for an RTI operation type are numbered with "A1", "A2", "A3", etc. in order of their treatment. Before specifying the first transfer cycle "TCYC1", the cycle array, for example "A1", FIG. 232*a*, should be initialised. The initialising of a cycle array is specified without any restriction to the cycle array in normal transfer specification, as explained before and is described with FIG. 232*b* to FIG. 232*t*.

Figure 232B:
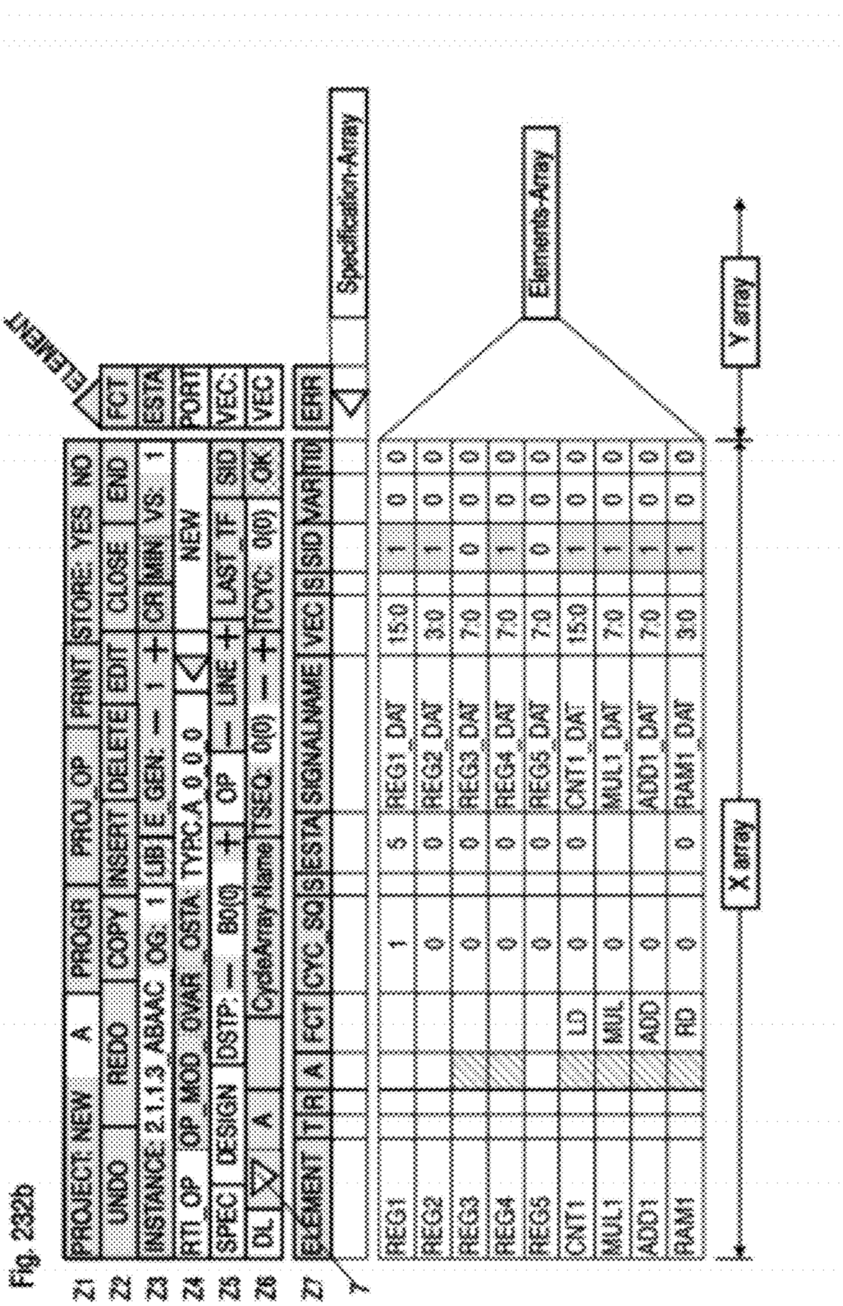
Figure 232C:
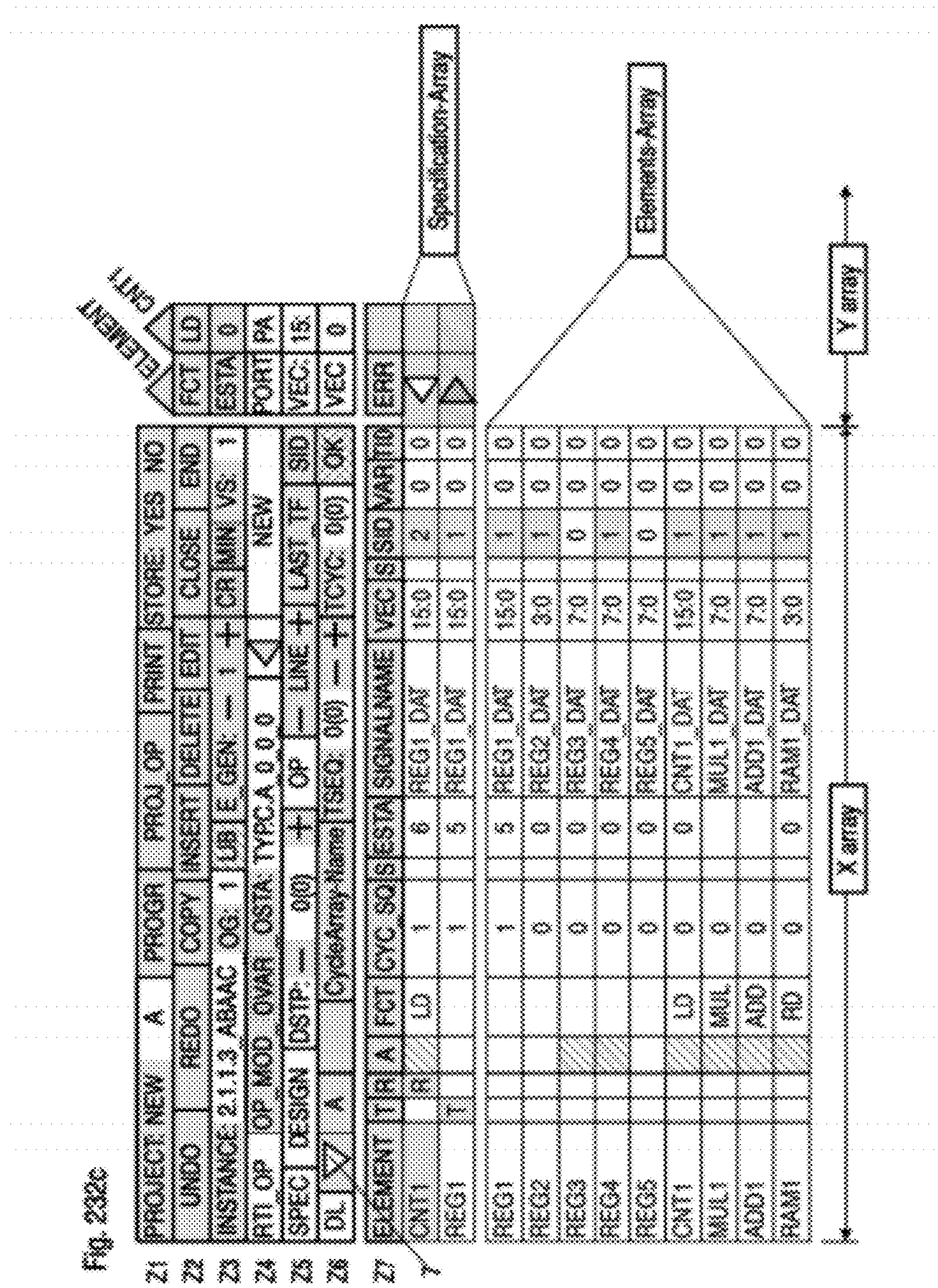
Figure 232D:
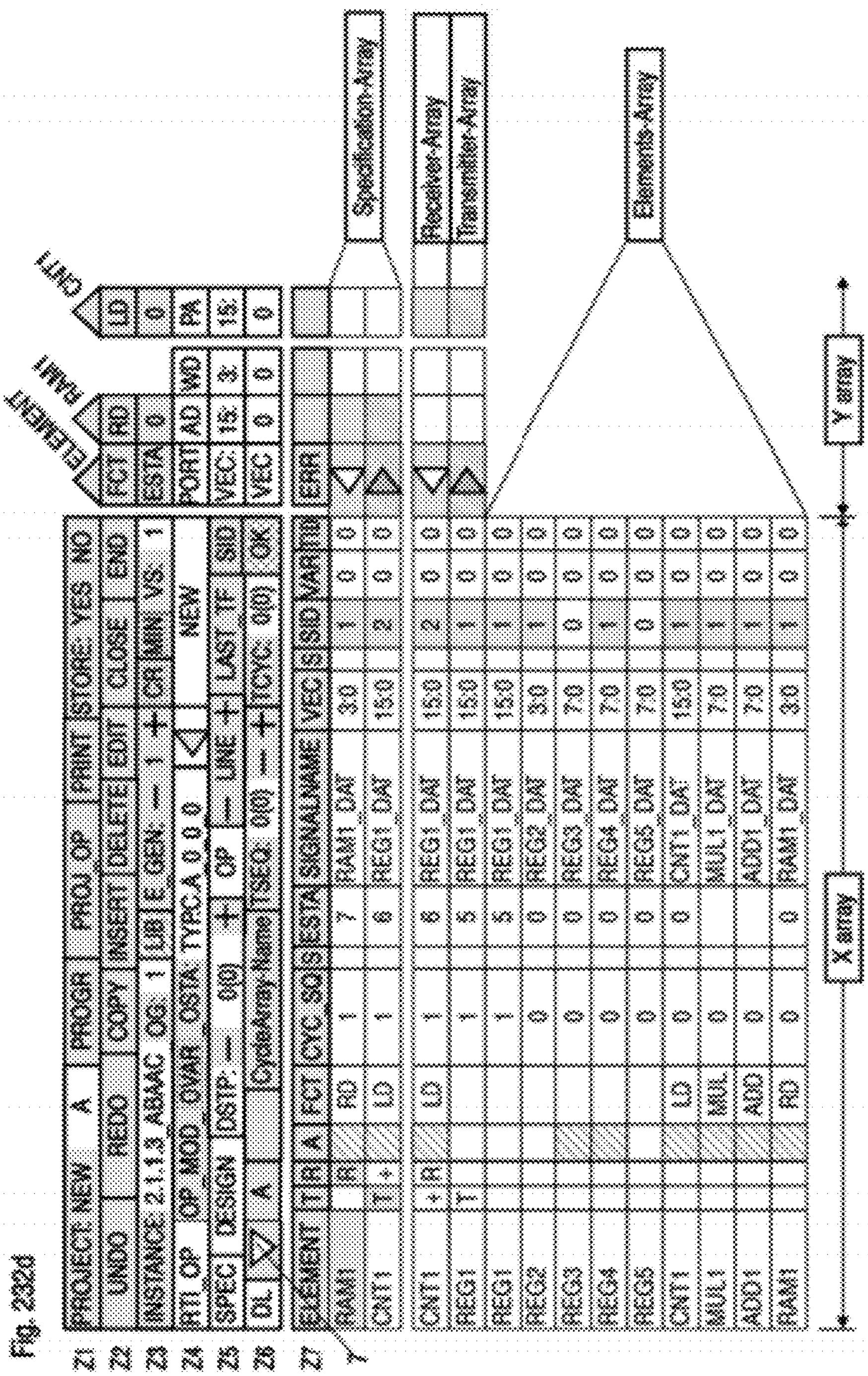
Figure 232E:
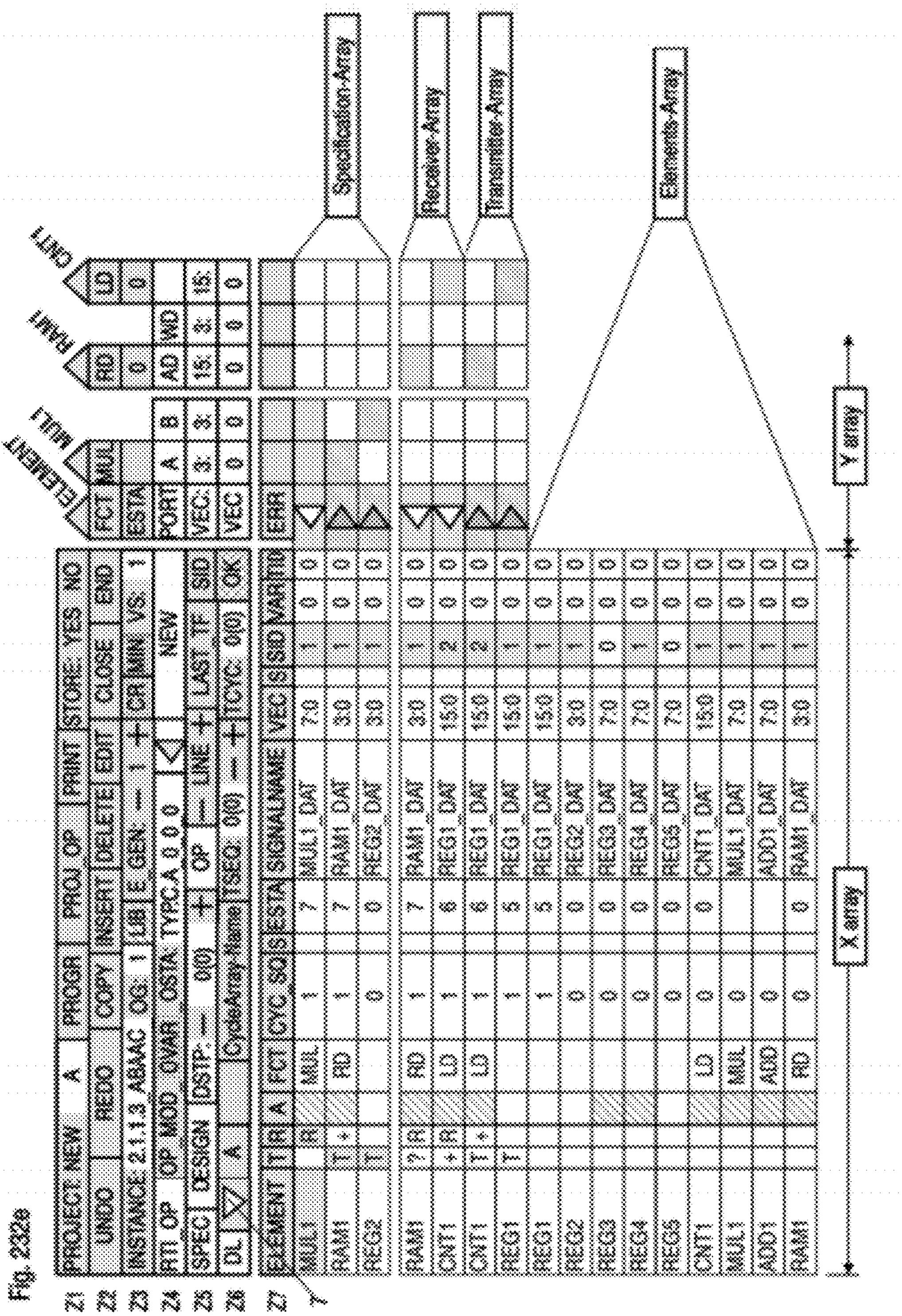

FIG. 232*b* shows the RTI-OP-BS with the elements and signal names illustrated in FIG. 232*a*. The buttons of the elements of the cycle array "A1" were marked for a better survey, for example hatched, by clicking the corresponding element lines in column "A". A further click on a hatched marked button can unmark the button again. The values in the column "CYC_SQ" and "ESTA" are supposed, exemplary values. For the initialising of the cycle array "A1", for example with the first design step "DSTP:0(0)", the following transfers are executed:

In FIG. 232*c* from REG1 to CNT1, in FIG. 232*d* from CNT1 to RAM1, in FIG. 232*e* from RAM1 and REG2 to MUL1 and in FIG. 232*f* from MUL1 to REG3. As already explained, for the receiver MEM with function "RD" as well as for "COM", in the example these are RAM1, MUL1 and ADD1, after acknowledging the reception and transfer from the specification array to the receiver array, in column "T" in the receiver array a question mark is "?" is set. This question mark is automatically erased, when the receiver has forwarded its actual data in the specification array as transmitter and the transmitter switches into the transmitter array. In FIG. 232*e* the MUL1 output signal name "MUL1_DAT" was manually defined or kept, respectively, after acknowledge of the transfer.

Figure 232G:
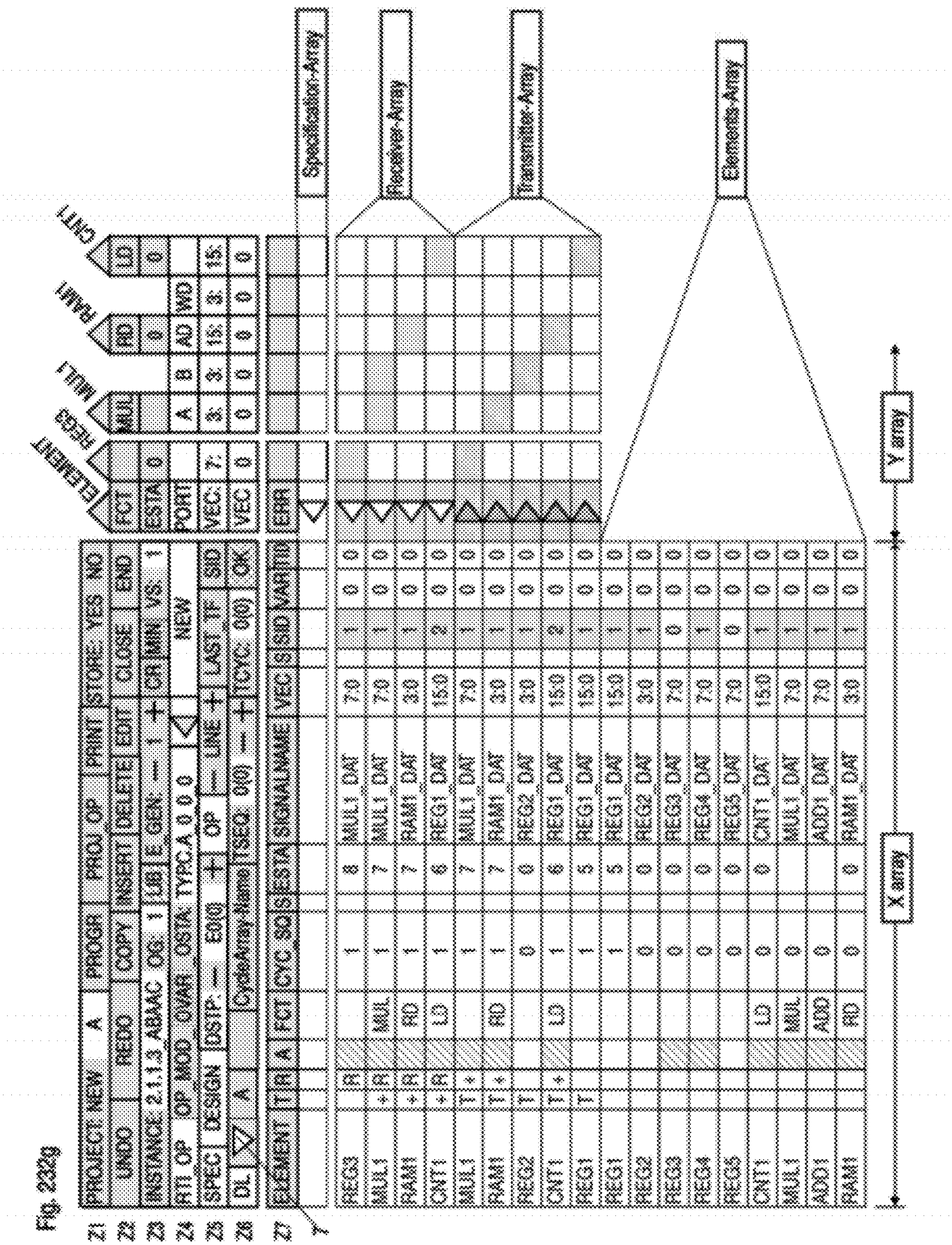
Figure 232H:
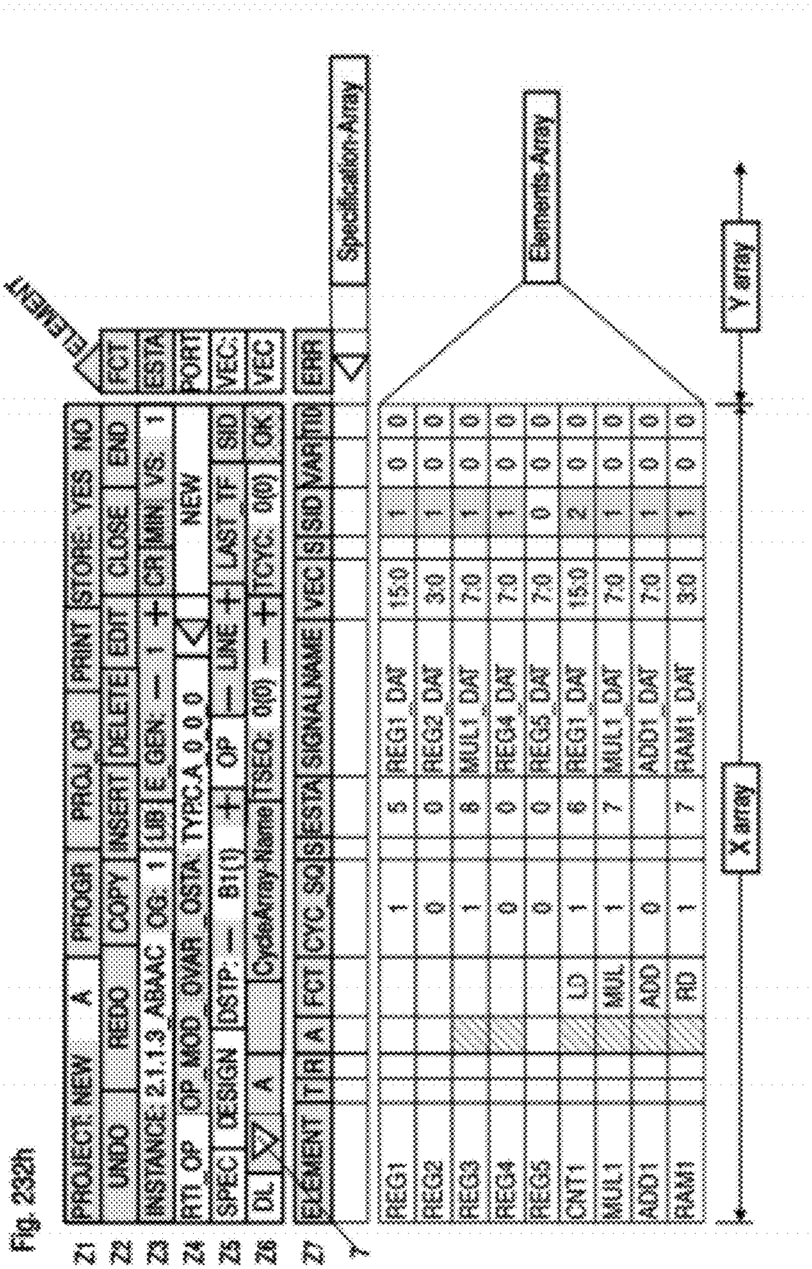
Figure 232I:
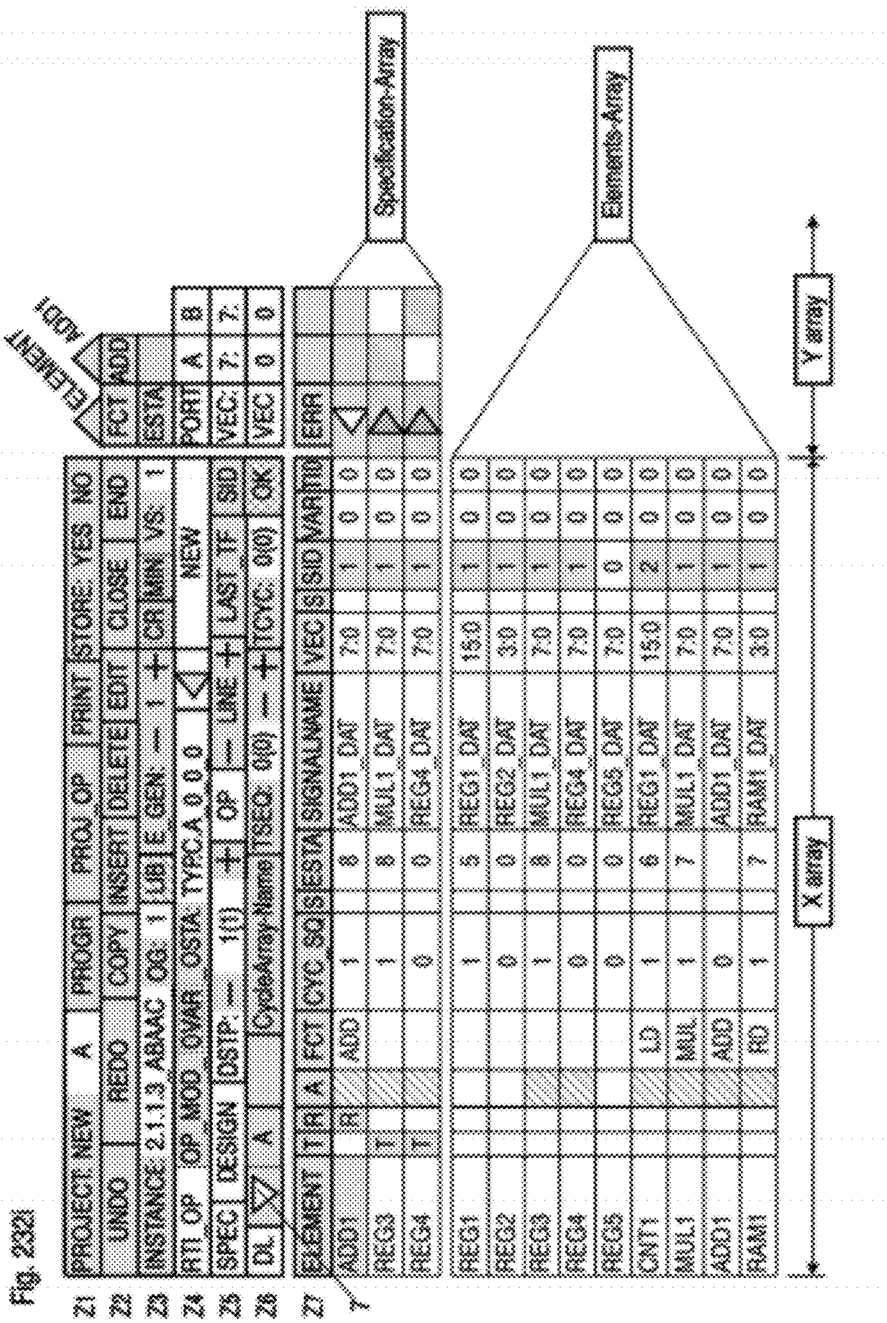
Figure 232K:
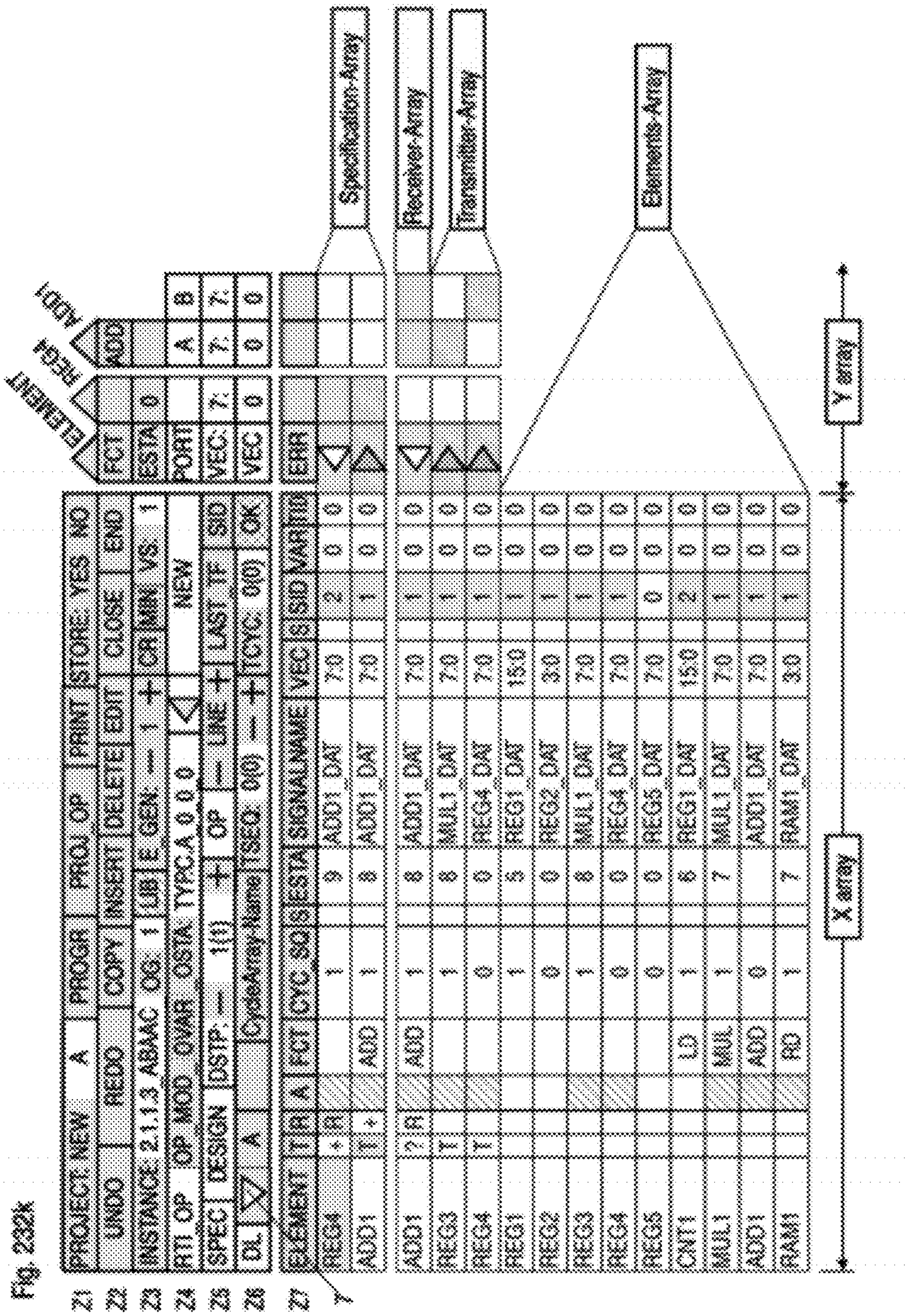
Figure 23B:
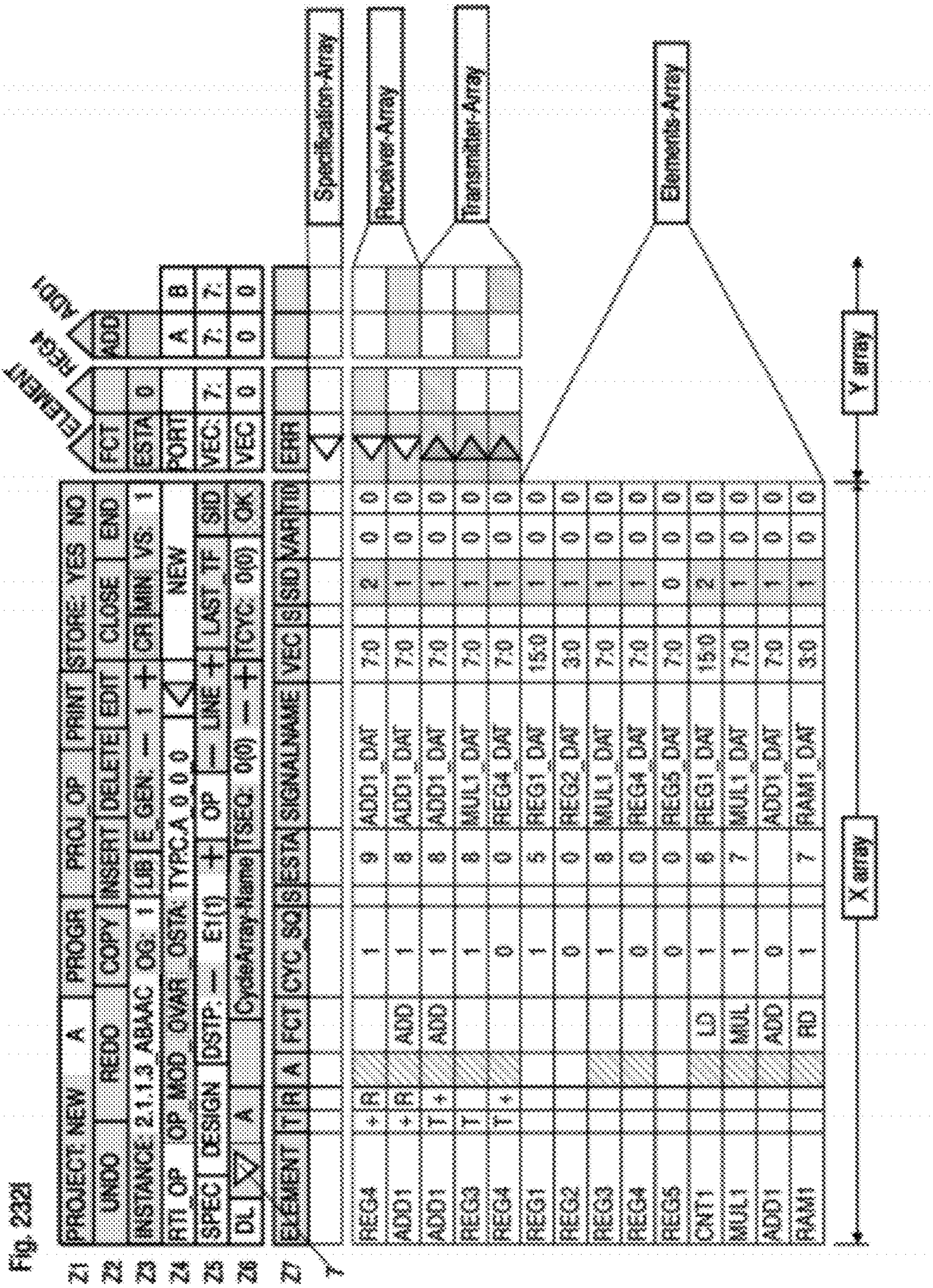

FIG. 232*g* indicates the termination of the first design step with "DSTP:E0(0)" in "Z5" after clicking the button "OK" in "Z6". To continue and to terminate the initialisation of the cycle array "A1" by a further clicking "OK" in "Z6" the beginning of the second design step "DSTP:B1(1)" in "Z5" is indicated, FIG. 232*h*. For that the following remaining transfers are executed:

In FIG. 232*i* form REG3 and REG4 to ADD1, as well as in FIG. 232*k* from ADD1 to REG4. FIG. 232I shows the termination of the second design step "DSTP:E1(1)" in "Z5" after clicking the button "OK" in "Z6". By clicking again the button "OK" in "Z6" the status of the element array is indicated by "DSTP:B2(2)", FIG. 232*m*. In FIG. 232*i* the ADD1 output signal name "ADD1_DAT" was defined manually or kept, respectively, after acknowledgement of the transfer.

Figure 232M:
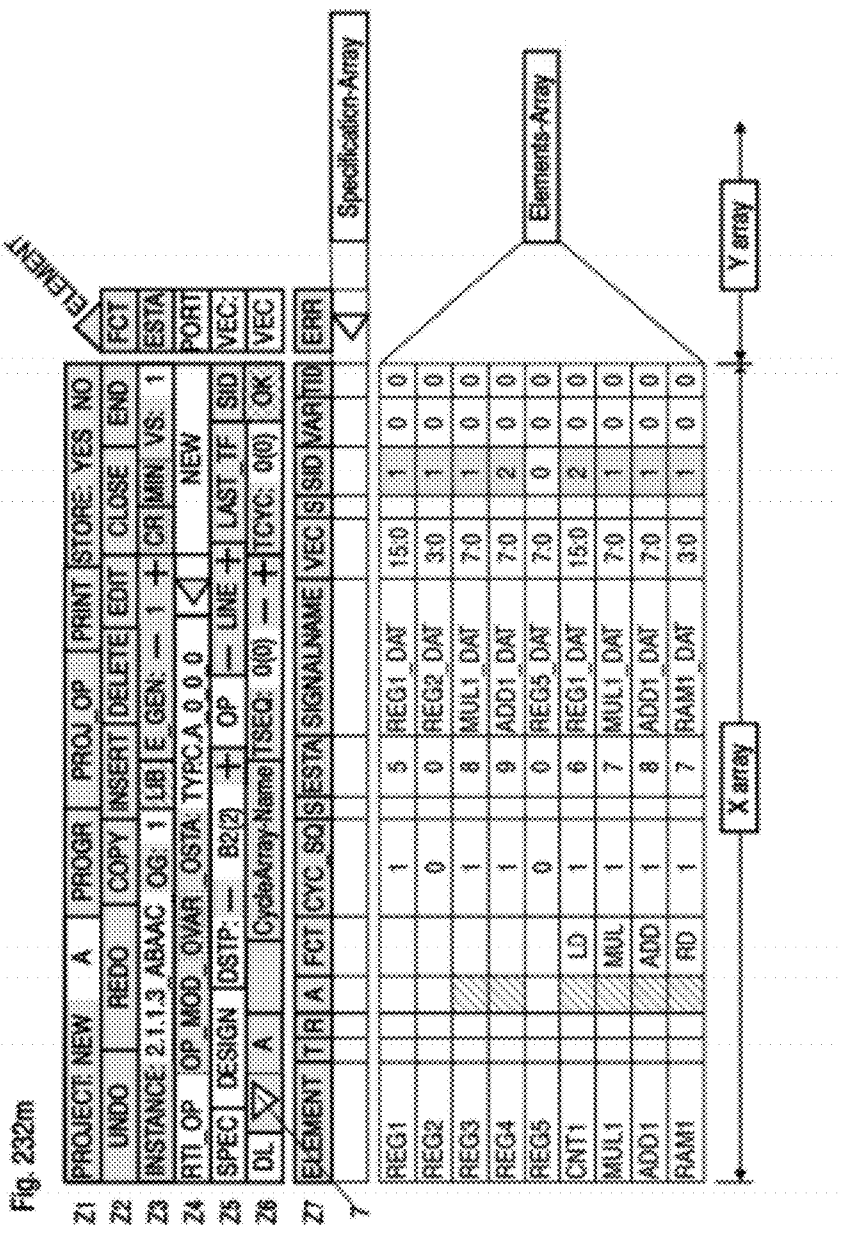
Figure 232N:
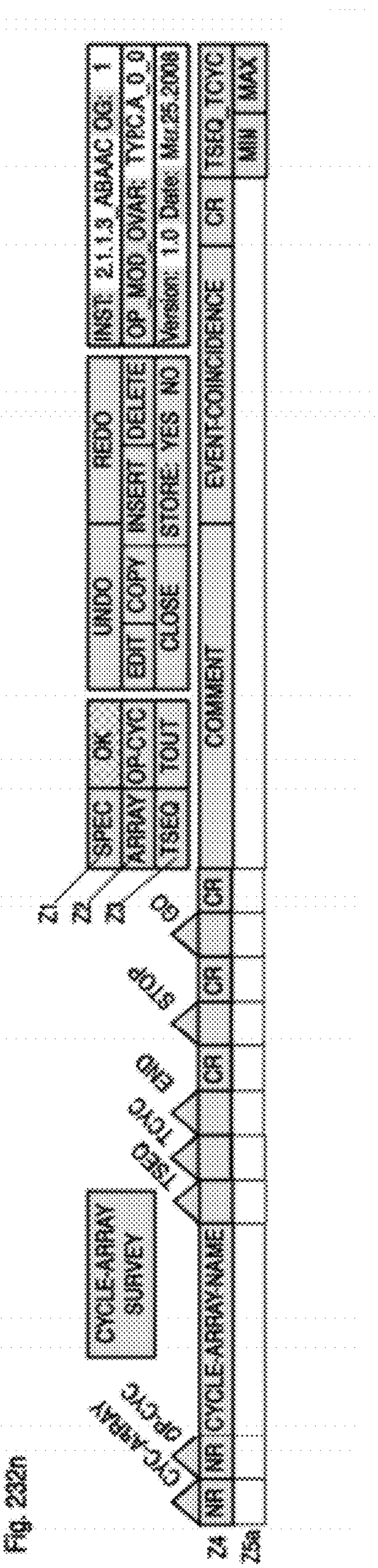
Figure 232B:
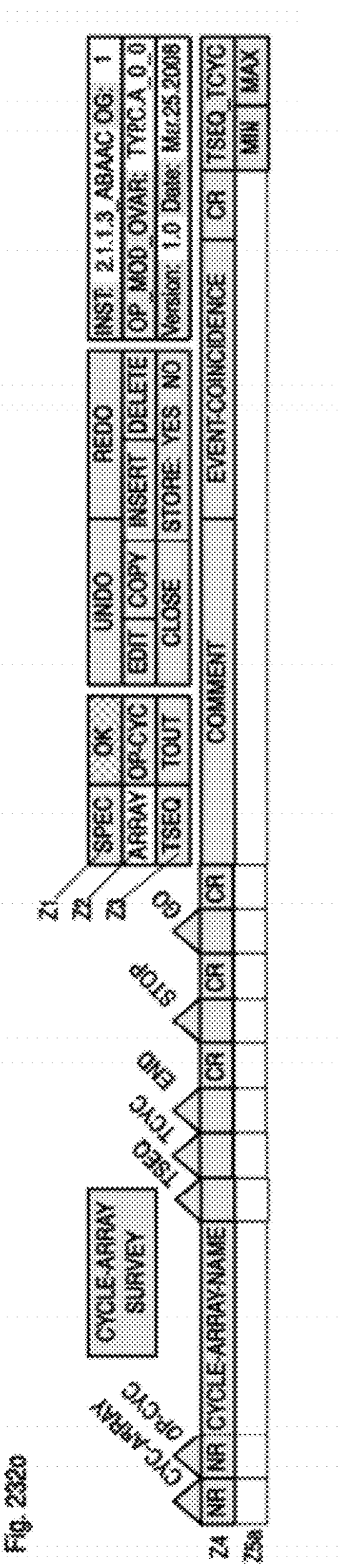

By double clicking the button "A" in "Z6" a display "CYCLE-ARRAY-SURVEY" is opened, as shown in FIG. 232*n*, which owns with the lines "Z1", "Z2", "Z3" in three blocks, display areas and buttons for the specification. In the block on the right side there are the display areas in "Z1" for the RTI instance with path-number_RTI-name and operation group number, in "Z2" the actual RTI operation with operation-type_mode_variation, and in "Z3" the version and the date of the actual RTI operation specification. The middle block shows in "Z1", "Z2", and "Z3" the standard buttons for the handling, as illustrated and described in the SPV displays before. The block on the left side holds in "Z1" the buttons "SPEC" for the beginning of specifying and "OK" for the acknowledging after specifying. In "Z2" with "ARRAY" a new cycle array is generated and with "OP-CYC" a new operation cycle number for an already existing cycle array is produced. A new operation cycle number is needed, if a cycle array is used more than one time in an RTI operation. The line "Z3" of the block on the left side holds the buttons "TSEQ" and "TOUT". By activating the button "TSEQ" all transfer sequence steps from beginning "BEG" to the end "END" of a cycle array, FIG. 232*a*, are specified for the first transfer cycle "TCYC1". With activated button "TOUT" (transfer out) signal transfers of transmitters of the cycle array to receivers outside of the cycle array can be specified. The line "Z4" contains the following columns, from left to right: cycle array number "CYC-ARRAY", operation cycle number "OP-CYC", "CYCLE-ARRAY-NAME", number of transfer sequences "TSEQ", number of transfer cycles "TCYC", column "END" with criterion "CR", column "STOP" with criterion "CR", column "GO" with criterion "CR". The column "COMMENT" and the coincidence of events "EVENT-COINCIDENCE" with the button criteria "CR" can be switched alternatively. The columns in "Z5*a*", minimum "MIN" and maximum "MAX" for "TSEQ_TCYC" in "Z4" complete the criteria constructs by "EVENT-COINCIDENCE", as it will be shown later. The lines "Z5*a*" and the succeeding lines "Z5*b*", "Z5*c*", etc. represent the specification array.

Figure 232P:
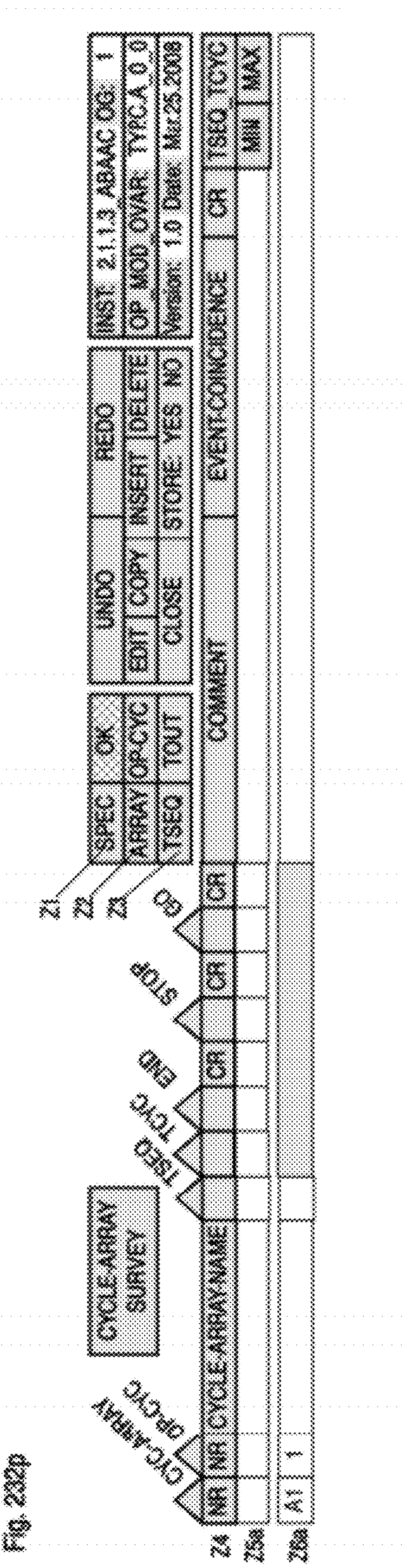
Figure 232Q:
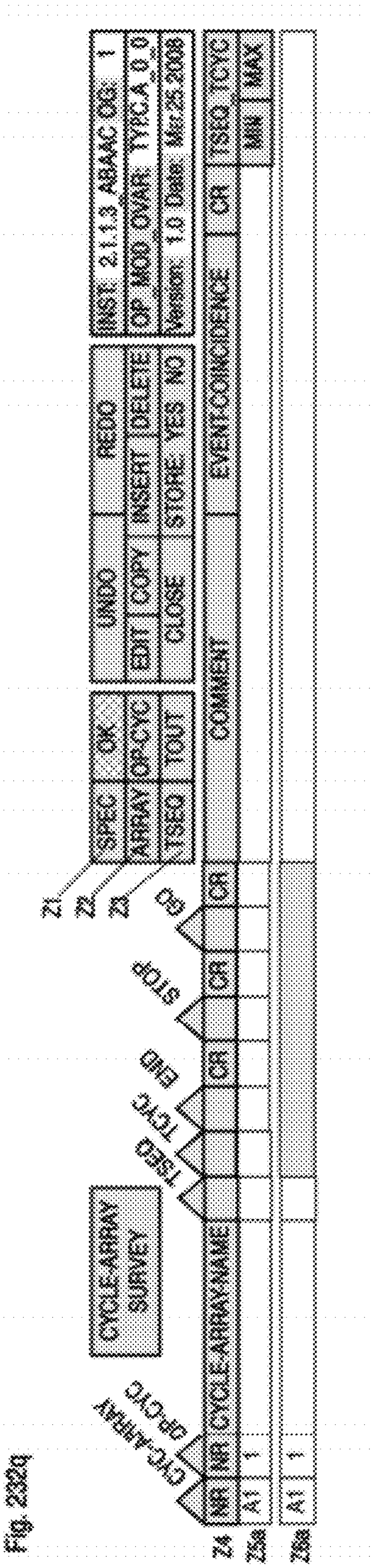

In FIG. 232*o* no cycle array is registered yet. Clicking the button "ARRAY" in "Z2" activated it for the entry of the first cycle array. Clicking the button "OK" in "Z1" generates a so-called register line "Z6*a*" and the first cycle array "A1" is entered in column "CYC-ARRAY" and in column "OP-CYC" the first operation cycle is entered with number "1", as shown in FIG. 232*p*. Thereby the button "ARRAY" in "Z2" is deactivated. By a double click on the marked button of line "Z6*a*" the entries "CYC-ARRAY" and "OP-CYC" of line "Z6*a*" are copied and inserted in the specification array, line "Z5*a*", as FIG. 232*q* shows.

Figure 232R:
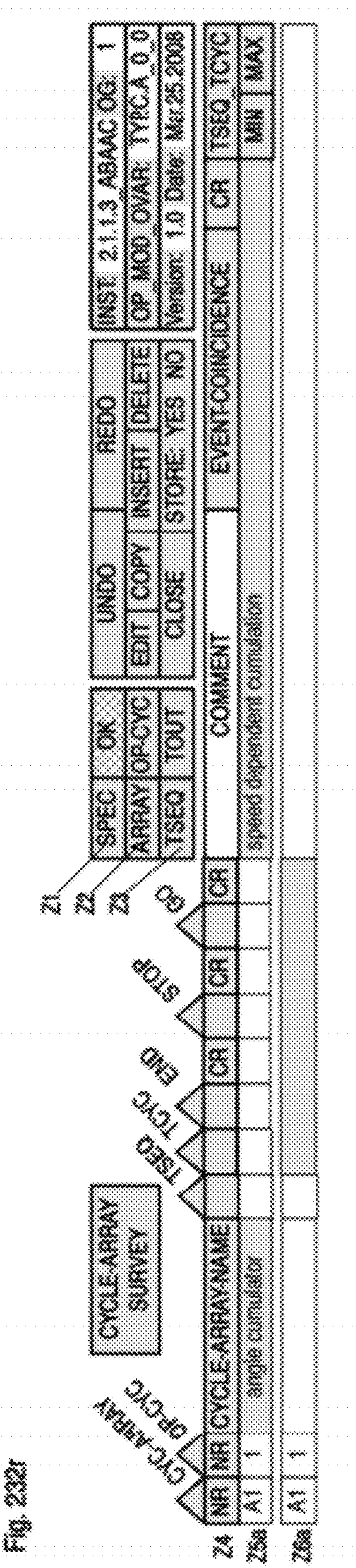
Figure 232S:
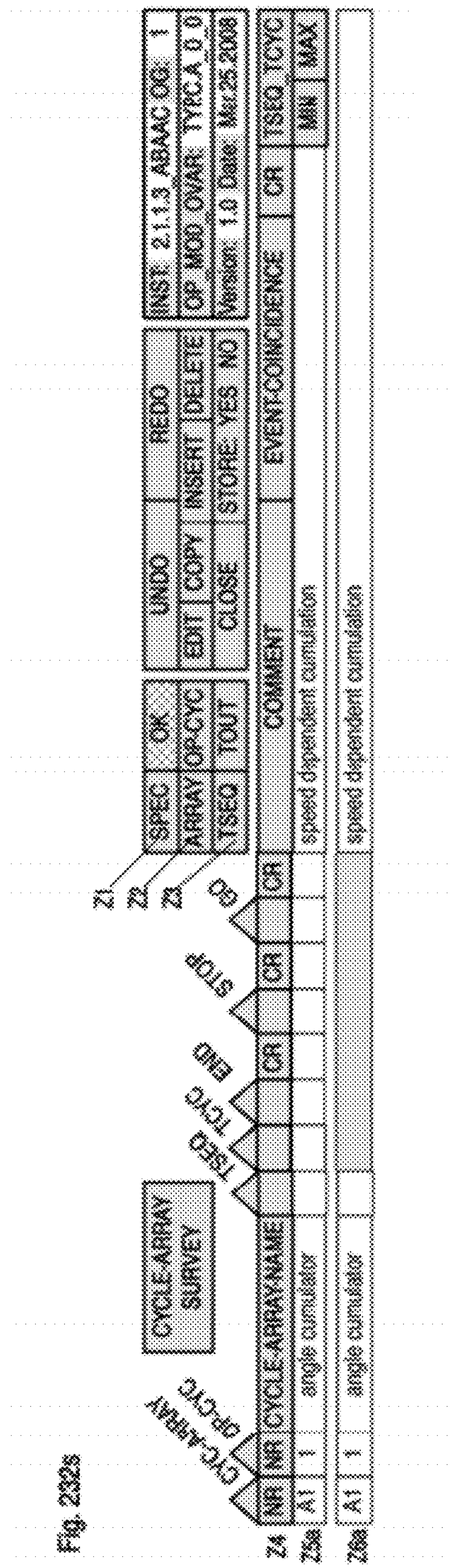

In FIG. 232*r*, clicking activated the buttons "CYCLE-ARRAY-NAME" and "COMMENT" in "Z4". With that in "Z5*a*" the areas in the activated columns were marked and in column CYCLE-ARRAY-NAME "angle cumulator" and in column COMMENT "speed dependent cumulation" were entered manually. After acknowledgement by "OK" in "Z1" in the columns "CYCLE-ARRAY-NAME" and "COMMENT", the buttons are deactivated in line "Z4a", and unmarked in line "Z5a" and the texts are adopted in line "Z6a", as FIG. 232*s* shows. In FIG. 232*t* clicking the button "TSEQ" in "Z3" activated it for the specification of transfer sequences.

Description to FIG. 233*a*-233*u*

By an additional click on the button "SPEC" in "Z1", FIG. 232*t*, the display changes from CYCLE-ARRAY-SURVEY" to "RTI-OP-BS" as FIG. 233*a* shows. Thereby the cycle array and the corresponding operation cycle with "A1_1", the specification task in field 7*a* with "TSEQ" and the cycle array name with "angle cumulator" have been transferred from the display "CYCLE-ARRAY-SURVEY" into the "RTI-OP-BS". Furthermore the button "A1_1" is automatically activated in "Z6" and the button "OP" in "Z5" is deactivated, so that the arrays outside of the cycle array "A1" are excluded from a specification. In FIG. 233*a*, for example, in column array "A" the elements of the cycle array "A1" were marked hatched by a click, for a better survey. The specification of the transfer sequences for a cycle array with corresponding operation cycle, in the example for "A1", is identical to the specification of a non-cycle-array, as explained in detail above, and begins with "DSTP:B0(0)" in "Z5", as FIG. 233a shows. The values in the columns "CYC_SQ" and "ESTA" result from the preceding initialising of the cycle array "A1", as illustrated in FIG. 232m.

Corresponding to the beginning of the cycle array "A1", FIG. 232a, the element "CNT1" for the first "TSEQ" was transferred from the element array to the specification array and the function "FCT" was switched from "LD" to "CU", as FIG. 233b shows. With the function count up "CU" or count down "CD" of a counter the transmitter is omitted in the specification array.

In FIG. 233c the first data processing step "DVSTP" was acknowledged in the specification array in column "R" and by that the button CNT1 in column "A" was marked in its whole area and the cycle was increased by one to "CYC=2". Furthermore, because the number of CNT1 steps is still unknown, in "Z7" the button "CYC_SQ" is activated automatically, as well as in the CNT1 line the display areas in the columns "CYC_SQ" and "ESTA" are marked, and in the locations "SQ" and "ESTA" a question mark "?" is set.

In FIG. 233d for CNT1 the sequence "SQ=1" was entered manually and acknowledged with "OK" in "Z6". Thereby the value corresponding to "SQ" is automatically entered in "ESTA" and in "Z7" the button "CYC_SQ" is deactivated and in the CNT1 line in the columns "CYC_SQ" and "ESTA" the marks are erased. Generally at the location of the "?" for the sequence "SQ" any number of CNT steps can be specified and entered manually. If the number of CNT counting steps doesn't allow a definite requirement, but is dependent on criteria "CR", then no manual entry in column "CYC_SQ" in the location of the "?" occurs, but by double clicking the button "CR" in line "Z3" a CR design window is opened.

In the CR display window, not illustrated, a criterion "CR" for the CNT1 sequence is defined, which consists, as is known, of corresponding event coincidences. In the CR display window all criteria "CR" needed for an RTI specification are defined and maintained. For that there are two CR maintenance groups. In CR-maintenance-group1 criteria for counting sequences of counters are kept in the "RTI-general-array", not in the RTI cycle arrays. The CR-maintence-group1 is represented by "RTI-name", RTI operation group "OG", RTI operation "OP_MOD_OVAR", "RTI-general-array", "counter-element-number" and counter-cycle "CYC" for the sequence "SQ" for which a criterion "CR" is defined or was defined. In the CR-maintenance-group2 exclusively criteria for counting sequences of counters in the "RTI cycle arrays", but not in the RTI-general-array are kept. The CR-maintenance-group2 is represented by "RTI-name", RTI operation group "OG", RTI operation "OP_MOD_OVAR", "RTI-cycle-array_operation-cycle", "counter-element-number" and counter-cycle "CYC" for the sequence "SQ" for which a criterion "CR" is defined or was defined.

In the example of FIG. 233d the CR-maintenance-group2 results from RTI name: "ABAAC", RTI operation group: "OG1", RTI operation OP_MOD_OVAR: "TYP.C.A_0_0", RTI cycle-array_operation-cycle: "A1_1", counter element number: "CNT1", counter cycle: "CYC2". As it will be shown later, in an RTI cycle array also a criterion "CR" each for cycle end "END", for cycle stop "STOP" and for cycle go "GO" can be defined. In the CR display window for each "CR", additionally to the event coincidences, values for the minimum and maximum sequence are defined, which are alternatively displayed in the "RTI-OP-BS" and which define the ESTA value. After acknowledgement of the CR inputs and closing the CR display window, it is changed to "RTI-OP-BS" with automatic entering of the minimum values for "SQ" and "ESTA", as for example for "CNT1" with "SQ=1" and "ESTA=7" as shown in FIG. 233e. Thereby the minimum values are illustrated in the columns "CYC_SQ" and "ESTA" on chequered background.

By clicking on the button "MIN" on chequered background in "Z3" this button switches to "MAX" on hatched background and in the CNT1 line the maximum values in the columns "CYC_SQ" and "ESTA" are indicated on a hatched background, in the example that is "SQ=4" and "ESTA=10", as shown in FIG. 233f. Consistent to "MAX" the button "CR" in "Z3" also has a hatched background. By clicking the button "MAX" in "Z3" the button is switched to "MIN", FIG. 233e, with chequered background. With this also "CR" in "Z3" changes from hatched to chequered background.

In FIG. 233g the second "TSEQ" was specified with the receiver "RAM1" in function "RD" and the transmitter "CNT1" with the RAM1 address and acknowledged in column "R" in FIG. 233h. Hereby for "RAM1" a RAM type was used, which only has one read data stream and therefore no entry is needed for the sequence "SQ" in the column "CYC_SQ". Generally applies: If a RAM type is used, which has more than one read data stream, then automatically in column "CYC_SQ" the read data streaming "SQ=0: n−1(n)" is displayed. "n" stands for two or more read data streams.

After the transfer of "RAM1" from the specification array to the receiver array, FIG. 233i, automatically in column "T" a "?" is set, which indicates, that the read data from "RAM1" must be transferred to a receiver still in the actual design step "0". Furthermore in FIG. 233i the third "TSEQ" with the receiver "MUL1" and the transmitter "RAM1" and "REG2" is specified and acknowledged in column "R" in FIG. 233k.

After the transfer of "MUL1" from the specification array to the receiver array, FIG. 233I, in column "T" automatically a "?" is set, which indicates, that the MUL1 data are to be transferred still in the actual design step "0" to a receiver. By the transfer of the transmitter "RAM1" from the specification array, FIG. 233k, to the transmitter array, FIG. 233l, for "RAM1" the "?" in column "T" in the receiver array is automatically deleted and replaced by a "+", which indicates, that "RAM1" has transferred its read data to a receiver, in the example to "MUL1". Furthermore in FIG. 2331 the fourth "TSEQ" with the receiver "REG3" and the transmitter "MUL1" is specified and acknowledged in column "R" in FIG. 233m. After the transfer of "REG3" from the specification array to the receiver array and of MUL1 from the specification array to the transmitter array, FIG. 233n, for "MUL1" in the receiver array in column "T" the "?", FIG. 239m, is automatically replaced by a "+", which indicates, that "MUL1" has transferred its data to a receiver, in the example to "REG3". Furthermore by clicking the button "OK" in line "Z6" the design step "0" with "DSTP:E0(0)" in line "Z5" was terminated.

By clicking again the button "OK" in "Z6" the beginning of the design step "DSTP:B1(1)" with the values in the columns "CYC_SQ" and "ESTA" of the element array is illustrated, as FIG. 233o shows. Furthermore the elements "REG3", "CNT1", "MUL1" and "RAM1" are marked in column "A", indicating that the TSEQ specifying was executed in the precedent design step "0".

In FIG. 233p the fifth "TSEQ" with the receiver "ADD1" and the transmitters "REG3" and "REG4" is specified and in FIG. 233*q* acknowledged in column "R". After the transfer of "ADD1" from the specification array, FIG. 233*q*, to the receiver array, FIG. 233*r*, automatically in column "T" a "?" is set, which indicates, that the ADD1 data must be transferred still in the actual design step "1" to a receiver. Furthermore in FIG. 233*r* the sixth and last "TSEQ" with receiver "REG4" and transmitter "ADD1" is specified and acknowledged in FIG. 233*s* in column "R".

FIG. 233*t* shows "REG4" in the receiver array and "ADD1" in the transmitter array after the transfer out of the specification array of FIG. 233*s*. By the transfer of the transmitter "ADD1" from the specification array, FIG. 233*s*, to the transmitter array, FIG. 233*t*, for "ADD1" in the receiver array in column "T" the "?" is automatically deleted and replaced by a "+", which indicates, that "ADD1" has transferred its data to a receiver, in the example to "REG4". Furthermore by clicking the button "OK" in "Z6" the design step "1" was terminated with "DSTP:E1(1)" in line "Z5".

By clicking again the button "OK" in line "Z6" the beginning of design step "2" with "DSTP:B2(2)" in "Z5", and with the values in the columns "CYC_SQ" and "ESTA" of the element array is indicated, as FIG. 233*u* shows. Therein finally all elements for the TSEQ specification of the cycle array "A1" are indicated by a mark in column "A". Like in the RTI specification of the non cycle arrays, in the RTI specification of cycle arrays the design steps can be counted backward and displayed, by clicking the button DSTP"–" in "Z5" from "B2(2)" to "E1(2)", to "B1(2)", to "E0(2)" and to "B0(2)". By clicking the button DSTP"+" in "Z5" the design steps are counted and displayed in the reverse direction. During a TSEQ specification of a cycle array the button "OP" in line "Z5" is deactivated, in line "Z6" the button "cycle array with correlated operation cycle", in the example "A1_1", is activated and the button "TSEQ" is deactivated.

Figure 234B:
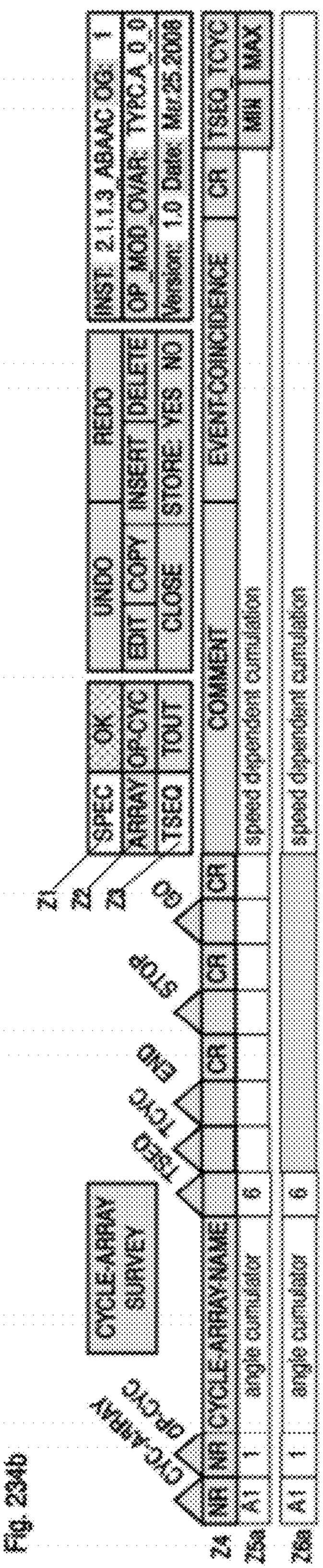
Figure 234C:
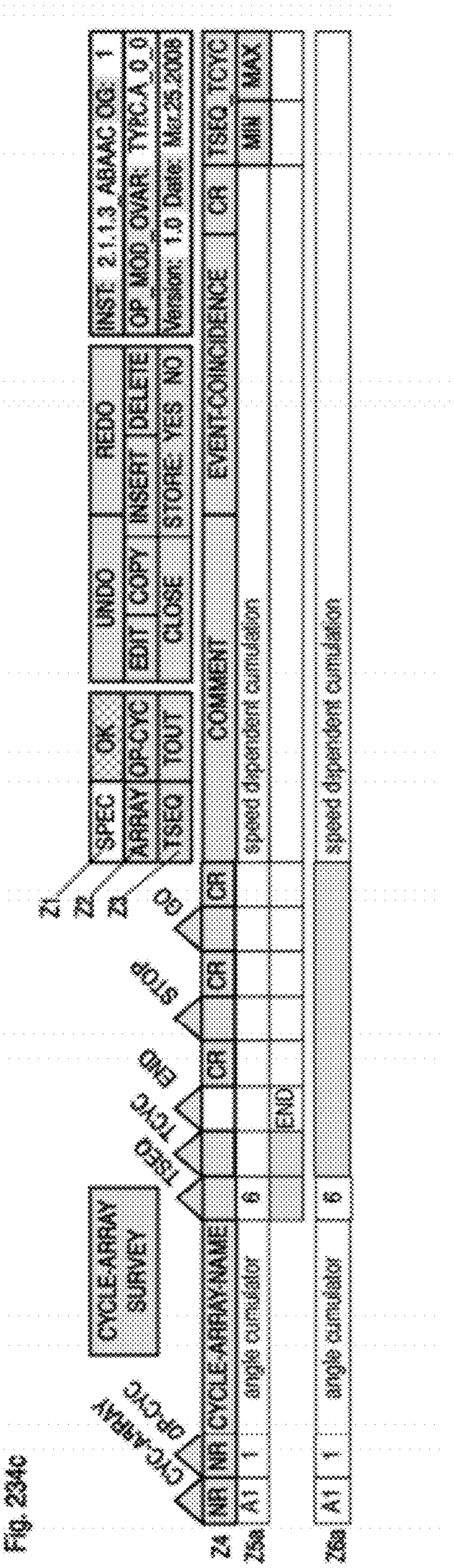
Figure 234D:
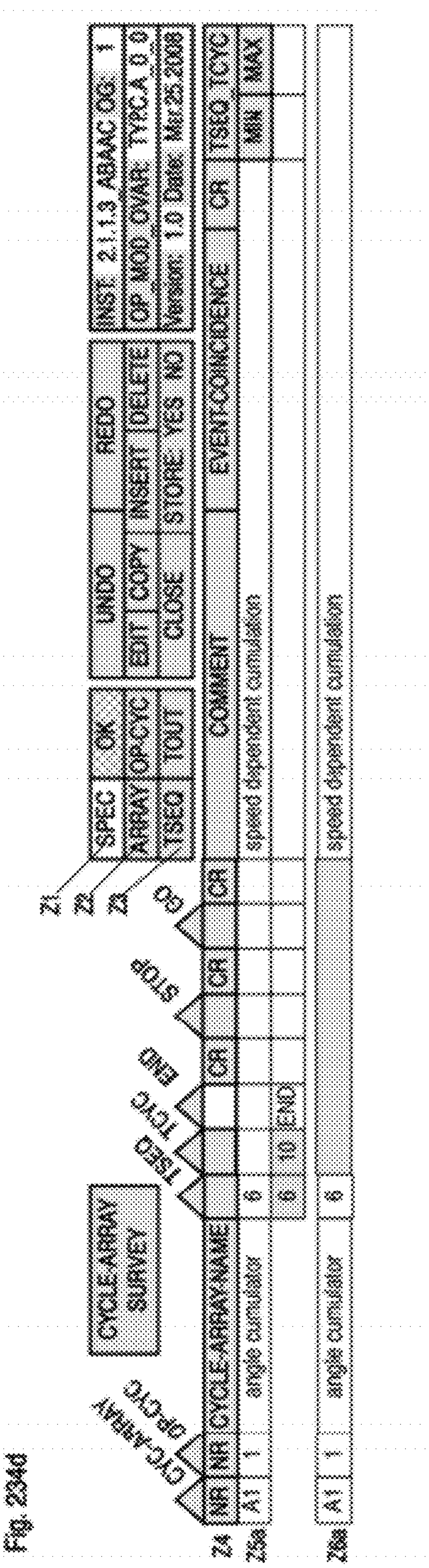
Figure 234E:
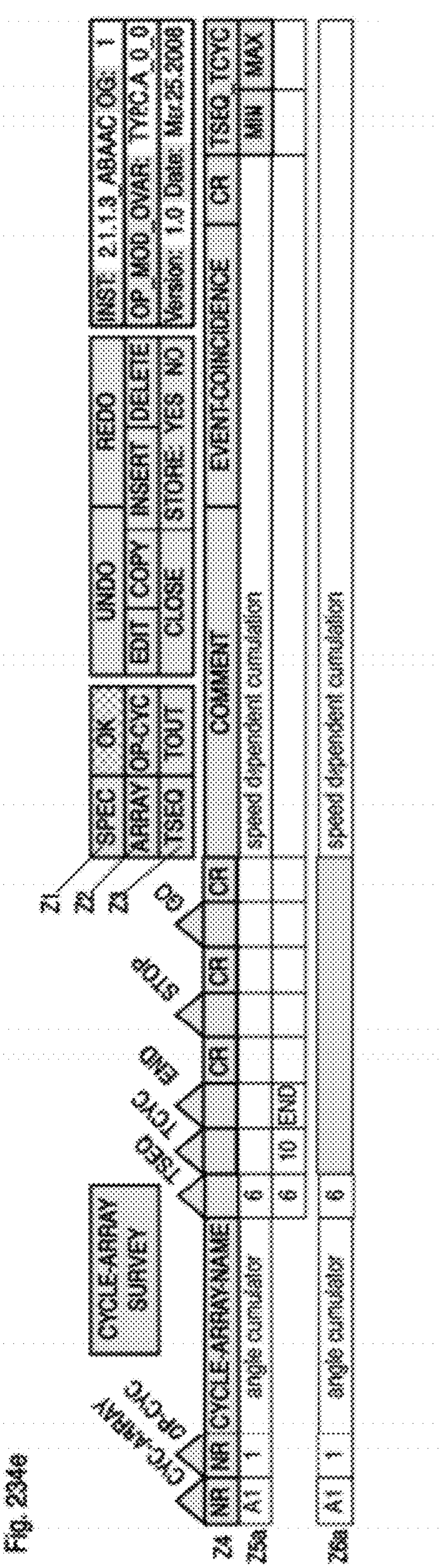
Figure 234F:
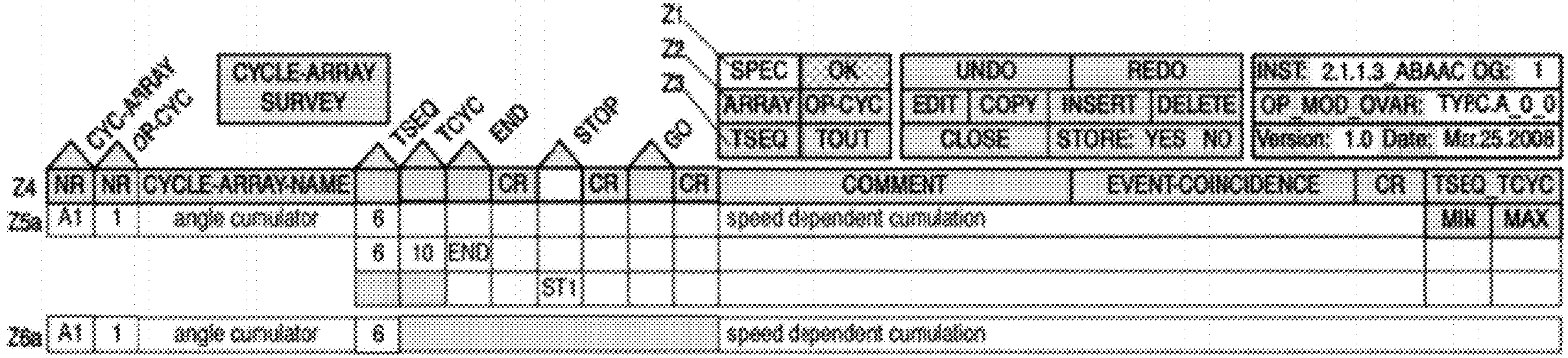
Figure 234G:
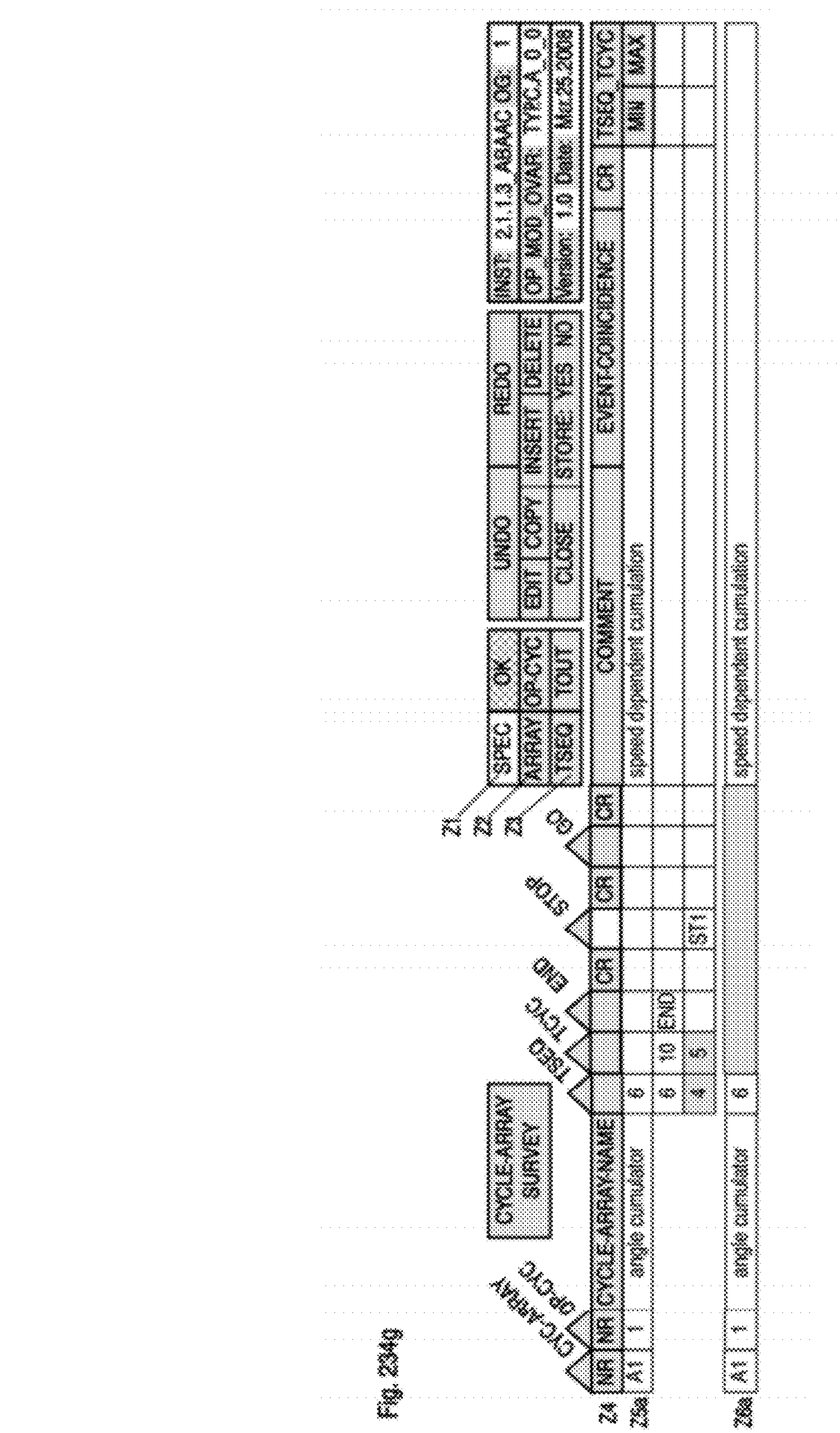
Figure 234H:
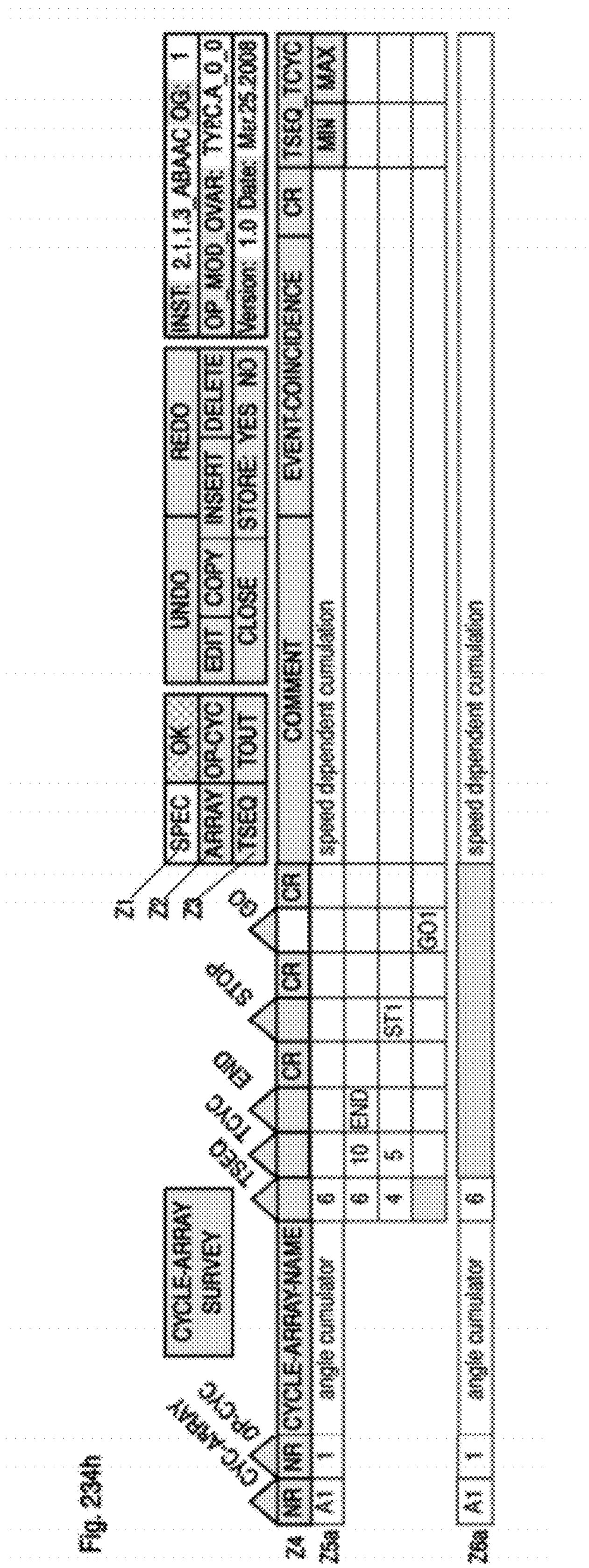
Figure 234I:
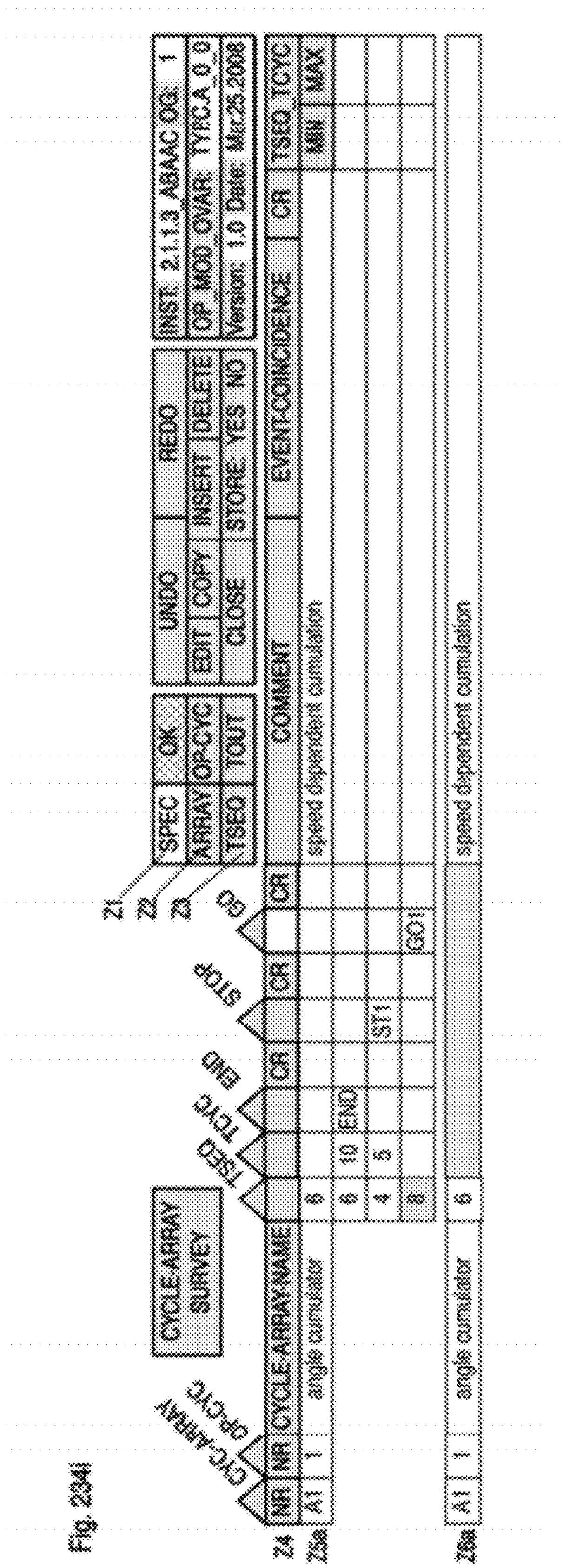
Figure 234K:
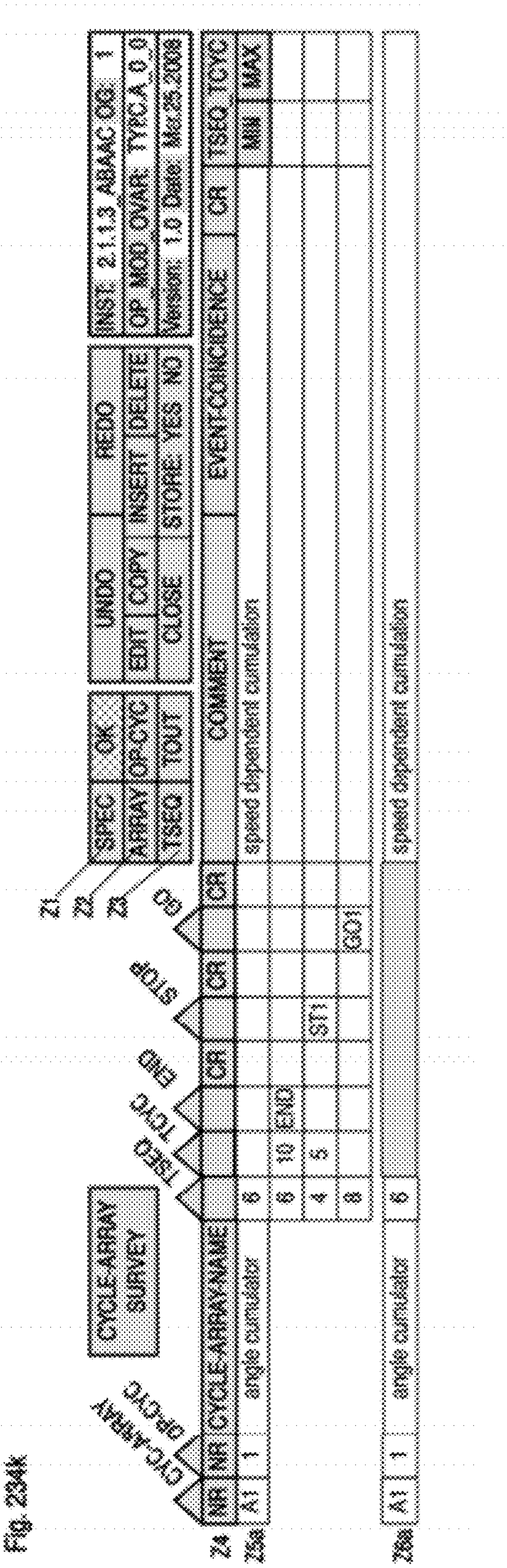
Figure 234I:
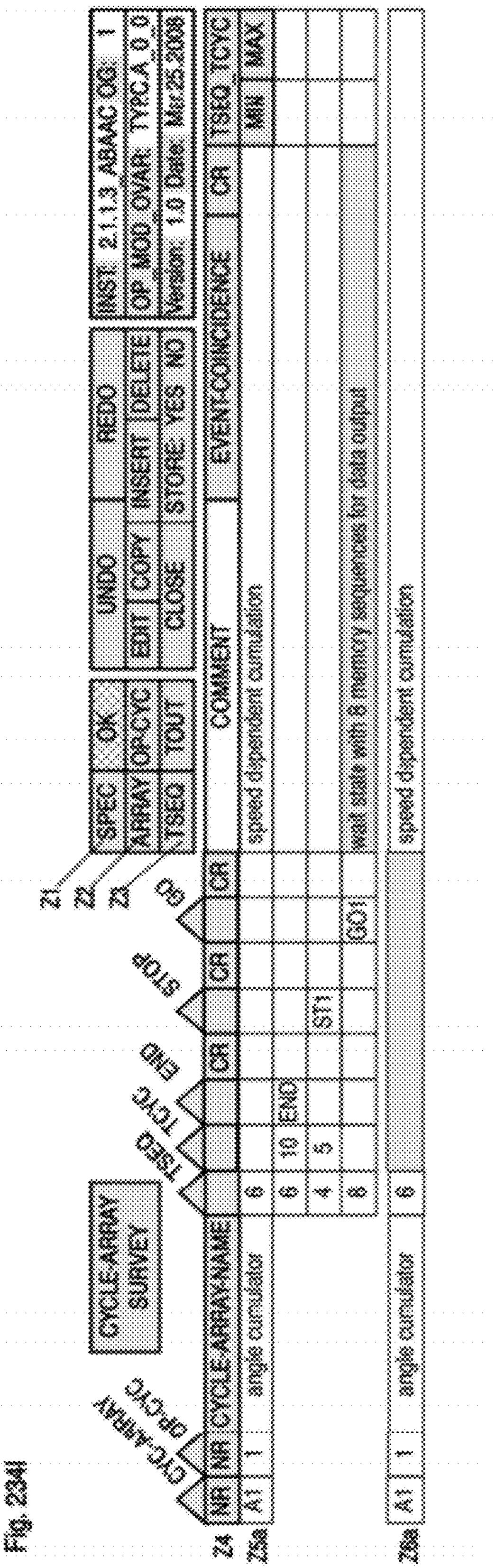
Figure 234M:
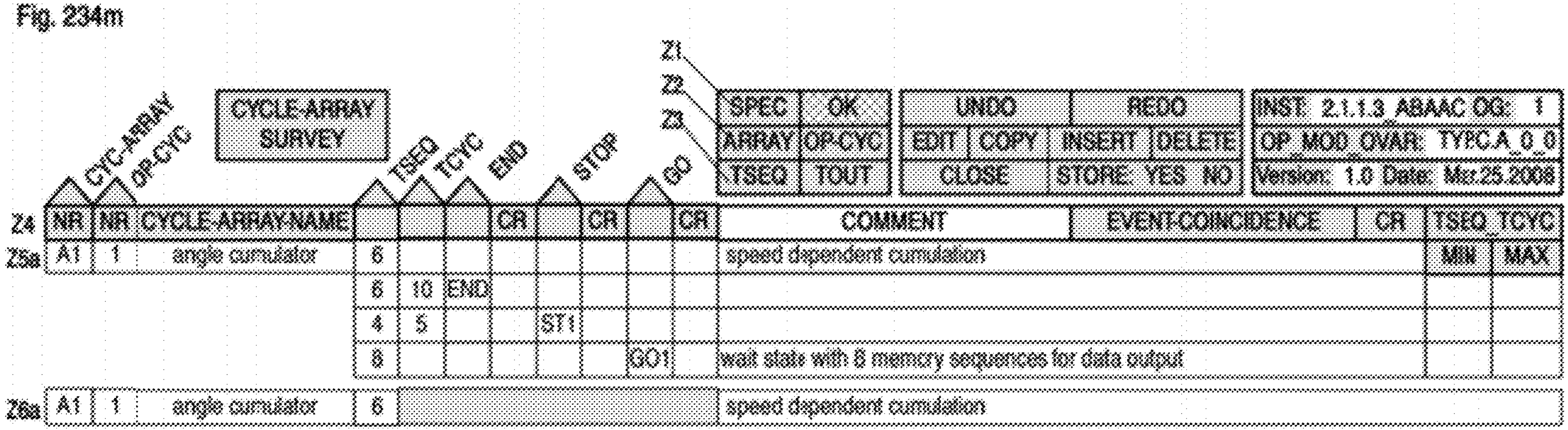
Figure 234N:
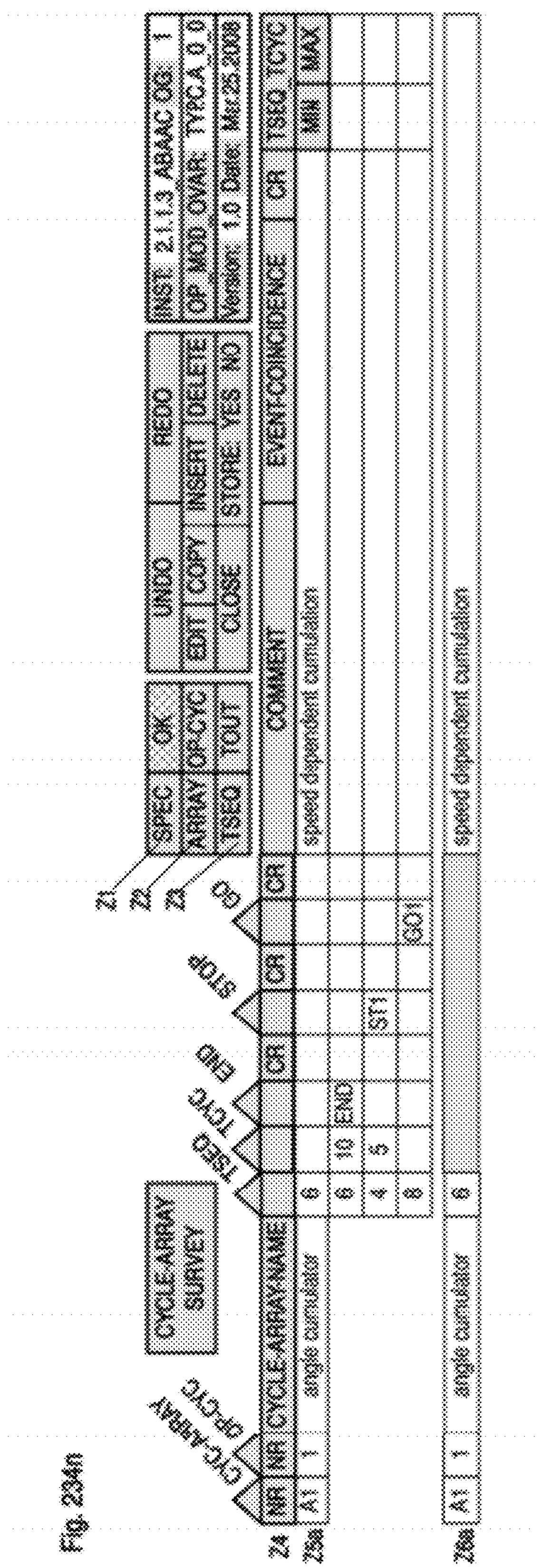
Figure 234O:
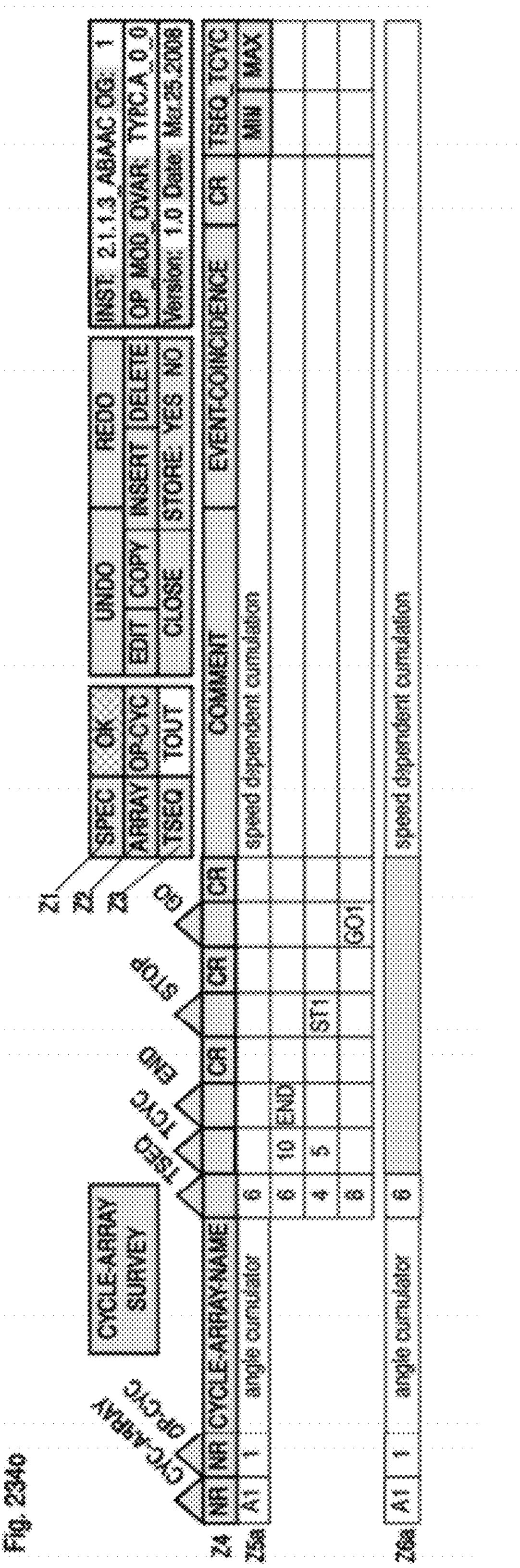
Figure 234P:
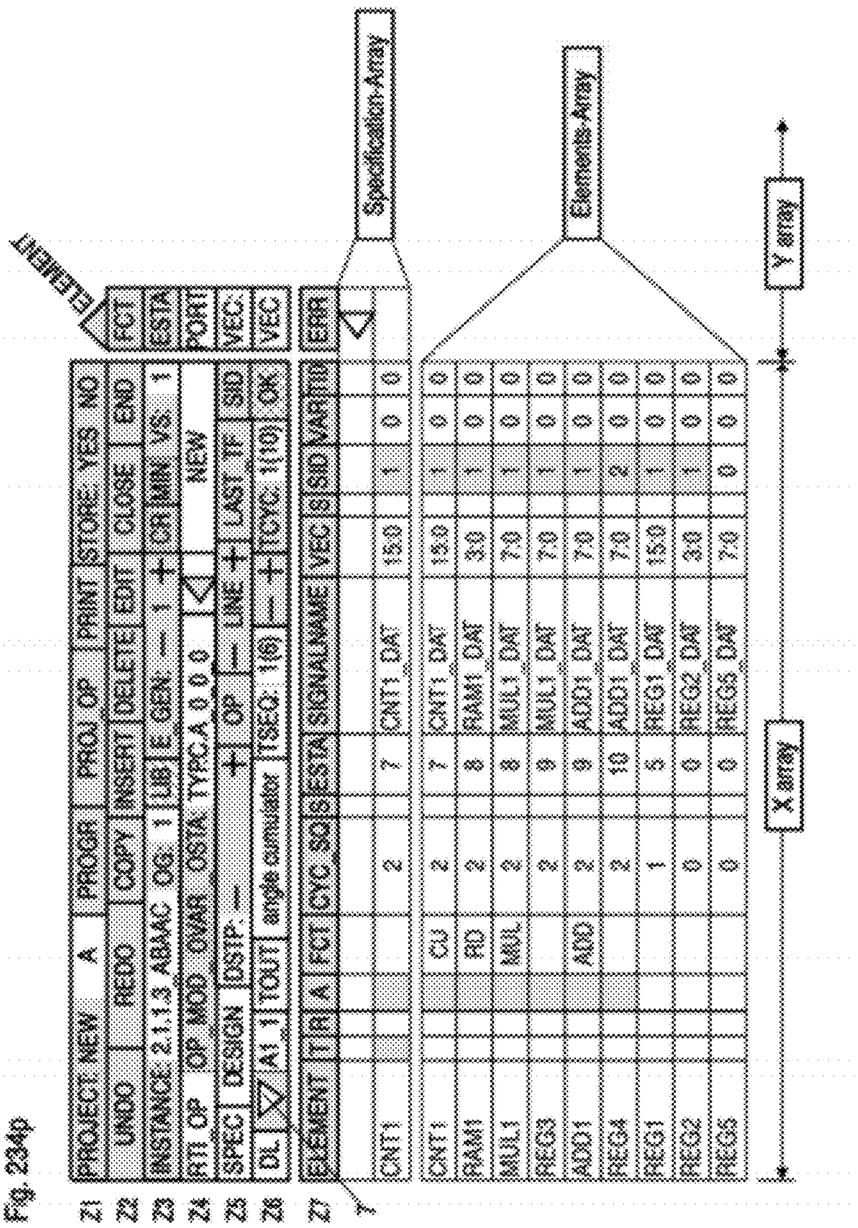
Figure 234Q:
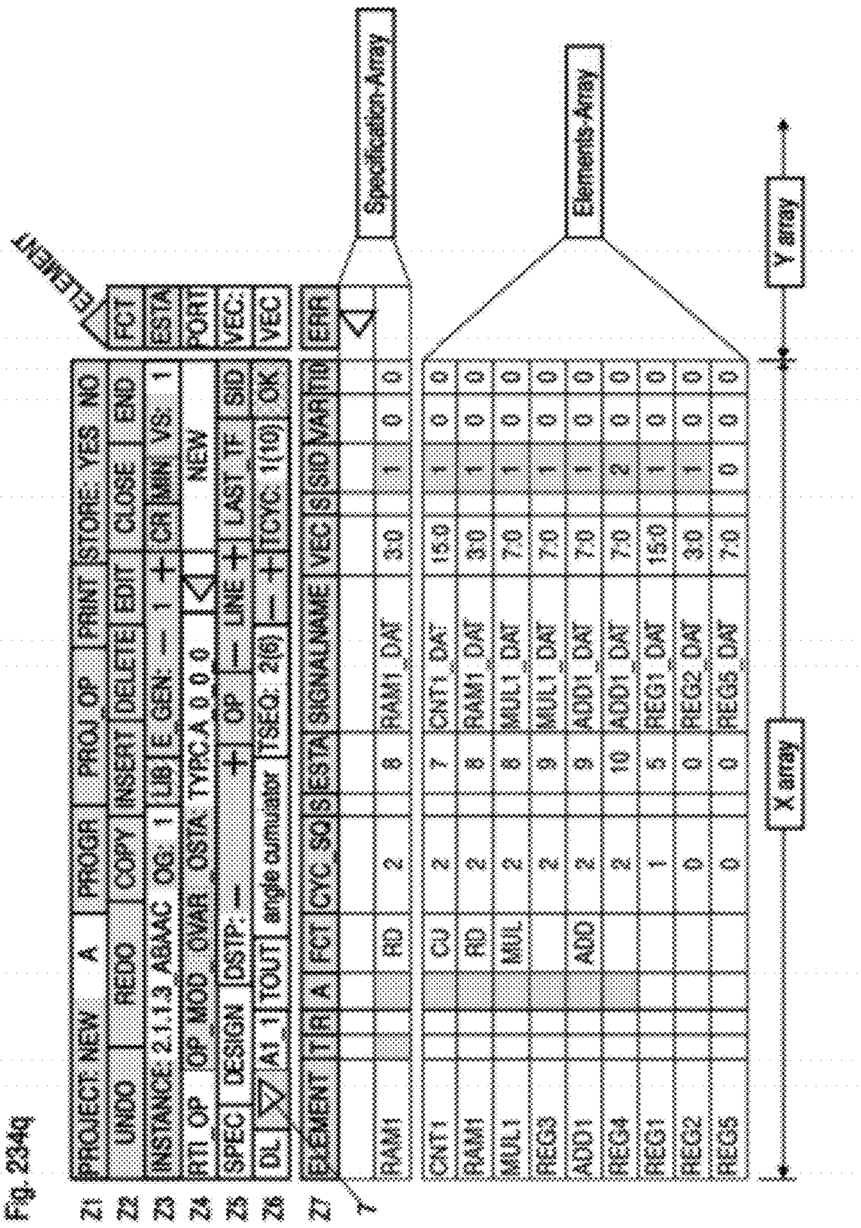
Figure 234R:
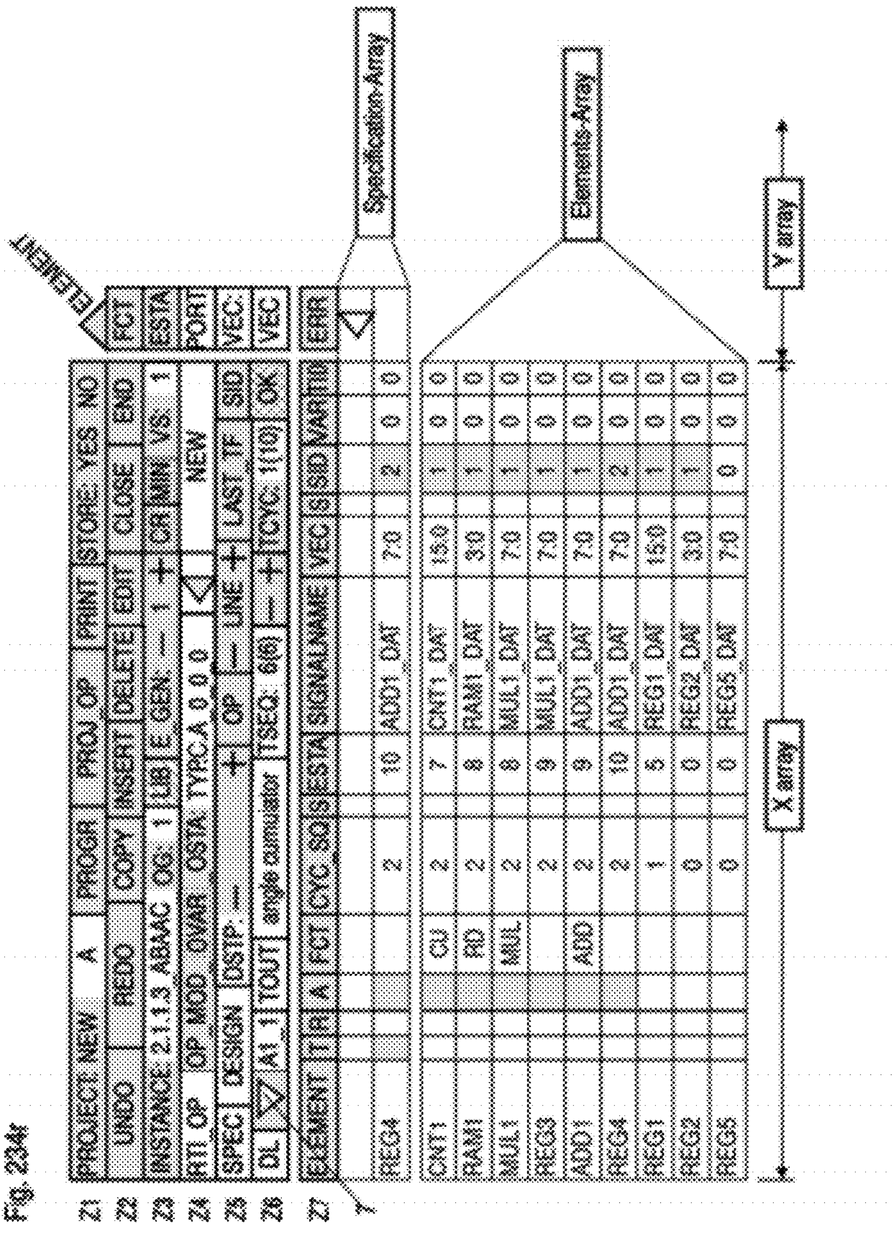
Figure 234S:
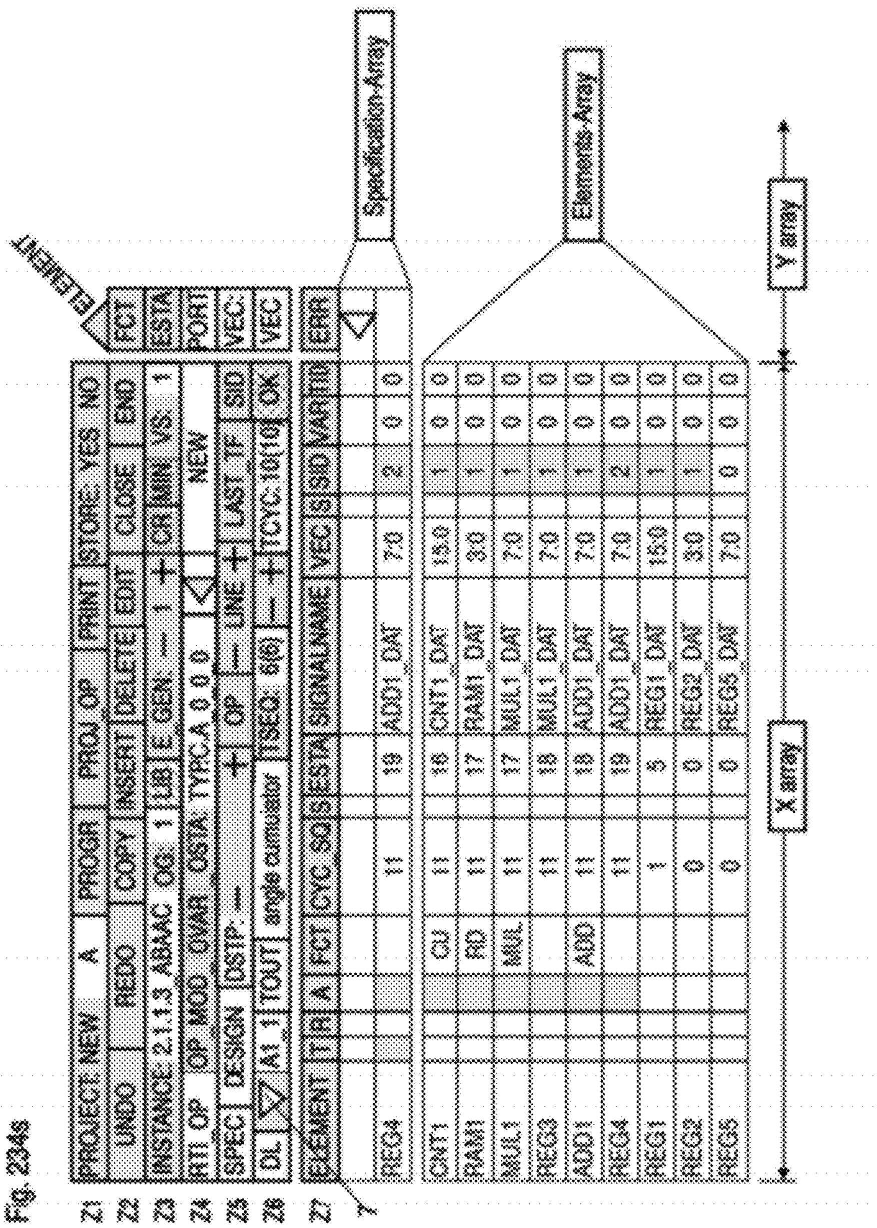
Figure 234I:
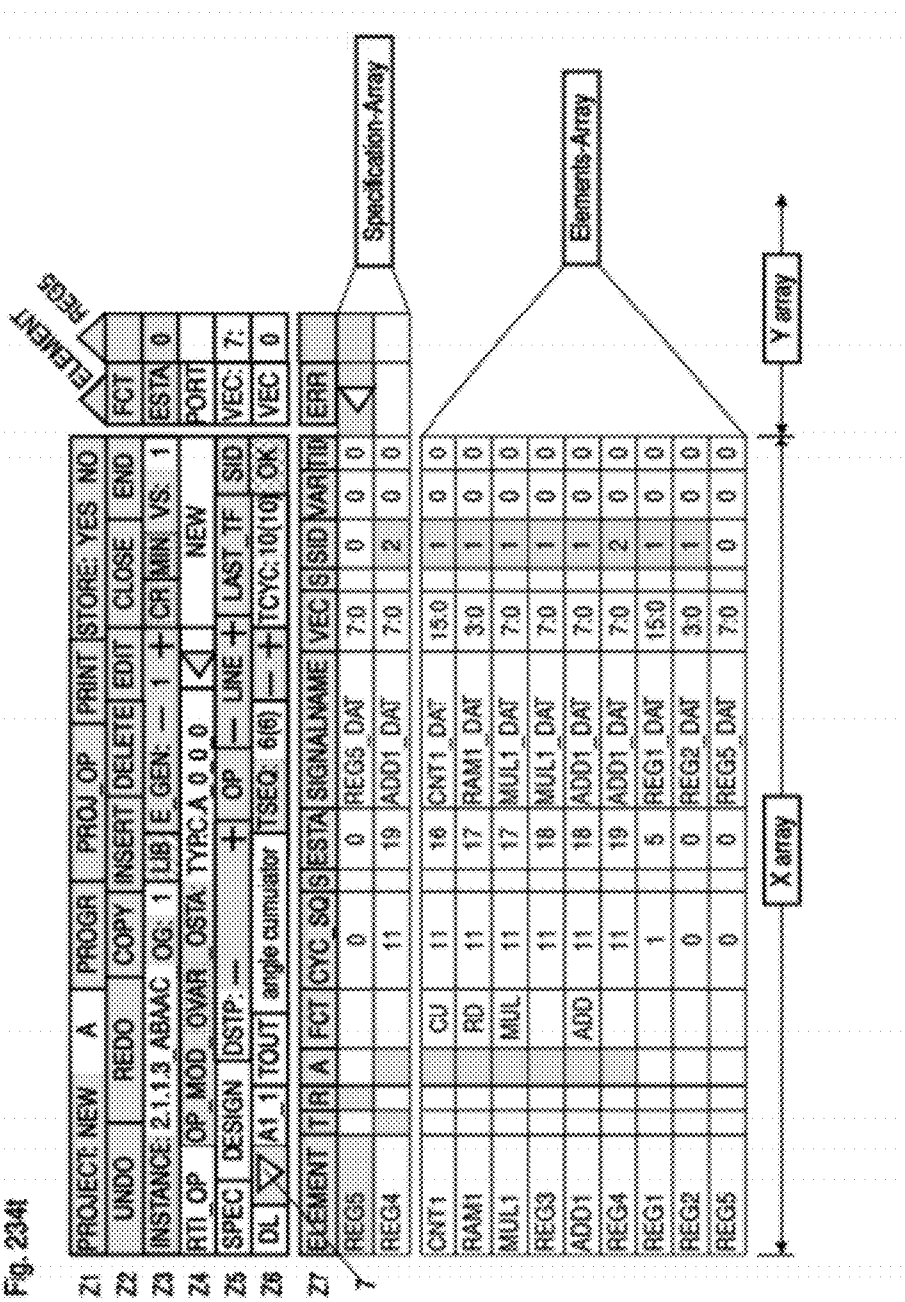
Figure 234U:
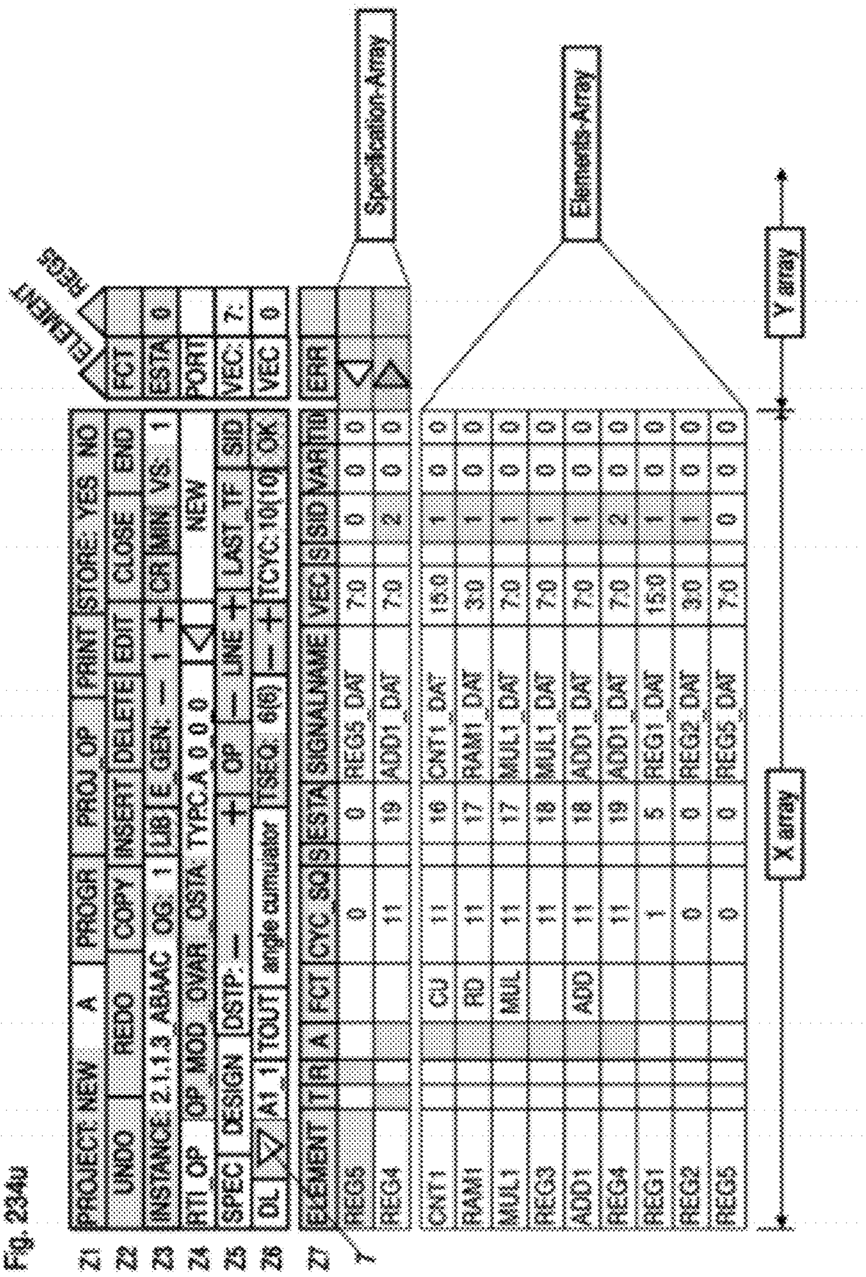
Figure 234V:
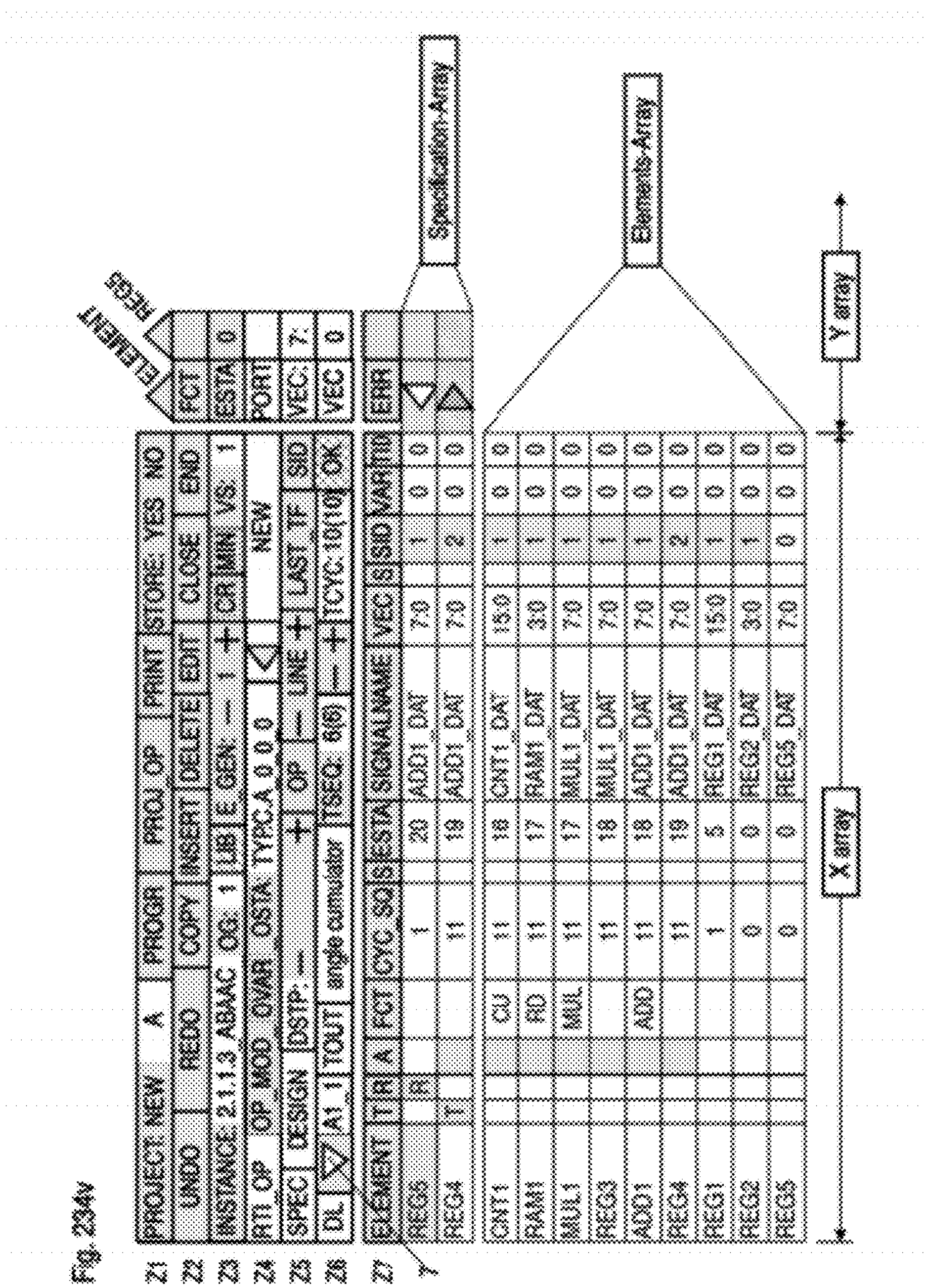
Figure 234W:
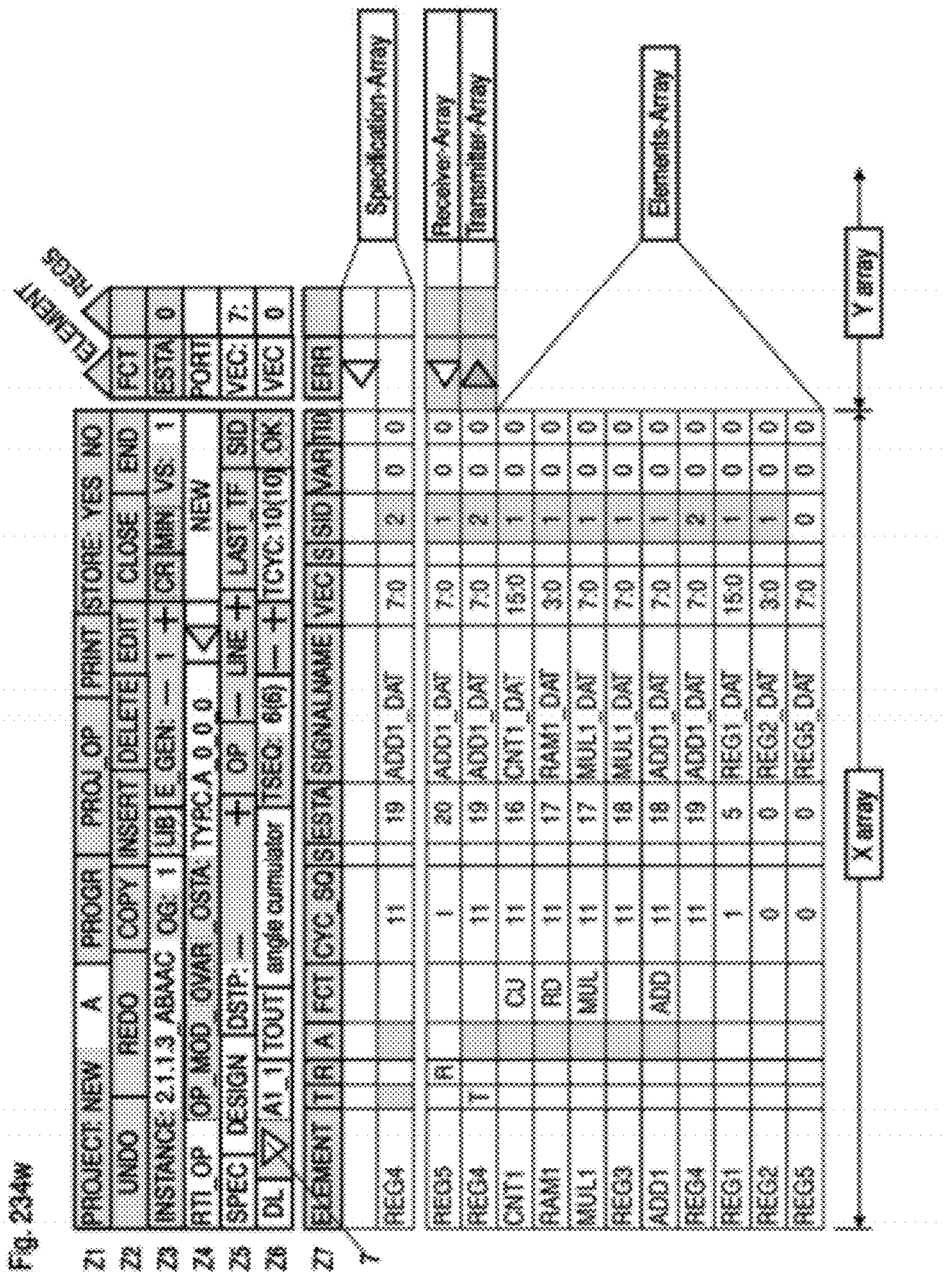
Figure 234X:
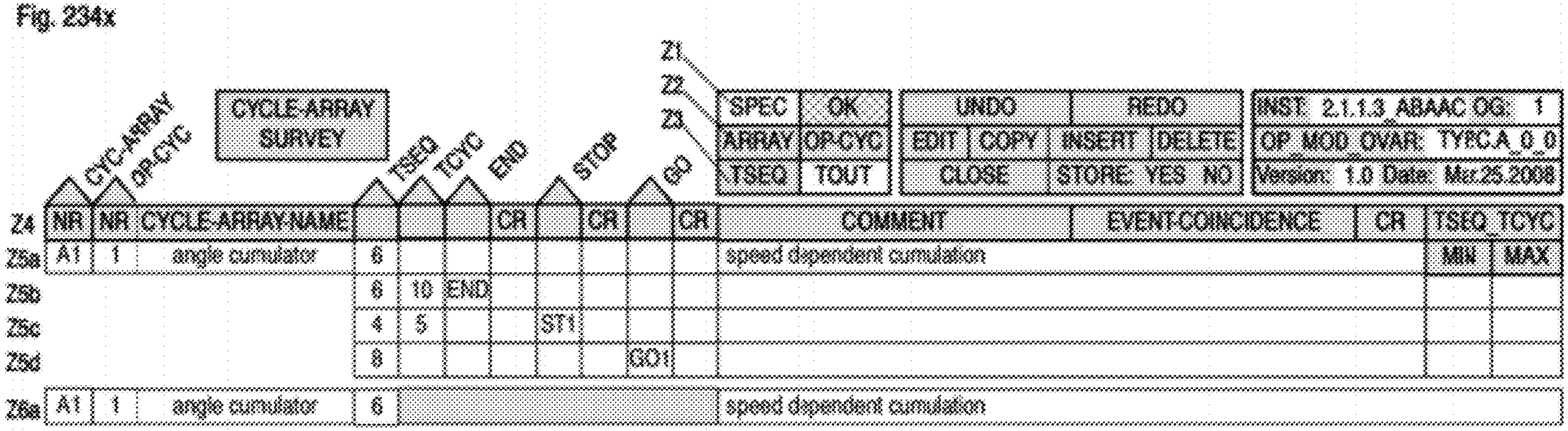
Figure 234Y:
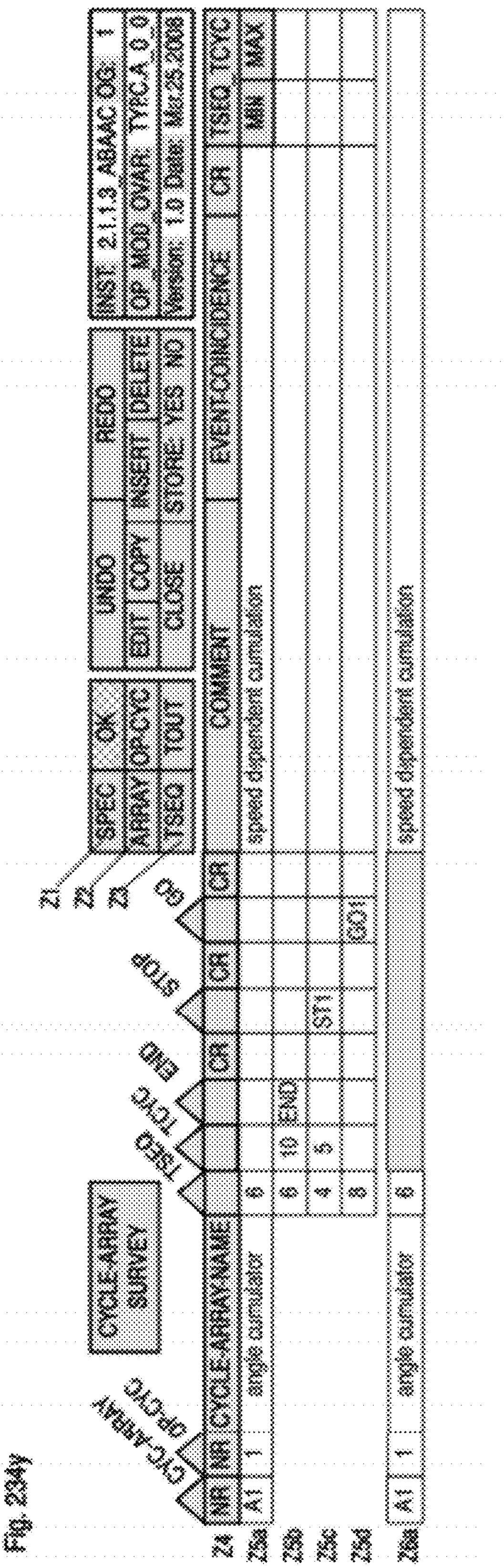

Description to FIG. 234*a*-234*y*

After the sixth and last transfer sequence "TSEQ6" with the data input in "REG4" in the block structure, FIG. 232*a*, was specified, now the button "TSEQ" in line "Z6" is activated by a click and with that the complete transfer for the first transfer cycle is displayed with the display area "TCYC:1(1)" in line "Z6", as FIG. 234*a* shows. Thereby the DSTP display area in "Z5" and the button "TSEQ:" in "Z6" are automatically deactivated. The order of transfers results as follows: First transfer sequence "TSEQ1": CNT1-CU with one counting step, "TSEQ2": from CNT1 to RAM1, "TSEQ3": from RAM1 and REG2 to MUL1, "TSEQ4": from MUL1 to REG3, "TSEQ5": from REG3 and REG4 to ADD1, and "TSEQ6": from ADD1 to REG4. In the receiver coordinate fields the transfer sequence numbers, in the example these are the numbers "1" to "6", are entered automatically. In cycle array structures, in which several elements execute at a time their data processing parallelly to a transfer sequence, each of these elements gets as receiver in its coordinate fields the same transfer sequence numbers. An alternative display of the complete transfer sequences, FIG. 234*a*, for the first transfer cycle "TCYC:1(1)" is the stepwise display of the transfer sequences "TSEQ1", "TSEQ2", to "TSEQ6". For this the button "TSEQ:" in "Z6" is activated by clicking and is set to value "TSEQ:1(6) and the first "TSEQ" with "CNT1" is indicated in the receiver array. Then, by clicks on the button "+" in line "Z6" the transfers for "TSEQ:2(6)", "TSEQ:3(6)" to "TSEQ:6(6)" can be indicated step by step in the receiver/transmitter array. By clicks on the button "–" in "Z6" the display of the transfers is produced in reverse direction. If for the TSEQ specification modifications or/and add-ons should be entered, then the button "TSEQ" besides "A1_1" in "Z6" is deactivated by click. With that again the specification mode with the last design step "DSTP:B2(2)", FIG. 233*u*, is displayed again. With activated button "TSEQ" besides "A1_1", FIG. 234*a*, acknowledgement by "OK" in "Z6" switches the display to "CYCLE-ARRAY-SURVEY", FIG. 234*b*, in which automatically in column "TSEQ" in the lines "Z5*a*" and "Z6*a*" the number of specified transfer sequences was entered as "TSEQ=6", and in which the terminated TSEQ specification is characterized by the activated buttons "SPEC" in "Z1" and "TSEQ" in "Z3". If again should be switched into the RTI-OP-BS to TSEQ specification mode, FIG. 233*u*, clicking the button "SPEC" in "Z1", FIG. 234*b*, does it.

By clicking the button "OK" in "Z1", FIG. 234*b*, the button "TSEQ" in "Z3" is deactivated and automatically the display is prepared for a specification of the cycle end "END", as FIG. 234*c* shows. Hereby the button "SPEC" in "Z1" is active and in line "Z4" the button "END" is activated. Furthermore the line "Z5*b*" is generated automatically, in column "END" the specification title "END" is entered and the buttons "TSEQ" and "TCYC" in "Z5*b*" are marked and prepared for a specification entry.

In FIG. 234*d*, for example, the cycle end with "TSEQ=6" and "TCYC=10" was entered. By acknowledging with "OK" in "Z1" the button "SPEC" in "Z1" and the button in line "Z4" in column "END" are deactivated and the entries for cycle end in "Z5*b*" are unmarked and valid, as FIG. 234*e* shows.

If before cycle end a stop cycle "STOP" should be specified, then in "Z4" the button "STOP" and in "Z1" the button "SPEC" is activated by clicking, as shown in FIG. 234*f*. Hereby the line "Z5*c*" is generated automatically, in column "STOP" the specification title "ST1" for the first stop is entered and the buttons in "Z5*c*" in columns "TSEQ" and "TCYC" are marked and prepared for a specification entry. The stop entries are automatically numbered and begin with "ST1".

In FIG. 234*g* for "STOP" the specification values in "Z5*c*" with "TSEQ=4" and "TCYCO5" were entered manually. By acknowledgment with "OK" in "Z1" the button in "Z4" in column "STOP" is deactivated, the specification entries for "ST1" in Z5*c*" are unmarked and valid, and the specification for continuing the cycle is prepared by "GO1" automatically, FIG. 234*h*. Thereby in "Z4" the button "GO" is activated, the line "Z5*d*" generated, in column "GO" the specification title "GO1" entered and the button in "Z5*d*" in column "TSEQ" marked and prepared for a specification entry. The numbering for "STOP" and for the following "GO" is processed identically, in the example this is "ST1" and "GO1".

In FIG. 234*i* for "GO1" the specification value was entered manually in "Z5d" as "TSEQ=8". By acknowledgement with "OK" in "Z1" the button "SPEC" in "Z1" and the button in "Z4" in column "GO" are deactivated and the specification entry for "GO1" in "Z5*d*" became unmarked and valid, as FIG. 234*k* shows. The GO1 entry with "TSEQ=8" corresponds to the eight (8) consecutive transfer sequences with exclusively memorizing elements. Transfer sequences between memorizing elements and combinatory elements or between combinatory elements among each other, are not considered. In FIG. 234*k* the entry of a "STOP" and "GO" was realized. The additional generation of "ST2" and "GO2" and further STOPs and GOs is effectuated as described for "ST1" and "GO1", thereby the needed Z5 lines are generated automatically. If values for "END" or "STOP" or "GO" should be modified, then in the column "TSEQ" or/and "TCYC" in which the modification should occur, the button is marked by clicking, and the new value is entered and acknowledged by "OK" in "Z1". If a STOP or GO line should be deleted, then in column "STOP" the button of the ST entry to delete, is marked by clicking and the line is deleted by a following click on the button "DELETE" in "Z2". Thereby the corresponding GO line is deleted automatically, too. If there are more than one STOP and GO lines, the numbers are adapted automatically in continuous order.

In FIG. 234*l* the button "COMMENT" in "Z4" was activated by a click. Additionally in column "COMMENT" in "Z5*d*" the line was marked and an exemplary comment was entered. After acknowledgment of the entry with "OK" in "Z1" the comment is valid and the marking in "Z5*d*" is erased, as FIG. 234*m* shows.

The button "COMMENT" in "Z4" is deactivated by clicking and the comment in "Z5*d*" is switched off, as FIG. 234*n* shows. Clicking again the button "COMMENT" in "Z4" activates it and the comment is indicated in "Z5*d*" again. Thus comments can be entered in all Z5 lines. For a modification of a comment the button "COMMENT" in "Z4" is to be activated and additionally the Z5 line to be modified is to be marked by clicking on column "COMMENT".

In FIG. 234*o* the button transfer out "TOUT" in "Z3" was activated by a click for a specification of a data transfer from the cycle array "A1" outward. Clicking the button "SPEC" in "Z1" switches the display from "CYCLE-ARRAY-SURVEY" to "RTI-OP-BS", FIG. 234*p*, in which the specification task with the activated button "TOUT" in "Z6" is displayed. Thereby in "Z6" the display of the transfer sequence shows "TSEQ:1(6)" and is activated, and the display of the transfer cycle indicates "TCYC:1(10)" and is not activated. The buttons "TSEQ:" and "TCYC:" can alternatively be activated and deactivated by click. Correlated to the activated buttons are the adjacent buttons "–" and "+", with which "TSEQ" and "TCYC" can be counted down and up. Counting up or down of "TSEQ" increases or decreases the "TCYC" by one at the transfer points. The elements of the cycle array "A1" are indicated in column "A" by marked buttons and are sorted in the element array from up to down in the order of their transfer sequence numbers, beginning with "CNT1" for "TSEQ1", "RAM1" for "TSEQ2" until the end of the cycle array "A1" with "REG4" for "TSEQ6". For "TSEQ:1(6)" in "Z6" the TOUT transmitter "CNT1" is placed in the specification array. The receiver outside the cycle array "A1" is not selected yet, therefore the receiver line above the transmitter line in the specification array is still empty.

In FIG. 234*q* the transfer sequence was increased by one to "TSEQ:2(6)" in "Z6". With that the transmitter "RAM1", which represents the "TSEQ2", is automatically displayed in the specification array. In FIG. 234*r* the transfer sequence was incremented to "TSEQ6" and with this "REG4" was automatically brought as transmitter into the specification array. After activating the button "TCYC:" in "Z6" the transfer cycle was automatically incremented to "TCYC:10 (10)", as FIG. 234*s* shows. Thereby the values in column "CYC_SQ" and "ESTA" were automatically adapted. For the transfer from "REG4" of the cycle array to the exterior, "REG5" was transferred as receiver into the cycle array, as FIG. 234*t* shows.

In FIG. 234*u* in the specification array the transmitter "REG4" was allocated to the receiver "REG5" and acknowledged in FIG. 234*v*. FIG. 234*w* shows the receiver "REG5" in the receiver array and the transmitter "REG4" in the transmitter array after the transfer out of the specification array. Thereby the transmitter "REG4" remains additionally in the specification array, corresponding to "TSEQ:6(6)" in "Z6" and can be allocated, for example, to an other receiver outside of the cycle array "A1". In a TOUT specification any number of data transfers for one or several TSEQ values and TCYC values from the cycle array outward can be specified. For a quick, stepwise display of the transfers by clicking the button "SPEC" in "Z5" this button is switched to "SHOW". With this automatically the first transfer or the first transfers of the lowest TCYC and TSEQ value are displayed in the receiver/transmitter array. Thereby in line "Z6" the according TCYC and TSEQ values are shown, the button "TSEQ:" is active, the button "TCYC:" is deactivated. By clicking the button "+" in "Z6" the TCYC/TSEQ values in "Z6" are increased for the next following transfer or the next following transfers and the transfer or the transfers are displayed in the receiver/transmitter array. By a next click on the button "+" in "Z6" the next transfer or the next transfers etc. are displayed. By clicking the button "–" in "Z6" the transfers can be indicated in reverse order. By clicking the button "OK" in "Z6", FIG. 234*w*, the display changes to "CYCLE-ARRAY-SURVEY", in which the buttons "SPEC" in "Z1" and "TOUT" in "Z3" are activated, as FIG. 234*x* shows.

After clicking the button "OK" in "Z1" the buttons "SPEC" and "TOUT" are deactivated, as shown in FIG. 234*y*. If add-ons or/and modifications should be effectuated in the TOUT specification, then again the "CYCLE-ARRAY-SURVEY" is changed to "RTI-OP-BS" by clicks on the buttons "TOUT" in "Z3" and "SPEC" in "Z1". In the present example the "RTI-OP-BS" would then be illustrated in FIG. 234*w*.

Description to FIG. 235*a*-235*k*

Figure 235A:
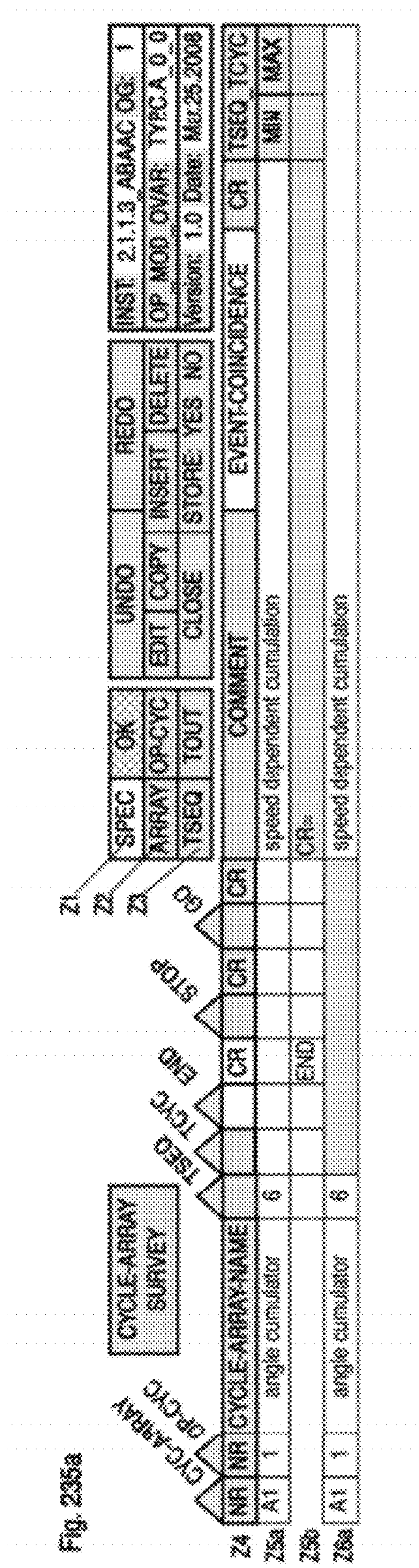

In the preceding transfer end "END", "STOP" and "GO" of the cycle array "A1" were specified by absolute values for "TSEQ" and "TCYC". Alternatively "END", "STOP" and "GO" can be specified by criteria "CR". With termination of the specifying of "TSEQ" automatically the specifying of "END" by absolute values of "TSEQ" and "TCYC" is prepared, as shown in FIG. 234*c*. If "END" should be specified by criteria "CR", then in line "Z4" the button "CR" of "END" is activated by a click. With this in "Z4" the button "EVENT-COINCIDENCE" is activated, in "Z5*b*" the buttons in the columns "TSEQ", "CYC" are unmarked and the entry "END" is moved from column "END" to column "CR" of "END", as FIG. 235*a* shows. Furthermore in "Z5*b*" in column "EVENT-COINCIDENCE" the button is marked and "CR=" is inserted, and the buttons in the columns "MIN" and "MAX" are marked. By double clicking the button "CR", besides of "EVENT-COINCIDENCE" in line "Z4", a CR display window is opened. In the CR display window, not illustrated, a criterion "CR" for cycle end "END" is defined, which, as is known, consists of adequate event coincidences "EVENT-COINCIDENCE". As already described in FIG. 233*e* and FIG. 233*f* the CR specification for a cycle array, in the example for "A1", is made in the CR-maintenance-group2. In the CR display window, not illustrated, during a specification of CR event coincidences for a cycle array, additionally minimum values and maximum values are defined for "TSEQ_TCYC".

Figure 235B:
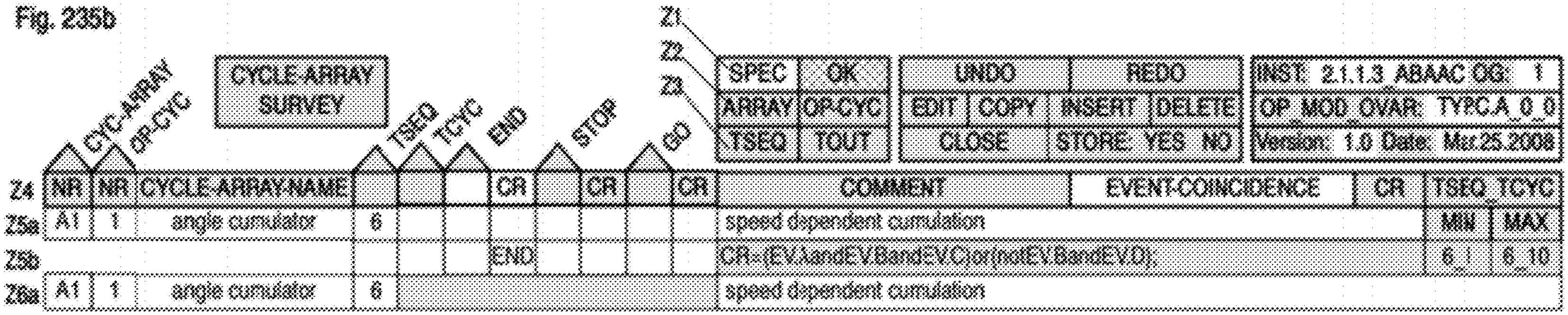
Figure 235C:
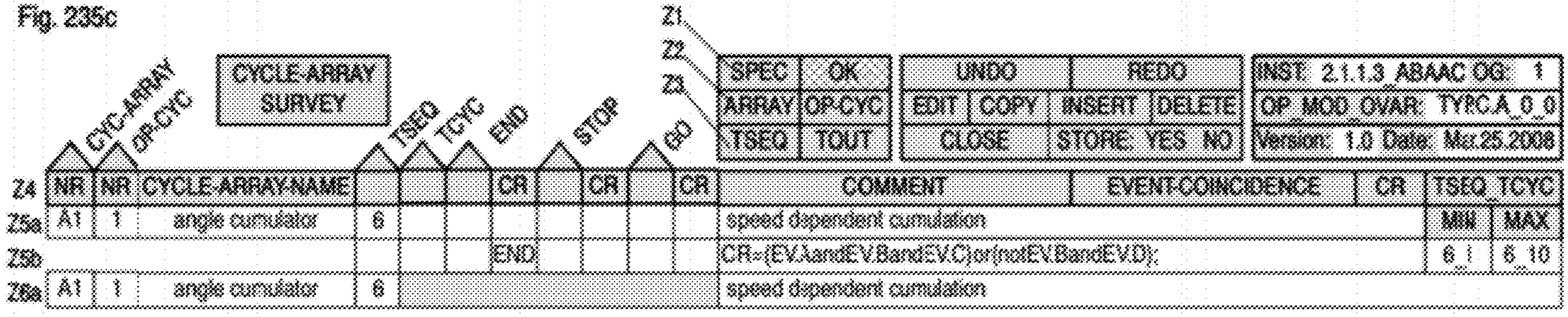

After acknowledgement of the CR event coincidences and of the minimum/maximum values for "TSEQ_TCYC" by closing the CR display window it is changed to "RTI-OP-BS", as FIG. 235*b* shows. Herein in line "Z5*b*" an exemplary criterion "CR" for the cycle end with the event coincidences "(Event.A and Event.B and Event.C) or (not-Event.B and event.D)" is specified and the limits for "TSE- Q_TCYC" are defined with "MIN=6_1" and "MAX=6_10". If modifications or/and add-ons should be processed, then again the button "CR" besides "EVENT-COINCIDENCE" in line "Z4" is double clicked and with that a change occurs to the CR display window. By clicking the button "OK" in "Z1", FIG. 235*b*, the specification of cycle end is acknowledged, the buttons "SPEC" in "Z1", "END" with "CR" and "EVENT-COINCIDENCE" in "Z4" are deactivated and in "Z5*b*" the buttons in the columns "EVENT-COINCIDENCE", "MIN" and "MAX" are unmarked, as FIG. 235*c* shows.

Figure 235D:
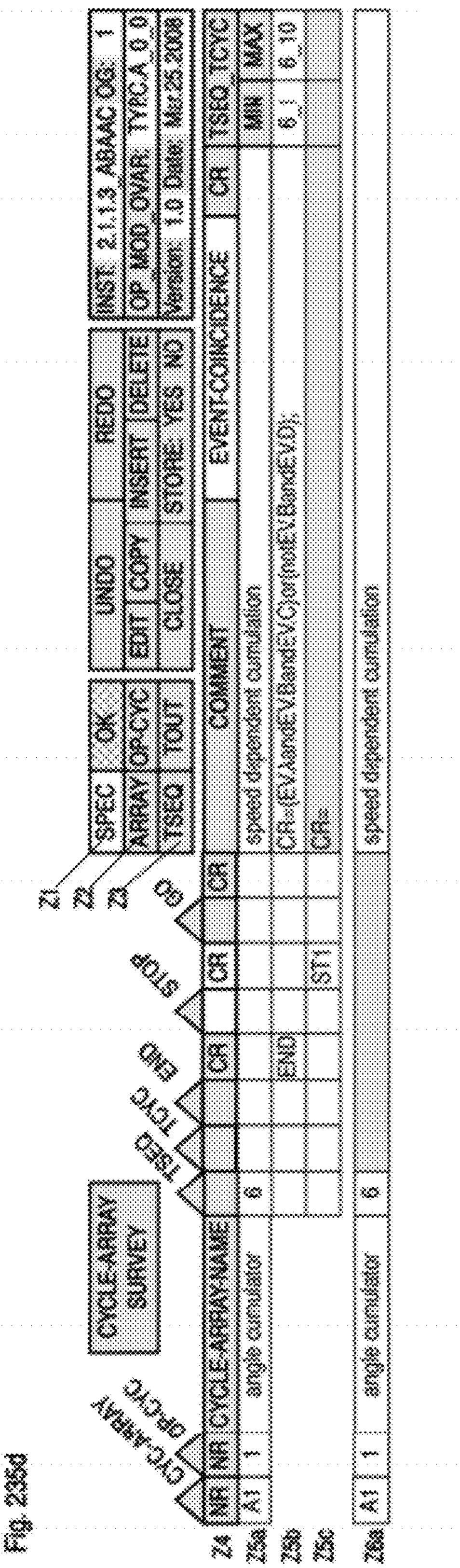

The preparation for the specifying of a first transfer stop "STOP" by a criterion "CR" shows FIG. 235*d*. Thereby by clicking on the buttons "CR" of "STOP" in "Z4" and "SPEC" in "Z1" these buttons are activated and automatically the buttons in "Z4" for "STOP" and "EVENT-COINCIDENCE" are activated, too. Furthermore the line "Z5*c*" is generated and in this line, in column "CR" of "STOP" automatically stop1 "ST1" and "CR=" are entered in the column "EVENT-COINCIDENCE" on a marked background and the buttons in the columns "MIN" and "MAX" are marked. By double clicking the button "CR" besides "EVENT-COINCIDENCE", in line "Z4" the CR display window is opened and for the stop "ST1", a criterion "CR" with MIN/MAX values for "TSEQ_TCYC" can be specified, and can be entered in the "CYCLE-ARRAY-SURVEY" and can be acknowledged.

Figure 235E:
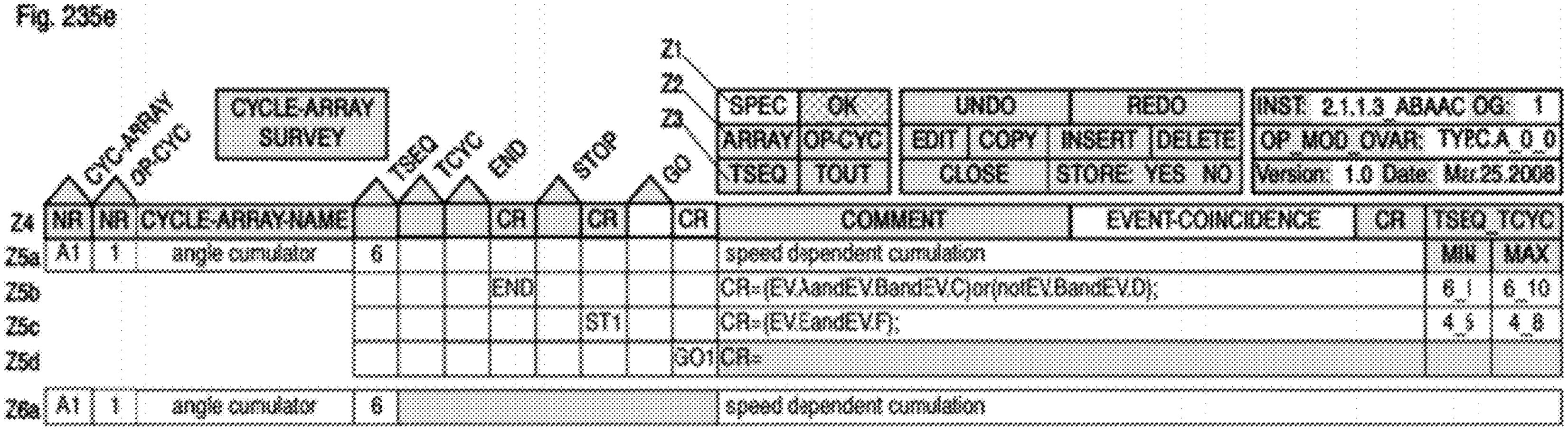

In FIG. 235*e* the preparation for the specification of a first transfer GO "GO1" by a criterion "CR" was illustrated. The preparation is identical to that of stop "ST1", with the exception, that in line "Z4" instead of the button "CR" of "STOP" the button "CR" of "GO" is activated and that line "Z5*d*" is generated. If during the preparation for the specification of transfer STOP or transfer GO by a criterion "CR", absolute values for "TSEQ" and "TCYC" are already entered, then these are automatically erased, as illustrated and described above with transfer END. For stop "ST1", FIG. 235*e*, in line "Z5*c*" an exemplary event coincidence for "CR", and for "TSEQ_TCYC" exemplary MIN/MAX values are entered and acknowledged.

Figure 235F:
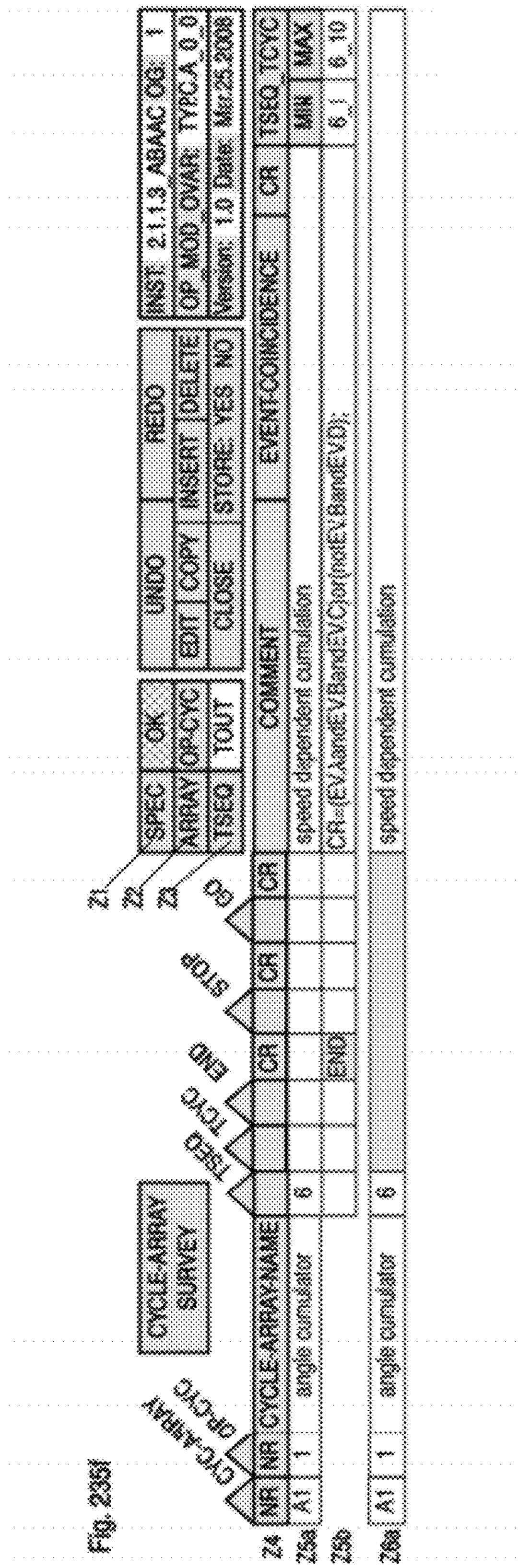
Figure 235G:
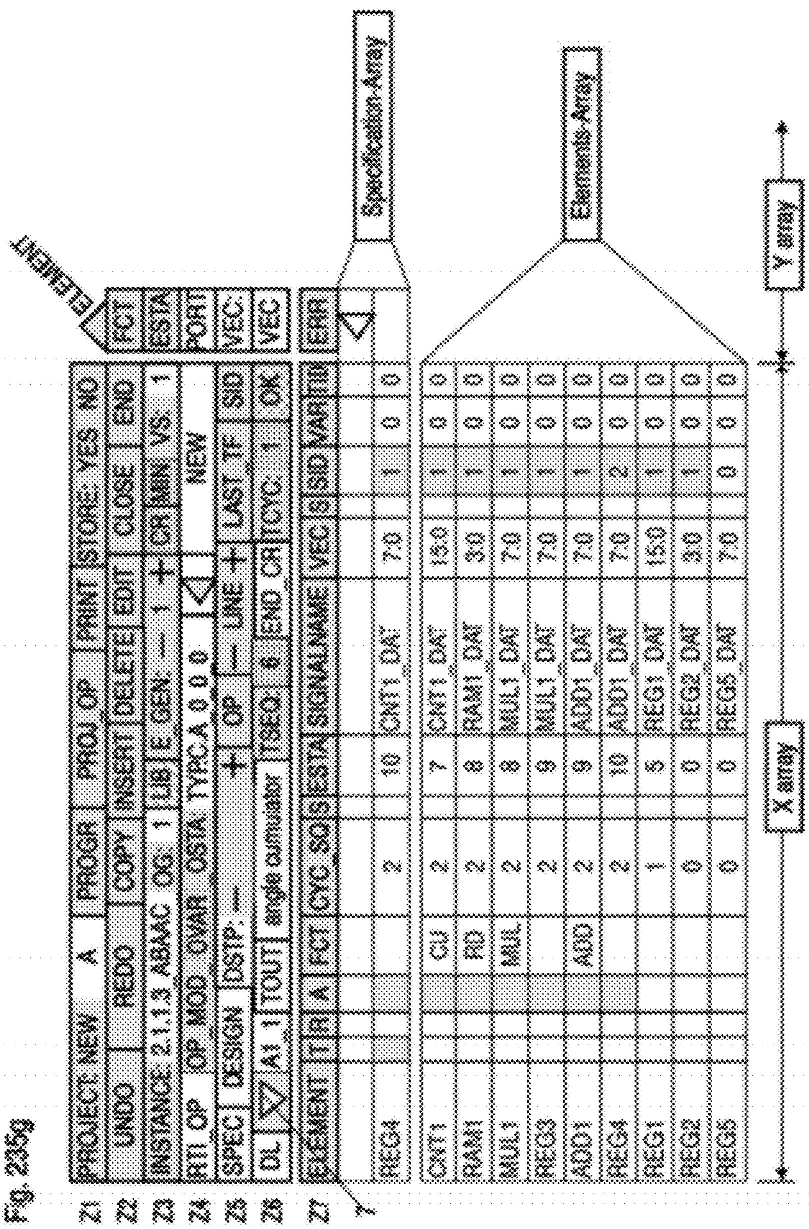

In FIG. 235*f* the specification "TOUT" for the transfer END is prepared. Thereby the buttons "TOUT" in "Z3" and "END" in "Z5*b*" are activated by clicks. Clicking the button "SPEC" in "Z1" changes the display to RTI-OP-BS, as FIG. 235*g* shows. Therein the buttons in "Z3" for "CR" with "MIN" are indicated on an exemplary chequered background, and in "Z6" with "TOUT", "END_CR" and the minimum values "TSEQ=6", "TCYC=1" are also indicated on an exemplary chequered background. With "TSEQ:6" the transmitter "REG4" is automatically entered in the specification array. "END_CR" means, that the transfer cycle end was specified by a criterion "CR". The values in the columns "CYC_SQ" and "ESTA" correspond to the minimum values of "TSEQ_TCYC=6_1" of FIG. 235*f*.

Figure 235H:
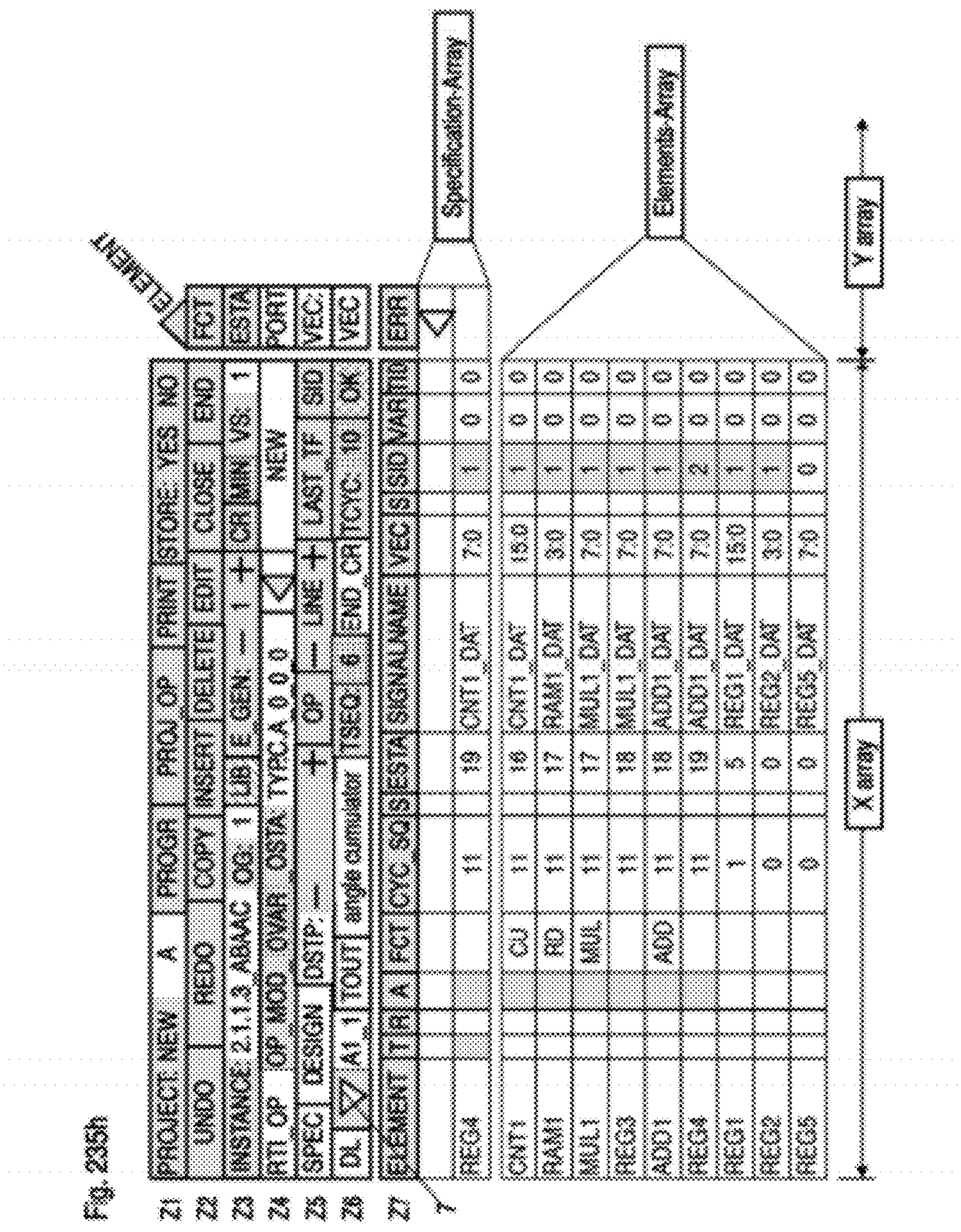

Clicking the button "MIN" in "Z3" switches to "MAX", for example, on a hatched background and for "TSEQ:" and "TCYC:" the maximum values are indicated in "Z6", for example, on a hatched background, as shown in FIG. 235*h*. The values in the columns "CYC_SQ" and "ESTA" correspond to the maximum values of "TSEQ_TCYC=6_10" in FIG. 235*f*.

Figure 235I:
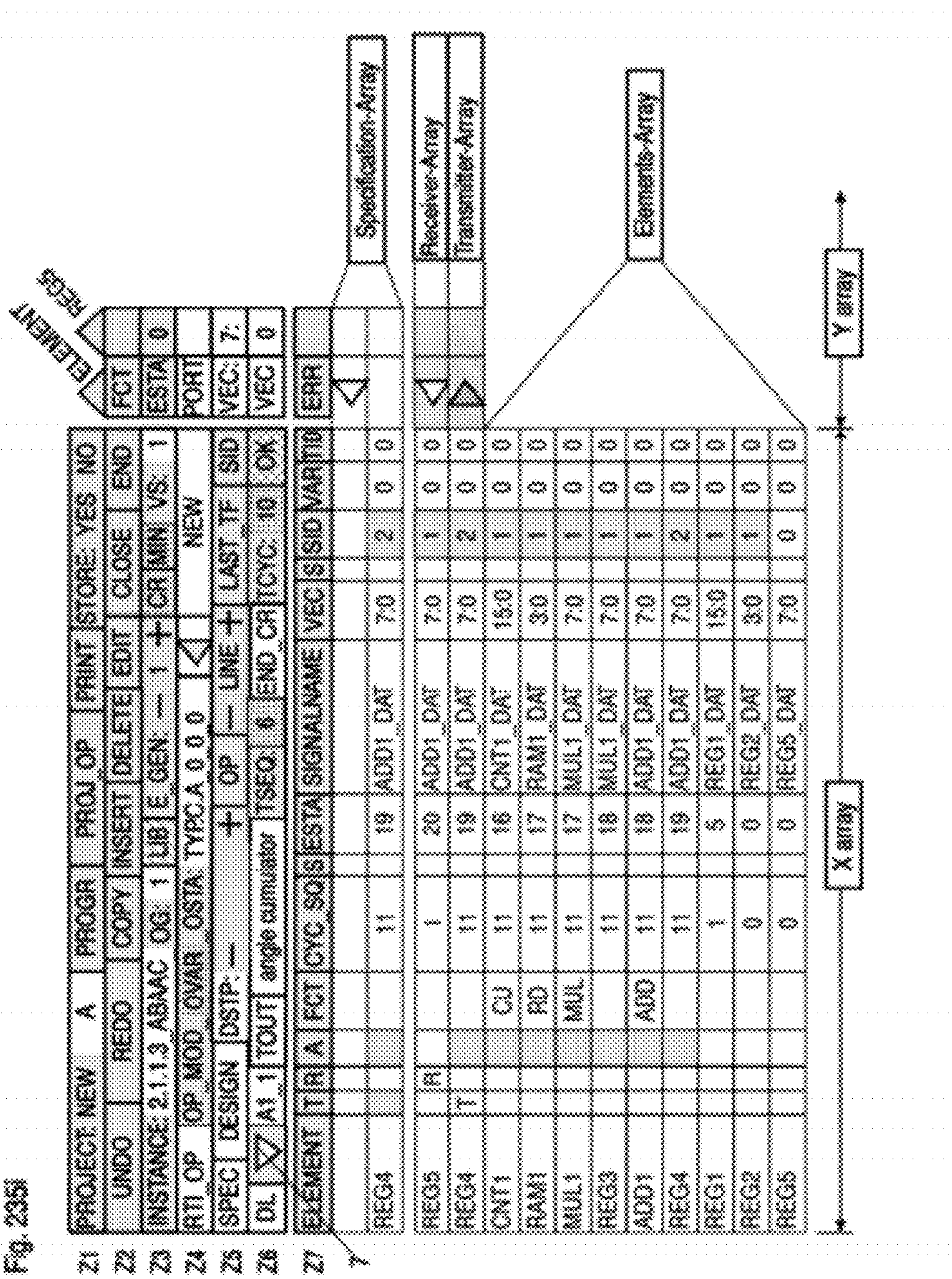
Figure 235K:
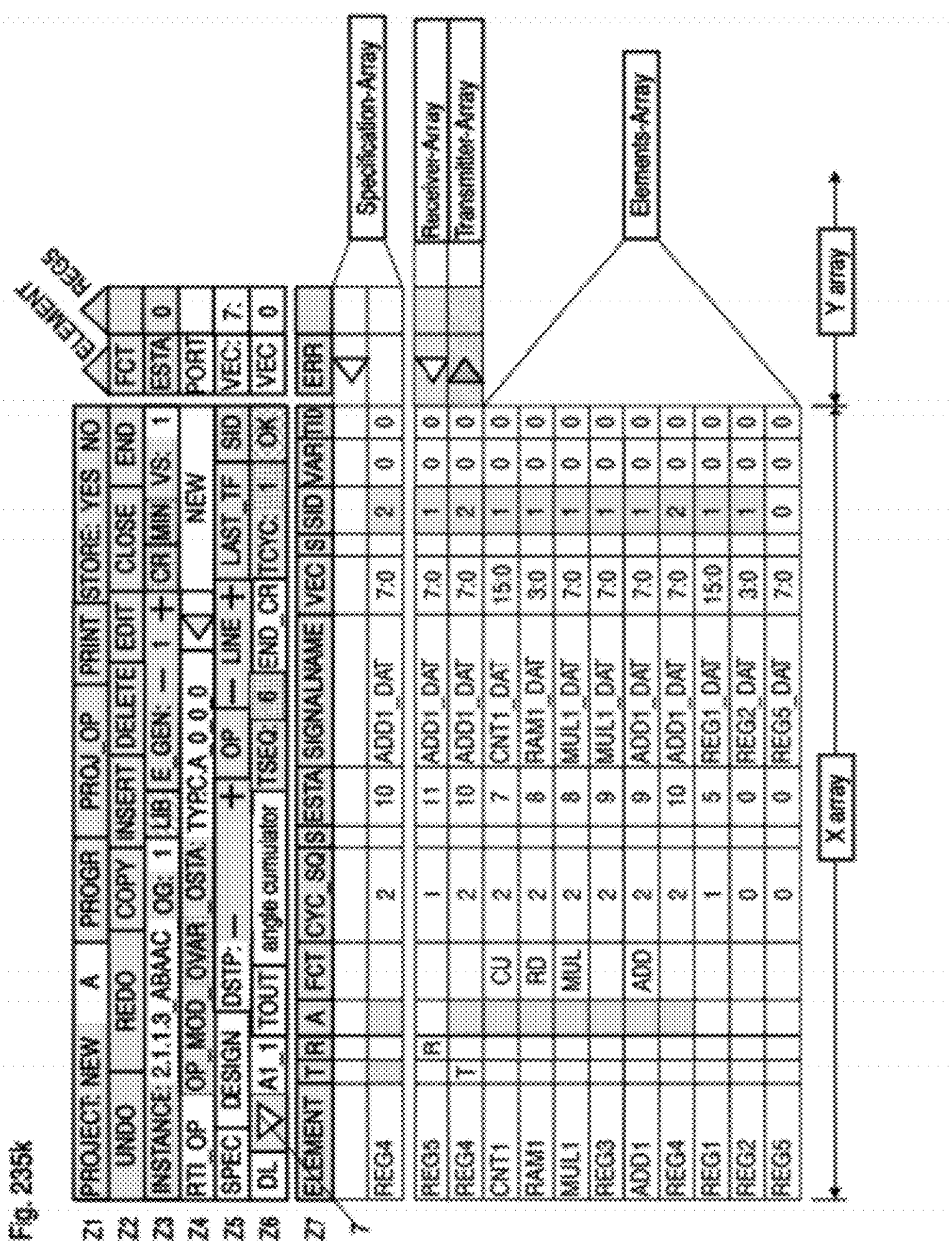

In FIG. 235*i* the status of the TOUT specification after allocation of REG4 data to REG5, acknowledgement and transfer are displayed in the receiver and transmitter array. Clicking the button "MAX" in "Z3", FIG. 235*i*, switched to "MIN", as FIG. 235*k* shows. Thus in "Z6" the TSEQ/TCYC minimum values and the status of the TOUT specification after allocation of REG4 data to REG5, acknowledgment and transfer to the receiver/transmitter array are displayed. If for TSEQ-MIN and TSEQ-MAX different values are specified, then corresponding, different transmitters result in the TOUT specification for TSEQ-MIN and TSEQ-MAX. If for a transfer STOP, for example for "ST1" a TOUT specification should be processed, then in the "CYCLE-ARRAY-SURVEY" the buttons "TOUT" in "Z3" and "ST1" in "Z5*c*", FIG. 235*e*, are activated and by clicking in the button "SPEC" in "Z1" it is switched to RTI-OP-BS. There in line "Z6" the buttons "TOUT" and stop "ST1_CR" for the specification are activated; for "TSEQ:" and "TCYC:" minimum values are indicated.

Description to FIG. 236*a*-236*k*

Figure 236A:
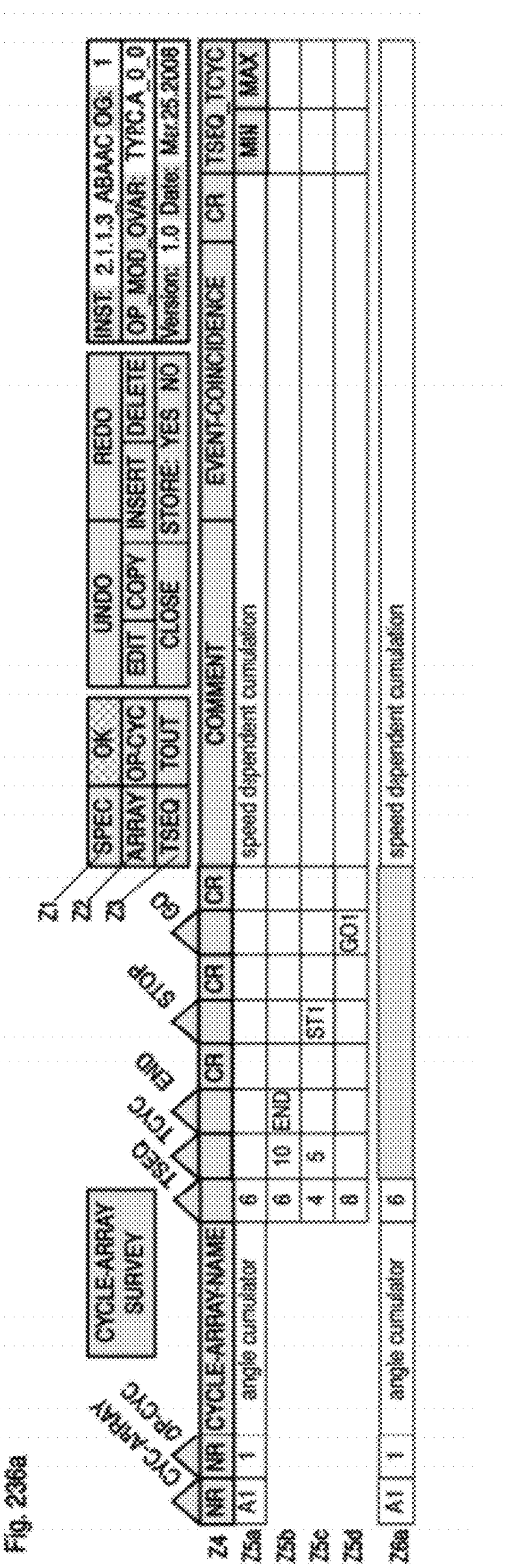

Subsequently the cycle array "A1" is extended in the CYCLE-ARRAY-SURVEY, based on the illustration in FIG. 236*a*, by an operation cycle "OP-CYC" and additionally a new cycle array "CYC-ARRAY" is added. For the extension of a cycle array by one operation cycle the button "OP-CYC" in line "Z2" is activated by a click and then the cycle array is selected, for which the operation cycle should be extended. The selection of the cycle array occurs below the specification array, in the register array, which begins with line "Z6*a"*.

Figure 236B:
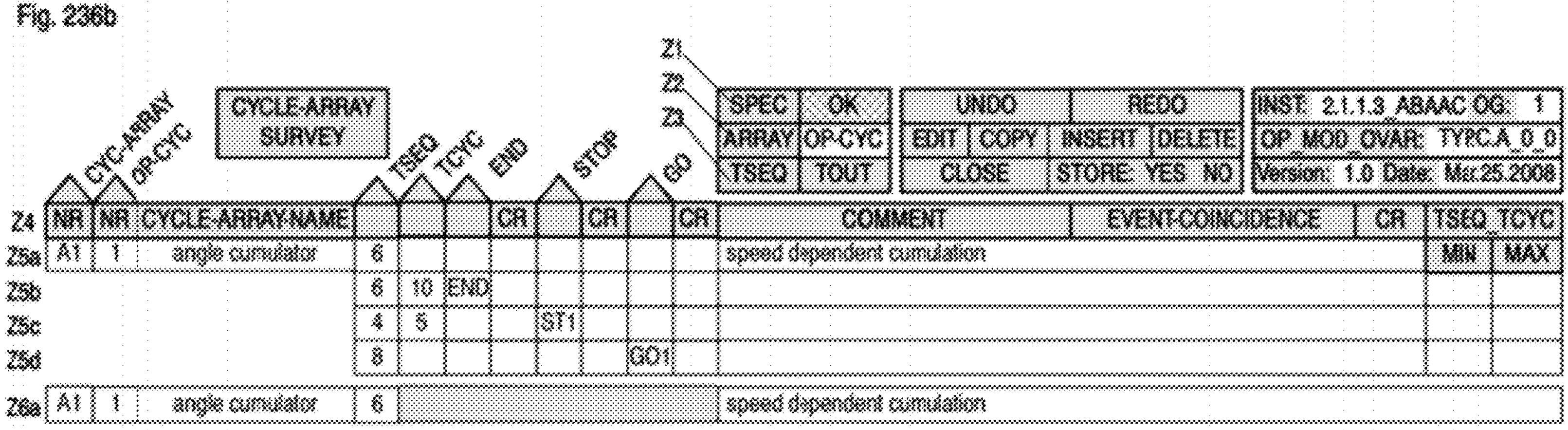
Figure 236C:
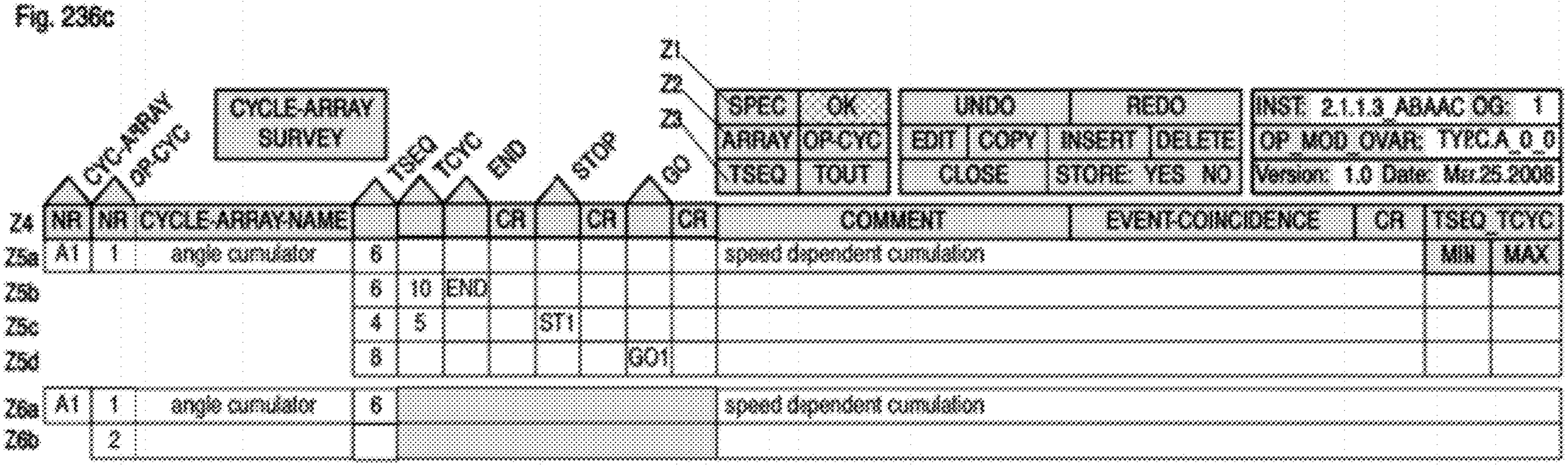
Figure 236D:
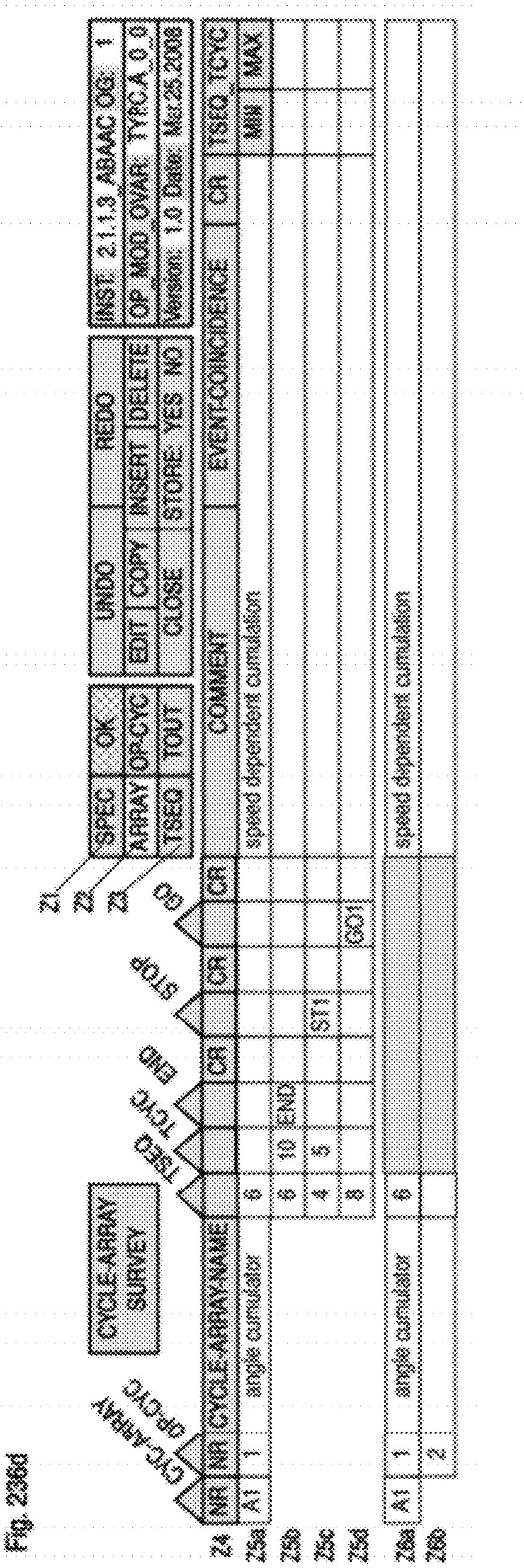

In the example the line "Z6*a*" is selected by a click on any position of this line and with that the column "CYC-ARRAY" is activated and marked, as shown in FIG. 236*b*. Clicking the button "OK" in "Z1" generates the line "Z6*b*" for "OP-CYC=2" and deactivates the buttons "OP-CYC" in "Z2" and "A1" in "Z6*a*", as shown in FIG. 236*c*. For the generation of a new cycle array the button "ARRAY" in "Z2" is activated by a click, FIG. 236*d*, and acknowledged by a following click on button "OK" in "Z1".

Figure 236E:
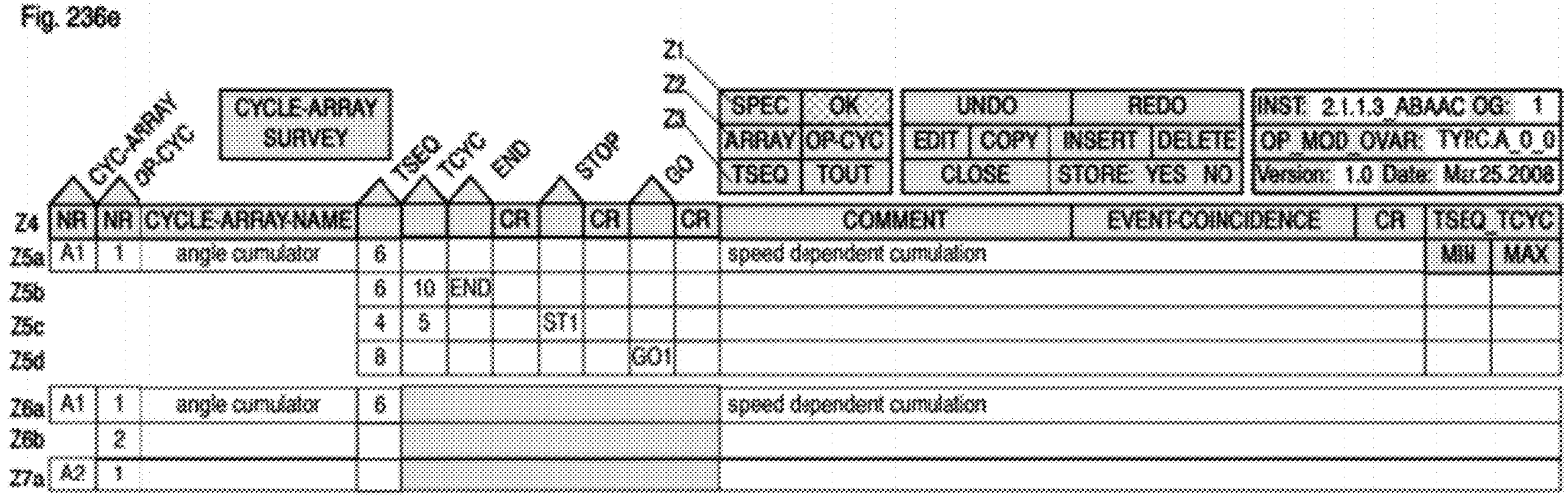
Figure 236F:
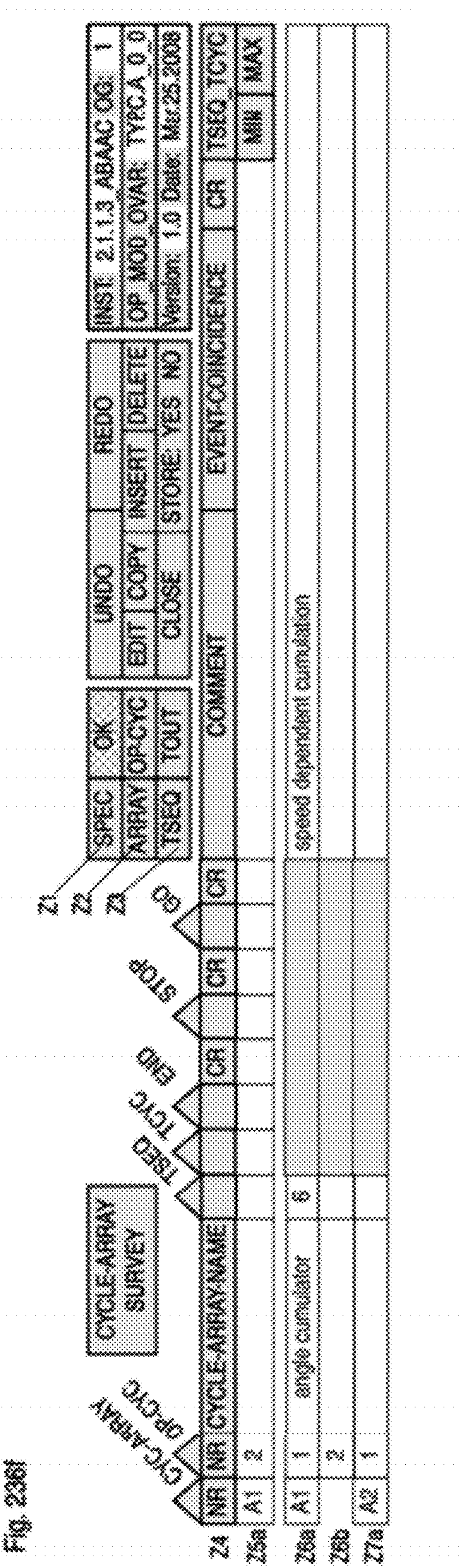

The new cycle array "A2" with line "Z7*a*" is illustrated in FIG. 236*e*, the button "ARRAY" in "Z2" was deactivated by the acknowledgement. If in the specification array, lines "Z5", a new operation cycle or/and a new cycle array should be entered, then the transfer occurs by selecting the corresponding line in the register array and by double clicking on the selected line, for example, in the marked array. In the example, FIG. 236*f*, the line "Z6*b*", "OP-CYC=2" of "A1", was transferred to the specification array "Z5*a*" by a double click.

Figure 236G:
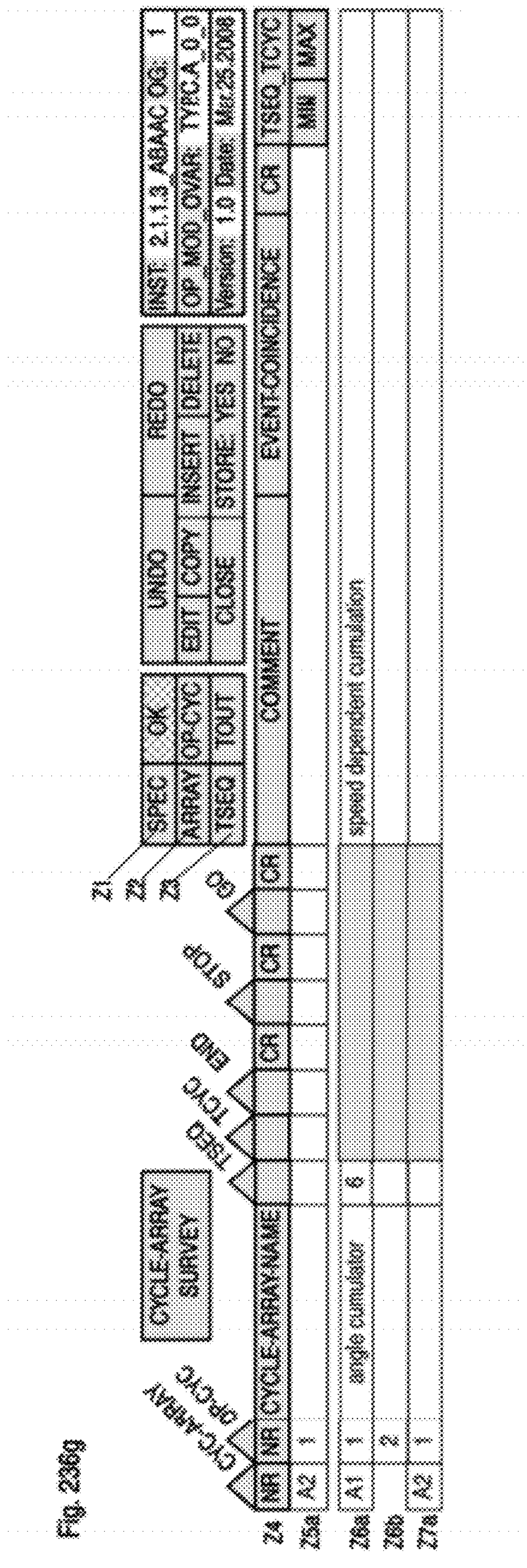
Figure 236H:
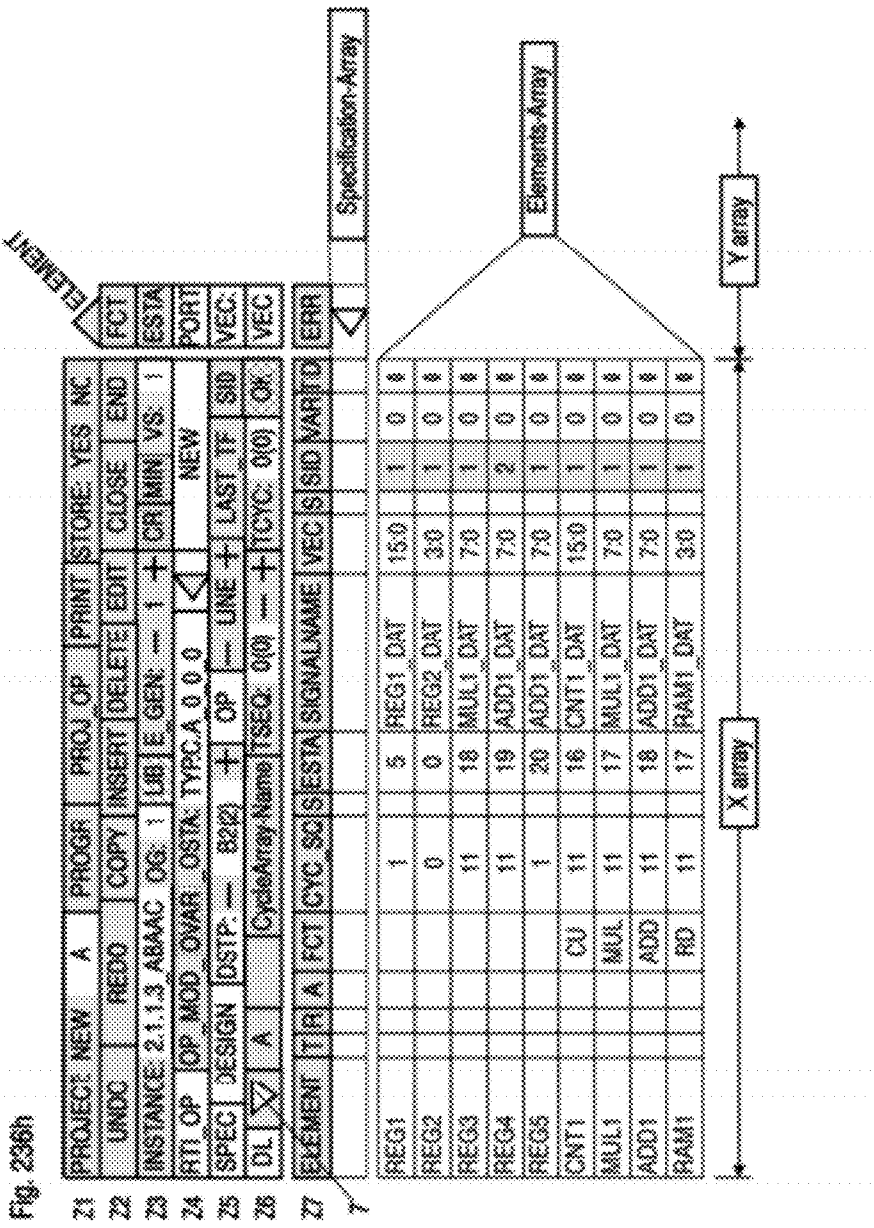

In FIG. 236*g* the line "Z7*a*" of the register array, with "CYC-ARRAY=A2" and "OP-CYC=1", was transferred to the specification array, "Z5*a*", by a double click. After termination of the specification with the display "CYCLE-ARRAY-SURVEY" by clicking the button "CLOSE" in line "Z3" the display "CYCLE-ARRAY-SURVEY" is closed and it is switched to "RTI-OP-BS" as shown in FIG. 236*h*. Before closing the display "CYCLE-ARRAY-SURVEY" it is checked, if all program inputs were terminated with "STORE", and if not so, the button "STORE:YES/NO" is activated or highlighted and the display "CYCLE-ARRAY-SURVEY" is closed by clicking the button STORE "YES" or "NO". In the RTI-OP-BS, FIG. 236*h*, in line "Z5" the latest status of the specification of the RTI-general-array before the specification of the cycle array "A1" is displayed with "DSTP:B2(2)", thereby the button "OP" in "Z5" is active. In line "Z6" all buttons for the specification of a cycle array are switched to passive. The values in the columns "CYC_SQ" and "ESTA" correspond to the values of the specification of the RTI-general-display plus the values of the specification of the cycle array "A1". Thereby for the cycle array "A1" a cycle end was supposed with absolute values for "TSEQ=6" and "TCYC=10".

Figure 236I:
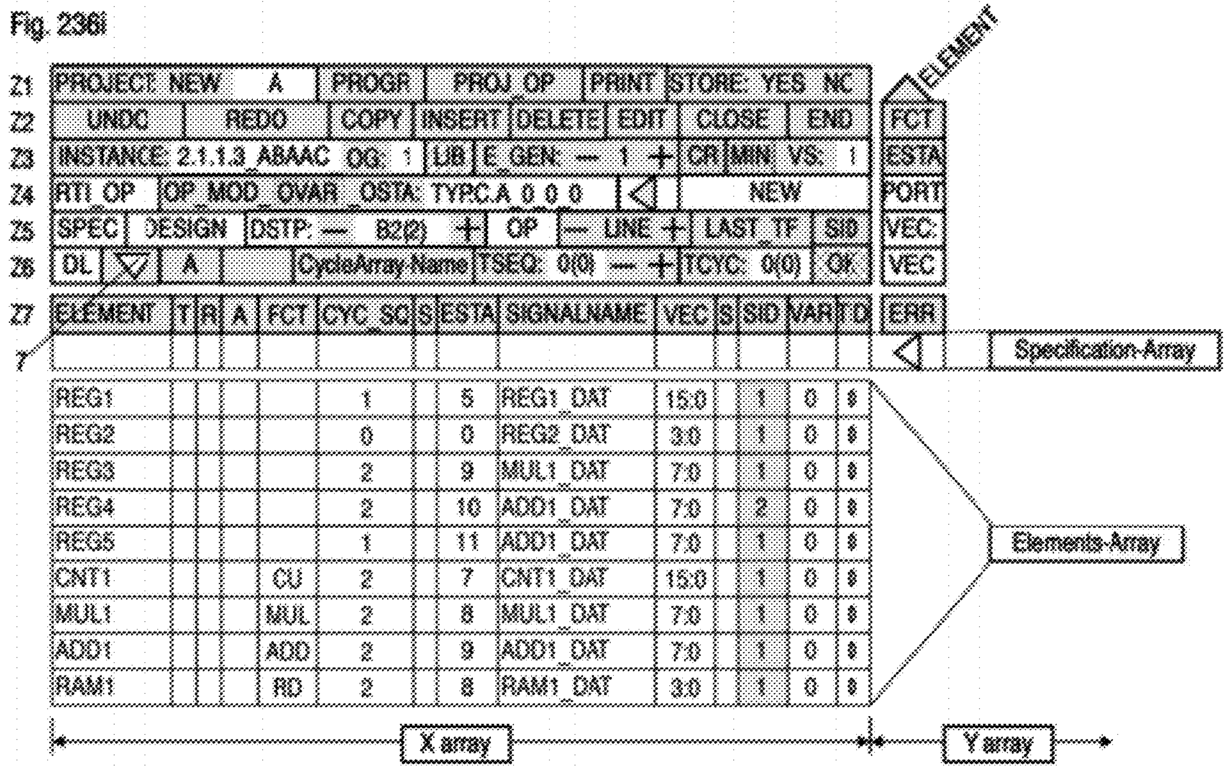
Figure 236K:
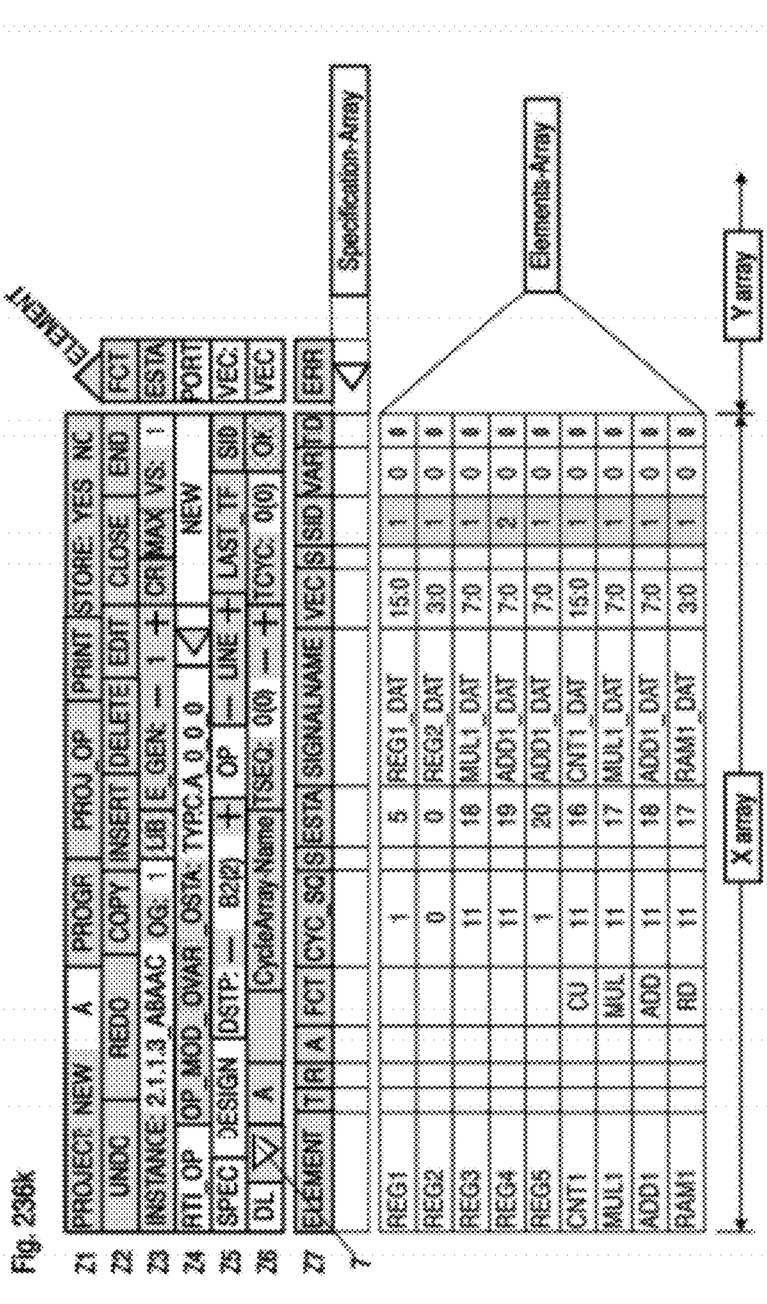

If for "A1" the cycle end was specified by a criterion "CR", as indicated in FIG. 235*c* with "TSEQ_TCYC" minimum value "6_1" and maximum value "6_10", then in RTI-OP-BS, FIG. 236*i*, in the columns "CYC_SQ" and "ESTA" the minimum values for "TSEQ_TCYC=6_1" are displayed. By clicking the button CR "MIN" in line "Z3" the button is switched to "MAX", corresponding to "TSEQ_TCYC=6_10" in FIG. 235*c*, and the maximum values in the columns "CYC_SQ" and "ESTA" are displayed, as shown in FIG. 236*k*. The MIN/MAX values for counter sequences, which arise during an RTI operation specification with criteria "CR" in the general array "CR-maintenance-group1", or MIN/MAX values for "CYC_SQ" of cycle arrays in "CR-maintenance-group2", in SPV are automatically added up and allocated in RTI-OP-BS to the elements in the columns "CYC_SQ" and "ESTA". The switching of MIN/MAX values occurs in line "Z3" from MAX to MIN by a click on button "MAX" beside "CR", FIG. 236*k*, and with the next click from MIN to MAX, etc.

Description to FIG. 237*a*-237*d*:

In the previous description the RTI operation specification in SPV was explained with examples as for instance with the RTI base operation "OP_MOD_OVAR:TYP.C.A_0_0". The specification version number in line "Z3" was "VS:1" as FIG. 237*a* shows.

In the following the functional features of the RTI-OP-BS for a modification of an existing specification of an RTI base operation are described. A modification of an RTI-base-operation-specification can only be executed in mode "SPEC", "DESIGN" in "Z5". As explained above, for each "DSTP" all "DVSTPs" are displayed in the receiver/transmitter array, and the "DSTP" can be selected as "E0( )", "E1( )", "E2( )", etc. in a rising or falling order.

If at a receiver in one "DVSTP" one or more transmitters should be changed, this is named modification model "MODIF-MOD1", then by clicking on the button in the line of the selected receiver in column "R", the receiver is transferred from the receiver array to the specification array. Thereby the corresponding transmitters are automatically transferred from the transmitter array to the specification array. The criterion for a DVSTP modification is the transfer of a DVSTP from the receiver/transmitter array to the specification array. In the specification array receiver and transmitter are in the status previous to a DVSTP acknowledgment, i.e. the element buttons in the columns "R" and "T" are marked, but without entry of "R" or "T". In the specification array the transmitters, which are to be replaced by new transmitters, are omitted. This occurs by clicking the buttons of the concerned transmitter lines in column "T". Then the selection and the transfer of the new transmitters to the specification array, follows as is known, from the element array or/and receiver array. After acknowledgment of the modified "DVSTP" in the specification array by clicking the button in the receiver line in column "R", the transfer of the receiver to the receiver array or, respectively the transfer of the transmitter to the transmitter array, is effectuated by clicking the button of the receiver in column "ELEMENT". Thereafter the SPV executes automatically for the "DVSTP", being modified, in its "DSTP" and the following "DSTPs" an ESTA checking/correcting, which is indicated by blinking of the display area "VS:" in "Z3". Thereby also possible adaptations of dynamic signal names are processed. During the time of automatic corrections in SPV the display area "VS:" is blinking, manual working steps cannot be processed during this time. After termination of the ESTA checking/correcting or possible adaptations of dynamic signal names "VS:" switches again to constant display. If at a receiver with more than one input port a new dynamic signal name is to be generated, then the old dynamic signal name or the static signal name as dynamic signal name can be automatically inserted during the ESTA checking/correcting, dependent on an SPV system adjustment.

In case that one or more manual entries of dynamic names are needed, then after termination of the ESTA checking/correcting automatically the preparation for the first manual entry of a dynamic signal name is performed. For this the RTI-OP-BS switches automatically in line "Z3" from version "VS" to correction "COR", as illustrated in FIG. 237*b*, and indicates the number of the requested manual corrections of dynamic signal names. In the example three corrections of signal names were supposed. The preparation for a manual entry of a dynamic signal name was explained in context of the RTI operation specification. After the manual entry of the first dynamic signal name and acknowledgment by "OK", automatically the next (in transfer direction) manual correction of a dynamic signal name is prepared. This can be still in the "DSTP" of the first modification or in a following "DSTP". After every executed and by "OK" acknowledged manual correction of a dynamic signal name, the number of corrections is decreased by one. When in a "DSTP" the last correction of a dynamic signal name was acknowledged by "OK", then automatically the display in "Z3" switches from "COR:1" to "VS:1". During the process of modification of a DVSTP no new modification of a DVSTP can be started.

In the previously described modification new transmitters replaced the old transmitters at a receiver.

In a further modification mode "MODIF-MOD2" in a "DVSTP" the receiver is replaced, the transmitters for example are not changed. For example an adder "ADD1" is replaced by a multiplier "MUL1". For the procedure of modification "ADD1" with its transmitters is transferred to the specification array and "ADD1" is eliminated of the specification array by clicking on column "ELEMENT". After that the receiver "MUL1" is transferred from the element array to the specification array, the DVSTP is acknowledged by clicking in the button of the MUL1 line on column "R" and "MUL1" is transferred with its transmitters by clicking in the button of the MUL1 line on column "ELEMENT" from the specification array to the receiver array and the transmitter array. With this modification mode also new transmitters can be allocated to the new receiver. The adaptation of the dynamic signal names for the new receiver "MUL1" and, respectively, the dynamic signal names of the receivers in the following transfer path as well as the ESTA checking/correcting are processed in "MODIF-MOD2" identically to "MODIF-MOD1".

With a further modification mode "MODIF-MOD3" in a "DVSTP" the receiver is eliminated without substitution. With this also the transmitters connected to this receiver are omitted. The elimination of the receiver is prepared by a double click in the receiver array on its coordinate field in the Y array in which a "?" is set. By double clicking again on the coordinate field this step is withdrawn and the "?" is deleted again. Alternatively this step can be withdrawn by clicking the button "UNDO" in "Z2". With acknowledging of receiver elimination by "OK" in "Z6" in the X array the receiver line and the corresponding transmitter lines are deleted. The receiver column in the Y array is automatically deleted with that, when the receiver is not specified in another "DVSTP". If the receiver was also transmitter for receivers, which follow in transfer direction, for example for four receivers, in the same or/and the following "DSTPs", then the display changes automatically from "VS:1" to correction "COR:4" in "Z3". Furthermore the display is automatically switched to the "DSTP", in which the first DVSTP modification is to be executed. In this "DSTP" the "DVSTP", which is to be modified, is brought automatically into the specification array. At the position of the missing transmitter an empty line is placed, in which a transmitter selected of the element array or of the receiver array is transferred and which is allocated to the receiver. Afterwards the "DVSTP" with the added new transmitter is acknowledged in the specification array and transferred to the receiver/transmitter array. After acknowledging of the modification in "COR4" by "OK" in "Z6", the display of "COR: 4" in "Z3" changes to "COR:3" and the next "DVSTP" to be modified is automatically displayed in the specification array. The procedure of the modification of DVSTP in "COR3" is identical to that in "COR4". After acknowledging of "COR3" by "OK" in "Z6" the display changes from "COR:3" in "Z3" to "COR:2" and the next "DVSTP", which is to be modified is automatically displayed in the specification array. After modification of the last "DVSTP" and acknowledging by "OK" in "Z6" the display in "Z3" changes automatically from "COR:1" to "VS:1" and "VS" is blinking. Thereby SPV executes a checking/correcting of "ESTA" and of the dynamic signal names as described before under "MODIF-MOD1". After termination of the automatic checking and correcting the RTI-OP-BS switches to a constant display of "VS" in "Z3".

If manual modifications of dynamic signal names are necessary, then in "Z3" automatically the display is switched from version "VS" to correction "COR", and the number of needed manual corrections of dynamic signal names is entered, as described under "MODIF-MOD1". The procedure of manual modification of dynamic signal names in "MODIF-MOD3" is identical to "MODIF-MOD1".

As described before any "DVSTPs" in any "DSTPs" can be modified during the specification of an RTI base operation. Furthermore also new "DVSTPs" in any "DSTPs", or/and new "DSTPs" can be added.

The results of an RTI operation specification are stored, as described before, by clicking the button "STORE" in line "Z1". After termination of an RTI operation specification the state of the version "VS:" in "Z3" can be increased manually before storing the results, for example from "VS:1" to "VS:2". By storing the RTI operation specification the version of the specification "VS" in "Z3" is automatically entered in the RTI operation window, as FIG. 237*c* shows.

Until now the modification modes "MODIF-MOD1", "MODIF-MOD2" and "MODIF-MOD 3" for the specification of an RTI base operation were described. As explained in FIG. 65 and FIG. 98*a* to FIG. 98*h* an RTI base operation can be influenced or varied in its flow by error events or/and decision criteria. For each combination of distinct error events or/and distinct decision criteria an RTI-base-operation-variant different to the RTI base operation is generated by modification of the RTI base operation or of an RTI-base-operation-variant.

Subsequently the procedure for an exemplary generation of a first RTI-base-operation-variant is described. For this the RTI-base-operation-variant to be produced, for example "OP_MOD_OVAR:TYP.C.A_0_1", is entered in the RTI operation window and the RTI base operation "OP_MOD_OVAR:TYP.C.A_0_0" is allocated as reference operation "REF-OP", as FIG. 237*c* shows.

FIG. 237*d* shows after closing of the RTI operation window in line "Z4" the RTI-base-operation-variant to specify, which was taken of the RTI operation window, and the RTI base operation as reference. Furthermore the version "VS:1" was manually entered in "Z3".

For the specification of the RTI-base-operation-variant, which is in the beginning of the specification identical to the RTI base operation, by modifying the RTI base operation, the above described modification modes "MODIF-MOD1", "MODIF-MOD2" and "MODIF-MOD3" apply.

As illustrated and described in FIG. 98*a* to FIG. 98*h*, each receiver element, whose "DVSTP" differs to the "DVSTP" of the RTI base operation because of a modification, is identified with a variant number "VAR-number" higher than zero or with a transfer identifier number "TID-number" higher than zero. In an RTI base operation all receiver elements hold "VAR0" and "TID0". The VAR-numbers and TID-numbers in the RTI-OP-BS are automatically generated by the SPV and are allocated in the columns "VAR" and "TID" to the receiver elements in the receiver array and in the specification array. If during a specification of an RTI-base-operation-variant a new "DVSTP" was used, which was not contained in the RTI reference operation or in the RTI base operation, then the receiver element in the receiver array and respectively in the specification array gets the entry "+1" in the column "VAR" and the column "TID". If in a further RTI-base-operation-variant this receiver element is modified again, then automatically in column "VAR" or/and "TID" the entry is set to "+2", and so on. If in an RTI-base-operation-variant an receive element is eliminated, then in the X array the element line in the receiver array remains with all its entries and in column "VAR" a "−1" is entered automatically. Moreover, for example, the corresponding transmitters are omitted. The corresponding receiver column in the Y array, for example, is deleted, if the receiver was not specified in any "DVSTP". By placing the cursor in a receiver line in column "VAR" or "TID", containing a "VAR" or "TID" entry different to zero, and pressing the right side mouse button, the "DVSTP" of the RTI base operation is indicated. Thereby the actual "DVSTP" is not hidden. In case of "VAR" or "TID" with "+1", "+2" etc. there is no DVSTP display of the RTI base operation, because this "DVSTP" doesn't exist in the RTI base operation.

Description to FIG. 238*a*-238*k:*

Until now the specification of operations "OPs" in an RTI were illustrated and described. Subsequently the specification of project operations "PROJ_OPs" is outlined. For this, corresponding to the block structure of FIG. 62, the connections of the primary operation groups "POGs" and of the internal primary operation group "1.IPOG" with the operation groups "OGs" of the RTIs and the project output port "H" were specified, as FIG. 238*a* to FIG. 238*k* show. Moreover it is specified for a primary operation "POP" the "C.POG" and for an internal primary operation "IPOP" the "1.IPOG" the allocation of the operations "OPs" to the RTIs and the "POP" of "1.IPOG" to the project output port "H", as shown in FIG. 239*a* to FIG. 239*z*. The project operation display "PROJ-OP-BS" is opened in the SPV program window of FIG. 8, by clicking the button "PROJ_OP".

Figure 238A:
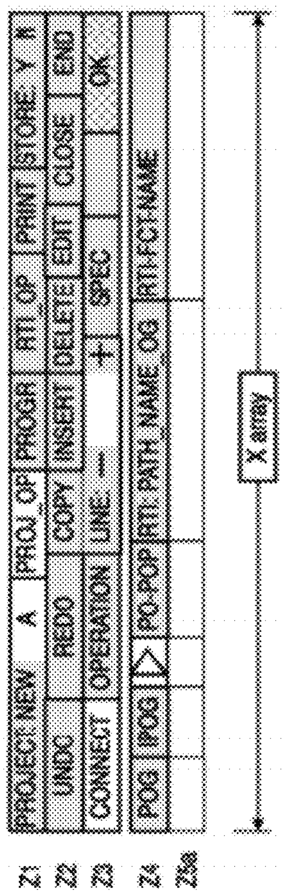

FIG. 238*a* shows the "PROJ-OP-BS" with activated display area "PROJ_OP" in line "Z1", in which subsequently the connections of the "POGs" and of the "1.IPOG" to the RTIs and to the project output port "H", corresponding to the block structure in FIG. 62 are entered. The connection and the operations "OP" of the 1.IPOG to the project output port "F" or, respectively, from the D.POG to the project output port "G", are outlined with the specification of RTI operations, as explained before. The functions of the buttons in the lines "Z1" and "Z2" in FIG. 238*a* are identical to those in "Z1" and "Z2" of the RTI-OP-BS.

The functions of the buttons in "Z3" are as follows:

The connections between "POGs" or "IPOGs" and "RTIs" as well as between "IPOGs" and project output ports, which transmit "POPs", are specified with activated button "CONNECT". For the specification "CONNECT" only the X array of the display is needed. If the display "OPERATION" is activated by a click, then the "POPs" and "IPOPs" are specified in interrelationship with the "RTI-OPs", or in case of an "IPOP" also with the "POPs" at the project output port. With the button LINE:"+" it is possible for the specification "CONNECT" to add stepwise further lines to the line "Z5*a*", which can be deleted again with "LINE:"–". The activation of the button "SPEC" by clicking is required for the procedure of a specification. By clicking the button "OK" the corresponding specification steps are acknowledged.

The meaning of the columns in line "Z4" is as follows:

In column "POG" the POG is defined by the entry of its project input ports, for example with "A", "B", etc., with "A.POG", "B.POG" etc. In column "IPOG" the IPOG is defined by the entry of a serial number, for example with "1", "2", etc., with "1.IPOG", "2.IPOG", etc. The column "arrow" is explained in the following with regard to the specification. In column "PO-POP" the project output ports are entered, over which the "POPs" are sent. In the column "RTI:PATH_NAME_OG" the RTI is defined with its operation group. In column "RTI-FCT-NAME" RTI function names can be entered.

Figure 238B:
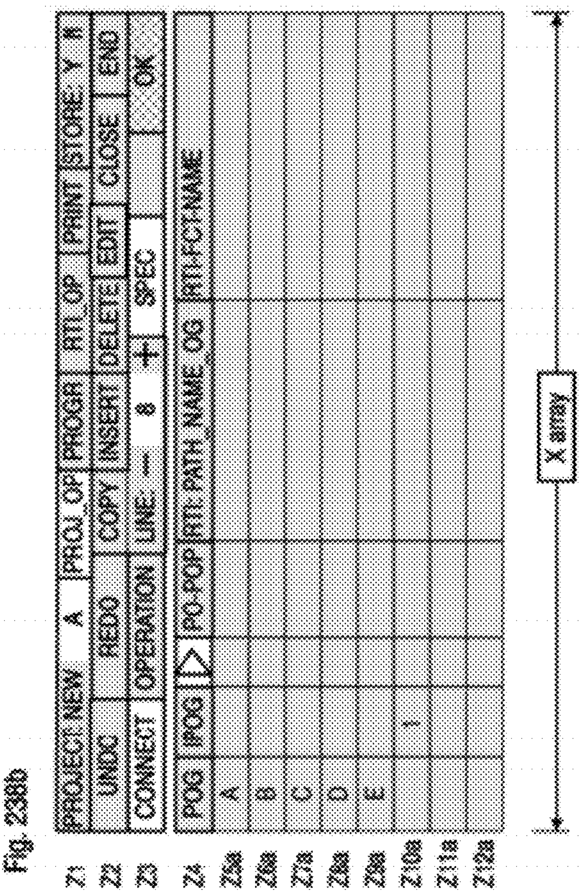

In FIG. 238*b* clicking activated the button "SPEC" in "Z3", thereby the button "LINE:" was activated too. The line display thereby was "1" and by seven further clicks on the button LINE"+" seven lines additional to "Z5*a*" were generated and were indicated in the line display as "8". Hereby all lines are marked and prepared for an entry. Furthermore in the columns "POG" and "IPOG" the entries corresponding to FIG. 62 were entered.

Figure 238C:
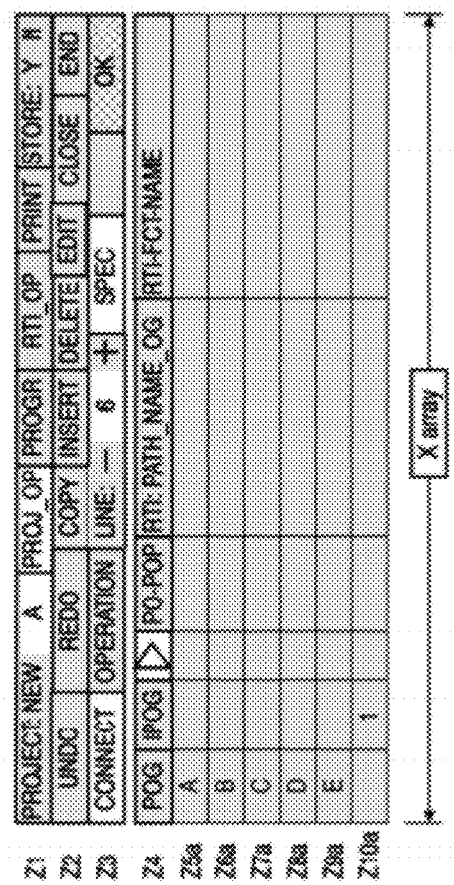
Figure 238D:
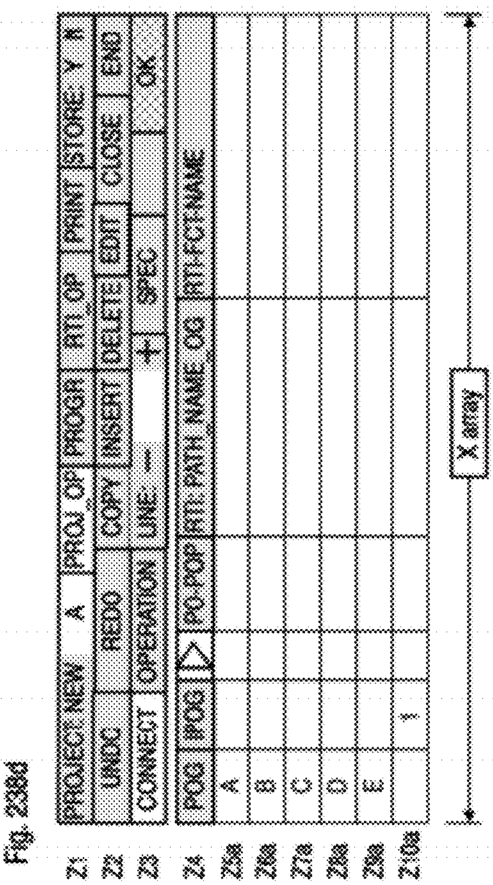
Figure 236E:
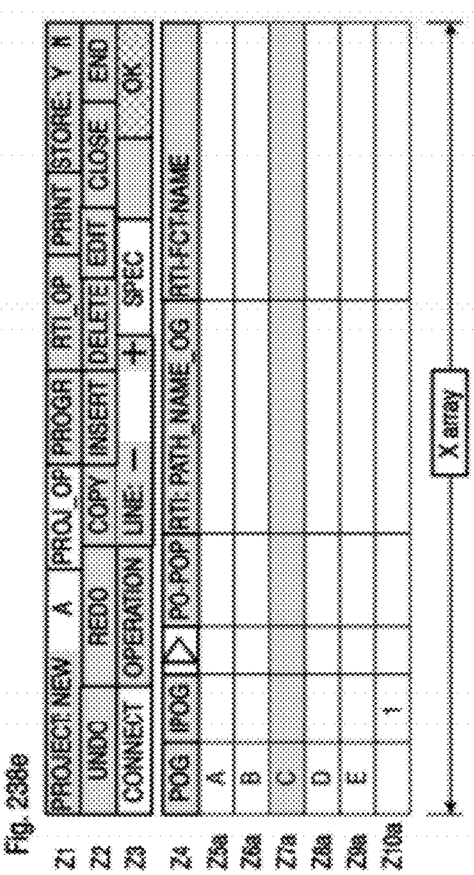
Figure 236F:
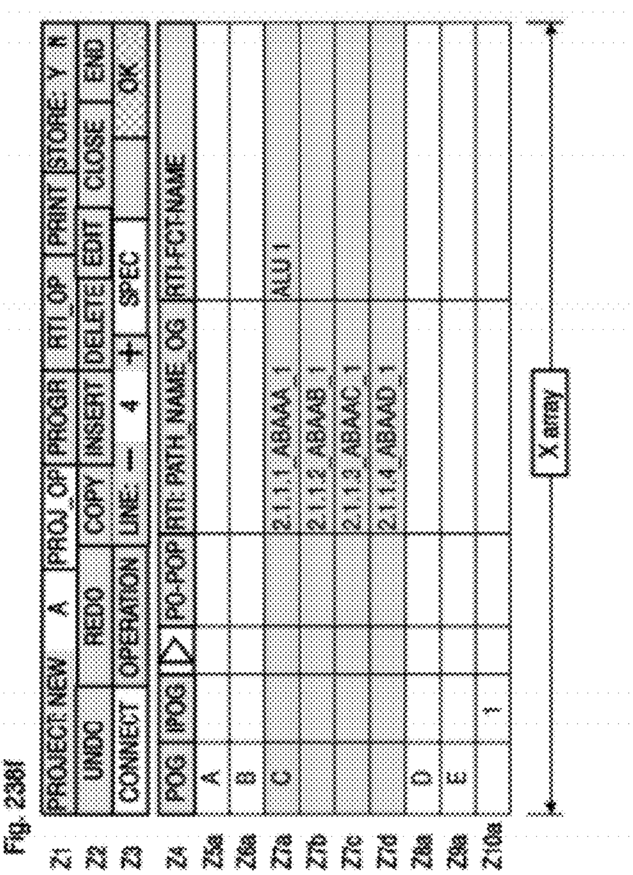

In FIG. 238*c* the surplus lines "Z11*a*" and "Z12*a*" were deleted by two clicks on the button LINE:"–". Therefore the line display shows the value "6". By clicking the button "OK" in "Z3" the buttons "SPEC" and "LINE:" in "Z3" are deactivated, the line displays are switched off and the line "Z5*a*" and the following were unmarked, as FIG. 238*d* shows.

Figure 238G:
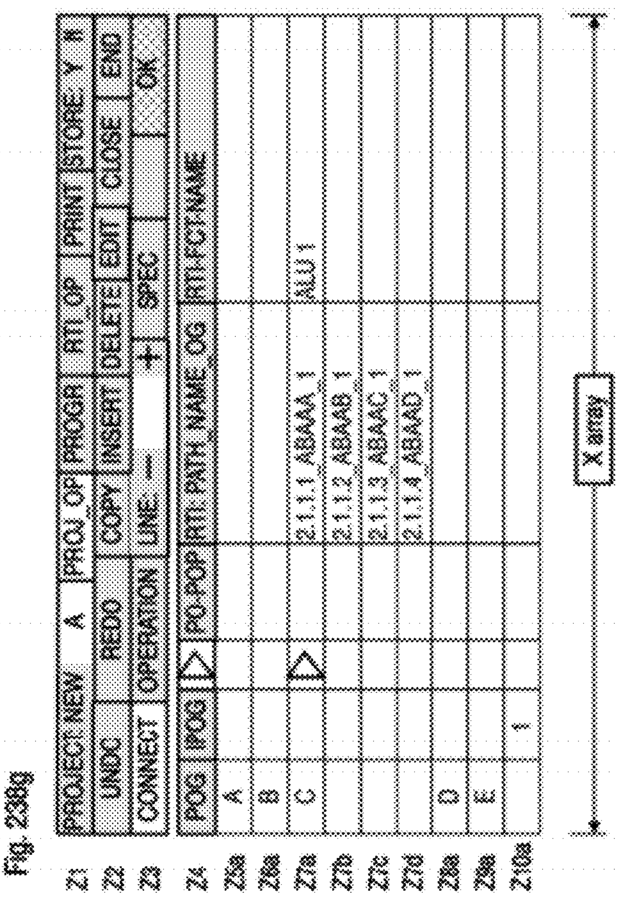

For the specification of the connections from C.POG to the RTIs, with activated button "SPEC" in "Z3", the line "Z7*a*" was marked by clicking on any location in this line, as FIG. 238*e* shows. After activation by clicking the button "LINE:" in "Z3" the line display is set to "1" and by three clicks on the button LINE:"+" the additional lines "Z7*b*", "Z7*c*", and "Z7*d*" are generated and marked and the line count is displayed as LINE:"4", as shown in FIG. 238*f*. Furthermore the C.POG connections to the RTIs were entered and the function name for the RTI "2.1.1.1_ABAAA_1" was entered as "ALU1". After clicking the button "OK" in "Z3" the buttons "SPEC" and "LINE" are deactivated, the display lines are switched off and the lines "Z7*a*" to "Z7*d*" are unmarked, as FIG. 238*g* shows. Thereby in column "arrow" for C.POG an arrow was generated automatically, which points to the connected RTI group.

Figure 238H:
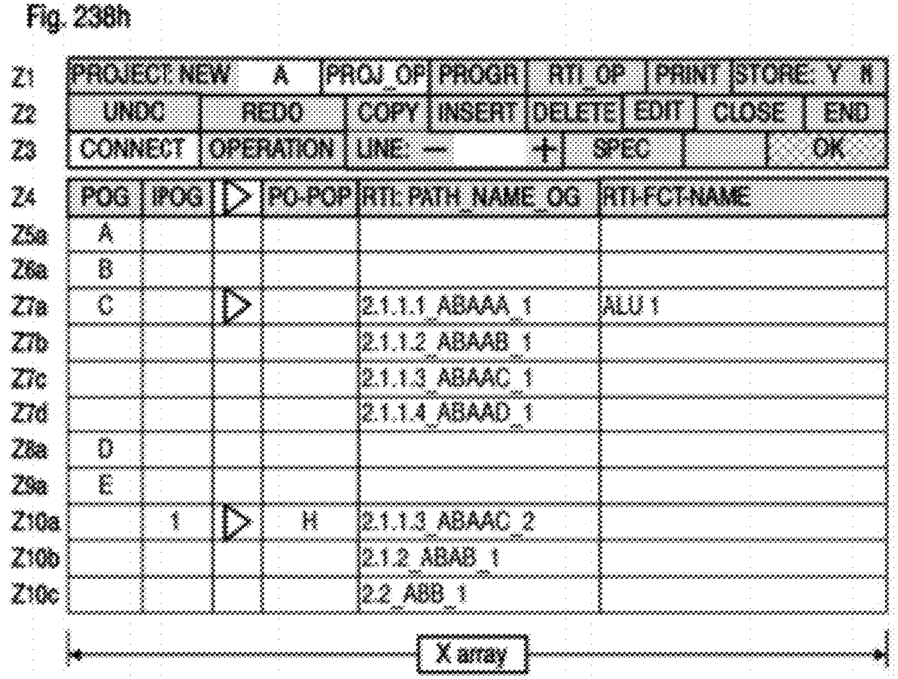
Figure 238I:
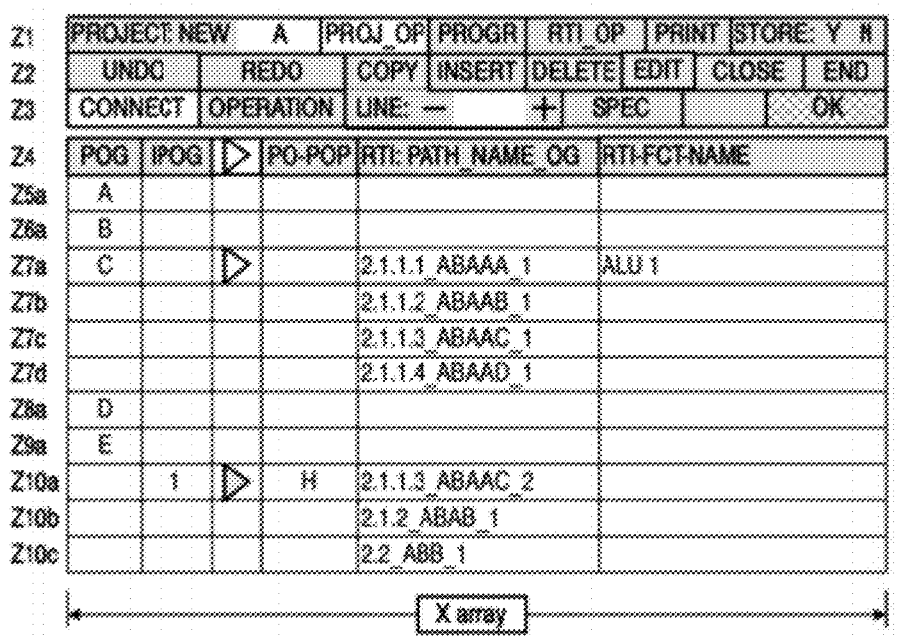
Figure 238K:
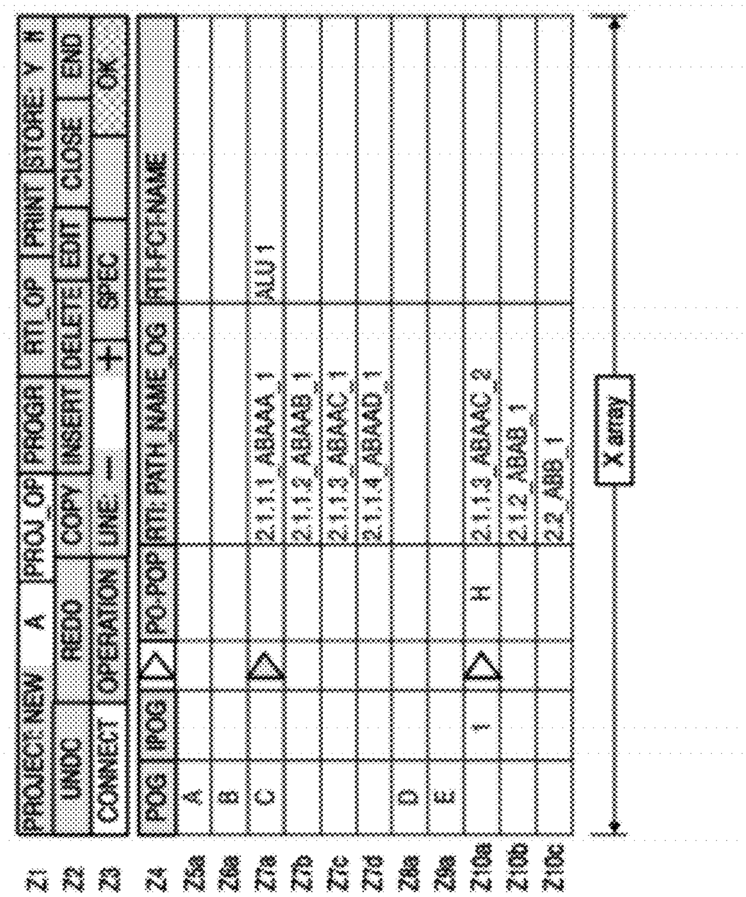

In FIG. 238*h*, corresponding to the block structure in FIG. 62, additional for 1.IPOG the connections to the RTIs and to the project output port "H" were defined and illustrated. Before a specification change from "CONNECT" to "OPERATION", the POG or IPOG, which is to be specified, is selected by clicking on column "arrow". Thereby the arrow of the selected POG or IPOG is marked. In FIG. 238*i* "1.IPOG" and in FIG. 238*k* "C.POG" were selected.

Description to FIG. 239*a*-239*z:*

FIG. 239*a* shows the display after switching the specification type from "CONNECT" to "OPERATION". Thereby the following button changes in the X array in line "Z3" were effectuated:

At the location of "LINE:" the operation state "OSTA:" is placed, the button "ALL" is newly added. By switching the specification type in display "CONNECT", FIG. 238*k*, the primary operation group "C.POG" with its connected RTIs was selected.

In the display "OPERATION", FIG. 239*a*, the RTIs in the Y array are indicated as receivers with their operation groups "OGs". The arrow in line "Z5" symbolizes the direction from transmitter to receiver. In column "POG" "C" stands for primary operation group "C.POG" and is, for example, highlighted by marking. At the beginning of an operation specification in "Z3" there is the entry "OSTA:1(1)". Thereby "1" means the actual, first value of OSTA. In the next operation specification steps the "OSTA" is continually incremented to "OSTA:2(2)", "OSTA:3(3)", etc. The OSTA value between brackets is always identical with the maximum OSTA value. If the actual, maximum OSTA value is changed toward lower OSTA values, as shown in the following, the OSTA value between brackets holds the maximum OSTA value.

In FIG. 239*b* the button "SPEC" in "Z3" was activated by clicking. Thus the button in "Z5" in column "POP_MOD_POVAR" was marked and so prepared for an entry and in column "OSTA" the value "1" was entered. "POP" and "MOD" stand for the primary operation type received in "C.POG" and its operation mode, "POVAR" stands for primary base operation variant. FIG. 239*c* shows an exemplary entry for "POP_MOD_POVAR".

In FIG. 239*d*, for the operations with "OSTA=1", the exemplary RTIs "ABAAA" and "ABAAB" were selected in the Y array in line "Z5" by clicking on their coordinate fields, which got thereby automatically the OSTA entry "1". With this the lines "Z6*a*" and "Z6*b*" are generated automatically, and are automatically allocated by the marked coordinate fields to the RTIs "ABAAA" and "ABAAB" respectively. The lines "Z6*a*" and "Z6*b*" are prepared by markings for an entry of the RTI operation type in column "RTI-OP" and of the RTI operation mode and RTI-base-operation-variant in column "MOD_OVAR".

In FIG. 239*e*, for example, entries were made in the columns "RTI-OP" and "MOD_OVAR". By clicking the button "OK" in "Z3", the button "SPEC" in "Z3" is deactivated and the marks in "Z6*a*" and "Z6*b*" in the X array are erased, as FIG. 239*f* shows. Furthermore the arrow in the Y array in column "RECEIVER" of "Z5", FIG. 239*e*, is transferred to the first RTI "ABAAA" in "Z6*a*" and is activated by marking. If the RTI "ABAAB" should be selected for an operation specification, then by clicking the button in column "RECEIVER" in line "Z6*b*" the arrow is directed to the RTI "ABAAB", which is to be specified. By clicking the button "RTI_OP" in "Z1" the display changes from "PROJ_OP", FIG. 239*f*, to display "RTI_OP" with opened "RTI operation window", as for example FIG. 99*k* shows. Thereby in the display "RTI_OP" the "INSTANCE: 2.1.1.1_ABAAA" with corresponding "OG" is entered automatically in line "Z3" at the location of "INSTANCE: 2.1.1.3_ABAAC" and in the "RTI operation window" the arrow is moved from LINE"2" to LINE"1" into the RTI operation to specify. After closing the "RTI operation window" the RTI operation to be specified is placed in line "Z4" of the display "RTI_OP". If there is still no entry in the "RTI operation window" for the RTI operation to be specified, then automatically the RTI operation to be specified is transferred from the display "PROJ_OP" to a new line on the left side of the arrow. In the columns on the right side of the arrow in "REF-OP", "MOD" and "OVAR" the entries are to be supplied manually.

After specifying the selected RTI operation, by clicking the button "PROJ_OP" in display "RTI_OP", the display changes from "RTI_OP" to "PROJ_OP", as FIG. 239*g* shows. Thereby the "OSTA=1" is automatically entered in the marked coordinate field in the Y array in column "ABAAA" and the corresponding arrow in column "RECEIVER" is unmarked. By clicking the column "RECEIVER" in line "Z6*b*" the arrow is directed to the next RTI "ABAAB" to be specified, as FIG. 239*h* shows.

FIG. 239*i* shows the display "PROJ_OP" after completed operation specification of RTI "ABAAB" by entry of "OSTA=1" in the marked coordinate field and unmarked arrow. With this all RTI operations are specified for "OSTA=1".

In FIG. 239*k*, with activated button "SPEC" in "Z3", the "OSTA" was incremented to "OSTA:2(2)" by clicking the button OSTA:"+". Thereby in "Z5" in column "OSTA" the value "2" is entered automatically. After selection of RTI "ABAAC" and entry of "RTI-OP=TYP.C.C" and "MOD_OVAR=0_0", FIG. 239*l*, by clicking the button "OK" in "Z3" the arrow is directed to the marked coordinate field of the RTI "ABAAC" and by a further click on the arrow area, the arrow is activated and marked, as FIG. 239*m* shows. FIG. 239*n* shows the display "PROJ_OP" after operation specification of the RTI "ABAAC".

For "OSTA=3" the RTI "ABAAD" was prepared for an operation specification, as FIG. 239*o* shows. FIG. 239*p* shows the display "PROJ_OP" after the operation specification of the RTI "ABAAD".

In FIG. 239*q* by clicking the button OSTA:"–" the "OSTA=2" was set and with this the view of the display "PROJ_OP" after the operation specification of RTI "ABAAC" is shown. By a further clicking the button OSTA:"–" the "OSTA=1" is set and with this the entries after the operation specification of RTI "ABAAB" are illustrated in the display "PROJ_OP", as FIG. 239*r* shows.

If all entries of the processed RTI operation specifications for "OSTA=1", "OSTA=2" and "OSTA=3" should be shown in the display "PROJ_OP", then this occurs by clicking the button "ALL" in "Z3" as FIG. 239*s* shows.

In FIG. 239*t* the first operation specification for the internal primary operation 1.IPOG "TYP.1IP.A" with "MOD_POVAR=0_0" for the RTI "ABAAC" is prepared and displayed after termination in FIG. 239*u*. After switching to "OSTA=2" with activated button "ALL" in "Z3", the first operation specification for the RTI "ABAAC" remains in the columns "Z5*a*" and "Z6*a*", as FIG. 239*v* shows.

In FIG. 239*w* with "OSTA=2" a "POP" with "POPOP=TYP.1IP.H.A" and "MOD_OVAR=0_0" as second operation specification was prepared for the project output port "H". As the POP request via the project output port "H" is received and specified in another project, by clicking the button "OK" in "Z3" the POP specifying for the transmitting project is ended immediately, as FIG. 239*x* shows.

In the receiving project the POP is transferred via a project input port to a POG. For the specifying of POP in the receiving project, for example, the transmit data of the RTI "ABAAC" can be used, which were specified with "OSTA=1".

FIG. 239*y* shows for "OSTA=3" the preparation of the operation specification of RTI "ABAB" with "RTI-OP=TYP.1IP.F" and "MOD_OVAR=0_0". FIG. 239*z* shows the terminated operation specification of RTI "ABAB" in the display "PROJ_OP".

Description to FIG. 240*a*-240*c:*

Subsequently exemplary operation flow variants are described for a primary operation "POP" at the project input port "C". For this the block structure in FIG. 240*a* shows the request flow of the primary operation from the project input port "C" to the primary operation group "C.POG" and the request flows of the operations from "C.POG" to the "RTIs" "ABAAA", "ABAAB", "ABAAC" and "ABAAD". The operation requests are received via the operation group "OG1" in all "RTIs". As described in FIG. 64, for the POP and OP request flows unified control signal structures are used. These are for the transmission of POP or OP requests the operation control signals "OCTR" and in the reverse direction of operation transmission these are the control signals "CTR" and the operation variant signals "OVAR". The arrows "DIN" and "DOUT" represent the general data input and data output of the "RTIs". Additionally special data connections are illustrated between "RTIs". These are the data connections "2.1.1.1_DATA.A" from "ABAAA" to "ABAAC", "2.1.1.2_DATA.B" from "ABAAB" to "ABAAD" and "2.1.1.3_DATA.C" from "ABAAC" to "ABAAD". The block structure in FIG. 240*a* serves only for explanation and is not part of SPV.

In the table of FIG. 240*b* the exemplary combinations of RTI-base-operation-variants "OVAR" are allocated to the primary base operation variants "POVAR=1" to "POVAR=7". For "C.POG" the reception of an exemplary primary operation "POP" with "TYP.P.A" and mode "MOD=0" was supposed. For all RTI operations applies the exemplary mode "MOD=0". The "C.POG" transmits with operation state "OSTA=1" and "POVAR=0" to "POVAR=7", for example, to the RTI "ABAAA" the operation "TYP.A.A" and to the RTI "ABAAB" the operation "TYP.B.A".

For the primary base operation with "POVAR=0", "C.POG" transmits with "OSTA=2" to the RTI "ABAAC" the operation "TYP.C.A", with "OSTA=3" and to the RTI "ABAAD" the operation "TYP.D.A". For a primary base operation with "POVAR=0" all concerned "RTIs" process base operations with "OVAR=0".

To the primary base operation variant with "POVAR=1", for example with "OSTA=1", an RTI-base-operation-variant of the RTI "ABAAA" having "OVAR=1", is allocated. Hereby, for example, the ABAAA result output "2.1.1.1_DATA.A" is modified, which is processed afterward with "OSTA=2" in the RTI "ABAAC". Therefore the "C.POG" with "OSTA=2" transmits to the RTI "ABAAC", corresponding to the modified data input "2.1.1.1_DATA.A", an exemplary operation "TYP.C.B", which has, for example, a modified ABAAC data output "2.1.1.3_DATA.C" as consequence. With "OSTA=3" the "C.POG" transmits to the RTI "ABAAD" an exemplary operation "TYP.D.B", corresponding to the modified ABAAD data input "2.1.1.3_DATA.C".

To the primary base operation variant with "POVAR=2", for example with "OSTA=1", an RTI-base-operation-variant of the RTI "ABAAB" having "OVAR=1", is allocated. Hereby, for example, the ABAAB result output "2.1.1.2_DATA.B" is modified, which is processed afterward with "OSTA=3" in the RTI "ABAAD". Therefore the "C.POG" with "OSTA=3" transmits to the RTI "ABAAD", corresponding to the modified data input "2.1.1.2_DATA.B", an exemplary operation "TYP.D.C".

To the primary base operation variant with "POVAR=3", for example with "OSTA=1", an RTI-base-operation-variant of the RTIs "ABAAA" and "ABAAB" having "OVAR=1" each, is allocated. Hereby, for example, the ABAAA result output "2.1.1.1_DATA.A" is modified, which is processed afterward with "OSTA=2" in the RTI "ABAAC". Therefore the "C.POG" with "OSTA=2" transmits to the RTI "ABAAC", corresponding to the modified data input "2.1.1.1_DATA.A", the operation "TYP.C.B", like under "POVAR=1", which causes a modified ABAAC data output "2.1.1.3_DATA.C". With "OSTA=3" the "C.POG" transmits to RTI "ABAAD" an exemplary operation "TYP.D.D", corresponding to the modified data input "2.1.1.2_DATA.B" and "2.1.1.3_DATA.C".

To the primary base operation variant with "POVAR=4", for example with "OSTA=1", an RTI-base-operation-variant of the RTI "ABAAA" having "OVAR=2" each, is allocated. Hereby, for example, the ABAAA result output "2.1.1.1_DATA.A" is modified, which is processed afterward with "OSTA=2" in the RTI "ABAAC". Therefore the "C.POG" with "OSTA=2" transmits to RTI "ABAAC", corresponding to the modified data input "2.1.1.1_DATA.A", an exemplary operation "TYP.C.C", which causes an exemplary modified ABAAC data output "2.1.1.3_DATA.C". With "OSTA=3" the "C.POG" transmits to RTI "ABAAD", corresponding to the modified data input "2.1.1.3_DATA.C", an exemplary operation "TYP.D.E".

With the primary base operation variant "POVAR=5", for example, an-RTI-base operation-variant "OVAR=3" of the RTI "ABAAA", is allocated to the "C.POG" with "OSTA=1". With this, for example, the primary operation flow with "OSTA=2" should end. With "OSTA=2" the "C.POG" transmits to the RTI "ABAAD" an exemplary operation "TYP.D.F".

With the primary base operation variant "POVAR=6", for example, an RTI base operation variant "OVAR=4" of the RTI "ABAAA" is allocated to the "C.POG" with "OSTA=1". Hereby, for example, the primary operation flow should end with "OSTA=1". The ABAAB RTI base operation variant thereby is not evaluated in the "C.POG", therefore it owns "OVAR=X".

With the primary base operation variant "POVAR=7" the primary operation flow for "OSTA=1" and "OSTA=2" corresponds to the primary base operation flow with "POVAR=0". For "OSTA=3" an exemplary RTI base operation variant "OVAR3" of the RTI "ABAAD" is allocated to "C.POG".

In FIG. 240*c*, for an operation "OP=TYP.A.A" with mode "MOD=0" at "OG1" of RTI "2.1.1.1_ABAAA", an exemplary dependence of the RTI base operation variant "OVAR" of exemplary external signals "E_AVAR" and internal signals "SVAR" of RTI "2.1.1.1_ABAAA" is displayed in a "truth table". As explained in FIG. 65, "AVAR" stands for asynchronous variant and "SVAR" stands for synchronous variant, the prefix "E_" designates external AVAR and SVAR signals, which are received by a "RTI".

For example, "E_AVAR" is composed of the signals of hardware error and software error, "SVAR" of the signals command parity error "CMDPERR", address parity error "ADRPERR" and data parity error "DATPERR". In the signal columns of "E_AVAR" and "SVAR" in the truth table a zero "0" means "signal=false", a one "1" means "signal=true", and an X stands for "signal=any". As already explained in FIG. 98*a* to FIG. 98*h*, for the building of "OVAR" additionally to error events also decision criteria may be involved, which generate corresponding SVAR and AVAR signals. Each RTI OVAR type owns its special, unique combination of one or several coincidences of SVAR and/or AVAR signals, which are defined by error events or/and decision criteria, and which cause a modified RTI operation flow compared to RTI base operation. The RTI OVAR types differ in a running number. For a RTI base operation is "OVAR=0". The RTI-base-operation-variants are numbered as "OVAR=1", "OVAR=2", etc.

Description to FIG. 241-248:

With the consecutively showed examples the generation of the parallel state "PSTA" for an RTI data processing is explained. In the examples the element state "ESTA" is shown, its generation was previously described and therefore is not explained any more.

Figure 241:
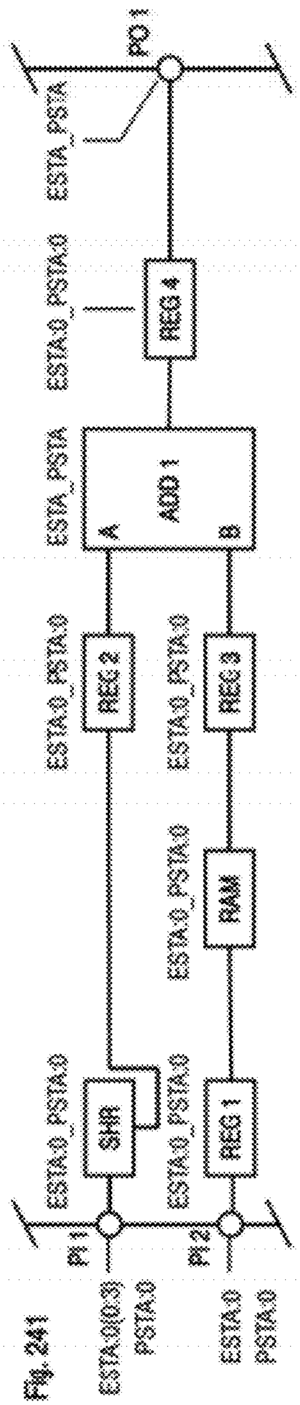

FIG. 241 shows the state of the RTI elements before they are processed. Thereby the PSTA is zero at the RTI input ports (PI1, PI2) and at the memorizing elements (SHR, REG1, RAM, REG2, REG3, REG4), the combiner element (ADD1) and the RTI output port (PO1) have no PSTA yet.

Figure 241A:
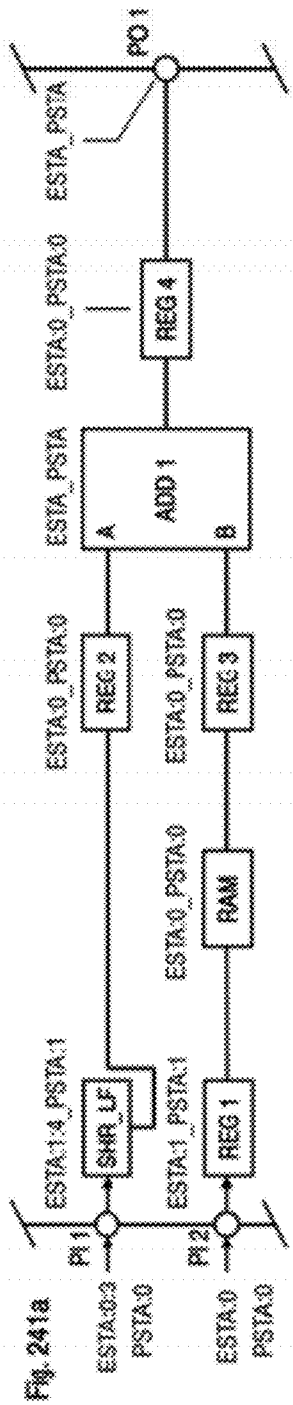

In FIG. 241*a* the shift register "SHR" has received data from an RTI input port "PI1" in a four bit streaming. The generation of the SHR-PSTA occurs independent of the SHR receive mode (serial or parallel). With data reception the SHR-PSTA is increased by one to PSTA:1. Simultaneously "REG1" takes single data from the RTI input port "PI2" and increases its PSTA to one.

Figure 241B:
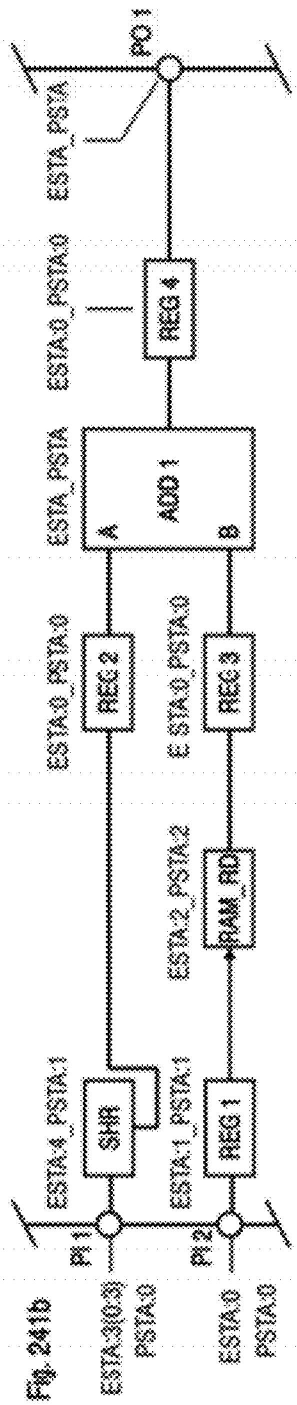

FIG. 241*b* shows the RAM function read "RD" with RAM address transfer from REG 1. The RAM-PSTA increases by one, compared to the PSTA of the transmitting element (REG1-PSTA:1) to RAM-PSTA:2.

Figure 241C:
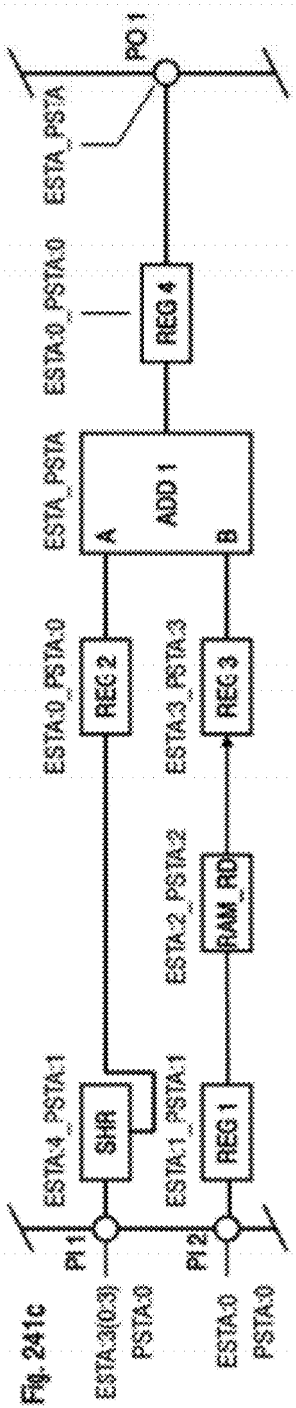

In FIG. 241*c* the RAM transfers its read data to REG3. Compared to the RAM-PSTA:2 the REG3-PSTA increases by one to PSTA:3.

Figure 241D:
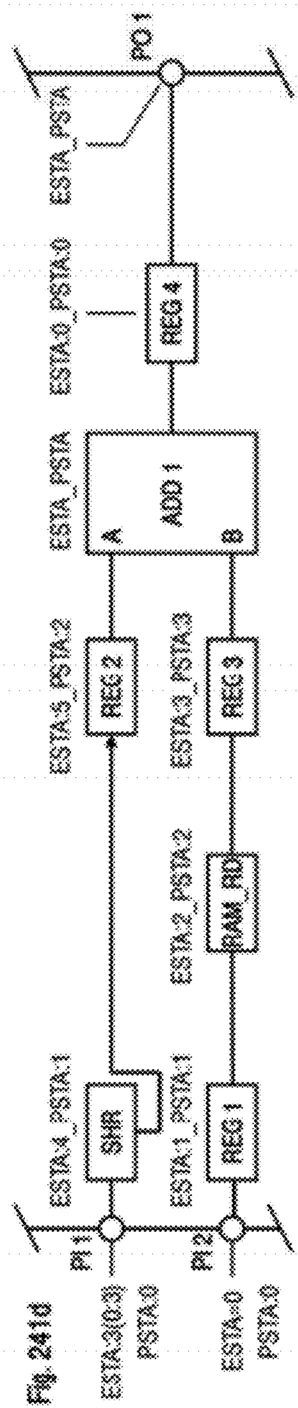

In FIG. 241*d* the SHR parallel data, PSTA:1 are stored in REG2 with PSTA:2.

Figure 241E:
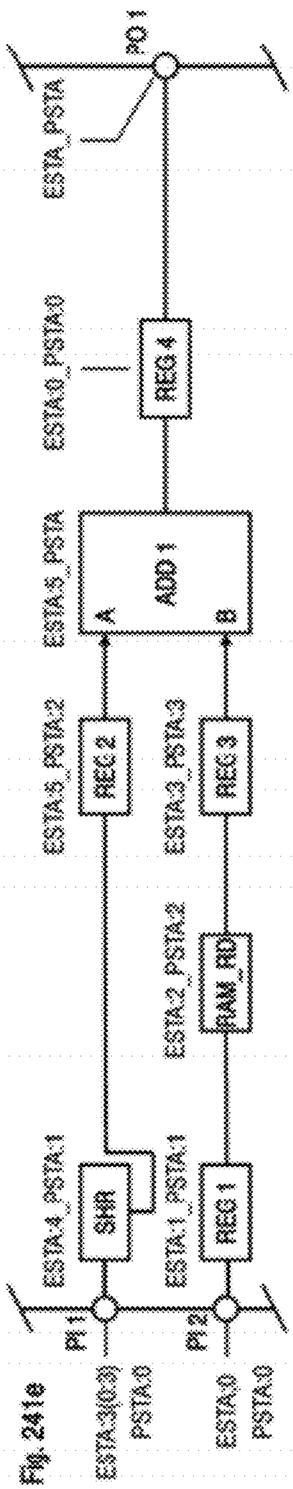

In FIG. 241*e* the data are processed in the first data processing step "DVSTP1" with the addition of REG2 data plus REG3 data in the adder "ADD1". In DVSTP1 the combinatory elements, in the example this is ADD1, hold no PSTA yet, but an ESTA.

Figure 241F:
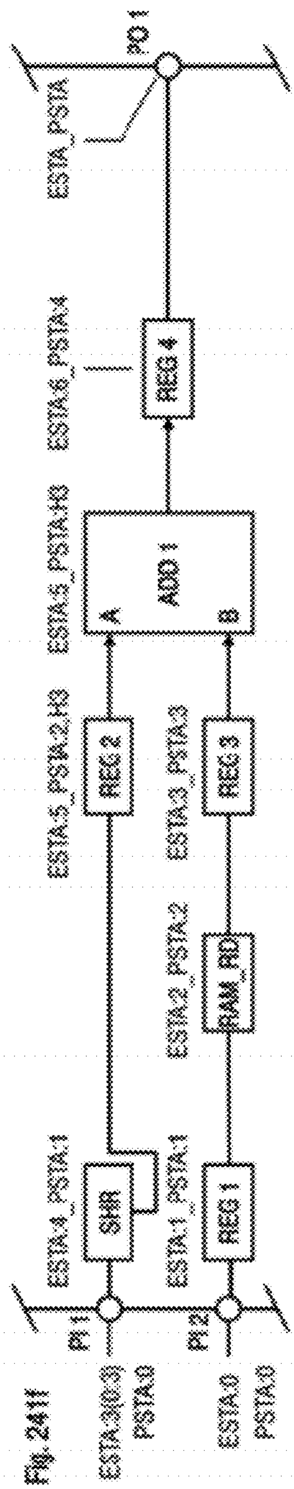

FIG. 241*f* shows the continuation of the data processing of FIG. 241*e* with DVSTP2, in which the result of the addition from ADD1 is received in REG4. For REG4 the PSTA:4 results from the maximum PSTA of the transmitting elements REG2 and REG3 plus one. With the data acceptance in the second data processing step in a memorizing element or in a RTI output port, a hold parallel state "PSTA:H" is assigned to the transmitting elements, which is built of the PSTA at the data acceptance in a memorizing element or in a RTI output port. For a memorizing element the PSTA:H for the allocation to the transmitting elements results of PSTA:H=PSTA minus one. For an RTI output port the PSTA:H for the allocation to the transmitting elements results of PSTA:H=PSTA. In the example FIG. 241*f*, the PSTA:H is allocated to the transmitting elements ADD1, REG2 and REG3 as PSTA:H3 with the data reception of REG4. For REG3 PSTA:3 is identical to PSTA:H3, therefore this is not noted.

Figure 241G:
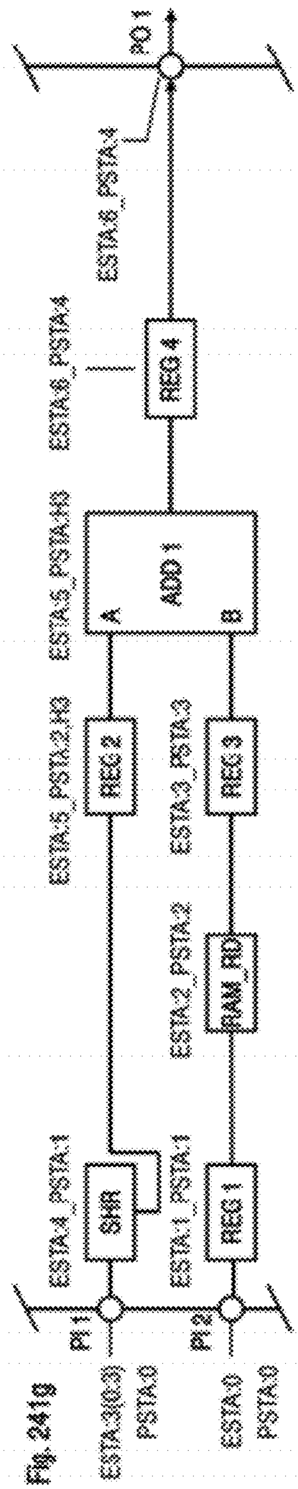

In FIG. 241*g* REG4 owns the PSTA:4, which is allocated with the data reception on the RTI port "PO1" with PSTA:4.

In the following with FIG. 242*a* to FIG. 248*b* further examples for the PSTA generation are explained. Thereby in FIG. 242*a* to FIG. 248*a* the first data processing step "DVSTP1" and in FIG. 242*b* to 248*b* the second data processing step "DVSTP2" of one data processing each is illustrated. For ESTA, PSTA and PSTA:H in FIG. 242*a* to FIG. 248*a* exemplary values were assumed.

In DVSTP1, FIG. 242*a* to FIG. 246*a* data of two memory elements with each a combinatory element (MUL1, ADD2, ADD3) are combined. Thereby generally no PSTA is allocated to the combinatory elements.

In FIG. 242*b* to FIG. 246*b* in DVSTP2 the result data of the combiner elements (MUL1, ADD2, ADD3) are allocated to the memorizing elements (REG1, REG9, REG6) or to the RTI output ports (PO1, PO2) respectively, and are memorized or taken, respectively. The generation of PSTA and PSTA:H is explained in the following for DVSTP2.

Figure 242A:
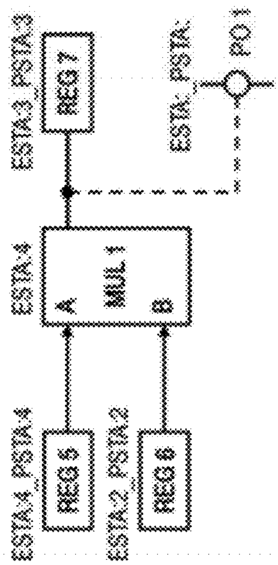
Figure 242B:
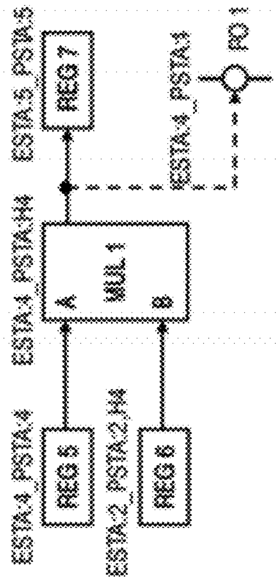

In FIG. 242*b* REG5 holds the maximum PSTA of the transmitting elements with PSTA:4, which is taken over with plus one from REG7 with PSTA:5. If before data acceptance of a memorizing receiver element, for example REG7, the PSTA or the PSTA:H is higher than the maximum PSTA of the data input transmitting elements, for example REG5 and REG6, then the PSTA of the memorizing receiver element, by accepting the data, is increased by one compared to the maximum PSTA or PSTA:H before the data acceptance. The hold-PSTA "PSTA:H" for the transmitting elements results in DVSTP2 of the newly built PSTA during data acceptance of a memory element. It applies: Newly built PSTA with the data reception of a memory element, in the example this is PSTA:5 at REG7, minus one gives the PSTA:H for the allocation to the transmitting elements, in the example, PSTA:H4 is allocated to MUL1 and REG6. For REG5 the PSTA:H4 is not noted, because it is identical to PSTA:4. Transmitting elements in DVSTP2 can be combinational elements or/and memorizing elements or/and RTI input ports, to which a corresponding PSTA:H is allocated. Receiving elements in DVSTP2 are memorizing elements or RTI output ports.

In FIG. 242*b* in DVSTP2 the data are received, instead from REG7, from the RTI output port "PO1". Thereby REG5 owns the maximum PSTA of the transmitting elements with PSTA:4, which is adopted by PO1. If before the data acceptance of an RTI output port, for example of PO1, the PSTA is higher than the maximum PSTA of the data input transmitting elements, for example of REG5 or REG6, then the PSTA of the receiving output element, in the example PO1, is increased by one with the data acceptance, compared to its maximum PSTA, before the data acceptance. The hold-PSTA "PSTA:H" for the transmitting elements results in DVSTP2 of the newly built PSTA with the data acceptance of an RTI output port. It applies: Newly built PSTA with the data reception of an RTI output port, in the example it is PO1 with PSTA:4, is allocated to the transmitting elements as PSTA:H, in the example the PSTA: H4 is allocated to MUL1 and REG6. For REG5 the PSTA: H4 is not noted, because it is identical to PSTA:4.

Figure 243A:
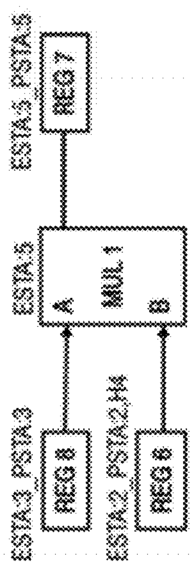
Figure 243B:
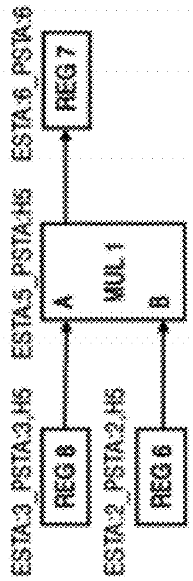

In FIG. 243*b* the REG7-PSTA before DVSTP2 is higher than the maximum PSTA of the transmitting memory elements REG5 and REG6. Therefore with DVSTP2 the PSTA of the receiving memory elements REG7 is increased by one from PSTA:5 to PSTA:6. The allocation of the PSTA:H to the data input transmitting elements (MUL1, REG8, REG6) results as REG7-PSTA:6 minus one to PSTA:H5.

Figure 244A:
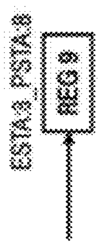
Figure 244B:
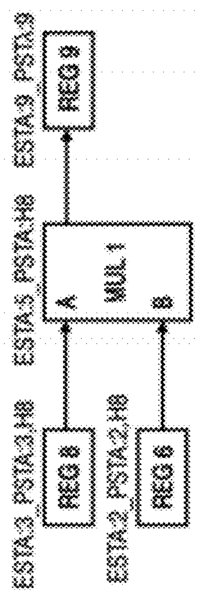
Figure 245A:
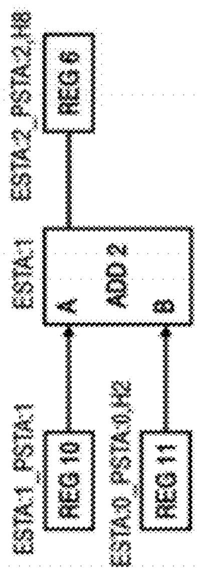
Figure 245B:
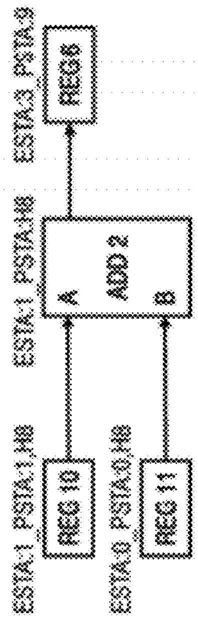

In same manner as in FIG. 243*b* the REG9-PSTA:9 and the PSTA:H8 with DVSTP2 are generated, FIG. 244*b*, on the basis of REG9-PSTA:8 before DVSTP2, as FIG. 244*a* shows, In FIG. 245*a* the maximum PSTA for REG6 with PSTA: H8 was assumed. As mentioned above, here REG11 holds a PSTA:H2 of a preceding usage. Thus with DVSTP2 in FIG. 245*b* results a REG6-PSTA:9 and a PSTA:H8.

Figure 246A:
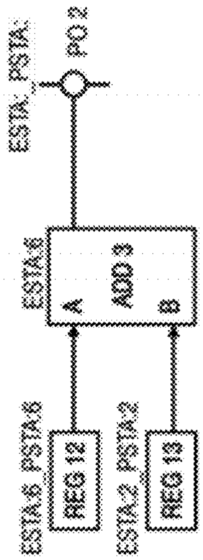
Figure 246B:
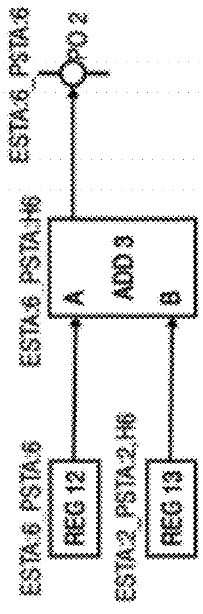
Figure 247A:
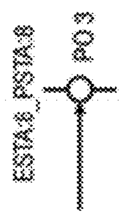
Figure 247B:
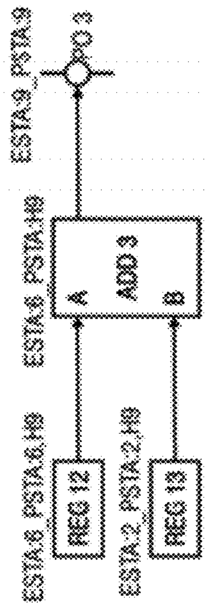

In FIG. 246*b* with DVSTP2 of PO2 the maximum PSTA from the transmitting memory elements with REG12-PSTA:6 was adopted and accordingly the PSTA:H6 was formed. The generation of PO3-PSTA:9 and of PSTA:H9 with DVSTP2 in FIG. 247*b*, happens in the same manner as in FIG. 246*b* on the basis of PO3-PSTA:8 before DVSTP2, as FIG. 247*a* shows.

Figure 248:
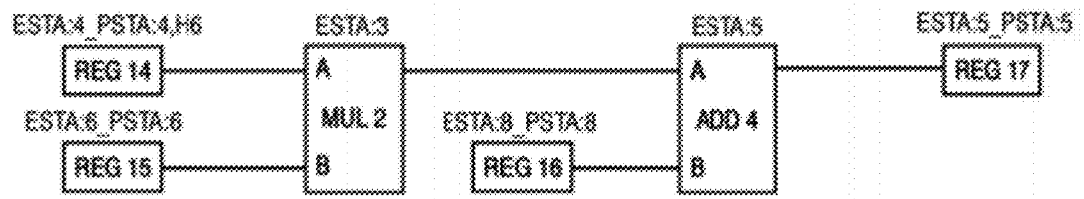

FIG. 248 shows a data processing configuration with two combinatory elements (MUL2, ADD4) arranged serially in data transfer direction with assumed PSTA values and still without DVSTP.

Figure 248A:
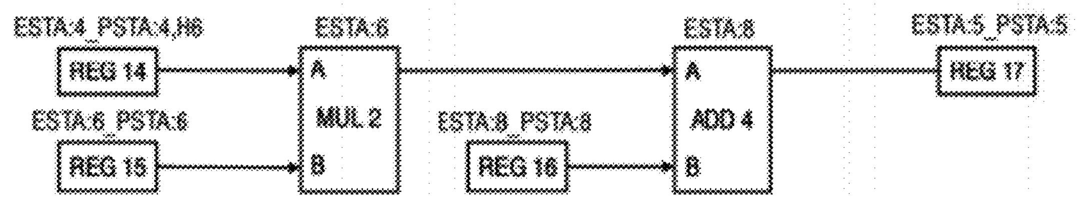

In FIG. 248*a* with DVSTP1 the ESTA is allocated to the combinatory elements MUL2 and ADD4. The MUL2-ESTA:6 results from the REG15-ESTA:6, the ADD4-ESTA:8 results from the REG16-ESTA:8.

Figure 248B:
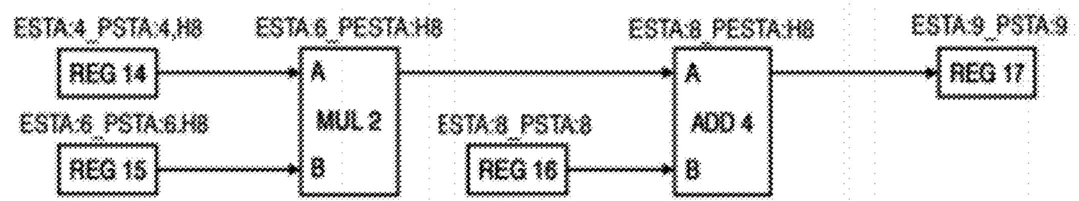

With DVSTP2, FIG. 248*b*, the ADD4 result is received in REG17 and the REG17-PSTA and the PSTA:H are generated. REG16-PSTA:8 causes the REG17-PSTA:9. The PSTA:H8 results from REG17-PSTA:9 minus one and is allocated to the elements ADD4, MUL2, REG14 and REG15. For REG16 the PSTA:H8 is not noted, because it is identical to PSTA:8.

Description to FIG. 249*a*-250*b:*

The handling of ESTA is illustrated in a survey in FIG. 249*a* for the data processing in FIG. 241*a* to FIG. 241*g* and in FIG. 249*b* for the data processing in FIG. 242*a* to FIG. 247*b*. The handling of the PSTA is illustrated in a survey in FIG. 250*a* for the data processing in FIG. 241*a* to FIG. 241*g* and in FIG. 250*b* for the data processing in FIG. 242*a* to FIG. 247*b*.

In the following the handling of ESTA, layout of survey and notations.

The survey in FIG. 249*a* is divided into four blocks from left to right:

Information regarding to the drawings for data processing, Data-Transmitter (Memorizing-Element or RTI input port "PI"), Data-Processing (Combiner-Element), Data-Receiver (Memorizing-Element or RTI output port "PO").

The notations in the blocks mean:

DVSTP: Data processing step (the values between brackets stand for the order of the data processing), ELEM: element, FCT: element function (LF: least bit first, RD: read data of RAM, PD: parallel data of SHR), ASTA: element action state (is incremented by one which each involvement in the data processing), ESTA: element state, (ESTA): element state before a DVSTP.

As it is seen in FIG. 249*a*, the transfer of the first data processing, FIG. 241*a*, occurs simultaneously with DVSTP1 from PI1 and PI2 to the memory elements SHR and REG1. The transfer of the second, third and forth data processing, according to FIG. 241*b*, FIG. 241*c* and FIG. 241*d*, occurs with DVSTP1 from memory element to memory element. In the fifth data processing, FIGS. 241*e* and 241*f*, the transfer occurs with DVSTP1 from REG2 and REG3 to ADD1 and with DVSTP2 from ADD1 to REG4. With the sixth data processing, FIG. 241*g*, the data transfer occurs with DVSTP1 from REG4 to PO1.

In FIG. 249*b* there is a survey over the ESTA handling during data processing in FIG. 242 to FIG. 247. The layout of the survey and the notations are identical to FIG. 249*a*. In the data processing examples the data transfer occurs with DVSTP1 from the memory elements to the combinatory elements and with DVSTP2 from the combinatory elements to the memory elements or to the RTI output ports. In FIG. 244*a* for the receive element REG9 and in FIG. 247*a* for the receive element PO3 special ESTA values were assumed, which were adopted in DVSTP1.

A survey over the PSTA procedure during data processing according to FIG. 241*a* to FIG. 247*g* is given with FIG. 250*a* and that according to FIG. 242*a* to FIG. 247*b* is given in FIG. 250*b*. The layout of the survey, the notations and the data transfer algorithms in FIG. 250*a* are identical to those in FIG. 249*a* and the ones in FIG. 250*b* are identical to those in FIG. 249*b*. The values between brackets (PSTA) and (PSTA:H) are values before a DVSTP. The PSTA of the receive memory element or RTI output port allocates the corresponding PSTA:H (Hold) to the transmitting elements with data reception (Load). In FIG. 250*a*, column PSTA, the PI1 transmit streaming is denoted with "(0:3)" and the corresponding SHR receive streaming with "(1:4)".

In SPV the element state "ESTA", the parallel state "PSTA", the hold parallel state "PSTA:H" and the action state "ASTA" are generated automatically.

By ESTA the data are defined unique on each element for every DVSTP of an RTI operation. Moreover ESTA shows exactly the logical depth in data processing steps (DVSTPs), beginning from the RTI input ports in transfer direction over the serially accessed receive memory elements to the RTI output ports.

PSTA defines, which elements execute simultaneously a data processing. The data transfer for a data processing can be executed as follows:

From the RTI input port over one or several combinatory elements to a receive memory element or direct, without combinatory elements to a receive memory element, or from transmit memory elements over one or several combinatory elements to a receive memory element or RTI output port, or direct, without combinatory elements to a receive memory element or RTI output port.

With PSTA:H for a memory element the needed data availability is defined, which decides when new data can be received again. The reception of new data in a memory element occurs generally with PSTA:H plus one. For combinatory elements the PSTA:H ensures, that a combinatory element is used only once in a PSTA.

The ASTA is incremented by one with every data processing action of each element and is zero before beginning of an RTI operation/data processing.

Description to FIG. 251-254:

FIG. 251 shows in the RTI_A an element configuration with designation of ESTA "E", PSTA "P" and VAR "V" before beginning of a data processing. The element input variant "VAR" is described in FIG. 98*a* to FIG. 98*h*. ASTA was not illustrated, since all elements process only one action in the data processing flow.

In FIG. 251*a* to FIG. 251*i* eight base operation variants to one base operation "OP.1" for the RTI_A are illustrated. The dependence of the base operation variants of criteria and error events is demonstrated in FIG. 252.

FIG. 251*a* shows the data processing flow of a base operation "OP.1". Thereby the operation variant is zero "OVAR0". The corresponding criteria (CR) and error events (parity error "PE") corresponding to OVAR0 are:

CR1=00, CR2=00, CR3=00, CR4=X, PE1=PE2=PE3=PE4=0.

The displays and the elements for the generation of "CR" and "PE" are marked grey.

FIG. 251*b* shows the first base operation variant OVAR1 with CR1=00, CR2=00, CR3=01, CR4=X, PE1=PE2=PE3=PE4=0. Thereby, compared to the base operation, the REG16 output is modified and allocated to PO2. Because the element PO2 was not used in the base operation, the element input variant "VAR" is indicated with "V+1". With a next, modified PO2 input, VAR would be increased by one and indicated as "V+2", etc. In case of a modified input of PO2 and simultaneous usage in the base operation, the PO2 input variant "VAR" would be indicated as "V1". With a next modified PO2 input, VAR would be increased by one and indicated as "V2", etc. The procedure of PO2-VAR applies to all elements, which were used in the examples of FIG. 251*a* to FIG. 251*i*.

FIG. 251*c* shows the second base operation variant OVAR2 with CR1=01, CR2=00, CR3=00, CR4=X, PE1=PE2=PE3=PE4=0. Thereby a modified signal input, compared to the base operation, is performed at MUL1/A with REG8 output.

FIG. 251*d* shows the third base operation variant OVAR3 with CR1=01, CR2=00, CR3=01, CR4=X, PE1=PE2=PE3=PE4=0. Thereby a modified signal input, compared to the base operation, is performed at MUL1/A with REG8 output and at PO2 with REG16 output.

FIG. 251*e* shows the forth base operation variant OVAR4 with CR1=00, CR2=01, CR3=X, CR4=01, PE1=PE2=PE3=PE4=0. Thereby, compared to the base operation, the following new elements are accessed: ADD1, REG13, ADD2, REG17, PO3, CMP4 and REG19.

FIG. 251*f* shows the fifth base operation variant OVAR5 with CR1=00, CR2=01, CR3=X, CR4=01, PE1=PE2=PE3=PE4=0. Thereby, compared to the base operation, the following new elements are accessed: ADD1, REG13, ADD2, REG17, PO3, CMP4 and REG19. Furthermore, compared to OVAR4, the REG17 output is now changed and allocated to PO4.

FIG. 251*g* shows the sixth base operation variant OVAR6 with CR1=01, CR2=01, CR3=X, CR4=00, PE1=PE2=PE3=PE4=0. Thereby, compared to the base operation, the following new elements are accessed: ADD1, REG13, ADD2, REG17, PO3, CMP4 and REG19. Furthermore, compared to OVAR5, the following inputs are changed: ADD1/B was allocated to REG8 output and PO3 was allocated to REG17 output.

FIG. 251*h* shows the seventh base operation variant OVAR7 with CR1=01, CR2=01, CR3=X, CR4=01, PE1=PE2=PE3=PE4=0. Thereby, compared to the base operation, the following new elements are accessed: ADD1, REG13, ADD2, REG17, PO3, CMP4 and REG19. Furthermore, compared to OVAR6 the REG8 output was allocated to the RTI output port PO4.

FIG. 251*i* shows the eighth base operation variant OVAR8 with CR1=X, CR2=X, CR3=X, CR4=X, PE1=1 or PE2=1 or PE3=1 or PE4=1. Thereby only the elements for the generation of CR1, CR2, PE1, PE2, PE3 and PE4 are accessed.

FIG. 252 shows for the preceding description of data processing examples in RTI_A, FIG. 251*a* to 251*i*, the generation of the coding of SVAR signals CR1 to CR4 and PE1 to PE4 with allocation to OVAR0 to OVAR8.

The synchronous variant signals "SVAR" are generated in the RTI_A with CR1, CR2, CR3, CR4 and PE1, PE2, PE3, PE4. The control of the data processing flow has to wait for the validity of SVAR. There is no need to wait for the validity of AVAR signals, they are only sampled.

The signals "AVAR" (asynchronous variant signal) in the RTI and the signals "E_SVAR", "E_AVAR", which are delivered from outside of the RTI, were not used in the examples of data processing of the RTI_A.

FIG. 253 shows the allocation of the data processing activity of each element with its element input variant "VAR" to the parallel state "PSTA" for OVAR0 to OVAR8. For elements, which execute more than one DVSTP, not in the example, in column "VAR" a corresponding value for ASTA higher than one can be allocated. VAR=0"VAR0" is the element input for the base operation "OP.1" in "RTI_A". VAR=1"VAR1" is a first element input variant, compared to VAR0. VAR+1 means a usage of elements, which were not used in the base operation. VAR+2 means a modified element input compared to VAR+1. VAR is generated automatically by SPV. The SVAR signals CR1 to CR4 and PE1 to PE4 are valid with PSTA=2. The SVAR signals and the elements for building the SVAR signals are marked grey in FIG. 253. To the base operation (OVAR0) and to each base operation variant (OVAR1 to OVAR8) a definite coding of operation flow and/or error criteria is allocated, in the example this is the SVAR signal coding, so that OVAR is defined with the validation of the coding of the operation flow and/or error criteria, in the example this is the coding of SVAR signals.

With the definitions, mentioned above, in each PSTA for each coding of operation flow and/or of error criteria, in the example this is the SVAR signal coding, the data input (VAR) is defined for each element. With this the SPV specification for a complete RTI operation flow can be compiled, for example in a high-level program language ("C", "C++", "VHDL", "VERILOG", etc.), in which to each element for every DVSTP with "if, then, else" the coding of the operation flow and/or of error criteria is allocated.

The allocation of the coding of operation flow and/or error criteria (SVAR, AVAR, E_SVAR, E_AVAR) to each element for every DVSTP, in the example these are SVAR signals CR1 to CR4 and PE1 to PE4, assumes, that to each element DVSTP the decisive SVAR or/and E_SVAR signals are valid.

The SVAR signals are exclusively generated with a RTI operation flow inside of the RTI, the E_SVAR signals are supplied to the RTI from outside. In the example (FIG. 251, FIG. 251*a*-FIG. 251*i*, FIG. 252, FIG. 253), the operation flow of "OP.1" in RTI_A is controlled only by SVAR signals. In SPV, during the specification of an RTI operation, the validity of the SVAR signals for all DVSTPs of the elements, which are involved in the data processing is automatically checked.

In FIG. 253 the SVAR signals for the DVSTPs of the elements ADD1, REG13, ADD2, REG17, PO3, PO4, CMP4 and REG19 are not valid. The DVSTPs of elements, which are still without validity of the SVAR signals, are automatically moved to higher PSTA values, in which they own the validity of the SVAR signals. In the example the DVSTPs of the elements ADD1, REG13, ADD2, REG17, PO3, PO4, CMP4 and REG19 are moved to a PSTA value plus one, as FIG. 254 shows.

With E_SVAR signals it is waited for the signal validity for VAR decisions with element DVSTPs in the corresponding PSTA.

AVAR and E_AVAR signals with element DVSTPs are only sampled; there is no waiting for the validity of the signal.

The invention claimed is:

1. A computer-aided development method for generation of hardware systems, software systems, or software and hardware systems for an automatically controlled data processing flow in data processing components, said method comprising the following steps:

during development of the data processing in a data processing component, with each data processing step, automatically allocating states to each element, which define the position of data processing of the elements in the data processing flow and secure the data management of storing elements and of input ports of the data processing component in the data processing flow;

wherein a first state is designated as a parallel-state, and defines the position of data processing of the elements in the data processing flow, and a second state is designated as parallel-state-hold, and secures the data management of the storing elements and of the input ports of the data processing component in the data processing flow;

wherein a value of the parallel-state in a data processing component automatically defines for an operation the elements as receiver which execute simultaneously a data processing step, parallel data processing, and the sequence of the data processing steps of elements, serial data processing, in a numerical sequence of the parallel state, while a value of the parallel-state-hold automatically secures the storing elements and the input ports of the data processing component in the data processing flow against preliminary overwriting;

automatically calculating the value of the parallel-state and the parallel- state-hold during the development of the data processing in a data processing component;

assigning, in a data processing component, to input ports and storing elements including register, counter, shift-register, memory, a parallel-state and a parallel-state-hold, wherein the value of the parallel-state-hold is equal or greater than the value of the parallel-state, and the values of the parallel-state and the parallel-state-hold are set to a start value at operation begin of the data processing component;

increasing the parallel-state-hold value of a storing element by one with each data reception and setting the parallel-state value equal to the parallel- state-hold value, if the parallel-state-hold value before the data reception is equal or greater than the maximum parallel-state value of the data input sending elements, else taking the maximum parallel-state value of the data input sending elements increased by one from the parallel-state value and the parallel-state-hold value of the receiving storing elements;

always returning the generated parallel-state value minus one with the data reception of a storing element and taking it as the parallel-state-hold value of the data input sending elements and input ports of the data processing component, if their parallel-state-hold value is less than the returned parallel- state value minus one;

for counter, increasing the parallel-state-hold value by one and setting the parallel-state value equal to the parallel-state-hold value during execution of function steps, counting, independent of the number of function steps and generating with a last function step a valid signal;

with data change on input-ports of the data processing component the parallel-state value is set equal to the parallel-state-hold value;

assigning a parallel-state to output-ports of a data processing component, which parallel-state value is set to a start value at operation begin of the data processing component;

increasing the parallel-state value of an output port of the data processing component by one with every data reception, if the parallel-state value before the data reception is equal or greater than the maximum parallel-state value of the data input sending elements, else taking the maximum parallel-state value of the data input sending elements as the parallel-state value of the receiving output ports of the data processing component;

wherein, with the data reception of the output port of the data processing component, the generated parallel-state value is always returned and taken from the parallel-state-hold of the data input sending elements, if their parallel- state-hold value is less than the returned parallel-state value;

the parallel-state-hold of a combinational element takes the returned parallel-state value minus one of a storing element or the returned parallel-state value of an output port of the data processing component, if the existing parallel-state-hold value of the combinational element is less than the returned parallel-state value minus one of a storing element or the returned parallel-state value of an output port;

in combinational elements forwarding in transfer direction the maximum value of the parallel-states of the data input sending elements with every data processing step;

specifying an operation for a data processing component dependent on criteria and/or error events, separated into basic-operation and individual basic- operation-variants defined by a basic-operation-variant-number;

the basic-operation-variant-number is set to an initial value for a basic- operation and numbered sequentially for basic-operation- variants;

wherein each data processing component has elements with which the execution of data processing from operation requirements are met in sequential data processing steps and the basic-operation-variant-number, depending on the effective criteria and/or error events, which defines the following operation request and reports back to the component that generated the operation requests;

generating a basic-operation-variant by changing or/and amending data processing steps of a reference operation, a basic-operation or an existing basic-operation-variant; and when generating a basic-operation-variant by changing or/and amending data processing steps of a reference operation, the values for parallel-state and parallel-state-hold are automatically adjusted in the data path transfer direction with the change or/and amendment of each data processing step.

2. Computer aided development method according to claim 1, comprising the following steps:

in a data processing component, all elements receive automatically a variation-number, which defines the assignment of sent data to each element input for each data processing step in an operation;

for basic-operations, the variation-numbers for all elements of a data processing component are set to an basic operations initial value;

for basic-operation-variants, the elements of a data processing component are given the variation-number of the basic operation initial value zero, if their element input is identical to the basic-operation, for the other elements the variation-number is incremented;

wherein, for an operation in a data processing component, a particular combination of criteria and/or error events corresponds to a particular combination of the variation-numbers assigned to the elements;

elements in a basic-operation-variant that are not in the basic-operation are automatically given an additional identifier in the variation-number;

the variation-numbers are automatically generated for each element data reception during the development of data processing in a data processing component;

automatic generation of a compiler listing for each operation of a data processing component that is defined for each combination of criteria and/or error events, wherein according to the basic-operation-variant-numbers, the assignment of the element variation-number, for each data processing step and each parallel-state is defined;

criteria and/or error events which are formed internally in a data processing component by signals, or are introduced from outside into the data processing component, define for an operation in a data processing component two signal types, a signal type synchronous-variation and a signal type asynchronous-variation, which differently control an operation in a data processing component;

if the signal type synchronous-variation is generated internally in a data processing component and if its parallel-state for the evaluation of the criteria and/or error events is equal to or greater than the parallel-state for the execution of the dependent data processing steps, then the parallel-state for the execution of the data processing steps is automatically incremented by one in the compiler listing compared to the parallel-state for the evaluation of the criteria and/or error events;

if a data processing component receives from the outside the signal type synchronous-variation, then it waits for a validity signal of the signal type synchronous-variation and then the data processing steps dependent on the signal type synchronous-variation are continued;

with the signal type asynchronous-variation, only the current state without waiting time is queried in an operation in a data processing component during the evaluation of the criteria and/or error events; and for further processing of a system specification, which also represents the implementation, the element inputs of the data processing component can be automatically converted into "If-Then-Else constructs".

* * * * *